US012482458B2

(12) United States Patent
Engelke et al.

(10) Patent No.: US 12,482,458 B2
(45) Date of Patent: Nov. 25, 2025

(54) SEMIAUTOMATED RELAY METHOD AND APPARATUS

(71) Applicant: Ultratec, Inc., Madison, WI (US)

(72) Inventors: Robert M. Engelke, Madison, WI (US); Kevin R. Colwell, Middleton, WI (US); Christopher R. Engelke, Verona, WI (US)

(73) Assignee: Ultratec, Inc., Madison, WI (US)

( * ) Notice: Subject to any disclaimer, the term of this patent is extended or adjusted under 35 U.S.C. 154(b) by 123 days.

(21) Appl. No.: 16/422,662

(22) Filed: May 24, 2019

(65) Prior Publication Data

US 2019/0312973 A1 Oct. 10, 2019

Related U.S. Application Data

(63) Continuation-in-part of application No. 15/982,239, filed on May 17, 2018, now abandoned, which is a
(Continued)

(51) Int. Cl.
*G10L 15/183* (2013.01)
*G10L 15/26* (2006.01)
(Continued)

(52) U.S. Cl.
CPC ............ *G10L 15/183* (2013.01); *G10L 15/26* (2013.01); *G10L 25/60* (2013.01); *H04M 1/2475* (2013.01);
(Continued)

(58) Field of Classification Search
CPC ......... H04M 3/42391; H04M 1/72433; H04M 1/2475; H04M 1/72478; H04M 2201/40;
(Continued)

(56) References Cited

U.S. PATENT DOCUMENTS 2,004,253 A 6/1935 Tasker
3,372,246 A 3/1968 Knuepfer et al.
(Continued)

FOREIGN PATENT DOCUMENTS

DE 2647097 4/1978
DE 2749923 5/1979
(Continued)

OTHER PUBLICATIONS

United States Patent and Trademark Office Before the Patent Trial and Appeal Board, Decision—Institution of Inter Partes Review, *CaptionCall LLC* v. *Ultratec Inc.*, Case IPR2013-00550, U.S. Pat. No. 7,003,082 B2, Mar. 5, 2014, 13 pages.
(Continued)

*Primary Examiner* — Jack Yip
(74) *Attorney, Agent, or Firm* — Quarles & Brady LLP

(57) ABSTRACT

A captioning method for presenting captions to an assisted user (AU) during communication with a hearing user (HU) where the assisted user uses a captioned device and the hearing user uses a hearing user's device to facilitate the communication, the captioned device including a display screen and a speaker for presenting captions and broadcasting the hearing user's voice signals, respectively, the method comprising the steps of during an ongoing call between the AU and the HU, using an automated speech recognition (ASR) engine to generate initial ASR captions associated with the HU's voice signal, assessing at least one caption quality factor associated with prior initial ASR captions generated during the ongoing call, delaying broadcast of HU voice signal to the AU and based on the at least one caption quality factor, adjusting a duration of the HU voice signal broadcast delay.

15 Claims, 76 Drawing Sheets

Related U.S. Application Data continuation-in-part of application No. 15/729,069, filed on Oct. 10, 2017, now abandoned, which is a continuation-in-part of application No. 15/171,720, filed on Jun. 2, 2016, now Pat. No. 10,748,523, which is a continuation-in-part of application No. 14/953,631, filed on Nov. 30, 2015, now Pat. No. 10,878,721, which is a continuation-in-part of application No. 14/632,257, filed on Feb. 26, 2015, now Pat. No. 10,389,876.

(60) Provisional application No. 61/946,072, filed on Feb. 28, 2014.

(51) Int. Cl.
*G10L 25/60* (2013.01)
*H04M 1/247* (2021.01)
*H04M 1/72433* (2021.01)
*H04M 1/72478* (2021.01)
*H04M 3/42* (2006.01)

(52) U.S. Cl.
CPC ... *H04M 1/72433* (2021.01); *H04M 1/72478* (2021.01); *H04M 3/42391* (2013.01); *H04M 2201/40* (2013.01); *H04M 2201/60* (2013.01)

(58) Field of Classification Search
CPC .. H04M 2201/60; G10L 15/183; G10L 15/26; G10L 25/60; G10L 15/01
See application file for complete search history.

(56) References Cited

U.S. PATENT DOCUMENTS 3,507,997 A 4/1970 Weitbrecht
3,515,814 A 6/1970 Morgan et al.
3,585,303 A 6/1971 Chieffo et al.
3,598,920 A 8/1971 Fischer et al.
3,800,089 A 3/1974 Reddick
3,896,267 A 7/1975 Sachs et al.
3,959,607 A 5/1976 Vargo
3,976,995 A 8/1976 Sebestyen
4,012,599 A 3/1977 Meyer
4,039,768 A 8/1977 O'Maley
4,126,768 A 11/1978 Grenzow
4,151,380 A 4/1979 Blomeyer et al.
4,160,136 A 7/1979 McGough
4,188,665 A 2/1980 Nagel et al.
4,191,854 A 3/1980 Coles
4,201,887 A 5/1980 Burns
4,254,308 A 3/1981 Blomeyer et al.
D259,348 S 5/1981 Sakai et al.
4,268,721 A 5/1981 Nielson et al.
4,289,931 A 9/1981 Baker
4,302,629 A 11/1981 Foulkes et al.
4,307,266 A 12/1981 Messina
4,354,252 A 10/1982 Lamb
4,415,065 A 11/1983 Sandstedt
4,426,555 A 1/1984 Underkoffler
4,430,726 A 2/1984 Kasday
D273,110 S 3/1984 Genaro et al.
4,451,701 A 5/1984 Bendig
4,471,165 A 9/1984 DeFino et al.
D275,857 S 10/1984 Moraine
4,490,579 A 12/1984 Godoshian
4,503,288 A 3/1985 Kessler
D278,435 S 4/1985 Hikawa
4,524,244 A 6/1985 Faggin
D280,099 S 8/1985 Topp
4,533,791 A 8/1985 Read et al.
4,568,803 A 2/1986 Frola
4,569,421 A 2/1986 Sandstedt
D283,421 S 4/1986 Brier
4,625,080 A 11/1986 Scott
RE32,365 E 3/1987 Sebestyen
4,650,927 A 3/1987 James
4,659,876 A 4/1987 Sullivan et al.
4,713,808 A 12/1987 Gaskill
4,754,474 A 6/1988 Feinson
D296,894 S 7/1988 Chen
4,777,469 A 10/1988 Engelke et al.
4,790,003 A 12/1988 Kepley et al.
4,799,254 A 1/1989 Dayton
4,815,121 A 3/1989 Yoshida
4,817,135 A 3/1989 Winebaum
4,839,919 A 6/1989 Borges
4,849,750 A 7/1989 Andros
4,866,778 A 9/1989 Baker
4,868,860 A 9/1989 Andros et al.
4,879,738 A 11/1989 Petro
4,897,868 A 1/1990 Engelke et al.
D306,727 S 3/1990 Fritzsche
4,908,866 A 3/1990 Goldwasser et al.
4,918,723 A 4/1990 Iggulden et al.
4,926,460 A 5/1990 Gutman et al.
4,951,043 A 8/1990 Minami
4,959,847 A 9/1990 Engelke et al.
D312,457 S 11/1990 Inatomi
4,995,077 A 2/1991 Malinowski
5,025,442 A 6/1991 Lynk et al.
5,027,406 A 6/1991 Roberts et al.
5,033,088 A 7/1991 Shipman
5,051,924 A 9/1991 Bergeron et al.
D322,785 S 12/1991 Wu
5,081,673 A 1/1992 Engelke et al.
5,086,453 A 2/1992 Senoo et al.
5,091,906 A 2/1992 Reed et al.
5,095,307 A 3/1992 Shimura et al.
5,099,507 A 3/1992 Mukai et al.
5,121,421 A 6/1992 Alheim
5,128,980 A 7/1992 Choi
5,134,633 A 7/1992 Werner
5,146,502 A 9/1992 Davis
5,163,081 A 11/1992 Wycherley et al.
5,192,948 A 3/1993 Neustein
5,199,077 A 3/1993 Wilcox et al.
5,210,689 A 5/1993 Baker et al.
5,214,428 A 5/1993 Allen
5,216,702 A 6/1993 Ramsden
5,249,220 A 9/1993 Moskowitz et al.
5,280,516 A 1/1994 Jang
5,289,523 A 2/1994 Vasile et al.
5,294,982 A 3/1994 Salomon et al.
5,307,399 A 4/1994 Pai et al.
5,311,516 A 5/1994 Kuznicki et al.
5,318,340 A 6/1994 Henry
5,325,417 A 6/1994 Engelke et al.
5,327,479 A 7/1994 Engelke et al.
5,339,358 A 8/1994 Danish et al.
5,343,519 A 8/1994 Feldman
5,351,288 A 9/1994 Engelke et al.
D351,185 S 10/1994 Matsuda et al.
5,359,651 A 10/1994 Draganoff
5,375,160 A 12/1994 Guidon et al.
5,377,263 A 12/1994 Bazemore et al.
5,392,343 A 2/1995 Davitt et al.
5,393,236 A 2/1995 Blackmer
5,396,650 A 3/1995 Terauchi
D357,253 S 4/1995 Wong
5,410,541 A 4/1995 Hotto
5,423,555 A 6/1995 Kidrin
5,424,785 A 6/1995 Orphan
5,426,706 A 6/1995 Wood
5,432,837 A 7/1995 Engelke et al.
5,459,458 A 10/1995 Richardson et al.
5,463,665 A 10/1995 Millios et al.
D364,865 S 12/1995 Engelke et al.
5,475,733 A 12/1995 Eisdorfer et al.
5,475,798 A 12/1995 Handlos
5,477,274 A 12/1995 Akiyoshi et al.
5,487,102 A 1/1996 Rothschild et al.
5,487,671 A 1/1996 Shpiro
5,497,373 A 3/1996 Hulen et al.

(56) References Cited

U.S. PATENT DOCUMENTS

| | | | |
|---|---|---|---|
| 5,508,754 | A | 4/1996 | Orphan |
| 5,517,548 | A | 5/1996 | Engelke et al. |
| 5,519,443 | A | 5/1996 | Salomon et al. |
| 5,519,808 | A | 5/1996 | Benton, Jr. et al. |
| 5,521,960 | A | 5/1996 | Aronow |
| 5,522,089 | A | 5/1996 | Kikinis et al. |
| 5,537,436 | A | 7/1996 | Bottoms et al. |
| 5,559,855 | A | 9/1996 | Dowens et al. |
| 5,559,856 | A | 9/1996 | Dowens |
| 5,574,776 | A | 11/1996 | Leuca et al. |
| 5,574,784 | A | 11/1996 | LaPadula et al. |
| 5,581,593 | A | 12/1996 | Engelke et al. |
| 5,604,786 | A | 2/1997 | Engelke et al. |
| D379,181 | S | 5/1997 | Sawano et al. |
| 5,649,060 | A | 7/1997 | Ellozy et al. |
| 5,671,267 | A | 9/1997 | August et al. |
| 5,680,443 | A | 10/1997 | Kasday et al. |
| 5,687,222 | A | 11/1997 | McLaughlin et al. |
| 5,701,338 | A | 12/1997 | Leyen et al. |
| 5,710,806 | A | 1/1998 | Lee et al. |
| 5,712,901 | A | 1/1998 | Meermans |
| 5,724,405 | A | 3/1998 | Engelke et al. |
| 5,745,550 | A | 4/1998 | Eisdorfer et al. |
| 5,751,338 | A | 5/1998 | Ludwig, Jr. |
| 5,787,148 | A | 7/1998 | August |
| 5,799,273 | A | 8/1998 | Mitchell et al. |
| 5,799,279 | A | 8/1998 | Gould et al. |
| 5,809,112 | A | 9/1998 | Ryan |
| 5,809,425 | A | 9/1998 | Colwell et al. |
| 5,815,196 | A | 9/1998 | Alshawi |
| 5,826,102 | A | 10/1998 | Escobar et al. |
| 5,850,627 | A | 12/1998 | Gould et al. |
| 5,855,000 | A | 12/1998 | Waibel et al. |
| D405,793 | S | 2/1999 | Engelke et al. |
| 5,867,817 | A | 2/1999 | Catallo et al. |
| 5,870,709 | A | 2/1999 | Bernstein |
| 5,883,986 | A | 3/1999 | Kopec et al. |
| 5,893,034 | A | 4/1999 | Hikuma et al. |
| 5,899,976 | A | 5/1999 | Rozak |
| 5,905,476 | A | 5/1999 | McLaughlin et al. |
| 5,909,482 | A | 6/1999 | Engelke |
| 5,915,379 | A | 6/1999 | Wallace et al. |
| 5,917,888 | A | 6/1999 | Giuntoli |
| 5,926,527 | A | 7/1999 | Jenkins et al. |
| 5,940,475 | A | 8/1999 | Hansen |
| 5,974,116 | A | 10/1999 | Engelke et al. |
| 5,978,014 | A | 11/1999 | Martin et al. |
| 5,978,654 | A | 11/1999 | Colwell et al. |
| 5,982,853 | A | 11/1999 | Liebermann |
| 5,982,861 | A | 11/1999 | Holloway et al. |
| 5,991,291 | A | 11/1999 | Asai et al. |
| 5,991,723 | A | 11/1999 | Duffin |
| 5,995,590 | A | 11/1999 | Brunet et al. |
| 6,002,749 | A | 12/1999 | Hansen et al. |
| 6,067,516 | A | 5/2000 | Levay et al. |
| 6,072,860 | A | 6/2000 | Kek et al. |
| 6,075,534 | A | 6/2000 | VanBuskirk et al. |
| 6,075,841 | A | 6/2000 | Engelke et al. |
| 6,075,842 | A | 6/2000 | Engelke et al. |
| 6,100,882 | A | 8/2000 | Sharman et al. |
| 6,122,613 | A | 9/2000 | Baker |
| 6,141,341 | A | 10/2000 | Jones et al. |
| 6,141,415 | A | 10/2000 | Rao |
| 6,173,259 | B1 | 1/2001 | Bijl et al. |
| 6,175,819 | B1 | 1/2001 | Van Alstine |
| 6,181,736 | B1 | 1/2001 | McLaughlin et al. |
| 6,181,778 | B1 | 1/2001 | Ohki et al. |
| 6,188,429 | B1 | 2/2001 | Martin et al. |
| 6,233,314 | B1 | 5/2001 | Engelke |
| 6,243,684 | B1 | 6/2001 | Stuart et al. |
| 6,278,772 | B1 | 8/2001 | Bowater et al. |
| 6,298,326 | B1 | 10/2001 | Feller |
| 6,307,921 | B1 | 10/2001 | Engelke et al. |
| 6,314,396 | B1 | 11/2001 | Monkowski |
| 6,317,716 | B1 | 11/2001 | Braida et al. |
| 6,324,507 | B1 | 11/2001 | Lewis et al. |
| 6,345,251 | B1 | 2/2002 | Jansson et al. |
| 6,366,882 | B1 | 4/2002 | Bijl et al. |
| 6,374,221 | B1 | 4/2002 | Haimi-Cohen |
| 6,377,925 | B1 | 4/2002 | Greene, Jr. et al. |
| 6,381,472 | B1 | 4/2002 | LaMedica, Jr. et al. |
| 6,385,582 | B1 | 5/2002 | Iwata |
| 6,385,586 | B1 | 5/2002 | Dietz |
| 6,389,114 | B1 | 5/2002 | Dowens et al. |
| 6,424,935 | B1 | 7/2002 | Taylor |
| 6,430,270 | B1 | 8/2002 | Cannon et al. |
| 6,442,518 | B1 | 8/2002 | Van Thong et al. |
| 6,445,799 | B1 | 9/2002 | Taenzer et al. |
| 6,457,031 | B1 | 9/2002 | Hanson |
| 6,473,778 | B1 | 10/2002 | Gibbon |
| 6,493,426 | B2 | 12/2002 | Engelke et al. |
| 6,493,447 | B1 | 12/2002 | Goss et al. |
| 6,504,910 | B1 | 1/2003 | Engelke et al. |
| 6,507,735 | B1 | 1/2003 | Baker et al. |
| 6,510,206 | B2 | 1/2003 | Engelke et al. |
| 6,549,611 | B2 | 4/2003 | Engelke et al. |
| 6,549,614 | B1 | 4/2003 | Zebryk et al. |
| 6,567,503 | B2 | 5/2003 | Engelke et al. |
| 6,594,346 | B2 | 7/2003 | Engelke |
| 6,603,835 | B2 | 8/2003 | Engelke et al. |
| 6,625,259 | B1 | 9/2003 | Hollatz et al. |
| 6,633,630 | B1 | 10/2003 | Owens et al. |
| 6,661,879 | B1 | 12/2003 | Schwartz et al. |
| 6,668,042 | B2 | 12/2003 | Michaelis |
| 6,668,044 | B1 | 12/2003 | Schwartz et al. |
| 6,701,162 | B1 | 3/2004 | Everett |
| 6,704,709 | B1 | 3/2004 | Kahn et al. |
| 6,748,053 | B2 | 6/2004 | Engelke et al. |
| 6,763,089 | B2 | 7/2004 | Feigenbaum |
| 6,775,360 | B2 | 8/2004 | Davidson et al. |
| 6,778,824 | B2 | 8/2004 | Nonak et al. |
| 6,813,603 | B1 | 11/2004 | Groner et al. |
| 6,816,468 | B1 | 11/2004 | Cruickshank |
| 6,816,469 | B1 | 11/2004 | Kung et al. |
| 6,816,834 | B2 | 11/2004 | Jaroker |
| 6,831,974 | B1 | 12/2004 | Watson et al. |
| 6,850,609 | B1 | 2/2005 | Schrage |
| 6,865,258 | B1 | 3/2005 | Polcyn |
| 6,876,967 | B2 | 4/2005 | Goto et al. |
| 6,882,707 | B2 | 4/2005 | Engelke et al. |
| 6,885,731 | B2 | 4/2005 | Engelke et al. |
| 6,894,346 | B2 | 5/2005 | Onose et al. |
| 6,934,366 | B2 | 8/2005 | Engelke et al. |
| 6,934,376 | B1 | 8/2005 | McLaughlin et al. |
| 6,947,896 | B2 | 9/2005 | Hanson |
| 6,948,066 | B2 | 9/2005 | Hind et al. |
| 6,950,500 | B1 | 9/2005 | Chaturvedi et al. |
| 6,980,953 | B1 | 12/2005 | Kanevsky et al. |
| 7,003,082 | B2 | 2/2006 | Engelke et al. |
| 7,003,463 | B1 | 2/2006 | Maes et al. |
| 7,006,604 | B2 | 2/2006 | Engelke |
| 7,016,479 | B2 | 3/2006 | Flathers et al. |
| 7,016,844 | B2 | 3/2006 | Othmer et al. |
| 7,035,383 | B2 | 4/2006 | ONeal |
| 7,042,718 | B2 | 5/2006 | Aoki et al. |
| 7,088,832 | B1 | 8/2006 | Cooper |
| 7,117,152 | B1 | 10/2006 | Mukherji et al. |
| 7,117,438 | B2 | 10/2006 | Wallace et al. |
| 7,130,790 | B1 | 10/2006 | Flanagan et al. |
| 7,133,513 | B1 | 11/2006 | Zhang |
| 7,136,478 | B1 | 11/2006 | Brand et al. |
| 7,142,642 | B2 | 11/2006 | McClelland et al. |
| 7,142,643 | B2 | 11/2006 | Brooksby |
| 7,164,753 | B2 | 1/2007 | Engelke et al. |
| 7,191,135 | B2 | 3/2007 | O'Hagan |
| 7,199,787 | B2 | 4/2007 | Lee et al. |
| 7,221,405 | B2 | 5/2007 | Basson et al. |
| 7,233,655 | B2 | 6/2007 | Gailey et al. |
| 7,287,009 | B1 | 10/2007 | Liebermann |
| 7,295,663 | B2 | 11/2007 | McLaughlin et al. |
| 7,313,231 | B2 | 12/2007 | Reid |
| 7,315,612 | B2 | 1/2008 | McClelland |
| 7,319,740 | B2 | 1/2008 | Engelke et al. |
| 7,330,737 | B2 | 2/2008 | Mahini |

(56) References Cited

U.S. PATENT DOCUMENTS

| | | | |
|---|---|---|---|
| 7,346,506 | B2 | 3/2008 | Lueck et al. |
| 7,363,006 | B2 | 4/2008 | Mooney |
| 7,406,413 | B2 | 7/2008 | Geppert et al. |
| 7,428,702 | B1 | 9/2008 | Cervantes et al. |
| 7,430,283 | B2 | 9/2008 | Steel, Jr. |
| 7,480,613 | B2 | 1/2009 | Kellner |
| 7,519,536 | B2 | 4/2009 | Maes et al. |
| 7,555,104 | B2 | 6/2009 | Engelke |
| 7,573,985 | B2 | 8/2009 | McClelland et al. |
| 7,606,718 | B2 | 10/2009 | Cloran |
| 7,613,610 | B1 | 11/2009 | Zimmerman et al. |
| 7,660,398 | B2 | 2/2010 | Engelke et al. |
| 7,747,434 | B2 | 6/2010 | Flanagan et al. |
| 7,792,701 | B2 | 9/2010 | Basson et al. |
| 7,831,429 | B2 | 11/2010 | O'Hagan |
| 7,836,412 | B1 | 11/2010 | Zimmerman |
| 7,844,454 | B2 | 11/2010 | Coles et al. |
| 7,848,358 | B2 | 12/2010 | LaDue |
| 7,881,441 | B2 | 2/2011 | Engelke et al. |
| 7,904,113 | B2 | 3/2011 | Ozluturk et al. |
| 7,962,339 | B2 | 6/2011 | Pieraccini et al. |
| 8,019,608 | B2 | 9/2011 | Carraux et al. |
| 8,032,383 | B1 | 10/2011 | Bhardwaj et al. |
| 8,180,639 | B2 | 5/2012 | Pieraccini et al. |
| 8,213,578 | B2 | 7/2012 | Engleke et al. |
| 8,249,878 | B2 | 8/2012 | Carraux et al. |
| 8,259,920 | B2 | 9/2012 | Abramson et al. |
| 8,265,671 | B2 | 9/2012 | Gould et al. |
| 8,286,071 | B1 | 10/2012 | Zimmerman et al. |
| 8,325,883 | B2 | 12/2012 | Schultz et al. |
| 8,332,212 | B2 | 12/2012 | Wittenstein et al. |
| 8,332,227 | B2 | 12/2012 | Maes et al. |
| 8,335,689 | B2 | 12/2012 | Wittenstein et al. |
| 8,352,883 | B2 | 1/2013 | Kashik et al. |
| 8,369,488 | B2 | 2/2013 | Sennett et al. |
| 8,370,142 | B2 | 2/2013 | Frankel et al. |
| 8,379,801 | B2 | 2/2013 | Romriell et al. |
| 8,407,052 | B2 | 3/2013 | Hager |
| 8,416,925 | B2 | 4/2013 | Engelke et al. |
| 8,447,366 | B2 | 5/2013 | Ungari et al. |
| 8,473,003 | B2 | 6/2013 | Jung et al. |
| 8,504,372 | B2 | 8/2013 | Carraux et al. |
| 8,510,109 | B2 | 8/2013 | Terrell, II et al. |
| 8,526,581 | B2 | 9/2013 | Charugundla |
| 8,538,324 | B2 | 9/2013 | Hardacker et al. |
| 8,554,559 | B1 | 10/2013 | Aleksic et al. |
| 8,605,682 | B2 | 12/2013 | Efrati et al. |
| 8,626,249 | B2 | 1/2014 | Ungari et al. |
| 8,645,136 | B2 | 2/2014 | Milstein |
| 8,682,672 | B1 | 3/2014 | Ha et al. |
| 8,781,510 | B2 | 7/2014 | Gould et al. |
| 8,806,455 | B1 | 8/2014 | Katz |
| 8,867,532 | B2 | 10/2014 | Wozniak et al. |
| 8,868,425 | B2 | 10/2014 | Maes et al. |
| 8,874,070 | B2 | 10/2014 | Basore et al. |
| 8,892,447 | B1 | 11/2014 | Srinivasan et al. |
| 8,908,838 | B2 | 12/2014 | Engelke et al. |
| 8,917,821 | B2 | 12/2014 | Engelke et al. |
| 8,917,822 | B2 | 12/2014 | Engelke et al. |
| 8,930,189 | B2 | 1/2015 | Cath et al. |
| 8,930,194 | B2 | 1/2015 | Newman et al. |
| 8,972,261 | B2 | 3/2015 | Milstein |
| 9,069,377 | B2 | 6/2015 | Wilson et al. |
| 9,124,716 | B1 | 9/2015 | Charugundla |
| 9,161,166 | B2 | 10/2015 | Johansson et al. |
| 9,183,843 | B2 | 11/2015 | Fanty et al. |
| 9,185,211 | B2 | 11/2015 | Roach et al. |
| 9,191,789 | B2 | 11/2015 | Pan |
| 9,215,406 | B2 | 12/2015 | Paripally et al. |
| 9,215,409 | B2 | 12/2015 | Montero et al. |
| 9,218,808 | B2 | 12/2015 | Milstein |
| 9,231,902 | B2 | 1/2016 | Brown et al. |
| 9,245,522 | B2 | 1/2016 | Hager |
| 9,247,052 | B1 | 1/2016 | Walton |
| 9,277,043 | B1 | 3/2016 | Bladon et al. |
| 9,305,552 | B2 | 4/2016 | Kim et al. |
| 9,318,110 | B2 | 4/2016 | Roe |
| 9,324,324 | B2 | 4/2016 | Knighton |
| 9,336,689 | B2 | 5/2016 | Romriell et al. |
| 9,344,562 | B2 | 5/2016 | Moore et al. |
| 9,355,611 | B1 | 5/2016 | Wang et al. |
| 9,380,150 | B1 | 6/2016 | Bullough et al. |
| 9,392,108 | B2 | 7/2016 | Milstein |
| 9,460,719 | B1 | 10/2016 | Antunes et al. |
| 9,495,964 | B2 | 11/2016 | Kim et al. |
| 9,502,033 | B2 | 11/2016 | Carraux et al. |
| 9,535,891 | B2 | 1/2017 | Raheja et al. |
| 9,536,567 | B2 | 1/2017 | Garland et al. |
| 9,571,638 | B1 | 2/2017 | Knighton et al. |
| 9,576,498 | B1 | 2/2017 | Zimmerman et al. |
| 9,628,620 | B1 | 4/2017 | Rae et al. |
| 9,632,997 | B1 | 4/2017 | Johnson et al. |
| 9,633,657 | B2 | 4/2017 | Svendsen et al. |
| 9,633,658 | B2 | 4/2017 | Milstein |
| 9,633,696 | B1 | 4/2017 | Miller et al. |
| 9,653,076 | B2 | 5/2017 | Kim |
| 9,672,825 | B2 | 6/2017 | Arslan et al. |
| 9,704,111 | B1 | 7/2017 | Antunes et al. |
| 9,715,876 | B2 | 7/2017 | Hager |
| 9,761,241 | B2 | 9/2017 | Maes et al. |
| 9,774,747 | B2 | 9/2017 | Garland et al. |
| 9,805,118 | B2 | 10/2017 | Ko et al. |
| 9,848,082 | B1 | 12/2017 | Lillard et al. |
| 9,858,256 | B2 | 1/2018 | Hager |
| 9,858,929 | B2 | 1/2018 | Milstein |
| 9,886,956 | B1 | 2/2018 | Antunes et al. |
| 9,916,295 | B1 | 3/2018 | Crawford |
| 9,947,322 | B2 | 4/2018 | Kang et al. |
| 9,953,653 | B2 | 4/2018 | Newman et al. |
| 10,032,455 | B2 | 7/2018 | Newman et al. |
| 10,044,854 | B2 | 8/2018 | Rae et al. |
| 10,049,669 | B2 | 8/2018 | Newman et al. |
| 10,469,660 | B2 | 11/2019 | Engelke et al. |
| 10,491,746 | B2 | 11/2019 | Engelke et al. |
| 10,553,208 | B2 | 2/2020 | Nelson et al. |
| 10,574,804 | B2 | 2/2020 | Bullough et al. |
| 10,587,751 | B2 | 3/2020 | Engelke et al. |
| 10,742,805 | B2 | 8/2020 | Engelke et al. |
| 11,011,157 | B2 | 5/2021 | Dernoncourt |
| 11,017,778 | B1 | 5/2021 | Thomson et al. |
| 11,170,782 | B2 | 11/2021 | Stoker et al. |
| 11,176,944 | B2 | 11/2021 | Boekweg et al. |
| 11,315,569 | B1 | 4/2022 | Talieh et al. |
| 11,363,141 | B2 | 6/2022 | Friio |
| 11,368,581 | B2 | 6/2022 | Engelke et al. |
| 11,445,266 | B2 | 9/2022 | Maurice |
| 11,636,859 | B2 | 4/2023 | Boekweg et al. |
| 11,785,278 | B1 | 10/2023 | Stone |
| 11,869,507 | B2 | 1/2024 | Min et al. |
| 11,934,791 | B2 | 3/2024 | Ravi et al. |
| 11,962,716 | B2 | 4/2024 | Patron et al. |
| 12,035,070 | B2 | 7/2024 | Engelke et al. |
| 12,094,481 | B2 | 9/2024 | Xu et al. |
| 12,136,425 | B2 | 11/2024 | Engelke et al. |
| 12,136,426 | B2 | 11/2024 | Engelke et al. |
| 12,137,183 | B2 | 11/2024 | Engelke et al. |
| 2001/0005825 | A1 | 6/2001 | Engelke et al. |
| 2002/0007275 | A1 | 1/2002 | Goto et al. |
| 2002/0049589 | A1 | 4/2002 | Poirier |
| 2002/0055351 | A1 | 5/2002 | Elsey et al. |
| 2002/0085685 | A1 | 7/2002 | Engelke et al. |
| 2002/0085703 | A1 | 7/2002 | Proctor |
| 2002/0094800 | A1 | 7/2002 | Trop et al. |
| 2002/0095290 | A1 | 7/2002 | Kahn et al. |
| 2002/0101537 | A1 | 8/2002 | Basson et al. |
| 2002/0103008 | A1 | 8/2002 | Rahn et al. |
| 2002/0114429 | A1 | 8/2002 | Engelke et al. |
| 2002/0119800 | A1 | 8/2002 | Jaggers et al. |
| 2002/0161578 | A1* | 10/2002 | Saindon .................. G06F 40/58 704/235 |
| 2002/0178001 | A1 | 11/2002 | Balluff et al. |
| 2002/0178002 | A1 | 11/2002 | Boguraev et al. |
| 2002/0193076 | A1 | 12/2002 | Rogers et al. |
| 2003/0045329 | A1 | 3/2003 | Kinoshita |

(56) References Cited

U.S. PATENT DOCUMENTS

2003/0063731 A1 4/2003 Woodring
2003/0069997 A1 4/2003 Bravin et al.
2003/0097262 A1 5/2003 Nelson
2003/0163310 A1 8/2003 Caldwell et al.
2003/0212547 A1 11/2003 Engelke et al.
2004/0064317 A1 4/2004 Othmer et al.
2004/0066926 A1 4/2004 Brockbank et al.
2004/0083105 A1 4/2004 Jaroker
2004/0143430 A1 7/2004 Said et al.
2004/0266410 A1 12/2004 Sand et al.
2005/0025290 A1 2/2005 Doherty et al.
2005/0048992 A1 3/2005 Wu et al.
2005/0049879 A1 3/2005 Audu et al.
2005/0063520 A1 3/2005 Michaelis
2005/0094776 A1 5/2005 Haldeman et al.
2005/0094777 A1 5/2005 McClelland
2005/0129185 A1 6/2005 McClelland et al.
2005/0144012 A1 6/2005 Afrashteh et al.
2005/0180553 A1 8/2005 Moore
2005/0183109 A1 8/2005 Basson et al.
2005/0209859 A1 9/2005 Tenembaum et al.
2005/0225628 A1 10/2005 Antoniou
2005/0226394 A1 10/2005 Engelke et al.
2005/0226398 A1 10/2005 Bojeun
2005/0232169 A1 10/2005 McLaughlin et al.
2005/0277431 A1 12/2005 White
2006/0026003 A1 2/2006 Carus et al.
2006/0089857 A1 4/2006 Zimmerman et al.
2006/0095575 A1 5/2006 Sureka et al.
2006/0105712 A1 5/2006 Glass et al.
2006/0133583 A1 6/2006 Brooksby
2006/0140354 A1 6/2006 Engelke
2006/0149558 A1 7/2006 Kahn et al.
2006/0167686 A1 7/2006 Kahn
2006/0172720 A1 8/2006 Islam et al.
2006/0190249 A1 8/2006 Kahn et al.
2006/0285652 A1 12/2006 McClelland et al.
2006/0285662 A1 12/2006 Yin et al.
2006/0293888 A1 12/2006 Jindal
2007/0011012 A1 1/2007 Yurick et al.
2007/0024583 A1 2/2007 Gettemy et al.
2007/0036282 A1 2/2007 Engelke et al.
2007/0116190 A1 5/2007 Bangor et al.
2007/0118373 A1 5/2007 Wise et al.
2007/0126926 A1 6/2007 Miyamoto et al.
2007/0153989 A1 7/2007 Howell et al.
2007/0208570 A1 9/2007 Bhardwaj et al.
2007/0282597 A1 12/2007 Cho et al.
2008/0005440 A1 1/2008 Li et al.
2008/0040111 A1* 2/2008 Miyamoto .............. G10L 15/22
704/E15.04
2008/0043936 A1 2/2008 Liebermann
2008/0064326 A1 3/2008 Foster et al.
2008/0129864 A1 6/2008 Stone et al.
2008/0152093 A1 6/2008 Engelke et al.
2008/0187108 A1 8/2008 Engelke et al.
2008/0215323 A1 9/2008 Shaffer et al.
2008/0312828 A1 12/2008 Marsalka et al.
2008/0319745 A1 12/2008 Caldwell et al.
2009/0037171 A1 2/2009 McFarland et al.
2009/0089236 A1 4/2009 Lamprecht et al.
2009/0174759 A1 7/2009 Yeh et al.
2009/0276215 A1 11/2009 Hager
2009/0299743 A1 12/2009 Rogers
2009/0306981 A1 12/2009 Cromack et al.
2009/0326939 A1 12/2009 Toner et al.
2010/0007711 A1 1/2010 Bell
2010/0027765 A1 2/2010 Schultz et al.
2010/0030738 A1 2/2010 Geer
2010/0063815 A1* 3/2010 Cloran ................. G06Q 10/103
704/235
2010/0076752 A1 3/2010 Zweig et al.
2010/0121629 A1 5/2010 Cohen
2010/0125791 A1 5/2010 Katis et al.
2010/0141834 A1 6/2010 Cuttner
2010/0145729 A1 6/2010 Katz
2010/0204989 A1 8/2010 Boes et al.
2010/0225807 A1 9/2010 Mears
2010/0228548 A1 9/2010 Liu et al.
2010/0293232 A1 11/2010 Jackson et al.
2010/0299131 A1 11/2010 Lanham et al.
2010/0323728 A1 12/2010 Gould et al.
2011/0013756 A1 1/2011 Davies et al.
2011/0022387 A1 1/2011 Hager
2011/0087491 A1 4/2011 Wittenstein et al.
2011/0099011 A1 4/2011 Jaiswal
2011/0112833 A1 5/2011 Frankel et al.
2011/0123003 A1 5/2011 Romriell et al.
2011/0128953 A1 6/2011 Wozniak et al.
2011/0170672 A1 7/2011 Engelke et al.
2011/0206189 A1 8/2011 Kennedy et al.
2011/0231184 A1 9/2011 Kerr
2011/0289134 A1 11/2011 de los Reyes et al.
2012/0016671 A1 1/2012 Jaggi et al.
2012/0022865 A1 1/2012 Milstein
2012/0062791 A1 3/2012 Thakolsri et al.
2012/0108196 A1 5/2012 Musgrove et al.
2012/0178064 A1 7/2012 Katz
2012/0214447 A1 8/2012 Russell et al.
2012/0245936 A1 9/2012 Treglia
2012/0250837 A1 10/2012 Engleke et al.
2012/0265529 A1 10/2012 Nachtrab et al.
2012/0278071 A1* 11/2012 Garland ................. H04M 11/10
704/235
2012/0284015 A1 11/2012 Drewes
2013/0013904 A1 1/2013 Tran
2013/0017800 A1 1/2013 Gouvia et al.
2013/0030804 A1 1/2013 Zavaliagkos et al.
2013/0035936 A1 2/2013 Garland et al.
2013/0045720 A1 2/2013 Madhavapeddl et al.
2013/0086293 A1 4/2013 Bosse et al.
2013/0171958 A1 7/2013 Goodson et al.
2013/0219098 A1 8/2013 Turnpenny et al.
2013/0254264 A1 9/2013 Hankinson et al.
2013/0262563 A1 10/2013 Lu
2013/0289971 A1 10/2013 Parkinson et al.
2013/0308763 A1 11/2013 Engleke et al.
2013/0317818 A1 11/2013 Bigham et al.
2013/0331056 A1 12/2013 McKown et al.
2013/0340003 A1 12/2013 Davis et al.
2014/0018045 A1 1/2014 Tucker
2014/0039871 A1 2/2014 Crawford
2014/0099909 A1 4/2014 Daly et al.
2014/0153705 A1 6/2014 Moore et al.
2014/0180667 A1* 6/2014 Johansson ............... G06F 40/58
704/2
2014/0270101 A1 9/2014 Maxwell et al.
2014/0314220 A1 10/2014 Charugundla
2014/0341359 A1 11/2014 Engelke et al.
2014/0365213 A1 12/2014 Totzke
2015/0032450 A1 1/2015 Hussain et al.
2015/0073790 A1 3/2015 Steuble et al.
2015/0074113 A1 3/2015 Ito et al.
2015/0088508 A1 3/2015 Bharadwaj et al.
2015/0094105 A1 4/2015 Pan
2015/0106091 A1 4/2015 Wetjen et al.
2015/0130887 A1 5/2015 Thelin et al.
2015/0131786 A1 5/2015 Roach et al.
2015/0279352 A1 10/2015 Willett et al.
2015/0287043 A1 10/2015 Michaelis et al.
2015/0288815 A1 10/2015 Charugundla
2015/0341486 A1* 11/2015 Knighton ................ G10L 15/26
455/414.1
2015/0358461 A1 12/2015 Klaban
2016/0012751 A1 1/2016 Hirozawa
2016/0119571 A1 4/2016 Ko
2016/0133251 A1 5/2016 Kadirkamanathan et al.
2016/0155435 A1 6/2016 Mohideen
2016/0179831 A1 6/2016 Gruber et al.
2016/0277709 A1 9/2016 Stringham et al.
2016/0295293 A1 10/2016 McLaughlin
2017/0085506 A1 3/2017 Gordon
2017/0178182 A1 6/2017 Kuskey et al.
2017/0187826 A1 6/2017 Russell et al.

(56) References Cited

U.S. PATENT DOCUMENTS

| | | | | |
|---|---|---|---|---|
| 2017/0187876 | A1 | 6/2017 | Hayes et al. | |
| 2017/0206808 | A1 | 7/2017 | Engelke et al. | |
| 2018/0013886 | A1 | 1/2018 | Rae et al. | |
| 2018/0081869 | A1 | 3/2018 | Hager | |
| 2018/0102130 | A1 | 4/2018 | Holm et al. | |
| 2018/0197545 | A1 | 7/2018 | Willett et al. | |
| 2018/0255163 | A1* | 9/2018 | Stimpson | H04M 1/2475 |
| 2018/0270350 | A1 | 9/2018 | Engelke et al. | |
| 2018/0315417 | A1 | 11/2018 | Flaks et al. | |
| 2019/0108834 | A1 | 4/2019 | Nelson et al. | |
| 2019/0295542 | A1 | 9/2019 | Huang et al. | |
| 2020/0007679 | A1 | 1/2020 | Engelke et al. | |
| 2020/0082824 | A1 | 3/2020 | Rahmel et al. | |
| 2020/0143820 | A1 | 5/2020 | Donofrio et al. | |
| 2020/0153958 | A1 | 5/2020 | Engelke et al. | |
| 2020/0244800 | A1 | 7/2020 | Engelke et al. | |
| 2020/0252507 | A1 | 8/2020 | Engelke et al. | |
| 2020/0364067 | A1 | 11/2020 | Accame et al. | |
| 2021/0058510 | A1 | 2/2021 | Engelke et al. | |
| 2021/0073468 | A1 | 3/2021 | Deshmukh et al. | |
| 2021/0210115 | A1 | 7/2021 | Kothari et al. | |
| 2021/0233530 | A1 | 7/2021 | Thomson et al. | |
| 2021/0234959 | A1 | 7/2021 | Engelke et al. | |
| 2021/0274039 | A1 | 9/2021 | Engelke et al. | |
| 2022/0014622 | A1 | 1/2022 | Engelke et al. | |
| 2022/0014623 | A1 | 1/2022 | Engelke et al. | |
| 2022/0028394 | A1 | 1/2022 | Engelke et al. | |
| 2022/0103683 | A1 | 3/2022 | Engelke et al. | |
| 2022/0284904 | A1 | 9/2022 | Pu et al. | |
| 2022/0319521 | A1 | 10/2022 | Liu | |
| 2023/0186941 | A1 | 6/2023 | Juneja et al. | |

FOREIGN PATENT DOCUMENTS

| | | | |
|---|---|---|---|
| DE | 3410619 | | 10/1985 |
| DE | 3632233 | | 4/1988 |
| DE | 10328884 | | 2/2005 |
| EP | 0016281 | A1 | 10/1980 |
| EP | 0029246 | A1 | 5/1981 |
| EP | 0651372 | A2 | 5/1995 |
| EP | 0655158 | A1 | 5/1995 |
| EP | 0664636 | A2 | 7/1995 |
| EP | 0683483 | A2 | 11/1995 |
| EP | 1039733 | A2 | 9/2000 |
| EP | 1330046 | A1 | 7/2003 |
| EP | 1486949 | A1 | 12/2004 |
| EP | 2093974 | A1 | 8/2009 |
| EP | 2373016 | A2 | 10/2011 |
| FR | 2403697 | A | 4/1979 |
| FR | 2432805 | A | 2/1980 |
| FR | 2538978 | A | 7/1984 |
| GB | 2183880 | A | 6/1987 |
| GB | 2285895 | A | 7/1995 |
| GB | 2327173 | A | 1/1999 |
| GB | 2335109 | A | 9/1999 |
| GB | 2339363 | A | 1/2000 |
| GB | 2334177 | B | 12/2002 |
| JP | S5544283 | A | 3/1980 |
| JP | S5755649 | A | 4/1982 |
| JP | S58134568 | A | 8/1983 |
| JP | S60259058 | A | 12/1985 |
| JP | S63198466 | A | 8/1988 |
| JP | H04248596 | A | 9/1992 |
| KR | 20050004503 | A | 12/2005 |
| WO | 9323947 | A1 | 11/1993 |
| WO | 9405006 | A1 | 3/1994 |
| WO | 9500946 | A1 | 1/1995 |
| WO | 9519086 | A1 | 7/1995 |
| WO | 9750222 | A1 | 12/1997 |
| WO | 9839901 | A1 | 9/1998 |
| WO | 9913634 | A1 | 3/1999 |
| WO | 9952237 | A1 | 10/1999 |
| WO | 0049601 | A1 | 8/2000 |
| WO | 0155914 | A1 | 8/2001 |
| WO | 0158165 | A2 | 8/2001 |
| WO | 0180079 | A2 | 10/2001 |
| WO | 0225910 | A2 | 3/2002 |
| WO | 02077971 | A1 | 10/2002 |
| WO | 03026265 | A1 | 3/2003 |
| WO | 03030018 | A1 | 4/2003 |
| WO | 03071774 | A1 | 8/2003 |
| WO | 2005081511 | A1 | 9/2005 |
| WO | 2008053306 | A2 | 5/2008 |
| WO | 2015131028 | A1 | 9/2015 |
| WO | 2015148037 | A1 | 10/2015 |

OTHER PUBLICATIONS

United States Patent and Trademark Office Before the Patent Trial and Appeal Board, Decision—Institution of Inter Partes Review, *CaptionCall LLC* v. *Ultratec Inc.,* Case IPR2013-00543, U.S. Pat. No. 7,555,104, Mar. 5, 2014, 16 pages.

United States Patent and Trademark Office Before the Patent Trial and Appeal Board, Decision—Institution of Inter Partes Review, *CaptionCall LLC* v. *Ultratec Inc.,* Case IPR2013-00540, U.S. Pat. No. 6,233,314, Mar. 5, 2014, 17 pages.

United States Patent and Trademark Office Before the Patent Trial and Appeal Board, Decision—Institution of Inter Partes Review, *CaptionCall LLC* v. *Ultratec Inc.,* Case IPR2013-00545, U.S. Pat. No. 6,594,346, Mar. 5, 2014, 21 pages.

United States Patent and Trademark Office Before the Patent Trial and Appeal Board, Decision—Institution of Inter Partes Review, *CaptionCall LLC* v. *Ultratec Inc.,* Case IPR2013-00541, U.S. Pat. No. 5,909,482, Mar. 5, 2014, 32 pages.

United States Patent and Trademark Office Before the Patent Trial and Appeal Board, Decision—Institution of Inter Partes Review, *CaptionCall LLC* v. *Ultratec Inc.,* Case IPR2013-00544, U.S. Pat. No. 8,213,578, Mar. 5, 2014, 22 pages.

United States Patent and Trademark Office Before the Patent Trial and Appeal Board, Decision—Institution of Inter Partes Review, *CaptionCall LLC* v. *Ultratec Inc.,* Case IPR2013-00542, U.S. Pat. No. 7,319,740, Mar. 5, 2014, 17 pages.

United States Patent and Trademark Office Before the Patent Trial and Appeal Board, Decision—Institution of Inter Partes Review, *CaptionCall LLC* v. *Ultratec Inc.,* Case IPR2013-00549, U.S. Pat. No. 6,603,835 B2, Mar. 5, 2014, 26 pages.

Ultratec Inc. and Captel Inc., Complaint for Patent Infringement, *Ultratec Inc. and CapTel Inc.* v. *Sorenson Communications Inc. and CaptionCall LLC,* Civil Action No. 13-346, May 17, 2013, 13 pages.

Ultratec Inc. and Captel Inc., Amended Complaint for Patent Infringement and Declaratory Judgment, *Ultratec Inc. and CapTel Inc.* v. *Sorenson Communications Inc. and CaptionCall LLC,* Civil Action No. 13-346, Jul. 31, 2013, 16 pages.

Sorenson Communications Inc. and Captioncall LLC, Defendants' Amended Answer to Plaintiffs' Amended Complaint for Patent Infringement and Declaratory Judgment and Counterclaims, *Ultratec Inc. and CapTel Inc.* v. *Sorenson Communications Inc. and CaptionCall LLC,* Civil Action No. 13-346, Aug. 14, 2013, 71 pages.

Ultratec Inc. and Captel Inc., Plaintiffs' Answer to Defendants' Amended Counterclaims, *Ultratec Inc. and CapTel Inc.* v. *Sorenson Communications Inc. and CaptionCall LLC,* Civil Action No. 13-346, Aug. 28, 2013, 26 pages.

Sorenson Communications Inc. and Captioncall LLC, Invalidity Contentions, *Ultratec Inc. and CapTel Inc.* v. *Sorenson Communications Inc. and CaptionCall LLC,* Civil Action No. 13-346, Sep. 23, 2013, 31 pages.

Sorenson Communications Inc. and Captioncall LLC, Exhibits to Invalidity Contentions, *Ultratec Inc. and CapTel Inc.* v. *Sorenson Communications Inc. and CaptionCall LLC,* Civil Action No. 13-346, Sep. 23, 2013, 587 pages.

Sorenson Communications Inc. and Captioncall LLC, Defendants' Answer to Plaintiffs' Original Complaint for Patent Infringement and Counterclaims, *Ultratec Inc. and CapTel Inc.* v. *Sorenson Communications Inc. and CaptionCall LLC,* Civil Action No. 14-66, Feb. 24, 2014, 41 pages.

(56) References Cited

OTHER PUBLICATIONS

Ultratec Inc. and Captel Inc., Plaintiffs' Answer to Defendants' Counterclaims, *Ultratec Inc. and CapTel Inc.* v. *Sorenson Communications Inc. and CaptionCall LLC,* Civil Action No. 14-CV-66, Mar. 17, 2014, 14 pages.
Ultratec Inc. and Captel Inc., Amended Complaint for Patent Infringement, *Ultratec Inc. and CapTel Inc.* v. *Sorenson Communications Inc. and CaptionCall LLC,* Civil Action No. 3-14-CV-66-BBC, Mar. 26, 2014, 11 pages.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 pages.
Opinion and Order, *Ultratec, Inc., et al.* v. *Sorenson Communications, Inc.,* et al., Civil Action No. 13-CV-346-BBC, United States District Court, Western District of Wisconsin, Aug. 28, 2014.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of the U.S. Pat. No. 7,660,398 U.S. Patent, 489 pages.
Vaseghi, Chapter 14: Echo Cancellation, Advanced Digital Signal Processing and Noise Reduction, Second Edition, John Wiley & Sons, Ltd., 2000, pp. 396-415.
Ultratec, Inc. and CapTel, Inc. Complaint for Patent Infringement, *Ultratec, Inc. and CapTel Inc.* v. *Sorenson Communications, Inc. and CaptionCall, LLC,* Civil Action No. 14-CV-66, Feb. 3, 2014, 9 pages.
Plaintiffs, Ultratec, Inc. and CapTel, Inc.'s Infringement Contentions, *Ultratec, Inc. and CapTel Inc.* v. *Sorenson Communications, Inc. and CaptionCall, LLC,* Civil Action No. 14-CV-66, Mar. 28, 2014, 9 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
United States Patent and Trademark Office, Office Action Summary and Detailed Action, U.S. Appl. No. 13/950,860, filed Sep. 3, 2014, 9 pages.
Applicant, Amendment (Response to Sep. 3, 2014, Office Action), U.S. Appl. No. 13/950,860, filed Mar. 3, 2015, 11 pages.
United States Patent and Trademark Office, Office Action Summary and Detailed Action, U.S. Appl. No. 13/950,860, filed Apr. 2, 2015, 8 pages.
PCT International Search Report and Written Opinion, PCT/US2006/025236, Oct. 2, 2006.
PCT International Preliminary Report on Patentability, PCT/US2006/025236, Jan. 9, 2008.
PCT International Search Report and Written Opinion, PCT/US2009/040523, Nov. 4, 2009.
Australian Government IP Australia, Examiner's First Report, Application No. 2006263680, Jun. 29, 2009.
European Patent Office, Examination Report, Application No. 06785768.0, Aug. 9, 2010.
Applicant, Response to Aug. 9, 2010 Examination Report, Application No. 06785768.0, Dec. 20, 2010.
Australian Government IP Australia, Examination Report No. 1, Application No. 2015222910, Jul. 6, 2019, 3 pages.
Opinion and Order Regarding Summary Judgment, *Ultratec, Inc., et al.* v. *Sorenson Communications, Inc., et al.,* Civil Action No. 3:13-cv-00346-BBC, United States District Court, Western District of Wisconsin, Aug. 28, 2014.
Additional Opinion and Order Regarding Summary Judgment, *Ultratec, Inc., et al.* v. *Sorenson Communications, Inc., et al.,* Civil Action No. 3:13-cv-00346-BBC, United States District Court, Western District of Wisconsin, Aug. 28, 2014.
Opinion and Order Regarding Claim Construction, Daubert, Motions in Limine, and Secondary Considerations of Nonobviousness, *Ultratec, Inc., et al.* v. *Sorenson Communications, Inc., et al.,* Civil Action No. 3:13-cv-00346-BBC, United States District Court, Western District of Wisconsin, Sep. 29, 2014.
Opinion and Order Regarding Motions in Limine and Correcting Errors in Summary Judgment Order, *Ultratec, Inc., et al.* v. *Sorenson Communications, Inc., et al.,* Civil Action No. 3:13-cv-00346-BBC, United States District Court, Western District of Wisconsin, Oct. 1, 2014.
Opinion and Order Regarding Induced Infringement, *Ultratec, Inc., et al.* v. *Sorenson Communications, Inc., et al.,* Civil Action No. 3:13-cv-00346-BBC, United States District Court, Western District of Wisconsin, Oct. 1, 2014.
Opinion and Order Regarding Motions in Limine, *Ultratec, Inc., et al.* v. *Sorenson Communications, Inc., et al.,* Civil Action No. 3:13-cv-00346-BBC, United States District Court, Western District of Wisconsin, Oct. 3, 2014.
Opinion and Order Regarding Motions in Limine, *Ultratec, Inc., et al.* v. *Sorenson Communications, Inc., et al.,* Civil Action No. 3:13-cv-00346-BBC, United States District Court, Western District of Wisconsin, Oct. 8, 2014.
Opinion and Order Regarding Daubert Motions of Secondary Considerations, *Ultratec, Inc., et al.* v. *Sorenson Communications, Inc., et al.,* Civil Action No. 3:13-cv-00346-BBC, United States District Court, Western District of Wisconsin, Oct. 10, 2014.
Joint Stipulation of Dismissal With Prejudice of Claims and Counterclaims Relating to Claims 1-6 of the '835 Patent and Claim 10 of the '578 Patent, *Ultratec, Inc., et al.* v. *Sorenson Communications, Inc., et al.,* Civil Action No. 3:13-cv-00346-BBC, United States District Court, Western District of Wisconsin, Oct. 13, 2014.
Stipulation Regarding Infringement of Claim 11 of the '578 Patent, *Ultratec, Inc., et al.* v. *Sorenson Communications, Inc., et al.,* Civil Action No. 3:13-cv-00346-BBC, United States District Court, Western District of Wisconsin, Oct. 13, 2014.
Opinion and Order Regarding Motion for Claims Construction, *Ultratec, Inc., et al.* v. *Sorenson Communications, Inc., et al.,* Civil Action No. 3:13-cv-00346-BBC, United States District Court, Western District of Wisconsin, Oct. 21, 2014.
Special Verdict Regarding Liability, *Ultratec, Inc., et al.* v. *Sorenson Communications, Inc., et al.,* Civil Action No. 3:13-cv-00346-BBC, United States District Court, Western District of Wisconsin, Oct. 23, 2014.
Judgment, *Ultratec, Inc., et al.* v. *Sorenson Communications, Inc., et al.,* Civil Action No. 3:13-cv-00346-BBC, United States District Court, Western District of Wisconsin, Nov. 3, 2014.
Defendants' Rule 50(b) Motion for Judgment of Non-Infringement as a Matter of Law and Rule 59 Motion for New Trial, *Ultratec, Inc., et al.* v. *Sorenson Communications, Inc., et al.,* Civil Action No. 3:13-cv-00346-BBC, United States District Court, Western District of Wisconsin, Nov. 26, 2014.
Defendants' Rule 50(b) Motion for Judgment of Invalidity (Anticipation) and Alternative Rule 59 Motion for New Trial on Anticipation and Brief in Support, *Ultratec, Inc., et al.* v. *Sorenson Communications, Inc., et al.,* Civil Action No. 3:13-cv-00346-BBC, United States District Court, Western District of Wisconsin, Dec. 1, 2014.
Defendants' Rule 59 Motion for New Trial and Brief in Support, *Ultratec, Inc., et al.* v. *Sorenson Communications, Inc., et al.,* Civil Action No. 3:13-cv-00346-BBC, United States District Court, Western District of Wisconsin, Dec. 1, 2014.
Defendants' Rule 50(b) Motion for Judgment of Invalidity Obviousness and Alternative Rule 59 Motion for New Trial on Obviousness and Brief in Support, *Ultratec, Inc., et al.* v. *Sorenson Communications, Inc., et al.,* Civil Action No. 3:13-cv-00346-BBC, United States District Court, Western District of Wisconsin, Dec. 1, 2014 (Redacted).
Opinion and Order Regarding Stay of Litigation, *Ultratec, Inc., et al.* v. *Sorenson Communications, Inc., et al.,* Civil Action No. 3:13-cv-00346-BBC, United States District Court, Western District of Wisconsin, May 13, 2015.
Defendants' Answer to Plaintiffs' Second Amended Complaint for Patent Infringement and Counterclaims, *Ultratec, Inc., et al.* v. *Sorenson Communications, Inc., et al.,* Civil Action No. 3:14-cv-00066-BBC, United States District Court, Western District of Wisconsin, May 9, 2014.
Defendants' Notice of Motion and Motion for Summary Judgment Regarding U.S. Pat. No. 7,660,398, *Ultratec, Inc., et al.* v. *Sorenson*

(56) References Cited

OTHER PUBLICATIONS

*Communications, Inc., et al.*, Civil Action No. 3:14-cv-00066-JDP, United States District Court, Western District of Wisconsin, Mar. 27, 2015.
Brief No. 1 in Support of Defendants' Motion for Summary Judgment (Indefiniteness and Claim Construction), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 2 in Support of Defendants' Motion for Summary Judgment (Non-Infringement and Invalidity Under 35 USC 102 and 103), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Reply in Support of Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, Jun. 24, 2015 (Redacted).
Claim Construction and Summary Judgment Opinion and Order, *Ultratec, Inc., et al.* v. *Sorenson Communications, Inc., et al.*, Civil Action No. 3:14-cv-00066-JDP, United States District Court, Western District of Wisconsin, Sep. 11, 2015.
Final Pretrial Conference and Order, *Ultratec, Inc., et al.* v. *Sorenson Communications, Inc., et al.*, Civil Action No. 3:14-cv-00066-JDP, United States District Court, Western District of Wisconsin, Sep. 21, 2015.
Order of Plaintiffs' Motion in Limine 16, *Ultratec, Inc., et al.* v. *Sorenson Communications, Inc., et al.*, Civil Action No. 3:14-cv-00066-JDP, United States District Court, Western District of Wisconsin, Sep. 22, 2015.
Order, *Ultratec, Inc., et al.* v. *Sorenson Communications, Inc., et al.*, Civil Action No. 3:14-cv-00066-JDP, United States District Court, Western District of Wisconsin, Oct. 6, 2015.
Special Verdict Form—Liability, *Ultratec, Inc., et al.* v. *Sorenson Communications, Inc., et al.*, Civil Action No. 3:14-cv-00066-JDP, United States District Court, Western District of Wisconsin, Oct. 6, 2015.
Judgment in a Civil Case, *Ultratec, Inc., et al.* v. *Sorenson Communications, Inc., et al.*, Civil Action No. 3:14-cv-00066-JDP, United States District Court, Western District of Wisconsin, Oct. 15, 2015.
Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 8, 2014.
Amended Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 22, 2014.
Defendants' Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Jan. 30, 2015.
Plaintiffs' Answer to Defendants Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' First Amended Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 7, 2015.
Parties' Stipulation to a Temporary Stay, *Ultratec, Inc., et al.* v. *Sorenson Communications, Inc., et al.*, Civil Action No. 3:14-cv-00847-BBC, United States District Court, Western District of Wisconsin, Apr. 24, 2015.
Order Granting Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 30, 2015.
Joint Notice of IPR Institution and Stipulation to Continue the Stay, *Ultratec, Inc., et al.* v. *Sorenson Communications, Inc., et al.*, Civil Action No. 3:14-cv-00847-BBC, United States District Court, Western District of Wisconsin, Sep. 11, 2015.
Complaint for Patent Infringement, *Ultratec, Inc., et al.* v. *Sorenson Communications, Inc., et al.*, Civil Action No. 3:15-cv-00563-JDP, United States District Court, Western District of Wisconsin, Sep. 7, 2015.
Amended Complaint for Patent Infringement, *Ultratec, Inc., et al.* v. *Sorenson Communications, Inc., et al.*, Civil Action No. 3:15-cv-00563-JDP, United States District Court, Western District of Wisconsin, Nov. 12, 2015.
Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 11, 2015.
Defendants' Answer to Plaintiffs' Amended Complaint for Patent Infringement and Counterclaims, *Ultratec, Inc., et al.* v. *Sorenson Communications, Inc., et al.*, Civil Action No. 3:15-cv-00563-JDP, United States District Court, Western District of Wisconsin, Dec. 11, 2015.
Plaintiffs' Response to Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 18, 2015.
Order Granting Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 22, 2015.
Petition for Inter Partes Review for U.S. Pat. No. 10,469,660, *CaptionCall, LLC* v. *Ultratec, Inc.*, United States Patent and Trademark Office Before the Patent Trial and Appeal Board, Jul. 1, 2020, 68 pages.
Declaration of Benedict J. Occhiogrosso for U.S. Pat. No. 10,469,660, *CaptionCall, LLC* v. *Ultratec, Inc.*, United States Patent and Trademark Office Before the Patent Trial and Appeal Board, Jun. 23, 2020, 113 pages.
U.S. Appl. No. 60/562,795 Provisional Application to McLaughlin et al., Apr. 16, 2004, 126 pages.
Blackberry, RIM Introduces New Color BlackBerry Handheld for CDMA2000 1X Wireless Networks, BlackBerry Press Release, Mar. 22, 2004, 2 pages.
Blackberry Wireless Handheld User Guide, 7750, Mar. 16, 2004, 144 pages.
Federal Communications Commission, Telecommunication Relay Services and Speech-to-Speech Services for Individuals With Hearing and Speech Disabilities, 68 Fed. Reg. 50973-50978 (Aug. 25, 2003).
Phonedb, RIM BlackBerry 7750 Device Specs, Copyright 2006-2020 PhoneDB, 6 pages.
Phonesdata, Nokia 6620 Specs, Review, Opinions, Comparisons, Copyright 2020, 9 pages.
Sundgot, Nokia Unveils the 6600, InfoSync World, Jun. 16, 2003, 2 pages.
Wikipedia, Dell Axim, https://en.wikipedia.org/wiki/Dell_Axim, Last Edited on Feb. 23, 2020, 4 pages.
Wikipedia, Palm Tungsten, https://en.wikipedia.org/wiki/Palm_Tungsten, Last Edited on Oct. 6, 2019, 10 pages.

(56) References Cited

OTHER PUBLICATIONS

Final Written Decision, U.S. Pat. No. 9,131,045, Case IPR2015-01889, *CaptionCall, LLC* v. *Ultratec, Inc.*, United States Patent and Trademark Office Before the Patent Trial and Appeal Board, Apr. 11, 2017, 118 pages.
Judgment, U.S. Pat. No. 7,881,441, Case IPR2015-01886, *CaptionCall, LLC* v. *Ultratec, Inc.*, United States Patent and Trademark Office Before the Patent Trial and Appeal Board, Jun. 9, 2016, 4 pages.
Petition for Inter Partes Review for U.S. Pat. No. 10,491,746, *CaptionCall, LLC* v. *Ultratec, Inc.*, United States Patent and Trademark Office Before the Patent Trial and Appeal Board, Jul. 1, 2020, 61 pages.
Declaration of Benedict J. Occhiogrosso for U.S. Pat. No. 10,491,746, *CaptionCall, LLC* v. *Ultratec, Inc.*, United States Patent and Trademark Office Before the Patent Trial and Appeal Board, Jun. 23, 2020, 79 pages.
Arlinger, Negative Consequences of Uncorrected Hearing Loss—A Review, International Journal of Audiology, 2003, 42:2S17-2S20.
Petition for Inter Partes Review for U.S. Pat. No. 10,587,751, *CaptionCall, LLC* v. *Ultratec, Inc.*, United States Patent and Trademark Office Before the Patent Trial and Appeal Board, Jul. 1, 2020, 64 pages.
Declaration of Benedict J. Occhiogrosso for U.S. Pat. No. 10,587,751, *CaptionCall, LLC* v. *Ultratec, Inc.*, United States Patent and Trademark Office Before the Patent Trial and Appeal Board, Jun. 23, 2020, 106 pages.
Curtis et al., Doctor-Patient Communication on the Telephone, Can Fam Physician, 1989, 35:123-128.
In the United States Patent and Trademark Office Before the Patent Trial and Appeal Board, Petitioner's Reply to Patent Owner's Response, *CaptionCall, LLC* v. *Ultratec, Inc.*, Case IPR2014-00780, U.S. Pat. No. 6,603,835, Apr. 20, 2015, 30 pages.
In the United States Patent and Trademark Office Before the Patent Trial and Appeal Board, Final Written Decision, *CaptionCall, LLC* v. *Ultratec, Inc.*, Case IPR2014-00780, U.S. Pat. No. 6,603,835, Dec. 1, 2015, 56 pages.
In the United States Patent and Trademark Office Before the Patent Trial and Appeal Board, Patent Owner's Request for Rehearing by Expanded Panel, *CaptionCall, LLC* v. *Ultratec, Inc.*, Case IPR2014-00780, U.S. Pat. No. 6,603,835, Dec. 31, 2015, 20 pages.
In the United States Patent and Trademark Office Before the Patent Trial and Appeal Board, Patent Owner's Request for Rehearing by Expanded Panel, *CaptionCall, LLC* v. *Ultratec, Inc.*, Case IPR2013-00540, U.S. Pat. No. 6,233,314, Apr. 2, 2015, 19 pages.
In the United States Patent and Trademark Office Before the Patent Trial and Appeal Board, Decision Denying Patent Owner's Request for Rehearing, *CaptionCall, LLC* v. *Ultratec, Inc.*, Case IPR2013-00540, U.S. Pat. No. 6,233,314, Dec. 1, 2015, 18 pages.
In the United States Patent and Trademark Office Before the Patent Trial and Appeal Board, Patent Owner's Notice of Appeal, *CaptionCall, LLC* v. *Ultratec, Inc.*, Case IPR2013-00540, U.S. Pat. No. 6,233,314, Feb. 2, 2016, 19 pages.
In the United States Patent and Trademark Office Before the Patent Trial and Appeal Board, Patent Owner's Request for Rehearing by Expanded Panel, *CaptionCall, LLC* v. *Ultratec, Inc.*, Case IPR2013-00541, U.S. Pat. No. 5,909,482, Apr. 2, 2015, 19 pages.
In the United States Patent and Trademark Office Before the Patent Trial and Appeal Board, Decision Denying Patent Owner's Request for Rehearing, *CaptionCall, LLC* v. *Ultratec, Inc.*, Case IPR2013-00541, U.S. Pat. No. 5,909,482, Dec. 1, 2015, 18 pages.
In the United States Patent and Trademark Office Before the Patent Trial and Appeal Board, Patent Owner's Notice of Appeal, *CaptionCall, LLC* v. *Ultratec, Inc.*, Case IPR2013-00541, U.S. Pat. No. 5,909,482, Feb. 2, 2016, 19 pages.
In the United States Patent and Trademark Office Before the Patent Trial and Appeal Board, Patent Owner's Request for Rehearing by Expanded Panel, *CaptionCall, LLC* v. *Ultratec, Inc.*, Case IPR2013-00542, U.S. Pat. No. 7,319,470, Apr. 2, 2015, 19 pages.
In the United States Patent and Trademark Office Before the Patent Trial and Appeal Board, Decision Denying Patent Owner's Request for Rehearing, *CaptionCall, LLC* v. *Ultratec, Inc.*, Case IPR2013-00542, U.S. Pat. No. 7,319,470, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00542, U.S. Pat. No. 7,319,470, Feb. 2, 2016, 12 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00543, U.S. Pat. No. 7,555,104, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case PR2013-00543, U.S. Pat. No. 7,555,104, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00543, U.S. Pat. No. 7,555,104, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00544, U.S. Pat. No. 8,213,578, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00544, U.S. Pat. No. 8,213,578, Dec. 1, 2015, 19 pages.
In the United States Patent and Trademark Office Before the Patent Trial and Appeal Board, Patent Owner's Notice of Appeal, *CaptionCall LLC* v. *Ultratec Inc.*, Case IPR2013-00544, U.S. Pat. No. 8,213,578, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00545, U.S. Pat. No. 6,594,346, Apr. 2, 2015, 16 pages.
In the United States Patent and Trademark Office Before the Patent Trial and Appeal Board, Decision Denying Patent Owner's Request for Rehearing, *CaptionCall LLC* v. *Ultratec Inc.*, Case PR2013-00545, U.S. Pat. No. 6,594,346, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00545, U.S. Pat. No. 6,594,346, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00549, U.S. Pat. No. 6,603,835, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00549, U.S. Pat. No. 6,603,835, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00549, U.S. Pat. No. 6,603,835, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00550, U.S. Pat. No. 7,003,082, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00550, U.S. Pat. No. 7,003,082, Dec. 1, 2015, 10 pages.
In the United States Patent and Trademark Office Before the Patent Trial and Appeal Board, Patent Owner's Notice of Appeal, *CaptionCall LLC* v. *Ultratec Inc.*, Case IPR2013-00550, U.S. Pat. No. 7,003,082, Feb. 2, 2016, 11 pages.
In the United States Patent and Trademark Office Before the Patent Trial and Appeal Board, Decision Denying Institution of Inter Partes Review, *CaptionCall LLC* v. *Ultratec Inc.*, Case IPR2014-01287, U.S. Pat. No. 7,660,398, Feb. 12, 2015, 15 pages.

(56) References Cited

OTHER PUBLICATIONS

In the United States Patent and Trademark Office Before the Patent Trial and Appeal Board, Request for Rehearing, *CaptionCall LLC* v. *Ultratec Inc.,* Case IPR2014-01287, U.S. Pat. No. 7,660,398, Mar. 13, 2015, 18 pages.
In the United States Patent and Trademark Office Before the Patent Trial and Appeal Board, Decision Denying Request for Rehearing, *CaptionCall LLC* v. *Ultratec Inc.,* Case IPR2014-01287, U.S. Pat. No. 7,660,398, Nov. 5, 2015, 7 pages.
PCT International Search Report, Application No. PCT/US93/04753, Aug. 20, 1993.
European Patent Office, Supplementary European Search Report, Application No. EP 93911360 (Patent No. EP 0596078), Mar. 27, 1995.
European Patent Office, Communication, Application No. EP 93911360.1 (Patent No. EP 0596078), Jul. 10, 1998.
Applicant, Response to Jul. 10, 1998 Communication, Application No. EP 93911360.1 (Patent No. EP 0596078), Jan. 20, 1999.
European Patent Office, Communication, Application No. EP 93911360.1 (Patent No. EP 0596078), Jun. 16, 1999.
United States Patent and Trademark Office, Notice of Allowance, Examiner's Amendment, Examiner Interview Summary Record, U.S. Appl. No. 08/129,894, now U.S. Pat. No. 5,432,837, filed Dec. 29, 1994.
United States Patent and Trademark Office, Examiner's Action, U.S. Appl. No. 08/155,061 now U.S. Pat. No. 5,517,548, filed Dec. 22, 1994.
Applicant, Amendment (Response to Dec. 22, 1994 Office Action), U.S. Appl. No. 08/155,061, now U.S. Pat. No. 6,517,548, filed Jun. 22, 1995.
United States Patent and Trademark Office, Notice of Allowance, U.S. Appl. No. 08/155,061, now U.S. Pat. No. 5,517,548, filed Aug. 8, 1995.
European Patent Office, Supplementary European Search Report, Application No. EP 93911361.9 (Patent No. EP 0596079), Mar. 27, 1995.
European Patent Office, Communication, Application No. EP 93911361.9 (Patent No. EP 0596079), Jul. 10, 1998.
Applicant, Response to Jul. 10, 1998 Communication, Application No. EP 93911361.9 (Patent No. EP 0596079), Jan. 20, 1999.
PCT International Search Report, Application No. PCT/US93/04760, Aug. 13, 1993.
Applicant, Amendment After Final (Jan. 5, 1998 Office Action), U.S. Appl. No. 08/802,053, filed Feb. 6, 1998.
United States Patent and Trademark Office, Advisory Action, U.S. Appl. No. 08/802,053, filed Feb. 20, 1998.
Applicant, Appellant's Brief on Appeal, U.S. Appl. No. 08/802,053, filed May 29, 1998.
United States Patent and Trademark Office, Examiner's Answer, U.S. Appl. No. 08/802,053, filed Aug. 18, 1998.
United States Patent and Trademark Office, Decision on Appeal, U.S. Appl. No. 08/802,053, filed Oct. 19, 2001.
United States Patent and Trademark Office, Examiner's Action, U.S. Appl. No. 08/258,044, now U.S. Pat. No. 5,604,786, filed Jun. 21, 1995.
Applicant, First Amendment (Response to Jun. 21, 1995 Office Action), U.S. Appl. No. 08/258,044 , now U.S. Pat. No. 5,604,786, filed Sep. 8, 1995.
United States Patent and Trademark Office, Communication, U.S. Appl. No. 08/258,044, now U.S. Pat. No. 5,604,786, filed Dec. 14, 1995.
Applicant, Second Amendment, U.S. Appl. No. 08/258,044, now U.S. Pat. No. 5,604,786, filed Jun. 14, 1996.
Applicant, Third Amendment, U.S. Appl. No. 08/258,044, now U.S. Pat. No. 5,604,786, filed Jul. 31, 1996.
United States Patent and Trademark Office, Notice of Allowance, U.S. Appl. No. 08/258,044, now U.S. Pat. No. 5,604,786, filed Aug. 7, 1996.
United States Patent and Trademark Office, Supplemental Notice of Allowability and Examiner's Amendment, U.S. Appl. No. 08/258,044, now U.S. Pat. No. 5,604,786, filed Nov. 18, 1996.
United States Patent and Trademark Office, Communication, U.S. Appl. No. 08/369,205, now U.S. Pat. No. 5,581,593, filed Nov. 2, 1995.
Applicant, Amendment (Response to Nov. 2, 1995 Office Action), U.S. Appl. No. 08/369,205, now U.S. Pat. No. 5,581,593, filed Feb. 5, 1996.
United States Patent and Trademark Office, Notice of Allowance, Interview Summary, and Examiner's Amendment, U.S. Appl. No. 08/369,205, now U.S. Pat. No. 5,581,593, filed May 15, 1996.
PCT International Search Report, Application No. PCT/US96/00282, Apr. 9, 1996.
United States Patent and Trademark Office, Office Action Summary and Detailed Action, U.S. Appl. No. 08/481,852, now U.S. Pat. No. 5,978,654, filed Sep. 5, 1996.
Applicant, Amendment (Response to Sep. 5, 1996 Office Action), U.S. Appl. No. 08/481,852, now U.S. Pat. No. 5,978,654, filed Nov. 26, 1997.
United States Patent and Trademark Office, Office Action Summary and Detailed Action, U.S. Appl. No. 08/481,852, now U.S. Pat. No. 5,978,654, filed Oct. 16, 1998.
Applicant, Response (to Oct. 16, 1998 Office Action), U.S. Appl. No. 08/481,852, now U.S. Pat. No. 5,978,654, filed Apr. 16, 1999.
United States Patent and Trademark Office, Notice of Allowance, U.S. Appl. No. 08/481,852, now U.S. Pat. No. 5,978,654, filed May 5, 1999.
PCT International Search Report, Application No. PCT/US96/09391, Aug. 27, 1996.
United States Patent and Trademark Office, Office Action Summary and Detailed Action, U.S. Appl. No. 09/288,420, now U.S. Pat. No. 6,233,314, filed Feb. 25, 2000.
Applicant, Amendment (Response to Feb. 25, 2000 Office Action) and Terminal Disclaimer, U.S. Appl. No. 09/288,420, now U.S. Pat. No. 6,233,314, filed Aug. 25, 2000.
United States Patent and Trademark Office, Notice of Allowance, U.S. Appl. No. 09/288,420, now U.S. Pat. No. 6,233,314, filed Dec. 5, 2000.
United States Patent and Trademark Office, Office Action Summary and Detailed Action, U.S. Appl. No. 09/783,337, now U.S. Pat. No. 6,493,426, filed Dec. 14, 2001.
Applicant, Response to Dec. 14, 2001 Office Action and Terminal Disclaimer, U.S. Appl. No. 09/783,337, now U.S. Pat. No. 6,493,426, filed Jun. 14, 2002.
United States Patent and Trademark Office, Notice of Allowance and Examiner's Statement of Reasons for Allowance, U.S. Appl. No. 09/783,337, now U.S. Pat. No. 6,493,426, filed Jul. 25, 2002.
United Kingdom Patent Office, Examination Report, Application No. GB 0319142.6 (Patent No. GB 2389993), Jan. 13, 2004.
Canadian Intellectual Property Office, Examiner's Report, Application No. CA 2,438,412, May 20, 2009.
Applicant, Response to May 20, 2009 Official Action, Application No. CA 2,438,412, Nov. 18, 2009.
Canadian Intellectual Property Office, Notice of Allowance, Application No. CA 2,438,412, Apr. 30, 2010.
Canadian Intellectual Property Office, Examiner's Report, Application No. CA 2,419, 150, Sep. 17, 2009.
Applicant, Response to Sep. 17, 2009 Official Action, Application No. CA 2,419, 150, Mar. 12, 2010.
United States Patent and Trademark Office, Office Action Summary and Detailed Action, U.S. Appl. No. 09/938,194, now U.S. Pat. No. 6,603,835, filed Jul. 5, 2002.
Applicant, Response (to Jul. 5, 2002 Office Action), U.S. Appl. No. 09/938,194, now U.S. Pat. No. 6,603,835, filed Jan. 6, 2003.
United States Patent and Trademark Office, Notice of Allowance, U.S. Appl. No. 09/938,194, now U.S. Pat. No. 6,603,835, filed Mar. 18, 2003.
IP Australia, Examiner's First Report, Application No. AU 2002313798, Oct. 27, 2006.
Applicant, Response to Oct. 27, 2006 Examination Report, Application No. AU 2002313798, Feb. 9, 2007.

(56) References Cited

OTHER PUBLICATIONS

IP Australia, Notice of Acceptance, Application No. AU 2002313798, Apr. 2, 2007.
Canadian Intellectual Property Office, Examiner's Report, Application No. CA 2,458,372, Oct. 15, 2009.
Applicant, Response to Oct. 15, 2009 Official Action, Application No. CA 2,458,372, Apr. 15, 2010.
Canadian Intellectual Property Office, Notice of Allowance, Application No. CA 2,458,372, Jul. 27, 2010.
United Kingdom Patent Office, Examination Report, Application No. GB 0403994.7, May 28, 2004.
PCT International Search Report, Application No. PCT/US02/26815, Jan. 3, 2003.
PCT Written Opinion, Application No. PCT/US02/26815, Apr. 29, 2003.
PCT International Preliminary Examination Report, Application No. PCT/US02/26815, Apr. 14, 2004.
United States Patent and Trademark Office, Notice of Allowance and Examiner's Amendment, U.S. Appl. No. 09/956,310, now U.S. Pat. No. 6,510,206, filed Aug. 19, 2002.
Applicant, Applicants' Comments on Examiner's Reason for Allowance (dated Aug. 19, 2002), U.S. Appl. No. 09/956,310, now U.S. Pat. No. 6,510,206, filed Nov. 19, 2002.
United Kingdom Patent Office, Combined Search and Examination Report, Application No. GB 0406768.2 (Patent No. GB 2396774), Apr. 27, 2004.
PCT International Search Report, Application No. PCT/US01/29130, Mar. 1, 2003.
PCT International Preliminary Examination Report, Application No. PCT/US01/29130, Mar. 17, 2003.
United Kingdom Patent Office, Examination Report, Application No. GB 0306458.1, Sep. 17, 2003.
Applicant, Response to Sep. 17, 2003 Official Letter, Application No. GB 0306458.1, Mar. 16, 2004.
United States Patent and Trademark Office, Office Action Summary and Detailed Action, U.S. Appl. No. 09/977,842, now U.S. Pat. No. 6,549,611, filed Apr. 23, 2002.
Applicant, Response (to Apr. 23, 2002 Office Action), U.S. Appl. No. 09/977,842, now U.S. Pat. No. 6,549,611, filed Oct. 23, 2002.
Applicant, Terminal Disclaimer, U.S. Appl. No. 09/977,842, now U.S. Pat. No. 6,549,611, filed Oct. 23, 2002.
United States Patent and Trademark Office, Notice of Allowance, U.S. Appl. No. 09/977,842, now U.S. Pat. No. 6,549,611, filed Nov. 15, 2002.
United States Patent and Trademark Office, Office Action, U.S. Appl. No. 10/412,118, filed Nov. 3, 2003.
United States Patent and Trademark Office, Office Action Summary and Detailed Action, U.S. Appl. No. 10/316,215, now U.S. Pat. No. 6,934,366, filed Jul. 13, 2004.
Applicant, Response (to Jul. 13, 2004 Office Action) and Terminal Disclaimer, U.S. Appl. No. 10/316,215, now U.S. Pat. No. 6,934,366, filed Jan. 13, 2005.
United States Patent and Trademark Office, Notice of Allowance and Detailed Action, U.S. Appl. No. 10/316,215, now U.S. Pat. No. 6,934,366, filed Apr. 18, 2005.
United States Patent and Trademark Office, Office Action Summary and Detailed Action, U.S. Appl. No. 10/348,466, now U.S. Pat. No. 6,748,053, filed Jul. 3, 2003.
Applicant, Response (to Jul. 3, 2003 Office Action) and Terminal Disclaimer, U.S. Appl. No. 10/348,466, now U.S. Pat. No. 6,748,053, filed Jan. 5, 2004.
United States Patent and Trademark Office, Notice of Allowance, U.S. Appl. No. 10/348,466, now U.S. Pat. No. 6,748,053, filed Jan. 27, 2004.
United States Patent and Trademark Office, Office Action Summary and Detailed Action, U.S. Appl. No. 10/436,650, now U.S. Pat. No. 7,164,753, filed Jul. 1, 2005.
Applicant, Amendment (Response to Jul. 1, 2005 Office Action), U.S. Appl. No. 10/436,650, now U.S. Pat. No. 7,164,753, filed Sep. 14, 2005.
United States Patent and Trademark Office, Office Action Summary and Detailed Action, U.S. Appl. No. 10/436,650, now U.S. Pat. No. 7,164,753, filed Nov. 17, 2005.
Applicant, Response (to Nov. 17, 2005 Office Action), U.S. Appl. No. 10/436,650, now U.S. Pat. No. 7,164,753, filed Jan. 18, 2006.
United States Patent and Trademark Office, Office Action Summary and Detailed Action, U.S. Appl. No. 10/436,650, now U.S. Pat. No. 7,164,753, filed Apr. 19, 2006.
Applicant, Response (to Apr. 19, 2006 Office Action), U.S. Appl. No. 10/436,650, now U.S. Pat. No. 7,164,753, filed Jun. 13, 2006.
United States Patent and Trademark Office, Notice of Allowance and Detailed Action, U.S. Appl. No. 10/436,650, now U.S. Pat. No. 7,164,753, filed Sep. 15, 2006.
IP Australia, Examiner's First Report, Application No. AU 2004239790, May 14, 2009.
Applicant, Response (to May 14, 2009 Examination Report), Application No. AU 2004239790, May 21, 2010.
Government of India the Patent Office, First Examination Report, Application No. 2262/KOLNP/2005, Apr. 29, 2008.
Applicant, Response to Apr. 29, 2008 Official Letter, Application No. 2262/KOLNP/2005, May 5, 2008.
Applicant, Response to Apr. 29, 2008 First Examination Report, Application No. 2262/KOLNP/2005, Oct. 23, 2008.
PCT International Preliminary Report on Patentability, Application No. PCT/US2004/014991, Dec. 1, 2005.
PCT International Search Report and Written Opinion, Application No. PCT/US2004/014991, Dec. 29, 2004.
United States Patent and Trademark Office, Notice of Allowance, Examiner's Amendment, Examiner Interview Summary Record, U.S. Appl. No. 07/074,625, now U.S. Pat. No. 4,777,469, filed May 20, 1988.
Canadian Patent Office, Notice of Allowance, Application No. CA 571,452 (Patent No. 1,301,388), Jan. 29, 1991.
Applicant, Restoration and Amendment, Application No. CA 571,452 (Patent No. 1,301,388), Aug. 8, 1991.
United States Patent and Trademark Office, Communication, U.S. Appl. No. 07/224,118, now U.S. Pat. No. 4,897,868, filed Jun. 8, 1989.
Applicant, Amendment (Response to Jun. 8, 1989 Office Action) and Terminal Disclaimer, U.S. Appl. No. 07/224,118, now U.S. Pat. No. 4,897,868, filed Jun. 19, 1989.
United States Patent and Trademark Office, Notice of Allowance, U.S. Appl. No. 07/224,118, now U.S. Pat. No. 4,897,868, filed Aug. 29, 1989.
United States Patent and Trademark Office, Communication, U.S. Appl. No. 07/334,003, now U.S. Pat. No. 4,959,847, filed Oct. 10, 1989.
Applicant, Amendment (Response to Oct. 10, 1989 Office Action), U.S. Appl. No. 07/334,003, now U.S. Pat. No. 4,959,847, filed Jan. 10, 1990.
United States Patent and Trademark Office, Notice of Allowance, U.S. Appl. No. 07/334,003, now U.S. Pat. No. 4,959,847, filed Mar. 27, 1990.
United Kingdom Patent Office, Examiner's Search Report, Application No. GB 9006994.9 (Patent No. GB 2,231,468), Jul. 12, 1990.
United Kingdom Patent Office, Examiner's Report, Application No. GB 9006994.9 (Patent No. GB 2,231,468), Dec. 16, 1992.
Applicant, Response to Dec. 16, 1992 Official Letter, Application No. GB 9006994.9 (Patent No. GB 2,231,468), Jun. 11, 1993.
Canadian Intellectual Property Office, Examination Report, Application No. CA 2,013,617, Jul. 28, 2000.
Applicant, Response to Jul. 28, 2000 Official Action, Application No. CA 2,013,617, Nov. 28, 2000.
Applicant, Information Letter, Application No. CA 2,013,617, Feb. 1, 2001.
Canadian Intellectual Property Office, Notice of Allowance, Application No. CA 2,013,617, Mar. 23, 2001.
United States Patent and Trademark Office, Communication, U.S. Appl. No. 07/842,943, now U.S. Pat. No. 5,351,288, filed Oct. 22, 1993.
Applicant, Amendment (Response to Oct. 22, 1993 Office Action) and Terminal Disclaimer, U.S. Appl. No. 07/842,943, now U.S. Pat. No. 5,351,288, filed Jan. 13, 1994.

(56) References Cited

OTHER PUBLICATIONS

United States Patent and Trademark Office, Communication, U.S. Appl. No. 07/842,943, now U.S. Pat. No. 5,351,288, filed Mar. 30, 1994.
Applicant, Response to Mar. 30, 1994 Final Rejection, U.S. Appl. No. 07/842,943, now U.S. Pat. No. 5,351,288, filed Apr. 12, 1994.
Applicant, Supplemental Response to Final Rejection and Terminal Disclaimer, U.S. Appl. No. 07/842,943, now U.S. Pat. No. 5,351,288, filed Apr. 28, 1994.
United States Patent and Trademark Office, Notice of Allowance, U.S. Appl. No. 07/842,943, now U.S. Pat. No. 5,351,288, filed Jun. 6, 1994.
United States Patent and Trademark Office, Examiner's Action, U.S. Appl. No. 07/886,553, now U.S. Pat. No. 5,325,417, filed May 21, 1993.
Applicant, First Amendment (Response to May 21, 1993 Office Action), U.S. Appl. No. 07/886,553, now U.S. Pat. No. 5,325,417, filed Oct. 21, 1993.
United States Patent and Trademark Office, Notice of Allowance, U.S. Appl. No. 07/886,553, now U.S. Pat. No. 5,325,417, filed Jan. 4, 1994.
European Patent Office, Communication, Application No. EP 93911359.3 (Patent No. EP 0608389), Jul. 10, 1998.
Applicant, Response to Jul. 10, 1998 Communication, Application No. EP 93911359.3 (Patent No. EP 0608389), Jan. 19, 1999.
Canadian Intellectual Property Office, Notice of Allowance, Application No. CA 2,113,841, Jun. 10, 2002.
PCT International Search Report, Application No. PCT/US93/04751, Aug. 18, 1993.
United States Patent and Trademark Office, Examiner's Action, U.S. Appl. No. 29/,024,266, now U.S. Pat. No. D364,865, filed Mar. 30, 1995.
Applicant, Response to First Office Action, U.S. Appl. No. 29/024,266, now U.S. Pat. No. D364,865, filed May 16, 1995.
United States Patent and Trademark Office, Notice of Allowance, U.S. Appl. No. 29/024,266, now U.S. Pat. No. D364,865, filed Jun. 7, 1995.
United States Patent and Trademark Office, Office Action Summary and Detailed Action, U.S. Appl. No. 29/076,383, now U.S. Pat. No. D405,793, filed Apr. 14, 1998.
Applicant, First Amendment (Response to Apr. 14, 1998 Office Action), U.S. Appl. No. 29/076,383, now U.S. Pat. No. D405,793, filed Jul. 14, 1998.
United States Patent and Trademark Office, Notice of Allowance and Examiner's Amendment, U.S. Appl. No. 29/076,383, now U.S. Pat. No. D405,793, filed Aug. 10, 1998.
Applicant, Preliminary Response to United States Patent and Trademark Office, U.S. Appl. No. 07/616,720, now U.S. Pat. No. 5,081,673, filed Dec. 31, 1990.
United States Patent and Trademark Office, Notice of Allowance, U.S. Appl. No. 07/616,720, now U.S. Pat. No. 5,081,673, filed Mar. 7, 1991.
Canadian Intellectual Property Office, Notice of Allowance, Patent No. CA 1320602, Oct. 27, 1992.
United States Patent and Trademark Office, Examiner's Action, U.S. Appl. No. 07/886,642, now U.S. Pat. No. 5,327,479, filed May 19, 1993.
Applicant, First Amendment (Response to May 19, 1993 Office Action), U.S. Appl. No. 07/886,642, now U.S. Pat. No. 5,327,479, filed Oct. 19, 1993.
United States Patent and Trademark Office, Notice of Allowance and Examiner Interview Summary Record, U.S. Appl. No. 07/886,642, now U.S. Pat. No. 5,327,479, filed Jan. 5, 1994.
Canadian Intellectual Property Office, Notice of Allowance, Application No. CA 2,113,839, Jun. 18, 2002.
United States Patent and Trademark Office, Office Action Summary and Detailed Action, U.S. Appl. No. 08/946,538, now U.S. Pat. No. 6,075,841, filed Sep. 18, 1998.
Applicant, First Amendment (Response to Sep. 18, 1998 Office Action), U.S. Appl. No. 08/946,538, now U.S. Pat. No. 6,075,841, filed Jan. 15, 1999.
United States Patent and Trademark Office, Office Action Summary and Detailed Action, U.S. Appl. No. 08/946,538, now U.S. Pat. No. 6,075,841, filed Mar. 26, 1999.
Applicant, Response to Mar. 26, 1999 Office Action and Terminal Disclaimer, U.S. Appl. No. 08/946,538, now U.S. Pat. No. 6,075,841, filed Jul. 20, 1999.
United States Patent and Trademark Office, Notice of Allowability and Examiner's Amendment and Statement of Reasons for Allowance, U.S. Appl. No. 08/946,538, now U.S. Pat. No. 6,075,841, filed Aug. 16, 1999.
United States Patent and Trademark Office, Office Action Summary and Detailed Action, U.S. Appl. No. 09/034,076, now U.S. Pat. No. 6,075,842, filed Apr. 6, 1999.
Applicant, Response to Apr. 6, 1999 Office Action and Terminal Disclaimer, U.S. Appl. No. 09/034,076, now U.S. Pat. No. 6,075,842, filed Jul. 21, 1999.
United States Patent and Trademark Office, Notice of Allowability, U.S. Appl. No. 09/034,076, now U.S. Pat. No. 6,075,842, filed Jan. 7, 2000.
United States Patent and Trademark Office, Notice of Allowability and Examiner's Statement of Reasons for Allowance, U.S. Appl. No. 09/108,790, now U.S. Pat. No. 5,974,116, filed May 11, 1999.
Canadian Intellectual Property Office, Examination Report, Application No. CA 2,268,383, May 10, 2007.
Applicant, Response to May 10, 2007 Office Action, Application No. CA 2,268,383, Nov. 9, 2007.
United Kingdom Patent Office, Examination Report, Application No. GB 9908310.7 (Patent No. GB 2339363), Jan. 25, 2003.
Applicant, Response to United Kingdom Patent Office Jan. 25, 2003 Report, Application No. GB 9908310.7 (Patent No. GB 2339363), Aug. 26, 2003.
United Kingdom Patent Office, Examination Report, Application No. GB 9908310.7 (Patent No. GB 2339363), Sep. 23, 2003.
Applicant, Response to United Kingdom Patent Office Sep. 23, 2003 Report, Application No. GB 9908310.7 Patent No. GB 2339363), Nov. 17, 2003.
United Kingdom Patent Office, Examination Report, Application No. GB 9908310.7 (Patent No. GB 2339363), Dec. 16, 2003.
Applicant, Response to United Kingdom Patent Office Dec. 16, 2003 Report, Application No. GB 9908310.7 (Patent No. GB 2339363), Dec. 30, 2003.
United States Patent and Trademark Office, Office Action Summary and Detailed Action, U.S. Appl. No. 09/572,819, now U.S. Pat. No. 6,307,921, filed Oct. 25, 2000.
Applicant, Response (to Oct. 25, 2000 Office Action) and Terminal Disclaimers, U.S. Appl. No. 09/572,819, now U.S. Pat. No. 6,307,921, filed Apr. 25, 2001.
United States Patent and Trademark Office, Notice of Allowability, U.S. Appl. No. 09/572,819, now U.S. Pat. No. 6,307,921, filed Jun. 4, 2001.
United States Patent and Trademark Office, Office Action Summary and Detailed Action, U.S. Appl. No. 08/481,856, now U.S. Pat. No. 5,809,425, filed Aug. 28, 1996.
Applicant, Amendment (Response to Aug. 18, 1996 Office Action), U.S. Appl. No. 08/481,856, now U.S. Pat. No. 5,809,425, filed Feb. 28, 1997.
United States Patent and Trademark Office, Office Action Summary and Detailed Action, U.S. Appl. No. 08/481,856, now U.S. Pat. No. 5,809,425, filed May 28, 1997.
Applicant, Amendment (Response to May 28, 1997 Office Action), U.S. Appl. No. 08/481,856, now U.S. Pat. No. 5,809,425, filed Nov. 26, 1997.
United States Patent and Trademark Office, Notice of Allowance and Statement of Reasons for Allowance, U.S. Appl. No. 08/481,856, now U.S. Pat. No. 5,809,425, filed Dec. 23, 1997.
PCT International Search Report, Application No. PCT/US96/09492, Sep. 4, 1996.
Canadian Intellectual Property Office, Examiner's Report, Application No. CA 2,458,372, May 16, 2011.

(56) References Cited

OTHER PUBLICATIONS

Intellectual Property Philippines, Official Action, Application No. PH 12007502940, Jun. 6, 2011.
Applicant, Response to Jun. 6, 2011 Office Action, Application No. PH 12007502940, Aug. 4, 2011.
UK Intellectual Property Office, Examination Report, Application No. GB 0617585.5, Aug. 15, 2008.
UK Intellectual Property Office, Examination Report, Application No. GB 0617585.5, Dec. 17, 2008.
Applicant, Response to Dec. 17, 2008 Official Letter, Application No. GB 0617585.5, Feb. 16, 2009.
European Patent Office, Communication, Application No. EP04761001.9, Jun. 30, 2011.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In The United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In The United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In The United States Patent and Trademark Office Before the Patent Trial and Appeal Board, Nov. 23, 2015, 5 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In The United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, In The United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, In The United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, In The United States Patent and Trademark Office Before the Patent Trial and Appeal Board, Nov. 23, 2015, 5 pages.
Declaration of Benedict J. Occhiogrosso, In Re: U.S. Pat. No. 9,131,045, Case IPR2015-01889, In The United States Patent and Trademark Office Before the Patent Trial and Appeal Board, Sep. 9, 2015, 63 pages.
Declaration of Benedict J. Occhiogrosso, In Re: U.S. Patent No. 5,974,116, Case IPR2015-001355, In The United States Patent and Trademark Office Before the Patent Trial and Appeal Board, Jun. 8, 2015, 45 pages.
Declaration of Benedict J. Occhiogrosso, In Re: U.S. Pat. No. 6,934,366, Case IPR2015-001357, In The United States Patent and Trademark Office Before the Patent Trial and Appeal Board, Jun. 8, 2015, 46 pages.
Declaration of Benedict J. Occhiogrosso, In Re: U.S. Pat. No. 7,006,604, Case IPR2015-001358, In The United States Patent and Trademark Office Before the Patent Trial and Appeal Board, Jun. 8, 2015, 45 pages.
Declaration of Benedict J. Occhiogrosso, In Re: U.S. Pat. No. 6,493,426, Case IPR2015-001359, In The United States Patent and Trademark Office Before the Patent Trial and Appeal Board, Jun. 8, 2015, 47 pages.
Declaration of Benedict J. Occhiogrosso, In Re: U.S. Pat. No. 8,515,024, Case IPR2015-01885, In The United States Patent and Trademark Office Before the Patent Trial and Appeal Board, Sep. 8, 2015, 23 pages.
Declaration of Benedict J. Occhiogrosso, In Re: U.S. Pat. No. 7,881,441, Case IPR2015-01886, In The United States Patent and Trademark Office Before the Patent Trial and Appeal Board, Sep. 8, 2015, 29 pages.
Intellectual Property Philippines, Official Action, Application No. PH 12005502024, Aug. 10, 2007.
Applicant, Response to Aug. 10, 2007 Official Action, Application No. PH 12005502024, Oct. 3, 2007.
Intellectual Property Philippines, Official Action, Application No. PH 12005502024, Oct. 17, 2007.
Applicant, Response to Oct. 17, 2007 Official Action, Application No. PH 12005502024, Dec. 11, 2007.
United States Patent and Trademark Office, Office Action Summary and Detailed Action, U.S. Appl. No. 10/619,040, now U.S. Pat. No. 7,006,604, filed Dec. 2, 2004.
Applicant, Response (to Dec. 2, 2004 Office Action) and Terminal Disclaimer, U.S. Appl. No. 10/619,040, now U.S. Pat. No. 7,006,604, filed Jun. 2, 2005.
United States Patent and Trademark Office, Notice of Allowance, U.S. Appl. No. 10/619,040, now U.S. Pat. No. 7,006,604, filed Sep. 16, 2005.
United States Patent and Trademark Office, Supplemental Notice of Allowability, Examiner's Amendment and Interview Summary, U.S. Appl. No. 10/628,193, now U.S. Pat. No. 6,885,731, filed Jan. 31, 2005.
United States Patent and Trademark Office, Office Action Summary and Detailed Action, U.S. Appl. No. 10/634,965, now U.S. Pat. No. 7,003,082, filed Jul. 16, 2004.
Applicant, Response (to Jul. 16, 2004 Office Action) and Terminal Disclaimer, U.S. Appl. No. 10/634,965, now U.S. Pat. No. 7,003,082, filed Jan. 14, 2005.
United States Patent and Trademark Office, Supplemental Notice of Allowability, U.S. Appl. No. 10/634,965, now U.S. Pat. No. 7,003,082, filed Nov. 9, 2005.
United States Patent and Trademark Office, Office Action Summary and Detailed Action, U.S. Appl. No. 11/061,682, now U.S. Pat. No. 7,660,398, filed Apr. 1, 2008.
Applicant, Amendment (Response to Apr. 1, 2008 Office Action), U.S. Appl. No. 11/061,682, now U.S. Pat. No. 7,660,398, filed Jul. 1, 2008.
United States Patent and Trademark Office, Office Action Summary and Detailed Action, U.S. Appl. No. 11/061,682, now U.S. Pat. No. 7,660,398, filed Nov. 4, 2008.
Applicant, Request for Continued Examination and Interview Summary, U.S. Appl. No. 11/061,682, now U.S. Pat. No. 7,660,398, filed Jan. 22, 2009.
United States Patent and Trademark Office, Office Action Summary and Detailed Action, U.S. Appl. No. 11/061,682, now U.S. Pat. No. 7,660,398, filed Mar. 25, 2009.
Applicant, Amendment, U.S. Appl. No. 11/061,682, now U.S. Pat. No. 7,660,398, filed Jun. 22, 2009.
United States Patent and Trademark Office, Notice of Allowance, U.S. Appl. No. 11/061,682, now U.S. Pat. No. 7,660,398, filed Sep. 25, 2009.
Applicant, Request for Recalculation of Patent Term Adjustment in View of Wyeth, U.S. Pat. No. 7,660,398, U.S. Appl. No. 11/061,682, filed Feb. 25, 2010.

(56) References Cited

OTHER PUBLICATIONS

United States Patent and Trademark Office, Decision on Request for Recalculation of Patent Term Adjustment in View of Wyeth and Notice of Intent to Issue Certificate of Correction, U.S. Pat. No. 7,660,398 U.S. Appl. No. 11/061,682, filed Apr. 20, 2010.
United States Patent and Trademark Office, Certificate of Correction, U.S. Pat. No. 7,660,398 U.S. Appl. No. 11/061,682, filed Nov. 30, 2010.
PCT International Search Report and Written Opinion, Application No. PCT/US2005/005149, May 24, 2005.
PCT International Preliminary Report on Patentability, Application No. PCT/US2005/005149, Aug. 31, 2006.
UK Intellectual Property Office, Examination Report, Application No. GB 0617585.5, Jan. 23, 2008.
Applicant, Response to Jan. 23, 2008 Official Letter, Application No. GB 0617585.5, Jul. 22, 2008.
UK Intellectual Property Office, Combined Search and Examination Report, Application No. GB 0617585.5. Aug. 15, 2008.
Applicant, Response to Aug. 15, 2008 Official Letter, Application No. GB 0617585.5, Dec. 9, 2008.
UK Intellectual Property Office, Combined Search and Examination Report, Application No. GB 0813502.2. Aug. 15, 2008.
Applicant, Response to Aug. 15, 2008 Official Letter, Application No. GB 0813502.2, Dec. 9, 2008.
United States Patent and Trademark Office, Office Action Summary and Detailed Action, U.S. Appl. No. 11/257,703, now U.S. Pat. No. 7,319,740, filed May 3, 2007.
Applicant, Amendment and Terminal Disclaimers (Response to May 3, 2007 Office Action), U.S. Appl. No. 11/257,703, now U.S. Pat. No. 7,319,740, filed Jul. 26, 2007.
United States Patent and Trademark Office, Notice of Allowance, U.S. Appl. No. 11/257,703, now U.S. Pat. No. 7,319,740, filed Aug. 23, 2007.
United States Patent and Trademark Office, Office Action Summary and Detailed Action, U.S. Appl. No. 08/217,518, now U.S. Pat. No. 5,724,405, filed Jul. 20, 1995.
Applicant, Amendment (Response to Jul. 20, 1995 Office Action), U.S. Appl. No. 08/217,518, now U.S. Pat. No. 5,724,405, filed Jan. 22, 1996.
United States Patent and Trademark Office, Office Action Summary and Detailed Action, U.S. Appl. No. 08/217,518, now U.S. Pat. No. 5,724,405, filed Apr. 16, 1996.
Applicant, Amendment (Response to Apr. 16, 1996 Office Action) and Terminal Disclaimer, U.S. Appl. No. 08/217,518, now U.S. Pat. No. 5,724,405, filed Oct. 16, 1996.
United States Patent and Trademark Office, Office Action Summary and Detailed Action, U.S. Appl. No. 08/217,518, now U.S. Pat. No. 5,724,405, filed Jan. 15, 1997.
Applicant, Response After Final (Response to Jan. 15, 1997 Office Action) and Terminal Disclaimer, U.S. Appl. No. 08/217,518, now U.S. Pat. No. 5,724,405, filed Jul. 15, 1997.
United States Patent and Trademark Office, Notice of Allowability, U.S. Appl. No. 08/217,518, now U.S. Pat. No. 5,724,405, filed Aug. 19, 1997.
United Kingdom Patent Office, Search Report, Application No. GB 9804556.0 (Patent No. GB 2335109), Aug. 12, 1998.
United Kingdom Patent Office, Examination Report, Application No. GB 9804556.0 (Patent No. GB 2335109), Sep. 27, 2002.
Applicant, Response to United Kingdom Patent Office Sep. 27, 2002 Examination Report, Application No. GE 9804556.0 (Patent No. GB 2335109), Mar. 26, 2003.
United States Patent and Trademark Office, Notice of Allowability, U.S. Appl. No. 08/925,558, now U.S. Pat. No. 5,909,482, filed Oct. 27, 1998.
United Kingdom Patent Office, Examination Report, Application No. GB 9908312.3 (Patent No. GB 2334177), Apr. 15, 2002.
Applicant, Response to United Kingdom Patent Office Apr. 15, 2002 Examination Report, Application No. GB 9908312.3 (Patent No. GB 2334177), Oct. 14, 2002.
PCT International Search Report, Application No. PCT/US98/18650, Nov. 6, 1998.
Canadian Intellectual Property Office, Examination Report, Application No. CA 2,268,582, Feb. 22, 2007.
Applicant, Amendment/Remarks Following Feb. 22, 2007 Examiner's Report, Application No. CA 2,268,582, Aug. 22, 2007.
Declaration of Paul W. Ludwick, In Re: U.S. Pat. No. 6,594,346, Case IPR2013-00545, In The United States Patent and Trademark Office Before the Patent Trial and Appeal Board, May 11, 2014.
Declaration of Paul W. Ludwick, In Re: U.S. Patent 7,555, 104, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 6,233,314, Case IPR2013-00540, In The United States Patent and Trademark Office Before the Patent Trial and Appeal Board, May 30, 2014.
Declaration of Paul W. Ludwick, In Re: U.S. Pat. No. 5,909,482, Case IPR2013-00541, In The United States Patent and Trademark Office Before the Patent Trial and Appeal Board, May 30, 2014.
Declaration of Paul W. Ludwick, In Re: U.S. Pat. No. 8,213,578, Case IPR2013-00544, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,233,314, Case IPR2013-00540, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In The United States Patent and Trademark Office Before the Patent Trial and Appeal Board, May 30, 2014.
Declaration of Kelby Brick, Esq., CDI, In Re: U.S. Pat. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In The United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In The United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In The United States Patent and Trademark Office Before the Patent Trial and Appeal Board, Jul. 7, 2014.

(56) References Cited

OTHER PUBLICATIONS

Supplemental Declaration of Benedict J. Occhiogrosso, In Re: U.S. Pat. No. 7,319,740, Case IPR2013-00542, In The United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In The United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In The United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, In The United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In The United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al.* v. *Sorenson Communications, Inc., et al.,* Civil Action No. 3:13-CV-346-BBC, United States District Court, Western District of Wisconsin, Apr. 20, 2014 [Redacted].
Expert Report of Mr. Benedict J. Occhiogrosso Regarding Invalidity of Asserted Claims of U.S. Pat. No. 5,909,482; U.S. Pat. No. 6,233,314; U.S. Pat. No. 6,594,346; U.S. Pat. No. 6,603,835; U.S. Pat. No. 7,003,082; U.S. Pat. No. 7,319,740; U.S. Pat. No. 7,555,104; and U.S. Pat. No. 8,213,578, *Ultratec, Inc., et al.* v. *Sorenson Communications, Inc., et al.,* Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al.* v. *Sorenson Communications, Inc., et al.,* Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Pat. No. 5,909,482; U.S. Pat. No. 6,233,314; U.S. Pat. No. 6,594,346; and U.S. Pat. No. 8,213,578, *Ultratec, Inc., et al.* v. *Sorenson Communications, Inc., et al.,* Civil Action No. 3:13-CV-346-BBC, United States District Court, Western District of Wisconsin, Apr. 22, 2014 [Redacted].
Validity Report of James A. Steel, Jr. Regarding U.S. Pat. No. 6,603,835; U.S. Pat. No. 7,003,082; U.S. Pat. No. 7,319,740; and U.S. Pat. No. 7,555,104, in Response to Expert Report of Benedict Occhiogrosso and Non-Infringement Report Regarding U.S. Pat. No. 3,379,801, *Ultratec, Inc., et al.* v. *Sorenson Communications, Inc., et al.,* Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al.* v. *Sorenson Communications, Inc., et al.,* Civil Action No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al.* v. *Sorenson Communications, Inc., et al.,* Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al.* v. *Sorenson Communications, Inc., et al.,* Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al.* v. *Sorenson Communications, Inc., et al.,* Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al.* v. *Sorenson Communications, Inc., et al.,* Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al.* v. *Sorenson Communications, Inc., et al.,* Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al.* v. *Sorenson Communications, Inc., et al.,* Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al.* v. *Sorenson Communications, Inc., et al.,* Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al.* v. *Sorenson Communications, Inc., et al.,* Civil Action No. 14-CV-66-BBC, United States District Court, Western District of Wisconsin, Jul. 16, 2014.
Sorenson Communications, Inc. and CaptionCall, LLC's Invalidity Contentions and Exhibits, *Ultratec, Inc., et al.* v. *Sorenson Communications, Inc., et al.,* Civil Action No. 14-CV-66-BBC, United States District Court, Western District of Wisconsin, May 16, 2014.
CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.

(56) References Cited

OTHER PUBLICATIONS

Declaration of Benedict J. Occhiogrosso, In Re: U.S. Pat. No. 8,917,822, Case IPR2015-00636, In The United States Patent and Trademark Office Before the Patent Trial and Appeal Board, Jan. 28, 2015, 65 pages.
Ultratec Inc. and Captel Inc., Amended Complaint for Patent Infringement, *Ultratec, Inc., et al.* v. *Sorenson Communications, Inc., et al.,* Civil Action No. 3:14-cv-847-JDP, United States District Court, Western District of Wisconsin, Dec. 23, 2014, 15 pages.
Sorenson Communications Inc. and Captioncall Llc, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.
In the United States Patent and Trademark Office Before the Patent Trial and Appeal Board, Final Written Decision, *CaptionCall LLC* v. *Ultratec Inc.,* Case IPR2014-00543, U.S. Pat. No. 7,555,104, Mar. 3, 2015, 29 pages.
In the United States Patent and Trademark Office Before the Patent Trial and Appeal Board, Final Written Decision, *CaptionCall LLC* v. *Ultratec Inc.,* Case IPR2014-00544, U.S. Pat. No. 8,213,578, Mar. 3, 2015, 56 pages.
In the United States Patent and Trademark Office Before the Patent Trial and Appeal Board, Final Written Decision, *CaptionCall LLC* v. *Ultratec Inc.,* Case IPR2014-00545, U.S. Pat. No. 6,594,346, Mar. 3, 2015, 41 pages.
In the United States Patent and Trademark Office Before the Patent Trial and Appeal Board, Final Written Decision, *CaptionCall LLC* v. *Ultratec Inc.,* Case IPR2014-00549, U.S. Pat. No. 6,603,835, Mar. 3, 2015, 35 pages.
In the United States Patent and Trademark Office Before the Patent Trial and Appeal Board, Final Written Decision, *CaptionCall LLC* v. *Ultratec Inc.,* Case IPR2014-00550, U.S. Pat. No. 7,003,082, Mar. 3, 2015, 25 pages.
United States Patent and Trademark Office Before the Patent Trial and Appeal Board, Decision Denying Institution of Inter Partes Review, *CaptionCall LLC* v. *Ultratec Inc.,* Case IPR2020-01215, U.S. Pat. No. 10,469,660, Jan. 27, 2021, 24 pages.
United States Patent and Trademark Office Before the Patent Trial and Appeal Board, Petitioner's Request for Rehearing Pursuant to 37 C.F.R. 42.71(d), *CaptionCall LLC* v. *Ultratec Inc.,* Case IPR2020-01215, U.S. Pat. No. 10,469,660, Feb. 18, 2021, 19 pages.
In the United States Patent and Trademark Office Before the Patent Trial and Appeal Board, Petition for Inter Partes Review of U.S. Pat. No. 10,742,805, *CaptionCall LLC* v. *Ultratec Inc.,* Case PR2021-01337, Aug. 24, 2021, 65 pages.
In the United States Patent and Trademark Office Before the Patent Trial and Appeal Board, Declaration of Benedict J. Occhiogrosso, Re: U.S. Pat. No. 10,742,805, *CaptionCall LLC* v. *Ultratec Inc.,* Case No. To Be Assigned, Jul. 29, 2021, 83 pages.
Rodman, The Effect of Bandwidth on Speech Intelligibility, White Paper, Jan. 16, 2003, Copyright 2003 Polycom, Inc., 9 pages.
United States Patent and Trademark Office, Office Action Summary and Detailed Action, U.S. Appl. No. 13/486,221, filed Aug. 18, 2015.
United States Patent and Trademark Office, Office Action Summary and Detailed Action, U.S. Appl. No. 13/486,221, filed Apr. 20, 2016.
United States Patent and Trademark Office, Office Action Summary and Detailed Action, U.S. Appl. No. 13/950,860, filed Nov. 4, 2015.
United States Patent and Trademark Office, Office Action Summary and Detailed Action, U.S. Appl. No. 14/506,080, filed Oct. 8, 2015.
United States Patent and Trademark Office, Office Action Summary and Detailed Action, U.S. Appl. No. 14/553,291, filed Mar. 4, 2015.
United States Patent and Trademark Office, Office Action Summary and Detailed Action, U.S. Appl. No. 14/553,291, filed Oct. 8, 2015.
United States Patent and Trademark Office, Office Action Summary and Detailed Action, U.S. Appl. No. 14/553,291, filed Apr. 5, 2016.
United States Patent and Trademark Office, Office Action Summary and Detailed Action, U.S. Appl. No. 14/553,291, filed Dec. 23, 2016.
United States Patent and Trademark Office, Office Action Summary and Detailed Action, U.S. Appl. No. 14/573,085, filed Nov. 21, 2016.
United States Patent and Trademark Office, Office Action Summary and Detailed Action, U.S. Appl. No. 14/632,257, filed Dec. 20, 2016.
United States Patent and Trademark Office, Office Action Summary and Detailed Action, U.S. Appl. No. 14/988,407, filed Mar. 4, 2016.
United States Patent and Trademark Office, Office Action Summary and Detailed Action, U.S. Appl. No. 14/988,407, filed Jul. 28, 2016.
United States Patent and Trademark Office, Office Action Summary and Detailed Action, U.S. Appl. No. 14/988,407, filed Nov. 10, 2016.
United States Patent and Trademark Office, Office Action Summary and Detailed Action, U.S. Appl. No. 15/010,179, filed May 24, 2016.
United States Patent and Trademark Office, Office Action Summary and Detailed Action, U.S. Appl. No. 15/010,179, filed May 4, 2017.
United States Patent and Trademark Office, Office Action Summary and Detailed Action, U.S. Appl. No. 15/010,193, filed Mar. 31, 2016.
United States Patent and Trademark Office, Office Action Summary and Detailed Action, U.S. Appl. No. 15/010,193, filed Nov. 10, 2016.
United States Patent and Trademark Office, Office Action Summary and Detailed Action, U.S. Appl. No. 15/010,193, filed May 4, 2017.
United States Patent and Trademark Office, Office Action Summary and Detailed Action, U.S. Appl. No. 15/010,199, filed Apr. 29, 2016.
United States Patent and Trademark Office, Office Action Summary and Detailed Action, U.S. Appl. No. 15/010,199, filed Sep. 29, 2016.
United States Patent and Trademark Office, Office Action Summary and Detailed Action, U.S. Appl. No. 15/010,199, filed May 3, 2017.
United States Patent and Trademark Office, Office Action Summary and Detailed Action, U.S. Appl. No. 15/204,142, filed Nov. 3, 2016.
United States Patent and Trademark Office, Office Action Summary and Detailed Action, U.S. Appl. No. 15/204,142, filed Jan. 19, 2017.
PCT International Search Report and Written Opinion, PCT/US2015/017954, Aug. 17, 2015.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35 (5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.

(56) References Cited

OTHER PUBLICATIONS

Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168-889-893.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Patent and Trademark Office, U.S. Appl. No. 08/396,554, Telephone for the Deaf and Method of Using Same, Filed Mar. 1, 1995, 121 pages.
U.S. Patent and Trademark Office, U.S. Appl. No. 09/599,347, filed Jun. 22, 2000, 19 pages.
U.S. Patent and Trademark Office, U.S. Appl. No. 10/099,824, Graphic User Interface for a Patient Ventilator, Filed Mar. 15, 2002, 3 pages.
U.S. Patent and Trademark Office, U.S. Appl. No. 60/041,458, TTY Modem System, Filed Mar. 25, 1997, 32 pages.
The Patent Office, Examination Report, Apr. 15, 2002, Application No. GB 9908312.3, 2 pages.
Applicant, Response to Apr. 15, 2002 Examination Report, Oct. 14, 2002, Application No. GB 9908312.3, 2 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office, Office Action Summary and Detailed Action, U.S. Appl. No. 09/783,679, now U.S. Pat. No. 6,594,346, filed Jun. 5, 2002.
Applicant, Response (to Jun. 5, 2002 Office Action), U.S. Appl. No. 09/783,679, now U.S. Pat. No. 6,594,346, filed Dec. 4, 2002.
United States Patent and Trademark Office, Notice of Allowance, U.S. Appl. No. 09/783,679, now U.S. Pat. No. 6,594,346, filed Feb. 19, 2003.
United States Patent and Trademark Office, Office Action Summary and Detailed Action, U.S. Appl. No. 09/789,120, now U.S. Pat. No. 6,567,503, filed Jun. 17, 2002.
Applicant, Amendment (Response to Jun. 17, 2002 Office Action), U.S. Appl. No. 09/789,120, now U.S. Pat. No. 6,567,503, filed Oct. 19, 2002.
United States Patent and Trademark Office, Notice of Allowance, U.S. Appl. No. 09/789,120, now U.S. Pat. No. 6,567,503, filed Dec. 30, 2002.
Canadian Intellectual Property Office, Examiner's Report, Application No. CA 2,372,061, Apr. 26, 2004.
Applicant, Response to Apr. 26, 2004 Official Action, Application No. CA 2,372,061, Oct. 26, 2004.
Canadian Intellectual Property Office, Notice of Allowance, Application No. CA 2,372,061, May 26, 2005.
Canadian Intellectual Property Office, Examiner's Report, Application No. CA 2,520,594, Mar. 7, 2006.
Applicant, Response to Mar. 7, 2006 Office Action, Application No. CA 2,520,594, Sep. 6, 2006.
Canadian Intellectual Property Office, Examiner's Report, Application No. CA 2,520,594, Nov. 27, 2006.
Applicant, Response to Nov. 27, 2006 Office Action, Application No. CA 2,520,594, May 25, 2007.
United Kingdom Patent Office, Combined Search and Examination Report, Application No. GB 0203898.2, Aug. 30, 2002.
Applicant, Response to Aug. 30, 2002 Official Letter, Application No. GB 0203898.2, Oct. 28, 2002.
United Kingdom Patent Office, Examination Report, Application No. GB 0203898.2, Jan. 21, 2003.
Applicant, Response to Jan. 21, 2003 Official Letter, Application No. GB 0203898.2, Jul. 15, 2003.
United Kingdom Patent Office, Combined Search and Examination Report, Application No. GB 0225275.7, Jan. 20, 2003.
Applicant, Response to Jan. 20, 2003 Letter, Application No. GB 0225275.7, Jul. 14, 2003.
United States Patent and Trademark Office, Office Action Summary and Detailed Action, U.S. Appl. No. 09/790,413, now U.S. Pat. No. 6,882,707, filed Mar. 23, 2004.
Applicant, Response to Restriction Requirement, U.S. Appl. No. 09/790,413 (Patent No. 6,882,707), Apr. 9, 2004.
United States Patent and Trademark Office, Office Action Summary and Detailed Action, U.S. Appl. No. 09/790,413, now U.S. Pat. No. 6,882,707, filed May 7, 2004.
Applicant, Response to May 7, 2004 Office Action, U.S. Appl. No. 09/790,413, now U.S. Pat. No. 6,882,707, filed Aug. 9, 2004.
United States Patent and Trademark Office, Notice of Allowance, Examiner's Amendment and Interview Summary, U.S. Appl. No. 09/790,413, now U.S. Pat. No. 6,882,707, filed Dec. 10, 2004.
United States Patent and Trademark Office, Office Action Summary and Detailed Action, U.S. Appl. No. 11/391,141, now U.S. Pat. No. 7,881,441, filed Mar. 9, 2010.
Applicant, First Amendment, U.S. Appl. No. 11/391,141, now U.S. Pat. No. 7,881,441, filed Jun. 9, 2010.

(56) References Cited

OTHER PUBLICATIONS

United States Patent and Trademark Office, Notice of Allowance, U.S. Appl. No. 11/391,141, now U.S. Pat. No. 7,881,441, filed Sep. 21, 2010.
United States Patent and Trademark Office, Supplemental Notice of Allowability, U.S. Appl. No. 11/391,141, now U.S. Pat. No. 7,881,441, filed Dec. 7, 2010.
European Patent Office, Communication, Application No. EP 06785768.0, Feb. 7, 2008.
Applicant, Reply to Feb. 7, 2008 Communication, Application No. EP 06785768.0, Mar. 12, 2008.
European Patent Office, Examination Report, Application No. EP 06785768.0, Aug. 9, 2010.
Applicant, Response to Aug. 9, 2010 Communication, Application No. EP 06785768.0, Dec. 20, 2010.
PCT International Search Report and Written Opinion, Application No. PCT/US2006/025236, Oct. 2, 2006.
PCT International Preliminary Report on Patentability, Application No. PCT/US2006/025236, Jan. 9, 2008.
Republic of the Philippines Intellectual Property Office, Findings/Action of Examiner, Application No. PH 1-2007-502940, Oct. 29, 2010.
Applicant, Response to Oct. 29, 2010 Office Action, Application No. PH 1-2007-502940, Dec. 29, 2010.
IP Australia, Examiner's First Report, Application No. AU 2006263680, Jun. 29, 2009.
Applicant, Response to Jun. 29, 2009 Examination Report, Application No. AU 2006263680, Jun. 17, 2010.
IP Australia, Examiner's Report No. 2, Application No. AU 2006263680, Jun. 22, 2010.
Applicant, Response to Jun. 22, 2010 Examination Report, Application No. AU 2006263680, Jul. 16, 2010.
United States Patent and Trademark Office, Office Action Summary and Detailed Action, U.S. Appl. No. 11/361,114, now U.S. Pat. No. 7,555,104, filed May 21, 2007.
Applicant, Terminal Disclaimer, U.S. Appl. No. 11/361,114, now U.S. Pat. No. 7,555,104, filed Jul. 23, 2007.
United States Patent and Trademark Office, Notice of Allowance and Examiner's Statement of Reasons for Allowance, U.S. Appl. No. 11/361,114, now U.S. Pat. No. 7,555,104), filed Sep. 15, 2008.
Applicant, Request for Continued Examination and Submission of Supplemental Information Disclosure Statement, U.S. Appl. No. 11/361,114, now U.S. Pat. No. 7,555,104, filed Dec. 15, 2008.
United States Patent and Trademark Office, Notice of Allowance, U.S. Appl. No. 11/361,114, now U.S. Pat. No. 7,555,104, filed Feb. 25, 2009.
United States Patent and Trademark Office, Notice of Allowance and Examiner's Statement of Reasons for Allowance, U.S. Appl. No. 09/876,340, now U.S. Pat. No. 6,504,910, filed Aug. 13, 2002.
PCT International Search Report, Application No. PCT/US02/18156, Oct. 29, 2002.
In the United States Patent and Trademark Office Before the Patent Trial and Appeal Board, Decision Granting Institution of Inter Partes Review of U.S. Pat. No. 10,587,751, *CaptionCall LLC* v. *Ultratec Inc.,* Case IPR2020-01217, Jan. 27, 2021, 24 pages.
In the United States Patent and Trademark Office Before the Patent Trial and Appeal Board, Judgment Granting Request for Entry of Adverse Judgment After Institution of Trial, U.S. Pat. No. 10,587,751, *CaptionCall LLC* v. *Ultratec Inc.,* Case IPR2020-01217, Apr. 28, 2021, 3 pages.
In the United States Patent and Trademark Office Before the Patent Trial and Appeal Board, Decision Denying Institution of Inter Partes Review, U.S. Pat. No. 10,491,746, *CaptionCall LLC* v. *Ultratec Inc.,* Case IPR2020-01216, Jan. 27, 2021, 22 pages.
Cooper, R. J., Break Feature for Half-Duplex Modem, IBM Technical Disclosure Bulletin, vol. 17, No. 8, pp. 2386-2387, Jan. 1975.
Gopalakrishnan, Effective Set-Up for Performing Phone Conversations by the Hearing Impaired, IBM Technical Disclosure Bulletin, vol. 34, No. 78, pp. 423-426, 1991.
Moskowitz, Telocator Alphanumeric Protocol, Version 1.8, Feb. 4, 1997.
Smith, R. L., ASCII to Baudot, Radio Electronics, pp. 51-58, Mar. 1976.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
United States Patent and Trademark Office, Office Action Summary and Detailed Action, U.S. Appl. No. 11/955,476, filed Jan. 24, 2011.
Applicant, Amendment (Response to Jan. 24, 2011, Office Action) and Terminal Disclaimers, U.S. Appl. No. 11/955,476, filed May 23, 2011.
United States Patent and Trademark Office, Office Action Summary and Detailed Action, U.S. Appl. No. 11/955,476, filed Jun. 23, 2011.
Applicant, Amendment Submitted with a Request for Continued Examination and Terminal Disclaimers, U.S. Appl. No. 11/955,476, filed Oct. 19, 2011.
United States Patent and Trademark Office, Notice of Allowance, U.S. Appl. No. 11/955,476, filed Mar. 2, 2012.
United States Patent and Trademark Office, Office Action Summary and Detailed Action, U.S. Appl. No. 13/486,221, filed Sep. 13, 2013.
Applicant, Amendment (Response to Sep. 13, 2013, Office Action), U.S. Appl. No. 13/486,221, filed Mar. 11, 2014.
United States Patent and Trademark Office, Office Action Summary and Detailed Action, U.S. Appl. No. 13/486,221, filed Mar. 26, 2014.
Applicant, Terminal Disclaimers and Remarks, U.S. Appl. No. 13/486,221, filed Apr. 30, 2014.
United States Patent and Trademark Office, Office Action Summary and Detailed Action, U.S. Appl. No. 13/486,221, filed Jun. 25, 2014.
United States Patent and Trademark Office, Office Action Summary and Detailed Action, U.S. Appl. No. 13/950,860, filed Jan. 9, 2014.
Applicant, Amendment (Response to Jan. 9, 2014, Office Action), U.S. Appl. No. 13/950,860, filed Jun. 30, 2014.
Applicant, Response to Jun. 29, 2009 Examiner's First Report, Application No. 2006263680, Jun. 17, 2010.
Applicant, Response to Aug. 9, 2010 Examination Report, Application No. 06785768.0, Dec. 20, 2010 Australian Government Ip Australia Examination Report No. 1 Application No. 2015222910 Jul. 6, 2019 doõpo pages.
In the United States Patent and Trademark Office Before the Patent Trial and Appeal Board, Decision—Institution of Inter Partes Review, *CaptionCall LLC* v. *Ultratec Inc.*, Case IPR2014-00780, U.S. Pat. No. 6,603,835, Dec. 4, 2014, 14 pages.
In the United States Patent and Trademark Office Before the Patent Trial and Appeal Board, Patent Owner Response Under 37 C.F.R. 42.120, *CaptionCall LLC* v. *Ultratec Inc.*, Case IPR2014-00780, U.S. Pat. No. 6,603,835, Feb. 11, 2015, 68 pages.
In the United States Patent and Trademark Office Before the Patent Trial and Appeal Board, Final Written Decision, *CaptionCall LLC* v. *Ultratec Inc.*, Case IPR2014-00540, U.S. Pat. No. 6,233,314, Mar. 3, 2015, 55 pages.
In the United States Patent and Trademark Office Before the Patent Trial and Appeal Board, Final Written Decision, *CaptionCall LLC* v. *Ultratec Inc.*, Case IPR2014-00541, U.S. Pat. No. 5,909,482, Mar. 3, 2015, 77 pages.
In the United States Patent and Trademark Office Before the Patent Trial and Appeal Board, Final Written Decision, *CaptionCall LLC* v. *Ultratec Inc.*, Case IPR2014-00542, U.S. Pat. No. 7,319,740, Mar. 3, 2015, 31 pages.
In the United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.
In the United States Patent and Trademark Office Before the Patent Trial and Appeal Board, Patent Owner's Preliminary Response, *CaptionCall LLC* v. *Ultratec Inc.*, Case IPR2015-00636, U.S. Pat. No. 8,917,822, Jun. 9, 2015, 66 pages.

(56) References Cited

OTHER PUBLICATIONS

In the United States Patent and Trademark Office Before the Patent Trial and Appeal Board, Decision Instituting Review, *CaptionCall LLC* v. *Ultratec Inc*., Case IPR2015-00636, U.S. Pat. No. 8,917,822, Sep. 8, 2015, 20 pages.
In the United States Patent and Trademark Office Before the Patent Trial and Appeal Board, Patent Owner Response, *CaptionCall LLC* v. *Ultratec Inc*., Case IPR2015-00636, U.S. Pat. No. 8,917,822, Nov. 23, 2015, 65 pages.
In the United States Patent and Trademark Office Before the Patent Trial and Appeal Board, Patent Owner's Contingent Motion to Amend, *CaptionCall LLC* v. *Ultratec Inc*., Case IPR2015-00636, U.S. Pat. No. 8,917,822, Nov. 23, 2015, 39 pages.
In the United States Patent and Trademark Office Before the Patent Trial and Appeal Board, Petitioner's Reply to Patent Owner Response, *CaptionCall LLC* v. *Ultratec Inc*., Case IPR2015-00636, U.S. Pat. No. 8,917,822, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC* v. *Ultratec Inc*., Case IPR2015-00636, U.S. Pat. No. 8,917,822, Jan. 26, 2016, 28 pages.
In the United States Patent and Trademark Office Before the Patent Trial and Appeal Board, Petition for Inter Partes Review of Claims 1-30 of U.S. Pat. No. 8,908,838, *CaptionCall LLC* v. *Ultratec Inc*., Case IPR2015-00637, U.S. Pat. No. 8,908,838, Jan. 29, 2015, 67 pages.
In the United States Patent and Trademark Office Before the Patent Trial and Appeal Board, Patent Owner's Preliminary Response, *CaptionCall LLC* v. *Ultratec Inc*., Case IPR2015-00637, U.S. Pat. No. 8,908,838, Jun. 9, 2015, 65 pages.
In the United States Patent and Trademark Office Before the Patent Trial and Appeal Board, Decision Instituting Review, *CaptionCall LLC* v. *Ultratec Inc*., Case IPR2015-00637, U.S. Pat. No. 8,908,838, Sep. 8, 2015, 25 pages.
In the United States Patent and Trademark Office Before the Patent Trial and Appeal Board, Patent Owner Response, *CaptionCall LLC* v. *Ultratec Inc*., Case IPR2015-00637, U.S. Pat. No. 8,908,838, Nov. 23, 2015, 65 pages.
In the United States Patent and Trademark Office Before the Patent Trial and Appeal Board, Patent Owner's Contingent Motion to Amend, *CaptionCall LLC* v. *Ultratec Inc*., Case IPR2015-00637, U.S. Pat. No. 3,908,838, Nov. 23, 2015, 38 pages.
In the United States Patent and Trademark Office Before the Patent Trial and Appeal Board, Petitioner's Reply to Patent Owner Response, *CaptionCall LLC* v. *Ultratec Inc*., Case IPR2015-00637, U.S. Pat. No. 8,908,838, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC* v. *Ultratec Inc*., Case IPR2015-00637, U.S. Pat. No. 8,908,838, Jan. 26, 2016, 28 pages.
In the United States Patent and Trademark Office Before the Patent Trial and Appeal Board, Petition for Inter Partes Review of Claims 1-74 of U.S. Pat. No. 9,131,045, *CaptionCall LLC* v. *Ultratec Inc*., Case IPR2015-01889, U.S. Pat. No. 9,131,045, Sep. 9, 2015, 66 pages.
In the United States Patent and Trademark Office Before the Patent Trial and Appeal Board, Patent Owner's Preliminary Response, *CaptionCall LLC* v. *Ultratec Inc*., Case IPR2015-01889, U.S. Pat. No. 9,131,045, Dec. 18, 2015, 26 pages.
In the United States Patent and Trademark Office Before the Patent Trial and Appeal Board, Petition for Inter Partes Review of Claims 1-18 of U.S. Pat. No. 5,974,116, *CaptionCall LLC* v. *Ultratec Inc*., Case IPR2015-01355, U.S. Pat. No. 5,974,116, Jun. 8, 2015, 65 pages.
In the United States Patent and Trademark Office Before the Patent Trial and Appeal Board, Patent Owner's Preliminary Response, *CaptionCall LLC* v. *Ultratec Inc*., Case IPR2015-01355, U.S. Pat. No. 5,974,116, Sep. 18, 2015, 43 pages.
In the United States Patent and Trademark Office Before the Patent Trial and Appeal Board, Decision Instituting Review, *CaptionCall LLC* v. *Ultratec Inc*., Case IPR2015-01355, U.S. Pat. No. 5,974,116, Dec. 16, 2015, 34 pages.
In the United States Patent and Trademark Office Before the Patent Trial and Appeal Board, Petition for Inter Partes Review of Claim 1 of U.S. Pat. No. 6,934,366, *CaptionCall LLC* v. *Ultratec Inc*., Case IPR2015-01357, U.S. Pat. No. 6,934,366, Jun. 8, 2015, 65 pages.
In the United States Patent and Trademark Office Before the Patent Trial and Appeal Board, Patent Owner's Preliminary Response, *CaptionCall LLC* v. *Ultratec Inc*., Case IPR2015-01357, U.S. Pat. No. 6,934,366, Sep. 22, 2015, 37 pages.
In the United States Patent and Trademark Office Before the Patent Trial and Appeal Board, Decision Instituting Review, *CaptionCall LLC* v. *Ultratec Inc*., Case IPR2015-01357, U.S. Pat. No. 6,934,366, Dec. 18, 2015, 16 pages.
In the United States Patent and Trademark Office Before the Patent Trial and Appeal Board, Petition for Inter Partes Review of Claim 1 of U.S. Pat. No. 7,006,604, *CaptionCall LLC* v. *Ultratec Inc*., Case IPR2015-01358, U.S. Pat. No. 7,006,604, Jun. 8, 2015, 65 pages.
In the United States Patent and Trademark Office Before the Patent Trial and Appeal Board, Patent Owner's Preliminary Response, *CaptionCall LLC* v. *Ultratec Inc*., Case IPR2015-01358, U.S. Pat. No. 7,006,604, Sep. 22, 2015, 34 pages.
In the United States Patent and Trademark Office Before the Patent Trial and Appeal Board, Decision Instituting Review, *CaptionCall LLC* v. *Ultratec Inc*., Case IPR2015-01358, U.S. Pat. No. 7,006,604, Dec. 18, 2015, 12 pages.
In the United States Patent and Trademark Office Before the Patent Trial and Appeal Board, Petition for Inter Partes Review of Claims 1-3 and 5-7 of U.S. Pat. No. 6,493,426, *CaptionCall LLC* v. *Ultratec Inc*., Case IPR2015-01359, U.S. Pat. No. 6,493,426, Jun. 8, 2015, 65 pages.
In the United States Patent and Trademark Office Before the Patent Trial and Appeal Board, Patent Owner's Preliminary Response, *CaptionCall LLC* v. *Ultratec Inc*., Case IPR2015-01359, U.S. Pat. No. 6,493,426, Sep. 22, 2015, 40 pages.
In the United States Patent and Trademark Office Before the Patent Trial and Appeal Board, Decision Instituting Review, *CaptionCall LLC* v. *Ultratec Inc*., Case IPR2015-01359, U.S. Pat. No. 6,493,426, Dec. 18, 2015, 17 pages.
In the United States Patent and Trademark Office Before the Patent Trial and Appeal Board, Petition for Inter Partes Review of Claims 1-4 of U.S. Pat. No. 8,515,024, *CaptionCall LLC* v. *Ultratec Inc*., Case IPR2015-01885, U.S. Pat. No. 8,515,024, Sep. 8, 2015, 35 pages.
In the United States Patent and Trademark Office Before the Patent Trial and Appeal Board, Patent Owner's Preliminary Response, *CaptionCall LLC* v. *Ultratec Inc*., Case IPR2015-01885, U.S. Pat. No. 8,515,024, Dec. 17, 2015, 25 pages.
In the United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC* v. *Ultratec Inc*., Case IPR2015-01886, U.S. Pat. No. 7,881,441, Sep. 8, 2015, 61 pages.
United States Patent and Trademark Office, Notice of Allowance, Examiner's Amendment, Examiner Interview Summary Record, U.S. Appl. No. 07/074,625 (U.S. Pat. No. 4,777,469), May 20, 1988.
United States Patent and Trademark Office, Communication, U.S. Appl. No. 07/224,118 (U.S. Pat. No. 4,897,868), Jun. 8, 1989.
Applicant, Amendment (Response to Jun. 8, 1989 Office Action) and Terminal Disclaimer, U.S. Appl. No. 07/224,118 (U.S. Pat. No. 4,897,868), Jun. 19, 1989.
United States Patent and Trademark Office, Notice of Allowance, U.S. Appl. No. 07/224,118 (U.S. Pat. No. 4,897,868), Aug. 29, 1989.
United States Patent and Trademark Office, Communication, U.S. Appl. No. 07/334,003 (U.S. Pat. No. 4,959,847), Oct. 10, 1989.
Applicant, Amendment (Response to Oct. 10, 1989 Office Action), U.S. Appl. No. 07/334,003 (U.S. Pat. No. 4,959,847), Jan. 10, 1990.

(56) References Cited

OTHER PUBLICATIONS

United States Patent and Trademark Office, Notice of Allowance, U.S. Appl. No. 07/334,003 (U.S. Pat. No. 4,959,847), Mar. 27, 1990.
United States Patent and Trademark Office, Communication, U.S. Appl. No. 07/842,943 (U.S. Pat. No. 5,351,288), Oct. 22, 1993.
Applicant, Amendment (Response to Oct. 22, 1993 Office Action) and Terminal Disclaimer, U.S. Appl. No. 07/842,943 (U.S. Pat. No. 5,351,288), Jan. 13, 1994.
United States Patent and Trademark Office, Communication, U.S. Appl. No. 07/842,943 (U.S. Pat. No. 5,351,288), Mar. 30, 1994.
Applicant, Response to Mar. 30, 1994 Final Rejection, U.S. Appl. No. 07/842,943 (U.S. Pat. No. 5,351,288), Apr. 12, 1994.
Applicant, Supplemental Response to Final Rejection and Terminal Disclaimer, U.S. Appl. No. 07/842,943 (U.S. Pat. No. 5,351,288), Apr. 28, 1994.
United States Patent and Trademark Office, Notice of Allowance, U.S. Appl. No. 07/842,943 (U.S. Pat. No. 5,351,288), Jun. 6, 1994.
United States Patent and Trademark Office, Communication, U.S. Appl. No. 07/255,357, filed May 3, 1989.
Applicant, Amendment (Response to May 3, 1989 Office Action), U.S. Appl. No. 07/255,357, filed Aug. 3, 1989.
United States Patent and Trademark Office, Communication, U.S. Appl. No. 07/255,357, filed Oct. 16, 1989.
Applicant, Amendment (Response to Oct. 16, 1989 Office Action), U.S. Appl. No. 07/255,357, filed Apr. 16, 1990.
United States Patent and Trademark Office, Communication, U.S. Appl. No. 07/255,357, filed Jul. 16, 1990.
Applicant, Response After Final, U.S. Appl. No. 07/255,357, filed Oct. 16, 1990.
United States Patent and Trademark Office, Advisory Action, U.S. Appl. No. 07/255,357, filed Nov. 6, 1990.
United States Patent and Trademark Office, Examiner's Action, U.S. Appl. No. 07/886,553 (U.S. Pat. No. 5,325,417), May 21, 1993.
Applicant, First Amendment (Response to May 21, 1993 Office Action), U.S. Appl. No. 07/886,553 (U.S. Pat. No. 5,325,417), Oct. 21, 1993.
United States Patent and Trademark Office, Notice of Allowance, U.S. Appl. No. 07/886,553 (U.S. Pat. No. 5,325,417), Jan. 4, 1994.
United States Patent and Trademark Office, Examiner's Action, U.S. Appl. No. 29/,024,266 (U.S. Pat. No. D. 364,865), Mar. 30, 1995.
Applicant, Response to First Office Action, U.S. Appl. No. 29/024,266 (U.S. Pat. No. D. 364,865), May 16, 1995.
United States Patent and Trademark Office, Notice of Allowance, U.S. Appl. No. 29/024,266 (U.S. Pat. No. D. 364,865), Jun. 7, 1995.
United States Patent and Trademark Office, Office Action Summary and Detailed Action, U.S. Appl. No. 29/076,383 (U.S. Pat. No. D. 405,793), Apr. 14, 1998.
Applicant, First Amendment (Response to Apr. 14, 1998 Office Action), U.S. Appl. No. 29/076,383 (U.S. Pat. No. D. 405,793), Jul. 14, 1998.
United States Patent and Trademark Office, Notice of Allowance and Examiner's Amendment, U.S. Appl. No. 29/076,383 (U.S. Pat. No. D. 405,793), Aug. 10, 1998.
Applicant, Preliminary Response to United States Patent and Trademark Office, U.S. Appl. No. 07/616,720 (U.S. Pat. No. 5,081,673), Dec. 31, 1990.
United States Patent and Trademark Office, Notice of Allowance, U.S. Appl. No. 07/616,720 (U.S. Pat. No. 5,081,673), Mar. 7, 1991.
United States Patent and Trademark Office, Examiner's Action, U.S. Appl. No. 07/886,642 (U.S. Pat. No. 5,327,479), May 19, 1993.
Applicant, First Amendment (Response to May 19, 1993 Office Action), U.S. Appl. No. 07/886,642 (U.S. Pat. No. 5,327,479), Oct. 19, 1993.
United States Patent and Trademark Office, Notice of Allowance and Examiner Interview Summary Record, U.S. Appl. No. 07/886,642 (U.S. Pat. No. 5,327,479), Jan. 5, 1994.
United States Patent and Trademark Office, Examiner's Action, U.S. Appl. No. 08/155,061 (U.S. Pat. No. 5,517,548), Dec. 22, 1994.
Applicant, Amendment (Response to Dec. 22, 1994 Office Action), U.S. Appl. No. 08/155,061 (U.S. Pat. No. 6,517,548), Jun. 22, 1995.
United States Patent and Trademark Office, Notice of Allowance, U.S. Appl. No. 08/155,061 (U.S. Pat. No. 6,517,548), Aug. 8, 1995.
United States Patent and Trademark Office, Communication, U.S. Appl. No. 07/886,552, filed May 21, 1993.
United States Patent and Trademark Office, Office Action Summary and Detailed Action, U.S. Appl. No. 08/802,053, filed Sep. 30, 1997.
Applicant, Response to Sep. 30, 1997 First Office Action, U.S. Appl. No. 08/802,053, filed Oct. 20, 1997.
United States Patent and Trademark Office, Office Action Summary and Detailed Action, U.S. Appl. No. 08/802,053, filed Jan. 5, 1998.
United States Patent and Trademark Office, Supplemental Notice of Allowability and Examiner's Amendment, U.S. Appl. No. 08/258,044 (U.S. Pat. No. 5,604,786), Nov. 18, 1996.
United States Patent and Trademark Office, Communication, U.S. Appl. No. 08/369,205 (U.S. Pat. No. 5,581,593), Nov. 2, 1995.
Applicant, Amendment (Response to Nov. 2, 1995 Office Action), U.S. Appl. No. 08/369,205 (U.S. Pat. No. 5,581,593), Feb. 5, 1996.
United States Patent and Trademark Office, Notice of Allowance, Interview Summary, and Examiner's Amendment, U.S. Appl. No. 08/369,205 (U.S. Pat. No. 5,581,593), May 15, 1996.
United States Patent and Trademark Office, Office Action Summary and Detailed Action, U.S. Appl. No. 08/481,852 (U.S. Pat. No. 5,978,654), Sep. 5, 1996.
Applicant, Amendment (Response to Sep. 5, 1996 Office Action), U.S. Appl. No. 08/481,852 (U.S. Pat. No. 5,978,654), Nov. 26, 1997.
United States Patent and Trademark Office, Office Action Summary and Detailed Action, U.S. Appl. No. 08/481,852 (U.S. Pat. No. 5,978,654), Oct. 16, 1998.
Applicant, Response (to Oct. 16, 1998 Office Action), U.S. Appl. No. 08/481,852 (U.S. Pat. No. 5,978,654), Apr. 16, 1999.
United States Patent and Trademark Office, Notice of Allowance, U.S. Appl. No. 08/481,852 (U.S. Pat. No. 5,978,654), May 5, 1999.
United States Patent and Trademark Office, Office Action Summary and Detailed Action, U.S. Appl. No. 09/288,420 (U.S. Pat. No. 6,233,314), Feb. 25, 2000.
Applicant, Amendment (Response to Feb. 25, 2000 Office Action) and Terminal Disclaimer, U.S. Appl. No. 09/288,420 (U.S. Pat. No. 6,233,314), Aug. 25, 2000.
United States Patent and Trademark Office, Notice of Allowance, U.S. Appl. No. 09/288,420 (U.S. Pat. No. 6,233,314), Dec. 5, 2000.
United States Patent and Trademark Office, Office Action Summary and Detailed Action, U.S. Appl. No. 09/783,337 (U.S. Pat. No. 6,493,426), Dec. 14, 2001.
Applicant, Response to Dec. 14, 2001 Office Action and Terminal Disclaimer, U.S. Appl. No. 09/783,337 (U.S. Pat. No. 6,493,426), Jun. 14, 2002.
United States Patent and Trademark Office, Notice of Allowance and Examiner's Statement of Reasons for Allowance, U.S. Appl. No. 09/783,337 (U.S. Pat. No. 6,493,426), Jul. 25, 2002.
United States Patent and Trademark Office, Office Action Summary and Detailed Action, U.S. Appl. No. 10/619,040 (U.S. Pat. No. 7,006,604), Dec. 2, 2004.
Applicant, Response (to Dec. 2, 2004 Office Action) and Terminal Disclaimer, U.S. Appl. No. 10/619,040 (U.S. Pat. No. 7,006,604), Jun. 2, 2005.
United States Patent and Trademark Office, Notice of Allowance, U.S. Appl. No. 10/619,040 (U.S. Pat. No. 7,006,604), Sep. 16, 2005.
United States Patent and Trademark Office, Supplemental Notice of Allowability, Examiner's Amendment and Interview Summary, U.S. Appl. No. 10/628,193 (U.S. Pat. No. 6,885,731), Jan. 31, 2005.
United States Patent and Trademark Office, Office Action Summary and Detailed Action, U.S. Appl. No. 10/634,965 (U.S. Pat. No. 7,003,082), Jul. 16, 2004.
Applicant, Response (to Jul. 16, 2004 Office Action) and Terminal Disclaimer, U.S. Appl. No. 10/634,965 (U.S. Pat. No. 7,003,082), Jan. 14, 2005.
United States Patent and Trademark Office, Supplemental Notice of Allowability, U.S. Appl. No. 10/634,965 (U.S. Pat. No. 7,003,082), Nov. 9, 2005.

(56) References Cited

OTHER PUBLICATIONS

United States Patent and Trademark Office, Office Action Summary and Detailed Action, U.S. Appl. No. 11/061,682 (U.S. Pat. No. 7,660,398), Apr. 1, 2008.
Applicant, Amendment (Response to Apr. 1, 2008 Office Action), U.S. Appl. No. 11/061,682 (U.S. Pat. No. 7,660,398), Jul. 1, 2008.
United States Patent and Trademark Office, Office Action Summary and Detailed Action, U.S. Appl. No. 11/061,682 (U.S. Pat. No. 7,660,398), Nov. 4, 2008.
Applicant, Request for Continued Examination and Interview Summary, U.S. Appl. No. 11/061,682 (U.S. Pat. No. 7,660,398), Jan. 22, 2009.
United States Patent and Trademark Office, Office Action Summary and Detailed Action, U.S. Appl. No. 11/061,682 (U.S. Pat. No. 7,660,398), Mar. 25, 2009.
Applicant, Amendment, U.S. Appl. No. 11/061,682 (U.S. Pat. No. 7,660,398), Jun. 22, 2009.
United States Patent and Trademark Office, Notice of Allowance, U.S. Appl. No. 11/061,682 (U.S. Pat. No. 7,660,398), Sep. 25, 2009.
Applicant, Request for Recalculation of Patent Term Adjustment in View of Wyeth, U.S. Pat. No. 7,660,398, (U.S. Appl. No. 11/061,682), Feb. 25, 2010.
United States Patent and Trademark Office, Decision on Request for Recalculation of Patent Term Adjustment in View of Wyeth and Notice of Intent to Issue Certificate of Correction, U.S. Pat. No. 7,660,398 (U.S. Appl. No. 11/061,682), Apr. 20, 2010.
United States Patent and Trademark Office, Certificate of Correction, U.S. Pat. No. 7,660,398 (U.S. Appl. No. 11/061,682), Nov. 30, 2010.
United States Patent and Trademark Office, Office Action Summary and Detailed Action, U.S. Appl. No. 11/257,703 (U.S. Pat. No. 7,319,740), May 3, 2007.
Applicant, Amendment and Terminal Disclaimers (Response to May 3, 2007 Office Action), U.S. Appl. No. 11/257,703 (U.S. Pat. No. 7,319,740), Jul. 26, 2007.
United States Patent and Trademark Office, Notice of Allowance, U.S. Appl. No. 11/257,703 (U.S. Pat. No. 7,319,740), Aug. 23, 2007.
United States Patent and Trademark Office, Office Action Summary and Detailed Action, U.S. Appl. No. 08/217,518 (U.S. Pat. No. 5,724,405), Jul. 20, 1995.
Applicant, Amendment (Response to Jul. 20, 1995 Office Action), U.S. Appl. No. 08/217,518 (U.S. Pat. No. 5,724,405), Jan. 22, 1996.
United States Patent and Trademark Office, Office Action Summary and Detailed Action, U.S. Appl. No. 08/217,518 (U.S. Pat. No. 5,724,405), Apr. 16, 1996.
Applicant, Amendment (Response to Apr. 16, 1996 Office Action) and Terminal Disclaimer, U.S. Appl. No. 08/217,518 (U.S. Pat. No. 5,724,405), Oct. 16, 1996.
United States Patent and Trademark Office, Office Action Summary and Detailed Action, U.S. Appl. No. 08/217,518 (U.S. Pat. No. 5,724,405), Jan. 15, 1997.
Applicant, Response After Final (Response to Jan. 15, 1997 Office Action) and Terminal Disclaimer, U.S. Appl. No. 08/217,518 (U.S. Pat. No. 5,724,405), Jul. 15, 1997.
United States Patent and Trademark Office, Notice of Allowability, U.S. Appl. No. 08/217,518 (U.S. Pat. No. 5,724,405), Aug. 19, 1997.
United States Patent and Trademark Office, Office Action Summary and Detailed Action, U.S. Appl. No. 09/783,679 (U.S. Pat. No. 6,594,346), Jun. 5, 2002.
Applicant, Response (to Jun. 5, 2002 Office Action), U.S. Appl. No. 09/783,679 (U.S. Pat. No. 6,594,346), Dec. 4, 2002.
United States Patent and Trademark Office, Notice of Allowance, U.S. Appl. No. 09/783,679 (U.S. Pat. No. 6,594,346), Feb. 19, 2003.
United States Patent and Trademark Office, Office Action Summary and Detailed Action, U.S. Appl. No. 09/789,120 (U.S. Pat. No. 6,567,503), Jun. 17, 2002.
Applicant, Amendment (Response to Jun. 17, 2002 Office Action), U.S. Appl. No. 09/789,120 (U.S. Pat. No. 6,567,503), Oct. 19, 2002.
United States Patent and Trademark Office, Notice of Allowance, U.S. Appl. No. 09/789,120 (U.S. Pat. No. 6,567,503), Dec. 30, 2002.
Applicant, Response to Jan. 20, 2003 Letter, Application No. GB 0225275.7, Jul. 14, 2003 Dodooc United States Patent and Trademark Office, Office Action Summary and Detailed Action, U.S. Appl. No. 09/790,413 (U.S. Pat. No. 6,882,707), Mar. 23, 2004.
Applicant, Response to Restriction Requirement, U.S. Appl. No. 09/790,413 (U.S. Pat. No. 6,882,707), Apr. 9, 2004.
United States Patent and Trademark Office, Office Action Summary and Detailed Action, U.S. Appl. No. 09/790,413 (U.S. Pat. No. 6,882,707), May 7, 2004.
Applicant, Response to May 7, 2004 Office Action, U.S. Appl. No. 09/790,413 (U.S. Pat. No. 6,882,707), Aug. 9, 2004.
United States Patent and Trademark Office, Notice of Allowance, Examiner's Amendment and Interview Summary, U.S. Appl. No. 09/790,413 (U.S. Pat. No. 6,882,707), Dec. 10, 2004.
United States Patent and Trademark Office, Office Action Summary and Detailed Action, U.S. Appl. No. 10/336,950, filed Jun. 2, 2003.
United States Patent and Trademark Office, Office Action Summary and Detailed Action, U.S. Appl. No. 11/391,141 (U.S. Pat. No. 7,881,441), Mar. 9, 2010.
Applicant, First Amendment, U.S. Appl. No. 11/391,141 (U.S. Pat. No. 7,881,441), Jun. 9, 2010.
United States Patent and Trademark Office, Notice of Allowance, U.S. Appl. No. 11/391,141 (U.S. Pat. No. 7,881,441), Sep. 21, 2010.
United States Patent and Trademark Office, Supplemental Notice of Allowability, U.S. Appl. No. 11/391,141 (U.S. Pat. No. 7,881,441), Dec. 7, 2010.
United States Patent and Trademark Office, Office Action Summary and Detailed Action, U.S. Appl. No. 11/361,114 (U.S. Pat. No. 7,555,104), May 21, 2007.
Applicant, Terminal Disclaimer, U.S. Appl. No. 11/361,114 (U.S. Pat. No. 7,555,104), Jul. 23, 2007.
United States Patent and Trademark Office, Notice of Allowance and Examiner's Statement of Reasons for Allowance, U.S. Appl. No. 11/361,114 (U.S. Pat. No. 7,555,104), Sep. 15, 2008.
Applicant, Request for Continued Examination and Submission of Supplemental Information Disclosure Statement, U.S. Appl. No. 11/361,114 (U.S. Pat. No. 7,555,104), Dec. 15, 2008.
United States Patent and Trademark Office, Notice of Allowance, U.S. Appl. No. 11/361,114 (U.S. Pat. No. 7,555,104), Feb. 25, 2009.
United States Patent and Trademark Office, Notice of Allowance and Examiner's Statement of Reasons for Allowance, U.S. Appl. No. 09/876,340 (U.S. Pat. No. 6,504,910), Aug. 13, 2002.
United States Patent and Trademark Office, Office Action Summary and Detailed Action, U.S. Appl. No. 13/486,221, filed Jan. 28, 2015, 8 pages.
United States Patent and Trademark Office, Office Action Summary and Detailed Action, U.S. Appl. No. 14/506,080, filed Feb. 27, 2015, 7 pages.
United States Patent and Trademark Office, Office Action Summary and Detailed Action, U.S. Appl. No. 14/299,531, filed Sep. 19, 2014, 8 pages.
Applicant, Amendment (Response to Sep. 19, 2014, Office Action), U.S. Appl. No. 14/299,531, filed Sep. 24, 2014, 12 pages.
United States Patent and Trademark Office, Office Action Summary and Detailed Action, U.S. Appl. No. 14/299,531, filed Oct. 10, 2014, 6 pages.
Applicant, Response (Response to Oct. 10, 2014, Office Action), U.S. Appl. No. 14/299,531, filed Oct. 17, 2014, 3 pages.
United States Patent and Trademark Office, Office Action Summary and Detailed Action, U.S. Appl. No. 14/299,651, filed Oct. 16, 2014, 5 pages.
Applicant, Response (Response to Oct. 16, 2014, Office Action), U.S. Appl. No. 14/299,651, filed Oct. 17, 2014, 3 pages.
United States Patent and Trademark Office, Office Action Summary and Detailed Action, U.S. Appl. No. 09/938,194 (U.S. Pat. No. 6,603,835), Jul. 5, 2002.
Applicant, Response (to Jul. 5, 2002 Office Action), U.S. Appl. No. 09/938,194 (U.S. Pat. No. 6,603,835), Jan. 6, 2003.

(56) References Cited

OTHER PUBLICATIONS

United States Patent and Trademark Office, Notice of Allowance, U.S. Appl. No. 09/938,194 (U.S. Pat. No. 6,603,835), Mar. 18, 2003.
United States Patent and Trademark Office, Notice of Allowance and Examiner's Amendment, U.S. Appl. No. 09/956,310 (U.S. Pat. No. 6,510,206), Aug. 19, 2002.
Applicant, Applicants' Comments on Examiner's Reason for Allowance (dated Aug. 19, 2002), U.S. Appl. No. 09/956,310 (U.S. Pat. No. 6,510,206), Nov. 19, 2002.
United States Patent and Trademark Office, Office Action Summary and Detailed Action, U.S. Appl. No. 10/436,650 (U.S. Pat. No. 7,164,753), Jul. 1, 2005.
Applicant, Amendment (Response to Jul. 1, 2005 Office Action), U.S. Appl. No. 10/436,650 (U.S. Pat. No. 7,164,753), Sep. 14, 2005.
United States Patent and Trademark Office, Office Action Summary and Detailed Action, U.S. Appl. No. 10/436,650 (U.S. Pat. No. 7,164,753), Nov. 17, 2005.
Applicant, Response (to Nov. 17, 2005 Office Action), U.S. Appl. No. 10/436,650 (U.S. Pat. No. 7,164,753), Jan. 18, 2006.
United States Patent and Trademark Office, Office Action Summary and Detailed Action, U.S. Appl. No. 10/436,650 (U.S. Pat. No. 7,164,753), Apr. 19, 2006.
Applicant, Response (to Apr. 19, 2006 Office Action), U.S. Appl. No. 10/436,650 (U.S. Pat. No. 7,164,753), Jun. 13, 2006.
United States Patent and Trademark Office, Notice of Allowance and Detailed Action, U.S. Appl. No. 10/436,650 (U.S. Pat. No. 7,164,753), Sep. 15, 2006.
Applicant, Response to Apr. 10, 2012 Official Action, Canadian Application No. 2,556,933, Jul. 12, 2012.
United States Patent and Trademark Office, Communication, U.S. Appl. No. 12/686,688, filed Nov. 8, 2012.
United States Patent and Trademark Office, Office Action Summary and Detailed Action, U.S. Appl. No. 15/204,142, Jan. 19, 2017.
United States Patent and Trademark Office, Office Action Summary and Detailed Action, U.S. Appl. No. 08/946,538 (U.S. Pat. No. 6,075,841), Sep. 18, 1998.
Applicant, First Amendment (Response to Sep. 18, 1998 Office Action), U.S. Appl. No. 08/946,538 (U.S. Pat. No. 6,075,841), Jan. 15, 1999.
United States Patent and Trademark Office, Office Action Summary and Detailed Action, U.S. Appl. No. 08/946,538 (U.S. Pat. No. 6,075,841), Mar. 26, 1999.
Applicant, Response to Mar. 26, 1999 Office Action and Terminal Disclaimer, U.S. Appl. No. 08/946,538 (U.S. Pat. No. 6,075,841), Jul. 20, 1999.
United States Patent and Trademark Office, Notice of Allowability and Examiner's Amendment and Statement of Reasons for Allowance, U.S. Appl. No. 08/946,538 (U.S. Pat. No. 6,075,841), Aug. 16, 1999.
United States Patent and Trademark Office, Office Action Summary and Detailed Action, U.S. Appl. No. 09/034,076 (U.S. Pat. No. 6,075,842), Apr. 6, 1999.
Applicant, Response to Apr. 6, 1999 Office Action and Terminal Disclaimer, U.S. Appl. No. 09/034,076 (U.S. Pat. No. 6,075,842), Jul. 21, 1999.
United States Patent and Trademark Office, Notice of Allowability, U.S. Appl. No. 09/034,076 (U.S. Pat. No. 6,075,842), Jan. 7, 2000.
United States Patent and Trademark Office, Notice of Allowability and Examiner's Statement of Reasons for Allowance, U.S. Appl. No. 09/108,790 (U.S. Pat. No. 5,974,116), May 11, 1999.
United States Patent and Trademark Office, Office Action Summary and Detailed Action, U.S. Appl. No. 09/572,819 (U.S. Pat. No. 6,307,921), Oct. 25, 2000.
Applicant, Response (to Oct. 25, 2000 Office Action) and Terminal Disclaimers, U.S. Appl. No. 09/572,819 (U.S. Pat. No. 6,307,921), Apr. 25, 2001.
United States Patent and Trademark Office, Notice of Allowability, U.S. Appl. No. 09/572,819 (U.S. Pat. No. 6,307,921), Jun. 4, 2001.
United States Patent and Trademark Office, Office Action Summary and Detailed Action, U.S. Appl. No. 08/481,856 (U.S. Pat. No. 5,809,425), Aug. 28, 1996.
Applicant, Amendment (Response to Aug. 18, 1996 Office Action), U.S. Appl. No. 08/481,856 (U.S. Pat. No. 5,809,425), Feb. 28, 1997.
United States Patent and Trademark Office, Office Action Summary and Detailed Action, U.S. Appl. No. 08/481,856 (U.S. Pat. No. 5,809,425), May 28, 1997.
Applicant, Amendment (Response to May 28, 1997 Office Action), U.S. Appl. No. 08/481,856 (U.S. Pat. No. 5,809,425), Nov. 26, 1997.
United States Patent and Trademark Office, Notice of Allowance and Statement of Reasons for Allowance, U.S. Appl. No. 08/481,856 (U.S. Pat. No. 5,809,425), Dec. 23, 1997.
United States Patent and Trademark Office, Office Action Summary and Detailed Action, U.S. Appl. No. 08/367,563, filed Aug. 2, 1996.
United States Patent and Trademark Office, Office Action Summary and Detailed Action, U.S. Appl. No. 09/153,771, filed Aug. 3, 1999.
Applicant, First Amendment (in Response to United States Patent and Trademark Office Nov. 8, 2012 Office Action), U.S. Appl. No. 12/686,688, filed Feb. 7, 2013.

* cited by examiner

SEMIAUTOMATED RELAY METHOD AND APPARATUS

CROSS-REFERENCE TO RELATED APPLICATIONS

This application is a continuation-in-part of U.S. patent application Ser. No. 15/982,239 which was filed on May 17, 2018, and which is titled "SEMIAUTOMATED RELAY METHOD AND APPARATUS" which is a continuation in part of U.S. patent application Ser. No. 15/729,069 which was filed on Oct. 10, 2017, and which is titled "SEMIAUTOMATED RELAY METHOD AND APPARATUS" which is a continuation in part of U.S. patent application Ser. No. 15/171,720, filed on Jun. 2, 2017, and titled "SEMIAUTOMATED RELAY METHOD AND APPARATUS", which is a continuation-in-part of U.S. patent application Ser. No. 14/953,631, filed on Nov. 30, 2015, and titled "SEMIAUTOMATED RELAY METHOD AND APPARATUS", which is a continuation-in-part of U.S. patent application Ser. No. 14/632,257, filed on Feb. 26, 2015, and titled "SEMIAUTOMATED RELAY METHOD AND APPARATUS", which claims priority to U.S. provisional patent application Ser. No. 61/946,072 filed on Feb. 28, 2014, and titled "SEMIAUTOMATED RELAY METHOD AND APPARATUS", and claims priority to each of the above applications, each of which is incorporated herein in its entirety by reference.

STATEMENT REGARDING FEDERALLY SPONSORED RESEARCH OR DEVELOPMENT

Not applicable.

BACKGROUND OF THE DISCLOSURE

The present invention relates to relay systems for providing voice-to-text captioning for hearing impaired users and more specifically to a relay system that uses automated voice-to-text captioning software to transcribe voice-to-text.

Many people have at least some degree of hearing loss. For instance, in the United states, about 3 out of every 1000 people are functionally deaf and about 17 percent (36 million) of American adults report some degree of hearing loss which typically gets worse as people age. Many people with hearing loss have developed ways to cope with the ways their loss effects their ability to communicate. For instance, many deaf people have learned to use their sight to compensate for hearing loss by either communicating via sign language or by reading another person's lips as they speak.

When it comes to remotely communicating using a telephone, unfortunately, there is no way for a hearing impaired person (e.g., an assisted user (AU)) to use sight to compensate for hearing loss as conventional telephones do not enable an AU to see a person on the other end of the line (e.g., no lip reading or sign viewing). For persons with only partial hearing impairment, some simply turn up the volume on their telephones to try to compensate for their loss and can make do in most cases. For others with more severe hearing loss conventional telephones cannot compensate for their loss and telephone communication is a poor option.

An industry has evolved for providing communication services to AUs whereby voice communications from a person linked to an AU's communication device are transcribed into text and displayed on an electronic display screen for the AU to read during a communication session.

In many cases the AU's device will also broadcast the linked person's voice substantially simultaneously as the text is displayed so that an AU that has some ability to hear can use their hearing sense to discern most phrases and can refer to the text when some part of a communication is not understandable from what was heard.

U.S. Pat. No. 6,603,835 (hereinafter "the '835 patent) titled "System For Text Assisted Telephony" teaches several different types of relay systems for providing text captioning services to AUs. One captioning service type is referred to as a single line system where a relay is linked between an AU's device and a telephone used by the person communicating with the AU. Hereinafter, unless indicated otherwise the other person communicating with the AU will be referred to as a hearing user (HU) even though the AU may in fact be communicating with another AU. In single line systems, one line links an HU device to the relay and one line (e.g., the single line) links the relay to the AU device. Voice from the HU is presented to a relay call assistant (CA) who transcribes the voice-to-text and then the text is transmitted to the AU device to be displayed. The HU's voice is also, in at least some cases, carried or passed through the relay to the AU device to be broadcast to the AU.

The other captioning service type described in the '835 patent is a two line system. In a two line system a HU's telephone is directly linked to an AU's device via a first line for voice communications between the AU and the HU. When captioning is required, the AU can select a captioning control button on the AU device to link to the relay and provide the HU's voice to the relay on a second line. Again, a relay CA listens to the HU voice message and transcribes the voice message into text which is transmitted back to the AU device on the second line to be displayed to the AU. One of the primary advantages of the two line system over one line systems is that the AU can add captioning to an on-going call. This is important as many AUs are only partially impaired and may only want captioning when absolutely necessary. The option to not have captioning is also important in cases where an AU device can be used as a normal telephone and where non-AUs (e.g., a spouse living with an AU that has good hearing capability) that do not need captioning may also use the AU device.

With any relay system, the primary factors for determining the value of the system are accuracy, speed and cost to provide the service. Regarding accuracy, text should accurately represent spoken messages from HUs so that an AU reading the text has an accurate understanding of the meaning of the message. Erroneous words provide inaccurate messages and also can cause confusion for an AU reading transcribed text.

Regarding speed, ideally text is presented to an AU simultaneously with the voice message corresponding to the text so that an AU sees text associated with a message as the message is heard. In this regard, text that trails a voice message by several seconds can cause confusion. Current systems present captioned text relatively quickly (e.g. 1-3 seconds after the voice message is broadcast) most of the time. However, at times a CA can fall behind when captioning so that longer delays (e.g., 10-15 seconds) occur.

Regarding cost, existing systems require a unique and highly trained CA for each communication session. In known cases CAs need to be able to speak clearly and need to be able to type quickly and accurately. CA jobs are also relatively high pressure jobs and therefore turnover is relatively high when compared jobs in many other industries which further increases the costs associated with operating a relay.

One innovation that has increased captioning speed appreciably and that has reduced the costs associated with captioning at least somewhat has been the use of voice-to-text transcription software by relay CAs. In this regard, early relay systems required CAs to type all of the text presented via an AU device. To present text as quickly as possible after broadcast of an associated voice message, highly skilled typists were required. During normal conversations people routinely speak at a rate between 110 and 150 words per minute. During a conversation between an AU and an HU, typically only about half the words voiced have to be transcribed (e.g., the AU typically communicates to the HU during half of a session). Because of various inefficiencies this means that to keep up with transcribing the HU's portion of a typical conversation a CA has to be able to type at around 100 words per minute or more. To this end, most professional typists type at around 50 to 80 words per minute and therefore can keep up with a normal conversation for at least some time. Professional typists are relatively expensive. In addition, despite being able to keep up with a conversation most of the time, at other times (e.g., during long conversations or during particularly high speed conversations) even professional typists fall behind transcribing real time text and more substantial delays can occur.

In relay systems that use voice-to-text transcription software trained to a CA's voice, a CA listens to an HU's voice and revoices the HU's voice message to a computer running the trained software. The software, being trained to the CA's voice, transcribes the re-voiced message much more quickly than a typist can type text and with only minimal errors. In many respects revoicing techniques for generating text are easier and much faster to learn than high speed typing and therefore training costs and the general costs associated with CA's are reduced appreciably. In addition, because revoicing is much faster than typing in most cases, voice-to-text transcription can be expedited appreciably using revoicing techniques.

At least some prior systems have contemplated further reducing costs associated with relay services by replacing CA's with computers running voice-to-text software to automatically convert HU voice messages to text. In the past there have been several problems with this solution which have resulted in no one implementing a workable system. First, most voice messages (e.g., an HU's voice message) delivered over most telephone lines to a relay are not suitable for direct voice-to-text transcription software. In this regard, automated transcription software on the market has been tuned to work well with a voice signal that includes a much larger spectrum of frequencies than the range used in typical phone communications. The frequency range of voice signals on phone lines is typically between 300 and 3000 Hz. Thus, automated transcription software does not work well with voice signals delivered over a telephone line and large numbers of errors occur. Accuracy further suffers where noise exists on a telephone line which is a common occurrence.

Second, many automated transcription software programs have to be trained to the voice of a speaker to be accurate. When a new HU calls an AU's device, there is no way for a relay to have previously trained software to the HU voice and therefore the software cannot accurately generate text using the HU voice messages.

Third, many automated transcription software packages use context in order to generate text from a voice message. To this end, the words around each word in a voice message can be used by software as context for determining which word has been uttered. To use words around a first word to identify the first word, the words around the first word have to be obtained. For this reason, many automated transcription systems wait to present transcribed text until after subsequent words in a voice message have been transcribed so that context can be used to correct prior words before presentation. Systems that hold off on presenting text to correct using subsequent context cause delay in text presentation which is inconsistent with the relay system need for real time or close to real time text delivery.

BRIEF SUMMARY OF THE DISCLOSURE

It has been recognized that a hybrid semi-automated system can be provided where, when acceptable accuracy can be achieved using automated transcription software, the system can automatically use the transcription software to transcribe HU voice messages to text and when accuracy is unacceptable, the system can patch in a human CA to transcribe voice messages to text. Here, it is believed that the number of CAs required at a large relay facility may be reduced appreciably (e.g., 30% or more) where software can accomplish a large portion of transcription to text. In this regard, not only is the automated transcription software getting better over time, in at least some cases the software may train to an HU's voice and the vagaries associated with voice messages received over a phone line (e.g., the limited 300 to 3000 Hz range) during a first portion of a call so that during a later portion of the call accuracy is particularly good. Training may occur while and in parallel with a CA manually (e.g., via typing, revoicing, etc.) transcribing voice-to-text and, once accuracy is at an acceptable threshold level, the system may automatically delink from the CA and use the text generated by the software to drive the AU display device.

It has been recognized that in a relay system there are at least two processors that may be capable of performing automated voice recognition processes and therefore that can handle the automated voice recognition part of a triage process involving a CA. To this end, in most cases either a relay processor or an AU's device processor may be able to perform the automated transcription portion of a hybrid process. For instance, in some cases an AU's device will perform automated transcription in parallel with a relay assistant generating CA generated text where the relay and AU's device cooperate to provide text and assess when the CA should be cut out of a call with the automated text replacing the CA generated text.

In other cases where a HU's communication device is a computer or includes a processor capable of transcribing voice messages to text, a HU's device may generated automated text in parallel with a CA generating text and the HU's device and the relay may cooperate to provide text and determine when the CA should be cut out of the call.

Regardless of which device is performing automated captioning, the CA generated text may be used to assess accuracy of the automated text for the purpose of determining when the CA should be cut out of the call. In addition, regardless of which device is performing automated text captioning, the CA generated text may be used to train the automated voice-to-text software or engine on the fly to expedite the process of increasing accuracy until the CA can be cut out of the call.

It has also been recognized that there are times when a hearing impaired person is listening to a HU's voice without an AU's device providing simultaneous text when the AU is confused and would like transcription of recent voice messages of the HU. For instance, where an AU uses an AU's device to carry on a non-captioned call and the AU has difficulty understanding a voice message so that the AU initiates a captioning service to obtain text for subsequent voice messages. Here, while text is provided for subsequent messages, the AU still cannot obtain an understanding of the voice message that prompted initiation of captioning. As another instance, where CA generated text lags appreciably behind a current HU's voice message, an AU may request that the captioning catch up to the current message.

To provide captioning of recent voice messages in these cases, in at least some embodiments of this disclosure an AU's device stores an HU's voice messages and, when captioning is initiated or a catch up request is received, the recorded voice messages are used to either automatically generate text or to have a CA generate text corresponding to the recorded voice messages.

In at least some cases when automated software is trained to a HU's voice, a voice model for the HU that can be used subsequently to tune automated software to transcribe the HU's voice may be stored along with a voice profile for the HU that can be used to distinguish the HU's voice from other HUs. Thereafter, when the HU calls an AU's device again, the profile can be used to identify the HU and the voice model can be used to tune the software so that the automated software can immediately start generating highly accurate or at least relatively more accurate text corresponding to the HU's voice messages.

A relay for captioning a hearing user's (HU's) voice signal during a phone call between an HU and a hearing assisted user (AU), the HU using an HU device and the AU using an AU device where the HU voice signal is transmitted from the HU device to the AU device, the relay comprising a display screen, a processor linked to the display and programmed to perform the steps of receiving the HU voice signal from the AU device, transmitting the HU voice signal to a remote automatic speech recognition (ASR) server running ASR software that converts the HU voice signal to ASR generated text, the remote ASR server located at a remote location from the relay, receiving the ASR generated text from the ASR server, present the ASR generated text for viewing by a call assistant (CA) via the display and transmitting the ASR generated text to the AU device.

In at least some embodiments the relay further includes an interface that enables a CA to make changes to the ASR generated text presented on the display. In some cases the processor is further programmed to transmit CA corrections made to the ASR generated text to the AU device with instructions to modify the ASR generated text previously sent to the AU device. In some cases the relay separates the HU voice signal into voice signal slices, the step of transmitting the HU voice signal to the ASR server includes independently transmitting the voice signal slices to the remote ASR server for captioning and wherein the step of receiving the ASR generated text from the relay includes receiving separate ASR generated text segments for each of the slices and cobbling the separate segments together to form a stream of ASR generated text.

In some cases at least some of the voice signal slices overlap. In some cases at least some of the voice signal slices are relatively short and some of the voice signal slices are relatively long and wherein the short voice signal slices are consecutive and do not overlap and wherein at least some relatively long voice signal slices overlap at least first and second of the relatively short voice signal slices. In some cases at least some of the ASR generated text associated with overlapping voice signal slices is inconsistent, the relay applying a rule set to identify which inconsistent ASR generated text to use in the stream of ASR generated text.

In some cases the ASR server generates ASR error corrections for the ASR generated text, the relay further programmed to perform the steps of receiving ASR error corrections, using the error corrections to automatically correct at least some of the errors in the ASR generated text on the display screen and transmitting the ASR error corrections to the AU device. In at least some embodiments the relay further includes an interface that enables a CA to make changes to the ASR generated text presented on the display, the processor further programmed to transmit CA corrections made to the ASR generated text to the AU device with instructions to modify the ASR generated text previously sent to the AU device. In some cases, after a CA makes a change to ASR generated text, the text prior thereto becomes firm so that no ASR error corrections are made to the text subsequent thereto.

In some cases the relay further includes a speaker and wherein the processor broadcasts the HU voice signal to the CA via the speaker as the ASR generated text is presented on the display screen. In some cases the processor aligns broadcast of the HU voice signal with ASR generated text presented on the display screen. In some cases the processor presents the ASR generated text on the on the display screen immediately upon reception and transmits the ASR generated text immediately upon reception and broadcasts the HU voice signal under control of the CA using an interface. In some cases, as word in the HU voice signal is broadcast to the CA, text corresponding to the broadcast word in on the display screen is visually distinguished from other text on the display screen.

Other embodiment include a relay for captioning a hearing user's (HU's) voice signal during a phone call between an HU and a hearing assisted user (AU), the HU using an HU device and the AU using an AU device where the HU voice signal is transmitted from the HU device to the AU device, the relay comprising a display screen, an interface device, a processor linked to the display screen and the interface device, the processor programmed to perform the steps of receiving the HU voice signal from the AU device, separating the HU voice signal into voice signal slices, separately transmitting the HU voice signal slices to a remote automatic speech recognition (ASR) server that is located at a remote location from the relay, receiving separate ASR generated text segments for each of the slices and cobbling the separate segments together to form a stream of ASR generated text, present the stream of ASR generated text as it is received from the ASR server for viewing by a call assistant (CA) via the display and transmitting the stream of ASR generated text to the AU device as the stream is received from the relay.

In some cases ASR error corrections to the ASR generated text are received from the ASR server and at least some of the ASR error corrections are used to correct the text on the display, the relay receives CA error corrections to the text on the display and uses those corrections to correct text on the display. In some cases, once a CA corrects an error in the text on the display, ASR error corrections for text prior to the CA corrected text on the display are not used to make error corrections on the display. In some cases all ASR generated text presented on the display is transmitted to the AU device and all ASR error corrections and CA text corrections that are presented on the display are transmitted as correction text to the AU device.

Some embodiment include an caption device for use by a hard of hearing assisted user (AU) to assist the AU during voice communications with a hearing user (HU) using an HU device, the caption device comprising a display screen, a memory, at least one communication link element for linking to a communication network, a speaker, a processor linked to each of the display screen, the memory, the speaker and the communication link, the processor programmed to perform the steps of receiving an HU voice signal from the HU device during a call, broadcasting the HU voice signal to the AU via the speaker, storing at least a most recent portion of the HU voice signal in the memory, receiving a command from the AU to start a captioning session, upon receiving the command, obtaining a text caption corresponding to the stored HU voice signal and presenting the text caption to the AU via the display.

In some cases the step of obtaining a text caption includes initiating a process whereby an automated speech recognition (ASR) program converts the stored HU voice signal to text. In some cases the processor runs the ASR program. In some cases the step of initiating the process includes establishing a link to a remote relay, and transmitting the stored HU voice signal to the relay, the step of obtaining further including receiving the text caption from the relay. In at least some embodiments the relay further includes, subsequent to receiving the command, obtaining text captions for additional HU voice signals received during the ongoing call. In some cases the step of obtaining text caption of the stored HU voice signal includes initiating a process whereby the HU voice signal is converted to text via an automatic speech recognition (ASR) engine and wherein the step of obtaining text captions form additional HU voice signal received during the ongoing call further includes transmitting the additional HU voice signal to a relay and receiving text captions back from the relay.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the invention can be employed. Other aspects, advantages and novel features of the disclosure will become apparent from the following detailed description of the invention when considered in conjunction with the drawings.

Figure 1:
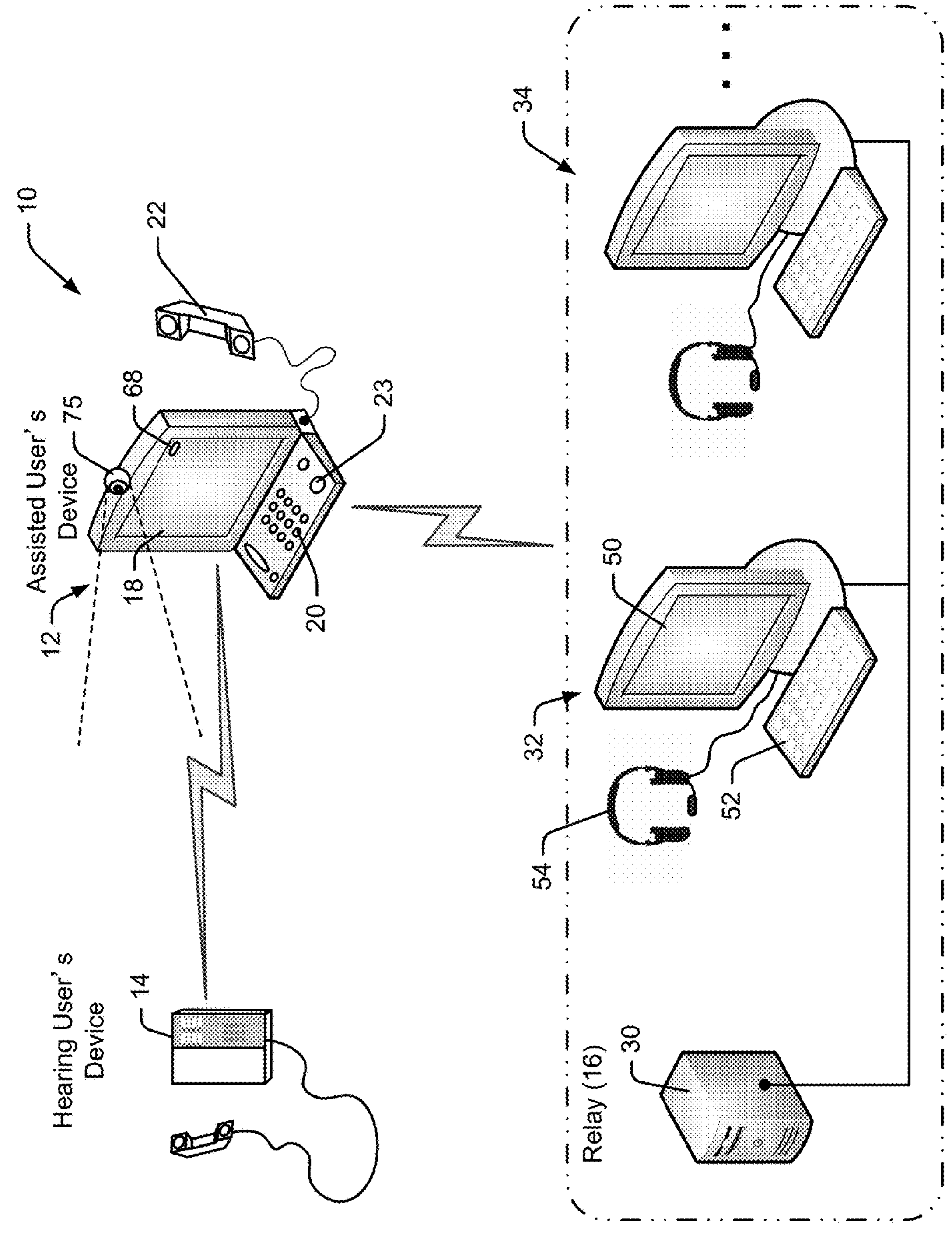
FIG. 1 is a schematic showing various components of a communication system including a relay that may be used to perform various processes and methods according to at least some aspects of the present invention.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, solid state drives and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Unless indicates otherwise, the phrases "assisted user", "hearing user" and "call assistant" will be represented by the acronyms "AU", "HU" and "CA", respectively. The acronym "ASR" will be used to abbreviate the phrase "automatic speech recognition". Unless indicated otherwise, the phrase "full CA mode" will be used to refer to a call captioning system instantaneously generating captions for at least a portion of a communication session wherein a voice signal is listened to by a live CA (e.g., a person) who transcribes the voice message to text which the CA then corrects where the CA generated text is presented to at least one of the communicants to the communication session and the phrase "ASR-CA backed up mode" will be used to refer to a call captioning system instantaneously generating captions for at least a portion of a communication session where a voice signal is fed to an ASR software engine (e.g., a computer running software) that generates at least initial captions for the received voice signal and where a CA corrects the original captions where the ASR generated captions and in at least some cases the CA generated corrections are presented to at least one of the communicants to the communication session.

System Architecture

Referring now to the drawings wherein like reference numerals correspond to similar elements throughout the several views and, more specifically, referring to FIG. 1, the present disclosure will be described in the context of an exemplary communication system 10 including an AU's communication device 12, an HU's telephone or other type communication device 14, and a relay 16. The AU's device 12 is linked to the HU's device 14 via any network connection capable of facilitating a voice call between the AU and the HU. For instance, the link may be a conventional telephone line, a network connection such as an internet connection or other network connection, a wireless connection, etc. AU device 12 includes a keyboard 20, a display screen 18 and a handset 22. Keyboard 20 can be used to dial any telephone number to initiate a call and, in at least some cases, includes other keys or may be controlled to present virtual buttons via screen 18 for controlling various functions that will be described in greater detail below. Other identifiers such as IP addresses or the like may also be used in at least some cases to initiate a call. Screen 18 includes a flat panel display screen for displaying, among other things, text transcribed from a voice message or signal generated using HU's device 14, control icons or buttons, caption feedback signals, etc. Handset 22 includes a speaker for broadcasting a HU's voice messages to an AU and a microphone for receiving a voice message from an AU for delivery to the HU's device 14. AU device 12 may also include a second loud speaker so that device 12 can operate as a speaker phone type device. Although not shown, device 12 further includes a processor and a memory for storing software run by the processor to perform various functions that are consistent with at least some aspects of the present disclosure. Device 12 is also linked or is linkable to relay 16 via any communication network including a phone network, a wireless network, the internet or some other similar network, etc. Device 12 may further include a Bluetooth or other type of transmitter for linking to an AU's hear aide or some other speaker type device.

HU's device 14, in at least some embodiments, includes a communication device (e.g., a telephone) including a keyboard for dialing phone numbers and a handset including a speaker and a microphone for communication with other devices. In other embodiments device 14 may include a computer, a smart phone, a smart tablet, etc., that can facilitate audio communications with other devices. Devices 12 and 14 may use any of several different communication protocols including analog or digital protocols, a VOIP protocol or others.

Referring still to FIG. 1, relay 16 includes, among other things, a relay server 30 and a plurality of CA work stations 32, 34, etc. Each of the CA work stations 32, 34, etc., is similar and operates in a similar fashion and therefore only station 32 is described here in any detail. Station 32 includes a display screen 50, a keyboard 52 and a headphone/microphone headset 54. Screen 50 may be any type of electronic display screen for presenting information including text transcribed from a HU's voice signal or message. In most cases screen 50 will present a graphical user interface with on screen tools for editing text that appears on the screen. One text editing system is described in U.S. Pat. No. 7,164,753 which issued on Jan. 16, 2007 which is titled "Real Time Transcription Correction System" and which is incorporated herein in its entirety.

Keyboard 52 is a standard text entry QUERTY type keyboard and can be used to type text or to correct text presented on displays screen 50. Headset 54 includes a speaker in an ear piece and a microphone in a mouth piece and is worn by a CA. The headset enables a CA to listen to the voice of a HU and the microphone enables the CA to speak voice messages into the relay system such as, for instance, revoiced messages from a HU to be transcribed into text. For instance, typically during a call between a HU on device 14 and an AU on device 12, the HU's voice messages are presented to a CA via headset 54 and the CA revoices the messages into the relay system using headset 54. Software trained to the voice of the CA transcribes the assistant's voice messages into text which is presented on display screen 50. The CA then uses keyboard 52 and/or headset 54 to make corrections to the text on display 50. The corrected text is then transmitted to the AU's device 12 for display on screen 18. In the alternative, the text may be transmitted prior to correction to the AU's device 12 for display and corrections may be subsequently transmitted to correct the displayed text via in-line corrections where errors are replaced by corrected text.

Although not shown, CA work station 32 may also include a foot pedal or other device for controlling the speed with which voice messages are played via headset 54 so that the CA can slow or even stop play of the messages while the assistant either catches up on transcription or correction of text.

Figure 2:
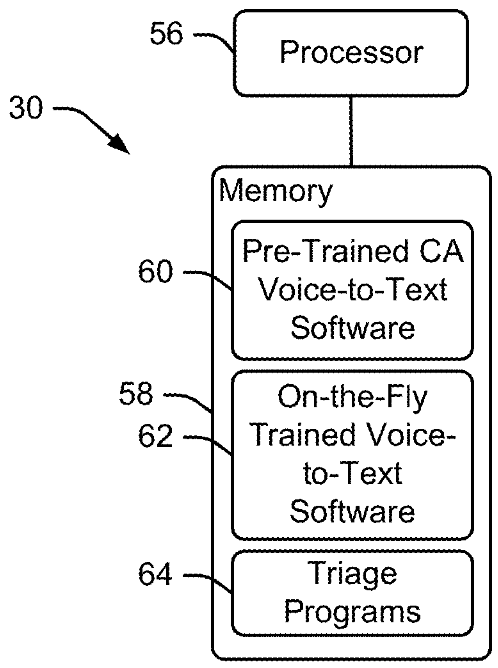
FIG. 2 is a schematic of the relay server shown in FIG. 1.

Referring still to FIG. 1 and also to FIG. 2, server 30 is a computer system that includes, among other components, at least a first processor 56 linked to a memory or database 58 where software run by processor 56 to facilitate various functions that are consistent with at least some aspects of the present disclosure is stored. The software stored in memory 58 includes pre-trained CA voice-to-text transcription software 60 for each CA where CA specific software is trained to the voice of an associated CA thereby increasing the accuracy of transcription activities. For instance, Naturally Speaking continuous speech recognition software by Dragon, Inc. may be pre-trained to the voice of a specific CA and then used to transcribe voice messages voiced by the CA into text.

In addition to the CA trained software, a voice-to-text software program 62 that is not pre-trained to a CA's voice and instead that trains to any voice on the fly as voice messages are received is stored in memory 58. Again, Naturally Speaking software that can train on the fly may be used for this purpose. Hereinafter, the automatic speech recognition software or system that trains to the HU voices will be referred to generally as an ASR engine at times.

Moreover, software 64 that automatically performs one of several different types of triage processes to generate text from voice messages accurately, quickly and in a relatively cost effective manner is stored in memory 58. The triage programs are described in detail hereafter.

One issue with existing relay systems is that each call is relatively expensive to facilitate. To this end, in order to meet required accuracy standards for text caption calls, each call requires a dedicated CA. While automated voice-to-text systems that would not require a CA have been contemplated, none has been successfully implemented because of accuracy and speed problems.

Basic Semi-Automated System

One aspect of the present disclosure is related to a system that is semi-automated wherein a CA is used when accuracy of an automated system is not at required levels and the assistant is cut out of a call automatically or manually when accuracy of the automated system meets or exceeds accuracy standards or at the preference of an AU. For instance, in at least some cases a CA will be assigned to every new call linked to a relay and the CA will transcribe voice-to-text as in an existing system. Here, however, the difference will be that, during the call, the voice of a HU will also be processed by server 30 to automatically transcribe the HU's voice messages to text (e.g., into "automated text"). Server 30 compares corrected text generated by the CA to the automated text to identify errors in the automated text. Server 30 uses identified errors to train the automated voice-to-text software to the voice of the HU. During the beginning of the call the software trains to the HU's voice and accuracy increases over time as the software trains. At some point the accuracy increases until required accuracy standards are met. Once accuracy standards are met, server 30 is programmed to automatically cut out the CA and start transmitting the automated text to the AU's device 12.

In at least some cases, when a CA is cut out of a call, the system may provide a "Help" button, an "Assist" button or "Assistance Request" type button (see 68 in FIG. 1) to an AU so that, if the AU recognizes that the automated text has too many errors for some reason, the AU can request a link to a CA to increase transcription accuracy (e.g., generate an assistance request). In some cases the help button may be a persistent mechanical button on the AU's device 12. In the alternative, the help button may be a virtual on screen icon (e.g., see 68 in FIG. 1) and screen 18 may be a touch sensitive screen so that contact with the virtual button can be sensed. Where the help button is virtual, the button may only be presented after the system switches from providing CA generated text to an AU's device to providing automated text to the AU's device to avoid confusion (e.g., avoid a case where an AU is already receiving CA generated text but thinks, because of a help button, that even better accuracy can be achieved in some fashion). Thus, while CA generated text is displayed on an AU's device 12, no "help" button is presented and after automated text is presented, the "help" button is presented. After the help button is selected and a CA is re-linked to the call, the help button is again removed from the AU's device display 18 to avoid confusion.

Figure 3:
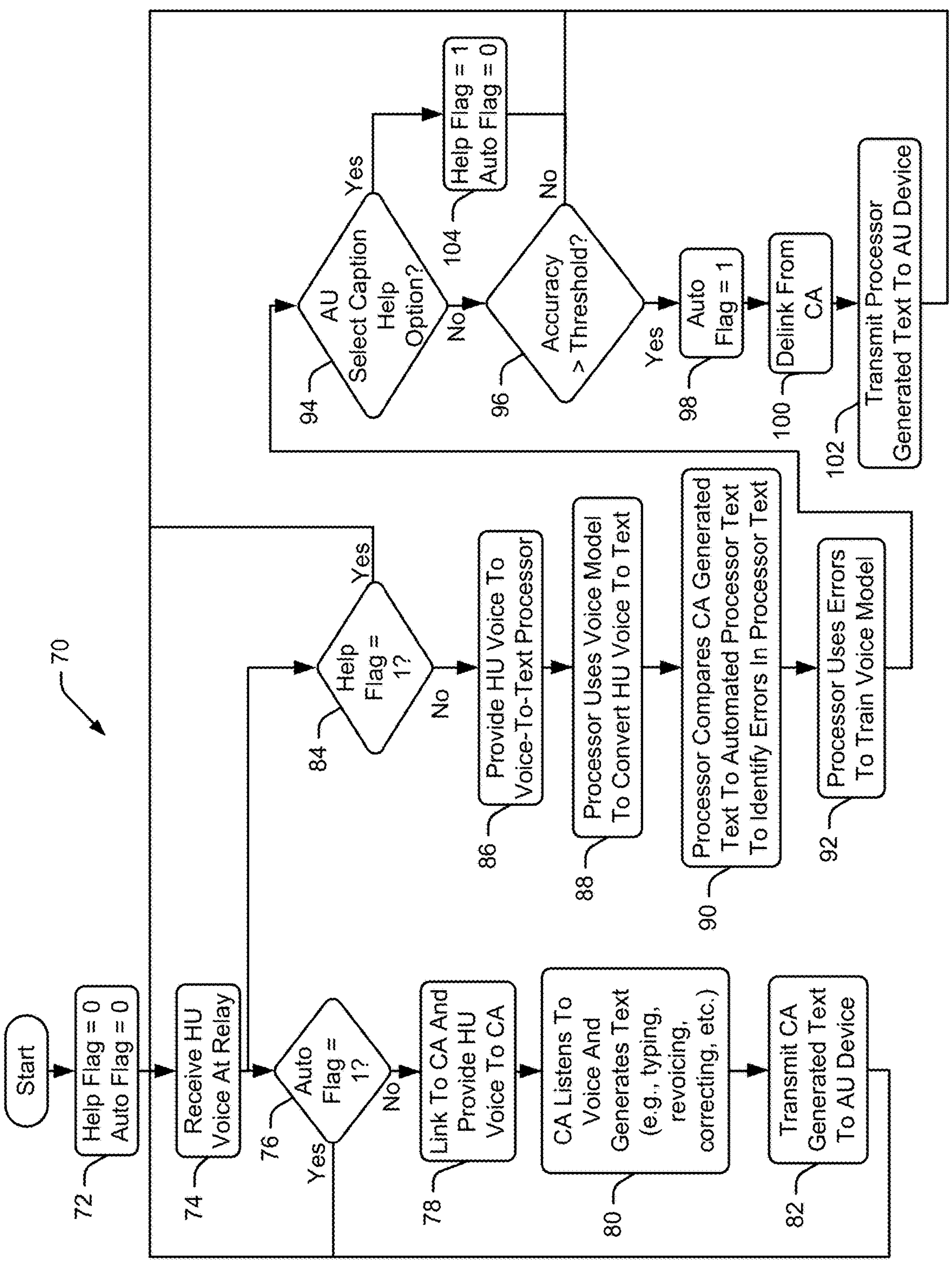
FIG. 3 is a flow chart showing a process whereby an automated voice-to-text engine is used to generate automated text in parallel with a CA generating text where the automated text is used instead of CA generated text to provide captioning an AU's device once an accuracy threshold has been exceeded.

Referring now to FIGS. 2 and 3, a method or process 70 is illustrated that may be performed by server 30 to cut out a CA when automated text reaches an accuracy level that meets a standard threshold level. Referring also to FIG. 1, at block 72, help and auto flags are each set to a zero value. The help flag indicates that an AU has selected a help or assist button via the AU's device 12 because of a perception that too many errors are occurring in transcribed text. The auto flag indicates that automated text accuracy has exceeded a standard threshold requirement. Zero values indicate that the help button has not been selected and that the standard requirement has yet to be met and one values indicate that the button has been selected and that the standard requirement has been met.

Referring still to FIGS. 1 and 3, at block 74, during a phone call between a HU using device 14 and an AU using device 12, the HU's voice messages are transmitted to server 30 at relay 16. Upon receiving the HU's voice messages, server 30 checks the auto and help flags at blocks 76 and 84, respectively. At least initially the auto flag will be set to zero at block 76 meaning that automated text has not reached the accuracy standard requirement and therefore control passes down to block 78 where the HU's voice messages are provided to a CA. At block 80, the CA listens to the HU's voice messages and generates text corresponding thereto by either typing the messages, revoicing the messages to voice-to-text transcription software trained to the CA's voice, or a combination of both. Text generated is presented on screen 50 and the CA makes corrections to the text using keyboard 52 and/or headset 54 at block 80. At block 82 the CA generated text is transmitted to AU device 12 to be displayed for the AU on screen 18.

Referring again to FIGS. 1 and 3, at block 84, at least initially the help flag will be set to zero indicating that the AU has not requested additional captioning assistance. In fact, at least initially the "help" button 68 may not be presented to an AU as CA generated text is initially presented. Where the help flag is zero at block 84, control passes to block 86 where the HU's voice messages are fed to voice-to-text software run by server 30 that has not been previously trained to any particular voice. At block 88 the software automatically converts the HU's voice-to-text generating automated text. At block 90, server 30 compares the CA generated text to the automated text to identify errors in the automated text. At block 92, server 30 uses the errors to train the voice-to-text software for the HU's voice. In this regard, for instance, where an error is identified, server 30 modifies the software so that the next time the utterance that resulted in the error occurs, the software will generate the word or words that the CA generated for the utterance. Other ways of altering or training the voice-to-text software are well known in the art and any way of training the software may be used at block 92.

After block 92 control passes to block 94 where server 30 monitors for a selection of the "help" button 68 by the AU. If the help button has not been selected, control passes to block 96 where server 30 compares the accuracy of the automated text to a threshold standard accuracy requirement. For instance, the standard requirement may require that accuracy be great than 96% measured over at least a most recent forty-five second period or a most recent 100 words uttered by a HU, whichever is longer. Where accuracy is below the threshold requirement, control passes back up to block 74 where the process described above continues. At block 96, once the accuracy is greater than the threshold requirement, control passes to block 98 where the auto flag is set to one indicating that the system should start using the automated text and delink the CA from the call to free up the assistant to handle a different call. A virtual "help" button may also be presented via the AU's display 18 at this time. Next, at block 100, the CA is delinked from the call and at block 102 the processor generated automated text is transmitted to the AU device to be presented on display screen 18.

Referring again to block 74, the HU's voice is continually received during a call and at block 76, once the auto flag has been set to one, the lower portion of the left hand loop including blocks 78, 80 and 82 is cut out of the process as control loops back up to block 74.

Referring again to block 94, if, during an automated portion of a call when automated text is being presented to the AU, the AU decides that there are too many errors in the transcription presented via display 18 and the AU selects the "help" button 68 (see again FIG. 1), control passes to block 104 where the help flag is set to one indicating that the AU has requested the assistance of a CA and the auto flag is reset to zero indicating that CA generated text will be used to drive the AU's display 18 instead of the automated text. Thereafter control passes back up to block 74. Again, at block 76, with the auto flag set to zero the next time through decision block 76, control passes back down to block 78 where the call is again linked to a CA for transcription as described above. In addition, the next time through block 84, because the help flag is set to one, control passes back up to block 74 and the automated text loop including blocks 86 through 104 is effectively cut out of the rest of the call.

In at least some embodiments, there will be a short delay (e.g., 5 to 10 seconds in most cases) between setting the flags at block 104 and stopping use of the automated text so that a new CA can be linked up to the call and start generating CA generated text prior to halting the automated text. In these cases, until the CA is linked and generating text for at least a few seconds (e.g., 3 seconds), the automated text will still be used to drive the AU's display 18. The delay may either be a pre-defined delay or may have a case specific duration that is determined by server 30 monitoring CA generated text and switching over to the CA generated text once the CA is up to speed.

In some embodiments, prior to delinking a CA from a call at block 100, server 30 may store a CA identifier along with a call identifier for the call. Thereafter, if an AU requests help at block 94, server 30 may be programmed to identify if the CA previously associated with the call is available (e.g. not handling another call) and, if so, may re-link to the CA at block 78. In this manner, if possible, a CA that has at least some context for the call can be linked up to restart transcription services.

In some embodiments it is contemplated that after an AU has selected a help button to receive call assistance, the call will be completed with a CA on the line. In other cases it is contemplated that server 30 may, when a CA is re-linked to a call, start a second triage process to attempt to delink the CA a second time if a threshold accuracy level is again achieved. For instance, in some cases, midstream during a call, a second HU may start communicating with the AU via the HU's device. For instance, a child may yield the HU's device 14 to a grandchild that has a different voice profile causing the AU to request help from a CA because of perceived text errors. Here, after the hand back to the CA, server 30 may start training on the grandchild's voice and may eventually achieve the threshold level required. Once the threshold again occurs, the CA may be delinked a second time so that automated text is again fed to the AU's device.

As another example text errors in automated text may be caused by temporary noise in one or more of the lines carrying the HU's voice messages to relay 16. Here, once the noise clears up, automated text may again be a suitable option. Thus, here, after an AU requests CA help, the triage process may again commence and if the threshold accuracy level is again exceeded, the CA may be delinked and the automated text may again be used to drive the AU's device 12. While the threshold accuracy level may be the same each time through the triage process, in at least some embodiments the accuracy level may be changed each time through the process. For instance, the first time through the triage process the accuracy threshold may be 96%. The second time through the triage process the accuracy threshold may be raised to 98%.

In at least some embodiments, when the automated text accuracy exceeds the standard accuracy threshold, there may be a short transition time during which a CA on a call observes automated text while listening to a HU's voice message to manually confirm that the handover from CA generated text to automated text is smooth. During this short transition time, for instance, the CA may watch the automated text on her workstation screen 50 and may correct any errors that occur during the transition. In at least some cases, if the CA perceives that the handoff does not work or the quality of the automated text is poor for some reason, the CA may opt to retake control of the transcription process.

Figure 4:
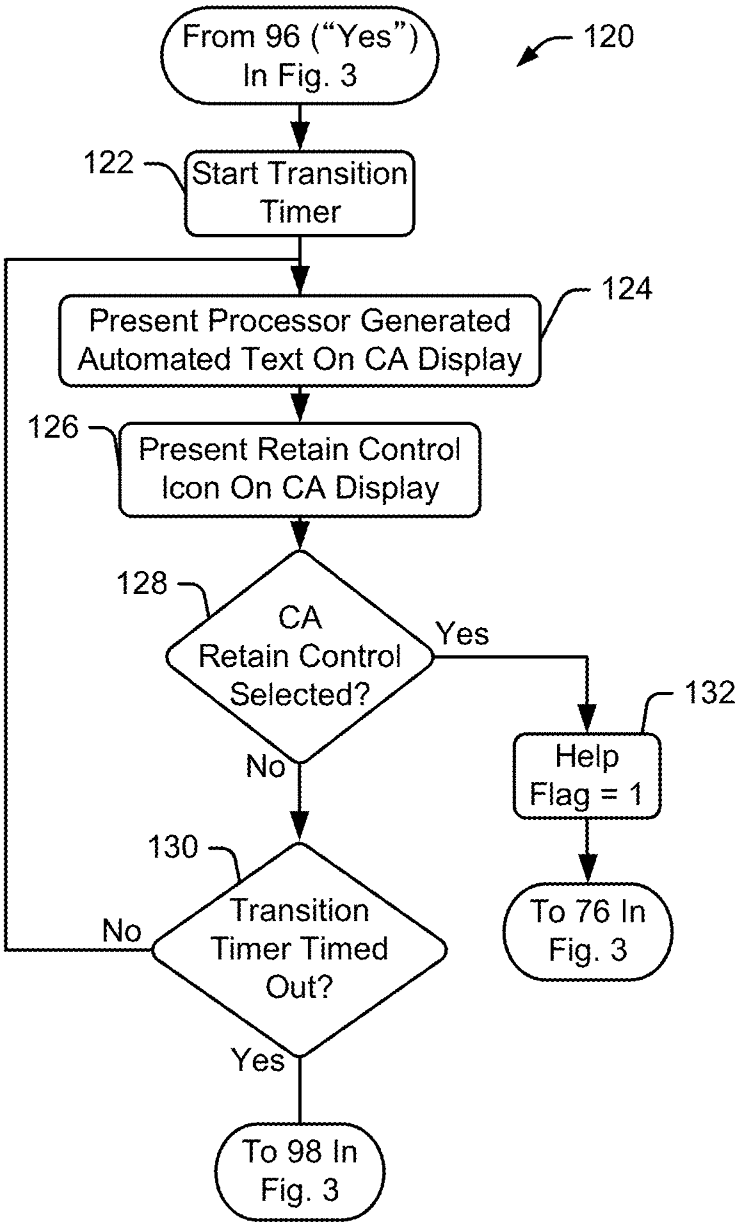
FIG. 4 is a sub-process that maybe substituted for a portion of the process shown in FIG. 3 whereby a control assistant can determine whether or not the automated text takes over the process after the accuracy threshold has been achieved.

One sub-process 120 that may be added to the process shown in FIG. 3 for managing a CA to automated text handoff is illustrated in FIG. 4. Referring also to FIGS. 1 and 2, at block 96 in FIG. 3, if the accuracy of the automated text exceeds the accuracy standard threshold level, control may pass to block 122 in FIG. 4. At block 122, a short duration transition timer (e.g. 10-15 seconds) is started. At block 124 automated text (e.g., text generated by feeding the HU's voice messages directly to voice-to-text software) is presented on the CA's display 50. At block 126 an on screen "Retain Control" icon or virtual button is provided to the CA via the assistant's display screen 50 which can be selected by the CA to forego the handoff to the automated voice-to-text software. At block 128, if the "Retain Control" icon is selected, control passes to block 132 where the help flag is set to one and then control passes back up to block 76 in FIG. 3 where the CA process for generating text continues as described above. At block 128, if the CA does not select the "Retain Control" icon, control passes to block 130 where the transition timer is checked. If the transition timer has not timed out control passes back up to block 124. Once the timer times out at block 130, control passes back to block 98 in FIG. 3 where the auto flag is set to one and the CA is delinked from the call.

In at least some embodiments it is contemplated that after voice-to-text software takes over the transcription task and the CA is delinked from a call, server 30 itself may be programmed to sense when transcription accuracy has degraded substantially and the server 30 may cause a re-link to a CA to increase accuracy of the text transcription. For instance, server 30 may assign a confidence factor to each word in the automated text based on how confident the server is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, server 30 may re-link to a CA to increase transcription accuracy. The automated process for re-linking to a CA may be used instead of or in addition to the process described above whereby an AU selects the "help" button to re-link to a CA.

In at least some cases when an AU selects a "help" button to re-link to a CA, partial call assistance may be provided instead of full CA service. For instance, instead of adding a CA that transcribes a HU's voice messages and then corrects errors, a CA may be linked only for correction purposes. The idea here is that while software trained to a HU's voice may generate some errors, the number of errors after training will still be relatively small in most cases even if objectionable to an AU. In at least some cases CAs may be trained to have different skill sets where highly skilled and relatively more expensive to retain CAs are trained to re-voice HU voice messages and correct the resulting text and less skilled CAs are trained to simply make corrections to automated text. Here, initially all calls may be routed to highly skilled revoicing or "transcribing" CAs and all re-linked calls may be routed to less skilled "corrector" CAs.

Figure 5:
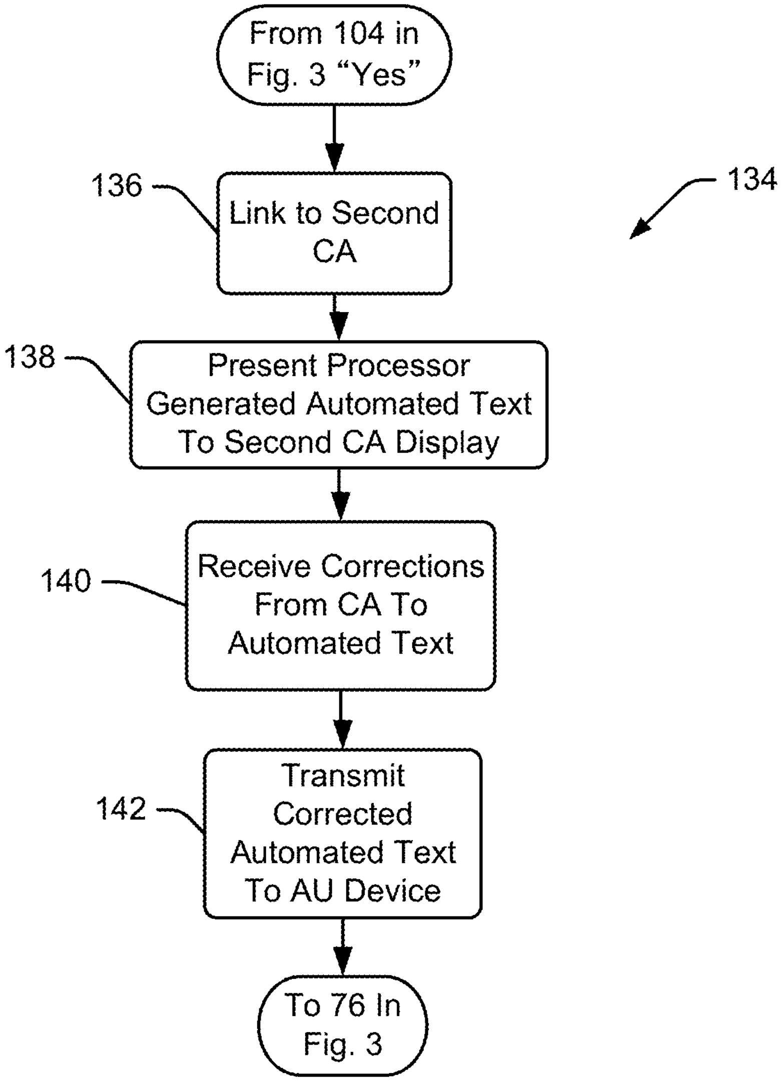
FIG. 5 is a sub-process that may be added to the process shown in FIG. 3 wherein, upon an AU's requesting help, a call is linked to a second CA for correcting the automated text.

A sub-process 134 that may be added to the process of FIG. 3 for routing re-linked calls to a corrector CA is shown in FIG. 5. Referring also to FIGS. 1 and 3, at decision block 94, if an AU selects the help button, control may pass to block 136 in FIG. 3 where the call is linked to a second corrector CA. At block 138 the automated text is presented to the second CA via the CA's display 50. At block 140 the second CA listens to the voice of the HU and observes the automated text and makes corrections to errors perceived in the text. At block 142, server 30 transmits the corrected automated text to the AU's device for display via screen 18. After block 142 control passes back up to block 76 in FIG. 2.

Re-Sync and Fill in Text

In some cases where a CA generates text that drives an AU's display screen 18 (see again FIG. 1), for one reason or another the CA's transcription to text may fall behind the HU's voice message stream by a substantial amount. For instance, where a HU is speaking quickly, is using odd vocabulary, and/or has an unusual accent that is hard to understand, CA transcription may fall behind a voice message stream by 20 seconds, 40 seconds or more.

In many cases when captioning falls behind, an AU can perceive that presented text has fallen far behind broadcast voice messages from a HU based on memory of recently broadcast voice message content and observed text. For instance, an AU may recognize that currently displayed text corresponds to a portion of the broadcast voice message that occurred thirty seconds ago. In other cases some captioning delay indicator may be presented via an AU's device display 18. For instance, see FIG. 17 where captioning delay is indicated in two different ways on a display screen 18. First, text 212 indicates an estimated delay in seconds (e.g., 24 second delay). Second, at the end of already transcribed text 214, blanks 216 for words already voiced but yet to be transcribed may be presented to give an AU a sense of how delayed the captioning process has become.

When an AU perceives that captioning is too far behind or when the user cannot understand a recently broadcast voice message, the AU may want the text captioning to skip ahead to the currently broadcast voice message. For instance, if an AU had difficulty hearing the most recent five seconds of a HU's voice message and continues to have difficulty hearing but generally understood the preceding 25 seconds, the AU may want the captioning process to be re-synced with the current HU's voice message so that the AU's understanding of current words is accurate.

Here, however, because the AU could not understand the most recent 5 seconds of broadcast voice message, a re-sync with the current voice message would leave the AU with at least some void in understanding the conversation (e.g., at least the most recent 5 seconds of misunderstood voice message would be lost). To deal with this issue, in at least some embodiments, it is contemplated that server 30 may run automated voice-to-text software on a HU's voice message simultaneously with a CA generating text from the voice message and, when an AU requests a "catch-up" or "re-sync" of the transcription process to the current voice message, server 30 may provide "fill in" automated text corresponding to the portion of the voice message between the most recent CA generated text and the instantaneous voice message which may be provided to the AU's device for display and also, optionally, to the CA's display screen to maintain context for the CA. In this case, while the fill in automated text may have some errors, the fill in text will be better than no text for the associated period and can be referred to by the AU to better understand the voice messages.

In cases where the fill in text is presented on the CA's display screen, the CA may correct any errors in the fill in text. This correction and any error correction by a CA for that matter may be made prior to transmitting text to the AU's device or subsequent thereto. Where corrected text is transmitted to an AU's device subsequent to transmission of the original error prone text, the AU's device corrects the errors by replacing the erroneous text with the corrected text.

Because it is often the case that AUs will request a re-sync only when they have difficulty understanding words, server 30 may only present automated fill in text to an AU corresponding to a pre-defined duration period (e.g., 8 seconds) that precedes the time when the re-sync request occurs. For instance, consistent with the example above where CA captioning falls behind by thirty seconds, an AU may only request re-sync at the end of the most recent five seconds as inability to understand the voice message may only be an issue during those five seconds. By presenting the most recent eight seconds of automated text to the AU, the user will have the chance to read text corresponding to the misunderstood voice message without being inundated with a large segment of automated text to view. Where automated fill in text is provided to an AU for only a pre-defined duration period, the same text may be provided for correction to the CA.

Figure 7:
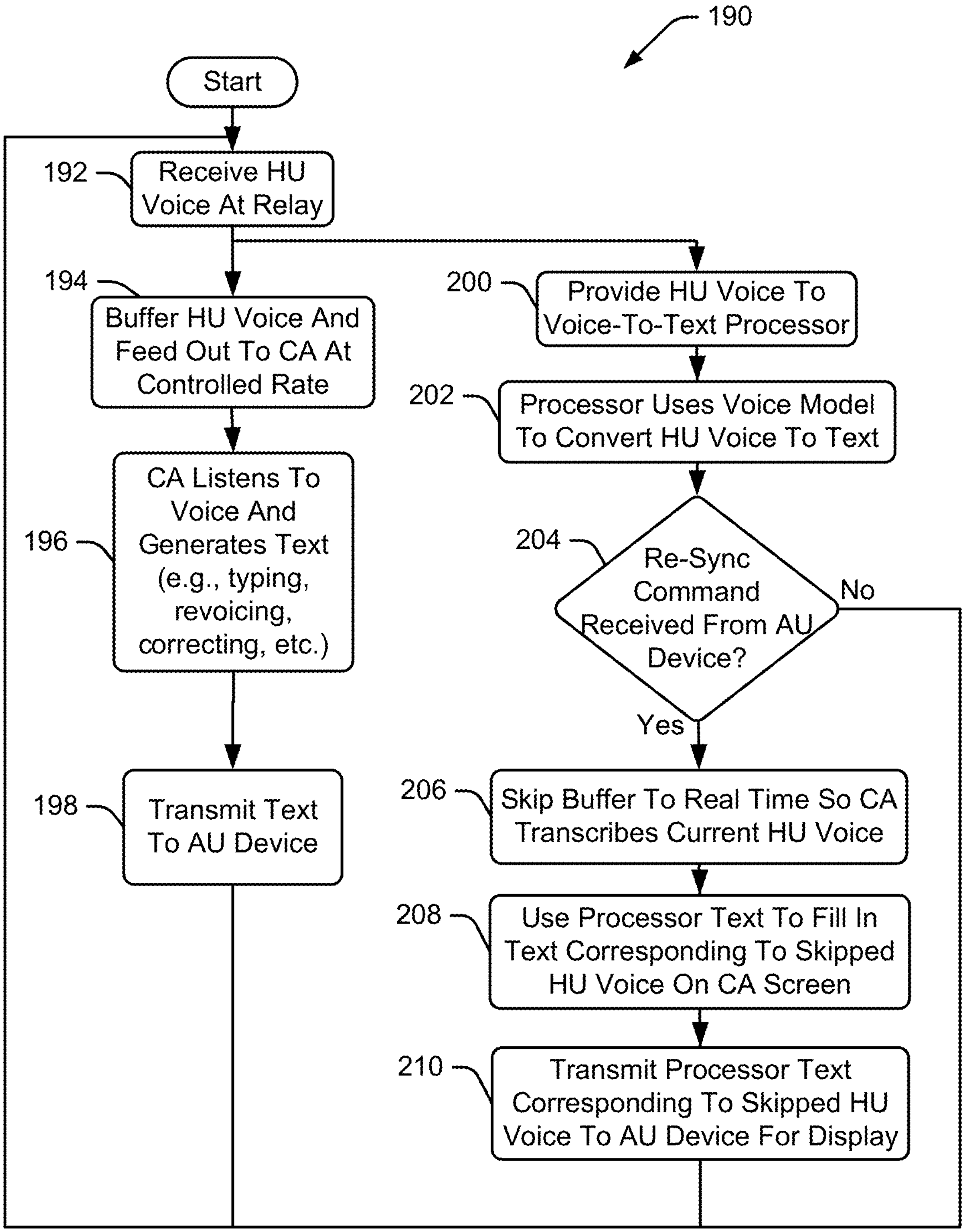
FIG. 7 is a process whereby automated text is automatically used to fill in captioning when transcription by a CA lags behind a HU's voice messages by a threshold duration.

Referring now to FIG. 7, a method 190 by which an AU requests a re-sync of the transcription process to current voice messages when CA generated text falls behind current voice messages is illustrated. Referring also to FIG. 1, at block 192 a HU's voice messages are received at relay 16. After block 192, control passes down to each of blocks 194 and 200 where two simultaneous sub-processes occur in parallel. At block 194, the HU's voice messages are stored in a rolling buffer. The rolling buffer may, for instance, have a two minute duration so that the most recent two minutes of a HU's voice messages are always stored. At block 196, a CA listens to the HU's voice message and transcribes text corresponding to the messages via re-voicing to software trained to the CA's voice, typing, etc. At block 198 the CA generated text is transmitted to AU's device 12 to be presented on display screen 18 after which control passes back up to block 192. Text correction may occur at block 196 or after block 198.

Referring again to FIG. 7, at process block 200, the HU's voice is fed directly to voice-to-text software run by server 30 which generates automated text at block 202. Although not shown in FIG. 7, after block 202, server 30 may compare the automated text to the CA generated text to identify errors and may use those errors to train the software to the HU's voice so that the automated text continues to get more accurate as a call proceeds.

Figure 17:
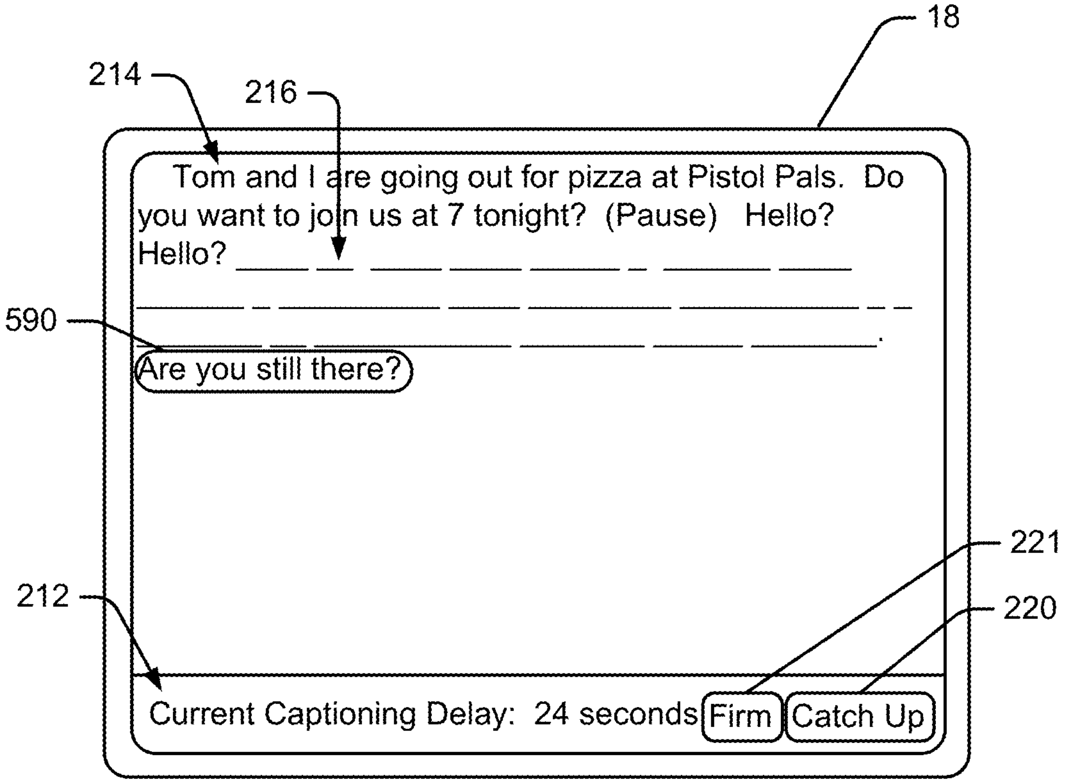
FIG. 17 is a schematic illustrating a screen shot that may be presented via an AU's device display screen.

Referring still to FIGS. 1 and 7, at decision block 204, controller 30 monitors for a catch up or re-sync command received via the AU's device 12 (e.g., via selection of an on-screen virtual "catch up" button 220, see again FIG. 17). Where no catch up or re-sync command has been received, control passes back up to block 192 where the process described above continues to cycle. At block 204, once a re-sync command has been received, control passes to block 206 where the buffered voice messages are skipped and a current voice message is presented to the ear of the CA to be transcribed. At block 208 the automated text corresponding to the skipped voice message segment is filled in to the text on the CA's screen for context and at block 210 the fill in text is transmitted to the AU's device for display. Here, where an ASR engine continues to correct text errors within the filled in text, those errors may be automatically corrected on the AU device display, the CA station display or both.

In other embodiments, an AU device processor may monitor AU voice signals for AU control commands such as a "update" command and may use that command as a trigger to fill in delayed text with ASR text and to skip a CA ahead to a current HU voice signal. Here, the idea is that the AU device processor may be programmed to recognize one or a small number of verbal commands for controlling a captioning process. In at least some cases, when a verbal control command is received, the processor may filter that AU voice signal control command out of the signal transmitted to the HU device and may consume that command to skip the captioning process ahead.

Where automated text is filled in upon the occurrence of a catch up process, the fill in text may be visually distinguished on the AU's screen and/or on the CA's screen. For instance, fill in text may be highlighted, underlined, bolded, shown in a distinct font, etc. For example, see FIG. 18 that shows fill in text 222 that is underlined to visually distinguish. See also that the captioning delay 212 has been updated. In some cases, fill in text corresponding to voice messages that occur after or within some pre-defined period prior to a re-sync request may be distinguished in yet a third way to point out the text corresponding to the portion of a voice message that the AU most likely found interesting (e.g., the portion that prompted selection of the re-sync button). For instance, where 24 previous seconds of text are filled in when a re-sync request is initiated, all 24 seconds of fill in text may be underlined and the 8 seconds of text prior to the re-sync request may also be highlighted in yellow. See in FIG. 18 that some of the fill in text is shown in a phantom box 226 to indicate highlighting.

In at least some cases it is contemplated that server 30 may be programmed to automatically determine when CA generated text substantially lags a current voice message from a HU and server 30 may automatically skip ahead to re-sync a CA with a current message while providing automated fill in text corresponding to intervening voice messages. For instance, server 30 may recognize when CA generated text is more than thirty seconds behind a current voice message and may skip the voice messages ahead to the current message while filling in automated text to fill the gap. In at least some cases this automated skip ahead process may only occur after at least some (e.g., 2 minutes) training to a HU's voice so ensure that minimal errors are generated in the fill in text.

Figure 6:
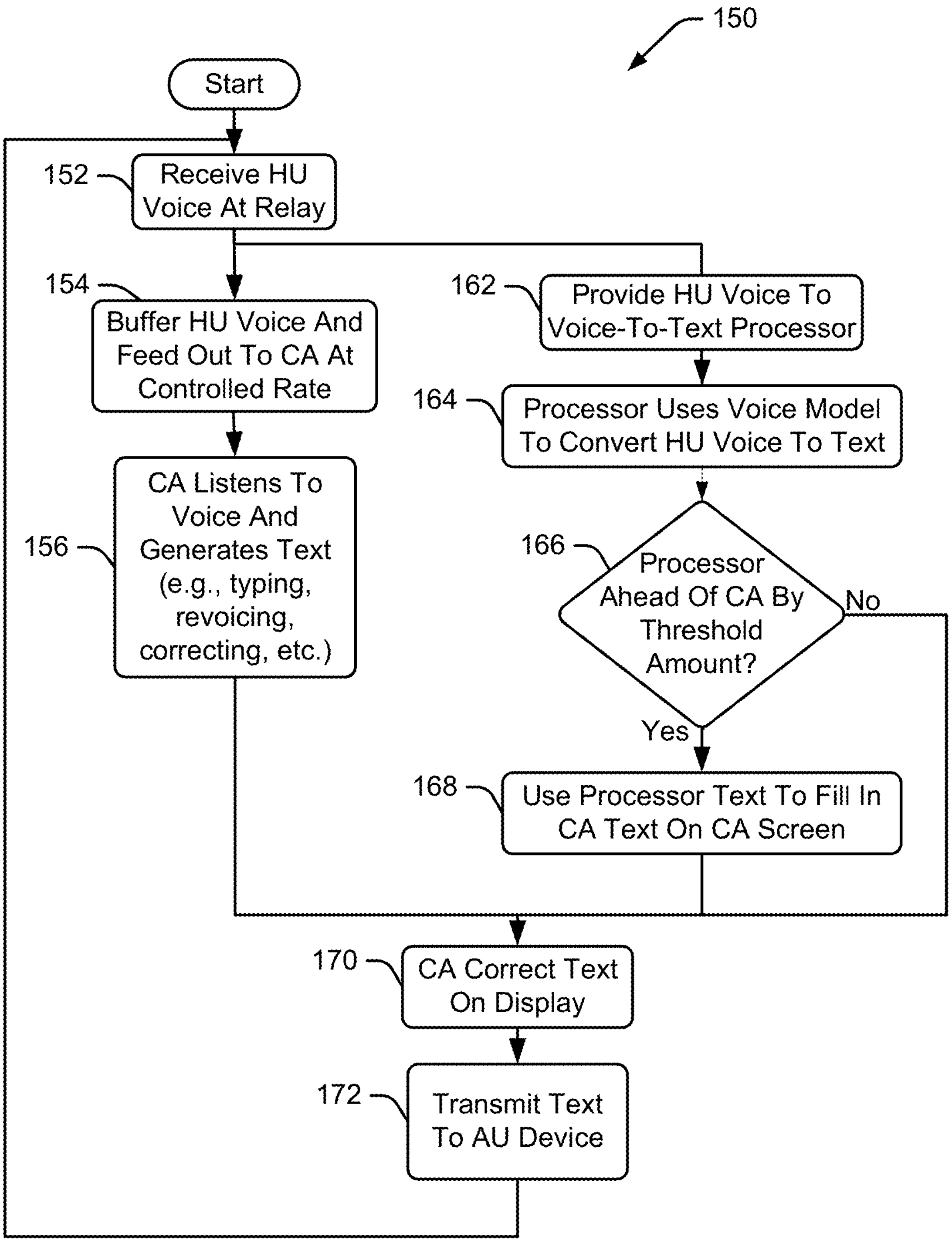
FIG. 6 is a process whereby an automated voice-to-text engine is used to fill in text for a HU's voice messages that are skipped over by a CA when an AU requests instantaneous captioning of a current message.

A method 150 for automatically skipping to a current voice message in a buffer when a CA falls to far behind is shown in FIG. 6. Referring also to FIG. 1, at block 152, a HU's voice messages are received at relay 16. After block 152, control passes down to each of blocks 154 and 162 where two simultaneous sub-processes occur in parallel. At block 154, the HU's voice messages are stored in a rolling buffer. At block 156, a CA listens to the HU's voice message and transcribes text corresponding to the messages via re-voicing to software trained to the CA's voice, typing, etc., after which control passes to block 170.

Referring still to FIG. 6, at process block 162, the HU's voice is fed directly to voice-to-text software run by server 30 which generates automated text at block 164. Although not shown in FIG. 6, after block 164, server 30 may compare the automated text to the CA generated text to identify errors and may use those errors to train the software to the HU's voice so that the automated text continues to get more accurate as a call proceeds.

Referring still to FIGS. 1 and 6, at decision block 166, controller 30 monitors how far CA text transcription is behind the current voice message and compares that value to a threshold value. If the delay is less than the threshold value, control passes down to block 170. If the delay exceeds the threshold value, control passes to block 168 where server 30 uses automated text from block 164 to fill in the CA generated text and skips the CA up to the current voice message. After block 168 control passes to block 170. At block 170, the text including the CA generated text and the fill in text is presented to the CA via display screen 50 and the CA makes any corrections to observed errors. At block 172, the text is transmitted to AU's device 12 and is displayed on screen 18. Again, uncorrected text may be transmitted to and displayed on device 12 and corrected text may be subsequently transmitted and used to correct errors in the prior text in line on device 12. After block 172 control passes back up to block 152 where the process described above continues to cycle. Automatically generated text to fill in when skipping forward may be visually distinguished (e.g., highlighted, underlined, etc.)

In at least some cases when automated fill in text is generated, that text may not be presented to the CA or the AU as a single block and instead may be doled out at a higher speed than the talking speed of the HU until the text catches up with a current time. To this end, where transcription is far behind a current point in a conversation, if automated catch up text were generated as an immediate single block, in at least some cases, the earliest text in the block could shoot off a CA's display screen or an AU's display screen so that the CA or the AU would be unable to view all of the automated catch up text. Instead of presenting the automated text as a complete block upon catchup, the automated catch up text may be presented at a rate that is faster (e.g., two to three times faster) than the HU's rate of speaking so that catch up is rapid without the oldest catch up text running off the CA's or AU's displays.

In addition to avoiding a case where text shoots off an AU's display screen, presenting text in a constant but rapid flow has a better feel to it as the text is not presented in a jerky start and stop fashion which can be distracting to an AU trying to follow along as text is presented.

In other cases, when an AU requests fill in, the system may automatically fill in text and only present the most recent 10 seconds or so of the automatic fill in text to the CA for correction so that the AU has corrected text corresponding to a most recent period as quickly as possible. In many cases where the CA generated text is substantially delayed, much of the fill in text would run off a typical AU's device display screen when presented so making corrections to that text would make little sense as the AU that requests catch up text is typically most interested in text associated with the most recent HU voice signal.

Many AU's devices can be used as conventional telephones without captioning service or as AU devices where captioning is presented and voice messages are broadcast to an AU. The idea here is that one device can be used by hearing impaired persons and persons that have no hearing impairment and that the overall costs associated with providing captioning service can be minimized by only using captioning when necessary. In many cases even a hearing impaired person may not need captioning service all of the time. For instance, a hearing impaired person may be able to hear the voice of a person that speaks loudly fairly well but may not be able to hear the voice of another person that speaks more softly. In this case, captioning would be required when speaking to the person with the soft voice but may not be required when speaking to the person with the loud voice. As another instance, an impaired person may hear better when well rested but hear relatively more poorly when tired so captioning is required only when the person is tired. As still another instance, an impaired person may hear well when there is minimal noise on a line but may hear poorly if line noise exceeds some threshold. Again, the impaired person would only need captioning some of the time.

To minimize captioning service costs and still enable an impaired person to obtain captioning service whenever needed and even during an ongoing call, some systems start out all calls with a default setting where an AU's device 12 is used like a normal telephone without captioning. At any time during an ongoing call, an AU can select either a mechanical or virtual "Caption" icon or button (see again 68 in FIG. 1) to link the call to a relay, provide a HU's voice messages to the relay and commence captioning service. One problem with starting captioning only after an AU experiences problems hearing words is that at least some words (e.g., words that prompted the AU to select the caption button in the first place) typically go unrecognized and therefore the AU is left with a void in their understanding of a conversation.

One solution to the problem of lost meaning when words are not understood just prior to selection of a caption button is to store a rolling recordation of a HU's voice messages that can be transcribed subsequently when the caption button is selected to generate "fill in" text. For instance, the most recent 20 seconds of a HU's voice messages may be recorded and then transcribed only if the caption button is selected. The relay generates text for the recorded message either automatically via software or via revoicing or typing by a CA or via a combination of both. In addition, the CA or the automated voice recognition software starts transcribing current voice messages. The text from the recording and the real time messages is transmitted to and presented via AU's device 12 which should enable the AU to determine the meaning of the previously misunderstood words. In at least some embodiments the rolling recordation of HU's voice messages may be maintained by the AU's device 12 (see again FIG. 1) and that recordation may be sent to the relay for immediate transcription upon selection of the caption button.

Figure 8:
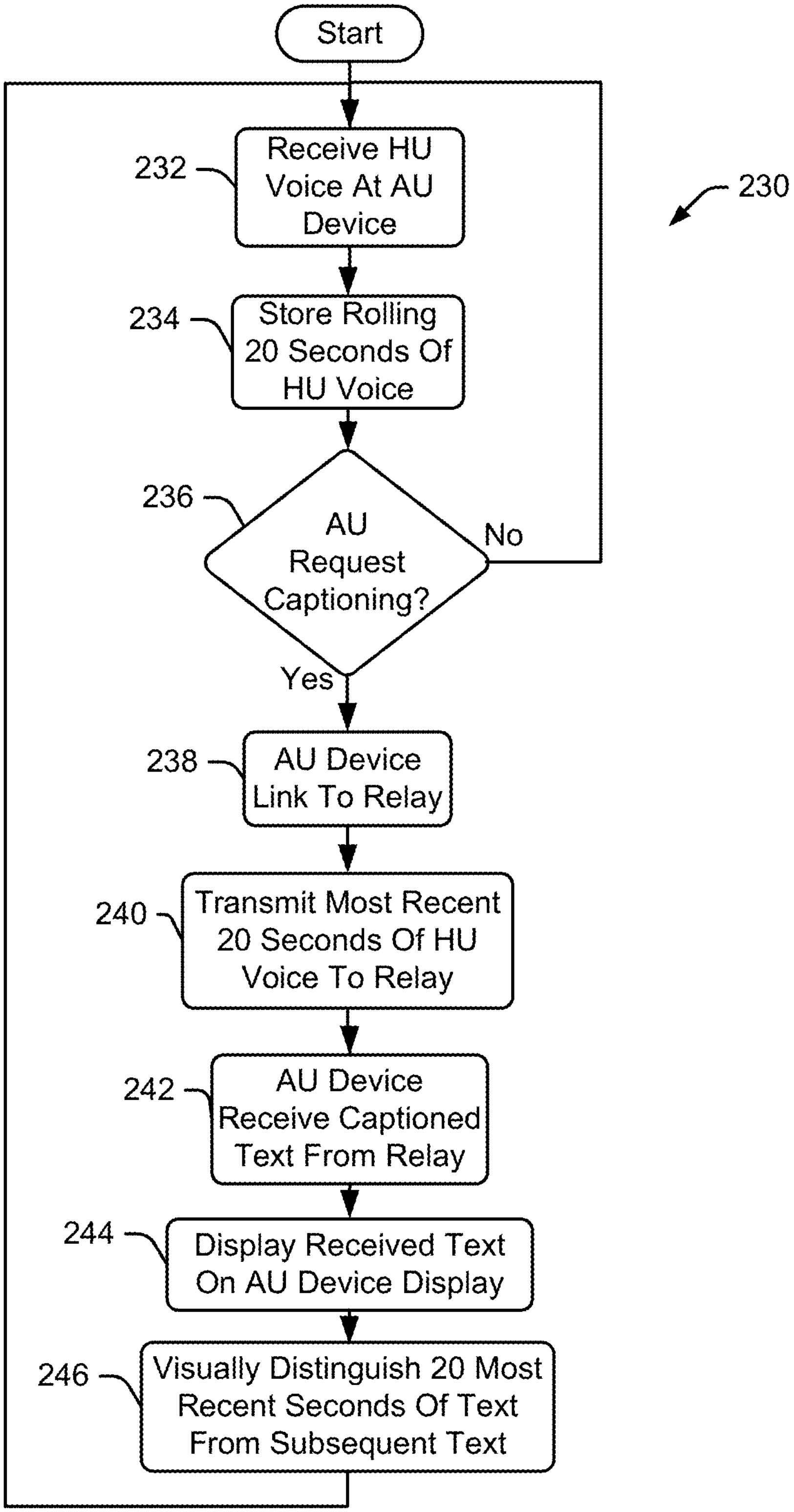
FIG. 8 is a flow chart illustrating a process whereby text is generated for a HU's voice messages that precede a request for captioning services.

Referring now to FIG. 8, a process 230 that may be performed by the system of FIG. 1 to provide captioning for voice messages that occur prior to a request for captioning service is illustrated. Referring also to FIG. 1, at block 232 a HU's voice messages are received during a call with an AU at the AU's device 12. At block 234 the AU's device 12 stores a most recent 20 seconds of the HU's voice messages on a rolling basis. The 20 seconds of voice messages are stored without captioning initially in at least some embodiments. At decision block 236, the AU's device monitors for selection of a captioning button (not shown). If the captioning button has not been selected, control passes back up to block 232 where blocks 232, 234 and 236 continue to cycle.

Once the caption button has been selected, control passes to block 238 where AU's device 12 establishes a communication link to relay 16. At block 240 AU's device 12 transmits the stored 20 seconds of the HU's voice messages along with current ongoing voice messages from the HU to relay 16. At this point a CA and/or software at the relay transcribes the voice-to-text, corrections are made (or not), and the text is transmitted back to device 12 to be displayed. At block 242 AU's device 12 receives the captioned text from the relay 16 and at block 244 the received text is displayed or presented on the AU's device display 18. At block 246, in at least some embodiments, text corresponding to the 20 seconds of HU voice messages prior to selection of the caption button may be visually distinguished (e.g., highlighted, bolded, underlined, etc.) from other text in some fashion. After block 246 control passes back up to block 232 where the process described above continues to cycle and captioning in substantially real time continues.

Figure 9:
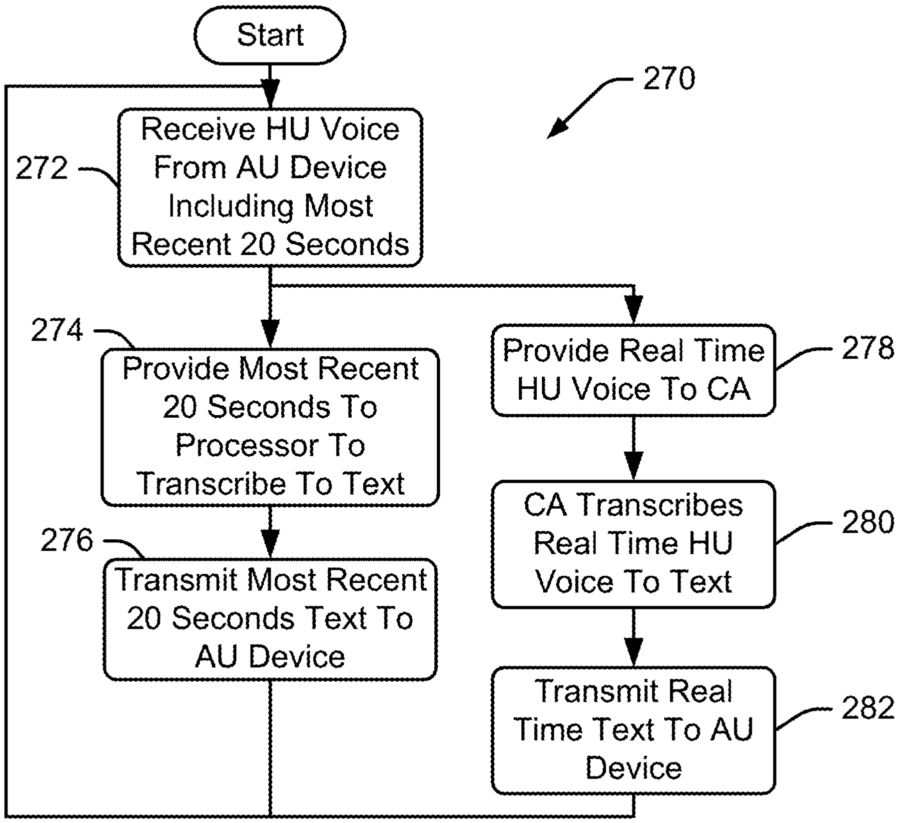
FIG. 9 is a flow chart illustrating a process whereby voice messages prior to a request for captioning service are automatically transcribed to text by an automated voice-to-text engine.

Referring to FIG. 9, a relay server process 270 whereby automated software transcribes voice messages that occur prior to selection of a caption button and a CA at least initially captions current voice messages is illustrated. At block 272, after an AU requests captioning service by selecting a caption button, server 30 receives a HU's voice messages including current ongoing messages as well as the most recent 20 seconds of voice messages that had been stored by AU's device 12 (see again FIG. 1). After block 27, control passes to each of blocks 274 and 278 where two simultaneous processes commence in parallel. At block 274 the stored 20 seconds of voice messages are provided to voice-to-text software run by server 30 to generate automated text and at block 276 the automated text is transmitted to the AU's device 12 for display. At block 278 the current or real time HU's voice messages are provided to a CA and at block 280 the CA transcribes the current voice messages to text. The CA generated text is transmitted to an AU's device at block 282 where the text is displayed along with the text transmitted at block 276. Thus, here, the AU receives text corresponding to misunderstood voice messages that occur just prior to the AU requesting captioning. One other advantage of this system is that when captioning starts, the CA is not starting captioning with an already existing backlog of words to transcribe and instead automated software is used to provide the prior text.

In other embodiments, when an AU cannot understand a voice message during a normal call and selects a caption button to obtain captioning for a most recent segment of a HU's voice signal, the system may simply provide captions for the most recent 10-20 seconds of the voice signal without initiating ongoing automatic or assistance from a CA. Thus, where an AU is only sporadically or periodically unable to hear and understand the broadcast HU's voice, the HU may select the caption button to obtain periodic captioning when needed. For instance, it is envisioned that in one case, an AU may participate in a five minute call and may only require captioning during three short 20 second periods. In this case, the AU would select the caption button three times, once for each time that the user is unable to hear the HU's voice signal, and the system would generate three bursts of text, one for each of three HU voice segments just prior to each of the button activation events.

In some cases instead of just presenting captioning for the 20 seconds prior to a caption button activation event, the system may present the prior 20 seconds and a few seconds (e.g. 10) of captioning just after the button selection to provide the 20 prior seconds in some context to make it easier for the AU to understand the overall text.

Third Party Automated Speech Recognition (ASR) and Other ASR Resources

In addition to using a service provided by relay 16 to transcribe stored rolling text, other resources may be used to transcribe the stored rolling text. For instance, in at least some embodiments an AU's device may link via the Internet or the like to a third party provider running automated speech recognition (ASR) software that can receive voice messages and transcribe those messages, at least somewhat accurately, to text. In these cases it is contemplated that real time transcription where accuracy needs to meet a high accuracy standard would still be performed by a CA or software trained to a specific voice while less accuracy sensitive text may be generated by the third party provider, at least some of the time for free or for a nominal fee, and transmitted back to the AU's device for display.

In other cases, it is contemplated that the AU's device 12 itself may run voice-to-text or ASR software to at least somewhat accurately transcribe voice messages to text where the text generated by the AU's device would only be provided in cases where accuracy sensitivity is less than normal such as where rolling voice messages prior to selection of a caption icon to initiate captioning are to be transcribed.

Figure 10:
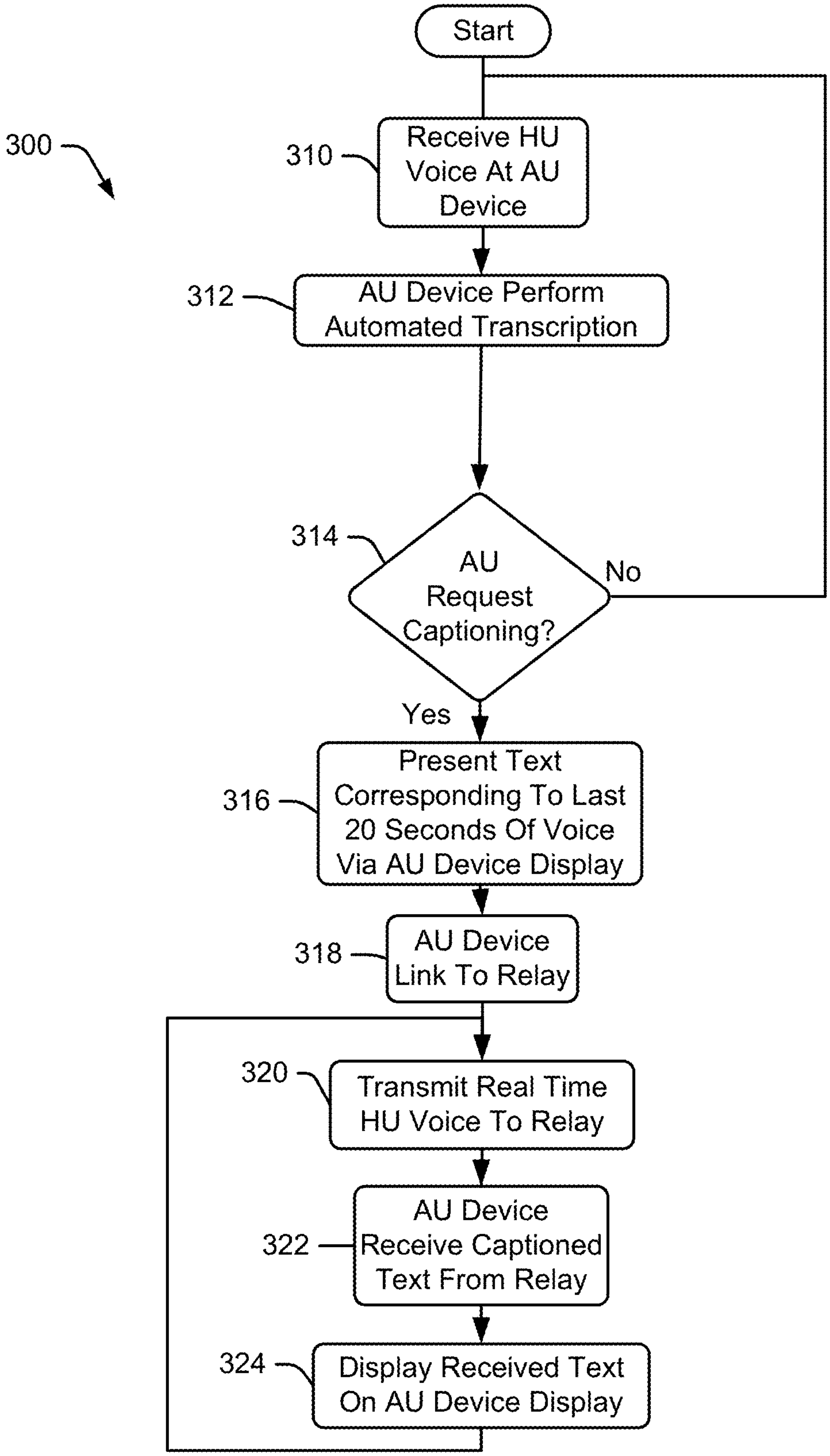
FIG. 10 is a flow chart illustrating a process whereby an AU's device processor performs transcription processes until a request for captioning is received at which point the AU's device presents texts related to HU voice messages prior to the request and ongoing voice messages are transcribed via a relay.

FIG. 10 shows another method 300 for providing text for voice messages that occurred prior to a caption request, albeit where an AU's device generates the pre-request text as opposed to a relay. Referring also to FIG. 1, at block 310 a HU's voice messages are received at an AU's device 12. At block 312, the AU's device 12 runs voice-to-text software that, in at least some embodiments, trains on the fly to the voice of a linked HU and generates caption text.

Here, on the fly training may include assigning a confidence factor to each automatically transcribed word and only using text that has a high confidence factor to train a voice model for the HU. For instance, only text having a confidence factor greater than 95% may be used for automatic training purposes. Here, confidence factors may be assigned based on many different factors or algorithms, many of which are well known in the automatic voice recognition art. In this embodiment, at least initially, the caption text generated by the AU's device 12 is not displayed to the AU in at least some embodiments. At block 314, until the AU requests captioning, control simply routes back up to block 310. Once captioning is requested by an AU, control passes to block 316 where the text corresponding to the last 20 seconds generated by the AU's device is presented on the AU's device display 18. Here, while there may be some errors in the displayed text, at least some text associated with the most recent voice message can be quickly presented and give the AU the opportunity to attempt to understand the voice messages associated therewith. At block 318 the AU's device links to a relay and at block 320 the HU's ongoing voice messages are transmitted to the relay. At block 322, after CA transcription at the relay, the AU's device receives the transcribed text from the relay and at block 324 the text is displayed. After block 324 control passes back up to block 320 where the sub-loop including blocks 320, 322 and 324 continues to cycle.

Thus, in the above example, instead of the AU's device storing the last 20 seconds of a HU's voice signal and transcribing that voice signal to text after the AU requests transcription, the AU's device constantly runs an ASR engine behind the scenes to generate automated engine text which is stored without initially being presented to the AU. Then, when the AU requests captioning or transcription, the most recently transcribed text can be presented via the AU's device display immediately or via rapid presentation (e.g., sequentially at a speed higher than the HU's speaking speed).

In at least some cases it is contemplated that voice-to-text software run outside control of the relay may be used to generate at least initial text for a HU's voice and that the initial text may be presented via an AU's device. Here, because known software still may generate more text transcription errors than allowed given standard accuracy requirements in the text captioning industry, a relay correction service may be provided. For instance, in addition to presenting text transcribed by the AU's device via a device display 18, the text transcribed by the AU's device may also be transmitted to a relay 16 for correction. In addition to transmitting the text to the relay, the HU's voice messages may also be transmitted to the relay so that a CA can compare the text automatically generated by the AU's device to the HU's voice messages. At the relay, the CA can listen to the voice of the hearing person and can observe associated text. Any errors in the text can be corrected and corrected text blocks can be transmitted back to the AU's device and used for in line correction on the AU's display screen.

One advantage to this type of system is that relatively less skilled CAs may be retained at a lesser cost to perform the CA tasks. A related advantage is that the stress level on CAs may be reduced appreciably by eliminating the need to both transcribe and correct at high speeds and therefore CA turnover at relays may be appreciably reduced which ultimately reduces costs associated with providing relay services.

A similar system may include an AU's device that links to some other third party provider ASR transcription/caption server (e.g., in the "cloud") to obtain initial captioned text which is immediately displayed to an AU and which is also transmitted to the relay for CA correction. Here, again, the CA corrections may be used by the third party provider to train the software on the fly to the HU's voice. In this case, the AU's device may have three separate links, one to the HU, a second link to a third party provider server, and a third link to the relay. In other cases, the relay may create the link to the third party server for ASR services. Here, the relay would provide the HU's voice signal to the third party server, would receive text back from the server to transmit to the AU device and would receive corrections from the CA to transmit to each of the AU device and the third party server. The third party server would then use the corrections to train the voice model to the HU voice and would use the evolving model to continue ASR transcription. In still other cases the third party ASR may train on an HU's voice signal based on confidence factors and other training algorithms and completely independent of CA corrections.

Figure 11:
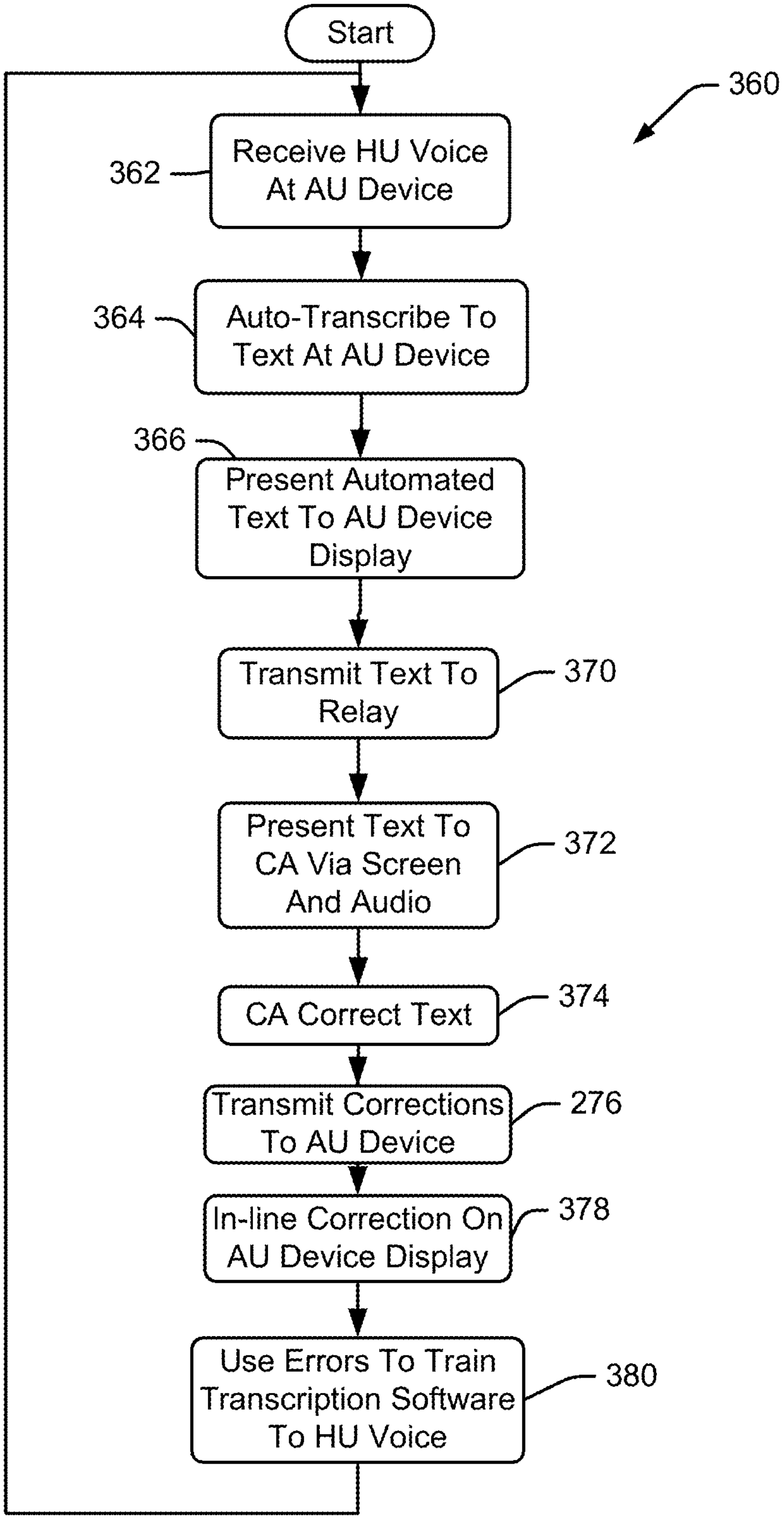
FIG. 11 is a flow chart illustrating a process whereby an AU's device processor generates automated text for a hear user's voice messages which is presented via a display to an AU and also transmits the text to a CA at a relay for correction purposes.

Referring to FIG. 11, a method 360 whereby an AU's device transcribes a HU's voice to text and where corrections are made to the text at a relay is illustrated. At block 362 a HU's voice messages are received at an AU's device 12 (see also again FIG. 1). At block 364 the AU's device runs voice-to-text software to generate text from the received voice messages and at block 366 the generated text is presented to the AU via display 18. At block 370 the transcribed text is transmitted to the relay 16 and at block 372 the text is presented to a CA via the CA's display 50. At block 374 the CA corrects the text and at block 376 corrected blocks of text are transmitted to the AU's device 12. At block 378 the AU's device 12 uses the corrected blocks to correct the text errors via in line correction. At block 380, the AU's device uses the errors, the corrected text and the voice messages to train the captioning software to the HU's voice.

In some cases instead of having a relay or an AU's device run automated voice-to-text transcription software, a HU's device may include a processor that runs transcription software to generate text corresponding to the HU's voice messages. To this end, device 14 may, instead of including a simple telephone, include a computer that can run various applications including a voice-to-text program or may link to some third party real time transcription software program (e.g., software run on a third party server in the "cloud" (e.g., Watson, Google Voice, etc.)) to obtain an initial text transcription substantially in real time. Here, as in the case where an AU's device runs the transcription software, the text will often have more errors than allowed by the standard accuracy requirements.

Again, to correct the errors, the text and the HU's voice messages are transmitted to relay 16 where a CA listens to the voice messages, observes the text on screen 18 and makes corrections to eliminate transcription errors. The corrected blocks of text are transmitted to the AU's device for display. The corrected blocks may also be transmitted back to the HU's device for training the captioning software to the HU's voice. In these cases the text transcribed by the HU's device and the HU's voice messages may either be transmitted directly from the HU's device to the relay or may be transmitted to the AU's device 12 and then on to the relay. Where the HU's voice messages and text are transmitted directly to the relay 16, the voice messages and text may also be transmitted directly to the AU's device for immediate broadcast and display and the corrected text blocks may be subsequently used for in line correction.

In these cases the caption request option may be supported so that an AU can initiate captioning during an on-going call at any time by simply transmitting a signal to the HU's device instructing the HU's device to start the captioning process. Similarly, in these cases the help request option may be supported. Where the help option is facilitated, the automated text may be presented via the AU's device and, if the AU perceives that too many text errors are being generated, the help button may be selected to cause the HU's device or the AU's device to transmit the automated text to the relay for CA correction.

One advantage to having a HU's device manage or perform voice-to-text transcription is that the voice signal being transcribed can be a relatively high quality voice signal. To this end, a standard phone voice signal has a range of frequencies between 300 and about 3000 Hertz which is only a fraction of the frequency range used by most voice-to-text transcription programs and therefore, in many cases, automated transcription software does only a poor job of transcribing voice signals that have passed through a telephone connection. Where transcription can occur within a digital signal portion of an overall system, the frequency range of voice messages can be optimized for automated transcription. Thus, where a HU's computer that is all digital receives and transcribes voice messages, the frequency range of the messages is relatively large and accuracy can be increased appreciably. Similarly, where a HU's computer can send digital voice messages to a third party transcription server accuracy can be increased appreciably.

Calls of Different Sound Quality Handled Differently

In at least some configurations it is contemplated that the link between an AU's device 12 and a HU's device 14 may be either a standard phone type connection or may be a digital or high definition (HD) connection depending on the capabilities of the HU's device that links to the AU's device. Thus, for instance, a first call may be standard quality and a second call may be high definition audio. Because high definition voice messages have a greater frequency range and therefore can be automatically transcribed more accurately than standard definition audio voice messages in many cases, it has been recognized that a system where automated voice-to-text program use is implemented on a case by case basis depending upon the type of voice message received (e.g., digital or analog) would be advantageous. For instance, in at least some embodiments, where a relay receives a standard definition voice message for transcription, the relay may automatically link to a CA for full CA transcription service where the CA transcribes and corrects text via revoicing and keyboard manipulation and where the relay receives a high definition digital voice message for transcription, the relay may run an automated voice-to-text transcription program to generate automated text. The automated text may either be immediately corrected by a CA or may only be corrected by an assistant after a help feature is selected by an AU as described above.

Figure 12:
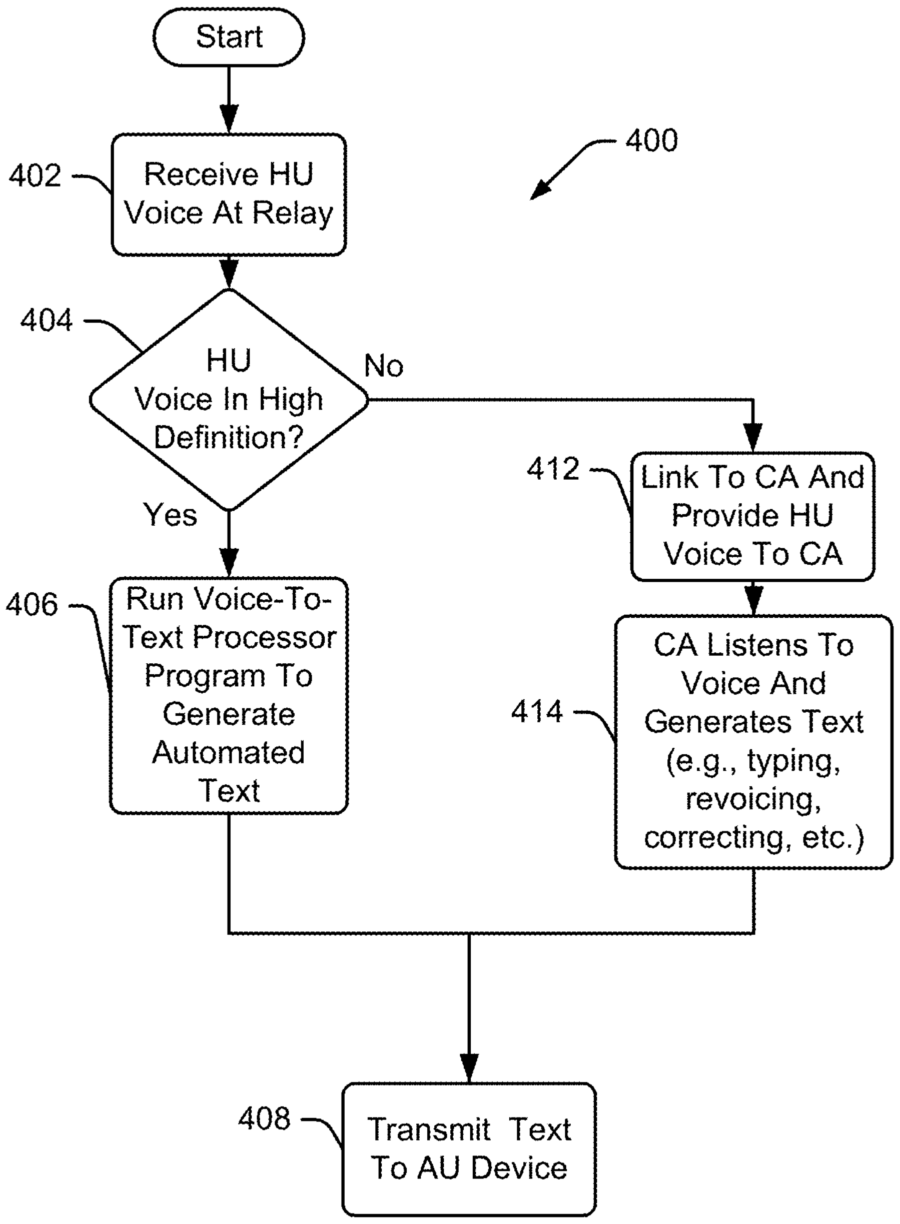
FIG. 12 is a flow chart illustrating a process whereby high definition digital voice messages and analog voice messages are handled differently at a relay.

Referring to FIG. 12, one process 400 for treating high definition digital messages differently than standard definition voice messages is illustrated. Referring also to FIG. 1, at block 402 a HU's voice messages are received at a relay 16. At decision block 404, relay server 30 determines if the received voice message is a high definition digital message or is a standard definition message (e.g., sometimes and analog message). Where a high definition message has been received, control passes to block 406 where server 30 runs an automated voice-to-text program on the voice messages to generate automated text. At block 408 the automated text is transmitted to the AU's device 12 for display. Referring again to block 404, where the HU's voice messages are in standard definition audio, control passes to block 412 where a link to a CA is established so that the HU's voice messages are provided to a CA. At block 414 the CA listens to the voice messages and transcribes the messages into text. Error correction may also be performed at block 414. After block 414, control passes to block 408 where the CA generated text is transmitted to the AU's device 12. Again, in some cases, when automated text is presented to an AU, a help button may be presented that, when selected causes automated text to be presented to a CA for correction. In other cases automated text may be automatically presented to a CA for correction.

Another system is contemplated where all incoming calls to a relay are initially assigned to a CA for at least initial captioning where the option to switch to automated software generated text is only available when the call includes high definition audio and after accuracy standards have been exceeded. Here, all standard definition HU voice messages would be captioned by a CA from start to finish and any high definition calls would cut out the CA when the standard is exceeded.

In at least some cases where an AU's device is capable of running automated voice-to-text transcription software, the AU's device 12 may be programmed to select either automated transcription when a high definition digital voice message is received or a relay with a CA when a standard definition voice message is received. Again, where device 12 runs an automated text program, CA correction may be automatic or may only start when a help button is selected.

Figure 13:
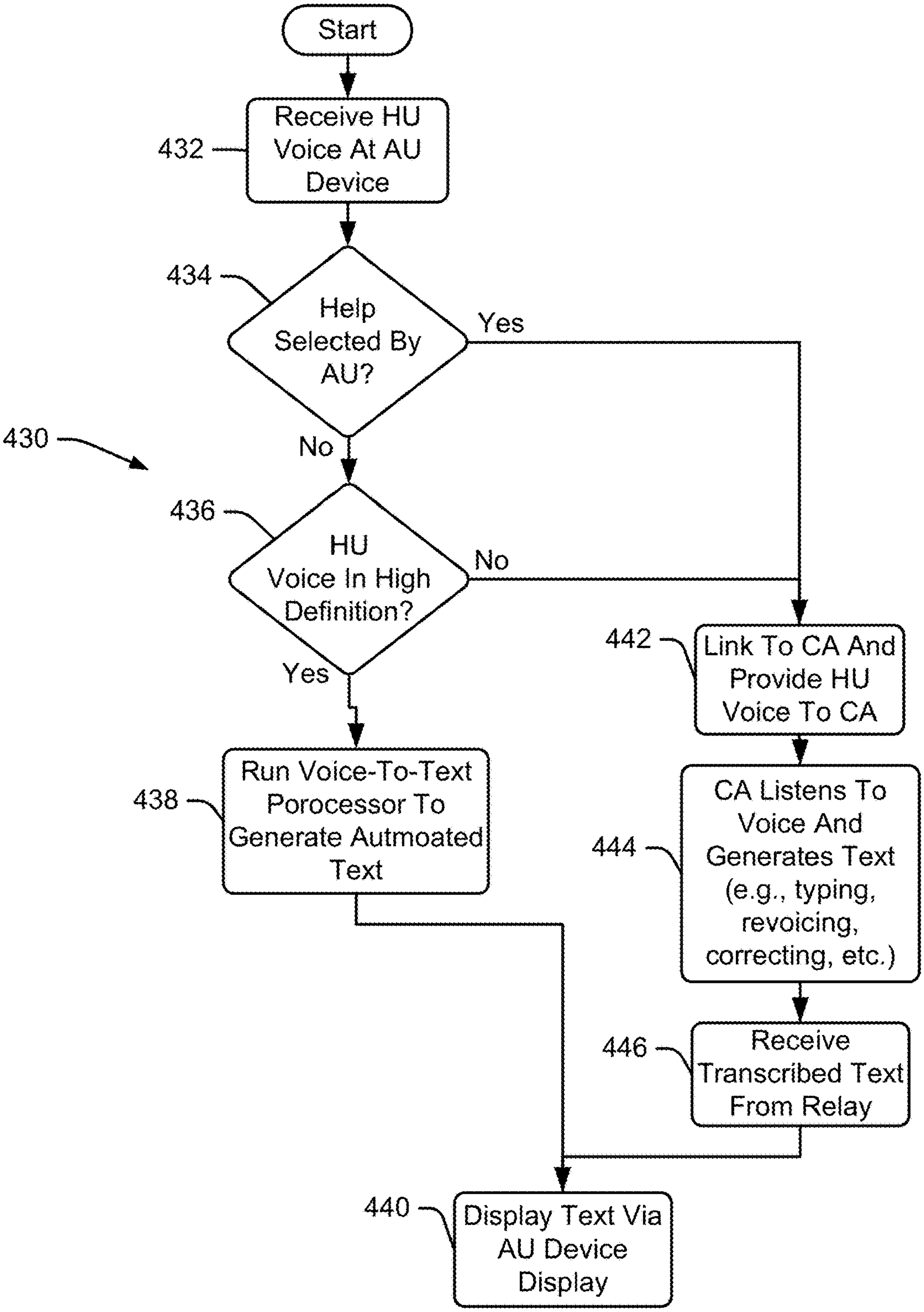
FIG. 13 is a process similar to FIG. 12, albeit where an AU also has the option to link to a CA for captioning service regardless of the type of voice message received.

FIG. 13 shows a process 430 whereby an AU's device 12 selects either automated voice-to-text software or a CA to transcribe based on the type (e.g., digital or analog) of voice messages received. At block 432 a HU's voice messages are received by an AU's device 12. At decision block 434, a processor in device 12 determines if the AU has selected a help button. Initially no help button is selected as no text has been presented so at least initially control passes to block 436. At decision block 436, the device processor determines if a HU's voice signal that is received is high definition digital or is standard definition. Where the received signal is high definition digital, control passes to block 438 where the AU's device processor runs automated voice-to-text software to generate automated text which is then displayed on the AU device display 18 at block 440.

Referring still to FIG. 13, if the help button has been selected at block 434 or if the received voice messages are in standard definition, control passes to block 442 where a link to a CA at relay 16 is established and the HU's voice messages are transmitted to the relay. At block 444 the CA listens to the voice messages and generates text and at block 446 the text is transmitted to the AU's device 12 where the text is displayed at block 440.

HU Recognition and Voice Training

In has been recognized that in many cases most calls facilitated using an AU's device will be with a small group of other hearing or non-HUs. For instance, in many cases as much as 70 to 80 percent of all calls to an AU's device will be with one of five or fewer HU's devices (e.g., family, close friends, a primary care physician, etc.). For this reason it has been recognized that it would be useful to store voice-to-text models for at least routine callers that link to an AU's device so that the automated voice-to-text training process can either be eliminated or substantially expedited. For instance, when an AU initiates a captioning service, if a previously developed voice model for a HU can be identified quickly, that model can be used without a new training process and the switchover from a full service CA to automated captioning may be expedited (e.g., instead of taking a minute or more the switchover may be accomplished in 15 seconds or less, in the time required to recognize or distinguish the HU's voice from other voices).

Figure 14:
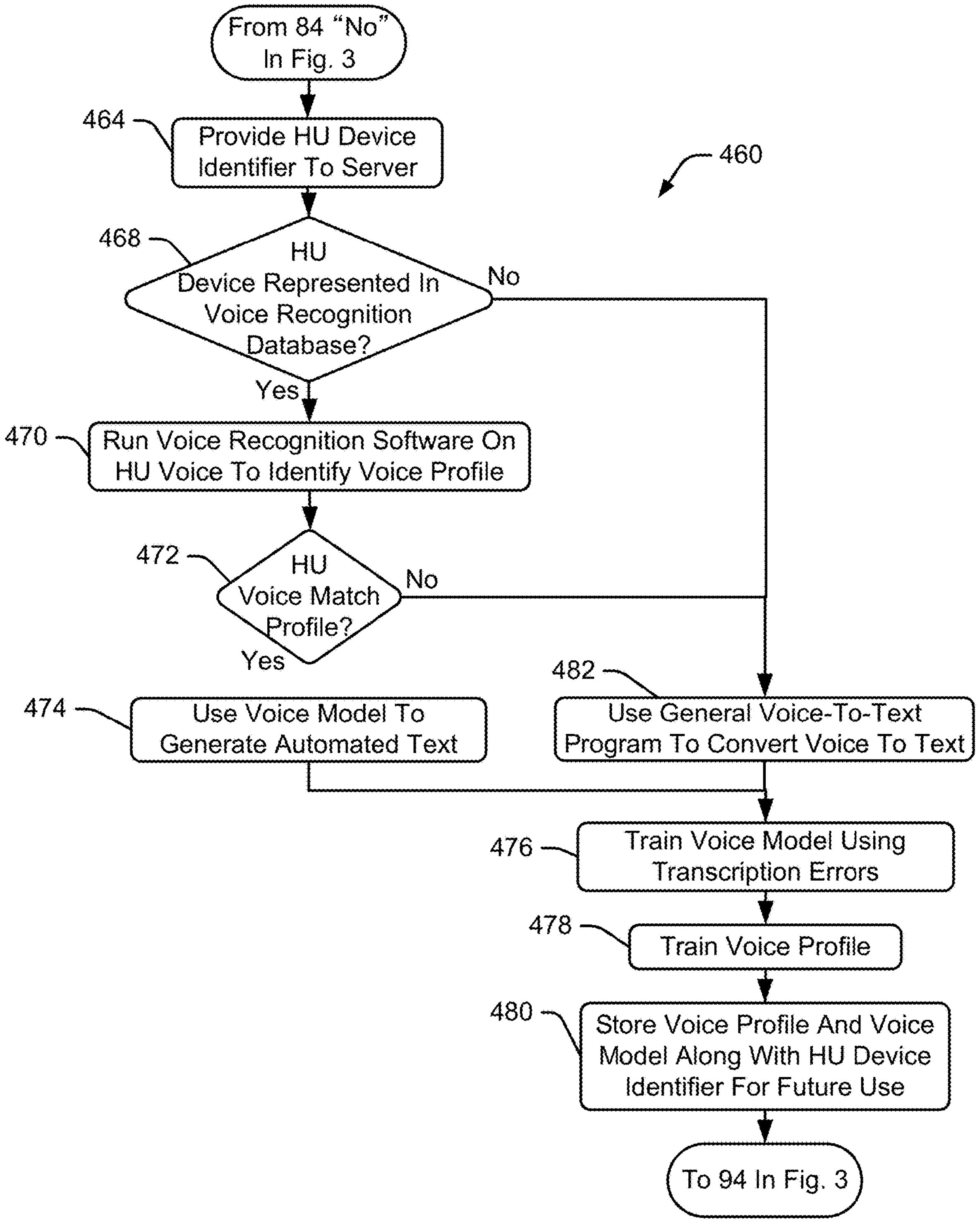
FIG. 14 is a flow chart that may be substituted for a portion of the process shown in FIG. 3 whereby voice models and voice profiles are generated for frequent HU's that communicate with an AU where the models and profiles can be subsequently used to increase accuracy of a transcription process.

FIG. 14 shows a sub-process 460 that may be substituted for a portion of the process shown in FIG. 3 wherein voice-to-text templates or models along with related voice recognition profiles for callers are stored and used to expedite the handoff to automated transcription. Prior to running sub-process 460, referring again to FIG. 1, server 30 is used to create a voice recognition database for storing HU device identifiers along with associated voice recognition profiles and associated voice-to-text models. A voice recognition profile is a data construct that can be used to distinguish one voice from others and provide improved speech to text accuracy.

In the context of the FIG. 1 system, voice recognition profiles are useful because more than one person may use a HU's device to call an AU. For instance in an exemplary case, an AU's son or daughter-in-law or one of any of three grandchildren may routinely use device 14 to call an AU and therefore, to access the correct voice-to-text model, server 30 needs to distinguish which caller's voice is being received. Thus, in many cases, the voice recognition database will include several voice recognition profiles for each HU device identifier (e.g., each HU phone number). A voice-to-text model includes parameters that are used to customize voice-to-text software for transcribing the voice of an associated HU to text.

The voice recognition database will include at least one voice model for each voice profile to be used by server 30 to automate transcription whenever a voice associated with the specific profile is identified. Data in the voice recognition database will be generated on the fly as an AU uses device 12. Thus, initially the voice recognition database will include a simple construct with no device identifiers, profiles or voice models.

Referring still to FIGS. 1 and 14 and now also to FIG. 3, at decision block 84 in FIG. 3, if the help flag is still zero (e.g., an AU has not requested CA help to correct automated text errors) control may pass to block 464 in FIG. 13 where the HU's device identifier (e.g., a phone number, an IP address, a serial number of a HU's device, etc.) is received by server 30. At block 468 server 30 determines if the HU's device identifier has already been added to the voice recognition database. If the HU's device identifier does not appear in the database (e.g., the first time the HU's device is used to connect to the AU's device) control passes to block 482 where server 30 uses a general voice-to-text program to convert the HU's voice messages to text after which control passes to block 476. At block 476 the server 30 trains a voice-to-text model using transcription errors. Again, the training will include comparing CA generated text to automated text to identify errors and using the errors to adjust model parameters so that the next time a word associated with an error is uttered by the HU, the software will identify the correct word. At block 478, server 30 trains a voice profile for the HU's voice so that the next time the HU calls, a voice profile will exist for the specific HU that can be used to identify the HU. At block 480 the server 30 stores the voice profile and voice model for the HU along with the HU device identifier for future use after which control passes back up to block 94 in FIG. 3.

Referring still to FIGS. 1 and 14, at block 468, if the HU's device is already represented in the voice recognition database, control passes to block 470 where server 30 runs voice recognition software on the HU's voice messages in an attempt to identify a voice profile associated with the specific HU. At decision block 472, if the HU's voice does not match one of the previously stored voice profiles associated with the device identifier, control passes to block 482 where the process described above continues. At block 472, if the HU's voice matches a previously stored profile, control passes to block 474 where the voice model associated with the matching profile is used to tune the voice-to-text software to be used to generate automated text.

Referring still to FIG. 14, at blocks 476 and 478, the voice model and voice profile for the HU are continually trained. Continual training enables the system to constantly adjust the model for changes in a HU's voice that may occur over time or when the HU experiences some physical condition (e.g., a cold, a raspy voice) that affects the sound of their voice. At block 480, the voice profile and voice model are stored with the HU device identifier for future use.

In at least some embodiments, server 30 may adaptively change the order of voice profiles applied to a HU's voice during the voice recognition process. For instance, while server 30 may store five different voice profiles for five different HUs that routinely connect to an AU's device, a first of the profiles may be used 80 percent of the time. In this case, when captioning is commenced, server 30 may start by using the first profile to analyze a HU's voice at block 472 and may cycle through the profiles from the most matched to the least matched.

To avoid server 30 having to store a different voice profile and voice model for every hearing person that communicates with an AU via device 12, in at least some embodiments it is contemplated that server 30 may only store models and profiles for a limited number (e.g., 5) of frequent callers. To this end, in at least some cases server 30 will track calls and automatically identify the most frequent HU devices used to link to the AU's device 12 over some rolling period (e.g., 1 month) and may only store models and profiles for the most frequent callers. Here, a separate counter may be maintained for each HU device used to link to the AU's device over the rolling period and different models and profiles may be swapped in and out of the stored set based on frequency of calls.

In other embodiments server 30 may query an AU for some indication that a specific HU is or will be a frequent contact and may add that person to a list for which a model and a profile should be stored for a total of up to five persons.

While the system described above with respect to FIG. 14 assumes that the relay 16 stores and uses voice models and voice profiles that are trained to HU's voices for subsequent use, in at least some embodiments it is contemplated that an AU's device 12 processor may maintain and use or at least have access to and use the voice recognition database to generate automated text without linking to a relay. In this case, because the AU's device runs the software to generate the automated text, the software for generating text can be trained any time the user's device receives a HU's voice messages without linking to a relay. For example, during a call between a HU and an AU on devices 14 and 12, respectively, in FIG. 1, and prior to an AU requesting captioning service, the voice messages of even a new HU can be used by the AU's device to train a voice-to-text model and a voice profile for the user. In addition, prior to a caption request, as the model is trained and gets better and better, the model can be used to generate text that can be used as fill in text (e.g., text corresponding to voice messages that precede initiation of the captioning function) when captioning is selected.

Figure 15:
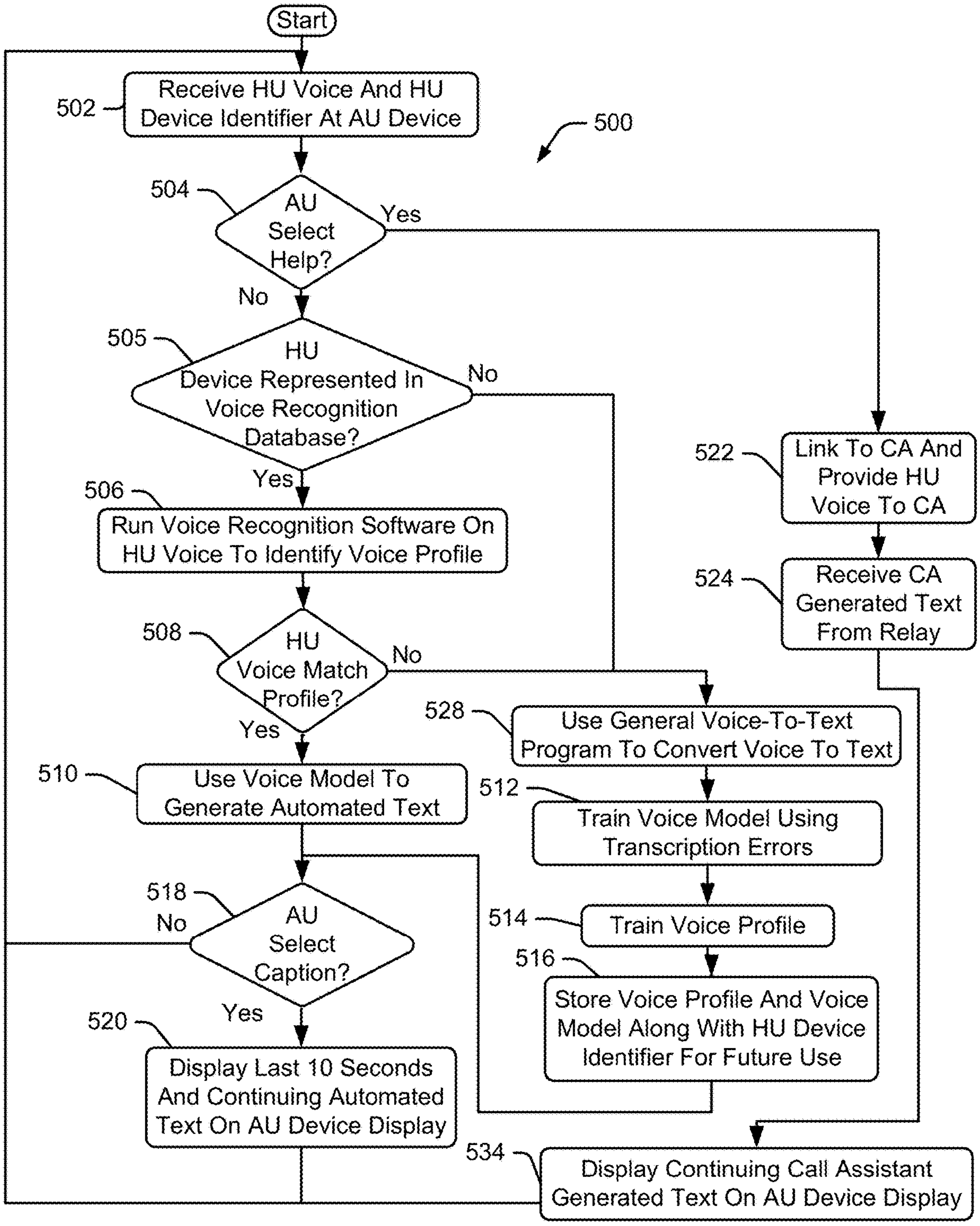
FIG. 15 is a flow chart illustrating a process similar to the sub-process shown in FIG. 14 where voice profiles and voice models are generated and stored for subsequent use during transcription.

FIG. 15 shows a process 500 that may be performed by an AU's device to train voice models and voice profiles and use those models and profiles to automate text transcription until a help button is selected. Referring also to FIG. 1, at block 502, an AU's device 12 processor receives a HU's voice messages as well as an identifier (e.g. a phone number) of the HU's device 14. At block 504 the processor determines if the AU has selected the help button (e.g., indicating that current captioning includes too many errors). If an AU selects the help button at block 504, control passes to block 522 where the AU's device is linked to a CA at relay 16 and the HU's voice is presented to the CA. At block 524 the AU's device receives text back from the relay and at block 534 the CA generated text is displayed on the AU's device display 18.

Where the help button has not been selected, control passes to block 505 where the processor uses the device identifier to determine if the HU's device is represented in the voice recognition database. Where the HU's device is not represented in the database control passes to block 528 where the processor uses a general voice-to-text program to convert the HU's voice messages to text after which control passes to block 512.

Referring again to FIGS. 1 and 15, at block 512 the processor adaptively trains the voice model using perceived errors in the automated text. To this end, one way to train the voice model is to generate text phonetically and thereafter perform a context analysis of each text word by looking at other words proximate the word to identify errors. Another example of using context to identify errors is to look at several generated text words as a phrase and compare the phrase to similar prior phrases that are consistent with how the specific HU strings words together and identify any discrepancies as possible errors. At block 514 a voice profile for the HU is generated from the HU's voice messages so that the HU's voice can be recognized in the future. At block 516 the voice model and voice profile for the HU are stored for future use during subsequent calls and then control passes to block 518 where the process described above continues. Thus, blocks 528, 512, 514 and 516 enable the AU's device to train voice models and voice profiles for HUs that call in anew where a new voice model can be used during an ongoing call and during future calls to provide generally accurate transcription.

Referring still to FIGS. 1 and 15, if the HU's device is already represented in the voice recognition database at block 505, control passes to block 506 where the processor runs voice recognition software on the HU's voice messages in an attempt to identify one of the voice profiles associated with the device identifier. At block 508, where no voice profile is recognized, control passes to block 528.

At block 508, if the HU's voice matches one of the stored voice profiles, control passes to block 510 where the voice-to-text model associated with the matching profile is used to generate automated text from the HU's voice messages. Next, at block 518, the AU's device processor determine if the caption button on the AU's device has been selected. If captioning has not been selected control passes to block 502 where the process continues to cycle. Once captioning has been requested, control passes to block 520 where AU's device 12 displays the most recent 10 seconds of automated text and continuing automated text on display 18.

In at least some embodiments it is contemplated that different types of voice model training may be performed by different processors within the overall FIG. 1 system. For instance, while an AU's device is not linked to a relay, the AU's device cannot use any errors identified by a call assistance at the relay to train a voice model as no CA is generating errors. Nevertheless, the AU's device can use context and confidence factors to identify errors and train a model. Once an AU's device is linked to a relay where a CA corrects errors, the relay server can use the CA identified errors and corrections to train a voice model which can, once sufficiently accurate, be transmitted to the AU's device where the new model is substituted for the old content based model or where the two models are combined into a single robust model in some fashion. In other cases when an AU's device links to a relay for CA captioning, a context based voice model generated by the AU's device for the HU may be transmitted to the relay server and used as an initial model to be further trained using CA identified errors and corrections. In still other cases CA errors may be provided to the AU's device and used by that device to further train a context based voice model for the HU.

Figure 16:
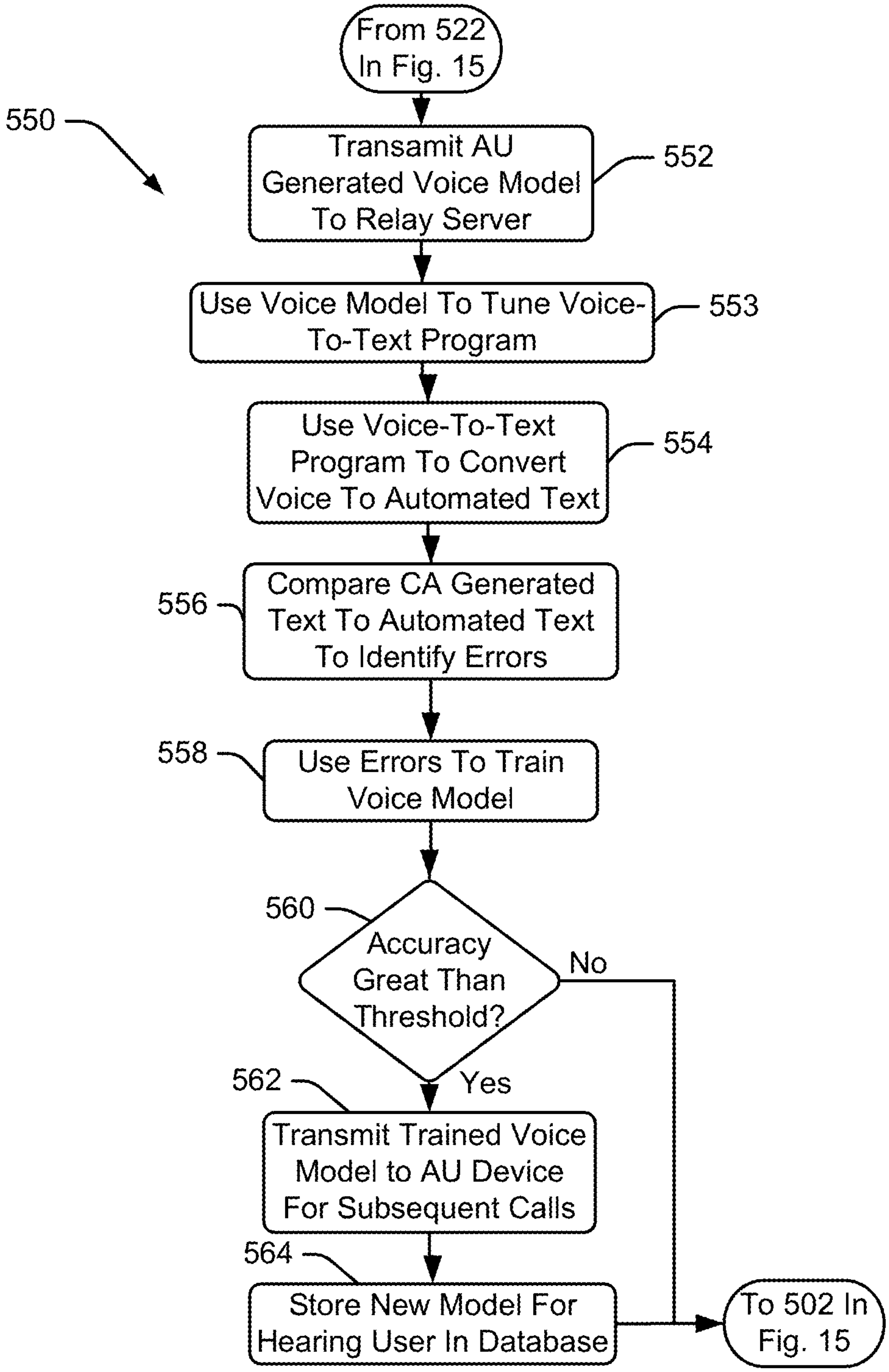
FIG. 16 is a flow chart illustrating a sub-process that may be added to the process shown in FIG. 15 where the resulting process calls for training of a voice model at each of an AU's device and a relay.

Referring now to FIG. 16, a sub-process 550 that may be added to the process shown in FIG. 15 whereby an AU's device trains a voice model for a HU using voice message content and a relay server further trains the voice model generated by the AU's device using CA identified errors is illustrated. Referring also to FIG. 15, sub-process 550 is intended to be performed in parallel with block 524 and 534 in FIG. 15. Thus, after block 522, in addition to block 524, control also passes to block 552 in FIG. 16. At block 552 the voice model for a HU that has been generated by an AU's device 12 is transmitted to relay 16 and at block 553 the voice model is used to modify a voice-to-text program at the relay. At block 554 the modified voice-to-text program is used to convert the HU's voice messages to automated text. At block 556 the CA generated text is compared to the automated text to identify errors. At block 558 the errors are used to further train the voice model. At block 560, if the voice model has an accuracy below the required standard, control passes back to block 502 in FIG. 15 where the process described above continues to cycle. At block 560, once the accuracy exceeds the standard requirement, control passes to block 562 wherein server 30 transmits the trained voice model to the AU's device for handling subsequent calls from the HU for which the model was trained. At block 564 the new model is stored in the database maintained by the AU's device.

Referring still to FIG. 16, in addition to transmitting the trained model to the AU's device at block 562, once the model is accurate enough to meet the standard requirements, server 30 may perform an automated process to cut out the CA and instead transmit automated text to the AU's device as described above in FIG. 1. In the alternative, once the model has been transmitted to the AU's device at block 562, the relay may be programmed to hand off control to the AU's device which would then use the newly trained and relatively more accurate model to perform automated transcription so that the relay could be disconnected.

Several different concepts and aspects of the present disclosure have been described above. It should be understood that many of the concepts and aspects may be combined in different ways to configure other triage systems that are more complex. For instance, one exemplary system may include an AU's device that attempts automated captioning with on the fly training first and, when automated captioning by the AU's device fails (e.g., a help icon is selected by an AU), the AU's device may link to a third party captioning system via the internet or the like where another more sophisticated voice-to-text captioning software is applied to generate automated text. Here, if the help button is selected a second time or a "CA" button is selected, the AU's device may link to a CA at the relay for CA captioning with simultaneous voice-to-text software transcription where errors in the automated text are used to train the software until a threshold accuracy requirement is met. Here, once the accuracy requirement is exceeded, the system may automatically cut out the CA and switch to the automated text from the relay until the help button is again selected. In each of the transcription hand offs, any learning or model training performed by one of the processors in the system may be provided to the next processor in the system to be used to expedite the training process.

Line Check Words

In at least some embodiments an automated voice-to-text engine may be utilized in other ways to further enhance calls handled by a relay. For instance, in cases where transcription by a CA lags behind a HU's voice messages, automated transcription software may be programmed to transcribe text all the time and identify specific words in a HU's voice messages to be presented via an AU's display immediately when identified to help the AU determine when a HU is confused by a communication delay. For instance, assume that transcription by a CA lags a HU's most current voice message by 20 seconds and that an AU is relying on the CA generated text to communicate with the HU. In this case, because the CA generated text lag is substantial, the HU may be confused when the AU's response also lags a similar period and may generate a voice message questioning the status of the call. For instance, the HU may utter "Are you there?" or "Did you hear me?" or "Hello" or "What did you say?". These phrases and others like them querying call status are referred to herein as "line check words" (LCWs) as the HU is checking the status of the call on the line.

If the line check words are not presented until they occurred sequentially in the HU's voice messages, they would be delayed for 20 or more seconds in the above example. In at least some embodiments it is contemplated that the automated voice engine may search for line check words (e.g., 50 common line check phrases) in a HU's voice messages and present the line check words immediately via the AU's device during a call regardless of which words have been transcribed and presented to an AU. The AU, seeing line check words or a phrase can verbally respond that the captioning service is lagging but catching up so that the parties can avoid or at least minimize confusion. In the alternative, a system processor may automatically respond to any line check words by broadcasting a voice message to the HU indicating that transcription is lagging and will catch up shortly. The automated message may also be broadcast to the AU so that the AU is also aware of the HU's situation.

When line check words are presented to an AU the words may be presented in-line within text being generated by a CA with intermediate blanks representing words yet to be transcribed by the CA. To this end, see again FIG. 17 that shows line check words "Are you still there?" in a highlighting box 590 at the end of intermediate blanks 216 representing words yet to be transcribed by the CA. Line check words will, in at least some embodiments, be highlighted on the display or otherwise visually distinguished. In other embodiments the line check words may be located at some prominent location on the AU's display screen (e.g., in a line check box or field at the top or bottom of the display screen).

One advantage of using an automated voice engine to only search for specific words and phrases is that the engine can be tuned for those words and will be relatively more accurate than a general purpose engine that transcribes all words uttered by a HU. In at least some embodiments the automated voice engine will be run by an AU's device processor while in other embodiments the automated voice engine may be run by the relay server with the line check words transmitted to the AU's device immediately upon generation and identification.

In still other cases where automated text is presented immediately upon generation to an AU, line check words may be presented in a visually distinguished fashion (e.g., highlighted, in different color, as a distinct font, as a uniquely sized font, etc.) so that an AU can distinguish those words from others and, where appropriate, provide a clarifying remark to a confused HU.

Figure 18:
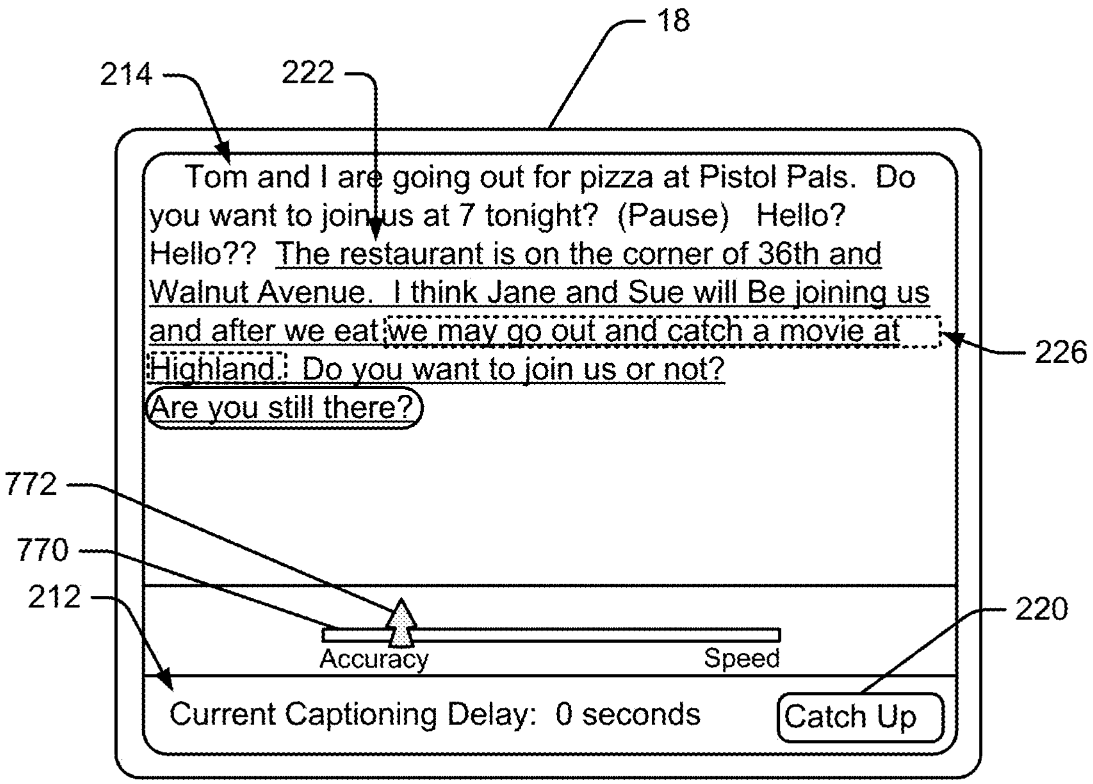
FIG. 18 is similar to FIG. 17, albeit showing a different screen shot.
Figure 19:
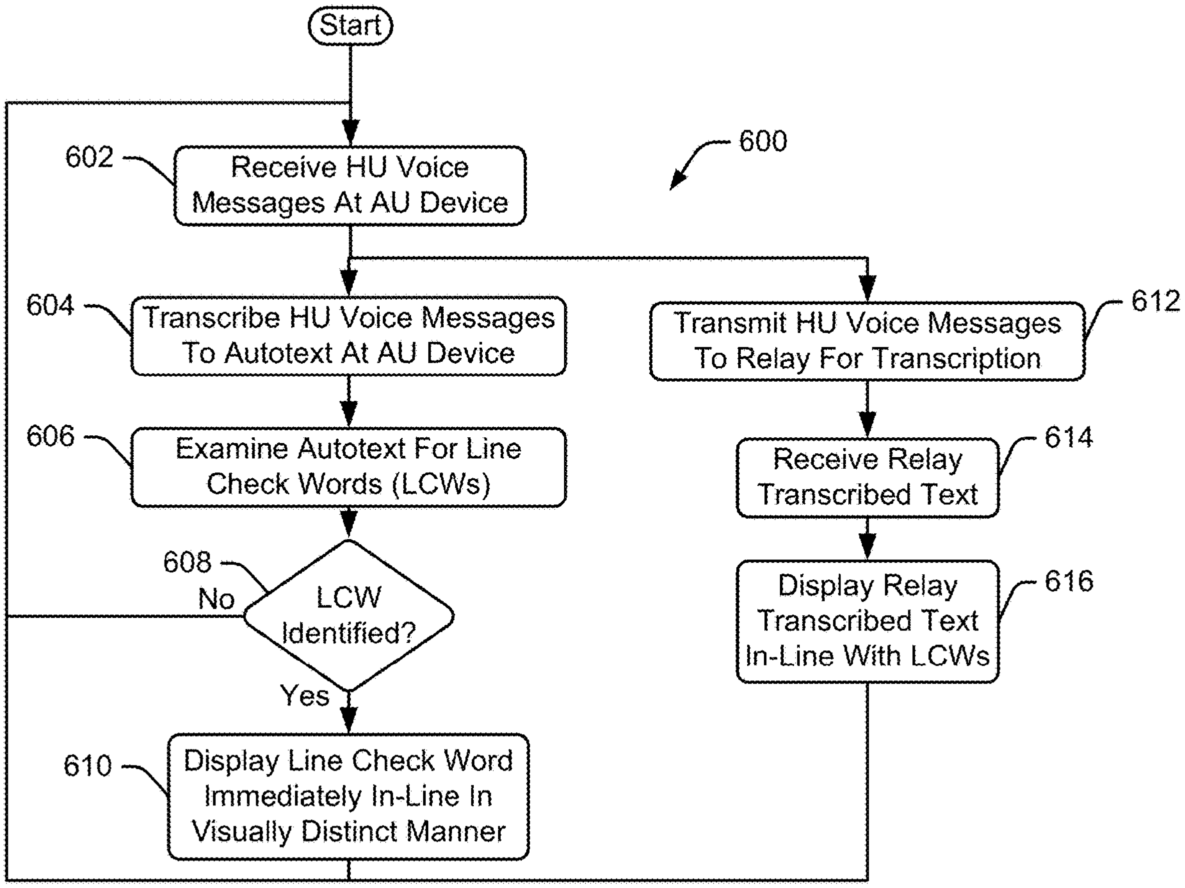
FIG. 19 is a process that may be performed by the system shown in FIG. 1 where automated text is generated for line check words and is presented to an AU immediately upon identification of the words.

Referring now to FIG. 19, a process 600 that may be performed by an AU's device 12 and a relay to transcribe HU's voice messages and provide line check words immediately to an AU when transcription by a CA lags in illustrated. At block 602 a HU's voice messages are received by an AU's device 12. After block 602 control continues along parallel sub-processes to blocks 604 and 612. At block 604 the AU's device processor uses an automated voice engine to transcribe the HU's voice messages to text. Here, it is assumed that the voice engine may generate several errors and therefore likely would be insufficient for the purposes of providing captioning to the AU. The engine, however, is optimized and trained to caption a set (e.g., 10 to 100) line check words and/or phrases which the engine can do extremely accurately. At block 606, the AU's device processor searches for line check words in the automated text. At block 608, if a line check word or phrase is not identified control passes back up to block 602 where the process continues to cycle. At block 608, if a line check word or phrase is identified, control passes to block 610 where the line check word/phrase is immediately presented (see phrase "Are you still there?" in FIG. 18) to the AU via display 18 either in-line or in a special location and, in at least some cases, in a visually distinct manner.

Referring still to FIG. 19, at block 612 the HU's voice messages are sent to a relay for transcription. At block 614, transcribed text is received at the AU's device back from the relay. At block 616 the text from the relay is used to fill in the intermediate blanks (see again FIG. 17 and also FIG. 18 where text has been filled in) on the AU's display.

ASR Suggests Errors in CA Generated Text

In at least some embodiments it is contemplated that an automated voice-to-text engine may operate all the time and may check for and indicate any potential errors in CA generated text so that the CA can determine if the errors should be corrected. For instance, in at least some cases, the automated voice engine may highlight potential errors in CA generated text on the CA's display screen inviting the CA to contemplate correcting the potential errors. In these cases the CA would have the final say regarding whether or not a potential error should be altered.

Figure 20:
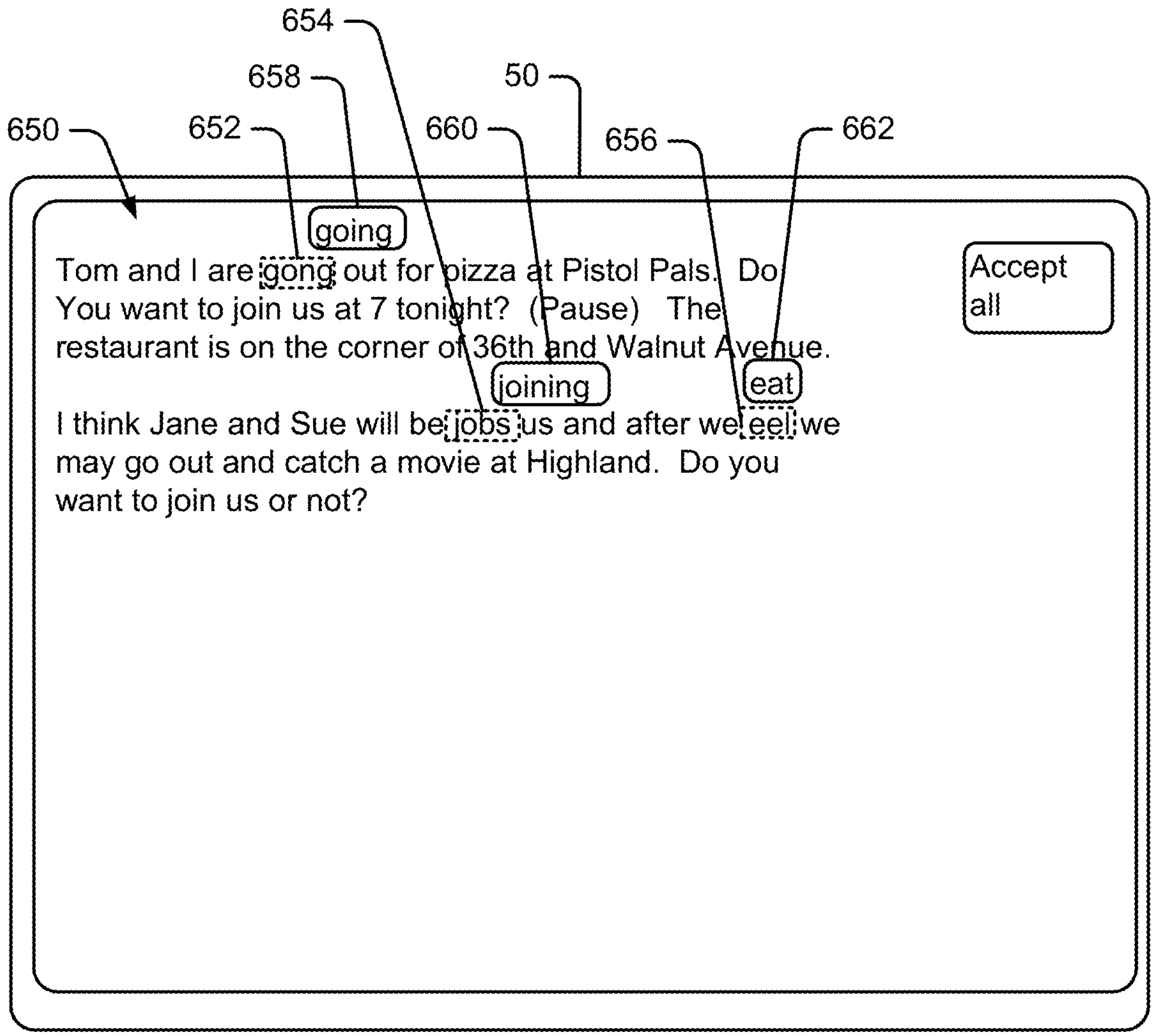
FIG. 20 is similar to FIG. 17, albeit showing a different screen shot.

Consistent with the above comments, see FIG. 20 that shows a screen shot of a CA's display screen where potential errors have been highlighted to distinguish the errors from other text. Exemplary CA generated text is shown at 650 with errors shown in phantom boxes 652, 654 and 656 that represent highlighting. In the illustrated example, exemplary words generated by an automated voice-to-text engine are also presented to the CA in hovering fields above the potentially erroneous text as shown at 658, 660 and 662. Here, a CA can simply touch a suggested correction in a hovering field or use a pointing device such as a mouse controlled cursor to select a presented word to make a correction and replace the erroneous word with the automated text suggested in the hovering field. If a CA instead touches an error, the CA can manually change the word to another word. If a CA does not touch an error or an associated corrected word, the word remains as originally transcribed by the CA. An "Accept All" icon is presented at 669 that can be selected to accept all of the suggestions presented on a CA's display. All corrected words are transmitted to an AU's device to be displayed.

Figure 21:
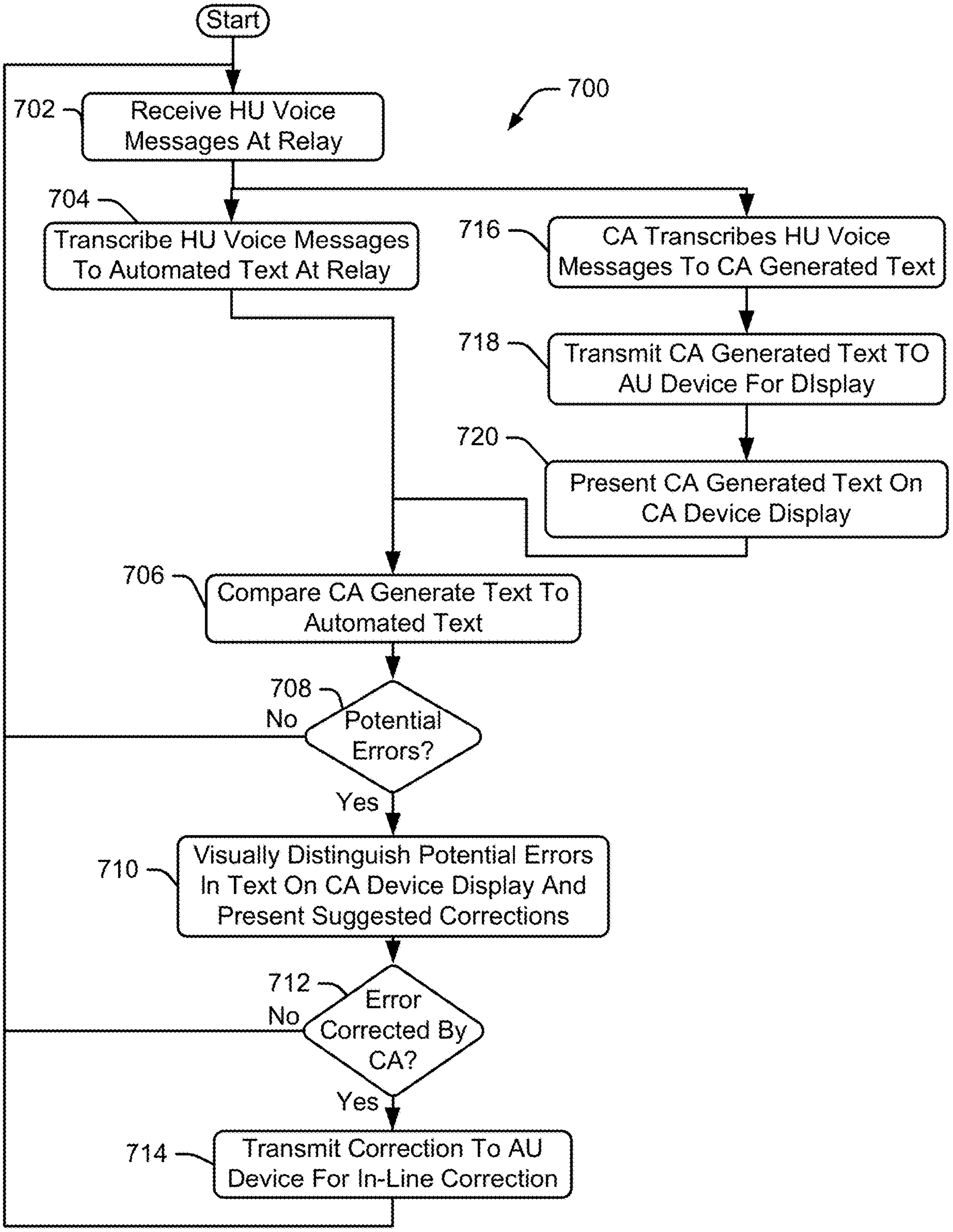
FIG. 21 is a flow chart illustrating a method whereby an automated voice-to-text engine is used to identify errors in CA generated text which can be highlighted and can be corrected by a CA.

Referring to FIG. 21, a method 700 by which a voice engine generates text to be compared to CA generated text and for providing a correction interface as in FIG. 20 for the CA is illustrated. At block 702 the HU's voice messages are provided to a relay. After block 702 control follows to two parallel paths to blocks 704 and 716. At block 704 the HU's voice messages are transcribed into text by an automated voice-to-text engine run by the relay server before control passes to block 706. At block 716 a CA transcribes the HU's voice messages to CA generated text. At block 718 the CA generated text is transmitted to the AU's device to be displayed. At block 720 the CA generated text is displayed on the CA's display screen 50 for correction after which control passes to block 706.

Referring still to FIG. 21, at block 706 the relay server compares the CA generated text to the automated text to identify any discrepancies. Where the automated text matches the CA generated text at block 708, control passes back up to block 702 where the process continues. Where the automated text does not match the CA generated text at block 708, control passes to block 710 where the server visually distinguishes the mismatched text on the CA's display screen 50 and also presents suggested correct text (e.g., the automated text). Next, at block 712 the server monitors for any error corrections by the CA and at block 714 if an error has been corrected, the corrected text is transmitted to the AU's device for in-line correction.

In at least some embodiments the relay server may be able to generate some type of probability or confidence factor related to how likely a discrepancy between automated and CA generated text is related to a CA error and may only indicate errors and present suggestions for probable errors or discrepancies likely to be related to errors. For instance, where an automated text segment is different than an associated CA generated text segment but the automated segment makes no sense contextually in a sentence, the server may not indicate the discrepancy or may not show the automated text segment as an option for correction. The same discrepancy may be shown as a potential error at a different time if the automated segment makes contextual sense.

In still other embodiments automated voice-to-text software that operates at the same time as a CA to generate text may be trained to recognize words often missed by a CA such as articles, for instance, and to ignore other words that CAs more accurately transcribe.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, while the methods above are described as being performed by specific system processors, in at least some cases various method steps may be performed by other system processors. For instance, where a HU's voice is recognized and then a voice model for the recognized HU is employed for voice-to-text transcription, the voice recognition process may be performed by an AU's device and the identified voice may be indicated to a relay 16 which then identifies a related voice model to be used. As another instance, a HU's device may identify a HU's voice and indicate the identity of the HU to the AU's device and/or the relay.

As another example, while the system is described above in the context of a two line captioning system where one line links an AU's device to a HU's device and a second line links the AU's device to a relay, the concepts and features described above may be used in any transcription system including a system where the HU's voice is transmitted directly to a relay and the relay then transmits transcribed text and the HU's voice to the AU's device.

As still one other example, while inputs to an AU's device may include mechanical or virtual on screen buttons/icons, in some embodiments other inputs arrangements may be supported. For instance, in some cases help or a captioning request may be indicated via a voice input (e.g., verbal a request for assistance or for captioning) or via a gesture of some type (e.g., a specific hand movement in front of a camera or other sensor device that is reserved for commencing captioning).

As another example, in at least some cases where a relay includes first and second differently trained CAs where first CAs are trained to be capable of transcribing and correcting text and second CAs are only trained to be capable of correcting text, a CA may always be on a call but the automated voice-to-text software may aid in the transcription process whenever possible to minimize overall costs. For instance, when a call is initially linked to a relay so that a HU's voice is received at the relay, the HU's voice may be provided to a first CA fully trained to transcribe and correct text. Here, voice-to-text software may train to the HU's voice while the first CA transcribes the text and after the voice-to-text software accuracy exceeds a threshold, instead of completely cutting out the relay or CA, the automated text may be provided to a second CA that is only trained to correct errors. Here, after training the automated text should have minimal errors and therefore even a minimally trained CA should be able to make corrections to the errors in a timely fashion. In other cases, a first CA assigned to a call may only correct errors in automated voice-to-text transcription and a fully trained revoicing and correcting CA may only be assigned after a help or caption request is received.

In other systems an AU's device processor may run automated voice-to-text software to transcribe HU's voice messages and may also generate a confidence factor for each word in the automated text based on how confident the processor is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, the device processor may link to a relay for more accurate transcription either via more sophisticated automated voice-to-text software or via a CA. The automated process for linking to a relay may be used instead of or in addition to the process described above whereby an AU selects a "caption" button to link to a relay.

User Customized Complex Words

In addition to storing HU voice models, a system may also store other information that could be used when an AU is communicating with specific HU's to increase accuracy of automated voice-to-text software when used. For instance, a specific HU may routinely use complex words from a specific industry when conversing with an AU. The system software can recognize when a complex word is corrected by a CA or contextually by automated software and can store the word and the pronunciation of the word by the specific HU in a HU word list for subsequent use. Then, when the specific HU subsequently links to the AU's device to communicate with the AU, the stored word list for the HU may be accessed and used to automate transcription. The HU's word list may be stored at a relay, by an AU's device or even by a HU's device where the HU's device has data storing capability.

In other cases a word list specific to an AU's device (i.e., to an AU) that includes complex or common words routinely used to communicate with the AU may be generated, stored and updated by the system. This list may include words used on a regular basis by any HU that communicates with an AU. In at least some cases this list or the HU's word lists may be stored on an internet accessible database (e.g., in the "cloud") so that the AU or some other person has the ability to access the list(s) and edit words on the list via an internet portal or some other network interface.

Where an HU's complex or hard to spell word list and/or an AU's word list is available, when a CA is creating CA generated text (e.g., via revoicing, typing, etc.), an ASR engine may always operate to search the HU voice signal to recognize when a complex or difficult to spell word is annunciated and the complex or hard to spell words may be automatically presented to the CA via the CA display screen in line with the CA generated text to be considered by the CA. Here, while the CA would still be able to change the automatically generated complex word, it is expected that CA correction of those words would not occur often given the specialized word lists for the specific communicating parties.

Dialect and Other Basis for Specific Transcription Programs

In still other embodiments various aspects of a HU's voice messages may be used to select different voice-to-text software programs that are optimized for voices having different characteristic sets. For instance, there may be different voice-to-text programs optimized for male and female voices or for voices having different dialects. Here, system software may be able to distinguish one dialect from others and select an optimized voice engine/software program to increase transcription accuracy. Similarly, a system may be able to distinguish a high pitched voice from a low pitched voice and select a voice engine accordingly.

In some cases a voice engine may be selected for transcribing a HU's voice based on the region of a country in which a HU's device resides. For instance, where a HU's device is located in the southern part of the United States, an engine optimized for a southern dialect may be used while a device in New England may cause the system to select an engine optimized for another dialect. Different word lists may also be used based on region of a country in which a HU's device resides.

Indicating/Selecting Caption Source

In at least some cases it is contemplated that an AU's device will provide a text or other indication to an AU to convey how text that appears on an AU device display 18 is being generated. For instance, when automated voice-to-text software (e.g., an automated voice recognition (ASR) system) is generating text, the phrase "Software Generated Text" may be persistently presented (see 729 in FIG. 22) at the top of a display 18 and when CA generated text is presented, the phrase "CA Generated Text" (not illustrated) may be presented. A phrase "CA Corrected Text" (not illustrated) may be presented when automated Text is corrected by a CA.

In some cases a set of virtual buttons (e.g., 68 in FIG. 1) or mechanical buttons may be provided via an AU device allowing an AU to select captioning preferences. For instance, captioning options may include "Automated/Software Generated Text", "CA Generated Text" (see virtual selection button 719 in FIG. 22) and "CA Corrected Text" (see virtual selection button 721 in FIG. 22). This feature allows an AU to preemptively select a preference in specific cases or to select a preference dynamically during an ongoing call. For example, where an AU knows from past experience that calls with a specific HU result in excessive automated text errors, the AU could select "CA generated text" to cause CA support to persist during the duration of a call with the specific HU.

Caption Confidence Indication

In at least some embodiments, automated voice-to-text accuracy may be tracked by a system and indicated to any one or a subset of a CA, an AU, and an HU either during CA text generation or during automated text presentation, or both. Here, the accuracy value may be over the duration of an ongoing call or over a short most recent rolling period or number of words (e.g., last 30 seconds, last 100 words, etc.), or for a most recent HU turn at talking. In some cases two averages, one over a full call period and the other over a most recent period, may be indicated. The accuracy values would be provided via the AU device display 18 (see 728 in FIG. 22) and/or the CA workstation display 50. Where an HU device has a display (e.g., a smart phone, a tablet, etc.), the accuracy value(s) may be presented via that display in at least some cases. To this end, see the smart phone type HU device 800 in FIG. 24 where an accuracy rate is displayed at 802 for a call with an AU. It is expected that seeing a low accuracy value would encourage an HU to try to annunciate words more accurately or slowly to improve the value.

Non-Text Communication Enhancements

Human communication has many different components and the meanings ascribed to text words are only one aspect of that communication. One other aspect of human non-text communication includes how words are annunciated which often belies a speakers emotions or other meaning. For instance, a simple change in volume while words are being spoken is often intended to convey a different level of importance. Similarly, the duration over which a word is expressed, the tone or pitch used when a phrase is annunciated, etc., can convey a different meaning. For instance, annunciating the word "Yes" quickly can connote a different meaning than annunciating the word "Yes" very slowly or such that the "s" sound carries on for a period of a few seconds. A simple text word representation is devoid of a lot of meaning in an originally spoken phrase in many cases.

In at least some embodiments of the present disclosure it is contemplated that volume changes, tone, length of annunciation, pitch, etc., of an HU's voice signal may be sensed by automated software and used to change the appearance of or otherwise visually distinguish transcribed text that is presented to an AU via a device display 18 so that the AU can more fully understand and participate in a richer communication session. To this end, see, for instance, the two textual effects 732 and 734 in AU device text 730 in FIG. 22 where an arrow effect 732 represents a long annunciation period while a bolded/italicized effect 734 represents an appreciable change in HU voice signal volume. Many other non-textual characteristics of an HU voice signal are contemplated and may be sensed and each may have a different appearance. For instance, pitch, speed of speaking, etc., may all be automatically determined and used to provide effect distinct visual cues along with the transcribed text.

The visual cues may be automatically provided with or used to distinguish text presented via an AU device display regardless of the source of the text. For example, in some cases automated text may be supplemented with visual cues to indicate other communication characteristics and in at least some cases even CA generated text may be supplemented with automatically generated visual cues indicating how an HU annunciates various words and phrases. Here, as voice characteristics are detected for an HU's utterances, software tracks the voice characteristics in time and associates those characteristics with specific text words or phrases generated by the CA. Then, the visual cues for each voice characteristic are used to visually distinguish the associated words when presented to the AU.

In at least some cases an AU may be able to adjust the degree to which text is enhanced via visual cues or even to select preferred visual cues for different automatically identified voice characteristics. For instance, a specific AU may find fully enabled visual queuing to be distracting and instead may only want bold capital letter visual queuing when an HU's volume level exceeds some threshold value. AU device preferences may be set via a display 18 during some type device of commissioning process.

In some embodiments it is contemplated that the automated software that identifies voice characteristics will adjust or train to an HU's voice during the first few seconds of a call and will continue to train to that voice so that voice characteristic identification is normalized to the HU's specific voice signal to avoid excessive visual queuing. Here, it has been recognized that some people's voices will have persistent voice characteristics that would normally be detected as anomalies if compared to a voice standard (e.g., a typical male or female voice). For instance, a first HU may always speak loudly and therefore, if his voice signal was compared to an average HU volume level, the voice signal would exceed the average level most if not all the time. Here, to avoid always distinguishing the first HU's voice signal with visual queuing indicating a loud voice, the software would use the HU voice signal to determine that the first HU's voice signal is persistently loud and would normalize to the loud signal so that words uttered within a range of volumes near the persistent loud volume would not be distinguished as loud. Here, if the first HU's voice signal exceeds the range about his persistent volume level, the exceptionally loud signal may be recognized as a clear deviation from the persistent volume level for the normalized voice and therefore distinguished with a visual queue for the AU when associated text is presented. The voice characteristic recognizing software would automatically train to the persistent voice characteristics for each HU including for instance, pitch, tone, speed of annunciation, etc., so that persistent voice characteristics of specific HU voice signals are not visually distinguished as anomalies.

In at least some cases, as in the case of voice models developed and stored for specific HUs, it is contemplated that HU voice models may also be automatically developed and stored for specific HU's for specifying voice characteristics. For instance, in the above example where a first HU has a particularly loud persistent voice, the volume range about the first HU's persistent volume as well as other persistent characteristics may be determined once during an initial call with an AU and then stored along with a phone number or other HU identifying information in a system database. Here, the next time the first HU communicates with an AU via the system, the HU voice characteristic model would be automatically accessed and used to detect voice characteristic anomalies and to visually distinguish accordingly.

Referring again to FIG. 22, in addition to changing the appearance of transcribed text to indicate annunciation qualities or characteristics, other visual cues may be presented. For instance, if an HU persistently talks in a volume that is much higher than typical for the HU, a volume indicator 717 may be presented or visually altered in some fashion to indicate the persistent volume. As another example, a volume indicator 715 may be presented above or otherwise spatially proximate any word annunciated with an unusually high volume. In some cases the distinguishing visual queue for a specially annunciated word may only persist for a short duration (e.g., 3 seconds, until the end of a related sentence or phrase, for the next 5 words of an utterance, etc.) and then be eliminated. Here, the idea is that the visual queuing is supposed to mimic the effect of an annunciated word or phrase which does not persist long term (e.g., the loud effect of a high volume word only persists as the word is being annunciated).

The software used to generate the HU voice characteristic models and/or to detect voice anomalies to be visually distinguished may be run via any of an HU device processor, an AU device processor, a relay processor and a third party operated processor linkable via the internet or some other network. In at least some cases it will be optimal for an HU device to develop the HU model for an HU that is associated with the device and to store the model and apply the model to the HU's voice to detect anomalies to be visually distinguished for several reasons. In this regard, a particularly rich acoustic HU voice signal is available at the HU device so that anomalies can be better identified in many cases by the HU device as opposed to some processor downstream in the captioning process.

Sharing Text with HU

Referring again to FIG. 24, in at least some embodiments where an HU device 800 includes a display screen 801, an HU voice text transcription 804 may also be presented via the HU device. Here, an HU viewing the transcribed text could formulate an independent impression of transcription accuracy and whether or not a more robust transcription process (e.g., CA generation of text) is required or would be preferred. In at least some cases a virtual "CA request" button 806 or the like may be provided on the HU screen for selection so that the HU has the ability to initiate CA text transcription and or CA correction of text. Here, an HU device may also allow an HU to switch back to automated text if an accuracy value 802 exceeds some threshold level. Where HU voice characteristics are detected, those characteristics may be used to visually distinguish text at 804 in at least some embodiments.

Captioning Via HU's Device

Where an HU device is a smart phone, a tablet computing device or some other similar device capable of downloading software applications from an application store, it is contemplated that a captioning application may be obtained from an application store for communication with one or more AU devices 12. For instance, the son or daughter of an AU may download the captioning application to be used any time the device user communicates with the AU. Here, the captioning application may have any of the functionality described in this disclosure and may result in a much better overall system in various ways.

For instance, a captioning application on an HU device may run automated voice-to-text software on a digital HU voice signal as described above where that text is provided to the AU device 12 for display and, at times, to a relay for correction, voice model training, voice characteristic model training, etc. As another instance, an HU device may train a voice model for an HU any time an HU's voice signal is obtained regardless of whether or not the HU is participating in a call with an AU. For example, if a dictation application on an HU device which is completely separate from a captioning application is used to dictate a letter, the HU voice signal during dictation may be used to train a general HU voice model for the HU and, more specifically, a general model that can be used subsequently by the captioning system or application. Similarly, an HU voice signal captured during entry of a search phrase into a browser or an address into mapping software which is independent of the captioning application may be used to further train the general voice model for the HU. Here, the general voice model may be extremely accurate even before used in by AU captioning application. In addition, an accuracy value for an HU's voice model may be calculated prior to an initial AU communication so that, if the accuracy value exceeds a high or required accuracy standard, automated text transcription may be used for an HU-AU call without requiring CA assistance, at least initially.

For instance, prior to an initial AU call, an HU device processor training to an HU voice signal may assign confidence factors to text words automatically transcribed by an ASR engine from HU voice signals. As the software trains to the HU voice, the confidence factor values would continue to increase and eventually should exceed some threshold level at which initial captioning during an AU communication would meet accuracy requirements set by the captioning industry.

As another instance, an HU voice model stored by or accessible by the HU device can be used to automatically transcribe text for any AU device without requiring continual redevelopment or teaching of the HU voice model. Thus, one HU device may be used to communicate with two separate hearing impaired persons using two different AU devices without each sub-system redeveloping the HU voice model.

As yet another instance, an HU's smart phone or tablet device running a captioning application may link directly to each of a relay and an AU's device to provide one or more of the HU voice signal, automated text and/or an HU voice model or voice characteristic model to each. This may be accomplished through two separate phone lines or via two channels on a single cellular line or via any other combination of two communication links.

In some cases an HU voice model may be generated by a relay or an AU's device or some other entity (e.g., a third party ASR engine provider) over time and the HU voice model may then be stored on the HU device or rendered accessible via that device for subsequent transcription. In this case, one robust HU voice model may be developed for an HU by any system processor or server independent of the HU device and may then be used with any AU device and relay for captioning purposes.

Assessing/Indicating Communication Characteristics

In still other cases, at least one system processor may monitor and assess line and/or audio conditions associated with a call and may present some type of indication to each or a subset of an AU, an HU and a CA to help each or at least one of the parties involved in a call to assess communication quality. For instance, an HU device may be able to indicate to an AU and a CA if the HU device is being used as a speaker phone which could help explain an excessive error rate and help with a decision related to CA captioning involvement. As another instance, an HU's device may independently assess the level of non-HU voice signal noise being picked up by an HU device microphone and, if the determined noise level exceeds some threshold value either by itself or in relation to the signal strength of the HU voice signal, may perform some compensatory or corrective function. For example, one function may be to provide a signal to the HU indicating that the noise level is high. Another function may be to provide a noise level signal to the CA or the AU which could be indicated on one or both of the displays 50 and 18. Yet another function would be to offer one or more captioning options to any of the HU or AU or even to a text correcting CA when the noise level exceeds the threshold level. Here, the idea is that as the noise level increases, the likelihood of accurate ASR captioning will typically decrease and therefore more accurate and robust captioning options should be available.

As another instance, an HU device may transmit a known signal to an AU device which returns the known signal to the HU device and the HU device may compare the received signal to the known signal to determine line or communication link quality. Here, the HU may present a line quality value as shown at 808 in FIG. 24 for the HU to consider. Similarly, an AU device may generate a line quality value in a similar fashion and may present the line quality signal (not illustrated) to the AU to be considered.

In some cases system devices may monitor a plurality of different system operating characteristics such as line quality, speaker phone use, non-voice noise level, voice volume level, voice signal pace, etc., and may present one or more "coaching" indications to any one of or a subset of the HU, CA and AU for consideration. Here, the coaching indications should help the parties to a call understand if there is something they can do to increase the level of captioning accuracy. Here, in at least some cases only the most impactful coaching indications may be presented and different entities may receive different coaching indications. For instance, where noise at HU location exceeds a threshold level, a noise indicating signal may only be presented to the HU. Where the system also recognizes that line quality is only average, that indication may be presented to the AU and not to the HU while the HU's noise level remains high. If the HU moves to a quieter location, the noise level indication on the HU device may be replaced with a line quality indication. Thus, the coaching indications should help individual call entities recognize communication conditions that they can effect or that may be the cause of or may lead to poor captioning results for the AU.

In some cases coaching may include generating a haptic feedback or audible signal or both and a text message for an HU and/or an AU. To this end, while AU's routinely look at their devices to see captions during a caption assisted call, many HUs do not look at their devices during a call and simply rely on audio during communication. In the case of an AU, in some cases even when captioning is presented to an AU the AU may look away from their device display at times when their hearing is sufficient. By providing a haptic or audible or both additional signals, a user's attention can be drawn to their device displays where a warning or call state text message may present more information such as, for instance, an instruction to "Speak louder" or "Move to a less noisy space", for consideration.

Text Lag Constraints

In some embodiments an AU may be able to set a maximum text lag time such that automated text generated by an ASR engine is used to drive an AU device screen 18 when a CA generated text lag reaches the maximum value.

For instance, an AU may not want text to lag behind a broadcast HU voice signal by more than 7 seconds and may be willing to accept a greater error rate to stay within the maximum lag time period. Here, CA captioning/correction may proceed until the maximum lag time occurs at which point automated text may be used to fill in the lag period up to a current HU voice signal on the AU device and the CA may be skipped ahead to the current HU signal automatically to continue the captioning process. Again, here, any automated fill in text or text not corrected by a CA may be visually distinguished on the AU device display as well as on the CA display for consideration.

It has been recognized that many AU's using text to understand a broadcast HU voice signal prefer that the text lag behind the voice signal at least some short amount of time. For instance, an AU talking to an HU may stair off into space while listening to the HU voice signal and, only when a word or phrase is not understood, may look to text on display 18 for clarification. Here, if text were to appear on a display 18 immediately upon audio broadcast to an AU, the text may be several words beyond the misunderstood word by the time the AU looks at the display so that the AU would be required to hunt for the word. For this reason, in at least some embodiments, a short minimum text delay may be implemented prior to presenting text on display 18. Thus, all text would be delayed at least 2 seconds in some cases and perhaps longer where a text generation lag time exceeds the minimum lag value. As with other operating parameters, in at least some cases an AU may be able to adjust the minimum voice-to-text lag time to meet a personal preference.

It has been recognized that in cases where transcription switches automatically from a CA to an ASR engine when text lag exceeds some maximum lag time, it will be useful to dynamically change the threshold period as a function of how a communication between an HU and an AU is progressing. For instance, periods of silence in an HU voice signal may be used to automatically adjust the maximum lag period. For example, in some cases if silence is detected in an HU voice signal for more than three seconds, the threshold period to change from CA text to automatic text generation may be shortened to reflect the fact that when the HU starts speaking again, the CA should be closer to a caught up state. Then, as the HU speaks continuously for a period, the threshold period may again be extended. The threshold period prior to automatic transition to the ASR engine to reduce or eliminate text lag may be dynamically changed based on other operating parameters. For instance, rate of error correction by a CA, confidence factor average in ASR text, line quality, noise accompanying the HU voice signal, or any combination of these and other factors may be used to change the threshold period.

One aspect described above relates to an ASR engine recognizing specific or important phrases like questions (e.g., see phrase "Are you still there?") in FIG. 18 prior to CA text generation and presenting those phrases immediately to an AU upon detection. Other important phrases may include phrases, words or sound anomalies that typically signify "turn markers" (e.g., words or sounds often associated with a change in speaker from AU to HU or vice versa). For instance, if an HU utters the phrase "What do you think?" followed by silence, the combination including the silent period may be recognized as a turn marker and the phrase may be presented immediately with space markers (e.g., underlined spaces) between CA text and the phrase to be filled in by the CA text transcription once the CA catches up to the turn marker phrase.

Figure 22:
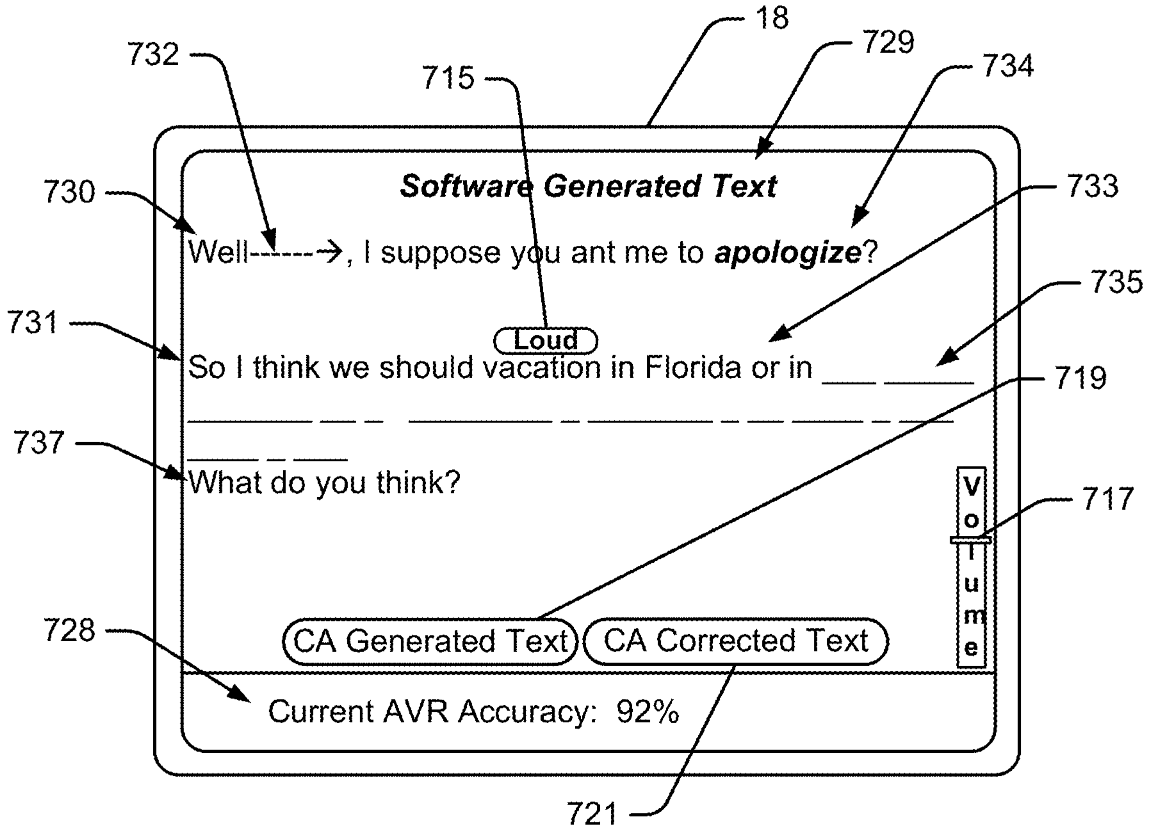
FIG. 22 is an exemplary AU device display screen shot that illustrates visually distinct text to indicate non-textual characteristics of an HU voice signal to an AU.

To this end, see the text at 731 in FIG. 22 where CA generated text is shown at 733 with a lag time indicated by underlined spaces at 735 and an ASR recognized turn marker phrase presented at 737. In this type of system, in some cases the ASR engine will be programmed with a small set (e.g., 100-300) of common turn marker phrases that are specifically sought in an HU voice signal and that are immediately presented to the AU when detected. In some cases, non-text voice characteristics like the change in sound that occurs at the end of a question which is often the signal for a turn marker may be sought in an HU voice signal and any ASR generated text within some prior period (e.g., 5 seconds, the previous 8 words, etc.) may be automatically presented to an AU.

Automatic Voice Signal Routing Based on Call Type

It has been recognized that some types of calls can almost always be accurately handled by an ASR engine. For instance, auto-attendant type calls can typically be transcribed accurately via an ASR. For this reason, in at least some embodiments, it is envisioned that a system processor at the AU device or at the relay may be able to determine a call type (e.g., auto-attendant or not, or some other call type routinely accurately handled by an ASR engine) and automatically route calls within the overall system to the best and most efficient/effective option for text generation. Thus, for example, in a case where an AU device manages access to an ASR operated by a third party and accessible via an internet link, when an AU places a call that is received by an auto-attendant system, the AU device may automatically recognize the answering system as an auto-attendant type and instead of transmitting the auto-attendant voice signal to a relay for CA transcription, may transmit the auto-attendant voice signal to the third party ASR engine for text generation.

In this example, if the call type changes mid-stream during its duration, the AU device may also transmit the received voice signal to a CA for captioning if appropriate. For instance, if an interactive voice recognition auto-attendant system eventually routes the AU's call to a live person (e.g., a service representative for a company), once the live person answers the call, the AU device processor may recognize the person's voice as a non-auto-attendant signal and route that signal to a CA for captioning as well as to the ASR for voice model training. In these cases, the ASR engine may be specially tuned to transcribe auto-attendant voice signals to text and, when a live HU gets on the line, would immediately start training a voice model for that HU's voice signal.

Synchronizing Voice and Text for Playback

In cases or at times when HU voice signals are transcribed automatically to text via an ASR engine when a CA is only correcting ASR generated text, the relay may include a synchronizing function or capability so that, as a CA listens to an HU's voice signal during an error correction process, the associated text from the ASR is presented generally synchronously to the CA with the HU voice signal. For instance, in some cases an ASR transcribed word may be visually presented via a CA display 50 at substantially the same instant at which the word is broadcast to the CA to hear. As another instance, the ASR transcribed word may be presented one, two, or more seconds prior to broadcast of that word to the CA.

In still other cases, the ASR generated text may be presented for correction via a CA display 50 immediately upon generation and, as the CA controls broadcast speed of the HU voice signal for correction purposes, the word or phrase instantaneously audibly broadcast may be highlighted or visually distinguished in some fashion. To this end, see FIG. 23 where automated ASR generated text is shown at 748 where a word instantaneously audibly broadcast to a CA (see 752) is simultaneously highlighted at 750. Here, as the words are broadcast via CA headset 54, the text representations of the words are highlighted or otherwise visually distinguished to help the error correcting CA follow along. Here, highlighting may be linked to the start time of a word being broadcast, to the end time of the word being broadcast, or in any other way to the start or end time of the word. For instance, in some cases a word may be highlighted one second prior to broadcast of the word and may remain highlighted for one second subsequent to the end time of the broadcast so that several words are typically highlighted at a time generally around a currently audibly broadcast word.

Figure 23:
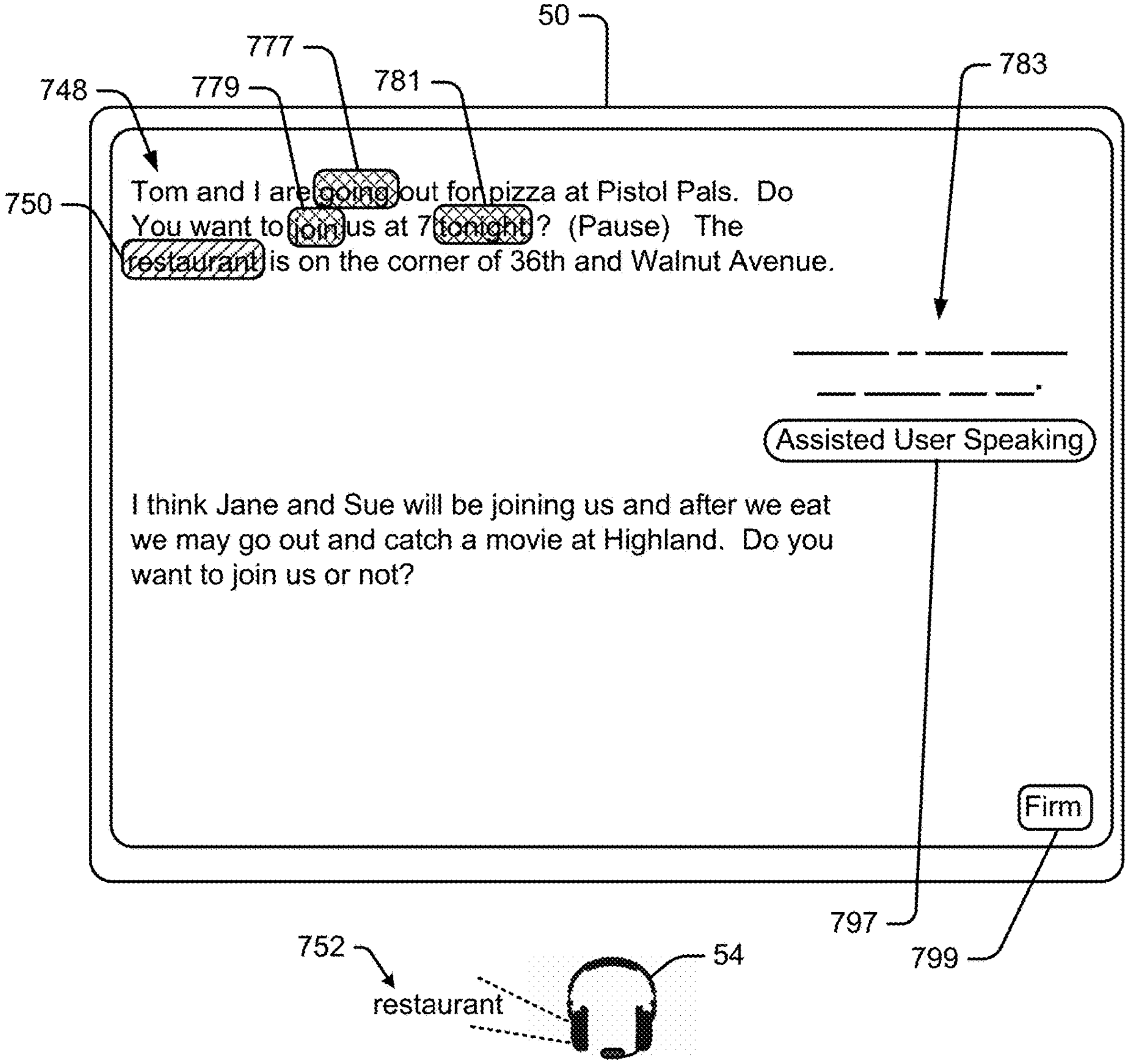
FIG. 23 is an exemplary CA workstation display screen shot that shows how automated ASR text associated with an instantaneously broadcast word may be visually distinguished for an error correcting CA.
Figure 23A:
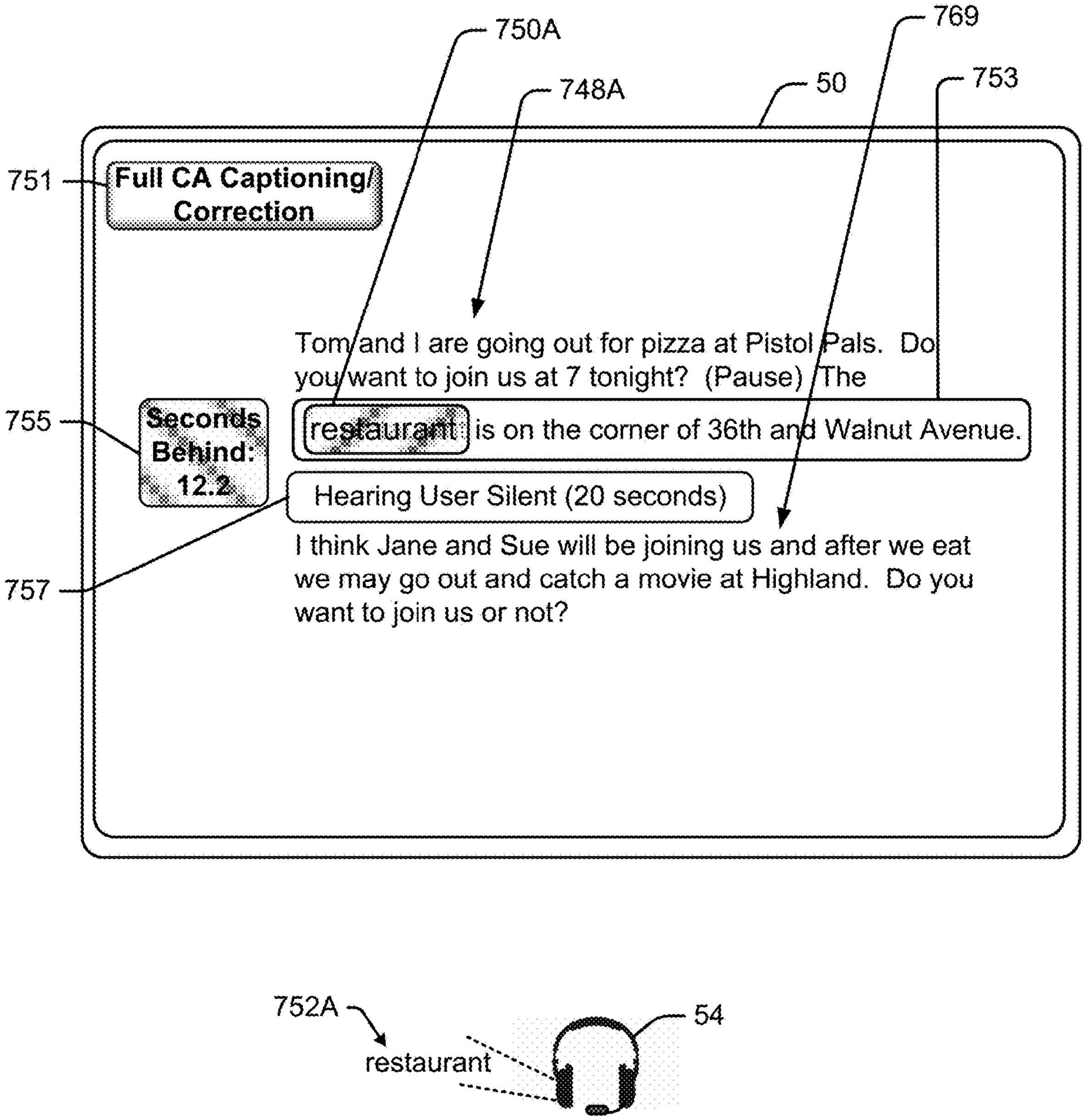
FIG. 23A is a screen shot of a CA interface providing an option to switch from ASR generated text to a full CA system where a CA generates caption text.

As another example, see FIG. 23A where ASR generated text is shown at 748A. Here, a word 752A instantaneously broadcast to a CA via headset 54 is highlighted at 750A. In this case, however, ASR text scrolls up as words are audibly broadcast to the CA so that a line of text including an instantaneously broadcast word is always generally located at the same vertical height on the display screen 50 (e.g., just above a horizontal center line in the exemplary embodiment in FIG. 23A). Here, by scrolling the text up, unless correcting text in a different line, the CA can simply focus on the one line of text presented in stationary field 753 and specifically the highlighted word at 750A to focus on the word audibly broadcast. In other cases it is contemplated that the highlight at 750A may in fact be a stationary word field and that even the line of text in field 753 may scroll from right to left so that the instantaneously broadcast word will be located in a stationary word field generally near the center of the screen 50. In this way the CA may be able to simply concentrate on one screen location to view the broadcast word.

Referring still to FIG. 23A, a selectable button 751 (hereinafter a "caption source switch button" unless indicated otherwise) allows a CA to manually switch from the ASR text generation to full CA assistance where the CA generates text and corrects that text instead of starting with ASR generated text. In addition, a "seconds behind" field 755 is presented proximate the highlighted broadcast word 750A so that the CA has ready access to that field to ascertain how far behind the CA is in terms of listening to the HU voice message for correction. In addition, an HU silent field 757 is presented that indicates a duration of time between HU voice message segments during which the HU remains silent (e.g., does not speak). Here, in some cases the HU may simply pause to allow the AU to respond and that pause would be considered silence.

Referring still to FIG. 23A, field 755 indicates that the audible broadcast is only 12.2 seconds behind despite the illustrated 20 seconds of HU silence at 757 and many ASR words that follow the instantaneously broadcast word at 750A. Here, a system processor accounts for the 20 seconds of HU silence when calculating the seconds behind value as the system can remove that silent period from CA consideration so that the CA can catch up more quickly. Thus, in the FIG. 23A example, the duration of time between when an HU actually uttered the words "restaurant" at 750A and "not" at 759 may be 32.2 seconds but the system can recognize that the HU was silent during 20 of those seconds so that the seconds behind calculation may be 12.2 seconds as shown.

In at least some cases when the seconds behind delay exceeds some threshold value, the system may automatically indicate that condition as a warning or alert to the CA. For instance, assume that the threshold delay is four seconds. Here, when the second behind value exceeds four seconds, in at least some cases, the seconds behind field may be highlighted or otherwise visually distinguished as an alert. In FIG. 23A, field 755 is shown as left down to right cross hatched to indicate the color red as an alert because the four second delay threshold is exceeded.

In at least some cases it is contemplated that more sophisticated algorithms may be implemented for determining when to alert the CA to a circumstance where the seconds behind period becomes problematic. For instance, where a seconds behind duration is 12.2 seconds as in FIG. 23A, that magnitude of duration may not warrant an alert if confidence factors associated with ASR generated text thereafter are all extremely high as accurate ASR text thereafter should enable the CA to catch up relatively quickly to reduce the seconds behind period rapidly. For instance, where ASR text confidence factors are high, the system may automatically double the broadcast rate of the HU voice signal so that the 12.2 second delay can be worked to a zero value in half that time.

As another instance, because HUs speak at different rates at different times, rate of HU speaking or density of words spoken during a time segment may be used to qualify the delay between a broadcast word and a most recent ASR word generated. For instance, assume a 15 second delay between when a word is broadcast to a CA and the time associated with the most recent ASR generated text. Here, in some cases an HU may utter 3 words during the 15 second period while in other cases the HU may have uttered 30 words during that same period. Clearly, the time required for a CA's to work the 15 second delay downward is a function of the density of words uttered by the HU in the intervening time. Here, whether or not to issue the alert would be a function of word density during the delay period.

As yet one other instance, instead of assessing delay by a duration of time, the relay may be based on a number of words between a most recently generated ASR word and the word that is currently being considered by a CA (e.g., the most current word in an HU voice signal considered by the CA). Here, an alert may be issued to the CA when the CA is a threshold number of words behind the most recent ASR generated word. For example, the threshold may be 12 words.

Many other factors may be used to determine when to issue CA delay alerts. For instance, a CAs metrics related to specific HU voice characteristics, voice signal quality factors, etc., may each be used separately or in combination with other factors to assess when an alert is prudent.

In addition to affecting when to issue a delay alert to a user, the above factors may be used to alter the seconds behind value in field 755 to reflect an anticipated duration of time required by a specific CA to catch up to the most recently generated ASR text. For instance, in FIG. 23A if, based on one or more of the above factors, the system anticipates that it will take the CA 5 seconds to catch up on the 12.2 second delay, the seconds behind value may be 5.0 seconds as opposed to 12.2 (e.g., in a case where the system speeds up the rate of HU voice signal broadcast through high confidence ASR text).

In at least some cases an error correcting CA will be able to skip back and forth within the HU voice signal to control broadcast of the HU voice signal to the CA. For instance, as described above, a CA may have a foot pedal or other control interface device useable to skip back in a buffered HU voice recording 5, 10, etc., seconds to replay an HU voice signal recording. Here, when the recording skips back, the highlighted text in representation 748 would likewise skip back to be synchronized with the broadcast words. To this end, see FIG. 25 where, in at least some cases, a foot pedal activation or other CA input may cause the recording to skip back to the word "pizza" which is then broadcast as at 764 and highlighted in text 748 as shown at 762. In other cases, the CA may simply single tap or otherwise select any word presented on display 50 to skip the voice signal play back and highlighted text to that word. For instance, in FIG. 25 icon 766 represents a single tap which causes the word "pizza" to be highlighted and substantially simultaneously broadcast. Other word selecting gestures (e.g., a mouse control click, etc.) are contemplated.

In some embodiments when a CA selects a text word to correct, the voice signal replay may automatically skip to some word in the voice buffer relative to the selected word and may halt voice signal replay automatically until the correction has been completed. For instance, a double tap on the word "pals' in FIG. 23 may cause that word to be highlighted for correction and may automatically cause the point in the HU voice replay to move backward to a location a few words prior to the selected word "pals." To this end, see in FIG. 25 that the word "Pete's" that is still highlighted as being corrected (e.g., the CA has not confirmed a complete correction) has been typed in to replace the word "Pals" and the word "pizza" that precedes the word "Pete's" has been highlighted to indicate where the HU voice signal broadcast will again commence after the correction at 760 has been completed. While backward replay skipping has been described, forward skipping is also contemplated.

In some cases, when a CA selects a word in presented text for correction or at least to be considered for correction, the system may skip to a location a few words prior to the selected word and may represent the HU voice signal stating at that point and ending a few words after that point to give a CA context in which to hear the word to be corrected. Thereafter, the system may automatically move back to a subsequent point in the HU voice signal at which the CA was when the word to be corrected was selected. For instance, again, in FIG. 25, assume that the HU voice broadcast to a CA is at the word "catch" 761 when the CA selects the word "Pete's 760 for correction. In this case, the CA's interface may skip back in the HU voice signal to the word pizza at 762 and re-broadcast the phrase parts from the word "pizza" to the word "want" 763 to provide immediate context to the CA. After broadcasting the word "want", the interface would skip back to the word "catch" 761 and continue broadcasting the HU voice signal from that point on.

In at least some embodiments where an ASR engine generates automatic text and a CA is simply correcting that text prior to transmission to an AU, the ASR engine may assign a confidence factor to each word generated that indicates how likely it is that the word is accurate. Here, in at least some cases, the relay server may highlight any text on the correcting CA's display screen that has a confidence factor lower than some threshold level to call that text to the attention of the CA for special consideration. To this end, see again FIG. 23 where various words (e.g., 777, 779, 781) are specially highlighted in the automatically generated ASR text to indicate a low confidence factor.

While AU voice signals are not presented to a CA in most cases for privacy reasons, it is believed that in at least some cases a CA may prefer to have some type of indication when an AU is speaking to help the CA understand how a communication is progressing. To this end, in at least some embodiments an AU device may sense an AU voice signal and at least generate some information about when the AU is speaking. The speaking information, without word content, may then be transmitted in real time to the CA at the relay and used to present an indication that the AU is speaking on the CA screen. For instance, see again FIG. 23 where lines 783 are presented on display 50 to indicate that an AU is speaking. As shown, lines 783 are presented on a right side of the display screen to distinguish the AU's speaking activity from the text and other visual representations associated with the HU's voice signal. As another instance, when the AU speaks, a text notice 797 or some graphical indicator (e.g., a talking head) may be presented on the CA display 50 to indicate current speaking by an AU. While not shown it is contemplated that some type of non-content AU speaking indication like 783 may also be presented to an AU via the AU's device to help the AU understand how the communication is progressing.

Sequential Short Duration Third Party Caption Requests

It has been recognized that some third party ASR systems available via the internet or the like tend to be extremely accurate for short voice signal durations (e.g., 15-30 seconds) after which accuracy becomes less reliable. To deal with ASR accuracy degradation during an ongoing call, in at least some cases where a third party ASR system is employed to generate automated text, the system processor (e.g., at the relay, in the AU device or in the HU device) may be programmed to generate a series of automatic text transcription requests where each request only transmits a short sub-set of a complete HU voice signal. For instance, a first ASR request may be limited to a first 15 seconds of HU voice signal, a second ASR request may be limited to a next 15 seconds of HU voice signal, a third ASR request may be limited to a third 15 seconds of HU voice signal, and so on. Here, each request would present the associated HU signal to the ASR system immediately and continuously as the HU voice signal is received and transcribed text would be received back from the ASR system during the 15 second period. As the text is received back from the ASR system, the text would be cobbled together to provide a complete and relatively accurate transcript of the HU voice signal.

While the HU voice signal may be divided into consecutive periods in some cases, in other cases it is contemplated that the HU voice signal slices or sub-periods sent to the ASR system may overlap at least somewhat to ensure all words uttered by an HU are transcribed and to avoid a case where words in the HU voice signal are split among periods. For instance, voice signal periods may be 30 seconds long and each may overlap a preceding period by 10 seconds and a following period by 10 seconds to avoid split words. In addition to avoiding a split word problem, overlapping HU voice signal periods presented to an ASR system allows the system to use context represented by surrounding words to better (e.g., contextually) covert HU voiced words to text. Thus, a word at the end of a first 20 second voice signal period will be near the front end of the overlapping portion of a next voice signal period and therefore, typically, will have contextual words prior to and following the word in the next voice signal period so that a more accurate contextually considered text representation can be generated.

In some cases, a system processor may employ two, three or more independent or differently tuned ASR systems to automatically generate automated text and the processor may then compare the text results and formulate a single best transcript representation in some fashion. For instance, once text is generated by each engine, the processor may poll for most common words or phrases and then select most common as text to provide to an AU, to a CA, to a voice modeling engine, etc.

Default ASR, User Selects Call Assistance

In most cases automated text (e.g., ASR generated text) will be generated much faster than CA generated text or at least consistently much faster. It has been recognized that in at least some cases an AU will prefer even uncorrected automated text to CA corrected text where the automated text is presented more rapidly generated and therefore more in sync with an audio broadcast HU voice signal. For this reason, in at least some cases, a different and more complex voice-to-text triage process may be implemented. For instance, when an AU-HU call commences and the AU requires text initially, automated ASR generated text may initially be provided to the AU. If a good HU voice model exists for the HU, the automated text may be provided without CA correction at least initially. If the AU, a system processor, or an HU determines that the automated text includes too many errors or if some other operating characteristic (e.g., line noise) that may affect text transcription accuracy is sensed, a next level of the triage process may link an error correcting CA to the call and the ASR text may be presented in essentially real time to the CA via display 50 simultaneously with presentation to the AU via display 18.

Here, as the CA corrects the automated text, corrections are automatically sent to the AU device and are indicated via display 18. Here, the corrections may be in-line (e.g., erroneous text replaced), above error, shown after errors, may be visually distinguished via highlighting or the like, etc. Here, if too many errors continue to persist from the AU's perspective, the AU may select an AU device button (e.g., see 68 again in FIG. 1) to request full CA transcription. Similarly, if an error correcting CA perceives that the ASR engine is generating too many errors, the error correcting CA may perform some action to initiate full CA transcription and correction. Similarly, a relay processor or even an AU device processor may detect that an error correcting CA is having to correct too many errors in the ASR generated text and may automatically initiate full CA transcription and correction.

In any case where a CA takes over for an ASR engine to generate text, the ASR engine may still operate on the HU voice signal to generate text and use that text and CA generated text, including corrections, to refine a voice model for the HU. At some point, once the voice model accuracy as tested against the CA generated text reaches some threshold level (e.g., 95% accuracy), the system may again automatically or at the command of the transcribing CA or the AU, revert back to the CA corrected ASR text and may cut out the transcribing CA to reduce costs. Here, if the ASR engine eventually reaches a second higher accuracy threshold (e.g., 98% accuracy), the system may again automatically or at the command of an error correcting CA or an AU, revert back to the uncorrected ASR text to further reduce costs.

AU Accuracy-Speed Preference Selection

In at least some cases it is contemplated that an AU device may allow an AU to set a personal preference between text transcription accuracy and text speed. For instance, a first AU may have fairly good hearing and therefore may only rely on a text transcript periodically to identify a word uttered by an HU wile a second AU has extremely bad hearing and effectively reads every word presented on an AU device display. Here, the first AU may prefer text speed at the expense of some accuracy while the second AU may require accuracy even when speed of text presentation or correction is reduced. An exemplary AU device tool is shown as an accuracy/speed scale 770 in FIG. 18 where an accuracy/speed selection arrow 772 indicates a current selected operating characteristic. Here, moving arrow 772 to the left, operating parameters like correction time, ASR operation etc., are adjusted to increase accuracy at the expense of speed and moving arrow 772 right on scale 770 increases speed of text generation at the expense of accuracy.

In at least some embodiments when arrow 772 is moved to the right so speed is preferred over greater accuracy, the system may respond to the setting adjustment by opting for automated text generation as opposed to CA text generation. In other cases where a CA may still perform at least some error corrections despite a high speed setting, the system may limit the window of automated text that a CA is able to correct to a small time window trailing a current time. Thus, for instance, instead of allowing a CA to correct the last 30 seconds of automated text, the system may limit the CA to correcting only the most recent 7 seconds of text so that error corrections cannot lag too far behind current HU utterances.

Where an AU moves arrow 772 to the left so that speed is sacrificed for greater caption accuracy, the system may delay delivery of even automated text to an AU for some time so that at least some automated error corrections are made prior to delivery of initial text captions to an AU. The delay may even be until a CA has made at least some or even all caption corrections. Other ways of speeding up text generation or increasing accuracy at the expense of speed are contemplated.

Audio-Text Synchronization Adjustment

In at least some embodiments when text is presented to an error correcting CA via a CA display 50, the text may be presented at least slightly prior to broadcast of (e.g., ¼ to 2 seconds) an associated HU voice signal. In this regard, it has been recognized that many CAs prefer to see text prior to hearing a related audio signal and link the two optimally in their minds when text precedes audio. In other cases specific CAs may prefer simultaneous text and audio and still others may prefer audio before text. In at least some cases it is contemplated that a CA workstation may allow a CA to set text-audio sync preferences. To this end, see exemplary text-audio sync scale 765 in FIG. 25 that includes a sync selection arrow 767 that can be moved along the scale to change text-audio order as well as delay or lag between the two.

In at least some embodiments an on-screen tool akin to scale 765 and arrow 767 may be provided on an AU device display 18 to adjust HU voice signal broadcast and text presentation timing to meet an AU's preferences.

System Options Based on HU's Voice Characteristics

It has been recognized that some AU's can hear voice signals with a specific characteristic set better than other voice signals. For instance, one AU may be able to hear low pitch traditionally male voices better than high pitch traditionally female voice signals. In some embodiments an AU may perform a commissioning procedure whereby the AU tests capability to accurately hear voice signals having different characteristics and results of those capabilities may be stored in a system database. The hearing capability results may then be used to adjust or modify the way text captioning is accomplished. For instance, in the above case where an AU hears low pitch voices well but not high pitch voices, if a low pitch HU voice is detected when a call commences, the system may use the ASR function more rapidly than in the case of a high pitched voice signal. Voice characteristics other than pitch may be used to adjust text transcription and ASR transition protocols in similar ways.

In some cases it is contemplated that an AU device or other system device may be able to condition an incoming HU voice signal so that the signal is optimized for a specific AU's hearing deficiency. For instance, assume that an AU only hears high pitch voices well. In this case, if a high pitch HU voice signal is received at an AU's device, the AU's device may simply broadcast that voice signal to the AU to be heard. However, if a low pitch HU voice signal is received at the AU's device, the AU's device may modify that voice signal to convert it to a high pitch signal prior to broadcast to the AU so that the A can better hear the broadcast voice. This automatic voice conditioning may be performed regardless of whether or not the system is presenting captioning to an AU.

In at least some cases where an HU device like a smart phone, tablet, computing device, laptop, smart watch, etc., has the ability to store data or to access data via the internet, a WIFI system or otherwise that is stored on a local or remote (e.g., cloud) server, it is contemplated that every HU device or at least a subset used by specific HUs may store an HU voice model for an associated HU to be used by a captioning application or by any software application run by the HU device. Here, the HU model may be trained by one or more applications run on the HU device or by some other application like an ASR system associated with one of the captioning systems described herein that is run by an AU device, the relay server, or some third party server or processor. Here, for example, in one instance, an HU's voice model stored on an HU device may be used to drive a voice-to-text search engine input tool to provide text for an internet search independent of the captioning system. The multi-use and perhaps multi-application trained HU voice model may also be used by a captioning ASR system during an AU-HU call. Here, the voice model may be used by an ASR application run on the HU device, run on the AU device, run by the relay server or run by a third party server.

In cases where an HU voice model is accessible to an ASR engine independent of an HU device, when an AU device is used to place a call to an HU device, an HU model associated with the number called may be automatically prepared for generating captions even prior to connection to the HU device. Where a phone or other identifying number associated with an HU device can be identified prior to an AU answering a call from the HU device, again, an HU voice model associated with the HU device may be accessed and readied by the captioning system for use prior to the answering action to expedite ASR text generation. Most people use one or a small number of phrases when answering an incoming phone call. Where an HU voice model is loaded prior to an HU answering a call, the ASR engine can be poised to detect one of the small number of greeting phrases routinely used to answer calls and to compare the HU's voice signal to the model to confirm that the voice model is for the specific HU that answers the call. If the HU's salutation upon answering the call does not match the voice model, the system may automatically link to a CA to start a CA controlled captioning process.

While at least some systems will include HU voice models, it should be appreciated that other systems may not and instead may rely on robust voice to text software algorithms that train to specific voices over relatively short durations so that every new call with an HU causes the system to rapidly train anew to a received HU voice signal. For instance, in many cases a voice model can be at least initially trained within tens of seconds to specific voices after which the models continue to train over the duration of a call to become more accurate as a call proceeds. In at least some of these cases there is no need for voice model storage.

Presenting Captions for AU Voice Messages

While a captioning system must provide accurate text corresponding to an HU voice signal for an AU to view when needed, typical relay systems for deaf and hard of hearing person would not provide a transcription of an AU's voice signal. Here, generally, the thinking has been that an AU knows what she says in a voice signal and an HU hears that signal and therefore text versions of the AU's voice was not necessary. This, coupled with the fact that AU captioning would have substantially increased the transcription burden on CAs (e.g., would have required CA revoicing or typing and correction of more voice signal (e.g., the AU voice signal)) meant that AU voice signal transcription simply was not supported. Another reason AU voice transcription was not supported was that at least some AUs, for privacy reasons, do not want both sides of conversations with HUs being listened to by CAs.

In at least some embodiments, it is contemplated that the AU side of a conversation with an HU may be transcribed to text automatically via an ASR engine and presented to the AU via a device display 18 while the HU side of the conversation is transcribed to text in the most optimal way given transcription triage rules or algorithms as described above. Here, the AU voice captions and AU voice signal would never be presented to a CA. Here, while AU voice signal text may not be necessary in some cases, in others it is contemplated that many AUs may prefer that text of their voice signals be presented to be referred back to or simply as an indication of how the conversation is progressing. Seeing both sides of a conversation helps a viewer follow the progress more naturally. Here, while the ASR generated AU text may not always be extremely accurate, accuracy in the AU text is less important because, again, the AU knows what she said.

Where an ASR engine automatically generates AU text, the ASR engine may be run by any of the system processors or devices described herein. In particularly advantageous systems the ASR engine will be run by the AU device 12 where the software that transcribes the AU voice to text is trained to the voice of the AU and therefore is extremely accurate because of the personalized training.

Figure 26:
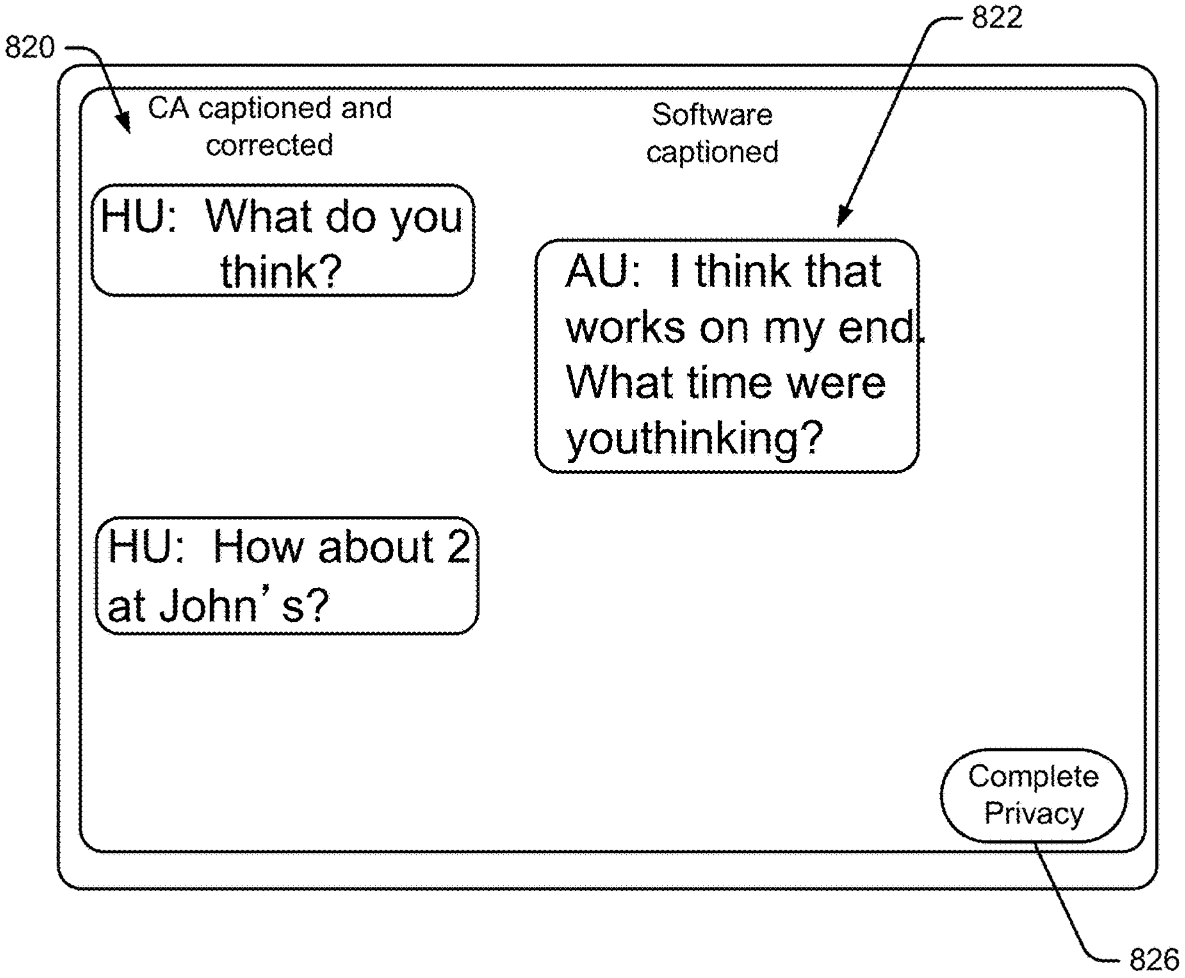
FIG. 26 is a screen shot of an exemplary AU device display that presents CA captioned HU text as well as ASR engine generated AU text.

Thus, referring again to FIG. 1, for instance, in at least some embodiments, when an AU-HU call commences, the AU voice signal may be transcribed to text by AU device 12 and presented as shown at 822 in FIG. 26 without providing the AU voice signal to relay 16. The HU voice signal, in addition to being audibly broadcast via AU device 12, may be transmitted in some fashion to relay 16 for conversion to text when some type of CA assistance is required. Accurate HU text is presented on display 18 at 820. Thus, the AU gets to see both AU text, albeit with some errors, and highly accurate HU text. Referring again to FIG. 24, in at least some cases, AU and HU text may also be presented to an HU via an HU device (e.g., a smart phone) in a fashion similar to that shown in FIG. 26.

Referring still to FIG. 26, where both HU and AU text are generated and presented to an AU, the HU and AU text may be presented in staggered columns as shown along with an indication of how each text representation was generated (e.g., see titles at top of each column in FIG. 26).

In at least some cases it is contemplated that an AU may, at times, not even want the HU side of a conversation to be heard by a CA for privacy reasons. Here, in at least some cases, it is contemplated that an AU device may provide a button or other type of selectable activator to indicate that total privacy is required and then to re-establish relay or CA captioning and/or correction again once privacy is no longer required. To this end, see the "Complete Privacy" button or virtual icon 826 shown on the AU device display 18 in FIG. 26. Here, it is contemplated that, while an AU-HU conversation is progressing and a CA generates/corrects text 820 for an HU's voice signal and an ASR generates HU text 822, if the AU wants complete privacy but still wants HU text, the AU would select icon 826. Once icon 826 is selected, the HU voice signal would no longer be broadcast to the CA and instead an ASR engine would transcribe the AU voice signal to automated text to be presented via display 18. Icon 826 in FIG. 26 would be changed to "CA Caption" or something to that effect to allow the AU to again start full CA assistance when privacy is less of a concern.

In cases where an ASR engine generates confidence factors for ASR captioned words or phrases, the captioned device may indicate low confidence factor words or phrases to the AU indicating that the words or phrases are more likely than others to be inaccurate. Here, in at least some cases it is contemplated that when a word is highlighted or otherwise visually distinguished or labelled to indicate low confidence, the captioned device will also present an option (e.g., selectable icon proximate the word) that an AU may select to temporarily link a CA to the call to consider only the selected word and surrounding text for context. When this option is selected, a CA may be linked and the word and surrounding text presented via the CA workstation display while the associated HU voice signal is broadcast to the CA for consideration. Here, the CA may correct the word or may leave the initial ASR text unchanged to affirm accuracy. In still other cases where low confidence is indicated for a word or phrase, where the ASR generates other possible options for that word or phrase, the captioned device may present one or more of those other options for consideration by the AU. Here the AU would simply sort out which option makes most sense or may ask the HU to clarify what was said.

In at least some cases it is contemplated that when an ASR generates confidence factors for ASR text, whether or not that ASR text is automatically and immediately transmitted to an AU captioned device may be a function of the confidence factor. For instance, where and ASR text confidence factor is low, that text may not be transmitted to an AU device for display and instead may simply be presented to a CA for error correction or confirmation while high confidence factor text may be automatically and immediately transmitted to an AU captioned device to be presented. Here, once a CA error corrects the text, the corrected text is transmitted to the AU captioned device for in-line or other error correction.

In some cases where an ASR text segment has a low confidence factor, all text segments thereafter will be delayed until the low confidence text is corrected. In other cases where an ASR text segment has a low confidence factor, only that low confidence text would be delayed and any high confidence factor text subsequent thereto would automatically be transmitted to the AU captioned device for immediate display.

In other cases where an ASR generated text segment confidence factor is low, segment transmission to the AU captioned device for display may be delayed for at least some time so that a CA may observe the text and correct any perceived errors. Here, the delay may be for a preset duration of time (e.g., 3-5 seconds) or may be based on other factors such as where the CA is currently making error corrections within presented text. Thus, for instance, where a CA is error correcting subsequent to a low confidence text segment, Other Triggers for Automated Catch Up Text In addition to a voice-to-text lag exceeding a maximum lag time, there may be other triggers for using ASR engine generated text to catch an AU up to an HU voice signal. For instance, in at least some cases an AU device may monitor for an utterance from an AU using the device and may automatically fill in ASR engine generated text corresponding to an HU voice signal when any AU utterance is identified. Here, for example, where CA transcription is 30 seconds behind an HU voice signal, if an AU speaks, it may be assumed that the AU has been listening to the HU voice signal and is responding to the broadcast HU voice signal in real time. Because the AU responds to the up to date HU voice signal, there may be no need for an accurate text transcription for prior HU voice phrases and therefore automated text may be used to automatically catch up. In this case, the CA's transcription task would simply be moved up in time to a current real time HU voice signal automatically and the CA would not have to consider the intervening 30 seconds of HU voice for transcription or even correction. When the system skips ahead in the HU voice signal broadcast to the CA, the system may present some clear indication that it is skipping ahead to the CA to avoid confusion. For instance, when the system skips ahead, a system processor may present a simultaneous warning on the CA display screen indicating that the system is skipping intervening HU voice signal to catch the CA up to real time.

As another example, when an AU device or other system device recognizes a turn marker in an HU voice signal, all ASR generated text that is associated with a lag time may be filled in immediately and automatically.

As still one other instance, an AU device or other device may monitor AU utterances for some specific word or phrase intended to trigger an update of text associated with a lag time. For instance, the AU may monitor for the word "Update" and, when identified, may fill in the lag time with automated text. Here, in at least some cases, the AU may be programmed to cancel the catch-up word "Update" from the AU voice signal sent to the HU device. Thus, here, the AU utterance "Update" would have the effect of causing ASR text to fill in a lag time without being transmitted to the HU device. Other commands may be recognized and automatically removed from the AU voice signal.

Thus, it should be appreciated that various embodiments of a semi-automated automatic voice recognition or text transcription system to aid hearing impaired persons when communicating with HUs have been described. In each system there are at least three entities and at least three devices and in some cases there may be a fourth entity and an associated fourth device. In each system there is at least one HU and associated device, one AU and associated device and one relay and associated device or sub-system while in some cases there may also be a third party provider (e.g., a fourth party) of ASR services operating one or more servers that run ASR software. The HU device, at a minimum, enables an HU to annunciate words that are transmitted to an AU device and receives an AU voice signal and broadcasts that signal audibly for the HU to hear.

The AU device, at a minimum, enables an AU to annunciate words that are transmitted to an HU device, receives an HU voice signal and broadcasts that signal (e.g., audibly, via Bluetooth where an AU uses a hearing aid) for the AU to attempt to hear, receives or generates transcribed text corresponding to an HU voice signal and displays the transcribed text to an AU on a display to view.

The relay, at a minimum, at times, receives the HU voice signal and generates at least corrected text that may be transmitted to another system device.

In some cases where there is no fourth party ASR system, any of the other functions/processes described above may be performed by any of the HU device, AU device and relay server. For instance, the HU device in some cases may store an HU voice model and/or voice characteristics model, an ASR application and a software program for managing which text, ASR or CA generated, is used to drive an AU device. Here, the HU may link directly with each of the AU device and relay, and may operate as an intermediary therebetween.

As another instance, HU models, ASR software and caption control applications may be stored and used by the AU device processor or, alternatively, by the relay server. In still other instances different system components or devices may perform different aspects of a functioning system. For instance, an HU device may store an HU voice model which may be provided to an AU device automatically at the beginning of a call and the AU device may transmit the HU voice model along with a received HU voice signal to a relay that uses the model to tune an ASR engine to generate automated text as well as provides the HU voice signal to a first CA for revoicing to generate CA text and a second CA for correcting the CA text. Here, the relay may transmit and transcribe text (e.g., automated and CA generated) to the AU device and the AU device may then select one of the received texts to present via the AU device screen. Here CA captioning and correction and transmission of CA text to the AU device may be halted in total or in part at any time by the relay or, in some cases, by the AU device, based on various parameters or commands received from any parties (e.g., AU, HU, CA) linked to the communication.

In cases where a fourth party to the system operates an ASR engine in the cloud or otherwise, at a minimum, the ASR engine receives an HU voice signal at least some of the time and generates automated text which may or may not be used at times to drive an AU device display.

In some cases it is contemplated that ASR engine text (e.g., automated text) may be presented to an HU while CA generated text is presented to an AU and a most recent word presented to an AU may be indicated in the text on the HU device so that the HU has a good sense of how far behind an AU is in following the HU's voice signal. To this end, see FIG. 27 that shows an exemplary HU smart phone device 800 including a display 801 where text corresponding to an HU voice signal is presented for the HU to view at 848. The text 848 includes text already presented to an AU prior to and including the word "after" that is shown highlighted 850 as well as ASR engine generated text subsequent to the highlight 850 that, in at least the illustrated embodiment, may not have been presented to the AU at the illustrated time. Here, an HU viewing display 801 can see where the AU is in receiving text corresponding to the HU voice signal. The HU may use the information presented as a coaching tool to help the HU regulate the speed at which the HU converses. In addition to indicating the most recent textual word presented to the AU, the most recent word audibly broadcast to the AU may be visually highlighted as shown at 847 as well.

In other cases, an HU device 800 may present other information to the HU indicating AU progress consuming the HU voice signal as a coaching feature. For instance, an HU voice signal consumption meter 821 shown in FIG. 27 may indicate a current state of HU voice signal consumption by the AU on a call. The meter 821 includes a scale 823 and a dynamic sliding consumption pointer 825 that slides along the scale 823 to indicate a duration of HU voice signal between the most recent HU voice signal word captioned for the AU and a current time. Although not shown, the scale 823, pointer 825 or both may change color as the delay in HU voice signal consumption changes (e.g., green to indicate relatively caught up, red indicating a substantial delay, yellow indicating an intermediate duration delay, etc.).

In still other cases audible indications of delays in AU consumption of the HU voice signal may be presented as indicated at 827 where the phrase "slow down" is automatically broadcast to the HU via a speaker in the HU phone device 800. Here, the broadcast may be faint in at least some embodiments. In still other cases device 800 may present a text message notice "Slow Down" as shown at 829 and/or control a haptic component (e.g., a vibrator) 831 integrated into device 800 to indicate a need to slow down or wait until the AU catches up more to the current HU voice signal.

Smart HU Device—Other System Arrangements

To be clear, where an HU device is a smart phone, laptop or some other type of computing device that can run an application program to establish and participate in a captioning service, many different communication linking arrangements between the AU, HU and a relay are contemplated and those linkages may be dynamic (e.g., the devices or system components may cooperate to switch communication linkages between parties and entities), automatically changed based on instantaneously required services as well as on other call and communication factors. This concept of dynamic system reconfiguration will be described in the context of the exemplary system 2000 shown in FIG. 61. Exemplary captioning system 2000 includes an AU's communication arrangement 2002, a relay captioning arrangement 2004 and an HU communication device 2010. In some embodiments, the system will also include a third party ASR provider represented by ASR server 2006.

The exemplary AU communication arrangement 2002 is shown to include a captioned device 2012 and a wireless portable computing device 2014. In other embodiments the AU's arrangement 2002 may only include a single captioned/telephone device or a network device (e.g., a wireless router) and a wireless computing device like a smart phone, a laptop, etc. System components illustrated in FIG. 61 outside AU communication arrangement 2002 are shown with communication links to the AU's arrangement 2002 generally as opposed to the separate devices 2012 and 2014 to indicate that each of the other components may link to either one of the AU's devices 2012 or 2014, depending on system setup. For instance, where device 2014 is a wireless, portable cellular smart phone, all communications with devices outside the AU's arrangement 2002 may be via the wireless cellular phone 2014 and the phone 2014 may communicate with captioned device 2012 so that the phone 2014 isolates captioned device 2012 from other system components.

In other cases, captioned device 2012 may isolate phone 2014 from other system devices and may allow the AU to use a microphone and speaker included in device 2014 for voice communications through device 2012 while device 2012 presents text corresponding to HU voice signal on the device display screen.

In still other cases devices 2012 and 2014 may share communication tasks to link to system devices outside arrangement 2002. For instance, a first AU-HU link for voice communication may be set up between wireless portable device 2014 and the hearing user's device 2010 while a second AU-relay link may be set up between captioned device 2002 and relay 2004 on which device 2012 transmits HU voice signal to relay 2004 and receives captions corresponding to the voice signal with wireless communication between AU devices 2012 and 2014.

Figure 61:
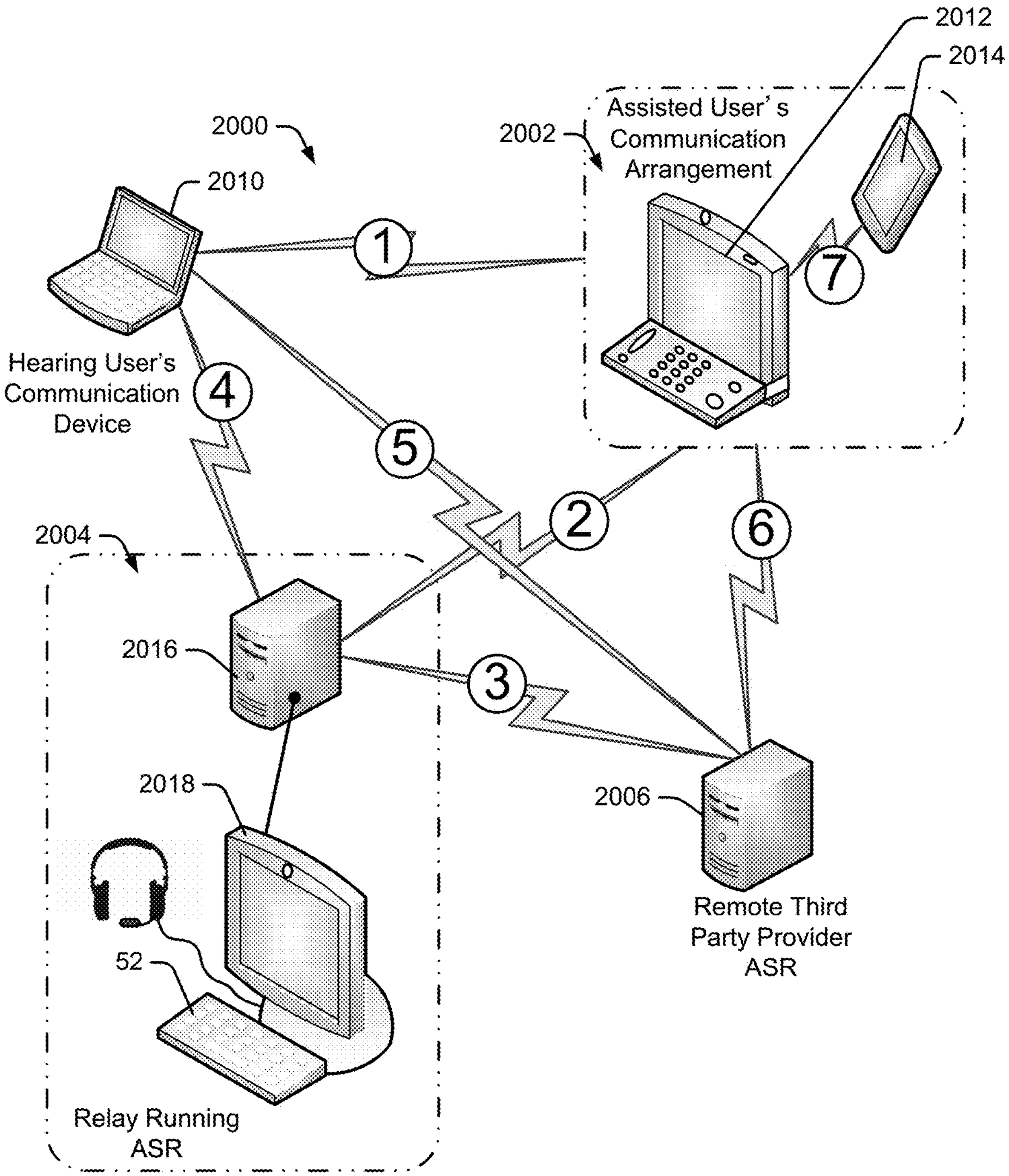
FIG. 61 is a schematic diagram that illustrates many combinations of system components that may cooperate in many different ways to provide captioning services to an assisted user.

Hereinafter, unless indicated otherwise, the AU communication arrangement 2002 will be referred to hereinafter as the AU's captioned device 2002 in the interest of simplifying this explanation, regardless of the number of devices that comprise the AU's communication arrangement. However, it should be appreciated that arrangement 2002 may include two cooperating devices as shown in FIG. 61 or, in some cases, even more than two devices where additional devices include, for instance, supplemental wireless speakers, a headphone set, one or more supplemental emissive display screens, a wireless router, a video camera for telepresence type communication, etc. Thus, hereafter, communication with any device in arrangement 2002 may include communication with any of the devices within the arrangement and where there are two communication links or channels to arrangement 2002, each of those links may be to any one of the arrangement devices with inter-arrangement communication between the two or more devices as needed. For instance, where a description indicates that HU device 2010 links to the AU captioned device 2002, where the AU's arrangement includes both devices 2012 and 2014, HU device 2010 may link to either of devices 2012 or 2014 (or even both devices 2012 and 2014 in some cases), depending on the AU's system setup and operation.

Referring still to FIG. 61, HU communication device 2010 is shown as a laptop computer but may be any type of computing device that is capable of running software programs and linking via one or more communication links to other system components and includes or has access to a speaker and to a microphone to facilitate voice communications between an HU and the AU.

Relay 2004 includes a relay server 2016 and a plurality of CA workstations (only one shown at 2018). Server 2016 links to other system devices and resources outside the relay sub-system and is also linked to CA workstation 2018. Server 2016 broadcasts HU voice signal to a CA at station 2018 and receives data (e.g., captions, caption correction, depending on system arrangement) back from the workstation to forward on to AU captioned device 2002.

The remote third party (3P) provider ASR 2006 may be included in some systems and not in others and, where included in a system, comprises an ASR server 2006. ASR server 2006 receives HU voice signals from some other system device or resource, transcribes that voice signal to ASR captions and then transmits those ASR captions to one or more other system devices and resources to be consumed (e.g., presented on a display, edited to correct errors, etc.).

Referring yet again to FIG. 61, several different communication links are shown and labelled "1" through "6", each labelled link indicating a different communication link or channel that may be established between different system devices or resources. For instance, link "1" is shown between HU device 2010 and the AU's captioned device 2002. As other instances, link "2" is shown between AU captioned device 2002 and relay 2004, link "3" is shown between relay 2002 and the remote ASR server 2006, link "4" is shown between HU communication device 2010 and relay 2004, link "5" is shown between HU communication device 2010 and third party ASR server 2006 and link "6" is shown between third party ASR server 2006 and the AU's captioned device 2002.

FIG. 61 also includes a link "7" that may be established within the AU's communication arrangement (e.g., between two or more AU communication devices). Although not shown in FIG. 61 it should be appreciated that when AU device 2002 includes two separate devices (e.g., a captioned device and a cell phone or a wireless router and a cell phone or tablet computing device or other dual device combinations), any of the communication links 1, 2 or 6 as shown may be with either of the two devices (e.g., link 1 to AU phone device 2014 for HU-AU voice and link 2 to captioned device 2012 for captions) with the two AU devices connected via link 7 as appropriate or two of those links may be with one of the devices (e.g., link 1 and link 2 to phone device 2014) with devices 2012 and 2014 connected via link 7.

Each of the FIG. 61 links may be one way or two way communication links and may transmit voice data, caption data, system control data, video data, subsets of those data types or each of those data types, depending on how the system is instantaneously set up. Each link may be any type of communication line or connection including a POTS line, a VOIP or other network channel, a cellular or other wireless channel, etc. Some of the lines may be one type of communication line while others are a different type of communication line.

The FIG. 61 links 1 through 6 are exemplary and, in most cases, only a subset of the illustrated links will be supported by a specific captioning system 2000. For instance, in some cases only links 1, 2 and 3 may be supported while in other cases, each of links 1 through 4 are supported and in still other cases, only links 4 and 2 may be supported during captioning sessions. Other supported link subsets are contemplated.

At a minimum, when HU-AU voice communication occurs, regardless of whether or not captioning service is provided, there has to be some communication path (e.g., one link or two series links) between HU device 2010 and AU device 2002 for voice communications.

When HU-AU voice communication is enhanced with captions provided by a system component other than HU device 2010 or AU device 2002, there has to be some communication link from the HU device 2010 that originates the HU voice signal to the captioning component to deliver the HU voice signal to the captioning component as well as some communication link for delivering captions from the captioning component to the AU device 2002 so that the captions can be presented to the AU. In some cases the HU-AU voice link, the HU voice to relay link and the relay caption to AU device link may each be a single link between two components while in other cases any of these links may be a dual link including first and second series links between components to deliver voice or captions to a destination component. For instance, referring again to FIG. 61, HU voice signal may be delivered to AU device 2002 via single link 1 in some cases or, in other cases, may be delivered from HU device 2010 through relay 2004 to AU device 2002 via series links 4 and 2. As another instance, HU voice may be delivered to relay 2004 via single link 4 or through AU device 2002 to relay 2004 via series links 1 and 2. In systems including third party ASR 2006, HU voice may be delivered to server 2006 directly via link 5, through relay 2004 via links 4 and 3, via AU device 2002, or even through three series links 1, 2 and 3.

Communication links required to support captioning may be established at different times in different systems. For instance, where relay 2004 generates captions and CA error corrections during captioning sessions, in some cases the link(s) to provide HU voice signals to the relay may only be established after captioning service is required. In other cases where relay 2004 generates captions and CA error corrections during captioning, links required to provide captioning may be established immediately when any HU-AU voice call is initiated (e.g., upon an HU dialing an AU or an AU dialing an HU) or established (e.g., upon an HU answering an AU call or an AU answering an HU call), regardless of whether or not captioning is to commence immediately. In this case, while communication links to support captioning may be established prior to a request for captioning service, a CA may not be assigned to the call until an AU requests captioning service.

Referring again to FIG. 61, once one of the HU and AU devices is used to initiate a call to the other device or to start a captioning service, either one of those devices may be programmed to control communication linkage paths within the illustrated system. For instance, in FIG. 61, assume an HU-AU voice call is progressing on link 1 when an AU requests captioning service. Here, when the AU device 2002 receives the captioning command, in some embodiments, AU device 2002 will establish link 2 to relay 2004 for HU voice and captions. In other embodiments, AU device 2002 may transmit control signals to HU device 2002 causing that device to establish link 4 directly to relay 2004 for HU and AU voice communication as well as establishing link 2 to relay 2004 for HU and AU voice and captions. Here, link 1 may be disabled once links 4 and 2 are established. In this regard, HU device 2010 may store a relay phone number or other network address usable to establish link 4.

In still other embodiments, AU device 2002 may establish link 2 to relay 2004 and transmit control signals to relay 2004 causing the relay server to establish link 4 directly to HU device 2010. In this regard, AU captioned device 2002 may identify an HU phone number or other address information at the beginning of a voice call that is transmitted on to relay 2004 which is usable by the relay to establish link 4.

In a similar fashion, other FIG. 61 links may be initiated or controlled by different ones of the system components illustrated.

Referring again to FIG. 61, in some systems, HU-AU voice communications may always be via link 1 where HU voice signals are transmitted on link 1 to AU captioned device 2002 which broadcast's the HU voice signal to the AU and AU voice signals captured by an AU device microphone or the like are transmitted back to HU device 2010 on the same link 1 to be broadcast to the HU via device 2010.

Referring still to FIG. 61, during an ongoing HU-AU phone call, if the AU requests captioning service (e.g., selects a captioning button on the captioned device), in some embodiments already described in this specification, link 2 is established to provide the HU voice signal from AU captioned device 2002 to relay 2004. ASR software at one or both of relay 2016 and ASR server 2006 and/or a CA at relay 2004 transcribes the HU voice signal to text which is transmitted back to AU captioned device 2002 for display to the AU.

Referring again to FIG. 61, in a different exemplary captioning arrangement, when an HU and AU are linked directly via line 1 for two way voice communication and relay captioning services are requested during an ongoing call, AU captioned device 2002 may transmit a control signal to HU device 2010 to cause HU device 2010 to establish a new communication link 4 to connect directly to relay 2004 and relay 2004 may then establish line 2 to link to AU device 2004 so that relay 2006 is located between AU and HU devices 2002 and 2006, respectively, within the communication network and all communications (e.g., voice and captions) then pass through relay 2004 between HU and AU devices 2010 and 2002, respectively. Thus, here, pre-captioning, the HU-AU voice call proceeds through first line 1 alone and after captioning commences, the linkage path in FIG. 28A is along lines 4 and 2 with HU voice signal to the relay on line 4, the HU voice signal and HU voice captions from relay 2004 to AU captioned device 2002 for display and broadcast to the AU on line 2, AU voice signals from AU device 2002 to the relay 2004 on line 2 and passing through the relay 2004 to HU device 2010 on line 4.

In this example, the system components cooperate to change the communication arrangement (e.g., the link paths are dynamic) so that the HU-AU voice call on line 1 continues between the AU and HU along a different communication or link path/route including lines 4 and 2. One advantage to this captioning arrangement is that an HU voice signal with reduced noise can often be provided to relay 2004 if that voice signal only travels along line 4 as opposed to along lines 1 and 2 to get to the relay and that often results in more accurate and faster captioning and error correction.

In still another embodiment, a call may start with an HU and an AU communicating via voice only on line 1 and then, once captioning is requested during an ongoing call, the HU device 2010 may link directly to relay 2004 (see line 4 in FIG. 61) and relay 2004 may link directly to AU device 2002 (see line 2) while the AU device to HU device link (see line 1) persists so that all communications, voice or data, are directly communicated from the device that generates the voice signal or data to the component that consumes the voice signal or data without having to pass through any other system device or resource (e.g., HU and AU voice signals are directly between HU and AU devices, HU voice signal is direct from HU device 2010 to relay 2004 and transcribed text associated with the HU voice is directly passed from relay 2010 to AU device 2002 to be displayed to the AU).

In still other cases, referring again to FIG. 61, when an HU first calls AU captioned device 2002, prior to any request from the AU to commence captioning, one of the HU device 2010 or the AU captioned device 2002 may be programmed to establish links 4 and 2 for HU and AU voice communications through the relay without captioning. At this point the HU and AU voices simply pass through the relay without captioning. Then, when captioning is requested, AU captioned device 2002 simply transmits a command to the relay to initiate captioning service. For instance, in some cases software run by HU's device 2010 may be programmed to recognize when the HU calls an AU that at least periodically needs captioning and, when that AU's number is called, may automatically link to relay 2004 (e.g., call the relay or otherwise establish line 4) and provide the AU captioned device number (or other identifier) to the relay so that the relay can use that number to establish link 2.

As another instance, in other embodiments software run by AU device 2002 may be programmed to, when an incoming call is received, automatically link to relay 2004 (e.g., call the relay or otherwise establish link 2) and provide an HU device number (or other identifier) to the relay so that the relay can use that number to establish link 4.

In still other cases an HU device may be programmed to call a relay when a number associated with an AU captioned device is called to establish a link with the relay. Here, the HU device would store the AU captioned device number as well as a corresponding relay number. Upon entry of the AU device number to commence a call to the AU, the HU device identifies and dials the relay number and presents the AU device number to a processor at the relay when the relay goes off hook (e.g., answers the incoming call). The relay then dials the AU device number and creates communication link 2 between the relay and the AU device for transmitting HU voice and text to the AU device for display.

Where a relay is positioned between AU and HU communication devices, during captioning, if an AU wants to disable captioning, the AU may select a disable icon or other input tool via one of the AU's devices causing the relay to cease captioning service. Here, in some embodiments, the HU-relay-AU links may persist for voice communications only, at least until the AU again requests captioning service. In other cases where captioning is disabled, one of the HU and AU devices may be programmed to establish a different direct link with the other of the AU and HU devices for voice communication and the relay may be removed from the communication.

Referring still to FIG. 61, in systems that include a remote third party server 2006 that provides ASR service, other system components may link to server 2006 in any of several different ways including directly or circuitously through other system components and link paths. For instance, as described in other parts of this specification, the relay server 2016 may establish link 3 directly to server 2006 when remote ASR captioning is required and HU voice signal as well as ASR captions may be transmitted on link 3 between the linked servers. As another instance, AU captioned device 2002 may link (see link 6) directly to ASR server 2006 when automated captioning is required with HU voice and captions transmitted on link 6. In still other cases, HU device 2010 may establish link 5 directly to server 2006 for HU voice and ASR caption transmission.

In still other cases HU voice may be provided to ASR server 2006 via one link and captions may be transmitted from server 2006 to one or more other system components via one or more other links. For example, in FIG. 61, HU voice signal may be provided to ASR server 2006 via link 5 and ASR captions may be transmitted to relay 2004 and AU captioned device 2002 via each of links 3 and 6, respectively.

Thus, pre-captioning HU-AU voice communications may be restricted to direct HU-AU link 1 or may be indirect and pass through other intervening system components along two or more series links (e.g., links 4 and 2 in FIG. 61). HU-AU voice communications during captioning may be direct on link 1 or pass through intervening system components and the HU-AU voice communication paths pre-captioning and during captioning may be different (e.g., direct on link 1 prior to captioning and indirect via links 4 and 2 once captioning commences).

Similarly, HU voice delivery to relay 2004 may be direct via link 4 or circuitous via links 1 and 2 or via other dual or more link paths and relay generated data (e.g., captions, error corrections, etc.) delivery to AU captioned device 2002 may be direct via link 2 or circuitous via dual or more series link paths.

Many different pre-caption and captioning linkages and dynamic link changes between system components are contemplated by the present disclosure. Table 1 below lists several different pre-caption link path options and captioning link path options for HU-AU voice transmission and text caption transmissions where different systems that are consistent with various aspects of the present disclosure employ different link path subsets. The first column groups captioning systems into two general categories including (I) systems that do not employ a remote third party ASR (see again 2006 in FIG. 61) and (II) systems that do employ a third party ASR.

The second column in Table 1 (entitled "Pre-captioning") indicates different pre-captioning HU-AU voice link path options (e.g., a separate option on each line in each cell) for each of the two system categories (e.g., without and with 3P ASR 2006 in FIG. 61) in the first column. For instance, the second column indicates different link paths within the FIG. 61 system for transmitting HU and AU voice signals between HU device 2010 and AU device 2002. For example, for a system that does not include the third party ASR 2006, HU-AU voice link options include (i) link 1 or (ii) series links 4 and 2 and, for a system with a third party ASR 2006, listed link options include (i) link 1; (ii) series links 4 and 2; (iii) series links 4, 3, 6 or (iv) series links 5 and 6.

The third column in Table 1 (entitled "During Captioning") indicates link path options (e.g., again, a separate option presented on each line in each cell) for different HU-AU voice transmission and caption transmissions during caption assisted voice communications (e.g., after captioning commences) for each of the two system categories in the first column. The third column includes six sub-columns, one for each voice or data type transfer. For instance, a first sub-column is labelled "HU-AU voice link" and cells thereunder indicate different link paths within the FIG. 61 system for transmitting HU and AU voice signals between HU device 2010 and AU device 2002. For example, for a system without the third party ASR 2006, HU-AU voice link options include (i) link 1 or (ii) series link 4 and 2 and, for a system with a third party ASR 2006, listed link options include (i) link 1; (ii) series link 4 and 2; (iii) series links 4, 3, 6 and (iv) series links 5 and 6.

Similarly, the second through sixth sub-columns labelled "HU voice to relay", "Relay captions to AU device", "HU voice to 3P ASR", "3P ASR captions to relay" and "3P ASR captions to AU device" each lists link options for the data transfer listed in the heading. For instance, for a system with a third party ASR system 2006, the third party ASR captions may be transmitted to the AU device via any of link paths including (i) 6; (ii) 3, 2; (iii) 3, 4, 1 or (iv) 5, 1. In the interest of simplifying this explanation, the voice and data transfer type columns in Table 1 have been labelled (1) through (7).

TABLE 1

| Caption System Types | Pre-Captioning (1) HU-AU voice link | During Captioning (2) HU-AU voice link | (3) HU voice to relay | (4) Relay captions to AU device | (5) HU voice to 3P ASR | (6) 3P ASR captions to relay | (7) 3P ASR captions to AU device |
|---|---|---|---|---|---|---|---|
| (I) Systems | 1 | | 4 | 2 | | | |
| W/O 3P ASR | 4, 2 | 4, 2 | 1, 2 | 4, 1 | | | |
| (II) Systems | 1 | 1 | 4 | 2 | 5 | 3 | 6 |
| With 3P ASR | 4, 2 | 4, 2 | 1, 2 | 4, 1 | 1, 2, 3 | 5, 4 | 3, 2 |
| | 4, 3, 6 | 4, 3, 6 | 5, 3 | | 4, 3 | 6, 2 | 3, 4, 1 |
| | 5, 6 | 5, 6 | | | 1, 6 | | 5, 1 |

Referring still to FIG. 61 and also to again to Table 1, the present disclosure contemplates any system that includes any combination of link paths from Table 1 including one path option from each cell in one of the category rows (I) or (II) (e.g., first category without 3P ASR 2006 and second category with P ASR 2006). Thus, for instance, for captioning systems that do not include a 3P ASR 2006, a first system may include link paths 1; 1; 4 and 2 from columns (1), (2), (3) and (4), respectively, a second captioning system may include link paths 1; 1; 4 and 4, 1 from columns (1), (2), (3) and (4), respectively, and a third captioning system may include link paths 4,2; 4,2; 4 and 4 from columns (1), (2), (3) and (4), respectively. For captioning systems that do include a 3P ASR 2006, a first system may include link paths 1; 1; 4; 2; 5; 3 and 6 from columns (1), (2), (3), (4), (5) and (6) respectively, second captioning system may include link paths 4, 2; 4, 2; 1, 2; 4, 1; 1, 2, 3; 5, 4 and 3, 2 from columns (1), (2), (3), (4), (5) and (6), respectively, and a third captioning system may include link paths 1; 1; 1, 2; 2; 5; 3 and 6 from columns (1), (2), (3), (4), (5) and (6), respectively. Many other combinations of link paths from Table 1 (and any other possible link path) are contemplated, some that dynamically change when captioning starts and others that persist when captioning is turned on for an ongoing call.

Figure 28:
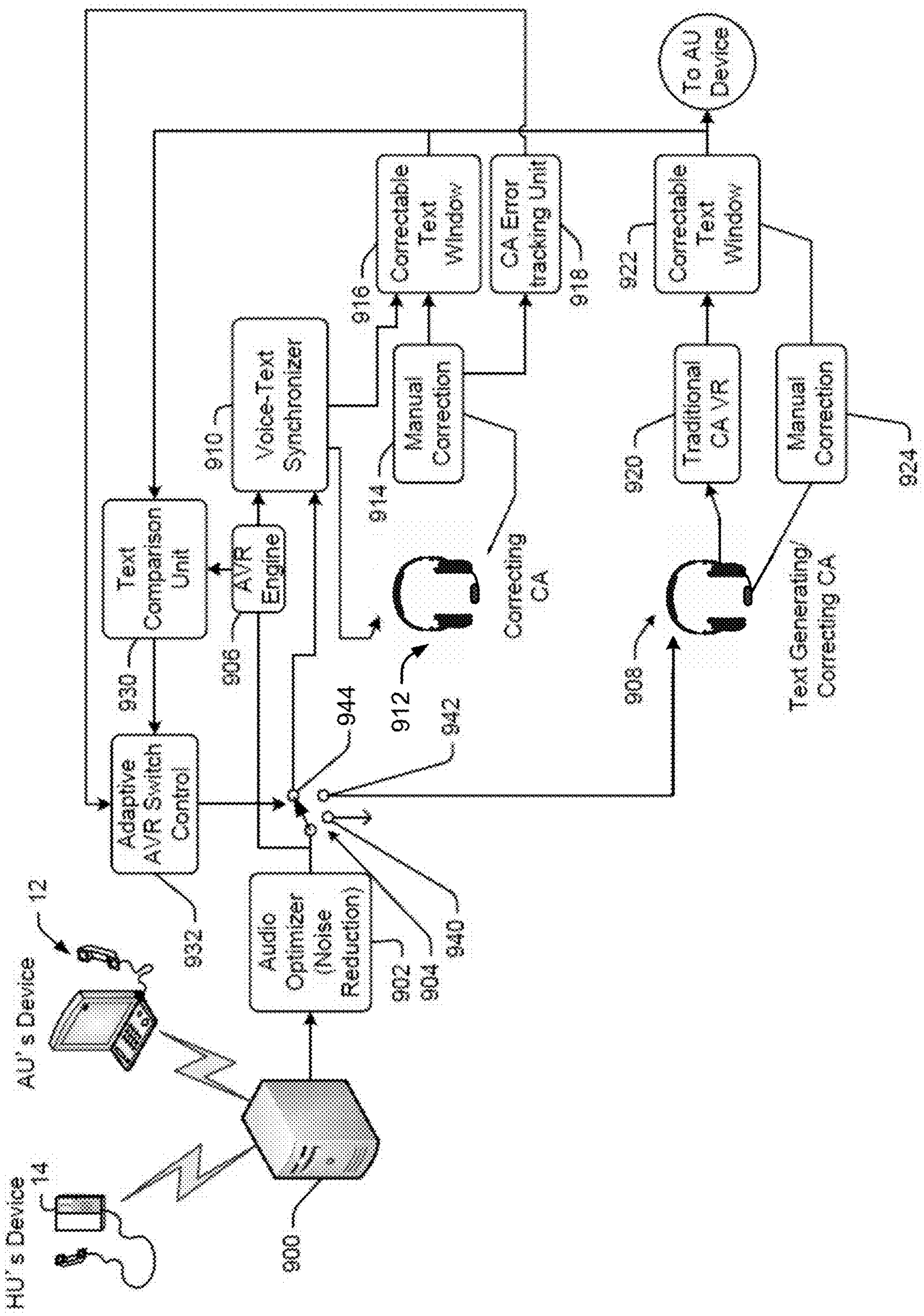
FIG. 28 is a schematic diagram showing a relay captioning system that is consistent with at least some aspects of the present disclosure.
Figure 28A:
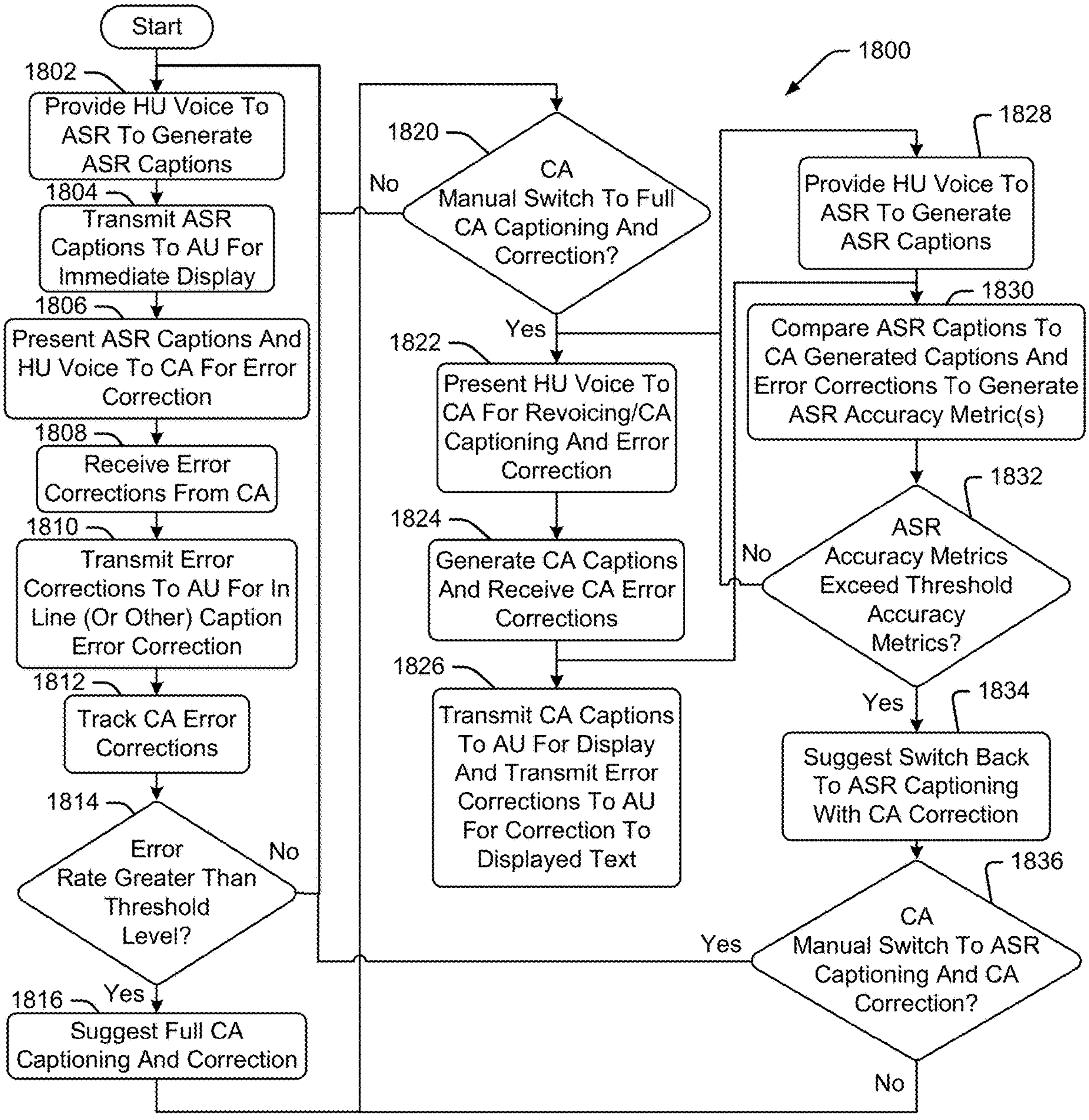
FIG. 28A includes a flowchart of a process that is consistent with at least some aspects of the present disclosure.

Referring now to FIG. 28, a schematic is shown of an exemplary semi-automated captioning system that is consistent with at least some aspects of the present disclosure. The system enables an HU using device 14 to communicate with an AU using AU device 12 where the AU receives text and HU voice signals via the AU device 12. Each of the HU and the AU link into a gateway server or other computing device 900 that is linked via a network of some type to a relay. HU voice signals are fed through a noise reducing audio optimizer to a 3 pole or path ASR switch device 904 that is controlled by an adaptive ASR switch controller 932 to select one of first, second and third text generating processes associated with switch output leads 940, 942 and 944, respectively. The first text generating process is an automated ASR text process wherein an ASR engine generates text without any input (e.g., data entry, correction, etc.) from any CA. The second text generating process is a process wherein a CA 908 revoices an HU voice or types to generate text corresponding to an HU voice signal and then corrects that text. The third text generating process is one wherein the ASR engine generates automated text and a correcting CA 912 makes corrections to the automated text. In the second process, the ASR engine operates in parallel with the CA to generate automated text in parallel to the CA generated and corrected text.

Referring still to FIG. 28, with switch 904 connected to output lead 940, the HU voice signal is only presented to ASR engine 906 which generates automated text corresponding to the HU voice which is then provided to a voice to text synchronizer 910. Here, synchronizer 910 simply passes the raw ASR text on through a correctable text window 916 to the AU device 12.

Referring again to FIG. 28, with switch 904 connected to output lead 942, the HU voice signal, in addition to being linked to the ASR engine, is presented to CA 908 for generating and correcting text via traditional CA voice recognition 920 and manual correction tools 924 via correction window 922. Here, corrected text is provided to the AU device 12 and is also provided to a text comparison unit or module 930. Raw text from the ASR engine 906 is presented to comparison unit 930. Comparison unit 930 compares the two text streams received and calculates an ASR error rate which is output to switch control 932. Here, where the ASR error rate is low (e.g., below some threshold), control 932 may be controlled to cut the text generating CA 908 out of the captioning process.

Referring still to FIG. 28, with switch 904 connected to output lead 944, the HU voice signal, in addition to being linked to the ASR engine, is fed through synchronizer 910 which delays the HU voice signal so that the HU voice signal lags the raw ASR text by a short period (e.g., 2 seconds). The delayed HU voice signal is provided to a CA 912 charged with correcting ASR text generated by engine 906. The CA 912 uses a keyboard or the like 914 to correct any perceived errors in the raw ASR text presented in window 916. The corrected text is provided to the AU device 12 and is also provided to the text comparison unit 930 for comparison to the raw ASR text. Again, comparison unit 930 generates an ASR error rate which is used by control 932 to operate switch device 904. The manual corrections by CA 912 are provided to a CA error tracking unit 918 which counts the number of errors corrected by the CA and compares that number to the total number of words generated by the ASR engine 906 to calculate a CA correction rate for the ASR generated raw text. The correction rate is provided to control 932 which uses that rate to control switch device 904.

Thus, in operation, when an HU-AU call first requires captioning, in at least some cases switch device 904 will be linked to output lead 942 so that full CA transcription and correction occurs in parallel with the ASR engine generating raw ASR text for the HU voice signal. Here, as described above, the ASR engine may be programmed to compare the raw ASR text and the CA generated text and to train to the HU's voice signal so that, over a relatively short period, the error rate generated by comparison unit 930 drops. Eventually, once the error rate drops below some rate threshold, control 932 controls device 940 to link to output lead 944 so that CA 908 is taken out of the captioning path and CA 912 is added. CA 912 receives the raw ASR text and corrects that text which is sent on to the AU device 12. As the CA corrects text, the ASR engine continues to train to the HU voice using the corrected errors. Eventually, the ASR accuracy should improve to the point where the correction rate calculated by tracking unit 918 is below some threshold. Once the correction rate is below the threshold, control 932 may control switch 904 to link to output link 940 to take the CA 912 out of the captioning loop which causes the relatively accurate raw ASR text to be fed through to the AU device 12. As described above in at least some cases the AU and perhaps a CA or the HU may be able to manually switch between captioning processes to meet preferences or to address perceived captioning problems.

FIG. 28A illustrates a method or process 1800 in flow chart form wherein a CA manually switches between an ASR caption and CA correction sub-process (e.g., a "first mode" of operation) and a full CA captioning-correcting sub-process (e.g., a "second mode of operation") that is consistent with at least some aspects of the present disclosure. In FIG. 28A the first mode of operation includes blocks 1802 through 1820 and the second mode of operation includes blocks 1822 through 1836. At block 1802, during a call between an AU and an HU, as the HU speaks, the HU voice signal is transmitted to a captioning relay which provides that HU voice signal to an ASR engine to generate ASR captions corresponding to the HU voice signal. Here, the HU voice signal may be transmitted to the relay either from the HU communication device or from the AU caption or other AU communication device (e.g., an AU phone device linked or in communication with an AU captioned device, a computer, a smart portable communication device, etc.). At block 1804, the ASR captions are transmitted to the AU captioned device for immediate display. At block 1806 the ASR captions are presented to a CA at the relay via a CA workstation display screen and the HU voice signal is broadcast to the CA via a headset or the like. The CA corrects ASR caption errors at block 180. At block 1810, CA error corrections are transmitted to the AU captioned device which uses those error corrections to make in line or other corrections to the prior presented ASR captions.

Referring still to FIG. 28A, at block 1812, the CA error corrections are tracked by a system processor which generates error rate metrics that reflect accuracy of the ASR captions/engine. At decision block 1814, the processor compares the instantaneous ASR caption error rate to a threshold level that represents an unacceptably high error rate. In this regard, "unacceptably high" means that the error rate is such that the error correction burden on the CA is high and likely slowing down the overall captioning and correction process when compared to metrics for the CA or CAs generally when the system operated via the second mode (e.g., where the CA generates initial captions as well as corrects errors in those captions without aid from an ASP). Thus, for instance, an exemplary threshold metric may be 10% of ASR captions requiring correction. In some cases the notification may be based on the error rate so that a more urgent notification is presented when the error rate is relatively higher.

At block 1814, where the error rate is not greater than the threshold level, control passes back up to block 1802 where the process described above continues. When the error rate exceeds the threshold level, control passes to block 1816 where the system processor generates an alert, notification or other type of signal to suggest to the CA that the CA manually switch from the first mode (e.g., ASR captions-CA corrections) to the second mode (e.g., full CA captions and corrections). For instance, a text notification may be presented along a lower edge of a display screen at a CA's workstation indicating, "Too many ASR errors, advise you switch to full CA captioning and corrections." Other notification types are contemplated including audible, haptic and combination of audible, haptic and visual. After block 1818, control passes to decision block 1820.

Referring again to FIG. 28A, at block 1820, the processor determines if the CA has manually elected to switch from the first to the second modes. In some cases even if the ASR caption error rate is high, a CA may still opt to have the ASR continue generating initial captions for the CA to correct. At block 1820, if the CA elects not to switch to the second mode, control passes back to block 1802 where the process described above continues. If the CA elects to switch to the full CA caption and correction mode, control passes to block 1822 where the HU voice signal is broadcast to the CA for revoicing to trained voice to text software or for typing captions corresponding thereto which are presented on the CA display screen for CA error correction.

In addition, in at least some cases when the CA elects to switch to the full CA caption and correction mode, control also passes to block 1828 where the HU voice signal is still provided to the ASR engine to generate ASR text behind the scenes (e.g., for comparison to CA captions and corrections but not to be presented on the CA display or AU captioned device).

Referring again FIG. 28A, at block 1824 the CA generates captions for the HU voice and also corrects errors in those captions. At block 1826 the CA captions are transmitted to the AU captioned device to be presented and error corrections are subsequently sent to the captioned device for in line or other error correction.

After ASR text is generated at block 1828, control passes to block 1830 where a system processor compares ASR captions to CA captions and error corrections to generate ASR accuracy metrics. At block 1832, the processor compares the ASR accuracy metrics to threshold accuracy metrics (e.g., 5% error rate over 30 seconds). Where the ASR quality metrics do not exceed the threshold metrics, control passes back up to blocks 1822 and 1828 where the process described above persists.

At block 1832, once the ASR accuracy metrics exceed the threshold accuracy metrics, control passes to block 1834 where the processor presents an alert, notification, or other indicator as a suggestion to the CA that the CA should at least consider switching back to the ASR captioning and CA correcting operating mode. At block 1836, if the CA switched back to the first operating mode, control passed back up to block 1802 as illustrated where the process described here continues to cycle. If the CA does not switch back to the first operating mode, control passes back up to block 1820 where the process that starts at block 1820 in FIG. 28A continually cycles.

Thus, in the FIG. 28A system there are two general operating modes including an ASR captioning and CA correcting mode and a full CA captioning and correcting mode where a system processor assesses ASR caption accuracy and provides guidance to a CA as to which mode is likely best given ASR caption accuracy and the CA manually switches between the two modes when deemed appropriate. In some cases interface icons or other input means for switching between the two modes may not be provided to the CA until the threshold accuracy metrics are met that trigger the suggestion to change.

It at least some embodiments the system may persistently provide interface icons or other input means enabling a CA to manually switch between the first and second operating modes at any time deemed appropriate by the CA. In this case, for instance, even where ASR captions are relatively accurate and do not exceed the threshold level at block 1814, the CA may opt for the full CA captioning and correcting operating mode.

In some cases it is contemplated that there may be two or more accuracy threshold levels and the system processor may operate differently to encourage a captioning mode change or to automatically cause a mode change based on which threshold is met. For instance, assume a case where a first ASR accuracy threshold is 10% (e.g., 10% of all captioned words are erroneous) and a second accuracy threshold is 15% (e.g., 15% of all captioned words are erroneous). Here, a processor may present a notification to a CA suggesting a change from the first mode to the second once the first threshold has been met for some duration of time (e.g., a time factor of 30 seconds). If the error rate exceeds the second threshold for a second time duration (e.g., 20 seconds), the processor may automatically initiate a change to the second operating mode. Thus, here, when the first threshold is met the CA is only encouraged to switch to the second mode but when the second threshold is met the system automatically initiates the second mode irrespective of the CA's desire. A similar 2 threshold triage process may be implemented when moving from the second operating mode to the first operating mode.

At most times ASR captioning will be faster and more real time than CA captioning and therefore, it will usually be advantageous to transmit ASR captions to an AU immediately in any system. In any of the above cases (e.g., two-mode or other configurations), ASR text may always be sent immediately upon generation to an AU captioned device for display followed by several rounds of error correction based on the instantaneously best caption information available from either an ASR or a CA. For example, where an ASR continues to generate ASR captions and automatically contextually correct ASR generated captions in parallel with a CA independently generating CA captions and manually correcting, the sequence of initial text to an AU and corrections may include (i) transmitting ASR txt to AU captioned device for display, (ii) transmitting ASR error corrections based on context to the AU captioned device for s first round of error corrections (assuming these corrections occur prior to CA error corrections (see (iv) hereafter)), (iii) transmitting CA generated (e.g., captioned from CA revoicing) captions or differences between those captions and the ASR captions to the AU captioned device for a second round of error corrections, and (iv) transmitting CA error corrections to the AU captioned device to drive a third round of error corrections at the AU device.

Figure 28B:
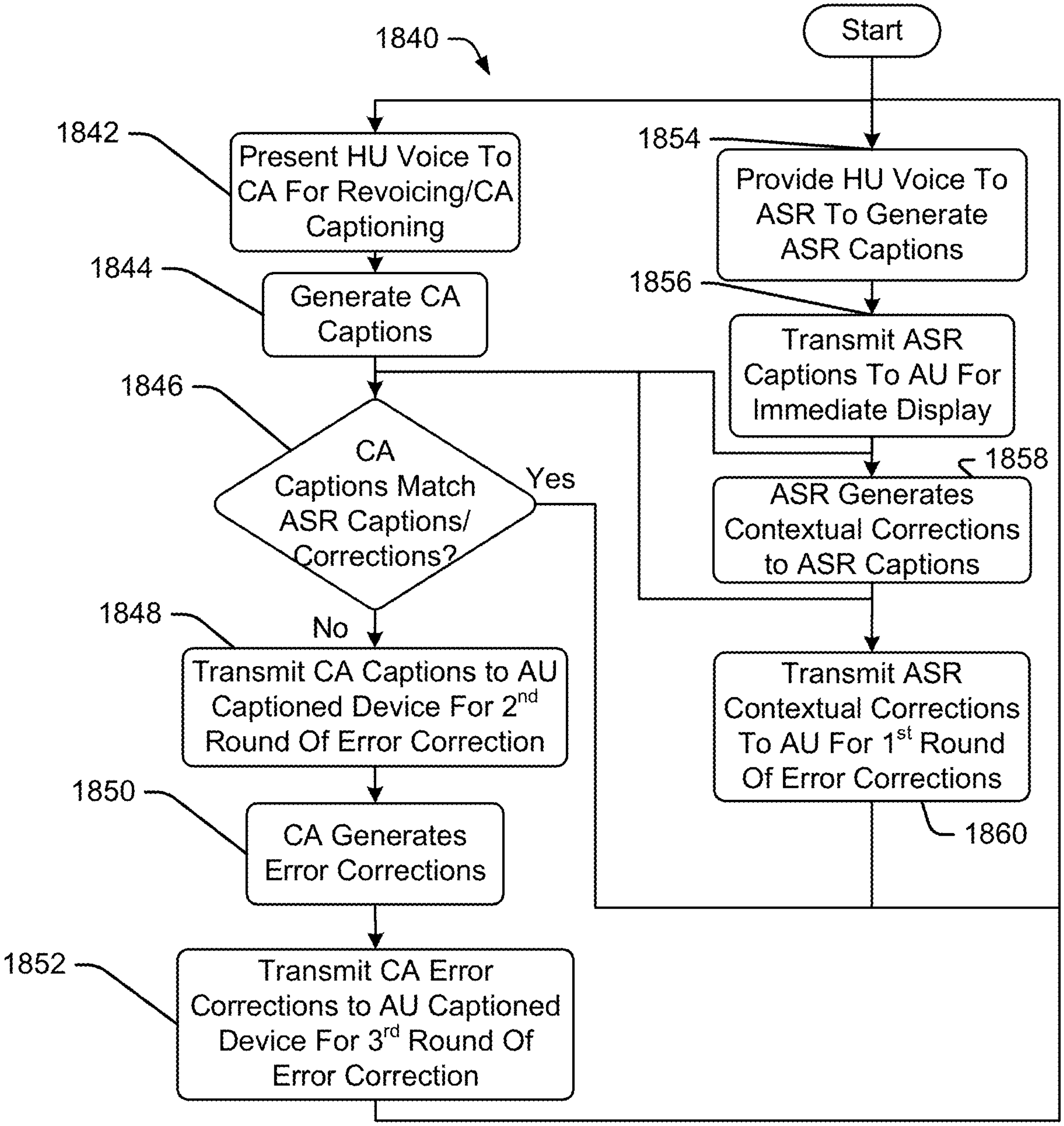
FIG. 28B includes a flowchart of a process that is consistent with at least some aspects of the present disclosure.

Referring now to FIG. 28B, a flow chart 1840 illustrating a captioning system with three rounds of error corrections is illustrated. At the beginning of the illustrated process, HU voice signal is simultaneously provided to an ASR for ASR captioning at block 1854 and to a CA at a relay at block 1842. The ASR engine generates ASR captions corresponding to the HU voice signal which are, upon generation, immediately transmitted to an AU captioned device at 1856 for display to an AU at the receiving device. At block 1858 the ASR engine continually uses perceived context in HU voice signal received to automatically identify likely errors in the ASR captions and at block 1860, corrections for perceived errors are sent to the AU captioned device for in line or other error correction to the ASR test previously presented to the AU (e.g., first round or error correction).

Referring again to FIG. 28B, at block 1842 the CA receives the HU voice signal and at block 1844 the CA revoices or otherwise acts to generate CA captions corresponding to the HU voice signal. At block 1846 a system processor receives the CA captions, the ASR captions and the ASR caption corrections and determines if the CA captions match the ASR captions and corrections. In at least some cases CA captions are taken as truth and therefore any mis-matching between CA and ASR captions or corrections is identified as an error in the ASR captions or corrections. At block 1848 CA captions that do not match the ASR captions or corrections are transmitted as error corrections to the AU captioned device for the second round of in line error or other type of correction.

Referring still to FIG. 28B, at block 1850 the CA reviews the CA generated text on a display screen and makes manual error corrections to that text which are transmitted to the AU captioned device to drive the third round of error corrections on the display presented to the AU.

As described above, it has been recognized that at least some ASR engines are more accurate and more resilient during the first 30+/− seconds of performing voice to text transcription. If an HU takes a speaking turn that is longer than 30 seconds the engine has a tendency to freeze or lag. To deal with this issue, in at least some embodiments, all of an HU's speech or voice signal may be fed into an audio buffer and a system processor may examine the HU voice signal to identify any silent periods that exceed some threshold duration (e.g., 2 seconds). Here, a silent period would be detected whenever the HU voice signal audio is out of a range associated with a typical human voice. When a silent period is identified, in at least some cases the ASR engine is restarted and a new ASR session is created. Here, because the process uses an audio buffer, no portion of the HU's speech or voice signal is lost and the system can simply restart the ASR engine after the identified silent period and continue the captioning process after removing the silent period.

Because the ASR engine is restarted whenever a silent period of at least a threshold duration occurs, the system can be designed to have several advantageous features. First, the system can implement a dynamic and configurable range of silence or gap threshold. For instance, in some cases, the system processor monitoring for a silent period of a certain threshold duration can initially seek a period that exceeds some optimal relatively long length and can reduce the length of the threshold duration as the ASR captioning process nears a maximum period prior to restarting the engine. Thus, for instance, where a maximum ASR engine captioning period is 30 seconds, initially the silent period threshold duration may be 3 seconds. However, after an initial 20 seconds of captioning by an engine, the duration may be reduced to 1.5 seconds. Similarly, after 25 seconds of engine captioning, the threshold duration may be reduced further to one half a second.

As another instance, because the system uses an audio buffer in this case, the system can "manufacture" a gap or silent period in which to restart an ASR engine, holding an HU's voice signal in the audio buffer until the ASR engine starts captioning anew. While the manufactured silent period is not as desirable as identifying a natural gap or silent period as described above, the manufactured gap is a viable option if necessary so that the ASR engine can be restarted without loss of HU voice signal.

In some cases it is contemplated that a hybrid silent period approach may be implemented. Here, for instance, a system processor may monitor for a silent period that exceeds 3 seconds in which to restart an ASR engine. If the processor does not identify a suitable 3-plus second period for restarting the engine within 25 seconds, the processor may wait until the end of any word and manufacture a 3 second period in which to restart the engine.

Where a silent period longer than the threshold duration occurs and the ASR engine is restarted, if the engine is ready for captioning prior to the end of the threshold duration, the processor can take out the end of the silent period and begin feeding the HU voice signal to the ASR engine prior to the end of the threshold period. In this way, the processor can effectively eliminate most of the silent period so that captioning proceeds quickly.

Restarting an ASR engine at various points within an HU voice signal has the additional benefit of making all hypothesis words (e.g., initially identified words prior to contextual correction based on subsequent words) firm in at least some embodiments. Doing so allows a CA correcting the text to make corrections or any other manipulations deemed appropriate for an AU immediately without having to wait for automated contextual corrections and avoids a case where a CA error correction may be replaced subsequently by an ASR engine correction.

In still other cases other hybrid systems are contemplated where a processor examines an HU voice signal for suitably long silent periods in which to restart an ASR engine and, where no such period occurs by a certain point in a captioning process, the processor commences another ASR engine captioning process which overlaps the first process so that no HU voice signal is lost. Here, the processor would work out which captioned words are ultimately used as final ASR output during the overlapping periods to avoid duplicative or repeated text.

Return on Audio Detector Feature

One other feature that may be implemented in some embodiments of this disclosure is referred to as a Return On Audio detector (ROA-Detector) feature. In this regard, a system processor receiving an HU voice signal ascertains whether or not the signal includes audio in a range that is typical for human speech during an HU turn and generates a duration of speech value equal to the number of seconds of speech received. Thus, for instance, in a ten second period corresponding to an HU voice signal turn, there may be 3 seconds of silence during which audio is not in the range of typical human speech and therefore the duration of speech value would be 7 seconds. In addition, the processor detects the quantity of captions being generated by an ASR engine. The processor automatically compares the quantity of captions from the ASR with the duration of speech value to ascertain if there is a problem with the ASR engine. Thus, for instance, if the quantity of ASR generated captions is substantially less than would be expected given the duration of speech value, a potential ASR problem may be identified. The idea here is that if the duration of speech value is low (e.g., 4 out of 10 seconds) while the caption quality value (based on CA error corrections or some other factor(s)) is also low, the low caption quality value is likely not associated with the quantity of speech signal to be captioned and instead is likely associated with an ASR problem. Where an ASR problem is likely, the likely problem may be used by the processor to trigger a restart of the ASR engine to generate a better result. As an alternative, where an ASR problem is likely, the problem may trigger initiation of a whole new ASR session. As still one other alternative, a likely ASR problem may trigger a process to bring a CA on line immediately or more quickly than would otherwise be the case.

In still other cases, when a likely ASR error is detected as indicated above, the ROA detector may retrieve the audio (i.e., the HU voice signal) that was originally sent to the ASR from a rolling buffer and replay/resend the audio to the ASR engine. This replayed audio would be sent through a separate session simultaneously with any new sessions that are sending ongoing audio to the ASR. Here, the captions corresponding to the replayed audio would be sent to the AU device and inserted into a correct sequential slot in the captions presented to the AU. In addition, here, the ROA detector would monitor the text that comes back from the ASR and compare that text to the text retrieved during the prior session, modifying the captions to remove redundancies. Another option would be for the ROA to simply deliver a message to the AU device indicating that there was an error and that a segment of audio was likely not properly captioned. Here, the AU device would present the likely erroneous captions in some way that indicates a likely error (e.g., perhaps visually distinguished by a yellow highlight or the like).

In some cases it is contemplated that a phone user may want to have just in time (JIT) captions on their phone or other communication device (e.g., a tablet) during a call with an HU for some reason. For instance, when a smart phone user wants to remove a smart phone from her ear for a short period the user may want to have text corresponding to an HU's voice presented during that period. Here, it is contemplated that a virtual "Text" or "Caption" button may be presented on the smart phone display screen or a mechanical button may be presented on the device which, when selected causes an ASR to generate text for a preset period of time (e.g. 10 seconds) or until turned off by the device user. Here, the ASR may be on the smart phone device itself, may be at a relay or at some other deice (e.g., the HU's device). In other cases where a smart phone includes a motion sensor device or other sensor that can detect when a user moves the device away from her ear or when the user looks at the device (e.g., a face recognition or eye gaze sensor), the system may automatically present text to the AU upon a specific motion (e.g., pulling away from the user's ear) or upon recognizing that the user is likely looking at a display screen on the AU's device.

While HU voice profiles may be developed and stored for any HU calling an AU, in some embodiments, profiles may only be stored for a small set of HUs, such as, for instance, a set of favorites or contacts of an AU. For instance, where an AU has a list of ten favorites, HU voice profiles may be developed, maintained, and morphed over time for each of those favorites. Here, again, the profiles may be stored at different locations and by different devices including the AU device, a relay, via a third party service provider, or even an HU device where the HU earmarks certain AUs as having the HU as a favorite or a contact.

In some cases it may be difficult technologically for a CA to correct ASR captions. Here, instead of a CA correcting captions, another option would simply be for a CA to mark errors in ASR text as wrong and move along. Here, the error could be indicated to an AU via the display on an AU's device. In addition, the error could be used to train an HU voice profile and/or captioning model as described above. As another alternative, where a CA marks a word wrong, a correction engine may generate and present a list of alternative words for the CA to choose from. Here, using an on screen tool, the CA may select a correct word option causing the correction to be presented to an AU as well as causing the ASR to train to the corrected word.

Metrics—Tracking and Reporting CA and ASR Accuracy

In at least some cases it is contemplated that it may be useful to run periodic tests on CA generated text captions to track CA accuracy or reliability over time. For instance, in some cases CA reliability testing can be used to determine when a particular CA could use additional or specialized training. In other cases, CA reliability testing may be useful for determining when to cut a CA out of a call to be replaced by automatic speech recognition (ASR) generated text. In this regard, for instance, if a CA is less reliable than an ASR application for at least some threshold period of time, a system processor may automatically cut the CA out even if ASR quality remains below some threshold target quality level if the ASR quality is persistently above the quality of CA generated text. As another instance, where CA quality is low, text from the CA may be fed to a second CA for either a first or second round of corrections prior to transmission to an AU device for display or, a second relatively more skilled CA trained in handling difficult HU voice signals may be swapped into the transcription process in order to increase the quality level of the transcribed text. As still one other instance, CA reliability testing may be useful to a governing agency interested in tracking CA accuracy for some reason.

In at least some cases it has been recognized that in addition to assessing CA captioning quality, it will be useful to assess how accurately an automated speech recognition system can caption the same HU voice signal regardless of whether or not the quality values are used to switch the method of captioning. For instance, in at least some cases line noise or other signal parameters may affect the quality of HU voice signal received at a relay and therefore, a low CA captioning quality may be at least in part attributed to line noise and other signal processing issues. In this case, an ASR quality value for ASR generated text corresponding to the HU voice signal may be used as an indication of other parameters that affect CA captioning quality and therefore in part as a reason or justification for a low CA quality value. For instance, where an ASR quality value is 75% out of 100% and a CA quality value is 87% out of 100%, the low ASR quality value may be used to show that, in fact, given the relatively higher CA quality value, that the CA value is quite good despite being below a minimum target threshold. Line noise and other parameters may be measured in more direct ways via line sensors at a relay or elsewhere in the system and parameter values indicative of line noise and other characteristics may be stored along with CA quality values to consider when assessing CA caption quality.

Several ways to test CA accuracy and generate accuracy statistics are contemplated by the present disclosure. One system for testing and tracking accuracy may include a system where actual or simulated HU-AU calls are recorded for subsequent testing purposes and where HU turns (e.g., voice signal periods) in each call are transcribed and corrected by a CA to generate a true and highly accurate (e.g., approximately 100% accurate) transcription of the HU turns that is referred to hereinafter as the "truth". Here, metrics on the HU voice message speed, dynamic duration of speech value, complexity of voice message words, quality of voice message signal, voice message pitch, tone, etc., can all be predetermined and used to assess CA accuracy as well as to identify specific call types with specific characteristics that a CA does best with and others that the assistant has relatively greater difficulty handling.

During testing, without a CA knowing that a test is being performed, the test recording is presented to the CA as a new AU-HU call for captioning and the CA perceives the recording to be a typical HU-AU call. In many cases, a large number of recorded calls may be generated and stored for use by the testing system so that a CA never listens to the same test recording more than once. In some cases a system processor may track CAs and which test recordings the CA has been exposed to previously and may ensure that a CA only listens to any test recording once.

As a CA listens to a test recording, the CA transcribes the HU voice signal to text and, in at least some cases, makes corrections to the text. Because the CA generated text corresponds to a recorded voice signal and not a real time signal, the text is not forwarded to an AU device for display. The CA is unaware that the text is not forwarded to the AU device as this exercise is a test. The CA generated text is compared to the truth and a quality value is generated for the CA generated text (hereinafter a "CA quality value"). For instance, the CA quality value may be a percent accuracy representing the percent of HU voice signal words accurately transcribed to text. The CA quality value may also be affected by other factors like speed of the voice message, dynamic duration of speech value, complexity of voice message words, quality of voice message signal, voice message pitch, tone, etc.

In at least some cases different CA quality values may be generated for a single CA where each value is associated with a different subset of voice message and captioning characteristics. For instance, in a simple case, a first CA may have a high caption quality value associated with high pitch voices and a relatively lower caption quality value associated with low pitch voices. The same first CA may have a relatively high caption quality value for high pitched voices where a duration of speech value is relatively low (e.g., less than 50%) when compared to the quality value for a high pitched voice where the duration of speech value is relatively high (e.g., greater than 50%). Many other voice message characteristic subsets for qualifying caption quality values are contemplated.

The multiple caption quality values can be used to identify specific call types with specific characteristics that a CA does best with and others that the assistant has relatively greater difficulty handling. Incoming calls can be routed to CAs that are optimized (e.g., available and highly effective for calls with specific characteristics) to handle those calls. CA caption quality values and associated voice message characteristics are stored in a data base for subsequent access.

In addition to generating one or more CA quality values that represent how accurately a CA transcribes voice to text, in at least some cases the system will be programmed to track and record transcription latency that can be used as a second type of quality factor referred to hereinafter as the "CA latency value". Here, the system may track instantaneous latency and use the instantaneous values to generate average and other statistical latency values. For instance, an average latency over an entire call may be calculated, an average latency over a most recent one minute period may be calculated, a maximum latency during a call, a minimum latency during a call, a latency average taking out the most latent 20% and least latent 20% of a call may be calculated and stored, etc. In some cases where both a CA quality value and CA latency values are generated, the system may combine the quality and latency values according to some algorithm to generate an overall CA service value that reflects the combination of accuracy and latency.

CA latency may also be calculated in other ways. For instance, in at least some cases a relay server may be programmed to count the number of words during a period that are received from an ASR service provider (see 1006 in FIG. 30) and to assume that the returned number of words over a minute duration represents the actual words per minute (WPM) spoken by an HU. Here, periods of HU silence may be removed from the period so that the word count more accurately reflects WPM of the speaking HU. Then, the number of words generated by a CA for the same period may be counted and used along with the period duration minus silent periods to determine a CA WPM count. The server may then compare the HU's WPM to the CA WPM count to assess CA delay or latency.

Where actual calls are used to generate CA metrics, in at least some cases call content is not persistently stored as either voice or text for subsequent access. Instead, in these cases, only audio, caption and correction timing information (e.g., delay durations) is stored for each call. In other cases, in addition to the timing information, call characteristics (e.g., Hispanic voice, HU WPM rate, line signal quality, HU volume, tone, etc.) and/or error types (e.g., visible, invisible, minor, etc.) for each corrected and missed error may be stored.

Where pre-recorded test calls are used to generate CA metrics, in at least some cases in addition to storing the timing, call characters and error types for each call, the system may store the complete text call audio record with time stamps, captioning record and corrections record so that a system administrator has the ability to go back and view captioning and correction for an entire call to gain insights related to CA strengths and weaknesses.

In at least some cases the recorded call may also be provided to an ASR to generate automatic text. The ASR generated text may also be compared to the truth and an "ASR quality value" may be generated. The ASR quality value may be stored in a database for subsequent use or may be compared to the CA quality value to assess which quality value is higher or for some other purpose. Here, also, an ASR latency value or ASR latency values (e.g., max, min, average over a call, average over a most recent period, etc.) may be generated as well as an overall ASR service value. Again, the ASR and CA values may be used by a system processor to determine when the ASR generated text should be swapped in for the CA generated text and vice versa.

Figure 29:
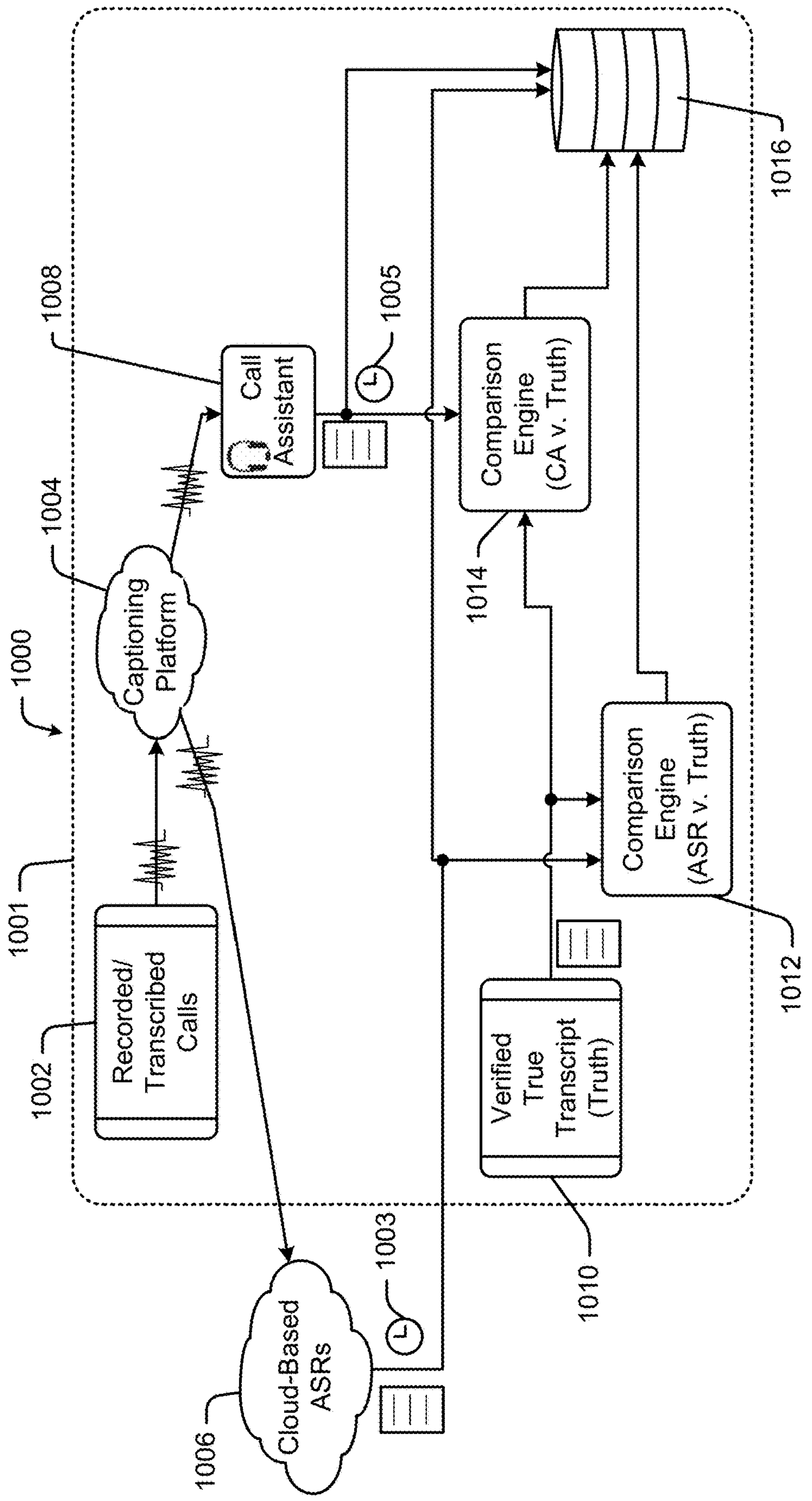
FIG. 29 is a schematic diagram of a relay system that includes a text transcription quality assessment function that is consistent with at least some aspects of the present disclosure.

Referring now to FIG. 29, an exemplary system 1000 for testing and tracking CA and ASR quality and latency values using pre-recorded HU-AU calls is illustrated. System 1000 includes relay components represented by the phantom box at 1001 and a cloud based ASR system 1006 (e.g., a server that is linked to via the internet or some other type of computing network). Two sources of pre-generated information are maintained at the relay including a set of recorded calls at 1002 and a set of verified true transcripts at 1010, one truth or true transcript for each recorded call in the set 1002. Again, the recorded calls may include actual HU-AU calls or may include mock calls that occur between two knowing parties that simulate an actual call.

During testing, a connection is linked from a system server that stores the calls 1002 to a captioning platform as shown at 1004 and one of the recorded calls, hereinafter referred to as a test recording, is transmitted to the captioning platform 1004. The captioning platform 1004 sends the received test recording to two targets including a CA at 1008 and the ASR server 1006 (e.g., Google Voice, IBM's Watson, etc.). The ASR generates an automated text transcript that is forwarded on to a first comparison engine at 1012. Similarly, the CA generates CA generated text which is forwarded on to a second comparison engine 1014. The verified truth text transcript at 1010 is provided to each of the first and second comparison engines 1012 and 1014. The first engine 1012 compares the ASR text to the truth and generates an ASR quality value and the second engine 1014 compares the CA generated text to truth and generates a CA quality value, each of which are provided to a system database 1016 for storage until subsequently required.

In addition, in some cases, some component within the system 1000 generates latency values for each of the ASR text and the CA generated text by comparing when the times at which words are uttered in the HU voice signal to the times at which the text corresponding thereto is generated. The latency values are represented by clock symbols 1003 and 1005 in FIG. 29. The latency values are stored in the database 1016 along with the associated ASR and CA quality values generated by the comparison engines 1012 and 1014.

Another way to test CA quality contemplated by the present disclosure is to use real time HU-AU calls to generate quality and latency values. In these cases, a first CA may be assigned to an ongoing HU-AU call and may operate in a conventional fashion to generate transcribed text that corresponds to an HU voice signal where the transcribed text is transmitted back to the AU device for display substantially simultaneously as the HU voice is broadcast to the AU. Here, the first CA may perform any process to convert the HU voice to text such as, for instance, revoicing the HU voice signal to a processor that runs voice to text software trained to the voice of the HU to generate text and then correcting the text on a display screen prior to sending the text to the AU device for display. In addition, the CA generated text is also provided to a second CA along with the HU voice signal and the second CA listens to the HU voice signal and views the text generated by the first CA and makes corrections to the first CA generated text. Having been corrected a second time, the text generated by the second CA is a substantially error free transcription of the HU voice signal referred to hereinafter as the "truth". The truth and the first CA generated text are provided to a comparison engine which then generates a "CA quality value" similar to the CA quality value described above with respect to FIG. 29 which is stored for subsequent access in a database.

In addition, as is the case in FIG. 29, in the case of transcribing an ongoing HU-AU call, the HU voice signal may also be provided to a cloud based ASR server or service to generate automated speech recognition text during an ongoing call that can be compared to the truth (e.g., the second CA generated text) to generate an ASR quality value. Here, while conventional ASRs are fast, there will again be some latency in text generation and the system will be able to generate an ASR latency value.

Figure 30:
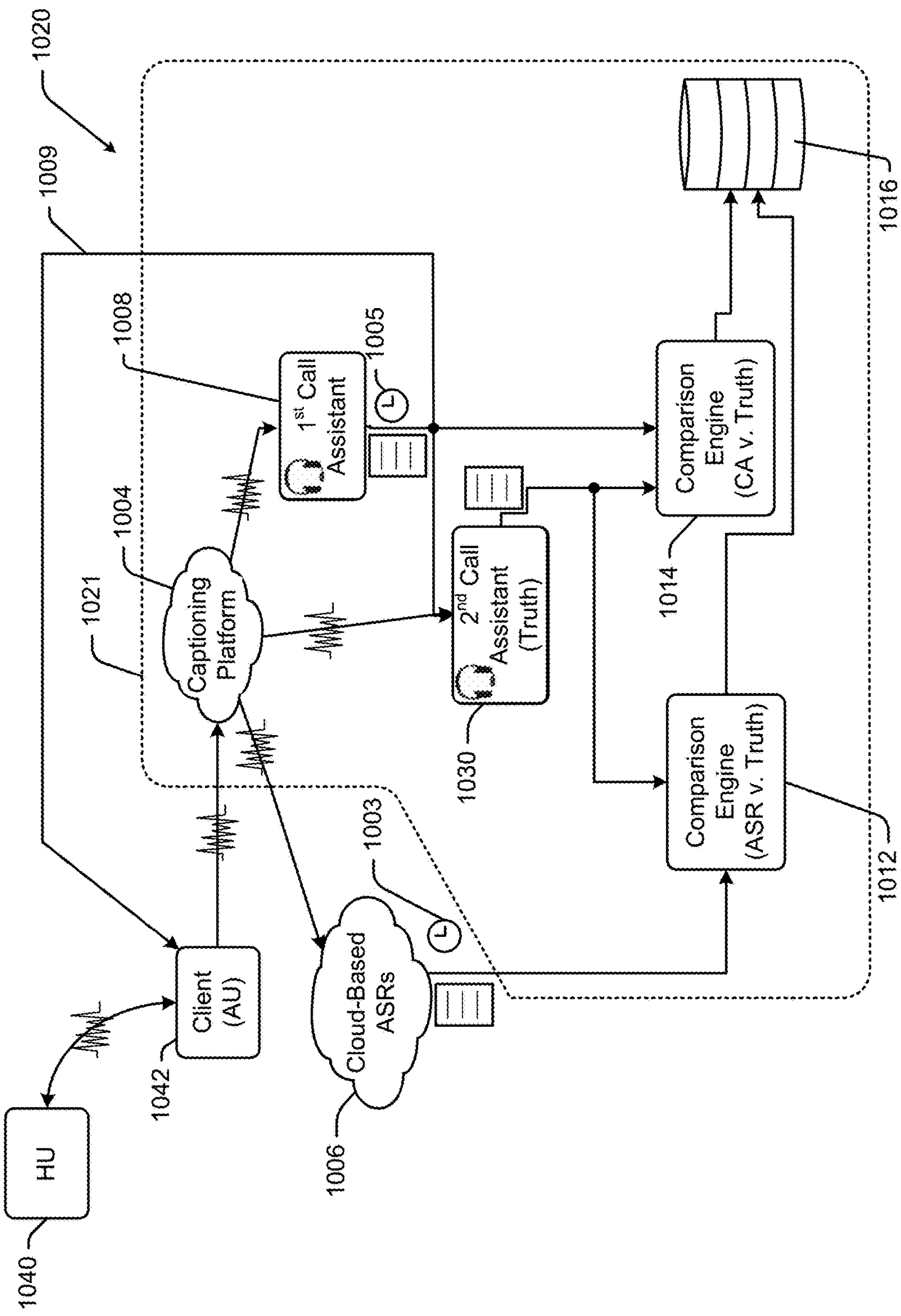
FIG. 30 is similar to FIG. 29, albeit showing a different relay system that includes a different quality assessment function.

Referring now to FIG. 30, an exemplary system 1020 for testing and tracking CA and ASR quality and latency values using ongoing HU-AU calls is illustrated. Components in the FIG. 30 system 1020 that are similar to the components described above with respect to FIG. 29 are labeled with the same numbers and operate in a similar fashion unless indicated otherwise hereafter. In addition to an HU communication device 1040 and an AU communication device 1042 (e.g., a caption type telephone device), system 1020 includes relay components represented by the phantom box at 1021 and a cloud based ASR system 1006 akin to the cloud based system described above with respect to FIG. 29. Here there is no pre-generated and recorded call or pre-generated truth text as testing is done using an ongoing dynamic call. Instead, a second CA at 1030 corrects text generated by a first CA at 1008 to create a truth (e.g., essentially 100% accurate text). The truth is compared to ASR generated text and the first CA generated text to create quality values to be stored in database 1016.

Referring still to FIG. 30, during testing, as in a conventional relay assisted captioning system, the AU device 1042 transmits an HU voice signal to the captioning platform at 1004. The captioning platform 1004 sends the received HU voice signal to two targets including a first CA at 1008 and the ASR server 1006 (e.g., Google Voice, IBM's Watson, etc.). The ASR generates an automated text transcript that is forwarded on to a first comparison engine at 1012. Similarly, the first CA generates CA generated text which is transmitted to at least three different targets. First, the first CA generated text which may include text corrected by the first CA is transmitted to the AU device 1042 for display to the AU during the call. Second, the first CA generated text is transmitted to the second comparison engine 1014. Third, the first CA generated text is transmitted to a second CA at 1030. The second CA at 1030 views the CA generated text on a display screen and also listens to the HU voice signal and makes corrections to the first CA generated text where the second CA generated text operates as a truth text or truth. The truth is transmitted to the second comparison engine at 1014 to be compared to the first CA generated text so that a CA quality value can be generated. The CA quality value is stored in database 1016 along with one or more CA latency values.

Referring again to FIG. 30, the truth is also transmitted from the second CA at 1030 to the first comparison engine at 1012 to be compared to the ASR generated text so that an ASR quality value is generated which is also stored along with at least one ASR latency value in the database 1016.

Figure 31:
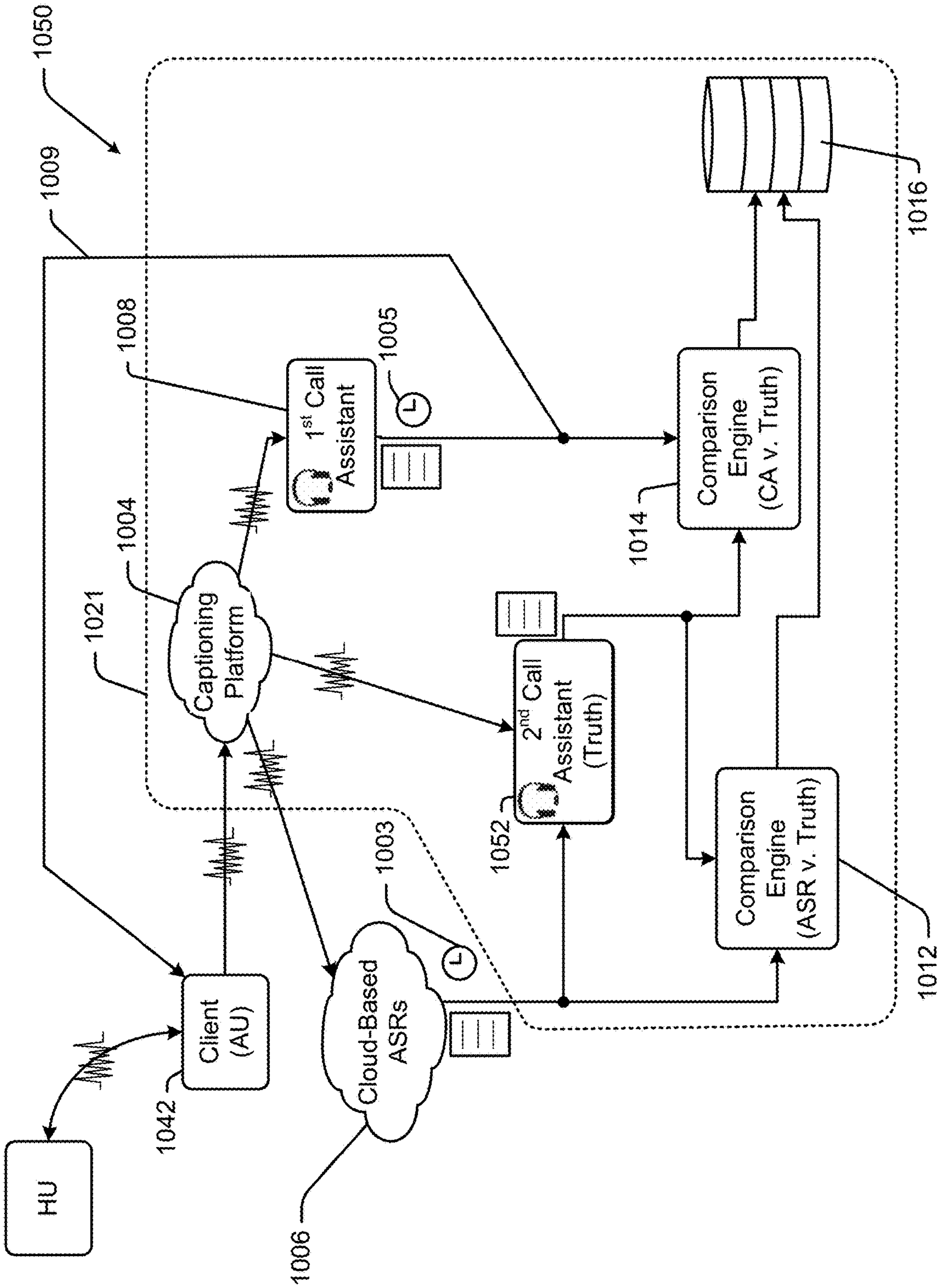
FIG. 31 is similar to FIG. 29, albeit showing a third relay system that includes a third quality assessment function.

Referring to FIG. 31, another embodiment of a testing relay system is shown at 1050 which is similar to the system 1020 of FIG. 30, albeit where the ASR service 1006 provides an initial text transcription to the second CA at 1052 instead of the CA receiving the initial text from the first CA. Here, the second CA generated the truth text which is again provided to the two comparison engines at 1012 and 1014 so that ASR and CA quality factors can be generated to be stored in database 1016.

The ASR text generation and quality testing processes are described above as occurring essentially in real time as a first CA generates text for a recorded or ongoing call. Here, real time quality and latency testing may be important where a dynamic triage transcription process is occurring where, for instance, ASR generated text may be swapped in for a cut out CA when ASR generated text achieves some quality threshold or a CA may be swapped in for ASR generated text if the ASR quality value drops below some threshold level. In other cases, however, quality testing may not need to be real time and instead, may be able to be done off line for some purposes. For instance, where quality testing is only used to provide metrics to a government agency, the testing may be done off line.

In this regard, referring again to FIG. 29, in at least some cases where testing cannot be done on the fly as a CA at 1008 generates text, the CA text and the recorded HU voice signal associated therewith may be stored in database 1016 for subsequent access for generating the ASR text at 1006 as well as for comparing the CA generated text and the ASR generated text to the verified truth text from 1010. Similarly, referring again to FIG. 30, where real time quality and latency values are not required, at least the HU portion of a call may be stored in database 1016 for subsequent off line processing by ASR service 1006 and the second CA at 1030 and then for comparisons to the truth at engines 1012 an 1014.

It should be appreciated that current there are Federal and state regulations that prohibit storage of any parts of voice communications between two or more people without authorization from at least one of those persons. For this reason, in at least some cases it is contemplated that real voice recordings of AU-HU calls may only be used for training purposes after authorization is sought and received. Here, the same recording may be used to train multiple CAs. In other cases, "fake" AU-HU call recordings may be generated and used for training purposes so that regulations and AU and HU privacy concerns cannot be violated. Here, true transcripts of the fake calls can be generated and stored for use in assessing CA caption quality. One advantage of fake call records is that different qualities of HU voice signals can be simulated automatically to see how those affect CA caption accuracy speed, etc. For instance, a first CA may be much more accurate and faster than a second CA at captioning standard or poor definition or quality voice signals.

One advantage of generating quality and latency values in real time using real HU-AU calls is that there is no need to store calls for subsequent processing. Currently there are regulations in at least some jurisdictions that prohibit storing calls for privacy reasons and therefore off line quality testing cannot be done in these cases.

In at least some embodiments it is contemplated that quality and latency testing may only be performed sporadically and generally randomly so that generated values are sort of an average representation of the overall captioning service. In other cases, while quality and latency testing may be periodic in general, it is contemplated that tell tail signs of poor quality during transcription may be used to trigger additional quality and latency testing. For instance, in at least some cases where an AU is receiving ASR generated text and the AU selects an option to link to a CA for correction, the AU request may be used as a trigger to start the quality testing process on text received from that point on (e.g., quality testing will commence and continue for HU voice received as time progresses forward). Similarly, when an AU requests full CA captioning (e.g., revoicing and text correction), quality testing may be performed from that point forward on the CA generated text.

In other cases, it is contemplated that an HU-AU call may be stored during the duration of the call and that, at least initially, no quality testing may occur. Then, if an AU requests CA assistance, in addition to patching a CA into the call to generate higher quality transcription, the system may automatically patch in a second CA that generates truth text as in FIG. 30 for the remainder of the call. In addition or instead, when the AU requests CA assistance, the system may, in addition to patching a CA in to generate better quality text, also cause the recorded HU voice prior to the request to be used by a second CA to generate truth text for comparison to the ASR generated text so that an ASR quality value for the text that caused the AU to request assistance can be generated. Here, the pre-CA assistance ASR quality value may be generated for the entire duration of the call prior to the request or just for a most recent sub-period (e.g., for the prior minute or 30 seconds). Here, in at least some cases, it is contemplated that the system may automatically erase any recorded portion of an HU-AU call immediately after any quality values associated therewith have been calculated. In cases where quality values are only calculated for a most recent period of HU voice signal, recordings prior thereto may be erased on a rolling basis.

As another instance, in at least some cases it is contemplated that sensors at a relay may sense line noise or other signal parameters and, whenever the line noise or other parameters meet some threshold level, the system may automatically start quality testing which may persist until the parameters no longer meet the threshold level. Here, there may be hysteresis built into the system so that once a threshold is met, at least some duration of HU voice signal below the threshold is required to halt the testing activities. The parameter value or condition or circumstance that triggered the quality testing would, in this case, be stored along with the quality value and latency information to add context to why the system started quality testing in the specific instance.

As one other example, in a case where an AU signals dissatisfaction with a captioning service at the end of a call, quality testing may be performed on at least a portion of the call. To this end, in at least some cases as an HU-AU call progresses, the call may be recorded regardless of whether or not ASR or CA generated text is presented to an AU. Then, at the end of a call, a query may be presented to the AU requesting that the AU rate the AU's satisfaction with the call and captioning on some scale (e.g., a 1 through 10 quality scale with 10 being high). Here, if a satisfaction rating were low (e.g., less than 7) for some reason, the system may automatically use the recorded HU voice or at least a portion thereof to generate a CA quality value in one of the ways described above. For instance, the system may provide the text generated by a first CA or by the ASR and the recorded HU voice signal to a second CA for generating truth and a quality value may be generated using the truth text for storage in the database.

In still other cases where an AU expresses a low satisfaction rating for a captioning service, prior to using a recorded HU voice signal to generate a quality value, the system server may request authorization to use the signal to generate a captioning quality value. For instance, after an AU indicates a 7 (out of 10) or lower on a satisfaction scale, the system may query the AU for authorization to check captioning quality by providing a query on the AU's device display and "Yes" and "No" options. Here, if the yes option is selected, the system would generate the captioning quality value for the call and memorialize that value in the system database 1016. In addition, if the system identifies some likely factor in a low quality assessment, the system may memorialize that factor and present some type of feedback indicating the factor as a likely reason for the low quality value. For instance, if the system determines that the AU-HU link was extremely noisy, that factor may be memorialized and indicated to the AU as a reason for the poor quality captioning service.

As another instance, because it is the HU's voice signal that is recorded (e.g., in some cases the AU voice signal may not be recorded) and used to generate the captioning quality value, authorization to use the recording to generate the quality value may be sought from an HU if the HU is using a device that can receive and issue an authorization request at the end of a call. For instance, in the case of a call where an HU uses a standard telephone, if an AU indicates a low satisfaction rating at the end of a call, the system may transmit an audio recording to the HU requesting authorization to use the HU voice signal to generate the quality value along with instructions to select "1" for yes and "2" for no. In other cases where an HU's device is a smart phone or other computing type device, the request may include text transmitted to the HU device and selectable "Yes" and "No" buttons for authorizing or not.

While an HU-AU call recording may be at least temporarily stored at a relay, in other cases it is contemplated that call recordings may be stored at an AU device or even at an HU device until needed to generate quality values. In this way, an HU or AU may exercise more control or at least perceive to exercise more control over call content. Here, for instance, while a call may be recorded, the recording device may not release recordings unless authorization to do so is received from a device operator (e.g., an HU or an AU). Thus, for instance, if the HU voice signal for a call is stored on an HU device during the call and, at the end of a call an AU expresses low satisfaction with the captioning service in response to a satisfaction query, the system may query the HU to authorize use of the HU voice to generate captioning quality values. In this case, if the HU authorizes use of the HU voice signal, the recorded HU voice signal would be transmitted to the relay to be used to generate captioning quality values as described above. Thus, the HU or AU device may serve as a sort of software vault for HU voice signal recordings that are only released to the relay after proper authorization is received from the HU or the AU, depending on system requirements.

As generally known in the industry, voice to text software accuracy is higher for software that is trained to the voice of a speaking person. Also known is that software can train to specific voices over short durations. Nevertheless, in most cases it is advantageous if software starts with a voice model trained to a particular voice so that caption accuracy can start immediately upon transcription. Thus, for instance, in FIG. 30, when a specific HU calls an AU to converse, it would be advantageous if the ASR service at 1006 had access to a voice model for the specific HU. One way to do this would be to have the ASR service 1006 store voice models for at least HUs that routinely call an AU (e.g., a top ten HU list for each AU) and, when an HU voice signal is received at the ASR service, the service would identify the HU voice signal either using recognition software that can distinguish once voice from others or via some type of an identifier like the phone number of the HU device used to call the AU. Once the HU voice is identified, the ASR service accesses an HU voice model associated with the HU voice and uses that model to perform automated captioning.

One problem with systems that require an ASR service to store HU voice models is that HUs may prefer to not have their voice models stored by third party ASR service providers or at least to not have the models stored and associated with specific HUs. Another problem may be that regulatory agencies may not allow a third party ASR service provider to maintain HU voice models or at least models that are associated with specific HUs. Once solution is that no information useable to associate an HU with a voice model may be stored by an ASR service provider. Here, instead of using an HU identifier like a phone number or other network address associated with an HU's device to identify an HU, an ASR server may be programmed to identify an HU's voice signal from analysis of the voice signal itself in an anonymous way. It is contemplated that voice models may be developed for every HU that calls an AU and may be stored in the cloud by the ASR service provider. Even in cases where there are thousands of stored voice models, an HU's specific model should be quickly identifiable by a processor or server.

Another solution may be for an AU device to store HU voice models for frequent callers where each model is associated with an HU identifier like a phone number or network address associated with a specific HU device. Here, when a call is received at an AU device, the AU device processor may use the number or address associated with the HU device to identify which voice model to associate with the HU device. Then, the AU device may forward the HU voice model to the ASR service provider 1006 to be used temporarily during the call to generate ASR text. Similarly, instead of forwarding an HU voice model to the ASR service provider, the AU device may simply forward an intermediate identification number or other identifier associated with the HU device to the ASR provider and the provider may associate the number with a specific HU voice model stored by the provider to access an appropriate HU voice model to use for text transcription. Here, for instance, where an AU supports ten different HU voice models for 10 most recent HU callers, the models may be associated with number 1 through 10 and the AU may simply forward on one of the intermediate identifiers (e.g., "7") to the ASR provider 1006 to indicate which one of ten voice models maintained by the ASR provider for the AU to use with the HU voice transmitted.

In other cases an ASR may develop and store voice models for each HU that calls a specific AU in a fashion that correlates those models with the AU's identity. Then when the ASR provider receives a call from and AU caption device, the ASR provider may identify the AU and associated HU voice models and use those models to identify the HU on the call and the model associated therewith.

In still other cases an HU device may maintain one or more HU voice models that can be forwarded on to an ASR provider either through the relay or directly to generate text.

Visible and Invisible Voice to Text Errors

In at least some cases other more complex quality analysis and statistics are contemplated that may be useful in determining better ways to train CAs as well as in assessing CA quality values. For instance, it has been recognized that voice to text errors can generally be split into two different categories referred to herein as "visible" and "invisible" errors. Visible errors are errors that result in text that, upon reading, is clearly erroneous while invisible errors are errors that result in text that, despite the error that occurred, makes sense in context. For instance, where an HU voices the phrase "We are meeting at Joe's restaurant at 9 PM", in a text transcription "We are meeting at Joe's rodent for pizza at 9 PM", the word "rodent" is a "visible" error in the sense that an AU reading the phrase would quickly understand that the word "rodent" makes no sense in context. On the other hand, if the HU's phrase were transcribed as "We are meeting at Joe's room for pizza at 9 PM", the erroneous word "room" is not contextually wrong and therefore cannot be easily discerned as an error. Where the word "restaurant" is erroneously transcribed as "room", an AU could easily get a wrong impression and for that reason invisible errors are generally considered worse than visible errors.

In at least some cases it is contemplate that some mechanism for distinguishing visible and invisible text transcription errors may be included in a relay quality testing system. For instance, where 10 errors are made during some subperiod of an HU-AU call, three of the errors may be identified as invisible while 7 are visible. Here, because invisible errors typically have a worse effect on communication effectiveness, statistics that capture relative numbers of invisible to all errors should be useful in assessing CA or ASR quality.

In at least some systems it is contemplated that a relay server may be programmed to automatically identify at least visible errors so that statistics related thereto can be captured. For instance, the server may be able to contextually examine text and identify words of phrases that simply make no sense and may identify each of those nonsensical errors as a visible error. Here, because invisible errors make contextual sense, there is no easy algorithm by which a processor or server can identify invisible errors. For this reason in at least some cases a correcting CA (see 1053 in FIG. 31) may be required to identify invisible errors or, in the alternative, the system may be programmed to automatically use CA corrections to identify invisible errors. In this regard, any time a CA changes a word in a text phrase that initially made sense within the phrase to another word that contextually makes sense in the phrase, the system may recognize that type of correction to have been associated with an invisible error.

In at least some cases it is contemplated that the decision to switch captioning methods may be tied at least in part to the types of errors identified during a call. For instance, assume that a CA is currently generating text corresponding to an HU voice signal and that an ASR is currently training to the HU voice signal but is not currently at a high enough quality threshold to cut out the CA transcription process. Here, there may be one threshold for the CA quality value generally and another for the CA invisible error rate where, if either of the two thresholds are met, the system automatically cuts the CA out. For example, the threshold CA quality value may require 95% accuracy and the CA invisible error rate may be 20% coupled with a 90% overall accuracy requirement. Thus, here, if the invisible error rate amounts to 20% or less of all errors and the overall CA text accuracy is above 90% (e.g., the invisible error rate is less than 2% of all words uttered by the HU), the CA may be cut out of the call and ASR text relied upon for captioning. Other error types are contemplated and a system for distinguishing each of several errors types from one another for statistical reporting and for driving the captioning triage process are contemplated.

In at least some cases when to transition from CA generated text to ASR generated text may be a function of not just a straight up comparison of ASR and CA quality values and instead may be related to both quality and relative latency associated with different transcription methods. In addition, when to transition in some cases may be related to a combination of quality values, error types and relative latency as well as to user preferences.

Other triage processes for identifying which HU voice to text method should be used are contemplated. For instance, in at least some embodiments when an ASR service or ASR software at a relay is being used to generate and transmit text to an AU device for display, if an ASR quality value drops below some threshold level, a CA may be patched in to the call in an attempt to increase quality of the transcribed text. Here, the CA may either be a full revoicing and correcting CA, just a correcting CA that starts with the ASR generated text and makes corrections or a first CA that revoices and a second CA that makes corrections. In a case where a correcting CA is brought into a call, in at least some cases the ASR generated text may be provided to the AU device for display at the same time that the ASR generated text is sent to the CA for correction. In that case, corrected text may be transmitted to the AU device for in line correction once generated by the CA. In addition, the system may track quality of the CA corrected text and store a CA quality value in a system database.

In other cases when a CA is brought into a call, text may not be transmitted to the AU device until the CA has corrected that text and then the corrected text may be transmitted.

In some cases, when a CA is linked to a call because the ASR generated text was not of a sufficiently high quality, the CA may simply start correcting text related to HU voice signal received after the CA is linked to the call. In other cases the CA may be presented with text associated with HU voice signal that was transcribed prior to the CA being linked to the call for the CA to make corrections to that text and then the CA may continue to make corrections to the text as subsequent HU voice signal is received.

Thus, as described above, in at least some embodiments an HU's communication device will include a display screen and a processor that drives the display screen to present a quality indication of the captions being presented to an AU. Here, the quality characteristic may include some accuracy percentage, the actual text being presented to the AU, or some other suitable indication of caption accuracy or an accuracy estimation. In addition, the HU device may present one or more options for upgrading the captioning quality such as, for instance, requesting CA correction of automated text captioning, requesting CA transcription and correction, etc.

Time Stamping Voice and Text

In at least some embodiments described above various HU voice delay concepts have been described where an HU's voice signal broadcast is delayed in order to bring the voice signal broadcast more temporally in line with associated captioned text. Thus, for instance, in a system that requires at least three seconds (and at times more time) to transcribe an HU's voice signal to text for presentation, a system processor may be programmed to introduce a three second delay in HU voice broadcast to an AU to bring the HU voice signal broadcast more into simultaneous alignment with associated text generated by the system. As another instance in a system where an ASR requires at least two seconds to transcribe an HU's voice signal to text for presentation to a correcting CA, the system processor may be programmed to introduce a two second delay in the HU voice that is broadcast to an AU to bring the HU voice signal broadcast for into temporal alignment with the ASR generated text.

In the above examples, the three and two second delays are simply based on the average minimum voice-to-text delays that occur with a specific voice to text system and therefore, at most times, will only imprecisely align an HU voice signal with corresponding text. For instance, in a case where HU voice broadcast is delayed three seconds, if text transcription is delayed ten seconds, the three second delay would be insufficient to align the broadcast voice signal and text presentation. As another instance, where the HU voice is delayed three seconds, if a text transcription is generated in one second, the three second delay would cause the HU voice to be broadcast two seconds after presentation of the associated text. In other words, in this example, the three second HU voice delay would be too much delay at times and too little at other times and misalignment could cause AU confusion.

In at least some embodiments it is contemplated that a transcription system may assign time stamps to various utterances in an HU's voice signal and those time stamps may also be assigned to text that is then generated from the utterances so that the HU voice and text can be precisely synchronized per user preferences (e.g., precisely aligned in time or, if preferred by an AU, with an HU's voice preceding or delayed with respect to text by the same persistent period) when broadcast and presented to the AU, respectively. While alignment per an AU's preferences may cause an HU voice to be broadcast prior to or after presentation of associated text, hereinafter, unless indicated otherwise, it will be assumed that an AU's preference is that the HU voice and related text be broadcast and presented simultaneously at substantially the same time (e.g., within 1-2 seconds before or after). It should be recognized that in any embodiment described hereafter where the description refers to aligned or simultaneous voice and text, the same teachings will be applicable to cases where voice and text are purposefully misaligned by a persistent period (e.g., always misaligned by 3 seconds per user preference).

Various systems are contemplated for assigning time stamps to HU voice signals and associated text words and/or phrases. In a first relatively simple case, an AU device that receives an HU voice signal may assign periodic time stamps to sequentially received voice signal segments and store the HU voice signal segments along with associated time stamps. The AU device may also transmit at least an initial time stamp (e.g. corresponding to the beginning of the HU voice signal or the beginning of a first HU voice signal segment during a call) along with the HU voice signal to a relay when captioning is to commence.

In at least some embodiments the relay stores the initial time stamp in association with the beginning instant of the received HU voice signal and continues to store the HU voice signal as it is received. In addition, the relay operates its own timer to generate time stamps for on-going segments of the HU voice signal as the voice signal is received and the relay generated time stamps are stored along with associated HU voice signal segments (e.g., one time stamp for each segment that corresponds to the beginning of the segment). In a case where a relay operates an ASR engine or taps into a fourth party ASR service (e.g., Google Voice, IBM's Watson, etc.) where a CA checks and corrects ASR generated text, the ASR engine generates automated text for HU voice segments in real time as the HU voice signal is received.

A CA computer at the relay simultaneously broadcasts the HU voice segments and presents the ASR generated text to a CA at the relay for correction. Here, the ASR engine speed will fluctuate somewhat based on several factors that are known in the speech recognition art so that it can be assumed that the ASR engine will translate a typical HU voice signal segment to text within anywhere between a fraction of a second (e.g., one tenth of a second) to 10 seconds. Thus, where the CA computer is configured to simultaneously broadcast HU voice and present ASR generated text for CA consideration, in at least some embodiments the relay is programmed to delay the HU voice signal broadcast dynamically for a period within the range of a fraction of a second up to the maximum number of seconds required for the ASR engine to transcribe a voice segment to text. Again, here, a CA may have control over the timing between text presentation and HU voice broadcast and may prefer one or the other of the text and voice to precede the other (e.g., HU voice to proceed corresponding text by two seconds or vice versa). In these cases, the preferred delay between voice and text can be persistent and unchanging which results in less CA confusion. Thus, for instance, regardless of delay between an HU's initial utterance and ASR text generation, both the utterance and the associated ASR text can be persistently presented simultaneously in at least some embodiments.

After a CA corrects text errors in the ASR engine generated text, in at least some cases the relay transmits the time stamped text back to the AU caption device for display to the AU. Upon receiving the time stamped text from the relay, the AU device accesses the time stamped HU voice signal stored thereat and associates the text and HU voice signal segments based on similar (e.g., closest in time) or identical time stamps and stores the associated text and HU voice signal until presented and broadcasted to the AU. The AU device then simultaneously (or delayed per user preference)

broadcasts the HU voice signal segments and presents the corresponding text to the AU via the AU caption device in at least some embodiments.

Figure 32:
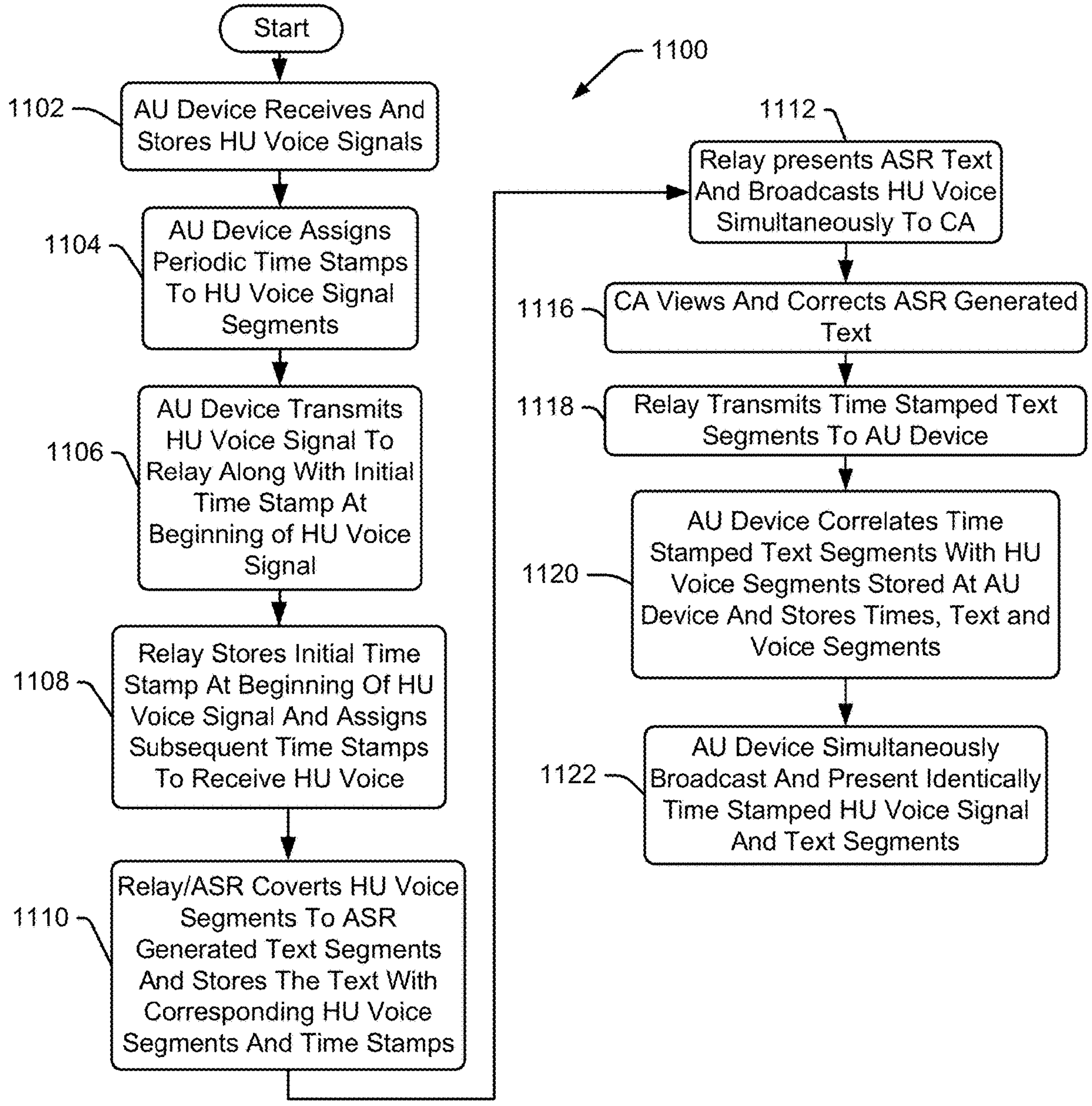
FIG. 32 is a flow chart illustrating a method whereby time stamps are assigned to HU voice segments which are then used to substantially synchronize text and voice presentation.
Figure 33:
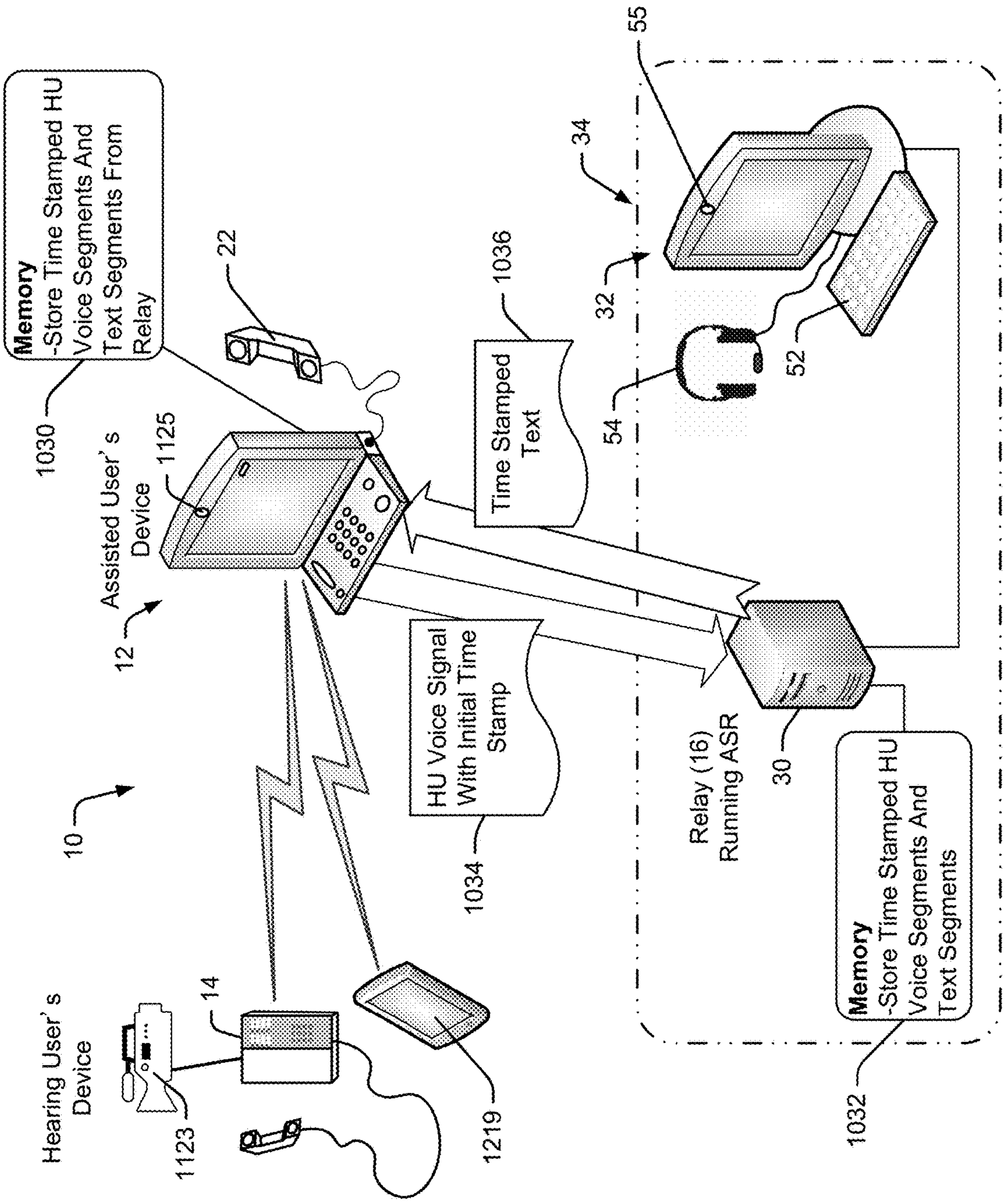
FIG. 33 is a schematic illustrating a caption relay system that may implement the method illustrated in FIG. 32 as well as other methods described herein.

A flow chart that is consistent with this simple first case of time stamping text segments is shown in FIG. 32 and will be described next. Referring also to FIG. 33, a system similar to the system described above with respect to FIG. 1 is illustrated where similar elements are labelled with the same numbers used in FIG. 1 and, unless indicated otherwise, operates in a similar fashion. The primary differences between the FIG. 1 system and the system described in FIG. 33 is that each of the AU caption device 12 and the relay 16 includes a memory device that stores, among other things, time stamped voice message segments corresponding to a received HU voice signal and that time stamps are transmitted between AU device 12 and relay server 30 (see 1034 and 1036).

Referring to FIGS. 32 and 33, during a call between an HU using an HU device 14 and an AU using AU device 12, at some point, captioning is required by the AU (e.g., either immediately when the call commences or upon selection of a caption option by the AU) at which point AU device 12 performs several functions. First, after captioning is to commence, at block 1102, the HU voice signal is received by the AU device 12. At block 1104, AU device 12 commences assignment and continues to assign periodic time stamps to the HU voice signal segments received at the AU device. The time stamps include an initial time stamp t0 corresponding to the instant in time when captioning is to commence or some specific instant in time thereafter as well as following time stamps. In addition, at block 1104, AU device 12 commences storing the received HU voice signal along with the assigned time stamps that divide up the HU voice signal into segments in AU device memory 1030.

Referring still to FIGS. 32 and 33, at block 1106, AU device 12 transmits the HU voice signal segments to relay 16 along with the initial time stamp t0 corresponding to the instant captioning was initiated where the initial time stamp is associated with the start of the first HU voice segment transmitted to the relay (see 1034 in FIG. 33). At block 1108, relay 16 stores the initial time stamp t0 along with the first HU voice signal segment in memory 1032, runs its own timer to assign subsequent time stamps to the HU voice signal received and stores the HU voice signal segments and relay generated time stamps in memory 1032. Here, because both the AU device and the relay assign the initial time stamp t0 to the same point within the HU voice signal and each assigns other stamps based on the initial time stamp, all of the AU device and relay time stamps should be aligned assuming that each assigns time stamps at the same periodic intervals (e.g., every second).

In other cases, each of the AU device and relay may assign second and subsequent time stamps having the form (t0+Δt) where Δt is a period of time relative to the initial time stamp to. Thus, for instance, a second time stamp may be (t0+1 sec), a third time stamp may be (t0+4 sec), etc. In this case, the AU device and relay may assign time stamps that have a different periods where the system simply aligns stamped text and voice when required based on closest stamps in time.

Continuing, at block 1110, relay 16 runs an ASR engine to generate ASR engine text for each of the stored HU voice signal segments and stores the ASR engine text with the corresponding time stamped HU voice signal segments. At block 1112, relay 16 presents the ASR engine text to a CA for consideration and correction. Here, the ASR engine text is presented via a CA computer display screen 32 while the HU voice segments are simultaneously (e.g., as text is scrolled onto display 32) broadcast to the CA via headset 54. The CA uses display 32 and/or other interface devices to make corrections (see block 1116) to the ASR engine text. Corrections to the text are stored in memory 1032 and the resulting text is transmitted at block 1118 to AU device 12 along with a separate time stamp for each of the text segments (see 1036 in FIG. 33).

Referring yet again to FIGS. 32 and 33, upon receiving the time stamped text, AU device 12 correlates the time stamped text with the HU voice signal segments and associated time stamps in memory 1130 and stores the text with the associated voice segments and related time stamps at block 1120. At block 1122, in some embodiments, AU device 12 simultaneously broadcasts and presents the correlated HU voice signal segments and text segments to the AU via an AU device speaker and the AU device display screen, respectively.

Referring still to FIG. 32, it should be appreciated that the time stamps applied to HU voice signal segments and corresponding text segments enable the system to align voice and text when presented to each of a CA and an AU. In other embodiments it is contemplated that the system may only use time stamps to align voice and text for one or the other of a CA and an AU. Thus, for instance, in FIG. 32, the simultaneous broadcast step at 1112 may be replaced by voice broadcast and text presentation immediately when available and synchronous presentation and broadcast may only be available to the AU at step 1122. In a different system synchronous voice and text may be provided to the CA at step 1112 while HU voice signal and caption text are independently presented to the AU immediately upon reception at steps 1102 and 1122, respectively.

In the FIG. 32 process, the AU only transmits an initial HU voice signal time stamp to the relay corresponding to the instant when captioning commences. In other cases it is contemplated that AU device 12 may transmit more than one time stamp corresponding to specific points in time to relay 16 that can be used to correct any voice and text segment misalignment that may occur during system processes. Thus, for instance, instead of sending just the initial time stamp, AU device 12 may transmit time stamps along with specific HU voice segments every 5 seconds or every 10 seconds or every 30 seconds, etc., while a call persists, and the relay may simply store each newly received time stamp along with an instant in the stream of HU voice signal received.

In still other cases AU device 12 may transmit enough AU device generated time stamps to relay 16 that the relay does not have to run its own timer to independently generate time stamps for voice and text segments. Here, AU device 12 would still store the time stamped HU voice signal segments as they are received and stamped and would correlate time stamped text received back from the relay 16 in the same fashion so that HU voice segments and associated text can be simultaneously presented to the AU.

Figure 34:
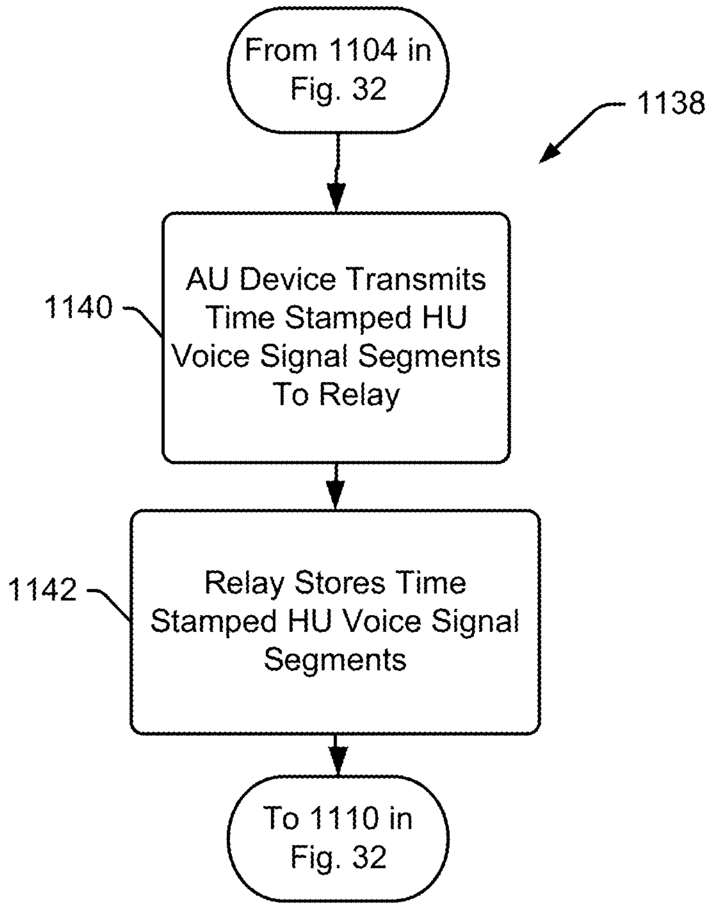
FIG. 34 is a sub process that may be substituted for a portion of the FIG. 32 process where an Au device assigns a sequence of time stamps to a sequence of text segments.

A sub-process 1138 that may be substituted for a portion of the process described above with respect to FIG. 32 is shown in FIG. 34, albeit where all AU device time stamps are transmitted to and used by a relay so that the relay does not have to independently generate time stamps for HU voice and text segments. In the modified process, referring also and again to FIG. 32, after AU device 12 assigns periodic time stamps to HU voice signal segments at block 1104, control passes to block 1140 in FIG. 34 where AU device 12 transmits the time stamped HU voice signal segments to relay 16. At block 1142, relay 16 stores the time stamped HU voice signal segments after which control passes back to block 1110 in FIG. 32 where the relay employs an ASR engine to convert the HU voice signal segments to text segments that are stored with the corresponding voice segments and time stamps. The process described above with respect to FIG. 32 continues as described above so that the CA and/or the AU are presented with simultaneous HU voice and text segments.

In other cases it is contemplated that an AU device 12 may not assign any time stamps to the HU voice signal and, instead, the relay or a fourth party ASR service provider may assign all time stamps to voice and text signals to generate the correlated voice and text segments. In this case, after text segments have been generated for each HU voice segment, the relay may transmit both the HU voice signal and the corresponding text back to AU device 12 for presentation.

A process 1146 that is similar to the FIG. 32 process described above is shown in FIG. 35, albeit where the relay generates and assigns all time stamps to the HU voice signals and transmits the correlated time stamps, voice signals and text to the AU device for simultaneous presentation. In the modified process 1146, process steps 1150 through 1154 in FIG. 35 replace process steps 1102 through 1108 in FIG. 32 and process steps 1158 through 1162 in FIG. 35 replace process steps 1118 through 1122 in FIG. 32 while similarly numbered steps 1110 through 1116 are substantially identical between the two processes.

Figure 35:
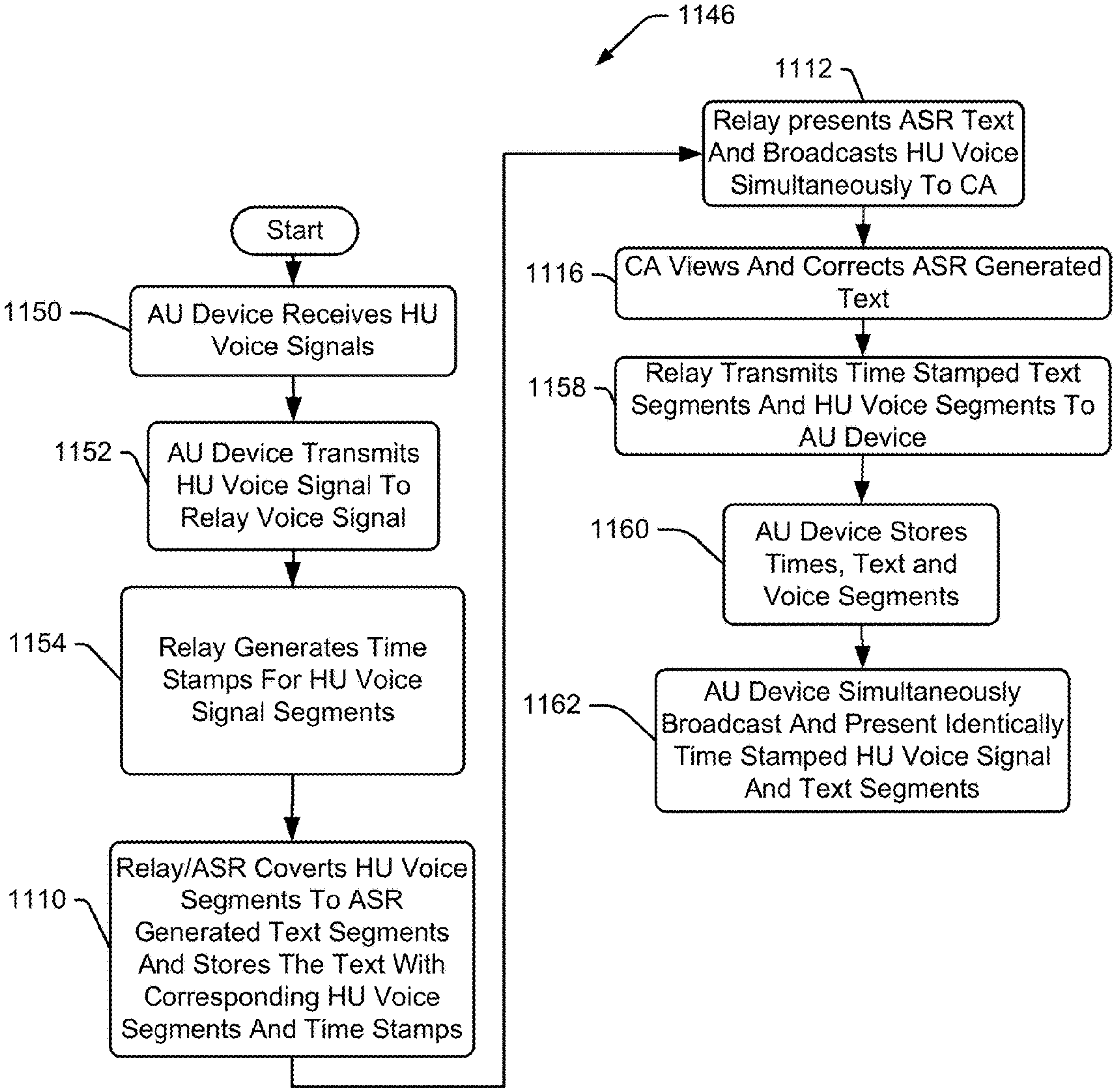
FIG. 35 is another flow chart illustrating another method for assigning and using time stamps to synchronize text and HU voice broadcast.

Process 1146 starts at block 1150 in FIG. 35 where AU device 12 receives an HU voice signal from an HU device where the HU voice signal is to be captioned. Without assigning any time stamps to the HU voice signal, AU device 12 links to a relay 16 and transmits the HU voice signal to relay 16 at block 1152. At block 1154, relay 16 uses a timer or clock to generate time stamps for HU voice signal segments after which control passes to block 1110 where relay 16 uses an ASR engine to convert the HU voice signal to text which is stored along with the corresponding HU voice signal segments and related time stamps. At block 1112, relay 16 simultaneously presents ASR text and broadcasts HU voice segments to a CA for correction and the CA views the text and makes corrections at block 1116. After block 1116, relay 16 transmits the time stamped text and HU voice segments to AU device 12 and that information is stored by the AU device as indicated at block 1160. At block 1162, AU device 12 simultaneously broadcasts and presents corresponding HU voice and text segments via the AU device display.

In cases where HU voice signal broadcast is delayed so that the broadcast is aligned with presentation of corresponding transcribed text, delay insertion points will be important in at least some cases or at some times. For instance, an HU may speak for 20 consecutive seconds where the system assigns a time stamp every 2 seconds. In this case, one solution for aligning voice with text would be to wait until the entire 20 second spoken message is transcribed and then broadcast the entire 20 second voice message and present the transcribed text simultaneously. This, however, is a poor solution as it would slow down HU-AU communication appreciably.

Another solution would be to divide up the 20 second voice message into 5 second periods with silent delays therebetween so that the transcription process can routinely catch up. For instance, here, during a first five second period plus a short transcription catch up period (e.g., 2 seconds), the first five seconds of the 20 second HU voice massage is transcribed. At the end of the first 7 seconds of HU voice signal, the first five seconds of HU voice signal is broadcast and the corresponding text presented to the AU while the next 5 seconds of HU voice signal is transcribed. Transcription of the second 5 seconds of HU voice signal may take another 7 seconds which would meant that a 2 second delay or silent period would be inserted after the first five seconds of HU voice signal is broadcast to the AU. In other cases the ASR text and HU voice would be sent ASAP when generated or received to deliver to the AU. In this case the 7 seconds described would be to complete the segment as opposed to for getting the first words to the AU for broadcast.

This process of inserting periodic delays into HU voice broadcast and text presentation while transcription catches up continues. Here, while it is possible that the delays at the five second times would be at ideal times between consecutive natural phrases, more often than not, the 5 second point delays would imperfectly divide natural language phrases making it more, not less difficult, to understand the overall HU voice message.

A better solution is to insert delays between natural language phrases when possible. For instance, in the case of the 20 second HU voice signal example above, a first delay may be inserted after a first 3 second natural language phrase, a second delay may be inserted after a second 4 second natural language phrase, a third delay may be inserted after a third 5 second natural language phrase, a fourth delay may be inserted after a fourth 2 second natural language phrase and a fifth delay may be inserted after a fifth 2 second natural language phrase, so that none of the natural language phrases during the voice message are broken up by intervening delays.

Software for identifying natural language phrases or natural breaks in an HU's voice signal may use actual delays between consecutive spoken phrases as one proxy for where to insert a transcription catch up delay. In some cases software may be able to perform word, sentence and/or topic segmentation in order to identify natural language phrases. Other software techniques for dividing voice signals into natural language phrases are contemplated and should be used as appropriate.

Thus, while some systems may assign perfectly periodic time stamps to HU voice signals to divide the signals into segments, in other cases time stamps will be assigned at irregular time intervals that make more sense given the phrases that an HU speaks, how an HU speaks, etc.

Figure 36:
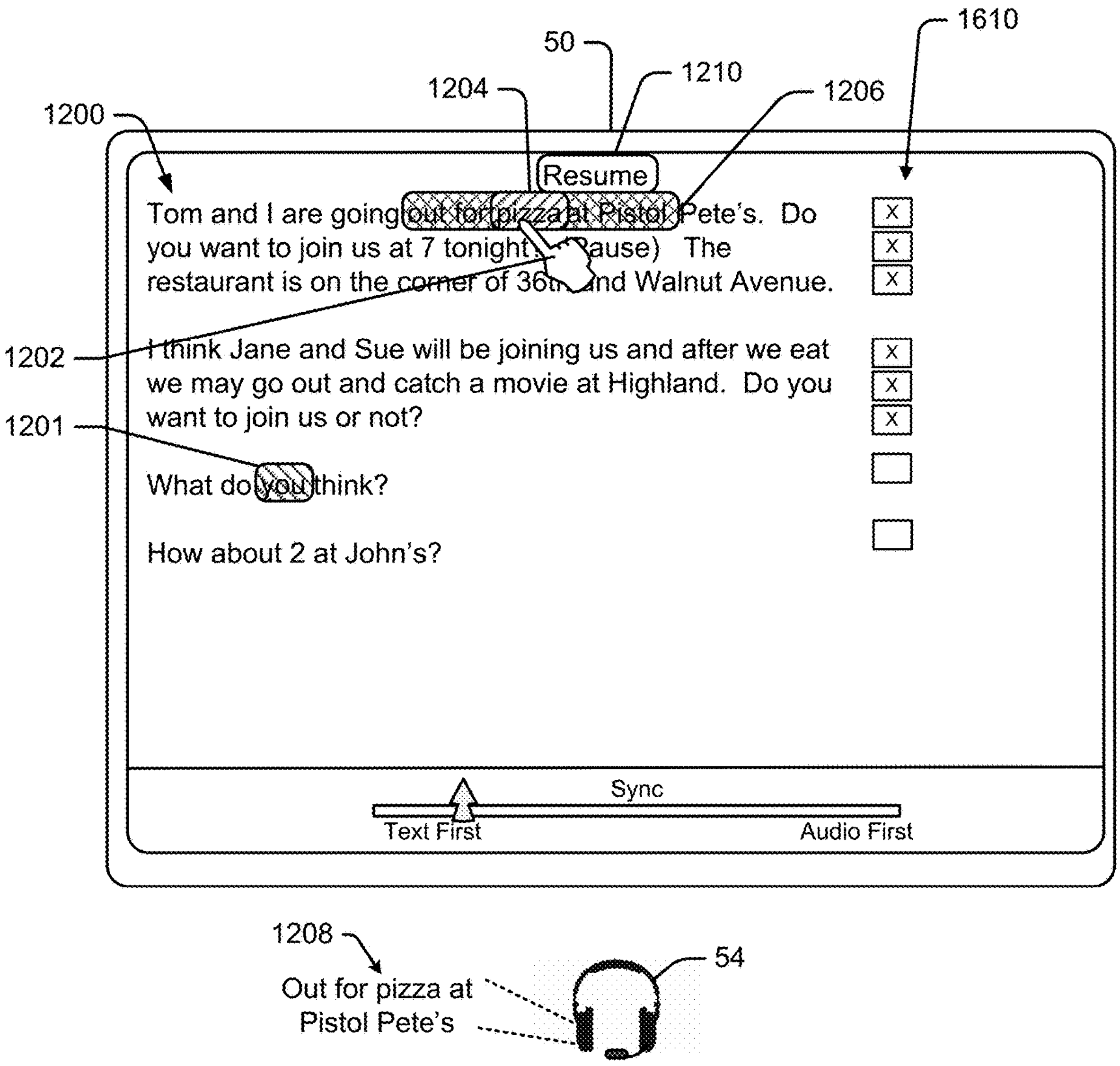
FIG. 36 is a screen shot illustrating a CA interface where a prior word is selected to be rebroadcast.

Voice Message Replay

Where time stamps are assigned to HU voice and text segments, voice segments can be more accurately selected for replay via selection of associated text. For instance, see FIG. 36 that shows a CA display screen 50 with transcribed text represented at 1200. Here, as text is generated by a relay ASR engine and presented to a CA, consistent with at least some of the systems described above, the CA may select a word or phrase in presented text via touch (represented by hand icon 1202) to replay the HU voice signal associated therewith.

When a word is selected in the presented text several things will happen in at least some contemplated embodiments. First, a current voice broadcast to the CA is halted. Second, the selected word is highlighted (see 1204) or otherwise visually distinguished. Third, when the word is highlighted, the CA computer accesses the HU voice segment associated with the highlighted word and re-broadcasts the voice segment for the CA to re-listen to the selected word. Where time stamps are assigned with short intervening periods, the time stamps should enable relatively precise replay of selected words from the text. In at least some cases, the highlight will remain and the CA may change the highlighted word or phrase via standard text editing tools. For instance, the CA may type replacement text to replace the highlighted word with corrected text. As another instance, the CA may re-voice the broadcast word or phrase so that software trained to the CA's voice can generate replacement text. Here, the software may use the newly uttered word as well as the words that surround the uttered word in a contextual fashion to identify the replacement word.

In some cases a "Resume" or other icon 1210 may be presented proximate the selected word that can be selected via touch to continue the HU voice broadcast and text presentation at the location where the system left off when the CA selected the word for re-broadcast. In other cases, a short time (e.g., ¼th second to 3 seconds) after rebroadcasting a selected word or phrase, the system may automatically revert back to the voice and text broadcast at the location where the system left off when the CA selected the word for re-broadcast.

While not shown, in some cases when a text word is selected, the system will also identify other possible words that may correspond to the voice segment associated with the selected word (e.g., second and third best options for transcription of the HU voice segment associated with the selected word) and those options may be automatically presented for touch selection and replacement via a list of touch selectable icons, one for each option, similar to Resume icon 1210. Here, the options may be presented in a list where the first list entry is the most likely substitute text option, the second entry is the second most likely substitute text option, and so on.

Referring again to FIG. 36, in other cases when a text word is selected on a CA display screen 50, a relay server or the CA's computer may select an HU voice segment that includes the selected word and also other words in an HU voice segment or phrase that includes the selected word for re-broadcast to the CA so that the CA has some audible context in which to consider the selected word. Here, when the phrase length segment is re-broadcast, the full text phrase associated therewith may be highlighted as shown at 1206 in FIG. 36. In some cases, the selected word may be highlighted or otherwise visually distinguished in one way and the phrase length segment that includes the selected word may be highlighted or otherwise visually distinguished in a second way that is discernably different to the CA so that the CA is not confused as to what was selected (e.g., see different highlighting at 1204 and 1206 in FIG. 36).

In some cases a single touch on a word may cause the CA computer to re-broadcast the single selected word while highlighting the selected word and the associated longer phrase that includes the selected word differently while a double tap on a word may cause the phrase that includes the selected word to be re-broadcast to provide audio context. Where the system divides up an HU voice signal by natural phrases, broadcasting a full phrase that includes a selected word should be particularly useful as the natural language phrase should be associated with a more meaningful context than an arbitrary group of words surrounding the selected word.

Even if the system rebroadcasts a full phrase including a selected word, in at least some cases CA edits will be made only to the selected word as opposed to the full phrase. Thus, for instance, in FIG. 36 where a single word is selected but a phrase including the word is rebroadcast, any CA edit (e.g., text entry or text generated by software in response to a revoiced word or phrase) would only replace the selected word, not the entire phrase.

Upon selection of Resume icon 1210, the highlighting is removed from the selected word and the CA computer restarts simultaneously broadcasting the HU voice signal and presenting associated transcribed text at the point where the computer left off when the re-broadcast word was selected. In some cases, the CA computer may back up a few seconds from the point where the computer left off to restart the broadcast to re-contextualize the voice and text presented to the CA as the CA again begins correcting text errors.

In other cases, instead of requiring a user to select a "Resume" option, the system may, after a short period (e.g., one second after the selected word or associated phrase is re-broadcast), simply revert back to broadcasting the HU voice signal and presenting associated transcribed text at the point where the computer left off when the re-broadcast word was selected. Here, a beep or other audibly distinguishable signal may be generated upon word selection and at the end of a re-broadcast to audibly distinguish the re-broadcast from broadcast HU voice. In other cases any re-broadcast voice signal may be audibly modified in some fashion (e.g., higher pitch or tone, greater volume, etc.) to audibly distinguish the re-broadcast from other HU voice signal broadcast.

To enable a CA to select a phrase that includes more than one word for rebroadcast or for correction, in at least some cases it is contemplated that when a user touches a word presented on the CA display device, that word will immediately be fully highlighted. Then, while still touching the initially selected and highlighted word, the CA can slide her finger left or right to select adjacent words until a complete phrase to be selected is highlighted. Upon removing her finger from the display screen, the highlighted phrase remains highlighted and revoicing or text entry can be used to replace the entire highlighted phrase.

Figure 37:
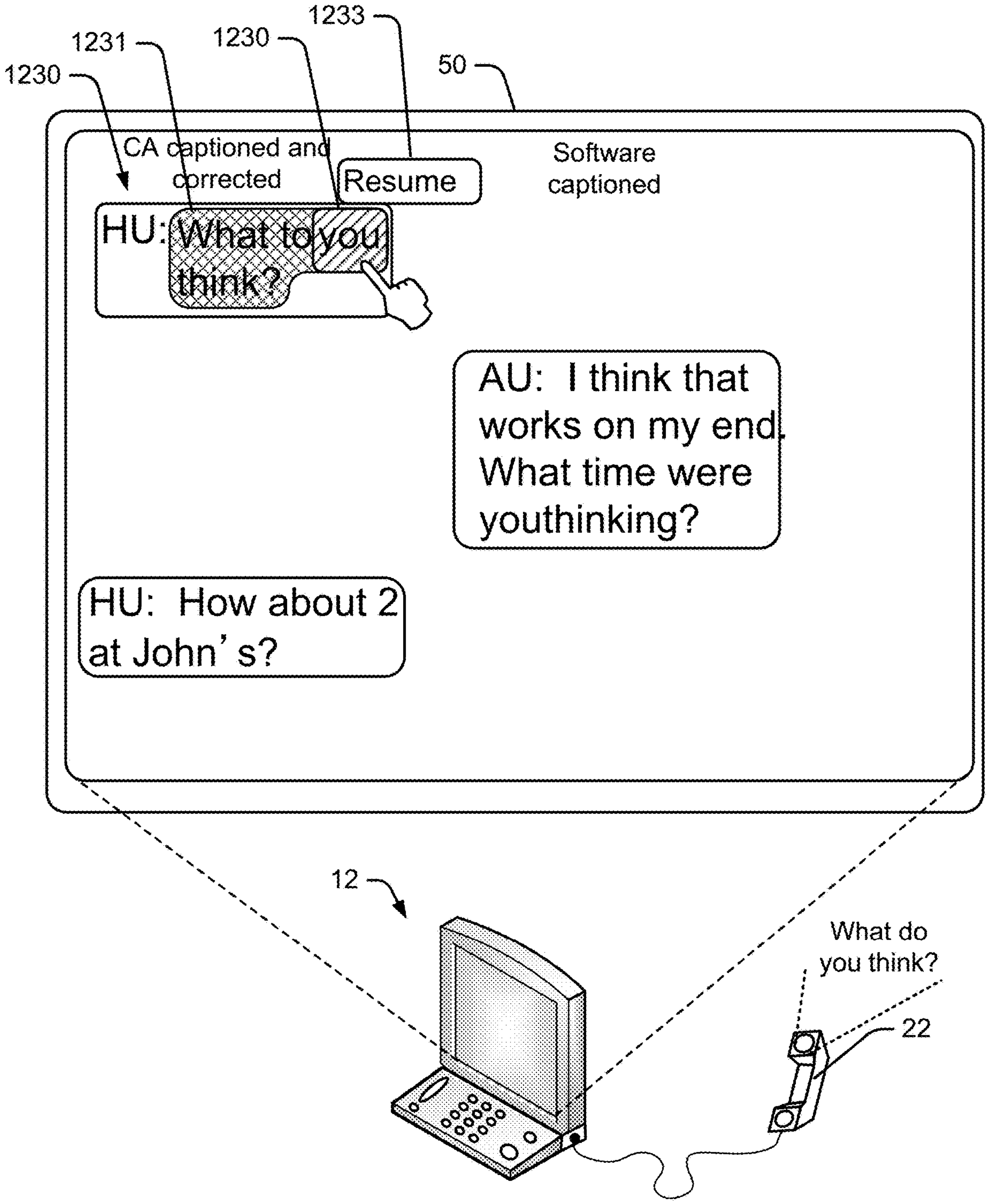
FIG. 37 is a screen shot similar to FIG. 36, albeit of an Au device display showing an AU selecting a prior broadcast phrase for rebroadcast.

Referring now to FIG. 37, a screen shot akin to the screen shot shown in FIG. 26 is illustrated at 50 that may be presented to an AU via an AU device display, albeit where an AU has selected a word from within transcribed text for re-broadcast. In at least some embodiments, similar to the CA system described above, when an AU selects a word from presented text, the instantaneous HU voice broadcast and text presentation is halted, the selected word is highlighted or otherwise visually distinguished as shown at 1230 and the phrase including the selected word may also be differently visually distinguished as shown at 1231. Beeps or other audible signals may be generated immediately prior to and after re-broadcast of a voice signal segment. When a word is selected, the AU device speaker (e.g., the speaker in associated handset 22) re-broadcasts the HU voice signal that is associated through the assigned time stamp to the selected word. In other cases the AU device will re-broadcast the entire phrase or sub-phrase that includes the selected word to give audio context to the selected word.

Referring again to FIG. 37, when an AU selects a word for rebroadcasting, in at least some cases if that word is still on a CA's display screen when the AU selects the word, that word may be specially highlighted on the CA display to alert or indicate to the CA that the AU had trouble understanding the selected word. To this end, see in FIG. 36 that the word selected in FIG. 37 is highlighted on the exemplary CA display screen at 1201. Here, the CA may read the phrase including the word and either determine that the text is accurate or that a transcription error occurred. Where the text is wrong, the CA may correct the text or may simply ignore the error and continue on with transcription of the continuing HU voice signal.

While the time stamping concept is described above with respect to a system where an ASR initially transcribes an HU voice signal to text and a CA corrects the ASR generated text, the time stamping concept is also advantageously applicable to cases where a CA transcribes an HU voice signal to text and then corrects the transcribed text or where a second CA corrects text transcribed by a first CA. To this end, in at least some cases it is contemplated that an ASR may operate in the background of a CA transcription system to generate and time stamp ASR text (e.g., text generated by an ASR engine) in parallel with the CA generated text. A processor may be programmed to compare the ASR text and CA generated text to identify at least some matching words or phrases and to assign the time stamps associated with the matching ASR generated words or phrases to the matching CA generated text.

It is recognized that the CA text will likely be more accurate than the ASR text most of the time and therefore that there will be differences between the two text strings. However, some if not most of the time the ASR and CA generated texts will match so that many of the time stamps associated with the ASR text can be directly applied to the CA generated text to align the HU voice signal segments with the CA generated text. In some cases it is contemplated that confidence factors may be generated for likely associated ASR and CA generated text and time stamps may only be assigned to CA generated text when a confidence factor is greater than some threshold confidence factor value (e.g., 88/100). In most cases it is expected that confidence factors that exceed the threshold value will occur routinely and with short intervening durations so that a suitable number of reliable time stamps can be generated.

Once time stamps are associated with CA generated text, the stamps may be used to precisely align HU voice signal broadcast and text presentation to an AU or a CA (e.g., in the case of a second "correcting CA") as described above as well as to support re-broadcast of HU voice signal segments corresponding to selected text by a CA and/or an AU.

Figure 38:
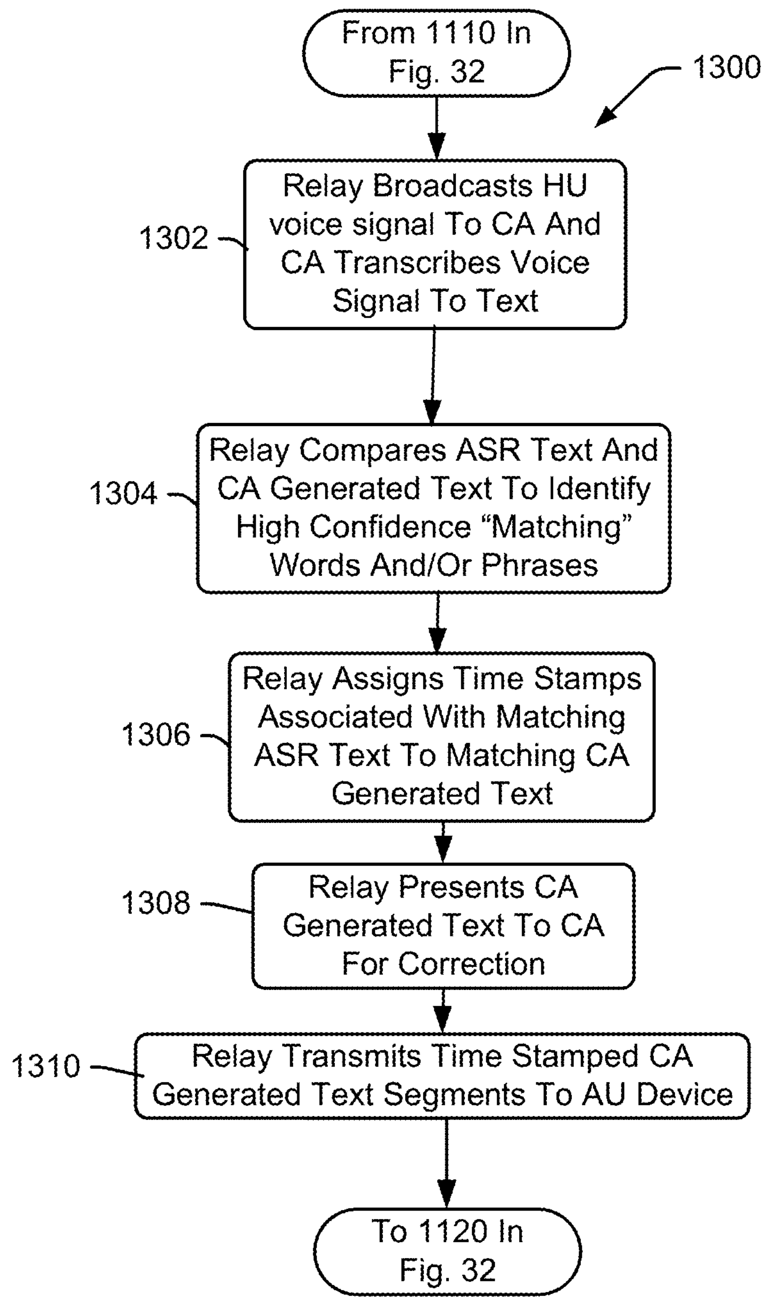
FIG. 38 is another sub process that may be substituted for a portion of the FIG. 32 method.

A sub-process 1300 that may be substituted for a portion of the FIG. 32 process is shown in FIG. 38, albeit where ASR generated time stamps are applied to CA generated text. Referring also to FIG. 32, steps 1302 through 1310 shown in FIG. 38 are swapped into the FIG. 32 process for steps 1112 through 1118. Referring also to FIG. 32, after an ASR engine generates and stores time stamped text segments for a received HU voice signal segment, control passes to block 1302 in FIG. 38 where the relay broadcasts the HU voice signal to a CA and the CA revoices the HU voice signal to transcription software trained to the CA's voice and the software yields CA generated text.

At block 1304, a relay server or processor compares the ASR text to the CA generated text to identify high confidence "matching" words and/or phrases. Here, the phrase high confidence means that there is a high likelihood (e.g., 95% likely) that an ASR text word or phrase and a CA generated text word or phrase both correspond to the exact same HU voice signal segment. Characteristics analyzed by the comparing processor include multiple word identical or nearly identical strings in compared text, temporally when text appears in each text string relative to other assigned time stamps, easily transcribed words where both an ASR and a CA are highly likely to accurately transcribe words, etc. In some cases time stamps associated with the ASR text are only assigned to the CA generated text when the confidence factor related to the comparison is above some threshold level (e.g., 88/100). Time stamps are assigned at block 1306 in FIG. 38.

At block 1308, the relay presents the CA generated text to the CA for correction and at block 1310 the relay transmits the time stamped CA generated text segments to the AU device. After block 1310 control passes back to block 1120 in FIG. 32 where the AU device correlates time stamped CA generated text with HU voice signal segments previously stored in the AU device memory and stores the times, text and associated voice segments. At block 1122, the AU device simultaneously broadcasts and presents identically time stamped HU voice and CA generated text to an AU. Again, in some cases, the AU device may have already broadcast the HU voice signal to the AU prior to block 1122. In this case, upon receiving the text, the text may be immediately presented via the AU device display to the AU for consideration. Here, the time stamped HU voice signal and associated text would only be used by the AU device to support synchronized HU voice and text re-play or representation.

In some cases the time stamps assigned to a series of text and voice segments may simply represent relative time stamps as opposed to actual time stamps. For instance, instead of labelling three consecutive HU voice segments with actual times 3:55:45 AM; 3:55:48 AM; 3:55:51 AM . . . , the three segments may be labelled t0, t1, t2, etc., where the labels are repeated after they reach some maximum number (e.g., t20). In this case, for instance, during a 20 second HU voice signal, the 20 second signal may have five consecutive labels t0, t1, t2, t3 and t4 assigned, one every four seconds, to divide the signal into five consecutive segments. The relative time labels can be assigned to HU voice signal segments and also associated with specific transcribed text segments.

In at least some cases it is contemplated that the rate of time stamp assignment to an HU voice signal may be dynamic. For instance, if an HU is routinely silent for long periods between intermittent statements, time stamps may only be assigned during periods while the HU is speaking. As another instance, if an HU speaks slowly at times and more rapidly at other times, the number of time stamps assigned to the user's voice signal may increase (e.g., when speech is rapid) and decrease (e.g., when speech is relatively slow) with the rate of user speech. Other factors may affect the rate of time stamps applied to an HU voice signal.

While the systems describe above are described as ones where time stamps are assigned to an HU voice signal by either or both of an AU's device and a relay, in other cases it is contemplated that other system devices or processors may assign time stamps to the HU voice signal including a fourth party ASR engine provider (e.g., IBM's Watson, Google Voice, etc.). In still other cases where the HU device is a computer (e.g., a smart phone, a tablet type computing device, a laptop computer), the HU device may assign time stamps to the HU voice signal and transmit to other system devices that need time stamps. All combinations of system devices assigning new or redundant time stamps to HU voice signals are contemplated.

In any case where time stamps are assigned to voice signals and text segments, words, phrases, etc., the engine(s) assigning the time stamps may generate stamps indicating any of (1) when a word or phrase is voiced in an HU voice signal audio stream (e.g., 16:22 to 16:22:5 corresponds to the word "Now") and (2) the time at which text is generated by the ASR for a specific word (e.g., "Now" generated at 16:25). Where a CA generates text or corrects text, a processor related to the relay may also generate time stamps indicating when a CA generated word is generated as well as when a correction is generated.

In at least some embodiments it is contemplated that any time a CA falls behind when transcribing an HU voice signal or when correcting an ASR engine generated text stream, the speed of the HU voice signal broadcast may be automatically increased or sped up as one way to help the CA catch up to a current point in an HU-AU call. For instance, in a simple case, any time a CA caption delay (e.g., the delay between an HU voice utterance and CA generation of text or correction of text associated with the utterance) exceeds some threshold (e.g., 12 seconds), the CA interface may automatically double the rate of HU signal broadcast to the CA until the CA catches up with the call.

In at least some cases the rate of broadcast may be dynamic between a nominal value representing the natural speaking speed of the HU and a maximum rate (e.g., increase the natural HU voice speed three times), and the instantaneous rate may be a function of the degree of captioning delay. Thus, for instance, where the captioning delay is only 4 or less seconds, the broadcast rate may be "1" representing the natural speaking speed of the HU, if the delay is between 4 and 8 seconds the rebroadcast rate may be "2" (e.g., twice the natural speaking speed), and if the delay is greater than 8 seconds, the broadcast rate may be "3" (e.g., three times the natural speaking speed).

In other cases the dynamic rate may be a function of other factors such as but not limited to the rate at which an HU utters words, perceived clarity in the connection between the HU and AU devices or between the AU device and the relay or between any two components within the system, the number of corrections required by a CA during some sub-call period (e.g., the most recent 30 seconds), statistics related to how accurately a CA can generate text or make text corrections at different speaking rates, some type of set AU preference, some type of HU preference, etc.

In some cases the rate of HU voice broadcast may be based on ASR confidence factors. For instance, where an ASR assigns a high confidence factor to a 15 second portion of HU voice signal and a low confidence factor to the next 10 seconds of the HU voice signal, the HU voice broadcast rate may be set to twice the rate of HU speaking speed during the first 15 second period and then be slowed down to the actual HU speaking speed during the next 10 second period or to some other percentage of the actual HU speaking speed (e.g., 75% or 125%, etc.).

In some cases the HU broadcast rate may be at least in part based on characteristics of an HU's utterances. For instance, where an HU's volume on a specific word is substantially increased or decreased, the word (or phrase including the word) may always be presented at the HU speaking speed (e.g., at the rate uttered by the HU). In other cases, where the volume of one word within a phrase is stressed, the entire phrase may be broadcast at speaking speed so that the full effect of the stressed word can be appreciated. As another instance, where an HU draws out pronunciation of a word such as "Well . . . " for 3 seconds, the word (or phrase including the word) may be presented at the spoken rate.

In some cases the HU voice broadcast rate may be at least in part based on words spoken by an HU or on content expressed in an HU's spoken words. For instance, simple words that are typically easy to understand including "Yes", "No", etc., may be broadcast at a higher rate than complex words like some medical diagnosis, multi-syllable terms, etc.

In cases where the system generates text corresponding to both HU and AU voice signals, in at least some embodiments it is contemplated that during normal operation only text associated with the HU signal may be presented to an AU and that the AU text may only be presented to the AU if the AU goes back in the text record to review the text associated with a prior part of a conversation. For instance, if an AU scrolls back in a conversation 3 minutes to review prior discussion, ASR generated AU voice related text may be presented at that time along with the HU text to provide context for the AU viewing the prior conversation.

In the systems described above, whenever a CA is involved in a caption assisted call, the CA considers an entire HU voice signal and either generates a complete CA generated text transcription of that signal or corrects ASR generated text errors while considering the entire HU voice signal. In other embodiments it is contemplated that where an ASR engine generates confidence factors, the system may only present sub-portions of an HU voice signal to a CA that are associated with relatively low confidence factors for consideration to speed up the error correction process. Here, for instance, where ASR engine confidence factors are high (e.g., above some high factor threshold) for a 20 second portion of an HU voice signal and then are low for the next 10 seconds, a CA may only be presented the ASR generated text and the HU voice signal may not be broadcast to the CA during the first 20 seconds while substantially simultaneous HU voice and text are presented to the CA during the following 10 second period so that the CA is able to correct any errors in the low confidence text. In this example, it is contemplated that the CA would still have the opportunity to select an interface option to hear the HU voice signal corresponding to the first 20 second period or some portion of that period if desired.

When a remote third party ASR engine generates and provides captions to a relay but does not provide confidence factors to the relay, in at least some embodiments a local ASR run at a relay may generate a local caption set in parallel and may use the local caption set to assess confidence factors for captions received from the remote ASR engine. Here, a local processor may compare remote ASR captions to the locally generated ASR captions and may assign confidence factors to each remote ASR caption word or phrase based on results of the comparison. For instance, where there is a mismatch, a low confidence factor may be assigned to the remote ASR caption word or phrase. As another instance, a low confidence factor may only be assigned to the remote ASR caption word when the local ASR caption word is grammatically correct. Other algorithms for assessing low confidence are contemplated.

In other cases, the local processor may assess low confidence for a remote ASR word or phrase when the local ASR generates a plurality of viable options (e.g., 2, 3, 4, etc.) for the word or phrase.

In some cases only a portion of HU voice signal corresponding to low confidence ASR engine text may be presented at all times and in other cases, this technique of skipping broadcast of HU voice associated with high confidence text may only be used by the system during threshold catch up periods of operation. For instance, the technique of skipping broadcast of HU voice associated with high confidence text may only kick in when a CA text correction process is delayed from an HU voice signal by 20 or more seconds (e.g., via a threshold period).

In particularly advantages cases, low confidence text and associated voice may be presented to a CA at normal speaking speed and high confidence text and associated voice may be presented to a CA at an expedited speed (e.g., 3 time normal speaking speed) when a text presentation delay (e.g., the period between the time an HU uttered a word and the time when a text representation of the word is presented to the CA) is less than a maximum latency period, and if the delay exceeds the maximum latency period, high confidence text may be presented in block form (e.g., as opposed to rapid sequential presentation of separate words) without broadcasting the HU voice to expedite the catchup process.

In cases where a system processor or sever determines when to automatically switch or when to suggest a switch from a CA captioning system to an ASR engine captioning system, several factors may be considered including the following:

1. Percent match between ASR generated words and CA generated words over some prior captioning period (e.g., last 30 seconds);
2. How accurate ASR confidence factors reflect corrections made by a CA;
3. Words per minute spoken by an HU and how that affects accuracy;
4. Average delay between ASR and CA generated text over some prior captioning period;
5. An expressed AU preference stored in an AU preferences database accessible by a system processor;
6. Current AU preferences as set during an ongoing call via an on screen or other interface tool;
7. Clarity of received signal or some other proxy for line quality of the link between any two processors or servers within the system;
8. Identity of a HU conversing with an AU; and
9. Characteristics of a HU's voice signal.

Other factors are contemplated.

Handling Automatic and Ongoing ASR Text Corrections

In at least some cases a speech recognition engine will sequentially generate a sequence of captions for a single word or phrase uttered by a speaker. For instance, where an HU speaks a word, an ASR engine may generate a first "estimate" of a text representation of the word based simply on the sound of the individual word and nothing more. Shortly thereafter (e.g., within 1 to 6 seconds), the ASR engine may consider words that surround (e.g., come before and after) the uttered word along with a set of possible text representations of the word to identify a final estimate of a text representation of the uttered word based on context derived from the surrounding words. Similarly, in the case of a CA revoicing an HU voice signal to an ASR engine trained to the CA voice to generate text, multiple iterations of text estimates may occur sequentially until a final text representation is generated.

In at least some cases it is contemplated that every best estimate of a text representation of every word to be transcribed will be transmitted immediately upon generation to an AU device for continually updated presentation to the AU so that the AU has the best HU voice signal transcription that exists at any given time. For instance, in a case where an ASR engine generates at least one intermediate text estimate and a final text representation of a word uttered by an HU and where a CA corrects the final text representation, each of the interim text estimate, the final text representation and the CA corrected text may be presented to the AU where updates to the text are made as in line corrections thereto (e.g., by replacing erroneous text with corrected text directly within the text stream presented) or, in the alternative, corrected text may be presented above or in some spatially associated location with respect to erroneous text.

In cases where an ASR engine generates intermediate and final text representations while a CA is also charged with correcting text errors, if the ASR engine is left to continually make context dependent corrections to text representations, there is the possibility that the ASR engine could change CA generated text and thereby undue an intended and necessary CA correction.

To eliminate the possibility of an ASR modifying CA corrected text, in at least some cases it is contemplated that automatic ASR engine contextual corrections for at least CA corrected text may be disabled immediately after a CA correction is made or even once a CA commences correcting a specific word or phrase. In this case, for instance, when a CA initiates a text correction or completes a correction in text presented on her device display screen, the ASR engine may be programmed to assume that the CA corrected text is accurate from that point forward. In some cases, the ASR engine may be programmed to assume that a CA corrected word is a true transcription of the uttered word which can then be used as true context for ascertaining the text to be associated with other ASR engine generated text words surrounding the true or corrected word. In some cases text words prior to and following the CA corrected word may be corrected by the ASR engine based on the CA corrected word that provides new context or independent of that context in other cases. Hereinafter, unless indicated otherwise, when an ASR engine is disabled from modifying a word in a text phrase, the word will be said to be "firm".

In cases where CA activity renders a word or phrase firm so that further ASR corrections are not presented to a CA or an AU, the ASR may still generate error corrections for the firm words or phrases for other purposes. For instance, in at least some cases where an ASR generates a change for a word or phrase after that word or phrase has been made firm by CA action and the ASR change does not match the firm word or phrase, without changing the word or phrase that word or phrase may still be highlighted or otherwise visually distinguished for the CA so that the CA is at least aware that the new ASR hypothesis on the word or phrase does not match the firm word or phrase. Here, the CA may simply ignore the mismatch indicated or elect to reconsider the word or phrase for error correction.

As another instance, where an ASR generates a change for a word or phrase after that word or phrase has been made firm by CA action, a processor programed to assess ASR accuracy may compare the firm text to the ASR text change as part of the accuracy calculation. Thus, taking the firm text to be truth (e.g., accurate), the processor may be programmed to increase ASR accuracy rating when the ASR text change matches the firm text and to decrease that rating when there is a mismatch.

In still other embodiments it is contemplated that after a CA listens to a word or phrase broadcast to the CA or some short duration of time thereafter, the word or phrase may become firm irrespective of whether or not a CA corrects that word or phrase or another word or phrase subsequent thereto. For instance, in some cases once a specific word is broadcast to a CA for consideration, the word may be designated firm. In this case each broadcast word is made firm immediately upon broadcast of the word and therefore after being broadcast, no word is automatically modified by an ASR engine. Here the idea is that once a CA listens to a broadcast word and views a representation of that word as generated by the ASR engine, either the word is correct or if incorrect, the CA is likely about to correct that word and therefore an ASR correction could be confusing and should be avoided.

As another instance, in some cases where a word forms part of a larger phrase, the word and other words in the phrase may not be designated firm until after either (1) a CA corrects the word or a word in the phrase that is subsequent thereto or (2) the entire phrase has been broadcast to the CA for consideration. Here, the idea is that in many cases a CA will have to listen to an entire phrase in order to assess accuracy of specific transcribed words so firming up phrase words prior to complete broadcast of the entire phrase may be premature.

In still other cases, a processor may recognize word phrases within ASR text and firm up an entire phrase just prior to or at the instant the first word in the phrase is broadcast to a CA for consideration. Thus, for instance, where a processor identifies a phrase including 8 words, at the instant in time when the first word is broadcast to the CA for consideration, the entire 8 word phrase may be made firm so that the ASR is not modifying text in the phrase as the CA is considering how to correct the ASR captions. The idea here is that a CA may find it distracting to listen to an HU broadcast while trying to correct ASR text when the ASR text is changing in real time.

In other cases a system processor may firm up all ASR text that is within some number or words or seconds of HU voice signal of a current word being broadcast to a CA for correction. For instance, all ASR text words within 8 words of a current word being broadcast to a CA may be rendered firm so that they do not change on the CA display screen. Here, in some cases when a word is firm for the CA, the word may also be firm for the AU (e.g., the ASR will not firm up the word and only CA error corrections to the word would be sent along to the AU for in line or other correction). In other cases, while a word may be firm for a CA, automatic ASR error corrections may still be sent along to the AU captioned device for in line corrections until the CA makes final error corrections at which point the captions presented to the AU prior to a CA final correction would be made firm.

As yet one other instance, in some cases automatic firm designations may be assigned to each word in an HU voice signal a few seconds (e.g., 3 seconds) after the word is broadcast, a few words (e.g., 5 words) after the word is broadcast, or in some other time related fashion.

Figure 43:
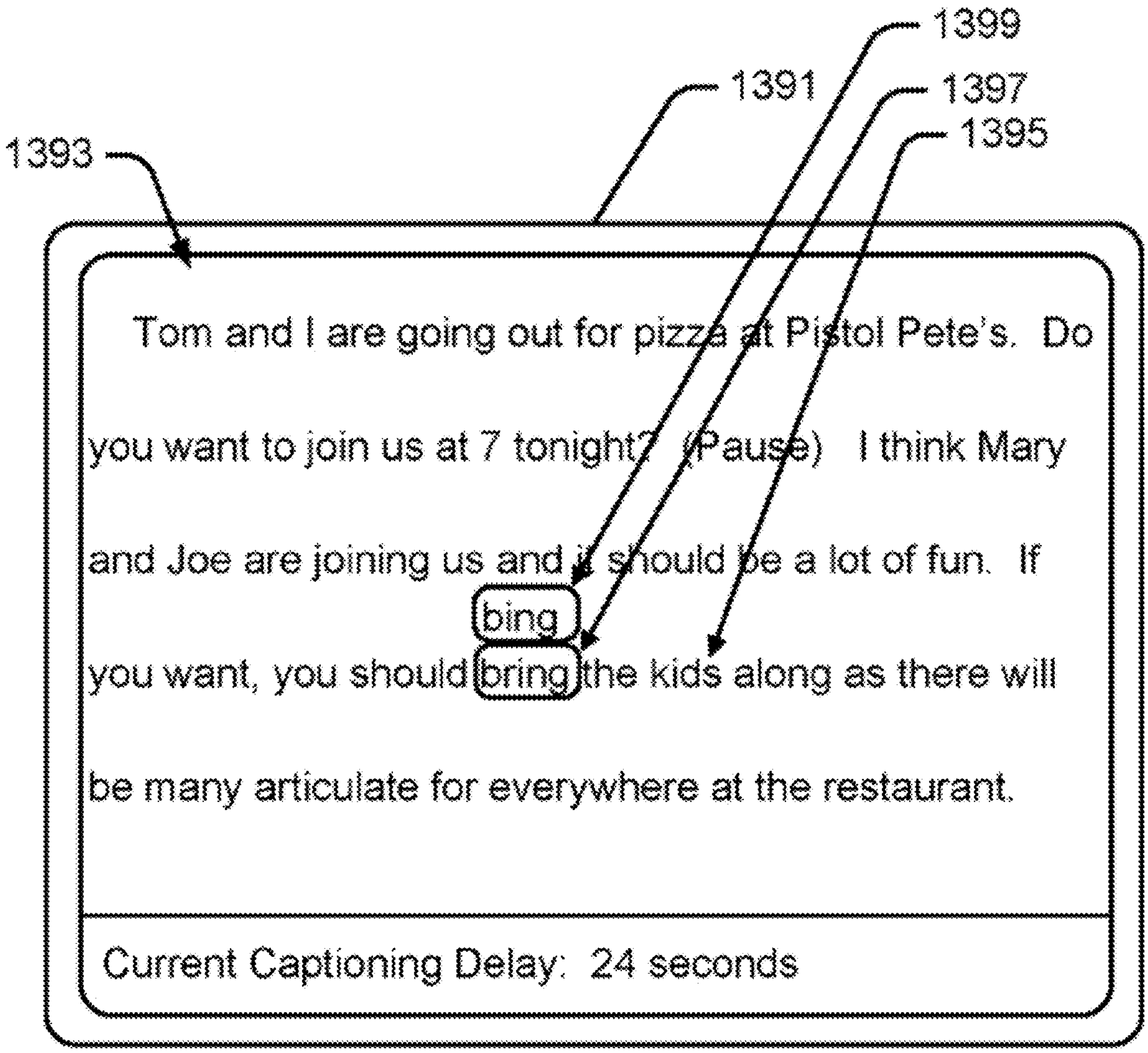
FIG. 43 is a screen shot illustrating yet another CA interface.

In at least some cases it is contemplated that if a CA corrects a word or words at one location in presented text, if an ASR subsequently contextually corrects a word or phrase that precedes the CA corrected word or words, the subsequent ASR correction may be highlighted or otherwise visually distinguished so that the CA's attention is called thereto to consider the ASR correction. In at least some cases, when an ASR corrects text prior to a CA text correction, the text that was corrected may be presented in a hovering tag proximate the ASR correction and may be touch selectable by the CA to revert back to the pre-correction text if the CA so chooses. To this end, see the CA interface screen shot 1391 shown in FIG. 43 where ASR generated text is shown at 1393 that is similar to the text presented in FIG. 39, albeit with a few corrections. More specifically, in FIG. 43, it is assumed that a CA corrected the word "cods" to "kids" at 1395 (compare again to FIG. 39) after which an ASR engine corrected the prior word "bing" to "bring". The prior ASR corrected word is highlighted or distinguished as shown at 1397 and the word that was changed to make the correction is presented in hovering tag 1399. Tag 1399 is touch selectable by the CA to revert back to the prior word if selected.

In other cases where a CA initiates or completes a word correction, the ASR engine may be programmed to disable generating additional estimates or hypothesis for any words uttered by the HU prior to the CA corrected word or within a text segment or phrase that includes the corrected word. Thus, for instance, in some cases, where 30 text words appear on a CA's display screen, if the CA corrects the fifth most recently presented word, the fifth most recently corrected word and the 25 preceding words would be rendered firm and unchangeable via the ASR engine. Here, in some cases the CA would still be free to change any word presented on her display screen at any time. In other cases, once a CA corrects a word, that word and any preceding text words may be firm as to both the CA and the ASR engine.

In at least some embodiments a CA interface may be equipped with some feature in addition to error correction that enables a CA to firm up all current text results prior to some point in a caption representation on the CA's and AU's display screens. For instance, in some cases a specific simultaneous keyboard selection like the "Esc" key and an "F1" key while a cursor is at a specific location in a caption representation may cause all text that precedes that point, whether ASR initial, ASR corrected, CA initial or CA corrected, to become firm. As another instance, in at least some cases where a CA's display screen is touch sensitive, a CA may contact the screen at a location associated with a captioned word and may perform some on screen gesture to indicate that words prior thereto should be made firm. For example, the on screen gesture may include a swipe upward, a double tap, or some other gesture reserved for firming up prior captioned text on the screen.

In still other cases, a CA may have a "Firm" or other labelled button or selectable on screen icon which, when selected by a CA, firms up all instantaneous caption text. In this regard, see the "Firm" screen icon 799 in FIG. 23 which, when selected, firms up most recent caption text so that no other ASR corrections are suggested or made. Here, instead of a selectable button or icon, in some cases the CA workstation processor may be programmed instead to receive CA caption control voice commands including, among others, a voice control command to firm up most current text. Here, the CA voice command would be filtered out of any CA voice signal that is captioned so that it does not affect a CA transcription.

In still other cases, an AU may be able to firm up text by selecting an on screen icon (see 221 in FIG. 17) or via an AU voice command. Again, the AU voice command would be filtered out of the AU voice signal transmitted to the HU device.

Figure 50:
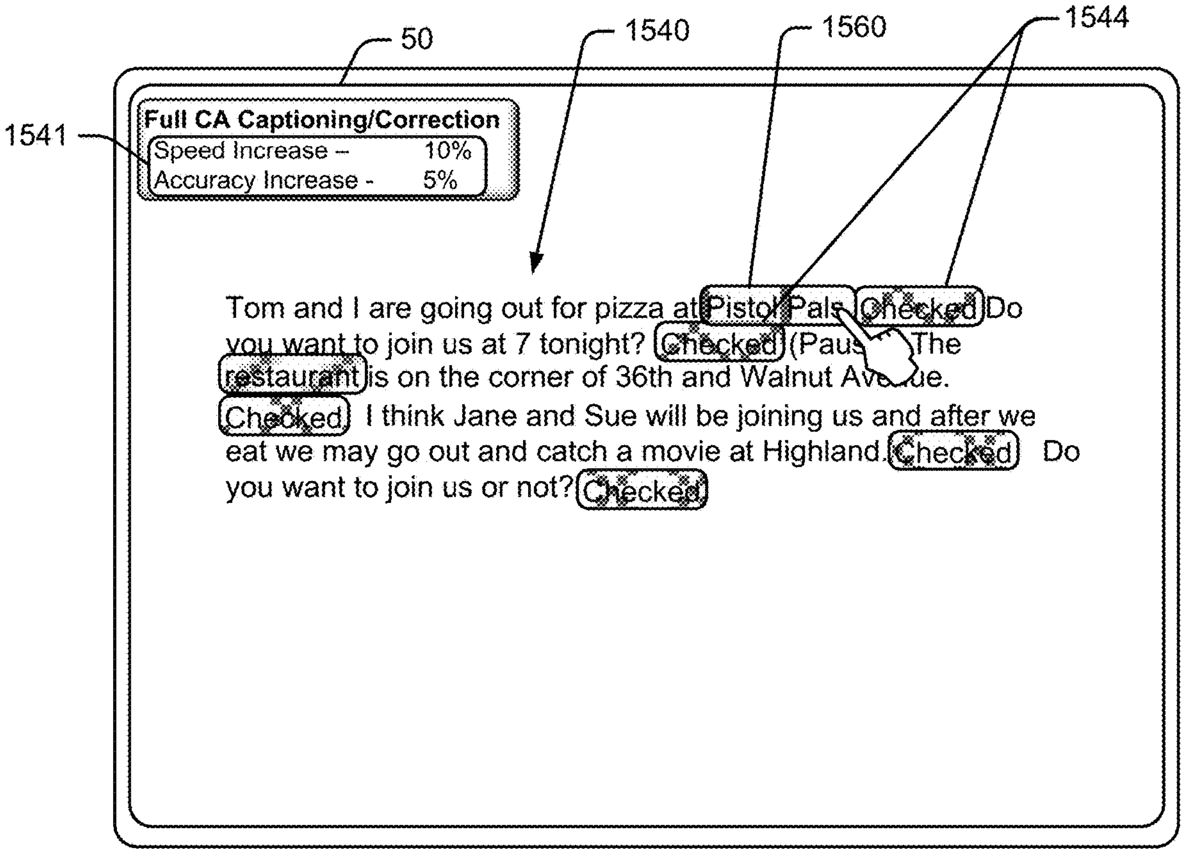
FIG. 50 is a screen shot showing a CA interface that, among other things, enables a CA to select specific points in ASR generated text to firm up prior ASR generated text.

In still other cases one or more interface output signals may be used by a CA to help the CA track the CA's correction efforts. For instance, whenever a CA corrects a word or phrase in caption text, all text prior to and including the correction may be highlighted or otherwise visually distinguished (e.g., text color changed) to indicate the point of the most recent CA text change. Here, in some cases, the CA could still make changed prior to the most recent change but the color change to indicate the latest change in the text would persist. In still other cases the CA may be able to select specific keys like an "Esc" key and some other key (e.g., "F2") to change text color prior to the selected point as an indication to the CA that prior text has already been considered. In still other cases it is contemplated that on screen "checked" options may be presented on the CA screen that are selectable to indicate that text prior thereto has been considered and the color should be changed. To this end see FIG. 50 where "Checked" icons (two labelled 1544) are presented after each punctuation mark to separate consecutive sentences in ASR generated text 1540. Here, if one of the checked icons is selected, text prior thereto may be highlighted or otherwise visually distinguished to indicate prior correction consideration.

While not shown, whenever text is firmed up and/or whenever a CA has indicated that text has been considered for correction, in addition to indicating that status on the CA display screen, in at least some cases that status may be indicated in a similar fashion on an AU device display screen. For instance, an on screen indicator may hover over a point in text presented to an AU where all text prior to that location is firm. The firm indicator may move smoothly along a line of text as text if firmed up during the course of a call.

When a CA firms up specific text, in at least some cases even if the CA is listening to HU voice signal prior to the point at which the text is firmed up, the system may automatically jump the HU voice broadcast point to the firmed up point so that the CA does not hear the intervening HU voice signal. When a voice signal jumps ahead, a warning may be presented to the CA on the CA's display screen confirming the jump ahead. In other cases the CA may still have to listen to the intervening HU voice signal. In still other cases the system may play the intervening HU voice signal at a double, triple or some other multiple of the original speech rate to expedite the process of working through the intervening voice signal.

It has been recognized that excessive error corrections can be distracting to an AU. Thus, for instance, if an ASR automatically corrects ASR text twice and a CA corrects the text once in rapid succession, the three rapid error corrections may distract an AU from her conversation with an HU. For this reason, in at least some cases it is contemplated that the number of automatic ASR error corrections passed on to an AU captioned device for in line correction may be limited to, for instance, a single error correction, two error corrections, etc. Here, all ASR error corrections may still be used to correct non-firm ASR text presented to a CA in some cases and, in other cases the number of ASR error corrections used to correct text presented to a CA may be limited (e.g., one, two, etc.).

In still other cases, while initially generated ASR text may be immediately transmitted to an AU and a CA for consideration, automatic ASR error corrections may only be presented initially to a CA (e.g., the AU would not see any automatic ASR error corrections). In this case, once ASR error corrections and CA error corrections become firm, all of those firm corrections would be transmitted to the AU device for in line or other correction. The idea here is that the AU would only receive a maximum of one error correction per word in displayed text once a caption is firm (e.g. fully error corrected by the ASR and CA). Again, the advantage of a single round of text correction for an AU is less distraction during an ongoing call.

In some cases, the degree to which automated ASR error corrections are used to automatically correct text presented to an AU may be dynamic. For instance, if recent ASR error correction rates are high (e.g., 50% (e.g., a threshold) words being automatically corrected by ASR), the system may automatically stop sending ASR error corrections to an AU and instead only use the ASR error corrections to in line correct text presented to a CA.

As another instance, where recent ASR error correction accuracy (accuracy is different than error rate) for a specific call (e.g., based on comparison of ASR error corrected text to CA corrections) is low (e.g., below some threshold level), the system may automatically stop sending ASR corrections to the AU and instead may present those corrections only to the CA for consideration. Here, if at a different point in time during the call ASR error correction accuracy exceeds the threshold level or some other threshold level, the ASR error corrections may again be transmitted to the AU device for in line correction. For example, at the beginning of a captioning session, automatic ASR caption corrections may be transmitted immediately when generated to an AU device to drive in line corrections. Over time, as a CA corrects initial ASR captions as well as automatic ASR caption corrections, a processor may compare CA corrections to ASR corrected text to assess accuracy of the automatic ASR corrections on a rolling basis. If the automatic ASR corrections accuracy rate is below a threshold level (e.g., 80%) for some duration of time (e.g., 10 seconds), the processor may then stop transmitting the automatic ASR corrections to the AU device and instead may simply present those corrections to the CA at the relay for consideration and CA correction.

In still other cases, whether or not initial ASR text is transmitted to an AU device for display may be dynamic and based on ASR accuracy, this time by comparing initial ASR text to CA corrected text on an ongoing basis. For instance, where initial ASR text accuracy is below some threshold level, the system may automatically stop transmitting that text to the AU device for display and instead may simply present that text to the CA for error correction. Here, if the ASR accuracy increases and exceeds the threshold level at a later time during a call, the system may automatically start transmitting the initial ASR text to the AU device for display with error corrections transmitted subsequently for in line correction.

In still other cases initial ASR text and ASR error corrections may both be dynamically controlled in an optimized fashion to provide optimal captioning service to an AU. For instance, initial ASR text may only be transmitted to an AU device for display when accuracy is above a first threshold and ASR error corrections may only be transmitted to the AU device when the ASR error correction accuracy exceeds a second accuracy threshold. Here, when accuracy fluctuates, system operation may adapt automatically back and forth between ASR text and error correction transmission to the AU device and blocking that transmission.

In other cases where an ASR or other system processor identifies confidence factors for ASR text and error corrections, the system may only automatically transmit ASR captions to the AU device that are associated with high confidence factor values and may wait for CA consideration of other ASR text and error corrections in other cases. Here, the idea is that low confidence ASR text will often be wrong and therefore presenting that text to an AU may simply prove confusing. When ASR text is high confidence, it can be used to speed up delivery of captions to an AU but when low confidence, it can be delayed until the CA error corrects and the text is firmed up.

Just as automatic ASR corrections may or may not be presented to an AU based on correction accuracy, the automatic ASR corrections may not be presented to a CA if accuracy drops below some threshold level. Here, in effect, if the ASR correction accuracy is too low, it may simply be faster for a CA to correct initial ASR captions without the distraction of automated error corrections from the ASR. In still other cases it is contemplated that automatic ASR corrections may be transmitted to an AU device all the time for immediate in line correction of non-firm text and the automatic ASR corrections may only be turned on and off for the CA in a dynamic fashion based on a rolling accuracy calculation.

In still other cases, whether or not ASR error corrections are transmitted to an AU device to drive caption corrections may be based at least in part or entirely on other factors. For instance, where HU and AU conversation rate is rapid (e.g., a high words per minute count that exceeds some threshold level), the system may be programmed to transmit all error corrections to an AU device and, where the conversation rate is below the threshold level, the system may be programmed to forego transmitting automatic ASR error corrections to the AU device or to only transmit first error corrections for any text to the AU device.

In at least some cases an AU device may support automatic triggers that cause CA activity to skip forward to a current time. For instance, in an ASR-CA backed up mode, in at least some cases where an AU has at least some hearing capability, it may be assumed that when an AU speaks, the AU is responding to a most recent HU voice signal broadcast and therefore understood the most recent HU voice signal and therefore that the AU's understanding of the conversation is current. Here, assuming the AU has a current understanding, the system may automatically skip CA error correction activities to the current HU voice signal and associated ASR text so that any error correction delay is eliminated.

In a similar fashion, in a CA caption mode, if an AU speaks, based on the assumption that the AU has a current understanding of the conversation when she speaks the system may automatically skip CA text generation and error correction activities to a current HU voice signal so that any text generation and error correction delay is eliminated. In this case, because there is no ASR text prior to the delay skipping, in parallel with the skipping activity, an ASR may generate fill in text automatically for the HU voice signal not already captioned by the CA. Any skipping ahead based on AU speech may also firm up all text presented to the AU prior to that point as well as any fill in text where appropriate.

In cases where an AU's voice signal operates as a catch up trigger, in at least some cases the trigger may require absence of typical words or phrases that are associated with a confused state. For instance, an exemplary phrase that indicates confusion may be "What did you say?" As another instance, an exemplary phrase may be "Can you repeat?" In this case, several predefined words or phrases may be supported by the system and, any time one of those words or phrases is uttered by an AU, the system may forego skipping the delayed period so that CA error correction or CA captioning with error correction continues unabated.

In other cases the relay server may apply artificial intelligence to recognize when a word or phrase likely indicates confusion and similarly may forego skipping the delayed period so that CA error correction or CA captioning with error correction continues unabated. If the AU's uttered word or phrase is not associated with confusion, as described above, the CA activities (e.g., error correction or captioning and error correction) are skipped ahead to the current HU voice signal.

In still other cases, a system processor may be programmed to apply artificial intelligence to HU voice signal as well as AU voice signal to assess meaning of HU and AU utterances and therefore meaning of and progression of conversations as well as the AU's state of understanding. This contextual analysis can be used to assess when an AU is caught up within a conversation and can be used as a smart trigger for skipping a CA ahead within an HU voice signal to minimize CA error correction delay. For instance, the processor may be programmed to understand the meaning of an HU query "What do you think?" and an AU response "I think that works on my end. What time were you thinking?" Here, by understanding the query and response, the processor can ascertain that the AU likely understood the query and therefore is currently caught up in the conversation. In this case, the CA can be automatically skipped ahead within the HU voice signal to a current instant in the HU voice signal and ASR captions and can error correct from that point on.

In some cases there may be restrictions on text corrections that may be made by a CA. For instance, in a simple case where an AU device can only present a maximum of 50 words to an AU at a time, the system may only allow a CA to correct text corresponding to the 50 words most recently uttered by an HU. Here, the idea is that in most cases it will make no sense for a CA to waste time correcting text errors in text prior to the most recently uttered 50 words as an AU will only rarely care to back up in the record to see prior generated and corrected text. Here, the window of text that is correctable may be a function of several factors including font type and size selected by an AU on her device, the type and size of display included in an AUs device, etc. This feature of restricting CA corrections to AU viewable text is effectively a limit on how far behind CA error corrections can lag.

Figure 40:
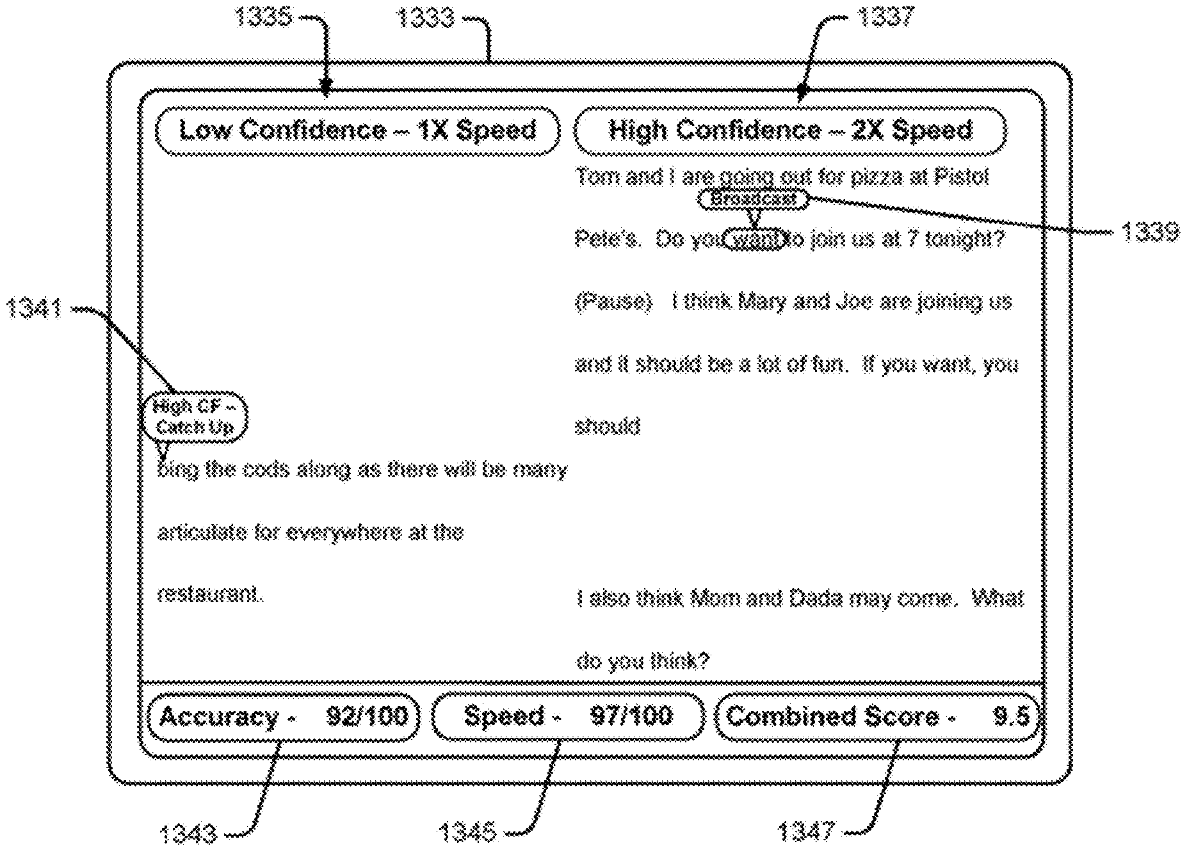
FIG. 40 is a screen shot illustrating another CA interface where low and high confidence text is presented in different columns to help a CA more easily distinguish between text likely to need correction and text that is less likely to need correction.

In some cases it is contemplated that a call may start out with full CA error correction so that the CA considers all ASR engine generated text but that, once the error correction latency exceeds some threshold level, that the CA may only be able to or may be encouraged to only correct low confidence text. For instance, the latency limit may be 10 seconds at which point all ASR text is presented but low confidence text is visually distinguished in some fashion designed to encourage correction. To this end see for instance FIG. 40 where low and high confidence text is presented to a CA in different scrolling columns. In some cases error correction may be limited to the left column low confidence text as illustrated. FIG. 40 is described in more detail hereafter. Where only low confidence text can be corrected, in at least some cases the HU voice signal for the high confidence text may not be broadcast.

Figure 40A:
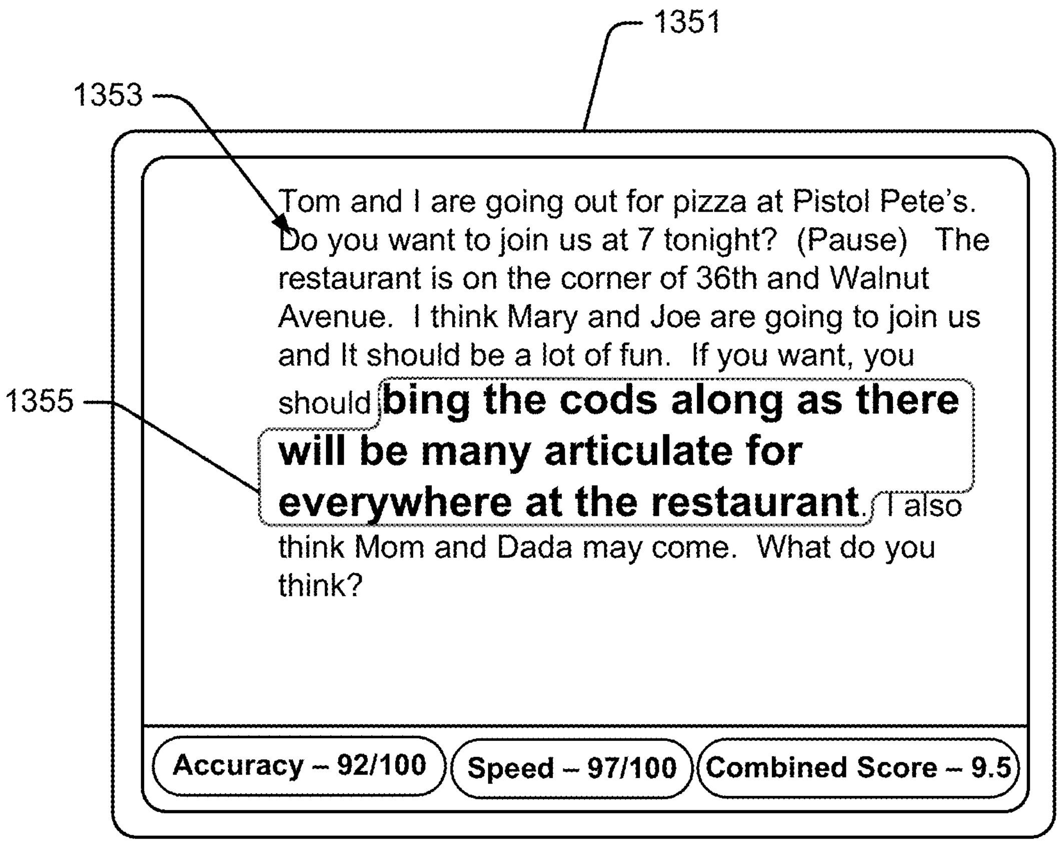
FIG. 40A is a screen shot of a CA interface showing low confidence caption text visually distinguished from other text presented to a CA for correction consideration, among other things.

As another example, see FIG. 40A where a CA display screen shot 1351 includes the same text 1353 as in FIG. 40 presented in a scrolling fashion and where phrases (only one shown) that include one or some threshold of low confidence factor words are visually distinguished (e.g., via a field border 1355, via highlighting, via different text font characteristics, etc.) to indicate the low confidence factor words and phrases. Here, in some cases the system may only broadcast the low confidence phrases skipping from one to the next to expedite the error correction process. In other cases the system may increase the HU voice signal broadcast rate (e.g., 2X, 3X, etc.) between low confidence phrases and slow the rate down to a normal rate during low confidence phrases so that the CA continues to be able to consider low confidence phrases in full context.

In some cases, only low confidence factor text and associated HU voice signal may be presented and broadcast to a CA for consideration with some indication of missing text and voice between the presented text segments. For instance, turn piping representations (see again 216 in FIG. 17) may be presented to a CA between low confidence editable text phrases.

Figure 40B:
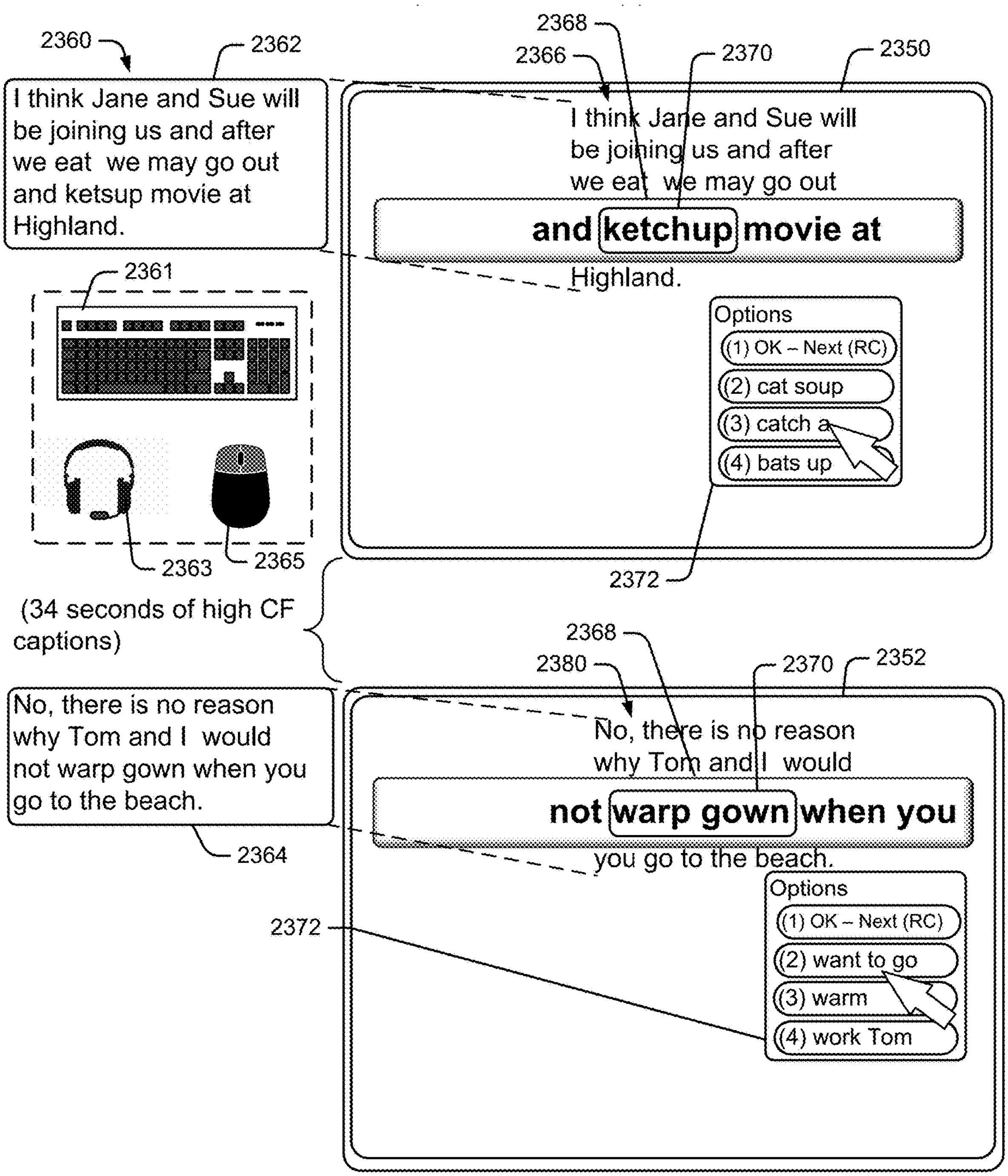
FIG. 40B shows screen shots presented via a CA workstation interface that are consistent with at least some aspects of the present disclosure.

Referring to FIG. 40B, a series of two consecutive CA interface screen shots 2350 and 2352 are illustrated that show ASR captions corresponding to consecutive low confidence caption text for an HU voice signal. The ASR captions are shown at 2360 where it can be seen that there is a 34 second high confidence caption segment separating two caption segments 2362 and 2364 that include low confidence phrases or words. The first low confidence caption segment 2362 is presented on a CA display screen at a first time as shown at 2366 where a line of captions that includes a low confidence factor captioned word or phrase (e.g., as identified by an ASR) is located within a low confidence caption field 2368 and where high confidence caption text is presented prior to and after field 2368 to provide context. A low confidence word is visually distinguished in some fashion (e.g., highlighted, underlined, bold, etc.) within line field 2368. In the illustrated example the low confidence word is distinguished by placing that word in a low confidence word/phrase field 2370 that includes a portion of the line field 2368 as illustrated at 2370 so that a CA can quickly identify the low confidence factor word or phrase.

The second low confidence caption segment 2364 is presented on the CA display screen at a second time as shown at 2380 where a second line of captions that includes a low confidence factor captioned word or phrase (e.g., as identified by an ASR) is again located within a low confidence caption field 2368 and where high confidence caption text is presented prior to and after field 2368 to provide context. A low confidence word or phrase is again visually distinguished in some fashion (e.g., highlighted, underlined, bold, etc.) within line field 2368. In the illustrated example the low confidence word is distinguished by placing that word in a low confidence word/phrase field 2370 that includes a portion of the line field 2368 as illustrated at 2370 so that a CA can quickly identify the low confidence factor word or phrase. Here, the system would essentially skip from one low confidence word or phrase and associated caption text to the next as the CA either verifies low confidence words or phrases or replaces those words or phrases. Thus, for instance, immediately upon the CA replacing the work "ketchup" with "catch a" in FIG. 40B, the CA interface would be updated to present the screen shot shown at 2352 including the next low confidence word or phrase as well as additional surrounding captions for context.

In at least some cases when the interface transitions from presenting a first low confidence segment to a second low confidence segment, the transition may appear as a scrolling upward to simulate a sense of moving forward in time In some cases the interface may present some indicator of the duration of HU voice signal that is not presented to the CA for error correction (e.g., in the present example, a 34 second indication). In other cases a transition may include a rapid defocusing (e.g., 1 second) of the first low confidence segment and refocusing where the second low confidence factor segment is presented. This may be particularly useful in cases where fields 2368 and 2370 remain stationary while caption segments are replaced.

Again, in alternative systems, all ASR text may be presented to the CA and all HU voice signal may be broadcast to the CA where high confidence factor words and phrases are presented at an increased speed and in a normal non-distinguished way and where low confidence factor captions are distinguished and associated voice signal is broadcast at the speaking speed of the HU.

In some embodiments, as illustrated in FIG. 40B, the low confidence line field 2368 and word/phrase field 2370 may be stationary as the system moves from one low confidence caption segment to another. To this end, see that the field 2370 and field 2368 remain at the exact same locations in interfaces 2366 and 2380 despite different caption text being presented. The idea here is that all low confidence words or phrases will appear, one at a time, within the low confidence word/phrase field 2370 with contextual high confidence text there around so that a CA can simply focus on the one field 2370 to view consecutive low confidence captioned words and phrases which should reduce eye and other physical strain on CAs.

Referring still to FIG. 40B, a CA workstation processor also generates correction options for a CA for each low confidence word or phrase presented for consideration. In this regard, see that a pop up window 2372 is presented as part of interface 2350 and presents selectable icons corresponding to different correction and verification options. The first illustrated option can be selected via any type of user CA user interface device to confirm that the current caption text is correct and the other options are each selectable to replace the caption text in filed 2368 with the selected option. In some embodiments the originally presented caption text in field 2368 is the best of all options and other options in field 2372 are presented in an order where the second most likely option is presented second, the third best option third, etc.

When the OK-Next option is selected, the processor immediately skips ahead to the next low confidence factor word or phrase and presents that word or phrase in field 2370 with surrounding text (see 2380) before and after for context as shown in FIG. 40B at 2352. In the present example it should be appreciated that by skipping ahead to the next low confidence factor captions for error correction, the system simply skips the 34 seconds of high confidence factor captions and HU voice signal which expedites the caption correction process and also reduces CA stress appreciably.

Referring again to FIG. 40B and specifically to screen interface 2350, if any of the second through fourth replacement caption options in field 2372 is selected, the caption text in field 2370 is replaced by the selected option and that error correction is transmitted to a connected AU captioned device to drive error corrections to the captions displayed by that device. In addition, again, the processor immediately skips ahead to the next low confidence factor word or phrase and presents that word or phrase in field 2370 with surrounding text before and after for context as shown in FIG. 40B at 2352. Again, when the system skips to the next low confidence word or phrase, the fields 2368 and 2370 do not move and instead, the text segment(s) that include the low confidence factor word or phrase are formatted so that the low confidence word or phrase can be placed in field 2370 with contextual text surrounding that word or phrase.

Referring still to FIG. 40B, in at least some embodiments a CA also has the ability to modify any text within a presented phrase including text within field 2370. Where a CA changes text in field 2370, once that change is entered, again, the processor immediately identifies and presents the caption segment(s) that includes the next low confidence factor word or phrase.

As in any interface that requires repetitive activity, any way to minimize required user burden to comprehend system output and provide user input is important. As described above, one way to reduce CA burden related to comprehending system output is in the way captions are presented to the CA for error correction. Again, by freezing fields 2368 and 2370 and simply populating those fields with consecutive low confidence factor captions, the burden of shifting sight trajectory around on the display screen is lessened.

To lessen the burden related to CA input to the system, one feature already described includes the error correction options field 2372 (see again FIG. 40B) where error correction options are presented to the CA for any low confidence words or phrases. In at least some embodiments the options field 2372, like fields 2368 and 2370, may be stationary and simply repopulated with error correction options for each low confidence factor phrase presented in field 2370. In at least some cases the options in field 2372 may be selected via an on screen cursor associated with a mouse input device 2365. In other cases, each option in field 2372 may be labelled with a number which is selectable via a keyboard device 2361 or via a microphone includes in a CA headset 2363. Thus, for instance, a CA may utter "three" while the word "ketchup" is in field 2368 to replace that word with the phrase "catch a". In still other cases the CA may utter the suggested replacement option (e.g., "catch a") to initiate a replacement.

Referring still to FIG. 40B, once a low confidence word or phrase is presented in field 2368, a system processor may be programmed to assume that any input from a CA is to be applied to the word or phrase in field 2368 so that there is no need to manually select field 2368 prior to changing the caption in the field or affirming that the caption in the field is accurate. Thus, for example, while viewing the screen shot shown at 2350 in FIG. 40B, if a CA wants to type in replacement text for the word "ketchup", she may simply start typing without having to select the word "ketchup" prior. Similarly, subsequently, while viewing the screen shot shown at 2352 in FIG. 40B, if a CA wants to type in a replacement for the phrase "warp gown", she may simply start typing without having to select that phrase prior. In other cases the CA where a CA can voice a replacement word or phrase and software then generates replacement text, while the CA is viewing the screen shot shown at 2350 in FIG. 40B, if a CA wants to replace the word "ketchup", she may simply voice the replacement word or phrase without having to select the word "ketchup" prior.

Thus, in one optimized CA interface, a CA may simply view consecutive low confidence factor captions one at a time where low confidence words and phrases are highlighted one at a time and where the highlighting of the word or phrase operates as an automatic selection thereof for error correction so that no CA selection step or action is required. By eliminating the phrase selection process, physical stress on a CA can be substantially reduced.

It should be appreciated that even in a system where initial selection of consecutive low confidence factor words and phrases is automated, a CA may be able to manually select any word or phrase presented on a display screen via a cursor, touch, or the like, so that any text, even high confidence text, can be edited or replaced as desired. Once a CA completes replacing a high confidence factor word or phrase, the system may be programmed to revert back to skipping from one low confidence factor phrase to another as described above.

Figure 40C:
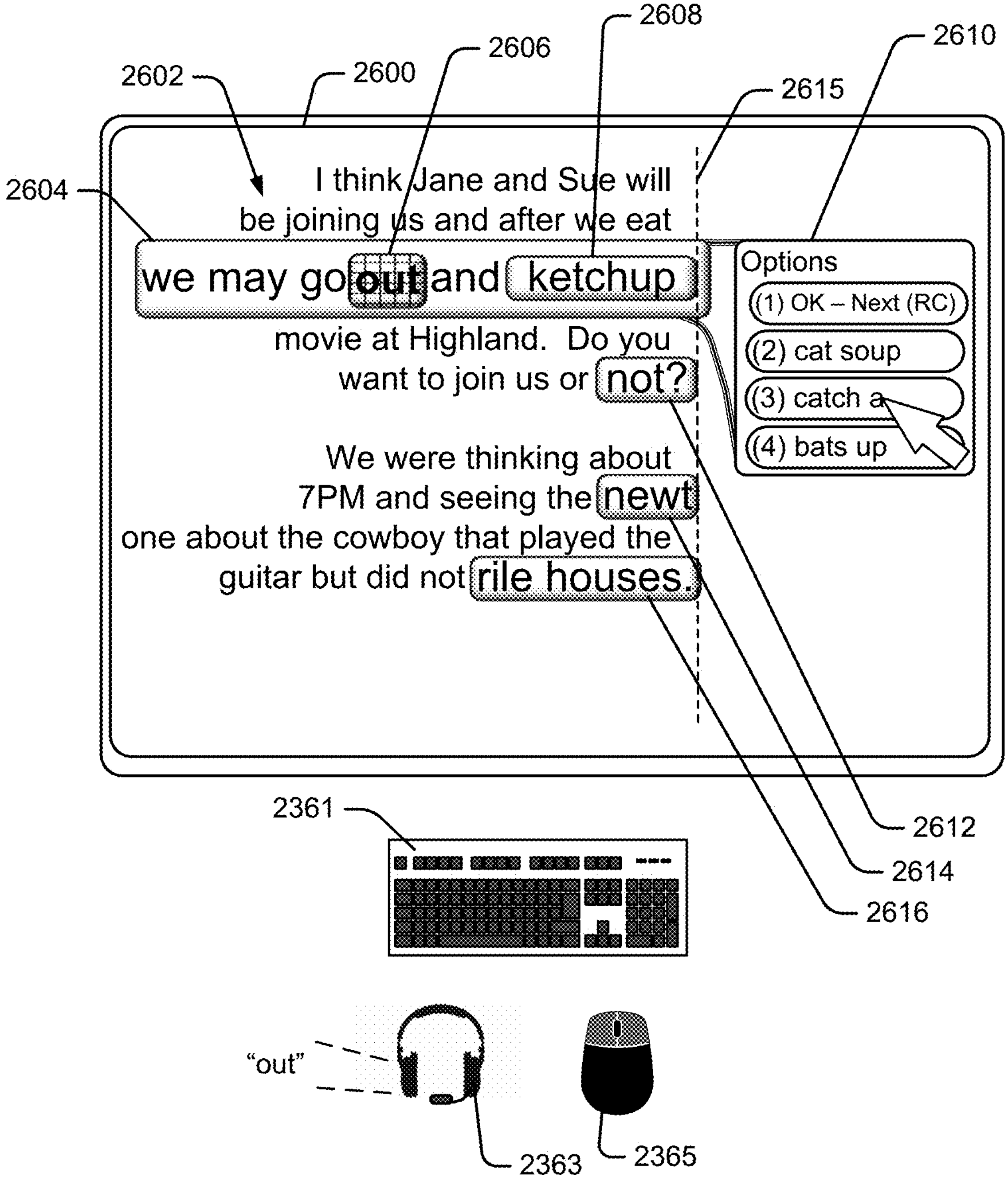
FIG. 40C is similar to FIG. 40B, albeit showing a different screen shot presented to a CA during caption error correction.

Referring now to FIG. 40C, yet another exemplary CA interface screen shot 2600 and exemplary CA input devices are illustrated where the interface includes several other advantageous content display features and arrangement limitations. To this end, ASR captioned text associated with an HU voice signal is presented in a scrolling fashion at 2602 where low confidence factor words and phrases are highlighted or otherwise visually distinguished at 2608, 2612, 2614 and 2616 in a first way. A text word currently being broadcast to a CA is visually distinguished in a second way 2606 and that word and other text within a line of text including that word are located within a stationary text line field 2604 (e.g., the captions scroll upward so that the text line including a currently broadcast word is always located within the filed 2604 so that a CA can primarily concentrate sight at the same vertical location on the screen to view currently broadcast text).

Referring still to FIG. 40C, the caption text is presented in a right justified arrangement (see phantom line 2615) and is arranged so that every low confidence word or phrase is presented along the right justified line which makes it easy for a CA to locate low confidence caption words and phrases as the captions scroll upward. Correction options for any low confidence word or phrase at the right end of field 2604 are presented in an options field or window 2610.

Referring still to FIG. 40C, a CA may select any of the presented text in at least some embodiments to make changes. A CA may use a mouse 2365, keyboard 2361 or headset 2362 to make changes in any of the manners described above. In at least some cases a CA listening to an HU voice signal broadcast may simply ignore any of the low confidence factor indicators allowing current words and phrases to pass off the screen. When a phrase or word passes off the screen without amendment, that word or phrase may become firm. Thus, in some cases a CA's inaction is used as confirmation that current text captions are accurate.

In other cases, while interim and final ASR engine text may be presented to an AU, a CA may only see final ASR engine text and therefore only be able to edit that text. Here, the idea is that most of the time ASR engine corrections will be accurate and therefore, by delaying CA viewing until final ASR engine text is generated, the number of required CA corrections will be reduced appreciably. It is expected that this solution will become more advantageous as ASR engine speed increases so that there is minimal delay between interim and final ASR engine text representations.

In still other cases it is contemplated that only final ASR engine text may be sent on to an AU for consideration. In this case, for instance, ASR generated text may be transmitted to an AU device in blocks where context afforded by surrounding words has already been used to refine text hypothesis. For instance, words may be sent in five word text blocks where the block sent always includes the 6th through 10th most recently transcribed words so that the most recent through fifth most recent words can be used contextually to generate final text hypothesis for the 6th through 10th most recent words. Here, CA text corrections would still be made at a relay and transmitted to the AU device for in line corrections of the ASR engine final text.

In this case, if a CA takes over the task of text generation from an ASR engine for some reason (e.g., an AU requests CA help), the system may switch over to transmitting CA generated text word by word as the text is generated. In this case CA corrections would again be transmitted separately to the AU device for in line correction. Here, the idea is that the CA generated text should be relatively more accurate than the ASR engine generated text and therefore immediate transmission of the CA generated text to the AU would result in a lower error presentation to the AU.

While not shown, in at least some embodiments it is contemplated that turn piping type indications may be presented to a CA on her interface display as a representation of the delay between the CA text generation or correction and the ASR engine generated text. To this end, see the exemplary turn piping 216 in FIG. 17. A similar representation may be presented to a CA.

Where CA corrections or even CA generated text is substantially delayed, in at least some cases the system may automatically force a split to cause an ASR engine to catch up to a current time in a call and to firm up (e.g., disable a CA from changing the text) text before the split time. In addition, the system may identify a preferred split prior to which ASR engine confidence factors are high. For instance, where ASR engine text confidence factors for spoken words prior to the most recent 15 words are high and for the last fifteen words are low, the system may automatically suggest or implement a split at the 15th most recent word so that ASR text prior to that word is firmed up and text thereafter is still presented to the CA to be considered and corrected. Here, the CA may reject the split either by selecting a rejection option or by ignoring the suggestion or may accept the suggestion by selecting an accept option or by ignoring the suggestion (e.g., where the split is automatic if not rejected in some period (e.g., 2 seconds)). To this end, see the exemplary CA screen shot in FIG. 39 where ASR generated text is shown at 1332. In this case, the CA is behind in error correction so that the CA computer is currently broadcasting the word "want" as indicted by the "Broadcast" tag 1334 that moves along the ASR generated text string to indicate to the CA where the current broadcast point is located within the overall string. A "High CF—Catch Up" tag 1338 is provided to indicate a point within the overall ASR text string presented prior to which ASR confidence factors are high and, after which ASR confidence factors are relatively lower. Here, it is contemplated that a CA would be able to select tag 1338 to skip to the tagged point within the text. If a CA selects tag 1338, the broadcast may skip to the associated tagged point so that "Broadcast" tag 1334 would be immediately moved to the point tagged by tag 1338 where the HU voice broadcast would recommence. In other cases, selecting high confidence tag 1338 may cause accelerated broadcast of text between tags 1334 and 1338 to expedite catch up.

Referring to FIG. 40, another exemplary CA screen shot 1333 that may be presented to show low and high confidence text segments and to enable a CA to skip to low confidence text and associated voice signal is illustrated. Screen shot 1333 divides text into two columns including a low confidence column 1335 and a high confidence column 1337. Low confidence column 1335 includes text segments that have ASR assigned confidence factors that are less than some threshold value which high confidence column 1337 include text segments that have ASR assigned confidence factors that are greater than the threshold value. Column 1335 is presented on the left half of screen shot 1333 and column 1337 is presented on the right half of shot 1333. The two columns would scroll upward simultaneously as more text is generated. Again, a current broadcast tag 1339 is provided at a current broadcast point in the presented text. Also, a "High CF, Catch Up" tag 1341 is presented at the beginning of a low confidence text segment. Here, again, it is contemplated that a CA may select the high confidence tag 1341 to skip the broadcast forward to the associated point to expedite the error correction process. As shown, in at least some cases, if the CA does not skip ahead by selecting tag 1341, the HU voice broadcast may be at 2X or more the speaking speed so that catch up can be more rapid.

In at least some cases it is contemplated that when a call is received at an AU device or at a relay, a system processor may use the calling number (e.g., the number associated with the calling party or the calling parties device) to identify the least expensive good option for generating text for a specific call. For instance, for a specific first caller, a robust and reliable ASR engine voice model may already exist and therefore be useable to generate automated text without the need for CA involvement most of the time while no model may exist for a second caller that has not previously used the system. In this case, the system may automatically initiate captioning using the ASR engine and first caller voice model for first caller calls and may automatically initiate CA assisted captioning for second caller calls so that a voice model for the second caller can be developed for subsequent use. Where the received call is from an AU and is outgoing to an HU, a similar analysis of the target HU may cause the system to initiate ASR engine captioning or CA assisted captioning.

In some embodiments identity of an AU (e.g., an AU's phone number or other communication address) may also be used to select which of two or more text generation options to use to at least initiate captioning. Thus, some AU's may routinely request CA assistance on all calls while others may prefer all calls to be initiated as ASR engine calls (e.g., for privacy purposes) where CA assistance is only needed upon request for relatively small sub-periods of some calls. Here, AU phone or address numbers may be used to assess optimal captioning type.

In still other cases both a called and a calling number may be used to assess optimal captioning type. Here, in some cases, an AU number or address may trump an HU number or address and the HU number or address may only be used to assess caption type to use initially when the AU has no perceived or expressed preference.

Referring again to FIG. 39, it has been recognized that, in addition to text corresponding to an HU voice signal, an optimal CA interface needs additional information that is related to specific locations within a presented text string. For instance, specific virtual control buttons need to be associated with specific text string locations. For example, see the "High CF— Catch Up" button in FIG. 39. As other examples, a "resume" tag 1233 as in FIG. 36 or a correction word (see FIG. 20) may need to be linked to a specific text location. As another instance, in some cases a "broadcast" tag indicating the word currently being broadcast may have to be linked to a specific text location (see FIG. 39).

In at least some embodiments, a CA interface or even an AU interface will take a form where text lines are separated by at least one blank line that operates as an "additional information" field in which other text location linked information or content can be presented. To this end, see FIG. 39 where additional information fields are collectively labelled 1215. In other embodiments it is contemplated that the additional information fields may also be provided below associated text lines. In still other embodiments, other text fields may be presented as separate in line fields within the text strings (see 1217 in FIG. 40).

Training, Gamification, CA Scoring, CA Profiles

In many industries it has been recognized that if a tedious job can be gamified, employee performance can be increased appreciably as employees work through obstacles to increase personal speed and accuracy scores and, in some cases, to compete with each other. Here, in addition to increased personal performance, an employing entity can develop insights into best work practices that can be rolled out to other employees attempting to better their performance. In addition, where there are clear differences in CA capabilities under different sets of circumstances, CA scoring can be used to develop CA profiles so that when circumstances can be used to distinguish optimal CAs for specific calls, an automated system can distribute incoming calls to optimal CAs for those specific calls or can move calls among CAs mid-call so that the best CA for each call or parts of calls can be employed.

In the present case, various systems are being designed and tested to add gamification, scoring and profile generating aspects to the text captioning and/or correction processes performed by CAs. In this regard, in some cases it has been recognized that if a CA simply operates in parallel with an ASR engine to generate text, a CA may be tempted to simply let the ASR engine generate text without diligent error correction which, obviously, is not optimal for AU's receiving system generated text where caption accuracy is desired and even required to be at high levels.

To avoid CAs shirking their error correction responsibilities and to help CAs increase their skills, in at least some embodiments it is contemplated that a system processor that drives or is associated with a CA interface may introduce periodic and random known errors into ASR generated text that is presented to a CA as test errors. Here, the idea is that a CA should identify the test errors and at least attempt to make corrections thereto. In most cases, while errors are presented to the CA, the errors are not presented to an AU and instead the likely correct ASR engine text is presented to the AU. In some cases the system allows a CA to actually correct the erroneous text without knowing which errors are ASR generated and which are purposefully introduced as part of the one of the gamification or scoring processes. Here, by requiring the CA to make the correction, the system can generate metrics on how quickly the CA can identify and correct caption errors.

In other cases, when a CA selects an introduced text error to make a correction, the interface may automatically make the correction upon selection so that the CA does not waste additional time rendering a correction. In some cases, when an introduced error is corrected either by the interface or the CA, a message may be presented to the CA indicating that the error was a purposefully introduced error.

Figure 41:
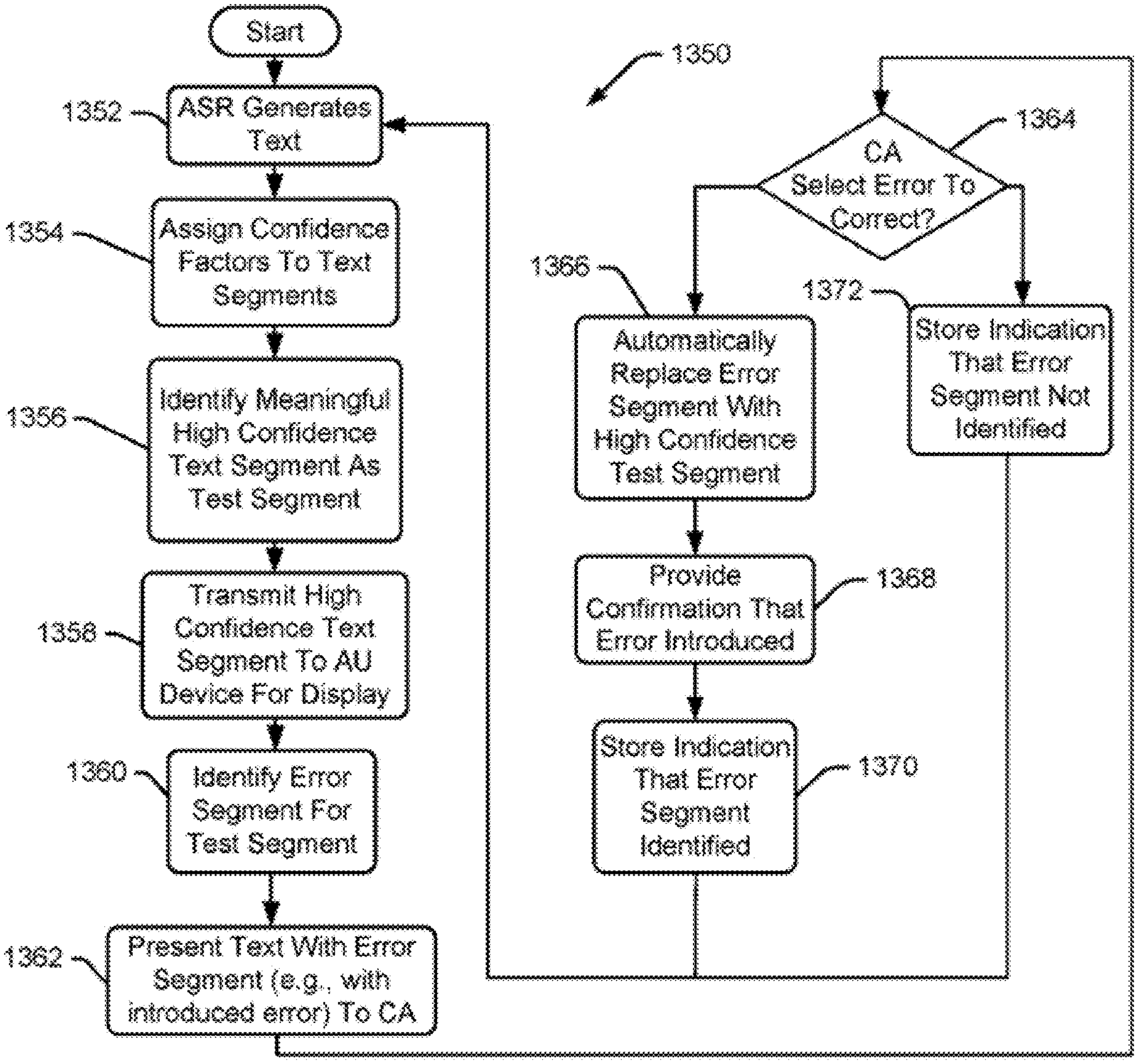
FIG. 41 is a flow chart illustrating a method of introducing errors in ASR generated text to text CA attention.

Referring to FIG. 41, a method 1350 that is consistent with at least some aspects of the present disclosure for introducing errors into an ASR text stream for testing CA alertness is illustrated. At block 1352, an ASR engine generates ASR text segments corresponding to an HU voice signal. At block 1354, a relay processor or ASR engine assigns confidence factors to the ASR text and at block 1356, the relay identifies at least one high confidence text segment as a "test" segment. At block 1358, the processor transmits the high confidence test segment to an AU device for display to an AU. At block 1360, the processor identifies an error segment to be swapped into the ASR generated text for the test segment to be presented to the CA. For instance, where a high confidence test segment includes the phrase "John came home on Friday", the processor may generate an exemplary error segment like "John camp home on Friday".

Referring still to FIG. 41, at block 1362, the processor presents text with the error segment to the CA as part of an ongoing text stream to consider for error correction. At decision block 1364, the processor monitors for CA selection of words or phrases in the error segment to be corrected. Where the CA does not select the error segment for correction, control passes to block 1372 where the processor stores an indication that the error segment was not identified and control passes back up to block 1352 where the process continues to cycle. In addition, at block 1372, the processor may also store the test segment, the error segment and a voice clip corresponding to the test segment that may later be accessed by the CA or an administrator to confirm the missed error.

Referring again to block 1364 in FIG. 41, if the CA selects the error segment for correction, control passes to block 1366 where the processor automatically replaces the error segment with the test segment so that the CA does not have to correct the error segment. Here the test segment may be highlighted or otherwise visually distinguished so that the CA can see the correction made. In addition, in at least some cases, at block 1368, the processor provides confirmation that the error segment was purposefully introduced and corrected. To this end, see the "Introduced Error—Now Corrected" tag 1331 in FIG. 39 that may be presented after a CA selects an error segment. At block 1370, the processor stores an indication that the error segment was identified by the CA. Again, in some cases, the test segment, error segment and related voice clip may be stored to memorialize the error correction. After block 1370, control passes back up to block 1352 where the process continues to cycle.

In some cases errors may only be introduced during periods when the rate of actual ASR engine errors and CA corrections is low. For instance, where a CA is routinely making error corrections during a one minute period, it would make no sense to introduce more text errors as the CA is most likely highly focused during that period and her attention is needed to ensure accurate error correction. In addition, if a CA is substantially delayed in making corrections, the system may again opt to not introduce more errors.

Error introductions may include text additions, text deletions (e.g., removal of text so that the text is actually missing from the transcript) and text substitutions in some embodiments. In at least some cases the error generating processor or CA interface may randomly generate errors of any type and related to any ASR generated text. In other cases, the processor may be programmed to introduce several different types of errors including visible errors (e.g., defined above as errors that are clear errors when placed in context with other words in a text phrase, e.g., the phrase does not make sense when the erroneous text is included), invisible errors (e.g., errors that make sense and a grammatically right in the context of surrounding words), minor errors which are errors that, while including incorrect text, have no bearing on the meaning of an associated phrase (e.g., "the" swapped for "a") and major errors which are errors that include incorrect text and that change the meaning of an associated phrase (e.g., swapping a 5 PM meeting time for a 3 PM meeting time). In some cases an error may have two designations such as, for instance, visible and major, visible and minor, invisible and major or invisible and minor.

Because at least some ASR engines can understand context, the engines can also be programmed to ascertain when a simple text error affects phrase meaning and can therefore generate and identify different error types to test a CAs correction skills. For instance, in some cases introduced errors may include visible, invisible, minor and major errors and statistics related to correcting each error type may be maintained as well as when a correction results in a different error. For instance, an invisible major error may be presented to a CA and the CA may recognize that error and incorrectly correct it to introduce a visible minor error which, while still wrong, is better than the invisible major error. Here, statistics would reflect that the CA identified and corrected the invisible major error but made an error when correcting which resulted in a visible minor error. As another instance, a visible minor error may be incorrectly corrected to introduce an invisible major error which would generate a much worse captioning result that could have substantial consequences. Here, statistics would reflect that the CA identified and corrected the initial error which is good, but would also reflect that the correction made introduced another error and that the new error resulted in a worse transcription result.

In some embodiments gamification can be enhanced by generating ongoing, real time dynamic scores for CA performance including, for instance, a score associated with accuracy, a separate score associated with captioning speed and/or separate speed and accuracy scores under different circumstances such as, for instance, for male and female voices, for east coast accents, Midwest accents, southern accents, etc., for high speed talking and slower speed talking, for captioning with correcting versus captioning alone versus correcting ASR engine text, and any combinations of factors that can be discerned. In FIG. 40, exemplary accuracy and speed scores that are updated in real time for an ongoing call are shown at 1343 and 1345, respectively. Where a call persists for a long time, a rolling most recent sub-period of the call may be used as a duration over which at least current scores are calculated and separate scores for associated with an entire call may be generated and stored as well.

CA scores may be stored as part of a CA profile and that profile may be routinely updated to reflect growing CA effectiveness with experience over time. Once CA specific scores are stored in a CA profile, the system may automatically route future calls that have characteristics that match high scores for a specific CA to that CA which should increase overall system accuracy and speed. Thus, for instance, if an HU profile associated with a specific phone number indicates that an associated HU has a strong southern accent and speaks rapidly, when a call is received that is associated with that phone number, the system may automatically route the call to a CA that has a high gamification score for rapid southern accents if such a CA is available to take the call. In other cases it is contemplated that when a call is received at a relay where the call cannot be associated with an existing HU voice profile, the system may assign the call to a first CA to commence captioning where a relay processor analyzes the HU voice during the beginning of the call and identifies voice characteristics (e.g., rapid, southern, male, etc.) and automatically switches the call to a second CA that is associated with a high gamification score for the specific type of HU voice. In this case, speed and accuracy would be expected to increase after the switch to the second CA.

Similarly, if a call is routed to one CA based on an incoming phone number and it turns out that a different HU voice is present on the call so that a better voice profile fits the HU voice, the call may be switched from an initial CA to a different CA that is more optimal for the HU voice signal. In some cases a CA switch mid-call may only occur if some threshold level of delay or captioning errors is detected. For instance, if a first assigned CA's delay and error rate is greater than threshold values and a system processor recognizes HU voice characteristics that are much better suited to a second available CA's skill set and profile, the system may automatically transition the call from the first CA to the second CA.

In addition, in some cases it is contemplated that in addition to the individual speed and accuracy scores, a combined speed/accuracy score can be generated for each CA over the course of time, for each CA over a work period (e.g., a 6 hour captioning day), for each CA for each call that the CA handles, etc. For example, an exemplary single score algorithm may including a running tally that adds one point for a correct word and adds zero points for an incorrect word, where the correct word point is offset by an amount corresponding to a delay in word generation after some minimal threshold period (e.g., 2 seconds after the word is broadcast to the CA for transcription or one second after the word is broadcast to and presented to a CA for correction). For instance, the offset may be 0.2 points for every second after the minimal threshold period. Other algorithms are contemplated. The single score may be presented to a CA dynamically and in real time so that CA is motivated to focus more. In other cases the single score per phone call may be presented at the end of each call or an average score over a work period may be presented at the end of the work period. In FIG. 40, an exemplary current combined score is shown at 1347.

The single score or any of the contemplated metrics may also be related to other factors such as, for instance:

(1) How quickly errors are corrected by a CA;
(2) How many ASR errors need to be corrected in a rolling period of time;
(3) ASR delays;
(4) How many manufactured or purposefully introduced errors are caught and corrected;
(5) Error types (e.g., visible, invisible, minor and major)
(6) Correct and incorrect corrections;
(7) Effect of incorrect corrections and non-corrections (e.g., better caption or worse caption);
(8) Rates of different types of corrections;
(9) Error density;
(10) Once a CA is behind, how does the CA respond, rate of catchup;
(11) HU speaking rate (WPM);
(12) HU accent or dialect;
(13) HU volume, pitch, tone, changes in audible signal characteristics;
(14) Voice signal clarity (perhaps as measured by the ASR engine);
(15) Communication link quality;
(16) Noise level (e.g., HU operating in high wind environment where noise is substantial and persistent);
(17) Quality of captioned sentence structure (e.g., verb, noun, adverb, in acceptable sequence);
(18) ASR confidence factors associated with text generated during a call (as a proxy for captioning complexity), etc.

In at least some embodiments where gamification and training processes are applied to actual AU-HU calls, there may be restrictions on ability to store captions of actual conversations. Nevertheless, in these cases, captioning statistics may still be archived without saving caption text and the statistics may be used to drive scoring and gamification routines. For instance, for each call, call characteristics may be stored including, for instance, HU accent, average HU voice signal rate, highest HU voice signal rate, average volume of HU voice signal, other voice signal defining parameters, communication line clarity or other line characteristics, etc. (e.g., any of the other factors listed above). In addition, CA timing information may be stored for each audio segment in the call, for captioned words and for corrective CA activities.

As in the case of the full or pure CA metrics testing and development system described above, in at least some cases real AU-HU calls may be replaced by pre-recorded text call data sets where audio is presented to a CA while mock ASR engine text associated therewith is visually presented to the CA for correction. In at least some cases, the pre-stored test data set may only include a mocked up HU voice signal and known correct or true text associated therewith and the system including an ASR engine may operate in a normal fashion so the ASR engine generates real time text including ASR errors for the mocked up HU voice signal as a CA views that ASR text and makes corrections. Here, as the CA generates corrected final text, a system processor may automatically compare that text to the known correct or true text to generate CA call metrics including various scoring values.

In other cases, the ASR engine functions may be mimicked by a system processor that automatically introduces known errors of specific types into the correct or true text associated with the mocked up HU voice signal to generate mocked up ASR text that is presented to a CA for correction. Here, again, as the CA generates corrected final text, a system processor automatically compares that text to the known true text to generate CA call metrics including various scoring values.

In still other cases, in addition to storing the test HU voice signal and associated true text, the system may also store a test version of text associated with the HU voice signal where the test text version has known errors of known types and, during a test session, the test text with errors may be presented to the CA for correction. Here, again, as the CA generates corrected final text, a system processor automatically compares that text to the known true text to generate CA call metrics including various scoring values.

In each cases where a mocked up HU voice signal is used during a test session, the voice signal and CA captioned transcripts can be maintained and correlated with the CA's results so that the CA and/or a system administrator can review those results for additional scoring purposes or to identify other insights into a specific CA's strengths and weaknesses or into CA activities more generally.

In at least some cases CAs may be tested using a testing application that, in addition to generating mock ASR text and ASR corrections for a mocked up AU-HU voice call, also simulates other exemplary and common AU actions during the call such as, for instance, switching from an ASR-CA backed up mode to a full CA captioning and error correction mode. Here, as during a normal call, the CA would listen to HU voice signal and see ASR generated text on her CA display screen and would edit perceived errors in the ASR text during the ASR-CA backed up mode operation. Here, the CA would have full functionality to skip around within the ASR generated text to rebroadcast HU segments during error correction, to firm up ASR text, etc., just as if the mocked up call were real. At some point, the testing application would then issue a command to the CA station indicating that the AU requires full CA captioning and correction without ASR assistance at which point the CA system would switch over to full CA captioning and correction mode. A switch back to the ASR-CA backed up mode may occur subsequently.

Where pre-recorded mock HU voice signals are fed to a CA, a Truth/Scorer processor may be programmed to automatically use known HU voice signal text to evaluate CA corrections for accuracy as described above. Here, a final draft of the CA corrected text may be stored for subsequent viewing and analysis by a system administrator or by the CA to assess effectiveness, timing, etc.

Where scoring is to be applied to a live AU-HU call that does not use a pre-recorded HU voice signal so there is no initial "true" text transcript, a system akin to one of those described above with respect to one of FIG. 30 or 31 may be employed where a "truth" transcript is generated either via another CA or an ASR or a CA correcting ASR generated text for comparison and scoring purposes. Here, the second CA that generates the truth transcript may operate at a much slower pace than the pace required to support an AU as caption rate is not as important and can be sacrificed for accuracy. Once or as the second CA generates the truth transcript, a system processor may compare the first CA captioning results to the truth transcript to identify errors and generate statistics related thereto. Here, the truth transcript is ultimately deleted so that there is no record of the call and all that persists is statistics related to the CA's performance in handling the call.

In other embodiments where scoring is applied to a live AU-HU call that does not have a predetermined "truth" transcript, the second CA may receive the first CA's corrected text and listen to the HU voice signal while correcting the first CA's corrected text a second time. In this case, a processor tracks corrections by the first CA as well as statistics related to one or any subset of the call factors (e.g., rate of speech, number of ASR text errors per some number of words, etc.) listed above. In addition, the processor tracks corrections by the second CA where the second CA corrections are considered the Truth transcript. Thus, any correction made by the second CA is taken as an error.

In at least some cases, instead of just identifying CA caption errors generally, either a system processor or a second CA/scorer may categorize each error as visible (e.g., in context of phrase, error makes no sense), invisible (e.g., in context of phrase error makes sense but meaning of phrase changes) or minor (e.g., error that does not change the meaning of including phrase). Where a scoring second CA has to identify error type in a case where a mock AU-HU call is used as the source for CA correction, a processor may present a screenshot to the second CA where all errors are identified and as well as tallying tools for adding each error to one of several error type buckets.

Figure 51:
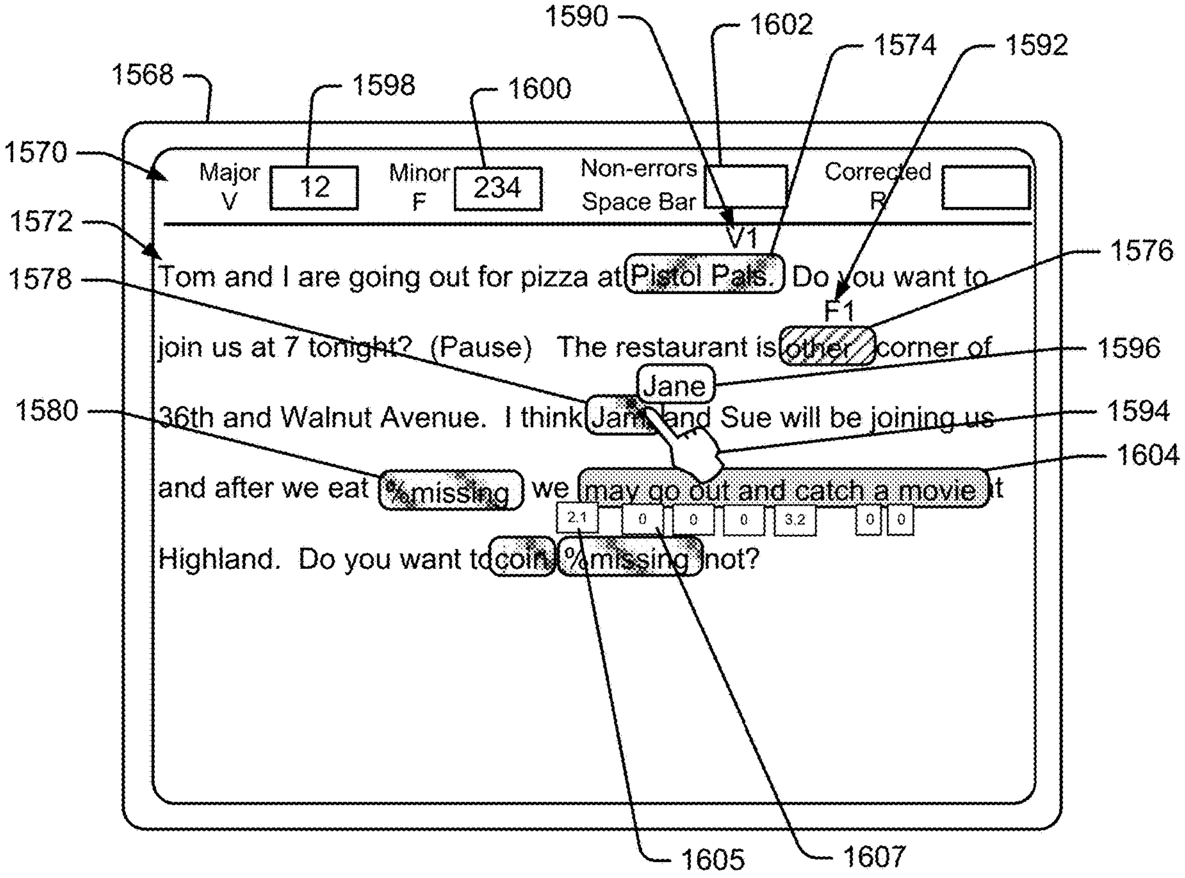
FIG. 51 is a screen shot illustrating an administrators interface that shows results of CA generated text and scoring tools used to assess quality of captions generated by a CA.

To this end, see FIG. 51 where an exemplary CA scoring screen shot 1568 is illustrated. The screen shot 1568 includes a CA text transcript at 1572 that includes corrections by a first CA that is being scored by a CA scorer (e.g., a system manager or administrator). While scoring the text, the scorer listens to the HU voice signal via a headset and, in at least some cases, a word associated with a currently broadcast HU voice signal is highlighted to aid the scorer in following along. In the illustrated embodiment, a system processor compares the CA corrected text to a truth transcript and identifies transcription errors. Each error in FIG. 51 is visually distinguished. For instance, see exemplary field indicators 1574, 1576, 1578 and 1580, each of which represents an error.

Referring still to FIG. 51, as the scorer works her way through the CA text transcript considering each error, the scorer uses judgement to determine if the error is a major error or a minor error and designates each error either major or minor. For instance, a scorer may use a mouse or touch to select each error and then use specific keyboard keys to assign different error types to each error. In the illustrated example, a "V" keyboard selection designates an error as a major error while an "F" selection designates the error as a minor error. In FIG. 51, each time an error type is assigned to an error, a V1 or F1 designator is spatially associated with the error on the screen shot 1568 so that the error type is clear. In addition, when an error type is assigned to an error, the designated error is visually distinguished in a different fashion to help the scorer track which errors have been characterized and which have not. For instance, in FIG. 51, fields 1574 and 1576 are shown as left up to right cross hatched to indicate a red color indicating that associated errors have ben categorized while fields 1578 and 1580 are shown left down to right cross hatched to indicate a blue color reserved for errors that have yet to be considered and categorized by the scorer.

In addition, when an error type is assigned to an error, a counter associated with the error type is incremented to indicate a total count for that specific type of error. To this end, a counter field 1570 is presented along the top edge of the screen shot 1568 that includes several counters including a major error counter and a minor error counter at 1598 and 1600, respectively. The final counts are used to generate various metrics related to CA quality and effectiveness.

In at least some cases a scorer may be able to select an error field to access associated text from the truth transcript that is associated with the error. To this end, see in FIG. 51 where hand icon 1594 indicates user selection of error field 1578 which opens up truth text field 1596 in which associated truth text is presented. In the example, the name "Jane" is the truth text for the error "Jam". Thus, the scorer can either listen to the broadcast voice or view truth text to compare to error text for assessing error type.

Referring still to FIG. 51, missing text is also an error and is represented by the term "% missing" as shown at 1580. Here, again, the scorer can select the missing text field to view truth text associated therewith in at least some embodiments.

A "non-error" is erroneous text that could not possibly be confusing to someone reading a caption. For instance, exemplary non-errors include alternate spellings of a word, punctuation, spelled out numbers instead of numerals, etc. Here, while the system may flag non-errors between a truth text and CA generated text, the scorer may un-flag those errors as they are effectively meaningless. The idea here is that on balance, it is better to have faster captioning with some non-errors than slower captioning where there are no non-errors and therefore, at a minimum, CAs should not be penalized for purposefully or even unintentionally allowing non-errors. When a scorer un-flags a non-error, the appearance of the non-error is changed so that it is not visually distinguished from other correct text in at least some embodiments. In addition, when a scorer un-flags a non-error, a value in a non-error count field 1602 is incremented by one.

In at least some cases a scorer can highlight word or phrases in a text caption causing a processor to indicate durations of silence prior to the selected word or each word in a selected phrase. To this end, see, for instance, the highlighted phrase "may go out and catch a movie" in FIG. 51 where pre-word delays are shown before each word in the highlighted phrase including, for instance, delays 1605 and 1607 corresponding to the words "may" and "go", respectively. Here, a scorer can use the delays to develop a sense of whether or not words repeated in CA corrected text are meaningful. For instance, where a CA corrected transcript includes the phrase "no no", whether or not this word duplication is meaningful or not may be dependent upon the delay between the two words. For instance, where there is no delay between the words, the duplication was not necessary as one "no" would have gotten the meaning across. On the other hand, where there is a several second delay between the first and second "no" utterances in the HU voice signal, that indicated that each word was a separate answer (e.g., the end of one sentence and the beginning of another). A scorer can use this type of information as another metric for scoring CA performance.

One other way to monitor CA attention is to present random or periodic indicators into the ASR engine text that the CA has to recognize within the text in some fashion to confirm the CA's attention. For instance, referring again to FIG. 36, in some cases a separate check box may be presented for each ASR transcript line of text as shown at 1610 where a CA has to select each box to place an "X" therein to indicate that the line has been examined. In other cases check boxes may be interspersed throughout the transcript text presented to the CA and the CA may need to select each of those boxes to confirm her attention.

Other AU Device Features and Processes

In at least some of the embodiments described above an AU has the option to request CA assistance or more CA assistance than currently afforded on a call and or to request ASR engine text as opposed to CA generated text (e.g., typically for privacy purposes). While a request to change caption technique may be received from a CA, in at least some cases the alternative may not be suitable for some reason and, in those cases, the system may forego a switch to a requested technique and provide an indication to a requesting AU that the switch request has been rejected. For instance, if an AU receiving CA generated and corrected text requests a switch to an ASR engine but accuracy of the ASR engine is below some minimal threshold, the system may present a message to the AU that the ASR engine cannot currently support captioning and the CA generation and correction may persist. In this example, once the ASR engine is ready to accurately generate text, the switch thereto may be either automatic or the system may present a query to the AU seeking authorization to switch over to the ASR engine for subsequent captioning.

In a similar fashion, if an AU requests additional CA assistance, a system processor may determine that ASR engine text accuracy is low for some reason that will also affect CA assistance and may notify the AU that the a switch will not be made along with a reason (e.g., "Communication line fault").

In cases where privacy is particularly important to an AU on a specific call or generally, the caption system may automatically, upon request from an AU or per AU preferences stored in a database, initiate all captioning using an ASR engine. Here, where corrections are required, the system may present short portions of an HU's voice signal to a series of CAs so that each CA only considers a portion of the text for correction. Then, the system would stitch all of the CA corrected text together into an HU text stream to be transmitted to the AU device for display.

Figure 45:
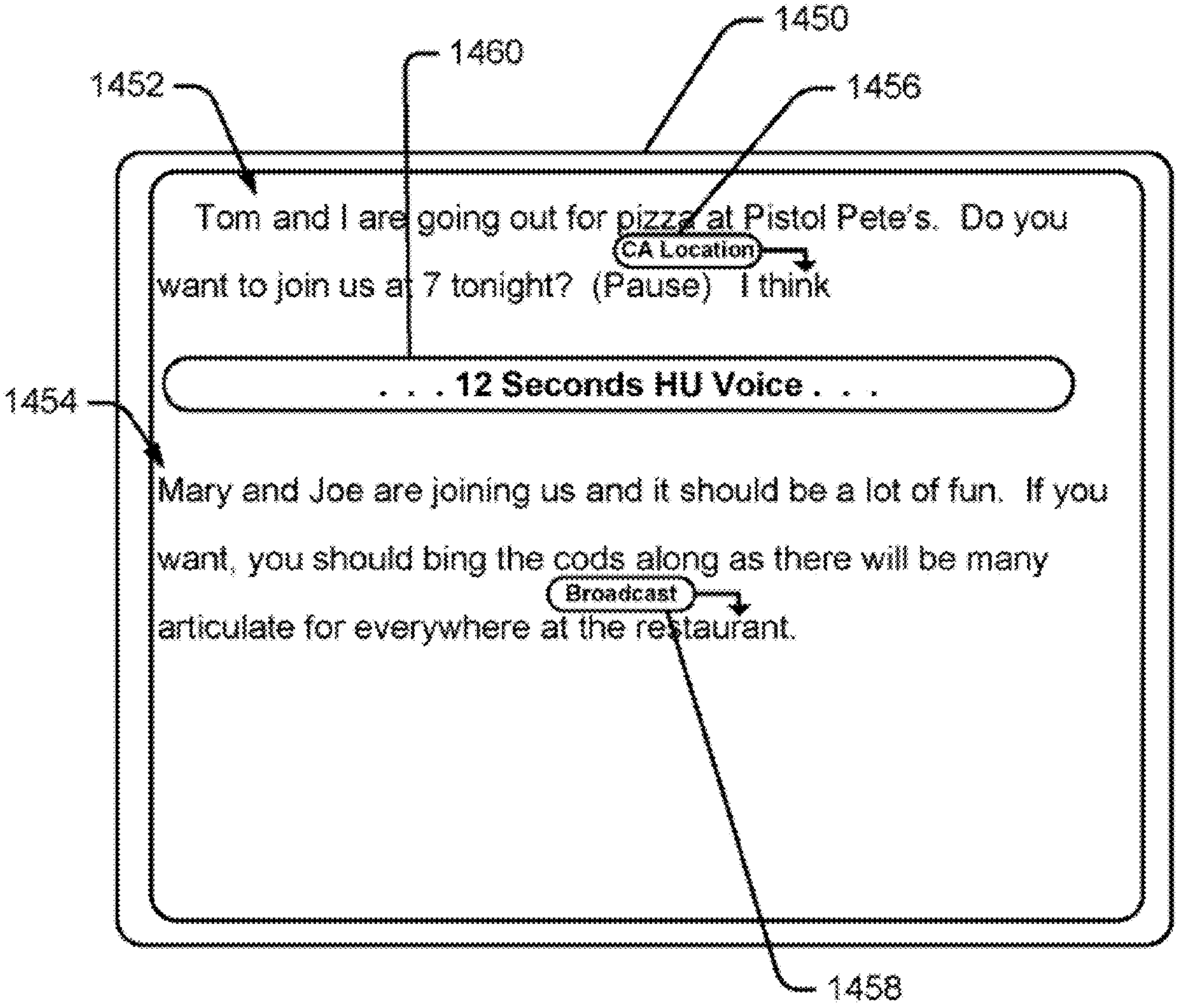
FIG. 45 is another CA interface screen shot showing a CA correction field, an ASR uncorrected text field and an intervening time field that is consistent with at least some aspects of the present disclosure.

In some cases it is contemplated that an AU device interface may present a split text screen to an AU so that the AU has the option to view essentially real time ASR generated text or CA corrected text when the corrected text substantially lags the ASR text. To this end, see the exemplary split screen interface 1450 in FIG. 45 where CA corrected text is shown in an upper field 1452 and "real time" ASR engine text is presented in a lower field 1454. As shown, a "CA location" tag 1456 is presented at the end of the CA corrected text while a "Broadcast" tag 1458 is presented at the end of the ASR engine text to indicate the CA and broadcast locations within the text string. Where CA correction latency reaches a threshold level (e.g., the text between the CA correction location and the most recent ASR text no longer fits on the display screen), text in the middle of the string may be replaced by a period indicator 1460 to indicate the duration of HU voice signal at the speaking speed that corresponds to the replaced text. Here, as the CA moves on through the text string, text in the upper field 1452 scrolls up and as the HU continued to speak, the ASR text in the bottom field 1454 also scrolls up independent of the upper field scrolling rate.

In at least some cases it is contemplated that an HU may use a communication device that can provide video of the HU to an AU during a call. For instance, an HU device may include a portable tablet type computing device or smart phone (see 1219 in FIG. 33) that includes an integrated camera for telepresence type communication. In other cases, as shown in FIG. 33, a camera 1123 may be linked to the HU phone or other communication device 14 for collecting HU video when activated. Where HU video is obtained by an HU device, in most cases the video and voice signals will already be associated for synchronous playback. Here, the HU voice and video signals are transmitted to an AU device, the HU video may be broken down into video segments that correspond with time stamped text and voice segments and the stamped text, voice and video segments may be stored for simultaneous replay to the AU as well as to a CA if desired. Here, where there are delays between broadcast of consecutive HU voice segments as text transcription progresses, in at least some cases the HU video will freeze during each delay. In other cases the video and audio voice signal may always be synchronized even when text is delayed. If the HU voice signal is sped up during a catch up period as described above, the HU video may be shown at a faster speed so that the voice and video broadcasts are temporally aligned.

Figure 42:
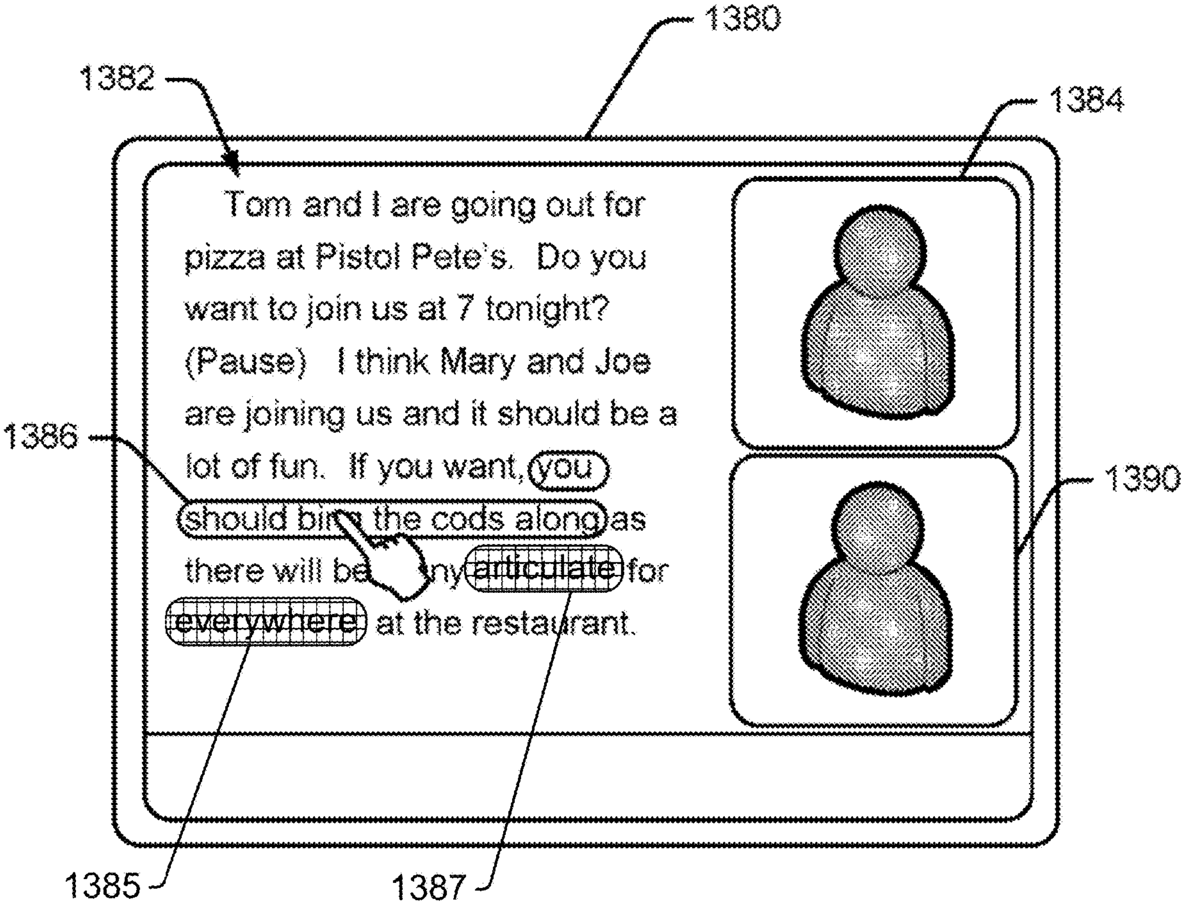
FIG. 42 is a screen shot illustrating an AU interface including, in addition to text presentation, an HU video field and a CA signing field that is consistent with at least some aspects of the present disclosure.

FIG. 42 shows an exemplary AU device screen shot 1308 including transcribed text 1382 and a video window or field 1384. Here, assuming that all of the shown text at 1382 has already been broadcast to the AU, if the AU selects the phrase "you should bing the cods along" as indicate by hand icon 1386, the AU device would identify the voice segment and video segment associated with the selected text segment and replay both the voice and video segments while the phrase remains highlighted for the user to consider.

In at least some embodiments where low confidence factors are assigned to captions presented to an AU, low confidence words or phrases may be visually distinguished for the AU so that the AU is at least aware of the fact that the words or phrases may be inaccurate. To this end, see in FIG. 42 that the words "articulate" 1385 and "everywhere" 1387 are shown in double hatch effect to indicate that those words are visually distinguished for the AU as an indication that each of those words is associated with a low confidence factor and therefore is likely more inaccurate than other caption text.

Referring yet again to FIG. 33, in some cases the AU device or AU station may also include a video camera 1125 for collecting AU video that can be presented to the HU during a call. Here, it is contemplated that at least some HUs may be reticent to allow an AU to view HU video without having the reciprocal ability to view the AU during an ongoing call and therefore reciprocal AU viewing would be desirable.

At least four advantages result from systems that present HU video to an AU during an ongoing call. First, where the video quality is relatively high, the AU will be able to see the HU's facial expressions which can increase the richness of the communication experience.

Second, in some cases the HU representation in a video may be useable to discern words intended by an HU even if a final text representation thereof is inaccurate. For instance, where a text transcription error occurs, an AU may be able to select the phrase including the error and view the HU video associated with the selected phrase while listening to the associated voice segment and, based on both the audio and video representations, discern the actual phrase spoken by the HU.

Third, it has been recognized that during most conversations, people instinctively provide visual cues to each other that help participants understand when to speak and when to remain silent while others are speaking. In effect, the visual cues operate to help people take turns during a conversation. By providing video representations to each of an HU and an AU during a call, both participants can have a good sense of when their turn is to talk, when the other participant is struggling with something that was said, etc. Thus, for instance, in many cases an HU will be able to look at the video to determine if an AU is silently waiting to view delayed text and therefore will not have to ask if there is a delay in AU communication.

Fourth, for deaf AU's that are trained to read lips, the HU video may be useable by the AU to enhance communication.

In at least some cases an AU device may be programmed to query an HU device at the beginning of a communication to determine if the HU device has a video camera useable to generate an HU video signal. If the HU device has a camera, the AU device may cause the HU device to issue a query to the HU requesting access to and use of the HU device camera during the call. For instance, the query may include brief instructions and a touch selectable "Turn on camera" icon or the like for turning on the HU device camera. If the HU rejects the camera query, the system may operate without generating and presenting an HU video as described above. If the HU accepts the request, the HU device camera is turned on to obtain an HU video signal while the HU voice signal is obtained and the video and voice signal are transmitted to the AU device for further processing.

There are video relay systems on the market today where specially trained CAs provide a sign language service for deaf AUs. In these systems, while an HU and an AU are communicating via a communication link or network, an HU voice signal is provided to a CA. The CA listens to the HU voice signal and uses her hands to generate a sequence of signs that correspond at least roughly to the content (e.g., meaning) of the HU voice messages. A video camera at a CA station captures the CA sign sequence (e.g., "the sign signal") and transmits that signal to an AU device which presents the sign signal to the AU via a display screen. If the AU can speak, the AU talks into a microphone and the AU's voice is transmitted to the HU device where it is broadcast for the HU to hear.

In at least some cases it is contemplated that a second or even a third communication signal may be generated for the HU voice signal that can be transmitted to the AU device and presented along with the sign signal to provide additional benefit to the AU. For instance, it has been recognized that in many cases, while sign language can come close to the meaning expressed in an HU voice signal, in many cases there is no exact translation of a voice message to a sign sequence and therefore some meaning can get lost in the voice to sign signal translation. In these cases, it would be advantageous to present both a text translation and a sign translation to an AU.

In at least some cases it is contemplated that an ASR engine at a relay or operated by a fourth party server linked to a relay may, in parallel with a CA generating a sign signal, generate a text sequence for an HU voice signal. The ASR text signal may be transmitted to an AU device along with or in parallel with the sign signal and may be presented simultaneously as the text and sign signals are generated. In this way, if an AU questions the meaning of a sign signal, the AU can refer to the ASR generated text to confirm meaning or, in many cases, review an actual transcript of the HU voice signal as opposed to a sometimes less accurate sign language representation.

In many cases an ASR will be able to generate text far faster than a CA will be able to generate a sign signal and therefore, in at least some cases, ASR engine text may be presented to an AU well before a CA generated sign signal. In some cases where an AU views, reads and understands text segments well prior to generation and presentation of a sign signal related thereto, the AU may opt to skip ahead and forego sign language for intervening HU voice signal.

Where an AU skips ahead in this fashion, the CA would be skipped ahead within the HU voice signal as well and continue signing from the skipped to point on.

In at least some cases it is contemplated that a relay or other system processor may be programmed to compare text signal and sign signal content (e.g., actual meaning ascribed to the signals) so that time stamps can be applied to text and sign segment pairings thus enabling an AU to skip back through communications to review a sign signal simultaneously with a paired text tag or other indicator. For instance, in at least some embodiments as HU voice is converted by a CA to sign segments, a processor may be programmed to assess the content (e.g., meaning) of each sign segment. Similarly, the processor may also be programmed to analyze the ASR generated text for content and to then compare the sign segment content to the text segment content to identify matching content. Where sign and text segment content match, the processor may assign a time stamp to the content matching segments and store the stamp and segment pair for subsequent access. Here, if an AU selects a text segment from her AU device display, instead of (or in addition to in some embodiments) presenting an associated HU voice segment, the AU device may represent the sign segment paired with the selected text.

Referring again to FIG. 33, the exemplary CA station includes, among other components, a video camera 55 for taking video of a signing CA to be delivered along with transcribed text to an AU. Referring also and again to FIG. 42, a CA signing video window is shown at 1390 alongside a text field that includes text corresponding to an HU voice signal. In FIG. 42, if an AU selects the phrase labelled 1386, that phrase would be visually highlighted or distinguished in some fashion and the associated or paired sign signal segment would be represented in window 1390.

In at least some video relay systems, in addition to presenting sign and text representations of an HU voice signal, an HU video signal may also be used to represent the HU during a call. In this regard, see again FIG. 42 where both an HU video window 1384 and a CA signing window 1390 are presented simultaneously. Here, all communication representations 1382, 1384 and 1390 may always be synchronized via time stamps in some cases while in other cases the representations may not be completely synchronized. For instance, in some cases the HU video window 1384 may always present a real time representation of the HU while text and sign signals are 1382 and 1390 are synchronized and typically delayed at least somewhat to compensate for time required to generate the sign signal as well as AU replay of prior sign signal segments.

In still other embodiments it is contemplated that a relay or other system processor may be programmed to analyze sign signal segments generated by a signing CA to automatically generate text segments that correspond thereto. Here the text is generated from the sign signal as opposed to directly from the voice signal and therefore would match the sign signal content more closely in at least some embodiments. Because the text is generated directly from the sign signal, time stamps applied to the sign signal can easily be aligned with the text signal and there would be no need for content analysis to align signals. Instead of using content to align, a sign signal segment would be identified and a time stamp applied thereto, then the sign signal segment would be translated to text and the resulting text would be stored in the system database correlated to the corresponding sign signal segment and the time stamp for subsequent access.

Figure 44:
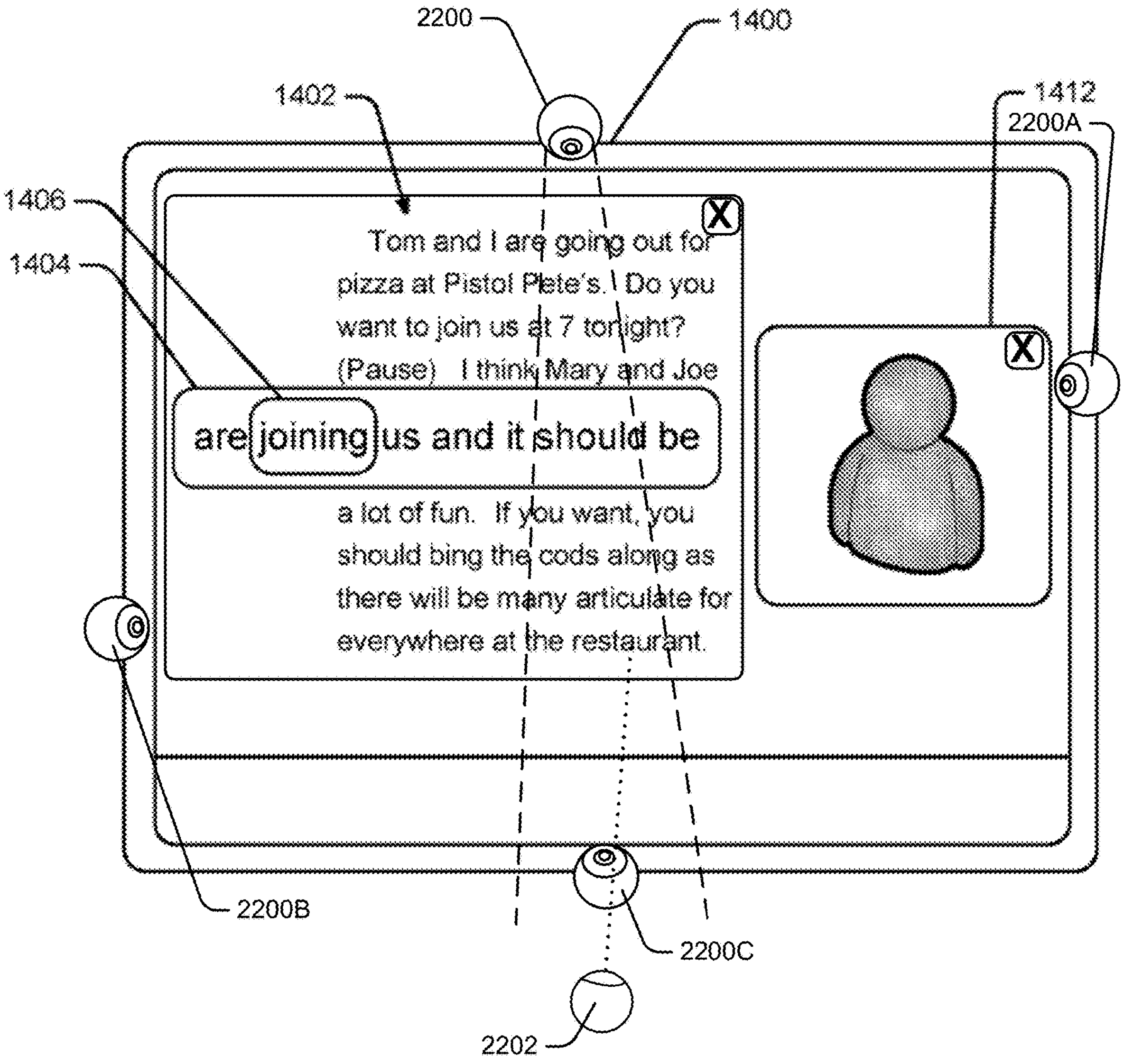
FIG. 44 is another AU interface screen shot including scrolling text and an HU video window.

FIG. 44 shows yet another exemplary AU screen shot 1400 where text segments are shown at 1402 and an HU video window is shown at 1412. The text 1402 includes a block of text where the block is presented in three visually distinguished ways. First, a currently audibly broadcast word is highlighted or visually distinguished in a first way as indicated at 1406. Second, the line of text that includes the word currently being broadcast is visually distinguished in a second way as shown at 1404. Other text lines are presented above and below the line 1404 to show preceding text and following text for context. In addition, the line at 1404 including the currently broadcast word at 1406 is presented in a larger format to call an AU's attention to that line of text and the word being broadcast. The larger text makes it easier for an AU to see the presented text. Moreover, the text block 1402 is controlled to scroll upward while keeping the text line that includes the currently broadcast word generally centrally vertically located on the AU device display so that the AU can simply train her eyes at the central portion of the display with the transcribed words scrolling through the field 1404. In this case, a properly trained AU would know that prior broadcast words can be rebroadcast by tapping a word above field 1404 and that the broadcast can be skipped ahead by tapping one of the words below field 1404. Video window 1412 is provided spatially close to field 1404 so that the text presented therein is intuitively associated with the HU video in window 1412.

Referring still to FIG. 44, in at least some embodiments a captioned device camera 2200A may be arranged along a side edge of the device display screen and an HU telepresence type filed 1412 may be positioned along that edge in a location selected to enhance the sense of eye contact when an AU looks toward the field 1412 at the presented HU video. In addition, the stationary text line 1404 may be presented on the display adjacent the telepresence field 1412 and at a vertical height that is similar to the height of the camera lens 2200A. In this way, regardless of whether or not the AU is looking at the HU representation in field 1412 or the text in field 1404, the HU will have a sense that the AU is generally looking in the direction of the HU and at least at times making eye contact with the HU.

In still other embodiments it is contemplated that an AU captioned device may include two or more differently located cameras (see 2200, 2200A, 2200B, 2200C in FIG. 44) and the AU may have the option to arrange content windows in any of several different ways. For instance, the AU may be able to remove telepresence field 1412 entirely from the screen, select and drag the telepresence field to different locations on the screen and change the size of the telepresence field. Where the user moves the telepresence field to a location adjacent a different one of the device cameras, the device processor may automatically select the proximate camera for generating AU images/video to send to the HU during a call so that the illusion of eye contact is maintained and optimized to the extent possible. Similarly, the AU may be able to drag the caption field around to different screen locations and change the field size, font, text size, etc., to meet user preferences. Where one of the fields is moved, other fields may automatically resize and move to accommodate new placement of the moved field.

In at least some embodiments where HU voice signal is broadcast essentially immediately or with minimal delay once received at the AU device, the highlighted line 1404 may always be the most recent line of text captioned either via a CA or an ASR, regardless of what caption words are currently being considered by a CA for error correction.

In at least some embodiments it is contemplated that when a CA replaces an ASR engine to generate text for some reason where the CA revoices an HU voice signal to the ASR engine to generate the text, instead of providing the voice signal re-voiced by the CA to an ASR engine at the relay, the CA revoicing signal may be routed to the ASR engine that was being used prior to convert the HU voice signal to text. Thus, for instance, where a system was transmitting an HU voice signal to a fourth party ASR engine provider when a CA takes over text generation via re-voicing, when the CA voices a word, the CA voice signal may be transmitted to the fourth party provider to generate transcribed text which is then transmitted back to the relay and on to the AU device for presentation.

In at least some cases it is contemplated that a system processor may treat at least some CA inputs into the system differently as a function of how well the ASR is likely performing. For instance, as described above, in at least some cases when a CA selects a word in a text transcript on her display screen for error correction, in normal operation, the selected word is highlighted for error correction. Here, however, in some cases what happens when a CA selects a text transcript word may be tied to the level of perceived or likely errors in the phrase that includes the selected word. Where a processor determines that the number of likely errors in the phrase is small, the system may operate in the normal fashion so that only the selected word or sub-phrase (e.g., after word selection and a swiping action) is highlighted and prepared for replacement or correction and where the processor determines that the number of likely errors in the phrase is large (e.g., the phrase is predictably error full), the system may operate to highlight the entire error prone phrase for error correction so that the CA does not have to perform other gestures to select the entire phrase. Here, when an entire phrase is visually distinguished to indicate ability to correct, the CA microphone may be automatically unmuted so the CA can revoice the HU voice signal to rapidly generate corrected text.

In other cases, while a simple CA word selection may cause that word to be highlighted, some other more complex gesture after word selection may cause the phrase including the word to be highlighted for editing. For instance, a second tap on a word that immediately follows the word selection may cause a processor to highlight an entire word containing phrase for editing. Other gestures for phrase, sentence, paragraph, etc., selection are contemplated.

In at least some embodiments it is contemplated that a system processor may be programmed to adjust various CA station operating parameters as a function of a CA's stored profile as well as real time scoring of CA captioning. For instance, CA scoring may lead to a CA profile that indicates a preferred or optimal rate of HU voice signal broadcast (e.g., in words per minute) for a specific CA. Here, the system may automatically use the optimal broadcast rate for the specific CA. As another instance, a processor may monitor the rate of CA captioning, CA correcting and CA error rates and may adjust the rate of HU voice signal broadcast that results in optimal time and error rate statistics. Here, the rate may be increased during a beginning portion of a CA's captioning shift until optimal statistics result. Here, if statistics fall off at any time, the system may slow the HU voice signal broadcast rate to maintain errors within an acceptable range.

In some cases a CA profile may specify separate optimal system settings for each of several different HU voice signal types or signal characteristics subsets. For instance, for a first CA, a first HU voice signal broadcast rate may be used for a Hispanic HU voice signal while a second relatively slower HU voice signal broadcast rate may be used for a Caucasian HU voice signal. Many other HU voice signal characteristic subsets and associated optimal station operating characteristics are contemplated.

ASR-CA Backed Up Mode

While several different types of semi-automated systems have been described above, one particularly advantageous system includes an automatic speech recognition system that at least initially handles incoming HU voice signal captioning where the ASR generated text is corrected by a CA and where the CA has the ability to manually (e.g., via selectin of button or the like) take over captioning whenever deemed necessary. Hereinafter, unless indicated otherwise, this type of ASR text first and CA correction second system will be referred to as an ASR-CA backed up mode.

Advantages of an ASR-CA backed up mode include the following. First, initial caption delay is minimized and remains relatively consistent so that captions can be presented to an AU as quickly as possible. To this end, ASR engines generate initial captions relatively quickly when compared to CA generated text in most cases in steady state.

Second, caption errors associated with current ASR engines can be essentially eliminated by a CA that only corrects ASR errors in most cases and final corrected text can be presented to an AU rapidly.

Third, by combining rapid ASR text with the error correction skills of a CA, it is possible to mix those capabilities in different ways to provide optimal captioning speed and accuracy regardless of characteristics of different calls that are fielded by the captioning system.

Fourth, the combination of rapid ASR text and CA error correction enables a system where an AU can customize their captioning system in many different ways to suit their own needs and system expectations to enhance their communication capabilities.

While various aspects of an ASR-CA backed up mode have been described above, some of those aspects are described in greater detail and additional aspects are described hereafter.

While an ASR engine is typically much faster at generating initial caption text than a CA, in at least some specific cases a CA may in fact be faster than an ASR engine. Whether or not CA captioning is likely to be faster than ASR captioning is often a function of several factors including, for instance, a CA's particular captioning strengths and weaknesses as well as characteristics of an HU voice signal that is to be captioned. For instance, a specific first CA may typically rapidly caption Hispanic voice signals but may only caption Midwestern voice signals relatively slowly so that when captioning a Hispanic signal the CA speed can exceed the ASR speed while the CA typically cannot exceed the ASR speed when captioning a Midwestern voice signal. As another instance, while an ASR may caption high quality HU voice signal faster than the first CA, the first CA may caption low quality HU voice signal faster than the ASR.

As described above, in some cases the system may present an option (see caption source switch button 751 in FIG. 23A) for a CA to change from the ASR generating original text and the CA correcting that text to a system where the CA generates original text and corrects errors and in other cases a system processor may automatically change the system over to CA original and corrected text when the ASR is too slow, is generating too many meaningful (e.g. "visible", changing the meaning of a phrase) transcription errors, or any combination of both. In still other cases a system processor that determines that a specific CA, based on CA strengths and HU voice signal characteristics, would likely be able to generate initial text faster than the ASR, may be programmed to offer a suggestion to the CA to switch over.

Thus, in some cases the caption source switch button 751 in FIG. 23A may only be presented to a CA as an option when a system processor determines that the specific CA should be able to generate faster initial captions for an HU voice signal. In an alternative, button 751 may always be presented to a CA but may have two different appearances including the full button for selection and a greyed out appearance to indicate that the button is not selectable. Here, by presenting the greyed out button when not selectable a user will not be confused when that button is absent.

In some cases it may be that it has to be likely a CA can speed up transcription appreciably prior to presenting button 751 so that small possible increases in speed do not cause a suggestion to be presented to the CA which could simply distract the CA from error correction. For instance, in an exemplary case, a processor may have to calculate that it is likely a specific CA can speed up transcription by 15% or more in order to present button 751 to the CA for selection.

In some cases the system processor may take into account more than initial captioning speed when determining when to present caption source switch button 751 to a CA. For instance, in some cases the processor may account for some combination of speed and some factor related to the number of transcription errors generated by an ASR to determine when to present button 751. Here, how speed and accuracy factors are weighed to determine when button 751 should be presented to a user may be a matter of designer choice and should be set to create a best possible AU experience.

In at least some cases it is contemplated that when the system automatically switches to full CA captioning and correction or the CA selects button 751 to switch to full CA captioning and correction, the ASR may still operate in parallel with the CA to generate a second initial version (e.g., a second to the CA generated captions) of the HU voice signal and the system may transmit whichever captions are generated first (e.g., ASR or CA) to the AU device for presentation. Here, it has been recognized that even when a CA takes over full captioning and correction, which captioning is fastest, ASR or CA, may switch back and forth and, in that case, the fastest captions should always be provided to the AU.

As recognized above, in at least some cases third party (e.g., a server in the cloud) ASR engines have at least a couple of shortcomings. First, third party ASR engine accuracy tends to decrease at the end of relatively long voice signal segments to be transcribed.

Second, ASR engines use context to generate final transcription results and therefore are less accurate when input voice segments are short. To this end, initial ASR results for a word in a voice signal are typically based on phonetics and then, once initial results for several consecutive words in a signal are available, the ASR engine uses the context of the words together as well as additional characteristics of the voice of the speaker generating the voice signal to identify a best final transcription result for each word. Where a voice segment in an ASR request is short, the signal includes less context in the segment for accurately identifying a final result and therefore the results tend to be less accurate.

Third, final results tend to be generated in clumps which means that automated ASR error corrections presented to a CA or an AU tend to be presented I spurts which can be distracting. For instance, if five consecutive words are changed in text presented on an AU's device display at the same time, the changes can be distracting.

As described above, one solution to the third party ASR shortcomings is to divide an HU voice signal into signal slices that overlap to avoid inaccuracies related to long duration signal segments. In addition, to make sure that all final transcription results are contextually informed, each segment slice should be at least some minimum segment length to ensure sufficient context. Ideally, segment slices sent to the ASR engine as transcription requests would include a predefined number of words within a range (e.g., 3 to 15 words) where the range is selected to ensure at least some level of context to inform the final result. Unfortunately, an HU voice signal is not transcribed prior to sending it to the ASR engine and therefore there is no way to ascertain the number of words in a voice segment prior to receiving transcription results back from the ASR.

For this reason segment slices have to be time based as opposed to word count based where the time range of each segment is selected so that it is likely the segment includes an optimal number (e.g., 3 to 15 words) of words spoken by an HU. In at least some cases the time range will be between 1 and 10 seconds and, in particularly advantageous cases, the range is between 1 and 3 seconds.

Once initial and/or final transcription results are received back at a relay for one or more HU voice signal segments, a relay processor may count the number of words in the transcription and automatically adjust the duration of each HU voice signal segment up or down to adapt to the HU's rate of speech so that each subsequent segment slice has the greatest chance of including an optimal number of words. Thus, for instance, where an HU talks extremely quickly, an initial segment slice duration of four seconds may be shortened to a two second duration.

In at least some cases a relay may only use central portions of ASR transcribed HU voice signal slices for final transcription results to ensure that all final transcribed words are contextually informed. Thus, for instance, where a typical voice signal slice includes 12 words, the relay processor may only use the third through ninth words in an associated transcription to correct the initial transcription so that all of the words used in the final results are context informed.

As indicated above, consecutive HU voice segment slices sent to ASR engines may be overlapped to ensure no word is missed. Overlapping segments also has the advantage that more context can be presented for each final transcription word. At the extreme the relay may transmit a separate ASR transcription request for each sub-period that is likely to be associated with a word (e.g., based on HU speaking rate or average HU speaking rate) and only one or a small number of transcribed words in a returned text segment may be used as the final transcription result. For instance, where overlapping segments each return an average of seven final transcribed words, the relay may only use the middle three of those words to correct initial text presented to the CA and the AU.

Where ASR transcription requests include overlapping HU voice signal segments, consecutive requests will return duplicative transcriptions of the same words. In at least some cases the relay processor receiving overlapping text transcriptions will identify duplicative word transcriptions and eliminate duplication in initial text presented to the CA and the AU as well as in final results.

In at least some cases it is contemplated that overlapping ASR requests may correspond to different length HU voice signal segments where some of the segment lengths are chosen to ensure rapid (e.g., essentially immediate) captions and rapid intermediate correction results while other lengths are chosen to optimize for context informed accuracy in final results. To this end, a first set of ASR requests may include short HU voice signal slices to expedite captioning and intermediate correction speed albeit while sacrificing some accuracy, and a second set of ASR requests may be relatively longer so that context informed final text is optimally identified.

Figure 46:
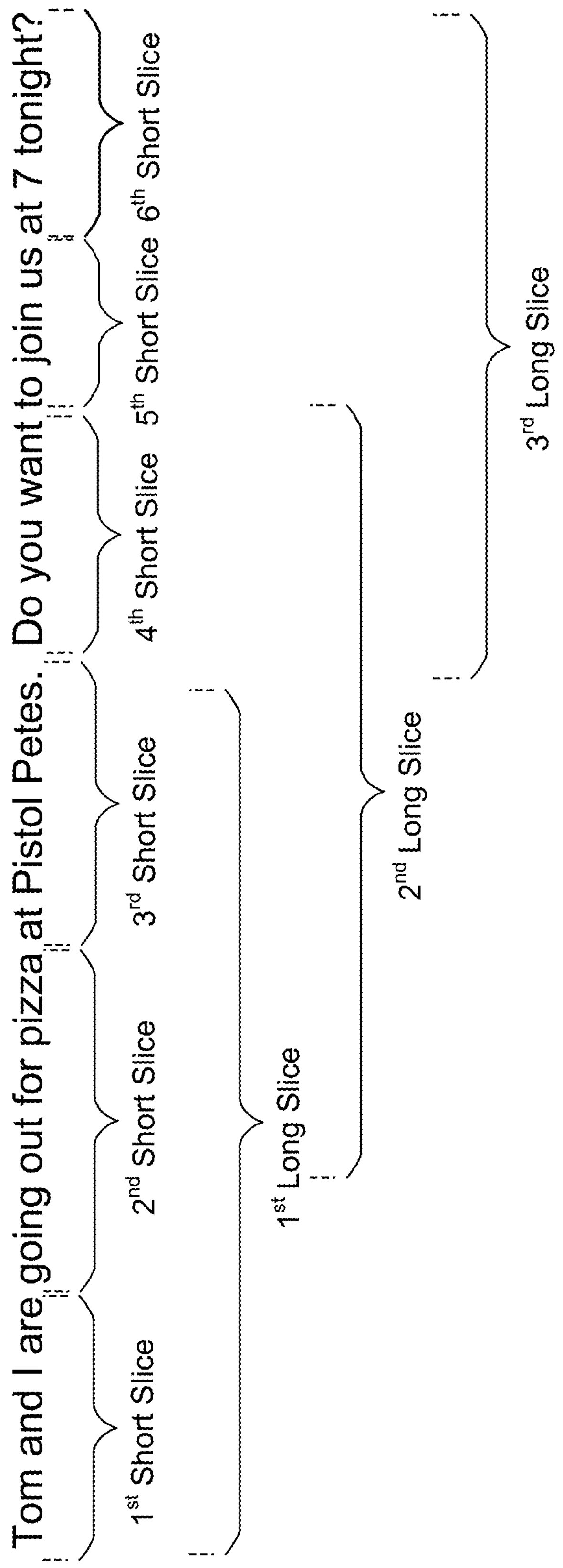
FIG. 46 is a schematic illustrating different phrase slices that may be formed that is consistent with at least some aspects of the present disclosure.

Referring to FIG. 46, a schematic is shown that includes a single HU voice signal line of text where the text is divided into signal segments or slices including first through sixth short slices and first, second and third long slices. The first long slice includes voice signal associated with the first through third short slices. The first long slice includes many words usable for immediate initial transcription as well as for final contextual transcription correction. Each long slice word is transmitted to an ASR engine essentially immediately as the HU voices the segment (e.g., a link to the ASR is opened at the beginning of the long slice and remains open as the HU voices the slice). Initial transcription of each word in the first long slice is almost immediate and is fed immediately to the CA for manual correction and to the AU as an initial text transcription irrespective of transcription errors that may exist. As more first slice words are voiced and transmitted to the ASR engine, those words are immediately transcribed and presented to the CA and AU and are also used to provide context for previously transcribed words in the first long slice so that errors in the prior words can be corrected.

Referring still to FIG. 46, the second long slice overlaps the first long slice and includes a plurality of words that correspond to a second slice duration. To handle the second long slice transcription, a second ASR request is transmitted to an ASR engine as the HU voices each word in the second slice and substantially real time or immediate text is transmitted back from the engine for each received word. In addition, as the second slice words are transcribed, those words are also used by the ASR engine to contextually correct prior transcribed words in the second slice to eliminate any perceived errors and those corrections are used to correct text presented to the CA and the AU.

The third long slice overlaps the second long slice and includes a plurality of words that correspond to a third slice duration. To handle the third long slice transcription, a third ASR request is transmitted to an ASR engine as the HU voices each word in the third slice and substantially real time or immediate text is transmitted back from the engine for each received word. In addition, as the third slice words are transcribed, those words are also used by the ASR engine to contextually correct prior transcribed words in the third slice to eliminate any perceived errors and those corrections are used to correct text presented to the CA and the AU.

It should be apparent from FIG. 46 because long slices overlap, two (and in some cases more) transcriptions for many HU voice signal words will be received by a relay from one or more ASR engines and therefore a relay processor has to be programmed to select which of the two or more initial transcriptions for a word to present to a CA and an AU and which of two or more final transcriptions for the word to use to correct text already presented to the CA and AU. In at least some embodiments the relay processor may be programmed to select the first long slice in an HU voice signal for generating initial transcription text for all first long slice words, the second long slice in the voice signal for generating initial transcription text for all second long slice words that follow the end time of the first long slice and the third long slice in the voice signal for generating initial transcription text for all third long slice words that follow the end time of the second long slice.

In an alternative system, the relay processor may be programmed to select the first long slice in an HU voice signal for generating initial transcription text for all first long slice words prior to the start time of the second long slice, the second long slice in the voice signal for generating initial transcription text for all second long slice words prior to the start time of the third long slice and the third long slice in the voice signal for generating initial transcription text for all third long slice words.

In yet one other alternative system, for words that are included in overlapping signal slices, the relay processor may pass on the first transcription of any word that is received by any ASR engine to the CA and AU devices to be presented irrespective of which slice included the word. Here, a second or other subsequent initial transcription of an already presented word may be completely ignored or may be used to correct the already presented word in some cases.

Referring again to FIG. 46, regarding final ASR text results for error correction, the first long slice transcription includes more contextual content than the second long slice for about the first two thirds of the first slice voice signal, the second long slice transcription includes more contextual content than the first and third long slices for about the central half of the second slice voice signal and so on. Thus, to provide most accurate ASR transcription error correction, the relay processor may be programmed to use final ASR text from sub-portions of each long signal slice for error correction including final ASR text from the about the first two thirds of the first long slice, about the central half of the second long slice and about the last two thirds of the third long slice. Here, because the slices are time based as opposed to word based, the exact sub-portion of each overlapping slice used for final text results can only be approximate until the text results are received back from the ASR engines.

Thus, it should be appreciated that different overlapping voice segments or slices may be used to generate initial and final transcriptions of words in at least some embodiments where the segments are selected to optimize for different purposes (e.g., speed or contextual accuracy).

Referring still to FIG. 46, while shown as consecutive and distinct, consecutive short slices may overlap at least somewhat as described above. Each short slice has a relatively short duration (e.g., 1-3 seconds) and is transmitted to an ASR engine as the HU voices the segment (e.g., a link to the ASR is opened at the beginning of the slice and remains open as the HU voices the slice). Here, initial transcription of each word in a short segment is almost immediate and could in some cases be used to provide the initial transcription of words to a CA and an AU in at least some embodiments. The advantage of shorter voice signal slices in ASR transcription requests is that the ASR should be able to generate more rapid final text transcriptions for words in the shorter segments so that error corrections in text presented to the CA and the AU are completed more rapidly. Thus, for instance, while an ASR may not finalize correction of text at the beginning of the first long slice in FIG. 46 until just after that slice ends so that all of the contextual information in that slice is considered, a different ASR handling the first short slice would complete its contextual error correction just after the end time of the first short slice. Here because short slice final text is generated relatively rapidly and only affects a small text segment, it can be used to reduce the amount of sporadic large magnitude error corrections that can be distracting to a CA or and AU. In other words, short slice final text error correction is more regular and generally of smaller magnitude than long slice final text error correction.

As explained above, one problem with short voice signal slices is that there is not enough content (e.g., additional surrounding words) in a short slice to result in highly accurate final text. Nevertheless, even short slice context results in better accuracy than initial transcription in most cases and can operate as an intermediate text correction agent to be followed up by long slice final text error correction. To this end, referring yet again to FIG. 46, in at least some embodiments the long text segments may be used to generate initial transcribed text presented to a CA and an AU. Intermediate error corrections in the initial text may be generated via contextual processing of the short signal segments and used immediately as an intermediate error correction for the initial text presented to the CA and AU. Final error correction in the intermediately corrected text may be generated via contextual processing of the long signal segments and used to finally error correct the intermediately corrected text for both the CA and the AU.

While initial, intermediate and final ASR text may be presented to each of the CA and an AU in some cases, in other embodiments the intermediate text may only be presented to one or the other of the CA and the AU. For instance, where initial text results may be displayed for each of the CA and the AU, intermediate results related to contextual processing of short voice signal slices may be used to in line correct errors in the CA presented text only to minimize distractions on the AU's display screen.

While the signal slicing and initial and final text selection processes have been described above as being performed by a relay processor, in other embodiments where an AU device or even an HU device links to an ASR engine to provide an HU voice signal thereto and receive text therefrom, the AU or HU device would be programmed to slice the voice signal for transmission in a similar fashion and to select initial and final and in some cases intermediate text to be presented to system users in a fashion similar to that described above.

While ASR engines operate well under certain circumstances, they are simply less effective than pure CA transcription systems under other sets of circumstances. For instance, it has been observed that during a first short time just after an AU-HU call commences and a second short time at the end of the call when accurate content is particularly time sensitive as well as often unclear and rushed, full CA modes have a clear advantage over ASR-CA backed up modes. For this reason, in at least some embodiments it is contemplated that one type of system may initially link the HU portion of a call to a full CA mode where a CA transcribes text and corrects that text for at least the beginning portion of the call after which the call is converted to an ASR-CA backed up call where an ASR engine generates initial text and ASR corrections with a CA further correcting the initial and final ASR text. For instance, in some cases the HU voice signal during the first 10-15 seconds of an AU-HU call may be handled by the full CA mode and thereafter the ASR-CA backed up mode may kick in once the ASR has context for subsequent words and phrases to increase overall ASR accuracy.

In some cases only a small subset of highly trained CAs may handle the full CA mode duties and when the ASR-CA backed up mode kicks in, the call may be transferred to a second CA that operates as a correction only CA most of the time. In other cases a single CA may operate in the full CA mode as well as in the ASR-CA backed up mode to maintain captioning service flow.

It has been recognized that for many AUs that have at least partial hearing capabilities, in most cases during an AU-HU call by far the most important caption text is the text associated with the most recently generated HU voice signal. To this end, in many cases an AU that has at least partial hearing relies on her hearing as opposed to caption text to understand HU communications. Then, when an AU periodically misunderstands an HU voiced word or phrase, the AU will turn to displayed captions to clarify the HU communication. Here, most AUs want immediate correct text in real time as opposed to three or six or more seconds later after a CA corrects the text so that the corrections are as simultaneous with a real time HU voice signal broadcast as possible. To be clear, in these cases, correct text corresponding to the most recent 7 or less seconds of HU voice signal is far more important most of the time than correct text associated with HU voice signal from 20 seconds ago.

In these cases and others where accurate substantially real time text is particularly important, a captioning system processor may be programmed to enforce a maximum cumulative duration of HU voice signal broadcast pause seconds to ensure that all CA correction efforts are at least somewhat aligned with the HU's real time voice signal. For instance, in some cases the maximum cumulative pause signal may be limited to seven seconds or five seconds or f even three seconds to ensure that essentially real time corrections to AU captions occur. In other cases the maximum cumulative delay may be limited by a maximum number of ASR text words so that, for instance, a CA cannot get more than 3 or 5 or 7 words behind the initially generated ASR text.

Figure 52:
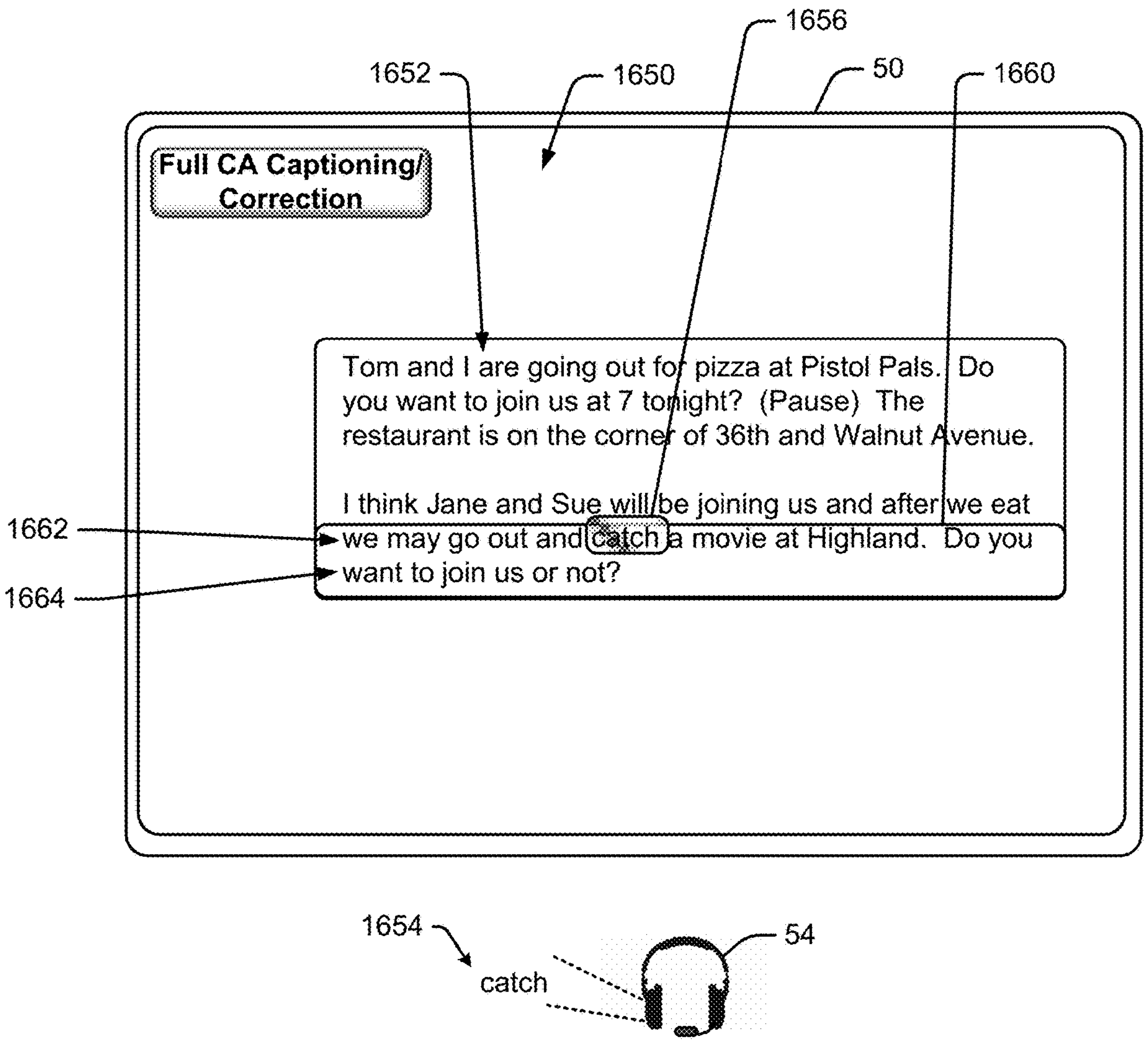
FIG. 52 is a screen shot illustrating a CA interface where a CA is restricted to editing text within a small field of recent text to ensure that the CA keeps up with current HU voice utterances within some window of time.
Figure 53:
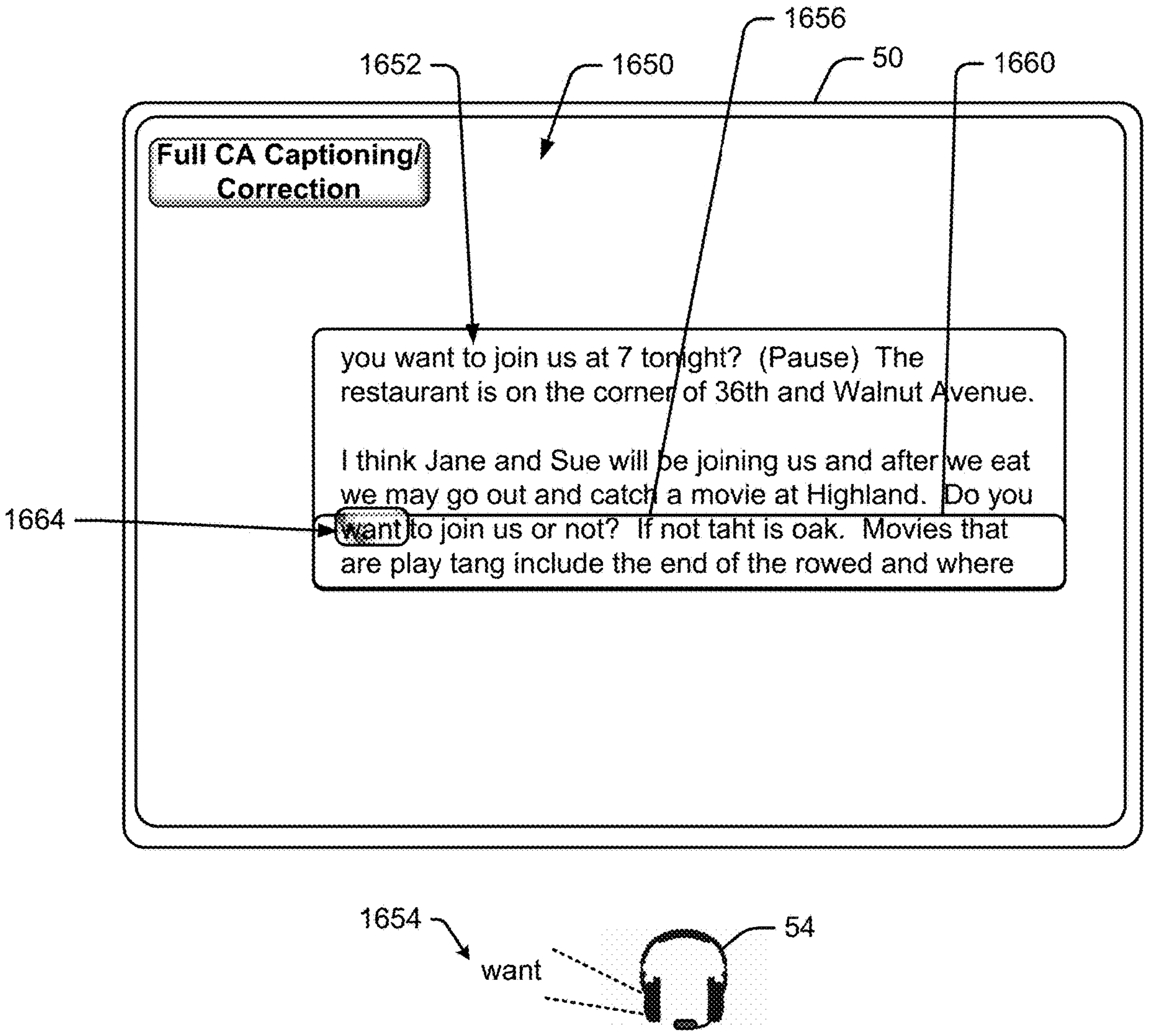
FIG. 53 is similar to FIG. 52, albeit showing the interface at a different point in time.

Referring now to FIG. 52, an exemplary CA display screen shot 1650 is illustrated that presents ASR text to a CA as the CA listens to a hearing user's voice signal via headset 54 as indicated at 1654. In this case, the CA is restricted to editing only text that appears in the most recent two lines 1662 and 1664 of the presented text which is visually distinguished by an offsetting box labelled 1656. Box 1660 stays stationary as additional ASR generated text is generated and added to the bottom of the text block 1652 and the on screen text scrolls upward. Again, as in several other figures described above, a system processor highlights or otherwise visually distinguishes the text word that corresponds to the instantaneously broadcast HU voice signal word as shown at 1660. Here, however, when the text 1652 scrolls up one line, if the word being broadcast is in the top line 1662 in box 1660 when scrolling occurs, the broadcast to the CA skips to the first word in the next line 1664 when a new line of text is added there below. To this end see FIG. 53 where one line of scrolling occurred while the system was still broadcasting a word in line 1662 in FIG. 52 so that the highlighted and broadcast word is skipped ahead to the word "want" at the beginning of line 1664.

In some cases a limitation on CA corrections may be based on the maximum amount of text that can be presented on the CA display screen. For instance, in a case where only approximately 100 ASR generated words can appear on an AU's display screen, it would make little sense to allow a CA to correct errors in ASR text prior to the most recent 100 words because it is highly likely that earlier corrections would not be visible by the AU. Thus, for instance, in some cases a cumulative maximum seconds delay may be set to 20 seconds where text associated with times prior to the 20 second threshold simply cannot be corrected by the CA. In other cases the cumulative maximum delay may be word count based (e.g., the maximum delay may be no more than 30 ASR generated words). In other cases the maximum delay may vary with other sensed parameters such as line signal quality, the HU's speaking rate (e.g., words per minute actual or average), a CA's current or average captioning statistics, etc.

A CA's ability to correct text errors may be limited in several different ways. For instance, relatively aged text that a CA can no longer correct may be visually distinguished (e.g., highlighted, scrolled up into a "firm" field, etc.) in a fashion different from text that the CA can still correct. As another instance, text that cannot be corrected may simply be scrolled off or otherwise removed from the CA display screen.

Where a CA is limited to a maximum number of cumulative delay seconds, the cumulative delay count may be reduced by any perceived HU silent periods that occur between a current time and a time that precedes the current time by the instantaneous delay count. Thus, for instance, if a current delay second count is 18 seconds, if the most recent 18 seconds includes a 12 second HU silent period (e.g., during an AU talking turn), then the cumulative delay may be adjusted downward to 6 seconds as the system will be able to remove the 12 second silent period from CA consideration so that the CA can catch up more rapidly.

In at least some cases it has been recognized that signal noise can appear on a communication link where the noise has a volume and perhaps other detected characteristics but that cannot be identified by an ASR engine as articulated words. Most of the time in these cases the noise is just that, simply noise. In some cases where line signal can clearly be identified as noise, a period associated with the noise may be automatically eliminated from the HU voice signal broadcast to a CA for consideration so that those noisy periods do not slow down CA captioning of actual HU voice signal words. In other cases where an ASR cannot identify words in a received line signal but cannot rule out the line signal as noise, a relay processor may broadcast that signal to a CA at a high rate (e.g., 2 to 4 times the rate of HU speech) so that the possible noisy period is compressed. In most cases where the line signal is actually noise, the CA can simply listen to the expedited signal, recognize the signal as noise, and ignore the signal. In other cases the CA can transcribe any perceived words or may slow down the signal to a normal HU speech rate to better comprehend any spoken words. Here, once the ASR recognizes a word in the HU voice signal and generates a captioned word again, the pace of HU voice signal broadcast can be slowed to the HU's speech rate.

Figure 47:
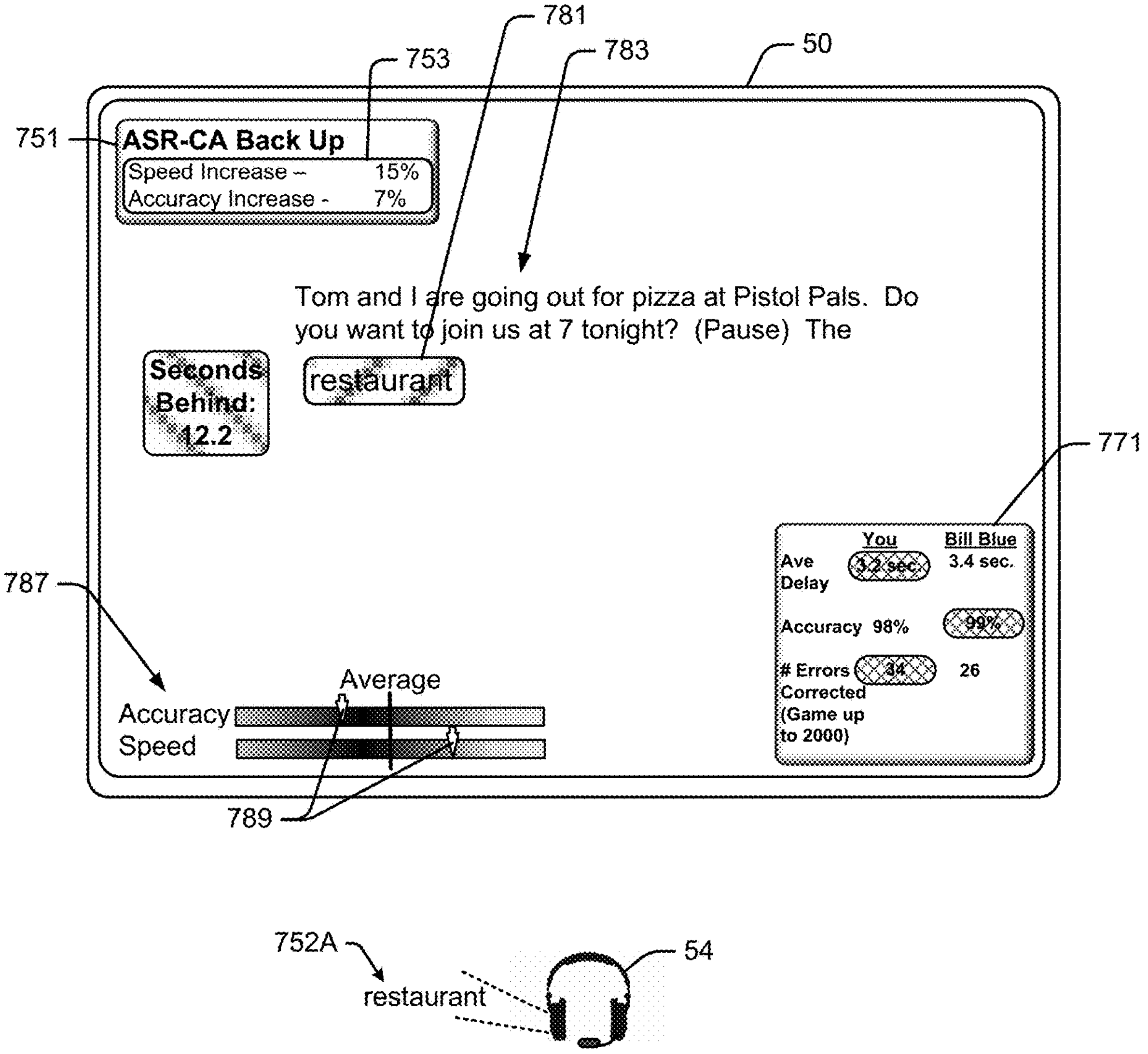
FIG. 47 is a screen shot illustrating an interface presented to a CA that includes various transcription feedback tools that are consistent with various aspects of the present disclosure.

In cases where a CA switches from an ASR-CA backed up mode to a full CA mode, in at least some embodiments, the non-firm ASR generated text is erased from the CA's display screen to avoid CA confusion. Thus, for instance, referring again to FIG. 23A, if a CA selects the full CA captioning/correction button 751 to initiate a pure CA text transcription and correction process, the CA display screen shot may be switched to the shot illustrated in FIG. 47. As shown in FIG. 47, firm ASR text prior to the current word considered by the CA at 781 or corrected by the CA persists at 783 but ASR generated text thereafter is wiped from the display screen. The label on the caption source switch button 751 is changed to now present the CA the option to switch back to the ASR-CA backed up type system if desired. The seconds behind field is still present to give the CA a sense of how well she is keeping up with the HU voice signal.

When a CA changes from the ASR-CR backed up mode to a full CA mode, in some embodiments there will be no change in what the AU sees on her display screen and no way to discern that the change took place so that there is no issue with visually disrupting the AU during the switchover. In other embodiments there may be some type of clean break so that the AU has a clear understanding that the captioning process has changed. For instance, see FIG. 48 where, after a CA has selected the full CA mode option, a carriage return occurs after the most recently generated ASR generated text 1500 and a line 1502 is presented to delineate initial ASR and CA generated text. After line 1502, CA generated text is presented to the AU as indicated at 1504. Here, all ASR text previously presented to the AU persists regardless of whether or not the text is firm or not and any initial CA generated text that is inconsistent with ASR generated text is used to correct the ASR generated text via inline correction so that the ASR generated text that is not firm is not completely wiped from the AU's device display screen.

Thus, for instance, in one exemplary system, when a CA takes over initial captioning from an ASR, while ASR generated text that follows the point in an HU voice broadcast most recently listened to or captioned by a CA is removed from the CA's display screen to avoid CA confusion, that same ASR generated text remains on the AU's display screen so that the AU does not recognize that the switch over to CA captioning occurred from the text presented. Then, as the CA re-voices HU voice signal to generate text or otherwise enters data to generate text for the HU voice signal, any discrepancies between the ASR generated text on the AU display screen and the CA generated text are used to perform in line corrections to the text on the AU display. Thus, to the CA, the initial CA generated text is seen as new text while the AU sees the initial text, up to the end of the prior ASR generated text as in line error corrections.

When a CA initiates a switch from a full CA mode to an ASR-CA backed up mode, the CA display screen shot may switch from a shot akin to the FIG. 47 shot back to the FIG. 23A shot where the button 751 caption is again switched back to "Full CA Captioning/Correction", the firm text and seconds behind indicator persist at 748A and 755 and where ASR generated non-firm text is immediately presented at 769 subsequent to the word 750A currently broadcast 752A to the CA for consideration and correction.

When a CA initiates a switch from a full CA mode to an ASR-CA backed up mode, again, in some embodiments there may be no change in what the AU sees on her display screen and no way to discern that the switch to the ASR-CA backed up mode took place so that the AU's visual experience of the captioned text is not visually disrupted. In other embodiments the AU display screen shot may switch from a shot akin to the FIG. 48 shot to a screen shot akin to the shot shown in FIG. 49 where a carriage return occurs after the most recently generated ASR generated text 1520 and a line 1522 is presented to delineate initial CA generated and corrected text from following ASR generated and CA corrected text. After line 1522, CA generated and corrected text is presented to the AU as indicated at 1524. Here, all CA generated text previously presented to the AU persists.

While the CA and AU display screen shots upon caption source switching are described above in the context of CA initiated caption source switching, it should be appreciated that similar types of switching notifications may be presented when an AU initiates the switching action. To this end, see, for instance, that in some cases when the system is operating as a full CA captioning system as in FIG. 48, an "ASR-CA Back Up" button 771 is presented that can be selected to switch back to an ASR-CA backed up mode operation in which case a screen shot similar to the FIG. 49 shot may be presented to the AU where line 1522 delineates the breakpoint between the CA generated initial text above and the ASR generated initial text that follows.

Figure 48:
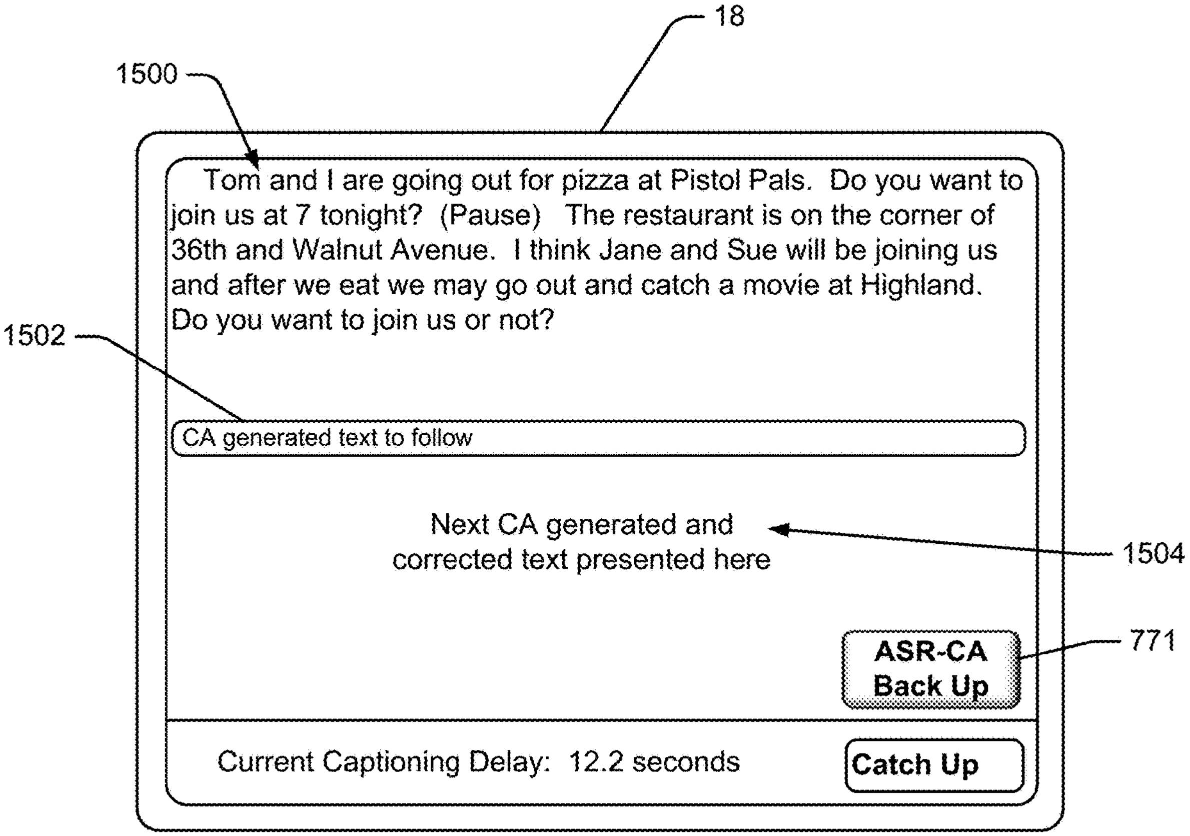
FIG. 48 is a screen shot illustrating an interface presented to an AU that indicates a transition from automated text to CA generated text that is consistent with at least some aspects of the present disclosure.
Figure 49:
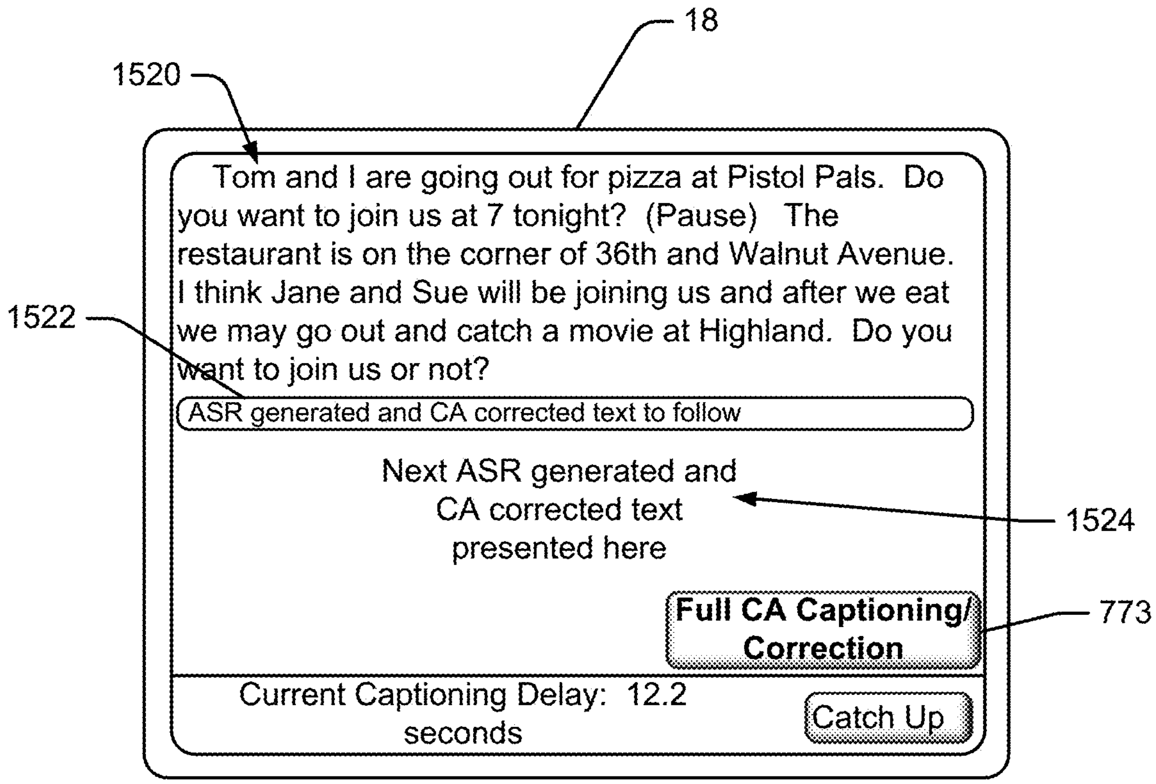
FIG. 49 is similar to FIG. 48, albeit illustrating an interface that indicates a transition from automated text to CA corrected text that is consistent with at least some aspects of the present disclosure.

As another instance, see that in some cases when the system is operating as an ASR-CA backed up mode as in FIG. 49, a "Full CA Captioning/Correction" button 773 is presented that can be selected to switch back to full CA captioning and correction system operation in which case a screen shot similar to the FIG. 48 shot may be presented to the AU where line 1502 delineates the breakpoint between the ASR generated initial text above and the CA generated initial text that follows.

In at least some embodiments as the system operates in the ASR-CA backed up mode of operation, as text is presented to a CA to consider the text for correction, the CA may be limited to only correcting errors that occur prior to a current point in the HU voice signal broadcast to the CA. Thus, for instance, referring again to FIG. 23A where a currently broadcast HU voice signal word is "restaurant", CA corrections may be limited to text prior to the word restaurant at 748A so that the CA cannot change any of the words at 769 until after they are broadcast to the CA.

In at least some embodiments when the system is in the ASR-CA backed up mode, a CA mute feature is enabled whenever the CA has not initiated a correction action and automatically disengages when the CA initiates correction. For instance, referring again to FIG. 50, assume a CA is reviewing the ASR generated text to identify text errors as she is listening to the HU voice signal broadcast. Here, if the CA selects the words "Pistol Pals" via touch as indicated at 1560, the selected text is visually distinguished, the HU voice signal broadcast to the CA halts at the word "restaurant", CA keyboard becomes active for entering correction text and the muted CA microphone is activated so that the CA has the option to enter corrective text either via the keyboard or via the microphone. In addition, the HU's voice segment including at least the annunciation related to the selected words "Pistol Pals" is immediately rebroadcast to the CA for consideration while viewing the words "Pistol Pals". Once the CA corrections are completed, the CA microphone is again disabled and the HU voice signal broadcast skips back to the word "restaurant" where the signal broadcast recommences. In some cases selection of the phrase "Pistol Pals" may also open a drop down window with other probable options for that phrase generated by the ASR engine or some other processor function where the CA can quickly select one of those other options if desired.

In some embodiments when a CA starts to correct a word or phrase in an ASR text transcript, once the CA selects the word or phrase for correction, a signal may be sent immediately to an AU device causing the word or phrase to be highlighted or otherwise visually distinguished so that the AU is aware that it is highly likely that the word or phrase is going to be changed shortly. In this way, an AU can recognize that a word or phrase in an ASR text transcription is likely wrong and if she was relying on the text representation to understand what the HU said, she can simply continue to view the highlighted word or phrase until it is modified by the CA or otherwise cleared as accurate.

Under at least some circumstances an ASR engine may lag an HU voice signal by a relatively long and unacceptable duration. In at least some embodiments it is contemplated that when a relay operates in an ASR-CA backed up mode (e.g., where the ASR generates initial text for correction by a CA), a system processor may track ASR text transcription lag time and, under at least certain circumstances, may automatically switch from the ASR backed up mode to a full CA captioning and correction mode either for the remainder of a call or for at least some portion of the call. For instance, when an ASR lag time exceeds some threshold duration (e.g., 1-15 seconds), the processor may automatically switch to the full CA mode for a predetermined duration (e.g., 15 seconds) so that a CA can work to eliminate or at least substantially reduce the lag time after which the system may again automatically revert back to the ASR-CA backed up mode. As another instance, once the system switches to the full CA mode, the system may remain in the full CA mode while the ASR continues to generate ASR engine text in parallel and a system processor may continue to track the ASR lag time and when the lag time drops below the threshold value either for a short duration or for some longer threshold duration of time (e.g., 5 consecutive seconds), the system may again revert back to the ASR-CA backed up operating mode. In still other cases where a system processor determines that some other communication characteristic (e.g., line quality, noise level, etc.) or HU voice signal characteristic (e.g., WPM, slurring of words, etc.) is a likely cause of the poor ASR performance, the system may switch to full CA mode and maintain that mode until the perceived communication or voice signal characteristic is no longer detected.

In at least some cases where a third party provides ASR engine services, ASR delay can be identified whenever an HU voice signal is sent to the engine and no text is received back for at least some inordinate threshold of time.

In at least some cases the ASR text transcript lag time that triggers a switch to a full CA operating mode may be a function of specific skills or capabilities of a specific CA that would take over full captioning and corrections if a switch over occurs. Here, for instance, given a persistent ASR delay of a specific magnitude, a first CA may be able to be substantially faster while a second could not so that a switch over to the second CA would only be justifiable if the persistent ASR delay was much longer. Here it is contemplated that CA profiles will include speed and accuracy metrics for associated CAs which can be used by the system to assess when to change over to the full CA system and when not to change over depending on the CA identity and related metrics.

In at least some embodiments it is contemplated that a relay processor may be programmed to coach a CA on various aspects of her relay workstation and how to handle calls generally and even specific calls while the calls are progressing. For instance, in at least some cases where a CA determines when to switch from an ASR-CA backed operating mode to a full CA mode, a system processor may track one or more metrics during the ASR-CA backed operating mode and compare that metric to metrics for the CA in the CA profile to determine when a full CA mode would be better than the ASR-CA backed mode by at least some threshold value (e.g., 10% faster, 5% more accurate, etc.). Here, instead of automatically switching over to the full CA mode when that mode would likely be more accurate and/or faster by the threshold value, a processor may present a notice or warning to the CA encouraging the CA to make the switch to full CA mode along with statistics indicating the likely increase in captioning effectiveness (e.g., 10% faster, 5% more accurate). To this end, the exemplary statistics shown at 1541 in FIG. 50 that are associated with a "Full CA Captioning/Correction" button.

In a similar fashion, when a CA operates a relay workstation in a full CA mode, the system may continually track metrics related to the CA's captions and compare those to estimated ASR-CA backed up mode estimates for the specific CA (e.g., based on the CA's profile performance statistics) and may coach the CA on when to switch to the ASR-CA backed operating mode. In this regard, see for instance the speed and accuracy statistics shown at 753 in FIG. 47 that are associated with the ASR-CA Back Up button 751.

In at least some embodiments it is contemplated that a CA will be able to set various station operating parameters to preferred settings that the CA perceives to be optimal for the CA while captioning. For instance, in cases where a workstation operating mode can be switched between ASR-CA backed and full CA, a CA may be able to turn automatic switching on or turn that switching off so that a switch only occurs when the CA selects an on screen or other interface button to make the switch. As another instance, the CA may be able to specify whether or not metrics (e.g., speed and accuracy as at 753 in FIG. 47) are presented to the CA to encourage a manual mode switch. As another instance, a CA may be able to adjust a maximum cumulative captioning delay period that is enforced during calls. As still one other instance, a CA may be able to turn on and off a 2 times or 3 times broadcast rate feature that kicks in whenever a CA latency value exceeds some threshold duration. Many other station parameters are contemplated that may be set to different operating characteristics by a CA.

In at least some cases it is contemplated that a system processor tracking all or at least a subset of CA statistics for all or at least a subset of CAs may routinely compare CA statistical results to identify high and low performers and may then analyze CA workstation settings to identify any common setting combinations that are persistently associated with either high or low performers. Once persistent high performer settings are identified, in at least some cases a system processor may use those settings to coach other CAs and, more specifically, low performing CAs on best practices. In other cases, persistent high performer settings may be presented to a system administrator to show a correlation between those settings and performance and the administrator may then use those settings to develop best practice materials for training other CAs.

For example, assume that several CAs set workstation parameters such that a system processor only broadcasts HU voice signal corresponding to phrases that have confidence factors of 6/10 or less at the HU's speaking rate and speeds up broadcast of any HU voice signal corresponding to phrases that have 7/10 or greater confidence factors to 2× the HU's speaking rate. Also assume that these setting result in substantially faster CA error correction than other station settings. In this case, a notice may be automatically generated to lower performing CAs encouraging each to experiment with the expedited broadcast settings based on ASR text confidence factors.

Various system gaming aspects have been described above where CA statistics are presented to a CA to help her improve skills and captioning services in a fun way. In some cases it is contemplated that a system processor may routinely compare a specific CA with her own average and best statistics and present that information to th CA either routinely during calls or at the end of each call so that the CA can compete against her own prior statistics. In some cases two or more CAs may be pitted against each other sort of like a race to see who can caption the fastest, correct more errors in a short period of time, generate the most accurate overall caption text, etc. In some cases CAs may be able to challenge each other and may be presented real time captioning statistics during a challenge session where each gets to compare their statistics to the other CA's real time statistics. To this end, see the exemplary dual CA statistics shown at 771 in FIG. 47 where the statistics shown include average captioning delay, accuracy level and number of errors corrected for a CA using a station that includes the display screen 50 and another CA, Bill Blue, captioning and correcting at a different station. Leaders in each statistical category are visually distinguished. For instance, statistic values that are best in each category are shown double cross hatched in FIG. 47 to indicate green highlighting.

While CA call and performance metrics may be textually represented in some cases, in other cases particularly advantageous metric indicators may have at least some graphic characteristics so that metrics can be understood based on a simple glance. For instance, see the graphical performance representation at 787 in FIG. 47 where arrows 789 that represent instantaneous statistics dynamically float along horizontal accuracy and speed scales to indicate performance characteristics. In some cases the graphical characteristics may be calculated relative to personal averages from a specific CA's profile and in other cases the characteristics may be calculated relative to all or a subset of CAs associated with the system.

In some embodiments it is contemplated that CAs may be automatically rewarded for good performance or increases in performance over time. For instance, each 2 hours a CA performs at or above some threshold performance level, she may be rewarded with a coupon for coffee or some other type of refreshment. As another instance, when a CA's persistent error correction performance level increases by 5% over time, she may be granted a paid one hour off at the end of the week. As yet one other instance, where CA's compete head to head in a captioning and correcting contest, the winner of a contest may be granted some reward to incent performance increases over time.

In line error corrections are described above where initial ASR or CA generated text is presented to an AU immediately upon being generated and then when a CA or an ASR corrects an error in the initial text, the erroneous text is replaced "in line" in the text already presented to the AU. In at least some cases the corrected text is highlighted or otherwise visually distinguished so that an AU can clearly see when text has been corrected. Major and minor errors are also described where a minor error is one that, while wrong, does not change the meaning of an including phrase while a major error does change the meaning of an including phrase.

It has been recognized that when text on an AU display screen is changed and visually distinguished often, the cumulative highlighted changes can be distracting. For this reason, in at least some embodiments it is contemplated that a system processor may filter CA error corrections and may only change major errors on an AU display screen so that minor errors that have no effect on the meaning of including phrases are simply not shown to the AU. In many cases limiting AU text error correction to major error corrections can decrease in line on screen corrections by 70% or more substantially reducing the level of distraction associated with the correction process.

To implement a system where only major errors are corrected on the AU display screen, all CA error corrections may be considered in context by a system processor (e.g., within including phrases) and the processor can determine if the correction changes the meaning of the including phrase. Where the correction affects the meaning of the including phrase, the correction is sent to the AU device along with instructions to implement an in line correction. Where the correction does not affect the meaning of the including phrase, the error may simply be disregarded in some embodiments and therefore never sent to the AU device. In other cases where a correction does not affect the meaning of the including phrase, the error may still be transmitted to the AU device and used to correct the error in a call text archive maintained by the AU device as opposed to in the on screen text. In this way, if the AU goes back in a call transcript to review content, all errors including major and minor are corrected.

In other embodiments, instead of only correcting major errors on an AU device display screen, all errors may be corrected but the system may only highlight or otherwise visually distinguish major errors to reduce error correction distraction. Here, the thinking is that if and AU cares at all about error corrections, the most important corrections are the ones that change the meaning of an including phrase and therefore those changes should be visually highlighted in some fashion.

In a similar fashion, automated ASR error corrections may be transmitted to a CA workstation where major and minor errors are treated differently. As in the case of how errors may be used by an AU captioned device, a CA workstation may only make major error changes on the CA display, may make all error changes and only highlight or otherwise visually distinguish major errors from other captioned text, may make major error changes in real time as they are received at the relay and minor error changes in archived text, etc.

CA Sensors (i) Eye Sight Trajectory Sensor(s)

CA station sensor devices can be provided at CA workstations to further enhance a CA's captioning and error correction capabilities. To this end, in at least some embodiments some type of eye trajectory sensor may be provided at a CA workstation for tracking the location on a CA display screen that a CA is looking at so that a word or phrase on the screen at the location instantaneously viewed by the CA can be associated with the CA's sight. To this end, see, for instance, the CA workstation 1700 shown in FIG. 54 that includes a display screen 50, keyboard 52 and headphones 54 as described above with respect to FIG. 1. In addition, the station 1700 includes an eye tracking sensor system that is represented by numeral 1702 that is directed at a CA's location at the station and specifically to capture images or video of the CA using the station. The camera field of view (FOV) is indicated at 1712 and is specifically trained on the face of a CA 1710 that currently occupies the station 1700.

Figure 54:
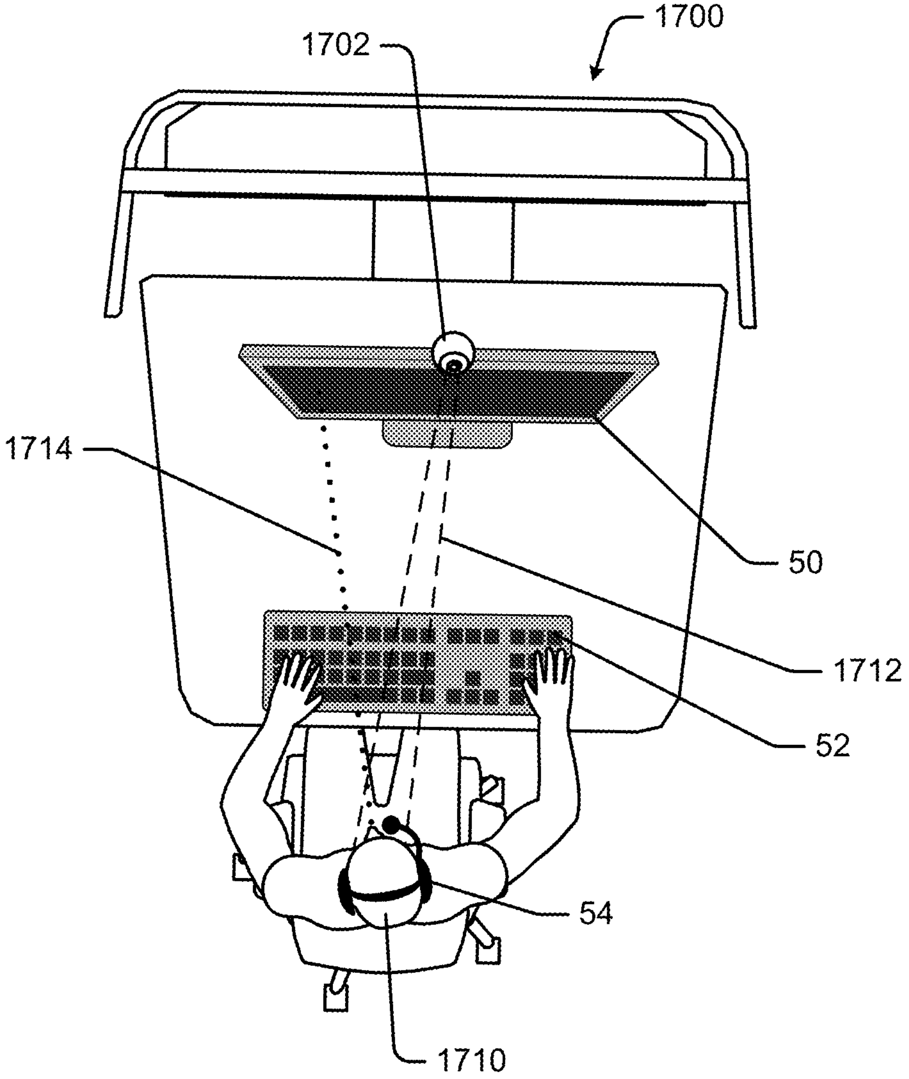
FIG. 54 is a top plan view of a CA workstation including an eye tracking camera that is consistent with at least some aspects of some embodiments of the present disclosure.
Figure 55:
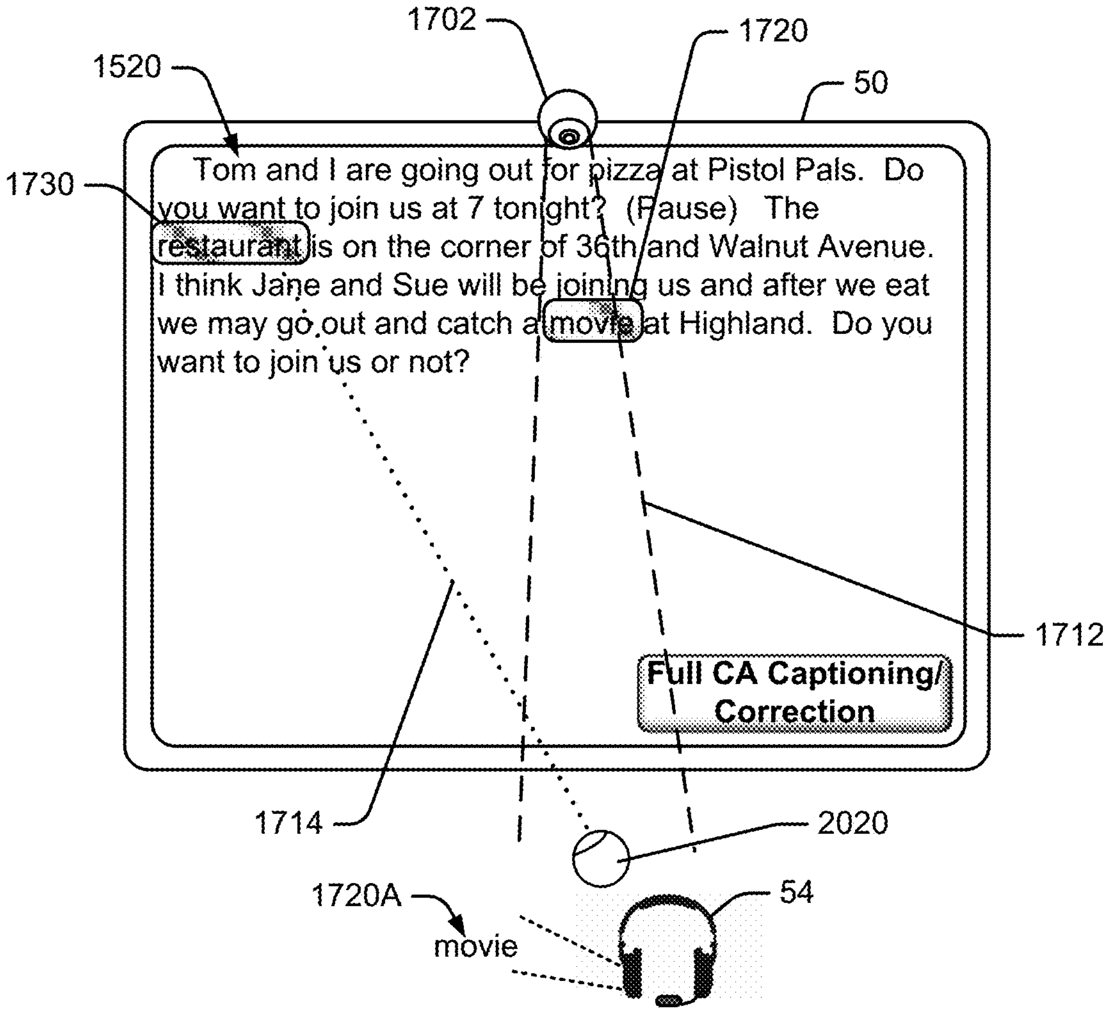
FIG. 55 is a schematic illustrating an exemplary CA screen shot and a camera that tracks a CA's eyes that is consistent with at least some aspects of some embodiments of the present disclosure.

Referring still to FIG. 54 and also to FIG. 55, images from sensor 1702 can be used to identify the CA's eyes and, more specifically, the trajectory of the CA's line of sight as labelled 1714. As best shown in FIG. 55, the CA's line of sight intersects the display screen 50 at a specific location where the text word "restaurant" is presented. In some embodiments, as illustrated, the word a CA is currently looking at on the screen 50 will be visually highlighted or otherwise distinguished as feedback to the CA indicating where the system senses that the CA is looking. Known eye tracking systems have been developed that generate invisible bursts of infrared light that reflects differently off a station user's eyes depending on where the user is looking. A camera picks up images of the reflected light which is then used to determine the CA's line of sight trajectory. In other cases a CA may wear a headset that tracks headset orientation in the ambient as well as the CA's pupil to determine the CA's line of sight. Other eye tracking systems are known in the art and any may be used in various embodiments.

Here, instead of having to move a mouse cursor to a word on the display screen or having to touch the word on the screen to select it, a CA may simply tap a selection button on her keyboard 52 once to select the highlighted word (e.g., the word subtended by the CA's light of sight) for error correction. In some cases a double tap of the keyboard selection button may cause the entire phrase or several words before and after the highlighted word to be selected for error correction.

Once a word or phrase is selected for error correction, the current HU voice signal broadcast 1720A may be halted, the word or phrase selected may be differently highlighted or visually distinguished and then re-broadcast for CA consideration as the CA uses the keyboard or microphone to edit the highlighted word or phrase. Once the word or phrase is corrected, the CA can tap an enter key or other keyboard button to enter the correction and cause the corrected text to be transmitted to the AU device for in line correction. Once the enter key is selected, HU voice signal broadcast would recommence at the word 1720 where it left off.

In some embodiments the eye tracking feature may be used to monitor CA activity and, specifically, whether or not the CA is considering all text generated by an ASR or CA re-voicing software. Here, another metric may include percent of text words viewed by a CA for error correction, durations of time required to make error corrections, etc.

(ii) CA Fatigue Sensor(s)

In at least some cases a CA workstation may be equipped with one or more sensor devices that generate data useable by a system processor to assess CA fatigue. For instance, a camera or a touch sensor built into a CA's wrist rest, keyboard or other input device may be able to generate data usable to assess blood pressure, heartrate, perspiration rate, or any other biometric parameter suitable to assess CA stress level or fatigue. Here, the system may automatically adjust a CA's captioning schedule in any of several different ways. As one simple example, when a CA's fatigue level exceeds some threshold level consistent with low productivity (e.g., a level that is consistent with a drop in captioning productivity or accuracy or some combination of those), the system may simply schedule a 10 minute break to give the CA a time to rejuvenate.

As another example, when a CA's fatigue level exceeds the threshold, the system may steer calls that are perceived to be relatively easy to caption to the CA for at least some duration so that, despite lower productivity, the CA may still be able to meet AU and system expectations related to speed and accuracy. Here, for instance, where first and second CAs are handling first and second calls that are assessed by a system processor to be relatively easy and relatively hard to caption (e.g., easy meaning HU speaking rate is relatively slow, HU voice signal easy to understand, etc., and hard meaning HU speaking rate is fast and/or voice signal is hard to understand), respectively, and where the system ascertains that the second CA is exhausted, the system may automatically swap the remainder of the calls between the first and second CAs so that the second CA handles the first relatively easier call and can more easily meet speed and accuracy expectations.

Multiple ASR Systems

In at least some embodiments it is contemplated that two or more ASR engines of different types (e.g., developed and operated by different entities) may be available for HU voice signal captioning. In these cases, it is contemplated that one of the ASR engines may generate substantially better captioning results than other engines. In some cases it is contemplated that at the beginning of an AU-HU call, the HU voice may be presented to two or more ASR engines so that two or more HU voice signal text transcripts are generated. Here, a CA may correct one of the ASR text transcripts to generate a "truth" transcript presented to an AU. Here, the truth transcript may be automatically compared by a processor to each of the ASR text transcripts associated with the call to rank the ASR engines best to worst for transcribing the specific call. Then, the system may automatically start using the best ASR engine for transcription during the call and may scrap use of the other two engines for the remainder of the call. In other cases while the other engines may be disabled, they may be re-enabled if captioning metrics deteriorate below some threshold level and the process above of assigning metrics to each engine as text transcripts are generated may be repeated to identify a current best ASR engine to continue servicing the call.

In another multi-ASR system, a plurality of ASR engines may persistently operate to generate multiple ASR caption streams throughout a call and a processor may automatically switch the stream transmitted to an AU and presented for correction to a CA based on relative accuracies of the separate streams. Thus, for instance, where five different ASR engines applying different voice to text algorithms generate five different ASR caption streams, a processor may compare each ASR caption stream to a CA's corrected captions over a rolling comparison period (e.g., 10 seconds to one minute) to assess the recently most accurate ASR engine and may then switch ASR streams presented to the CA and AU so that ASR caption accuracy is maximized. This type of system will be particularly useful in cases where HU voice signal quality or line noise changes or a speaker at the HU end of a call (e.g. a child takes over a call from a father) changes during the course of a call so that one ASR engine may be most accurate at one time while another is most accurate at a different time.

Figure 59:
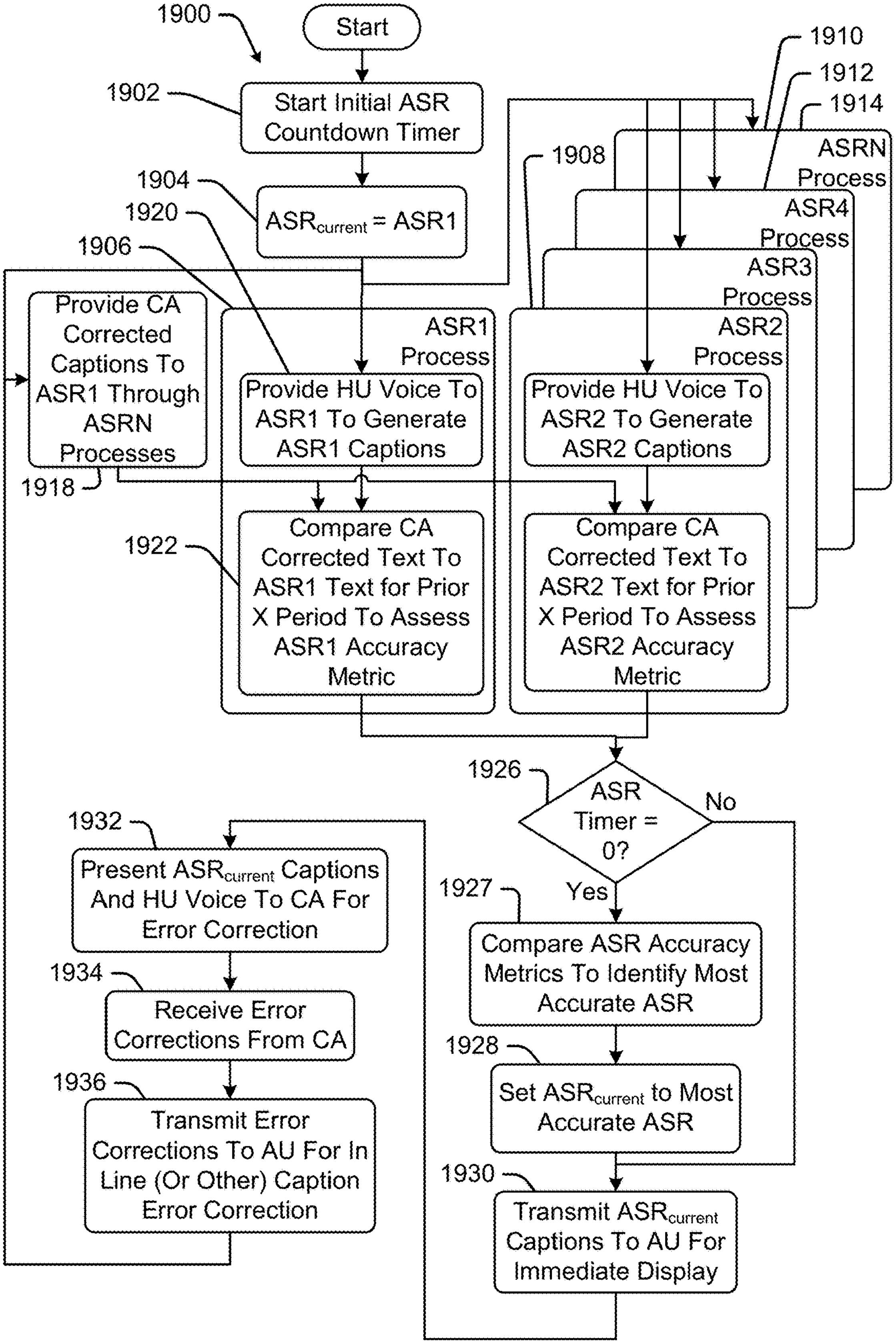
FIG. 59 includes a flowchart that shows a process that is consistent with at least some aspects of the present disclosure.

Referring now to FIG. 59, an exemplary process 1900 for switching between a plurality of ASR engines based on engine accuracy is illustrated as a flow chart. As shown, process 1900 utilizes a plurality of ASR engine sub-processes 1906, 1908, 1910, 1912 and 1914 (ASRN where N may be any integer value) where the sub-processes are similar, albeit applying different voice to text algorithms and therefore generating at least some different caption results at times. Exemplary ASR engine process 1906 includes a first process block 1920 where the ASR1 engine receives an HU voice signal and generates ASR1 captions as well as a block 1922 where the ASR1 captions are compared to CA corrected captions to generate an ASR1 accuracy metric. While not separately labelled, each of the other ASR engines two process blocks similar to blocks 1920 and 1922, albeit where the different ASR algorithms (e.g., ASR2, ASR3, etc.) are used to generate the ASR caption streams for comparison to the CA corrected captions.

At the beginning of a call captioning session (e.g., after an AU has requested caption service for an ongoing call), tin at least some embodiments there will be no way to ascertain an optimal ASR for a current call and therefore the system is programmed to use a default ASR engine at least initially until accuracy metrics for the plurality of ASR engines are generated to fuel selection of an instantaneously optimal ASR engine. In the FIG. 59 example, at initial process block 1902 an initial ASR countdown timer is initiated during which the default ASR engine is used to generate initial captions for an AU and a CA. Here, for instance, the initial countdown timer may be set for a short duration (e.g., 10 seconds to 90 seconds). In other cases, the initial ASR engine may be employed for a predefined number of captioned words (e.g., 100) or until some other occurrence such as, for instance, a discernible and appreciable difference in ASR engine accuracy. Unless indicated otherwise, the condition (e.g., timed out timer, number of captioned words, etc.) that must occur prior to switching to the most accurate ASR engine will be referred to as the "initial switching condition" generally.

Referring still to FIG. 59, at block 1904 a current ASR-$_{current}$ is set equal to the default ASR (e.g., ASR1 in the illustrated example) that is then used prior to occurrence of the initial switching condition to generate text initial captions to send to the AU for display and to the CA for error correction.

The HU voice signal received at the relay is provided in parallel to each of the first ASR1 1906 through Nth ASRN 1914 automated captioning engines. The initial default engine ASR1 automatically generates first ASR1 captions at block 1920 which are the ASRcurrent captions prior to occurrence of the initial switching condition. In FIG. 59, the initial switching condition (e.g., the initial ASR countdown timer condition) is monitored at decision block 1926 and, until that condition is met, control passes down to block 1930. At block 1930, a relay processor transmits the ASR-current captions to the AU captioned device for display.

At block 1932, the processor presents the ASRcurrent captions on a CA workstation display screen and broadcasts the HU voice signal to the CA to hear. At block 1934 a CA corrects any perceived errors in the ASRcurrent captions and at 1936 the corrections are transmitted to the AU captioned device which is programmed to make in line corrections or other corrections consistent with the CS corrections.

Referring still to FIG. 59, at block 1918 the CA corrected captions are provided to the second block in each of the ASR engine processes (e.g., ASR1 through ASRN). At block 1922 in the first process 1906 compares the ASR1 captions to the CA corrected captions to generate an ASR1 accuracy metric for a preceding duration X. Here, the duration X may be equal to the countdown timer duration, less than or greater than that duration. In at least some cases the preceding duration X will be within a range of 10 seconds to 90 seconds although other ranges are contemplated. Similarly, each of the other ASR processes 1908 through 1914 compares associated ASR captions to the CA corrected captions thereby generating a separate accuracy metric ASR2 through ASRN for each of those processes.

All of the ASR accuracy metrics are provided to decision block 1926 and, eventually, once the initial switching condition is met (e.g., the countdown timer expires), are provided to block 1927. At block 1927, once the initial switching condition occurs, a processor compares the ASR accuracy metrics for each engine process 1906 through 1914 to identify the most accurate engine over the most recent duration X (e.g., X rolls over time during an ongoing call). At block 1928, the current ASR ASRcurrent is set to the most accurate ASR after which control passes to block 1930 where the process described above continues.

During a long HU-AU captioning session, it is possible that the most accurate ASR engine will change several times during the session as line and signal quality changes or as the person on the HU end of the call changes. To avoid rapid or essentially meaningless ASR engine changes, in at least embodiments a threshold for accuracy increase may be set so that the system only switches from a current ASR to a more accurate ASR if the more accurate ASR is more accurate by a threshold percent (e.g., 10% more accurate). Similarly, the system may impose a limit on the rate of ASR changes so that, for instance, no more than one ASRcurrent change occurs every 20 seconds The accuracy metric may take many different forms. For instance, in some cases the accuracy metric may simply comprise a count or errors that occurred over the prior X duration. As another instance, the accuracy metric may be based on a count of errors that change the meaning of captions over the prior X duration. Many other accuracy metrics are contemplated.

In some cases, the initial default ASR engine in FIG. 59 may change as a function of ASR accuracy metrics that occurred during prior calls. For instance, if one of the ASR engines routinely has the highest accuracy metric, the system may automatically initiate all caption sessions with that ASR as the default. If the ASR with the routinely highest accuracy metric changes over time, a different ASR with the best accuracy metric may be set as the default.

In some embodiments it is contemplated that where a captioning session is commenced during an ongoing HU-AU call, HU voice signal prior to commencement of the captioning session may be automatically captured and used to assess a most accurate ASR engine to be used as the $ASR_{current}$ engine once a captioning session starts. Here, because a CA only corrects ASR captions after a caption session is initiated there would be no CA corrected captions to operate as "truth" for assessing ASR accuracy metrics as in FIG. 59. For this reason, therefore, a system processor would have to generate confidence factors related to the ASR captions which would then be used to assess ASR accuracy metrics used to select a most accurate ASR as the initial default when a captioning session commences.

In still other cases it is contemplated that a system processor may be programmed to use some set of call characteristics to select a current $ASR_{current}$ instead of relying on accuracy disparities. For instance, as a simple example, it may be that a third ASR3 engine out of the N engines routinely generates higher caption accuracy when an HU-AU phone link has a noise level above some threshold level. In this case, a processor may monitor line noise and select the $ASR_{current}$ based thereon. Other call characteristics and combinations of characteristics to trigger specific $ASR_{current}$ engines are contemplated including HU voice signal volume, vowel shapes, dynamic pitch range, etc. $ASR_{current}$ selection may be based on pre-caption session call characteristics, characteristics during an ongoing call, or a combination of both.

In at least some cases a system processor will be programmed to dynamically learn which ASR engine is most accurate or meets other desirable characteristics for calls with specific call characteristics and may then use the most advantageous ASR engine to generate captions based on perceived call characteristic sets.

While FIG. 59 is described in the context of ASR accuracy metrics, other metrics may also be considered when the system selects an $ASR_{current}$. For instance, a speed metric related to how quickly specific ASR engines generate text or firm up automated ASR error corrections may be generated for each ASR engine and used as a factor in selecting the $ASR_{current}$ engine. Here, the speed or correction firming metric may be dispositive or may be combined with other factors (e.g., accuracy) to select the $ASR_{current}$ engine.

In some cases a switch from one $ASR_{current}$ engine to a next may be delayed until some additional event occurs. For instance, the switch to a next $ASR_{current}$ engine may only occur upon occurrence of a silence period in the HU voice signal or upon an utterance by an AU.

In some cases each ASR may generate confidence factors for each word, phrase, utterance or call time slice (e.g., 5 second durations) and a system processor may, for each word, phrase, utterance or call time slice, use captions that have the highest confidence factor as the $ASR_{current}$ captions regardless of which ASR engine generated the captions. Thus, at the limit, in a ten word HU utterance, a different one of the ASR engines may generate each consecutive captioned word in the final $ASR_{current}$ text presented to an AU and a CA.

Some systems described above include an ASR that is integrated into an AU captioned device or some other device that is directly accessible to the captioned device instead of or in addition to an ASR located at a remote captioning relay. AU captioning devices with integrated or accessible ASRs have several advantages in addition to those described above. First, see again FIG. 17 where turn piping graphics are presented at 216 indicating uttered HU voice signal words that have yet to be captioned by a CA or, in some cases, by either an ASR or a CA. Where an AU captioned device includes an integrated-directly accessible ASR, turn piping can be done extremely fast to present a better real time sense of delay in CA captioning. In this case, even a relatively inaccurate and likely inexpensive ASR may be integrated into the AU captioned device.

Second, an integrated-directly accessed ASR could result in substantial savings over a remote cloud based service if the integrated ASR works well. In this case, the ASR would present automated ASR captions to the AU via the captioned device immediately upon generation and would use differences between CA corrected captions and the ASR captions to correct the initial text. In some cases in addition to presenting the ASR captions to the AU, those captions may be transmitted to a relay to be presented for error corrections to a CA. In other cases a CA may simply generate CA captions and make error corrections and each of those may be sent to the AU captioned device to make different rounds of error corrections to the text presented to the AU.

Third, in systems that run two or more ASRs in parallel, a second or additional ASR may be provided relatively inexpensively as an integration in the AU captioned device. Thus, a first ASR engine may operate at a remote relay or caption service provider while a second ASR may be integrated in the captioned device. Here, advantages include a lower cost second ASR, an ability to automatically generate at least some metrics related to how well a first cloud based captioning engine is operating, ability to assess different ASR caption accuracies, etc.

Fourth, in cases where a first ASR engine is operated by a third party that a relay links to for captioning, an integrated second ASR would enable continued captioning service if the link to the third party captioning provider fails. Here, for instance, if the third party captioning provider fails to generate captions, a relay may be programmed to obtain captions from the integrated ASR engine for error corrections so captioning can continue substantially uninterrupted.

Fifth, an integrated ASR can be employed in ways that limit privacy concerns. To this end, it at least some embodiments it is contemplated that a local integrated ASR may be used to generate ASR text and only portions of an HU voice signal may be transmitted to a remote relay for captioning so that an attending CA only hears portions of an HU voice signal. For instance, in some cases, an HU voice signal may be divided by sequential 7 second time slices where an integrated ASR (e.g., ASR that is integrated into an AU captioned device) generates a complete ASR caption stream for the HU voice signal and where only every other 7 second time slice of HU voice signal is transmitted to the relay for CA captioning. In other cases, the local ASR may be used to dynamically identify pauses or other good times at which to start and stop HU voice signal slices that are transmitted to a relay for captioning.

In at least some cases, a captioned device processor may assign confidence factors to ASR caption words or phrases and may only transmit low confidence factor HU voice signal to a relay for more accurate captioning service. In still other cases, a captioned device processor may examiner ASR caption text for specific words or phrases that are often sensitive from a privacy perspective and may, in effect, redact those words or phrases or phrases that include those words or phrases from the HU voice signal that is transmitted to a relay for captioning. Here, the ASR captions for the redacted words would persist in the captions presented to the AU. For example, numbers, names of diseases, etc., may be blocked from the audio transmitted to the relay.

Privacy

Several aspects of and features of various captioning systems related to privacy are described above. Here we gather various privacy related concepts in one place and embellish several of those concepts with additional important details.

One problem with existing HU captioning systems where a CA listens to a phone call between an HU and an AU is that the CA may hear an entire conversation between conversing parties. While CA's agree to complete confidentiality, the privacy guarantee is only as good as a CA's word and, in any event, AUs and HUs that are aware that a CA hears an entire conversation are often, rightly or wrongly, uncomfortable with a third party listening in on their conversation. For this reason, many of the captioning systems disclosed herein operate in ways designed to assuage privacy concerns of both the AU and HU participating in a call.

One solution that is implemented in at least some embodiments of the present disclosure is to only transmit an HU voice signal to a relay for captioning. In most systems, at least one party on a call, the HU, has no or minimal hearing loss and therefore there is no reason to caption an AU's voice and therefore no reason to transmit the AU voice signal to the relay for captioning. In these cases a CA only hears one side of a conversation (e.g., an HU voice side) which tends to obfuscate the meaning of communications during a call.

While only passing an HU's side of a conversation on to a relay for CA captioning affords some privacy related advantages, in many cases CA's can ascertain a lot about what is being communicated from a single side of a conversation. For this reason other solutions for increasing the degree of private communications in a captioning system are desired. A second solution, as described above, is to provide a full ASR system that captions HU voice signals to be presented to an AU via a display screen. While this solution is clearly private as no CA or other administrator listens to the HU voice signal and instead a processor runs software to automatically generate HU voice signal captions. This solution alone has not worked well as ASR captions are often insufficiently accurate for the purposes of providing meaningful captions for real time communications.

A third solution is to use ASR captions some of the time and have a CA at a relay listen to only time slices of an HU voice signal and transcribe those time slice signals. For instance, an ASR may generate ASR captions for an entire HU voice signal that are presented to an AU immediately upon caption generation while every other 10 second period of the HU voice signal is sent to a CA for captioning and correction. Then, the CA captions and error corrections may be sent back to the AU device for correcting corresponding portions (e.g., time slices) of the ASR captions.

In other cases, an ASR may generate ASR text, assign confidence factors to each word or phrase in the text and then only transmit low confidence ASR text and corresponding HU voice signal to the relay for consideration by a CA. This type of system is especially advantageous in cases where a CA's captioning lags behind an ASR engine which affords the engine an opportunity to caption HU voice and identify a confidence factor for each word or phrase prior to a CA considering the HU voice signal for error correction. In fact, in at least some cases it is contemplated that an HU voice signal may be delayed for a short duration period selected so that an ASR has time to generate ASR captions and confidence factors prior to transmitting (or not) associated HU voice signal to the AU communication device so that only HU voice signal associated with low confidence ASR captions and the associated ASR captions are sent to a CA for error correction. In these cases where a CA only has the chance to perceive part of one side of a conversation, privacy is increased appreciably.

A fourth solution is to use more than one CA to caption an HU voice signal or correct ASR or CA generated captions during a call. For instance, in a simple case where a relay call center has first and second CAs working at one time to caption HU voice signals, first and second CAs may provide caption services (e.g., captioning, correction or both captioning and correction) for consecutive 20 second interleaved slices of an HU voice signal for a single call so that each CA only perceives about half of one side of the call. Thus, for instance, a first CA may listen to a first 20 second duration of an HU voice signal during a captioning session and generate captions, then a second CA may handle the next 20 seconds of HU voice signal while the first CA is disconnected from the call, then the first CA may be reconnected to the call to handle the next 20 seconds while the second CA is disconnected, and so on, typically with some overlap between CA segments.

In a case where 200 CAs work at a relay center at a time to captions HU voice signals, a CA may only be exposed to a small time slice of any one call. For instance, during a ten minute captioning session where HU voice signal is divided into 20 second segments, 30 different CAs may each handle 20 second HU voice signal slices to provide complete captioning service during the entire 10 minute call. One advantage here is that CA downtime when not handling a call can be minimized as any available CA can be assigned to any HU voice signal slice of any of several different simultaneous calls. Thus, for instance, when a first CA completes a 20 second captioning time slice for a first call, that first CA may only have 3 seconds prior to being assigned a 20 second time slice in a second ongoing call, and so on.

In at least some cases where the system automatically swaps in one CA for another in a time sliced manner, the duration of HU voice signal time slices may be dynamic and based on HU signal characteristics. For instance, time slices may have a range of duration between 15 seconds and 30 seconds and a system processor may select a time slice duration that makes sense given silent periods in an HU voice signal of other call factors. For example, if an HU voice signal is silent for 2 seconds at a 17 second duration, the processor may cut out a current CA and switch to a second CA.

In particularly advantageous systems automatically switching from one CA to another during a single call for privacy reasons will have additional advantages. For instance, in at least some cases a processor may be programmed to favor switching CAs when current CA captions or error corrections lag behind ASR text. For instance, if current CA captions lag 16 seconds behind ASR captions, a system processor may split the difference and assign a second CA to take over error corrections starting 8 seconds back from the current ASR caption time. Thus, here, the first CA would complete the first 8 seconds of captioning of the 16 second delay and the second CA would pick up from there, both operating in parallel to eliminate the 16 second delay in a relatively short time. Here, in addition to facilitating greater privacy by having two CAs caption different sections of an HU voice signal, by switching CAs during captioning-error correction delays, overall captioning speed can be increased substantially. In some cases CA switches may only occur when a current CA captioning or error correction effort falls behind by some threshold duration (e.g., 30 seconds).

A fifth solution which also affords a captioning speed advantage in addition to enhanced privacy is to have CAs that are waiting in a queue to handle incoming caption sessions handle at least portions of ongoing captioning sessions where current CA captions or error corrections are substantially lagging. Thus, for instance, assume a first CA is 30 seconds behind on captioning an HU voice signal in a first ongoing call. Here, a second CA waiting in a queue to handle an incoming session may be temporarily assigned to the first call to handle the delay and the first CA may be skipped ahead automatically to handle real time HU voice signal. Here, at the end of the HU voice signal corresponding to the 30 second delay, the second CA would be disconnected from the first call and placed back in the queue to await a new captioning session or to be assigned to again handle captioning during another prolonged delay in an ongoing call.

In still other similar systems, one or more CAs at a relay station may simply be assigned as catch up CAs where they never handle a complete call and instead are only assigned to calls for short durations (e.g., less than 60 seconds) to help other CAs catch up to real time HU voice signals when the other CAs fall behind on captioning. Thus, for instance, a first "catch up" CA may be assigned for 25 seconds during a first call, off for 4 seconds, assigned to caption on a second call for 32 seconds and then off for 3 seconds, then assigned to a third call for 18 seconds, and so on.

In the above cases, second or catch up CAs only hear and perceive short portions of the HU voice signals and a first or main CA on a call, while hearing most of the HU voice signal, hears less than all of that signal and therefore privacy is better than in some of the other systems contemplated above.

In some cases combinations of the above privacy enhancing solutions are implemented. For instance, in one exemplary system an HU voice signal on a first call may be handle as follows. First, an ASR may receive an HU voice signal and generate ASR captions for that signal as well as confidence factors for each word in the HU voice signal. The ASR text may initially be provided to an AU via a display screen. A system processor may identify only phrases including low confidence factor words and may only transmit low confidence text and associated HU voice signal to a relay for CA captioning. At the relay, the first 20 seconds of the HU voice signal corresponding to low confidence ASR captions may be presented to a first HU for captioning, the second 20 seconds of low confidence ASR captions to a second HU for voice captioning, the third 20 seconds of low confidence ASR captions to a third HU for voice captioning, and so on. For instance, in a first minute of ASR captions, it may be that only 20 seconds of ASR captions are low confidence, and that 20 seconds would be error corrected by the first CA. Similarly, in each of second and third minutes of ASR captions, it may be that there are also 20 seconds of ASR captions that have low confidence factors. In this example the second CA would error correct the second 20 seconds of low confidence factor ASR captions and the third CA would error correct the third 20 seconds of low confidence factor ASR captions, and so on. Thus, in the first 3 minutes of HU voice signal, each of the CAs would only error correct 20 seconds of the ASR captions and substantial privacy would persists.

Cloud and Relay ASR Systems

Generally there are two different types of ASRs, ones that can be trained over time based on CA error corrections to captions generated by the ASR and ones that train automatically where training is not based on CA error corrections. In at least some systems cloud based ASRs (e.g., ASRs typically operated by fourth parties (e.g., the first through third parties being the AU, HU and relay) have no mechanism for consuming CA caption error corrections and therefore cannot train based off CA error corrections while ASRs that are hosted at a relay are typically trainable via CA error corrections. Given this reality, why is it advantageous to use cloud based ASRs for captioning services? The simple answer is that cloud based ASRs tend to be far more accurate than trainable but untrained relay hosted ASRs. At the beginning of most AU-HU calls, an ASR is not trained and therefore the cloud based ASRs are more accurate than the untrained relay hosted ASRs. One issue with cloud based ASRs is that the captioning service is typically more expensive to provide than relay hosted ASRs.

In at least some cases it is contemplated that a relay may employ both a cloud based ASR and a relay hosted and trainable (e.g., based on CA error corrections) ASR to provide automated captions to a CA and an AU where a processor selects one or the other of the ASRs based on detected accuracy. In a particularly advantageous system, at the beginning of a captioning session, an HU voice signal is presented to each of a cloud based first ASR and a relay hosted and trainable second ASR to generate first and second ASR caption streams, respectively. At least initially, because the cloud based ASR is almost always more accurate than a relay hosted and trainable (but initially untrained) ASR, the cloud based ASR captions are presented to the CA for error correction and immediately transmitted to the AU captioned device to be presented to the AU as an initial HU voice signal caption stream.

A first accuracy metric is generated by comparing the cloud based ASR captions to the CA error corrected captions. Similarly, the hosted ASR captions are compared to the CA error corrected captions to generate a second dynamic accuracy metric for the hosted ASR. In addition, the CA error corrections are used to train the hosted ASR so that the hosted ASR accuracy increases over time and, in particular, during a first part of an ongoing call.

A relay processor compares the first accuracy metric (e.g., the cloud based ASR metric) to the second accuracy metric (e.g., the relay hosted ASR metric) and, once the second accuracy metric is better than the first, at a minimum, the relay switches over to the hosted ASR captions and provides those captions to the AU and the CA instead of the cloud based ASR captions. In addition, in at least some embodiments, the relay may disconnect and disable the cloud based ASR to avoid incurring unnecessary costs associated therewith.

Figure 60:
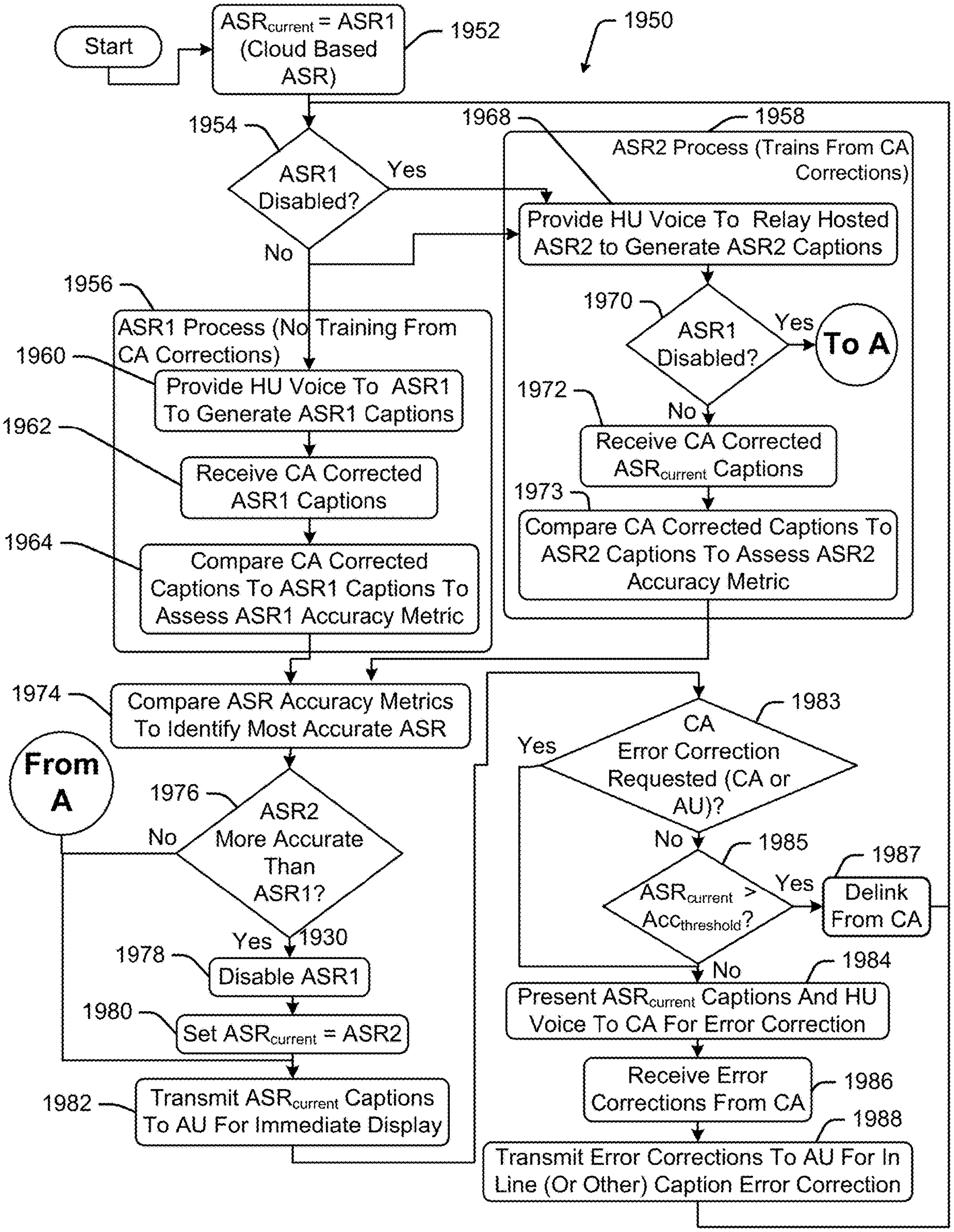
FIG. 60 includes a flowchart that shows a process that is consistent with at least some aspects of the present disclosure.

An exemplary process 1950 that is consistent with at least some aspects of the present disclosure for running parallel cloud based and relay hosted ASRs is illustrated in FIG. 60. As shown, the process 1950 includes a first cloud based ASR1 sub-process 1956 where ASR1 does not learn from CA caption error corrections and a second cloud based ASR2 sub-process 1958 that is relay hosted and trains based on CA error corrections during an ongoing call. The two ASR processes ASR1 and ASR2 proceed in parallel at the beginning of a call and the ASR1 process is eventually disabled and cut out of the process once second ASR2 accuracy exceeds ASR1 process accuracy. To be clear, ASR1 may train during a call, but would only train based on automatically identified captioning errors, typically based on automatic contextual caption corrections, instead of training based on CA error corrections.

Referring again to FIG. 60, at the beginning of a captioning session during an HU-AU call, at process block 1952 a current ASR $ASR_{current}$ is set equal to ASR1 (e.g., the cloud based ASR that does not train off CA error corrections). At decision block 1954, a system processor determines if the first ASR1 has been disabled. In the illustrated process, once second ASR2 accuracy exceeds first ASR1 accuracy, the first ASR1 is disabled (see blocks 1976 and 1978 in FIG. 60). At least initially ASR1 will not be disabled so control passes down to the ASR1 and ASR2 sub-processes 1956 and 1958.

At process block 1960, the HU voice signal is provided to the cloud based ASR1 which generates ASR1 captions. Once a CA corrects a current ASR caption stream to generate a CA corrected caption stream (see blocks 1984, 1986 in FIG. 60), the CA corrected stream is received at block 1962 and compared to the ASR1 captions at block 1964 to generates a dynamic ASR1 accuracy metric which is provided to process block 1974.

Referring still to FIG. 60 and again to block 1954, when ASR1 is not disabled, in addition to providing the HU voice signal to sub-process 1956, that HU voice signal is simultaneously provided to sub-process 1958 and, more specifically, process block 1968. At block 1968, the relay hosted ASR2 generates an ASR2 caption stream. At decision block 1970, a processor again checks if ASR1 has been disabled because trained ASR2 accuracy exceeds ASR1 accuracy. If ASR1 is still enabled, control passes to block 1972 where the CA corrected caption stream is received. At block 1973, the CA corrected captions are compared to the ASR2 captions to generate a dynamic ASR2 accuracy metric which is provided to process block 1974. As in the FIG. 59 process, the accuracy metrics may be calculated in many different ways.

At process block 1974, the ASR1 and ASR2 accuracy metrics are compared to identify the most accurate ASR (e.g., cloud based ASR1 or relay hosted ASR2 that trains off CA error corrections). At decision block 1976, if the relay hosted ASR2 is less accurate than the cloud based ASR1, control passes down to block 1982 where the $ASR_{current}$ captions are transmitted to the AU captioned device for immediate display after which control passes to block 1983.

At process block 1983 a processor monitors for a CA or AU request that CA error correction persist or, in some cases, be initiated. If a CA or AU requested persistent CA error correction, control passes down to block 1984. If no CA or AU requested persistent CA error correction control passes to decision block 1985 where accuracy of the $ASR_{current}$ captions is compared to an accuracy threshold value $Acc_{threshold}$ (e.g., 95% accurate). Where $ASR_{current}$ caption accuracy is less than the threshold value, control again passes to block 1984. However, if $ASR_{current}$ caption accuracy exceeds the threshold value, control passes to block 1987 where the CA is disconnected from the call and control loops back up to block 1954 where the process described above continues to cycle. Thus, if neither the AU nor CA associated with a call enters a command requiring persistent CA error corrections to ASR text, blocks 1983, 1985 and 1987 cause disconnection of the CA when the accuracy of the current ASR exceeds the high accuracy threshold level.

Referring yet again to block 1984, where CA error corrections persist, the $ASR_{current}$ captions are presented along with the HU voice to the CA and at block 1986 the CA corrects any errors in the $ASR_{current}$ captions. Corrections are transmitted to the AU captioned device for in line or other correction to the captions presented to the AU.

Referring again to FIG. 60, during at least the first few times through the process 1950, the ASR1 Accuracy will likely be greater than the ASR2 accuracy but, eventually, as the ASR2 engine trains using the CA error corrections, the ASR2 accuracy will exceed ASR1 accuracy so that, at block 1976, control passes down to block 1978 where ASR1 is disabled. At block 1980, $ASR_{current}$ is set equal to ASR2 and then control passes to block 1982 where $ASR_{current}$ is again sent to the AU captioned device for display and the sub-process including blocks 1984 through 1988 continues as described above. After block 1988, control passes back up to block 1954 where the process described above continues to cycle.

Referring yet again to FIG. 60 and more specifically to block 1970, once ASR1 has been disabled, in at least some embodiments there is no reason to continue to track ASR accuracy metrics as it would be assumed that ASR2 which continues to train off CA error corrections remains relatively more accurate than ASR1. For this reason, at block 1970, once ASR1 is disabled, control would route down to block 1982 where ASR captions from ASR2 are transmitted to the AU captioned device for display.

Thus, referring again to FIG. 60, once ASR2 accuracy exceeds ASR1 accuracy, in at least some embodiments of disclosed captioning systems, process 1950 is paired down so that all of sub-process 1956 as well as process and decision blocks 1972, 1973, 1974, 1976, 1978 and 1980 are effectively disabled.

In at least some cases, the system may implement hysteretic ASR change whereby ASR2 must be more accurate for some threshold level of duration, number of captioned words, etc., prior to switching from ASR1 to ASR2. For instance, at block 1976, ASR2 may have to be more accurate than ASR1 for 15 consecutive seconds of HU voice prior to control passing to block 1978. In other cases, ASR2 may have to be more accurate than ASR1 for a duration corresponding with 50 words uttered by an HU. In still other cases, ASR2 may have to be at least 15% more accurate than ASR1 for at least 20 consecutive seconds at block 1976 prior to control passing to block 1978.

While process 1950 is described above as one where a caption session starts with ASR1 and switches once to ASR2 to generate captions where ASR1 is disabled once ASR2 takes over, in at least some cases it is contemplated that the ASR2 sub-process 1958 (see again FIG. 60) may persist for the entire length of a captioning session so that an ASR2 accuracy metric is persistently calculated and, when the ASR2 accuracy metric value drops below some threshold value, the system may automatically reinitiate a cloud based ASR session. Here, during the reinitiated ASR session, the ASR1 process would again generate an ASR1 captions and an accuracy metric to compare to the ASR2 accuracy metric. In this case, if the ASR1 accuracy metric again exceeds the ASR2 accuracy metric, the system would reset $ASR_{current}$ to ASR1 and the process described above would continue to cycle. Thus, here, the system may switch back and forth between ASR1 and ASR2 based on calculated accuracy metrics but, advantageously, the cloud based ASR1 would be taken out of the process at least some of the time which would reduce captioning costs substantially.

As in cases where a CA has the ability to manually switch between (i) CA generated and corrected text and (ii) ASR text correction per CA preferences, in at least some cases a CA will be able to manually switch between two or more ASRs based on CA preference, instantaneous perception related to which ASR will be most accurate at a specific time, etc., or between two or more ASRs as well as CA caption/error correction mode. In addition, in some cases, the system will provide coaching to a CA suggesting changes to captioning protocol (e.g., ASR1, ASR2, CA, etc.) based on accuracy or other metrics.

While ASR1 in FIG. 1950 is described as being a cloud based ASR, in other embodiments ASR1 may also be a highly accurate relay hosted ASR, albeit one that does not train using CA error corrections. Here, as in the cases of the cloud based ASR system, ASR1 may be a more expensive captioning option than ASR2 and, in that case, the system may automatically switch out to ASR2 when ASR2 accuracy exceeds ASR1 so that ASR1 can be disabled.

Optimized ASR Selection Prior to Captioning

In cases where a relay selects from among several ASRs based on call characteristics such as voice type (e.g., pitch, tone, volume, etc.), voicing speed (e.g., words per minute), accent, etc., line noise, line sound quality, etc., in at least some embodiments it is contemplated that any call involving an AU may be linked immediately to a relay irrespective of whether or not captioning is to commence immediately and an HU voice may be transmitted to the relay even prior to a captioning request. In this case, a relay processor may be programmed to analyze the HU voice signal to identify call characteristics and may then select an optimal ASR for captioning the call if and when the captioning is required. Thus, for instance, a first ASR1 may be better suited to accurately caption when line noise is substantial and a second ASR2 may be better suited when line noise is below some threshold level. Here, ASR1 or ASR2 would be preselected prior to initiation of a captioning session so that the optimal ASR can start automatic captioning once captioning required/requested. Many other call characteristics are contemplated that could be identified prior to captioning an used to select an optimal ASR.

In at least some embodiments, at least an initial determination of which ASR to use to handle a call may be made by an AU device. To this end, the AU device may run software that listens to an HU voice, identifies characteristics of that voice signal and that then uses those characteristics to identify one of several ASRs optimized to generate most accurate captions. In this case, the AU device may transmit an optimized ASR control signal to a relay or third party ASR provider before or after an AU generates a caption request and the relay or provider would then use the ASR associated with the optimized control signal to at least initiate ASR captioning if and when captioning is required.

In still other cases, an HU communication device may also be programmed to listen to an HU voice signal, identify voice characteristics and use the identified characteristics to identify one of several ASRs optimized to generate most accurate captions given the voice characteristics. Again, the HU device would transmit the optimized ASR control signal to a relay or third party ASR provider before or after a captioning request and the relay or provider would use the optimized ASR to at least initially caption the HU voice signal once captioning is required.

In at least some cases, where an ASR can train without CA error corrections, ASR training for a specific call may occur prior to a captioning request. To this end, again, at the beginning of an HU-AU call and prior to the AU requesting captioning, the HU voice signal may be provided to a relay or a third party ASR provider. Here, a relay or provider processor may use an ASR to caption the HU voice signal and may attempt to identify caption errors based on content within the generated captions. Caption errors can then be used to better train the ASR so that, subsequently when captioning is requested, the trained ASR can be used immediately to generate relatively more accurate captions.

HU Voice Signal Conditioning

In at least some embodiments a relay may be programmed to condition HU voice signals received from other system components (e.g., an AU captioned device, an HU phone device, etc.) to optimize those signals for other purposes. For instance, a simple example of an HU voice characteristic that may be adjusted by a relay processor to optimize for ASR captioning and broadcast to a CA is HU voice signal volume where a processor may adjust volume to be substantially continuous and identical for each of an ASR and a CA or continuous and at different levels for an ASR and a CA. In other cases, the HU voice signal volume may be adjusted to be substantially continuous for a CA but may be fed to an ASR at whatever volume the HU generated the signal. Another voice characteristic that may be adjusted is speaking pace. For instance, in some cases an HU may alternate from speaking quickly to slowly. In this case, a relay processor may adjust speaking pace in the HU signal broadcast to a CA so that the overall pace is constant. Here, in at least some cases where an ASR operates to generate HU voice signal captions, the ASR will often outpace a CA in captioning. In this case, the ASR results can be examined by the processor for pace so that when the voice signal is subsequently broadcast to the CA, the voice signal pace can be rendered substantially constant.

In some cases different CAs may prefer different HU voice signal paces and in those cases it is contemplated that a CA may be able to set HU voice signal pace or that a relay processor may be programed to "hunt" for a CA optimal pace and automatically adjust pace in real time for CA optimization. Thus, the processor may adjust HU voice signal pace and monitor CA accuracy and speed so that the pace can be modified until optimized. Other voice characteristics may be optimized as well for CA broadcast and consumption by one or more different ASRs.

In at least some cases one or more biometric sensors may be included within an AU's caption device that can be used for various purposes. For instance, see again FIG. 1 where a camera 75 is included in device 12 for obtaining images of an AU using the caption device 12 during a voice communication with an HU. Other biometric sensor devices are contemplated such as, for instance, the microphone in handset 22, a finger print reader 23 on device 12 or handset 22, etc., each of which may be used to confirm AU user identity.

One purpose for camera 75 or another biometric sensor device may be to recognize a specific AU and only allow the captioning service to be used by a certified hearing impaired AU. Thus, for instance, a software application run by a processor in device 12 or that is run by the system server 30 may perform a face or eye recognition process each time device 12 is activated, each time any person locates within the field of view of camera 75, each time the camera senses movement within its FOV, etc. In this case it is contemplated that any AU that is hearing impaired would have to pre-register with the system where the system is initially enabled by scanning the AU's face to generate a face recognition model which would be stored for subsequent device enablement processes.

In other cases it is contemplated that hearing specialists of physicians may, upon diagnosing an AU with sufficient hearing deficiency to warrant the captioning service, obtain an image of the AU's face or an entire 3D facial model using a smart phone or the like which is uploaded to a system server 30 and stored with user identification information to facilitate subsequent facial recognition processes as contemplated here. In this way, AUs that are not comfortable with computers or technology may be spared the burden of commissioning their caption devices at home which, for some, may not be intuitive.

After a caption device is set up and commissioned, once an authorized AU is detected in the camera FOV, device 12 may operate in any of the ways described above or hereafter to facilitate captioned or non-captioned calls for an AU. Where a person not authorized to use the caption service uses device 12 to make a call, device 12 may simply not provide any caption related features per the graphical display screen so that device 12 operates like a normal display based phone device.

In other cases images or video from camera 75 may be provided to an HU or even a CA to give either or both of those people a visual representation of the AU so that each can get a sense from non-verbal queues of effectiveness of AU communications. When a visual representation of the AU is presented to either or both of the HU and CA, some clear indicator of the visual representation will be given to the AU such as for instance, a warning message on display 18 of device 12. In fact, prior to presenting AU images or video to others, device 12 may seek AU authorization in a clear fashion so that the AU is not caught off guard.

In at least some embodiments described above, ASR or other currently best caption text (e.g., CA generated text in a full CA mode of operation) is presented immediately or at least substantially immediately to an AU upon generation and subsequently, when an error in that initial text is corrected, the error is corrected within the text presented to the AU by replacing the initial erroneous text with corrected text. To notify the AU that the text has been modified, the corrected text is highlighted or otherwise visually distinguished in line. It has been recognized that while highlighting or other tagging to distinguish corrected text is useful in most cases, those highlights or tags can become distracting under certain circumstances. For instance, when substantial or frequent error corrections are made, the new text highlighting can be distracting to an AU participating in a call.

In some cases, as described above, a system processor may be programmed to determine if error corrections result in a change in meaning in an including sentence and may only highlight error corrections that are meaningful (e.g., change the meaning of the included sentence). Here, all error corrections would be made on the AU device display but only meaningful error corrections would be highlighted.

In other cases it is contemplated that all error corrections may be visually distinguished where meaningful corrections are distinguished in one fashion and minor (e.g., not changing meaning of including sentence) error correction are distinguished in a relatively less noticeable fashion. For instance, minor error corrections may be indicated via italicizing text swapped into original text while meaningful corrections are indicated via yellow or green or some other type of highlighting.

In still other cases all error corrections may be distinguished initially upon being made but the highlighting or other distinguishing effect may be modified based on some factor such as time, number of words captioned since the error was corrected, number or error corrections since the error was corrected, or some combination of these factors. For example, an error correction may initially be highlighted bright yellow and, over the next 8 seconds, the highlight may be dimmed until it is no longer visually identifiable. As another example, a first error correction may be highlighted bright yellow and that highlighting may persist until each of a second and third error correction that follows the first correction is made after which the first error correction highlighting may be completely turned off. As yet one other instance, an error correction may be initially highlighted bright yellow and bolded and, after 8 subsequent text words are generated, the highlighting may be turned off while the bold effect continues. Then, after a next two error corrections are made, the bold effect on the first error correction may be eliminated. Many other expiring error correction distinguishing effects are contemplated.

Figure 56:
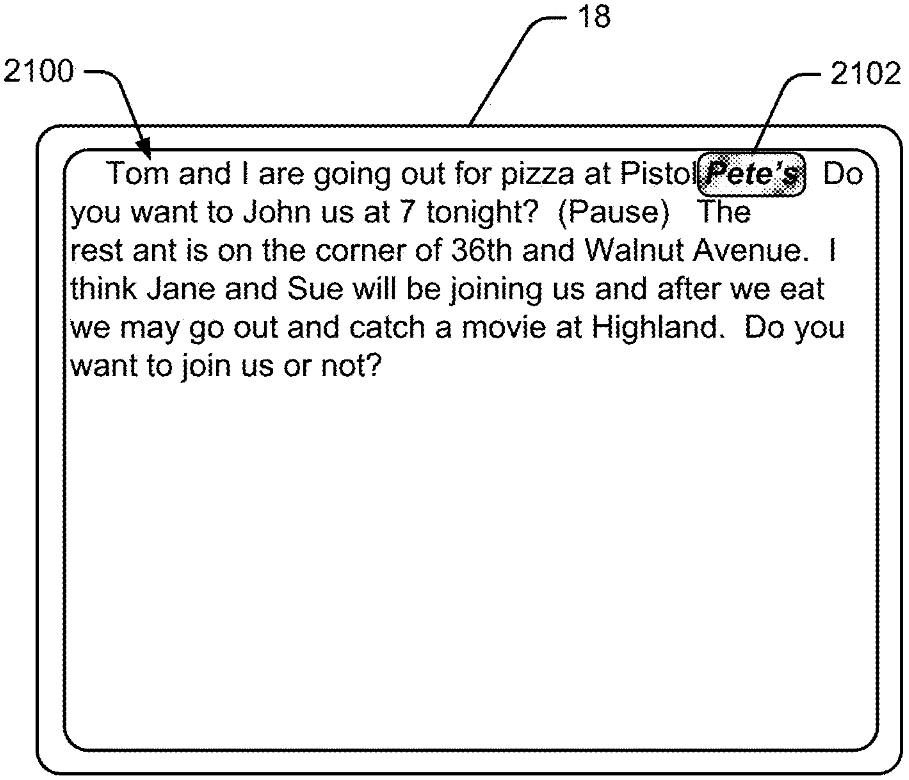
FIG. 56 is a screen shot showing an AU interface where a first error correction is shown distinguished in multiple ways.

Referring now to FIG. 56, a screen shot of an AU interface is shown that may be presented on a caption device display 18 that shows caption text that includes some errors where a first error is shown corrected at 2102 (e.g., the term "Pal's" has been corrected and replaced with "Pete's"). As illustrated the new term "Pete's" is visually distinguished in two ways including highlighting and changing the font to be bold and italic.

Figure 57:
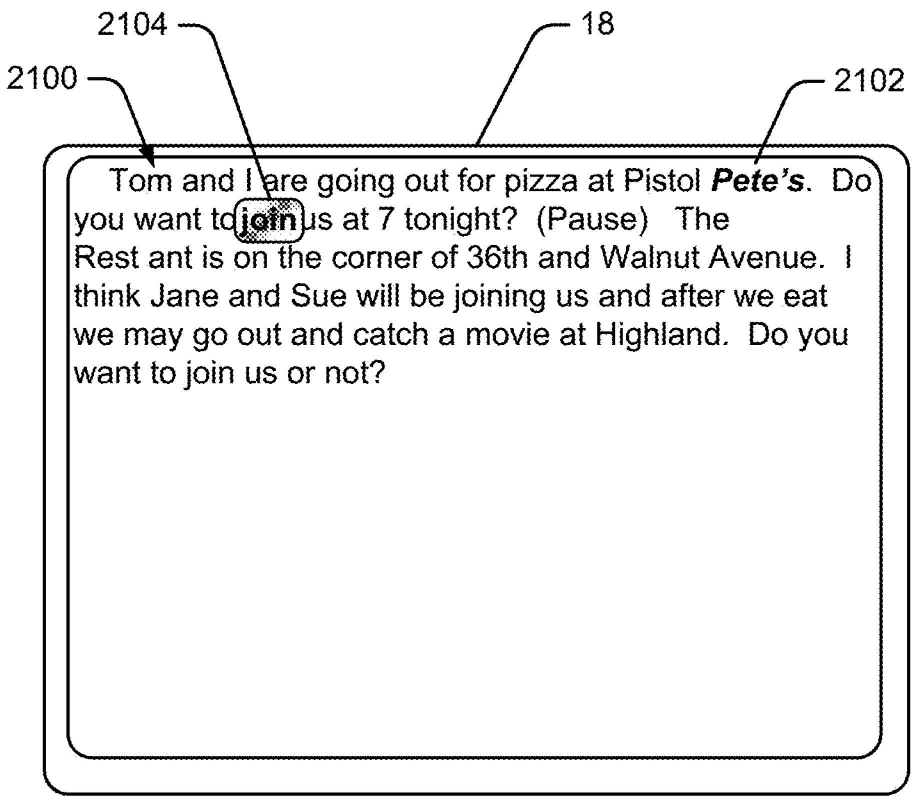
FIG. 57 is a screen shot similar to FIG. 56, albeit where the first error correction is shown in a less noticeable way and a second error correction is shown distinguished in multiple ways so that the distinguishing effect related to the first error correction appears to be extinguishing.

Referring also to FIG. 57, a screen shot similar to the FIG. 56 shot is shown, albeit where a second error (e.g., "John") has been corrected and replaced in line with the term "join" 1204. In this example, the correction distinguishing rules are that a most recent error correction is highlighted, bold and italic, a second most recent error correction is indicated only via bold and italic font (e.g., no highlighting) and that when two error corrections occur after any error correction, the earliest of those corrections is no longer highlighted (e.g., is shown as regular text). Thus, in FIG. 57, the error correction at 1202 is now distinguished by bold and italic font but is no longer highlighted and the most recent error correction at 1204 is highlighted and shown via bold and italic font.

Figure 58:
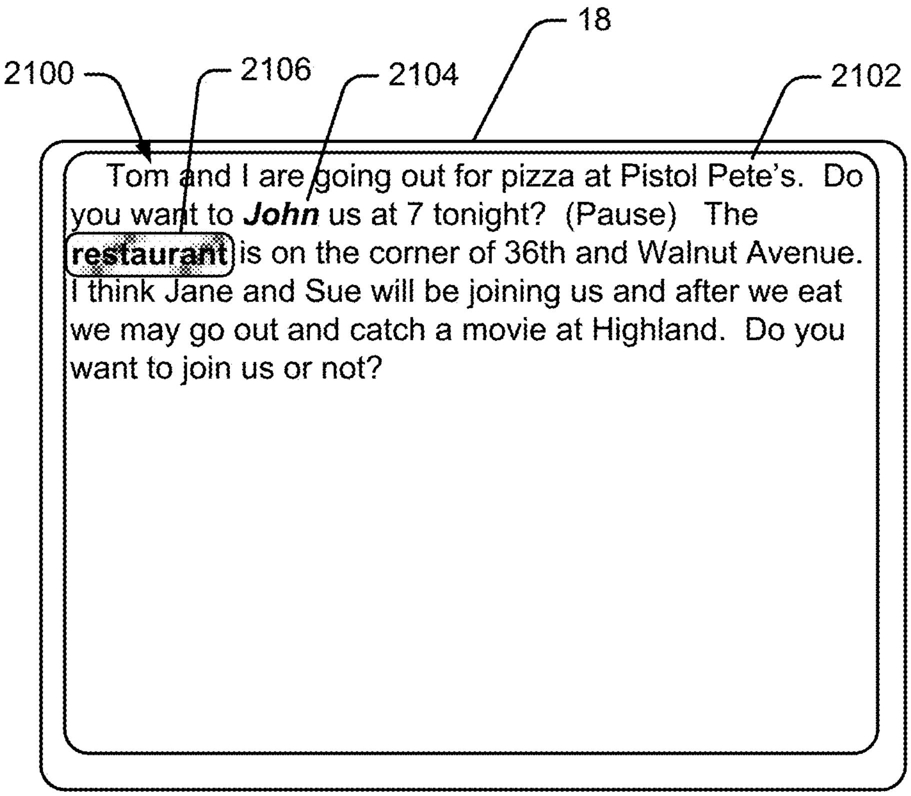
FIG. 58 is similar to FIGS. 56 and 57, albeit showing the interface after a third error correction is presented where the first error correction is now shown as normal text, the second is shown distinguished in an extinguishing fashion and the third error correction is fully distinguished.

Referring to FIG. 58, a screen shot similar to the FIG. 56 and FIG. 57 shots is shown, albeit where a third error (e.g., "rest ant") has been corrected and replaced in line with the term "restaurant" 2106. Consistent with the correction distinguishing rules described above, the most recent correction 1206 is shown highlighted, bolded and italic, the prior error correction at 1204 is shown bolded and italic and the error correction at 1202 is shown as normal text with no special effect.

In any case where a second CA is taking over primary captioning from either an ASR or a first or initial CA at a specific point in an HU voice signal, the system may automatically broadcast at least a portion of the HU voice signal that precedes the point at which the second CA is taking over captioning to the second CA to provide context for the second CA. For instance, the system may automatically broadcast 7 seconds of HU voice signal that precede the point where the second CA takes over captioning so that when the CA takes over, the CA has context in which to start captioning the first few words of the HU voice signal to be captioned by the CA. In at least some cases the system may audibly distinguish HU voice signal provided for context from HU voice signal to be captioned by the CA so that the CA has a sense of what signal to caption and which is simply presented as context. For instance, the tone or pitch or rate of broadcast or volume of the contextual HU voice signal portion may be modified to distinguish that portion of the voice signal form the signal to be captioned.

Systems have been described above where ongoing calls are automatically transferred from a first CA to a second CA based on CA expertise in handling calls with specific detected characteristics. For instance, a call where an HU has a specific accent may be transferred mid-call to a CA that specializes in the detected accent, a call where a line is particularly noisy may be transferred to a CA that has scored well in terms of captioning accuracy and speed for low audio quality calls, etc.

One other call characteristic that may be detected and used to direct calls to specific CAs is call subject matter related to specific technical or business fields where specific CAs having expertise in those fields will typically have better captioning results. In these case, in at least some embodiments, a system processor may be programmed to detect specific words or phrases that are tell tail signs that call subject matter is related to a specific field or discipline handled best by specific CAs and, once that correlation is determined, an associated call may be transferred from an initial CA to a second CA that specializes in captioning that specific subject matter.

In some cases an AU may work in a specific field in which the AU and many HUs that the AU converses with use complex field specific terminology. Here, a system processor may be programmed to learn over time that the AU is associated with the specific field based on conversation content (e.g., content of the HU voice signal and, in some cases, content of an AU voice signal) and, in addition to generating an utterance and text word dictionary for an AU, may automatically associate specific CAs that specialize in the field with any call involving the AU's caption device (as identified by the AU's phone number or caption device address). For instance, if an AU is a neuroscientist and routinely participates in calls with industry colleagues using complex industry terms, a system processor may recognize the terms and associate the terms and AU with an associated industry. Here, specific CAs may be associated with the neuroscience industry and the system may associate those CAs with the calling number of the AU so that going forward, all calls involving the AU are assigned to CAs specializing in the associated industry whenever one of those CAs is available. If a specialized CA is not available at the beginning of a call involving the AU, the system may initiate captioning using a first CA and then once a specialized CA becomes available, may transfer the call to the available CA to increase captioning accuracy, speed or both.

In some cases it is contemplated that an AU may specify a specific field or fields that the AU works in so that the system can associate the AU with specific CAs that specialize in captioning for that field or those fields. For instance, in the above example, a neuroscientist AU may specify neuroscience as her field during an caption device commissioning process and the system may then associate ten different CAs that specialize in calls involving terminology in the field of neuroscience with the AU's caption device. Thereafter, when the AU participates in a call and requires CA captioning, the call may be linked to one of the associated specialized CAs when one is available.

In some embodiments it is contemplated that a system may track AU interaction with her caption device and may generate CAS preference data based on that interaction that can be used to select or avoid specific CAs in the future. For instance, where an AU routinely indicates that the captioning procedure handled by a specific CA should be modified, once a trend associated with the specific CA for the specific AU is identified, the system may automatically associate the CA with a list of CAs that should not be assigned to handle calls for the AU.

In some cases it is contemplated that the system may enable an AU to indicate perceived captioning quality at the end of each call or at the end of specific calls based on caption confidence factors or some other metric(s) so that the AU can directly indicate a non-preference for CAs. Similarly, an AU may be able to indicate a preference for a specific CA or that a particular caption session was exceptionally good in which case the CA may be added to a list of preferred CAs for the AU. In these cases, calls with the AU would be assigned to preferred CAs and not assigned to CAs on the non-preferred list whenever possible. Here, at the end of each of a subset of calls, an AU may be presented with touch selectable icons (e.g., "Good Captioning"; "Unsatisfactory Captioning") enabling the AU to indicate satisfaction level for captioning service related to the call and those satisfaction indications would be used to categorize CAs for the specific AU.

Sensor(s) Added to AU System

A CA workstation is described above with respect to FIGS. 54 and 55 where a camera is integrated into the CA station and a station processor uses images from the camera to track a sight trajectory for the CA so that what a CA is viewing can be used as a system input for one or several different applications or system features. In at least some embodiments it is contemplates that an AU captioned system may be similarly equipped with a camera and eye or at least face tracking software so that an AU's sight trajectory or likely sight trajectory can be used as another input for controlling caption system operations.

Figure 62:
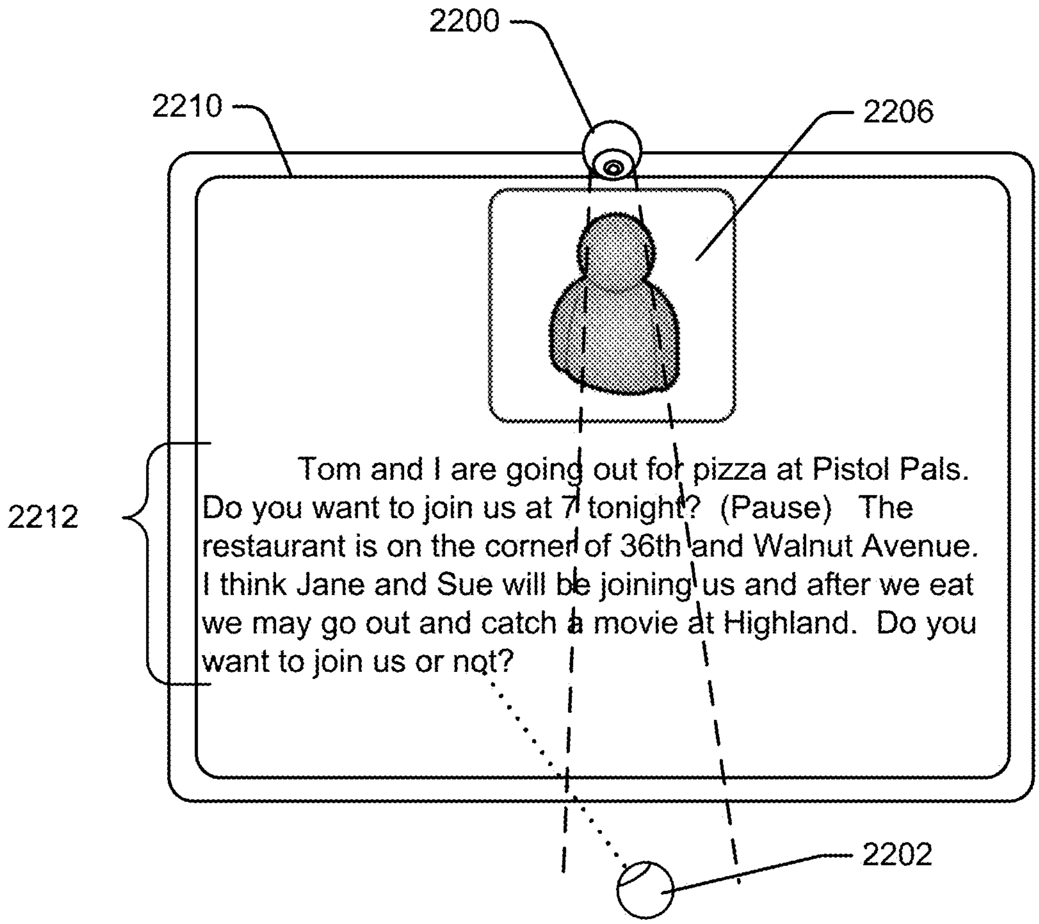
FIG. 62 shows a captioned device display screen including an eye tracking camera that is consistent with at least some aspects of the present disclosure.

To this end, see FIG. 62 that includes a camera 2200 aimed toward an area adjacent a display screen 2210 in which an AU's eyes 2202 are likely to be located when the AU is viewing the display screen (e.g., within 2-3 feet of the display screen). Camera 2200 generates real time images of an AU's eye(s) 2202 which are examined by a system processor to identify the sight trajectory of the AU's eye gaze and, more specifically, what (e.g., which "object") the AU is instantaneously looking at on the display screen. For instance, in some cases, the processor will ascertain a word or phrase within a caption field 2212 instantaneously viewed by the AU within presented captioned text. In other cases, the system may ascertain that the AU is instantaneously looking directly at a telepresence type video field or window 2206 showing a HU on the other end of an ongoing call. In the FIG. 62 example, the AU is instantaneously looking at the last captioned word "not".

It has been recognized that in many cases an AU's gaze or sight trajectory can be used as a rough proxy for an AU's instantaneous understanding/confusion related to an ongoing call. To this end, in most cases when an AU uses a captioned phone device or system as described in the present disclosure, when the AU fails to hear or comprehend a segment of the HU's voice signal and therefore is instantaneously confused, the AU will immediately look to the captioned device display screen to see captions associated with the HU voice signal to clarify understanding. More specifically, in most cases, when an AU is confused, the AU will look to the most recent captions segment presented on the display screen as those captions are best aligned with the instant in time at which the AU became confused. In many cases, when an AU understands a HU voice signal, the AU will look away from the captioning display screen or captioned text so as to not be distracted by the presented text (e.g., to concentrate on the audio part of the communication as opposed to text captions, minimize eye strain, concentrate vision on some other object within the AU's vicinity, etc.). It is worth noting that in many cases, AUs are only partially hearing impaired (e.g., can hear at least somewhat) and in fact, for most of their lives, had perfectly good hearing capability and are accustomed to and even prefer consuming HU voice signals audibly, not via captions, so sight trajectories away from captions are often chosen.

Thus, in many cases, an AU's instantaneous gaze can be used as a proxy for when the AU is confused by an HU voice signal segment and when the AU understands the segment. In many cases, even when captioning is enabled, most of the time an AU simply does not view captions. For instance, an AU may prefer to look out a window adjacent her captioned device while communicating with and audibly understanding an HU. As another instance, in a case where a telepresence type HU video 2206 (see again FIG. 70) is presented adjacent text captions, an AU may more often than not view the telepresence video to make "virtual eye contact" with the HU during many call segments. Again, the AU may only look at captions when periodically confused.

In at least some embodiments, an AU device or system processor may be programmed to control the captioning service automatically so that different quality services are provided when the AU is viewing captions and when the AU is not viewing the captions. For instance, when an AU is currently looking away from a captioned device display screen (e.g., toward an area laterally adjacent the display screen), the system may facilitate a relatively inexpensive and quick captioning process such as, for instance, one where high speed ASR text is generated and presented on the display screen without CA error correction. Here, the high speed ASR text gives a sense that the captioning process is ongoing and presents essentially real time glanceable captions that are correct most of the time.

In the above example, if the AU changes sight trajectory and looks at the captioned text or screen, the new trajectory is detected and a CA may be automatically and immediately connected to the call and presented a most recent segment of ASR generated text (e.g., last 10 seconds, last 10 words, etc.) as well as HU voice signal associated with the most recent ASR generated text segment for captioning. Here, the CA corrects any perceived errors in the text and those corrections are transmitted to the AU device to immediately drive in line or other caption error corrections. In at least some cases, while the AU's sight trajectory is still aimed at the display screen and, more specifically, the caption field 2212 (see again FIG. 62), the CA remains connected to the call to facilitate ongoing error corrections.

If the AU again changes sight trajectory to look away from the display screen or caption field 2212 prior to the CA correcting any or some of the perceived errors in the most recent text segment, the CA may be disconnected from the call or CA error correction may be disabled based on the assumption that the AU's new sight trajectory is a proxy indicating that the AU understands the most recent HU voice communication (e.g., there is no need for CA error correction if the AU is satisfied with her understanding of the HU voice signal). In this example, once captions are requested, at least some captions are always presented immediately upon generation (e.g., the ASR captions) and CA error correction is only enabled when an AU's sight trajectory indicates likely confusion.

In other embodiments where a first CA generates captions and a second CA error corrects, the first CA may be persistently on a call for generating initial uncorrected captions and the second CA may only be linked to the call to error correct when the AU's sight trajectory is again aimed at the display screen captions.

While the above description of AU sight trajectory input for controlling system operation is described in the context of a processor that distinguishes between AU sight trajectory aimed at captions and away from a display screen, the system may enable and disable CA error correction of recent ASR text when an AU's sight trajectory is at the caption field and at the telepresence video 2206, respectively. Thus, when an AU is making virtual eye contact with an HU presented in field 2206 (e.g., looking at the HU image in field 2206), CA error corrections may be disabled as the AU is not viewing the captions anyway. Then, when an AU looks at the presented captions field 2212, CA error correction for the most recently presented text may be enabled, at least until the AU again changes sight trajectory and looks away from the caption field 2212.

Other system operation may be automatically controlled based on AU sight trajectory. To this end, for instance, where ASR captions are instantaneously presented to an AU and a CA error corrects ASR captions and is behind in error correcting by at least some threshold duration (e.g., 20 seconds), when the AU changes gaze from looking away from presented captions to looking at the presented captions, the CA may be automatically skipped ahead to the most recently presented captions in order to correct captions most commensurate in time with the instant that the AU's gaze indicates possible confusion. Here, in at least some cases, intervening caption errors between the point the CA was correcting at and the recent captions may simply be ignored and not corrected. In other cases, intervening errors may be corrected by a second temporary CA or by an attending CA at a later time (e.g., after a call ends, during a silent duration of an on-going call, etc.).

In at least some cases the camera and processor that assess AU sight trajectory only needs to be able to assess sight trajectory very granularly as opposed to precisely. In this regard, the system may only need to assess two states, one in which an AU's sight trajectory subtends the caption field 2012 on a screen and all other trajectories. Thus, here, any time an AU's sight trajectory subtends any location within caption field 2012, it may be assumed that the AU is audibly confused so that high quality CA corrected captions are required and, any time an AU's sight trajectory is aimed outside the caption field 2012, it may be assumed that the AU is not audibly confused so that lower quality ASR captions are optimal. Thus, in at least some embodiments the camera and processor are programmed to recognize gaze at the captioned text field 2012 and gaze along any other trajectory.

In other cases more precise AU sight trajectory may be required such as, for instance, a level of precision such that the processor can calculate which word in captioned text presented is being focused on. For instance, in some cases it may be assumed that the last word an AU focuses on within presented text prior to looking away is the point at which the AU's understanding can be assumed. For instance, in FIG. 62, if an AU last gazed at the phrase "Walnut Avenue", the processor may be programmed to move the CA error corrections up to the point in the text just after the "Walnut Avenue" phrase.

In some cases the system may automatically change appearance of objects on the AU captioned device display screen based on AU sight trajectory. For instance, when an AU's sight trajectory switches from telepresence video field 2206 to caption field 2012, the caption field and related text may be enlarged and the telepresence field 2206 may be shrunk to a smaller size to accommodate larger captions. When the AU again looks toward telepresence field 2206, caption field 2012 size may again be reduced and field 2206 size may be increased. As another instance, when an AU views telepresence field 2206 (e.g., sight trajectory is aimed at that field), field 2206 may be bright and caption field 2212 may be dimmed and when the AU's sight trajectory is altered to aim at caption field 2212, that field may be bright while the telepresence field 2206 is dimmed. Other visual characteristics of different fields may also be modified based on AU sight trajectory and in some cases combinations of characteristics may be modified.

While sight trajectory is often a good proxy for AU confusion/understanding state, other AU activities may also be used in a similar fashion. For instance, orientation of an AU's head and more specifically face may be a good proxy for sight trajectory and therefore the AU's confusion/understanding. Thus, where an AU's face is oriented to face the captioned device display screen, the processor may be programmed to link a CA to an ongoing call for error correction and when the AU's face is not oriented to face the captioned device screen, the processor may be programmed to disconnect the CA from an ongoing call as error correction would not be required.

Here, the idea is that in many cases CA error correction is not needed most of the time and therefore, N CAs should be able to provide captioning services when required for more than N simultaneous calls and thus the cost to provide caption services should be able to be reduced. For instance, in a simple case where ten simultaneous ongoing calls occur and each AU views captions during only 10% of each call, three or four CAs should be able to provide error corrections for all of the calls assuming that at least some of the time three or four AUs will view captions simultaneously.

In at least some cases an AU system or device processor may be programmed to monitor AU sight trajectory over time and, if the AU routinely views captions while using the captioned device, may keep a CA connected to a call persistently even when the AU periodically looks away from the display screen. For instance, if an AU's sight trajectory is aimed at the caption text field 2012 four or more times in a minute, an error correcting CA may remain linked to a call thereafter or until some other threshold of time elapses without the AU looking at the caption field (e.g., the AU looks away from the field for at least one minute). AU sight trajectory tracking over time may be during a single call or between calls so that, if a specific CA routinely looks at the caption field many times during a call, a CA may always be assigned to that AU's calls and persistent provide error correction when needed.

In still other cases, whether or not a CA is connected to a call to correct errors in recent captions when an AU's sight trajectory is aimed at captions or a captioned device display may depend on confidence factors associated with the recent captions. For instance, in a case where an ASR assigns confidence factors to ASR captioned words or phrases, if a high confidence factor is assigned to the most recent ASR caption phrase presented on a captioned device display when an AU looks at the phrase, the system processor may forego linking an error correcting CA to the call as the captions presented would highly likely be accurate. In this same case if the confidence factor assigned to the most recent ASR generated phrase is low, the processor may automatically link an error correcting CA to a call when an AU's sight trajectory is at the display screen of caption field. This feature should further reduce the number of error correcting CAs required to handle a plurality of simultaneous calls.

Figure 63:
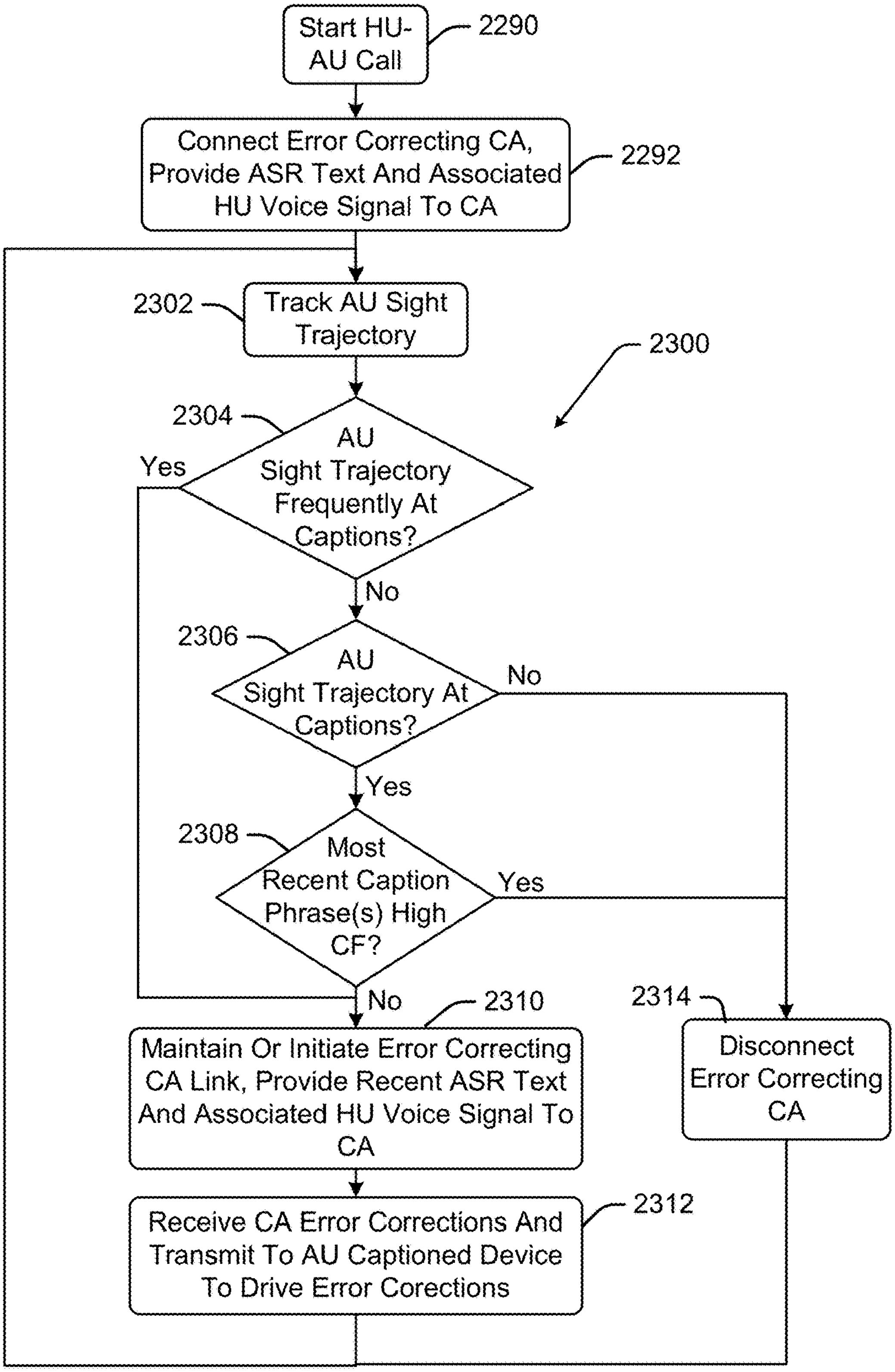
FIG. 63 includes a flowchart that shows a process that is consistent with at least some aspects of the present disclosure.

FIG. 63 includes a flow chart illustrating a process 2300 for using AU sight trajectory to control CA error correction functions that is consistent with at least some aspects of the present disclosure. At process block 2290 an HU-AU call is initiated and at block 2292 an error correcting CA is linked to the call and ASR text and associated HU voice signal are presented to the CA for error correction. At block 2302, images from a captioned device camera 2200 (FIG. 62) are examined by a processor to identify AU eye or sight trajectory. At decision block 2304 the processor determines if the AU's sight trajectory is frequently directed at the caption field 2012 (see again FIG. 62). Here, what constitutes "frequent" is a matter of designer choice and sets a threshold for when CA error correction will persistently be enabled because an AU routinely views caption text. For instance, again, one threshold may be if an AU views captions four or more times within a minute, another may be that an AU views captions more than 40% of the time during a recent call segment (e.g., 60 seconds), etc.

In FIG. 63, if an AU frequently views captions at block 2304, control passes down to block 2310 where the link to the CA is maintained and CA error correction persists. At block 2304, if the AU does not frequently view the captions, control passes to block 2306 where a processor determines if the AU is instantaneously looking at the captions on the device display. If the AU is not currently looking at the captions on the display, control passes to block 2314 where the CA is disconnected form the call and then control passes back up to block 2302 where the process continues to cycle. Thus, here, cost associated with CA error correction is avoided for at least a portion of a call.

Referring still to FIG. 63, at block 2306 if the AU's instantaneous sight trajectory is at the displayed captions, control passes to decision block 2308 where the processor next determines if ASR confidence factors for the most recent captions phrase or phrases is high (e.g., above some threshold) or low. Where the confidence factor(s) is high, control passes to block 2314 where, again, the CA is disconnected from the call to save costs associated with CA error correction. Where the confidence factor(s) is high, control passes from block 2308 to block 2310 where the link to the error correcting CA is wither maintained or a new link to an error correcting CA is established and ASR text and associated HU voice signal for recent ASR phrases is presented to the linked CA for error correction. After block 2310 control passes to block 2312 where CA error corrections are transmitted to the AU captioned device to drive in line or other caption error correction after which control passes back up to block 2302 and the process described above continues to cycle.

Figure 63A:
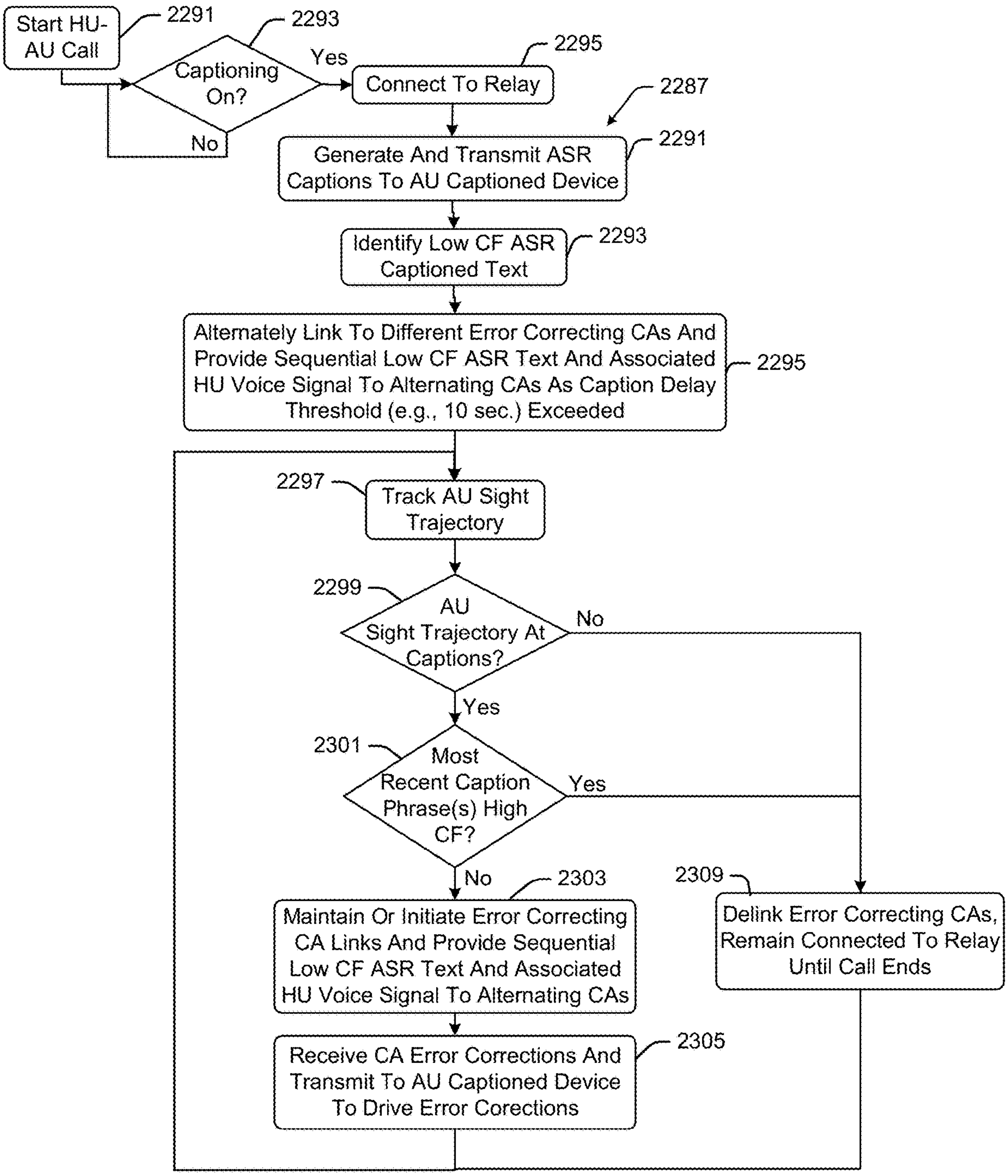
FIG. 63A includes a flowchart of a process that is consistent with at least some aspects of the present disclosure.

FIG. 63A includes a flowchart that illustrated another captioning process 2287 where CA error correction only occurs for low confidence ASR text and only when an AU sight trajectory is directed at ASR captions and where alternate CAs handle consecutive low confidence ASR text segment corrections. At block 2291 an HU-AU call commences and at decision block 2293 a processor determines if an AU has requested captioning or if captioning is set as a default. Where captioning is not on control loops back through block 2293 where the system waits for caption initiation. Once captioning is initiated control passes to block 2295.

Referring still to FIG. 63A, at block 2295, a system device links to the relay and the HU voice signal is provided to the relay. At block 2291 an ASR generates captions that are transmitted to the AU device to be presented immediately to the AU for consideration. At block 2293 the ASR or some other system processor identifies any low confidence factor ASR captioned text. When a low confidence factor text word or phrase is identified, at 2295 that word or phrase along with surrounding text or phrases for context are sent to a linked CA for broadcast, viewing, consideration and when needed, error correction by the CA. Here, the CA is linked to the call and receives only one or a small number of caption segments, each including a single low confidence word or phrase for error correction or affirmation (e.g., no correction if accurate). For instance, in at least some cases low confidence text segments will be presented to the first CA until the first CA error correction delay exceeds some threshold duration of HU voice signal (e.g., 10 seconds) (see block 2295).

In other cases the first CA may be provided a predefined small number of low confidence factor texts for consideration (e.g., 2, 5, 10, etc.). In still other cases the first CA may handle any low confidence factor text corrections that occur during a 40 second segment of the call. Once the low confidence caption segment(s) is corrected or affirmed, the CA is delinked from that call and is available for other calls.

When a next low confidence caption text which follows the texts considered by the first CA is identified, a link to a second CA is established and that next low confidence text along with surrounding words or phrases for context is presented to the second linked CA for broadcast, viewing, consideration and, when needed, error correction by the second CA. Again, the second CA is only linked to the call to handle a subset of low confidence text error correction tasks and is then delinked from the call and is available to handle error corrections on a different call. This process of consecutively linking to different CAs to handle sequential low confidence factor text consideration continues until the call ends or some other event causes CA error corrections to cease (e.g., ASR accuracy exceeds some required threshold so CAs are delinked generally, the AU looks away from the captions so there is no need for CA level accuracy, etc.). Between CA linkages to a call, while no CA may be linked to the call, in at least some embodiments the communication line or link to the relay remains intact so that relining to a CA when next needed can be expedited.

Referring still to FIG. 63A, at block 2297 a system processor (e.g., AU captioned device processor) tracks AU sight trajectory and at decision block 2299 the processor determines if the AU is looking at the captions. Where the AU is not looking at the captions, control passes to block 2309 where any CA that is linked to the call to receive HU voice signal is delinked from the call, again the call-relay link or communication line is maintained during the duration of the call in at least some embodiments. After block 2309 control passes back up to block 2297 where the process described above and hereafter continues to loop.

Referring again to FIG. 63A, at block 2299, where the AU is looking at the captions on the captioned device display, control passes to block 2301 where the processor determines if recent caption phrases (e.g., in last 10 seconds or including phrases currently presented on the AU captioned device display) are high confidence or low confidence. Where the most recent captions are all high confidence, control passes again to block 2309 where the processor delinks any linked CAs while maintaining the relay connection so a new CA linkage can be established quickly when needed.

At block 2301, when a low confidence factor is associated with at least one of the most recent ASR caption phrases, control passes to block 2303 where an existing CA link is maintained or, if there is no existing CA link, a new CA link is established and the low confidence factor ASR text and associated HU voice signal is presented to the linked CA for correction consideration. CA error corrections are received at 2305 and are transmitted to the AU captioned device for in line or other correction. After block 2305 control loops back up to block 2297 where the process above continues to loop.

Other rules for caption system control based on AU sight trajectory and other sensed AU factors are contemplated.

AU sight trajectory can be used to optimize system operation in other ways. For instance, where an AU looks away from captions presented on a captioned device display for some time (e.g., at least a threshold duration (20 seconds), if CA error corrections are behind HU voice signal by some duration, the CA may be automatically moved ahead in the HU voice signal to reduce error correction latency. For example, assume a CA is 30 seconds behind on error correcting an HU voice signal and that for the last 20 seconds, the AU has been looking away from the captions presented on her captioned device display. In this case, again, the AU's sight trajectory away from the captions is often a good proxy indicating that the AU understands the HU voice signal recently heard (e.g. during the last 20 seconds). In this case, the system may skip the CA ahead by 20 seconds within the HU voice signal and ASR captions so that the CA immediately error corrects more recent ASR captions that are better aligned with AU confusion that may occur next. Here, the benefit is that ASR captions are corrected that are most likely to be associated with audio that causes AU confusion. Again, AU's typically refer to captions when confused and therefore most recent captions are typically associated with AU confusion and accuracy of those captions is more important than accuracy of captions that the AU does not view during a call.

Automatically Adjusting Captioning System

The captioning systems disclosed above have many different operating parameters and characteristics such as, for instance, more or less ASR captioning and error correction, more or less CA captioning and error correction, characteristics related to when ASRs are used for which calls as well as which ASRs are used for different parts or calls, when ASRs are selected, when line connections are made, how text is presented to CAs, AUs and, in some cases, HUs, how and when text errors are corrected and indicated, etc. While rules governing captioning characteristics may be programmed and automatically implemented or, in some cases, at the request of an AU, a CA or an HU, in some cases it is contemplated that the system may be programmed to learn user preferences or tendencies so that the system can automatically adjust and optimize operation for specific users. For instance, where an AU routinely firms up caption text presented on her captioned device display screen (e.g., see icon 221 in FIG. 17) (e.g., during an ongoing call or during a string of several calls) prior to CA error correction of the most recent presented text, the system may automatically adjust operation to remove the CA from the captioning process at a lower accuracy threshold than a default initial threshold so that a full ASR system becomes operational more rapidly. Here, the idea is that if the AU essentially never or only minimally benefits from CA error corrections because of how the AU uses the system, the system adjusts to take out the "expensive" CA service more rapidly to reduce overall cost.

As another instance, where an AU routinely requires text catch up so that CA error corrections are always within the most recent threshold duration of an HU voice signal (e.g., the last 15 seconds), the system may automatically adjust operation so that a CA cannot fall behind a current HU voice signal by more than 15 seconds. Here, the adjustment may manifest itself in a CA interface where ASR text corresponding to HU voice signal prior to the most recent 15 seconds is firmed up and cannot be corrected or otherwise changed by the CA which ensures that the CA is always correcting errors that are commensurate with the text that the AU most cares about. In still other cases, other sensed AU activities may be used to automatically adjust system operation.

Other Text Firming Rules

Several different rules for firming up text or errors generated by an ASR or a CA have been described above where one or the other or both of an ASR and a CA are prohibited at some point from further caption error corrections. In other embodiments it is contemplated that there may be no rules for firming up text so that either of a CA or an ASR that generates a most recent caption error correction can drive error corrections on a CA display screen or in captions presented to an AU. In other cases there may be other tie breaker rules such as, for instance, if a second error correction occurs even a split second after a first, the second error correction is implemented or, in the alternative, the first error correction is implemented, and the non-implemented correction is discarded. In still other cases, any CA error correction to a specific word or phrase may be treated as truth and firm up the corrected text while all other text that is not CA corrected may still be fair game for ASR error corrections. Other rules for implementing conflicting ASR and CA errors are contemplated.

AU Split Screen Viewing

Figure 64:
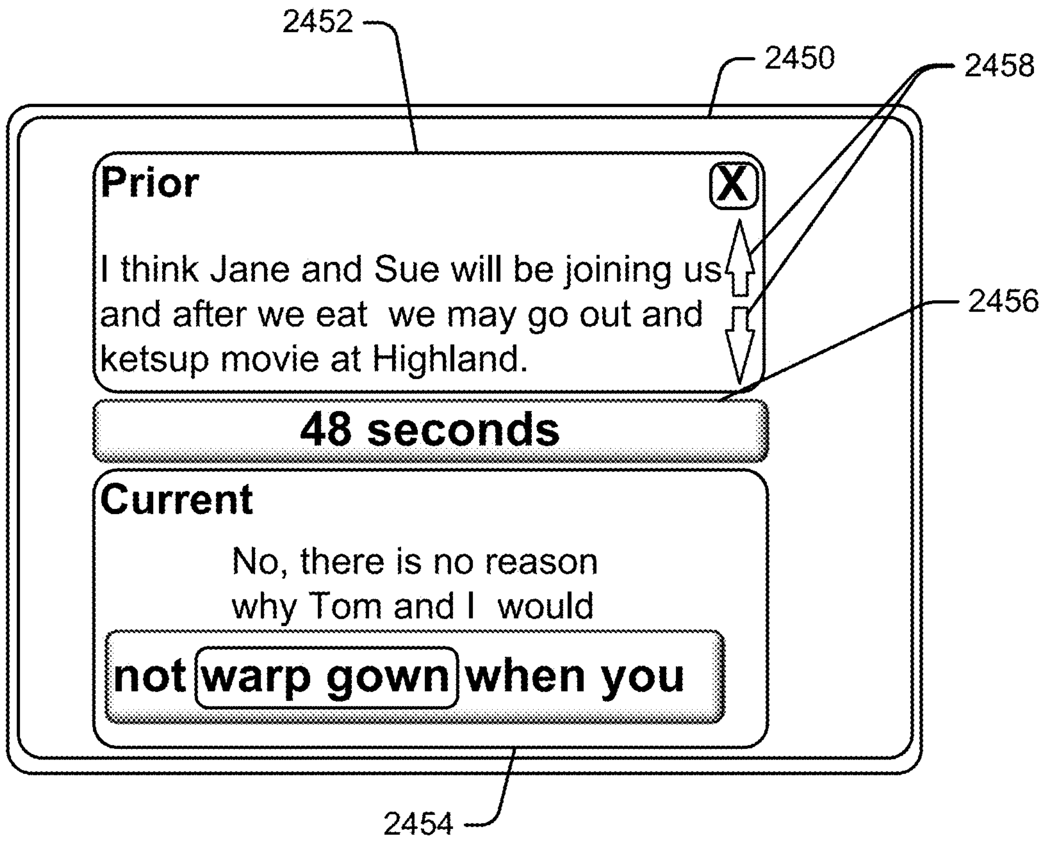
FIG. 64 is a captioning screen shot that is consistent with at least some aspects of the present disclosure.

It has been recognized that in at least some cases an AU may want to have real time Hu voice signal captioning while also having the ability to simultaneously view prior call captions during an ongoing call. For instance, during a long call, an AU may be interested in reviewing what an HU said several minutes ago. In some cases the AU may be able to simply scroll up on captions presented on a captioned device display screen to see prior captions. In a particularly advantageous case, when an AU scrolls up so that real time captions would no longer fit on a display screen if all intervening captions were also presented, a processor driving the captioned device display may be programmed to automatically split the display screen so that two caption sets, an archived set from some time back and a real time set are presented simultaneously without presenting intervening captions. To this end, see for instance, FIG. 64 where an AU interface 2400 is shown that includes a split dual caption screen including an upper screen showing prior captions from earlier during an ongoing call and real time instantaneous captions. On screen selectable arrow icons 2458 are provided in the prior captions field that are selectable to move back and forth in time to different prior caption segments.

Dual HU Video

Verbal communication is only one way that people express themselves. Other ways are through gestures, posture, and facial expressions. Telepresence type video enhancements (see 1412 in FIG. 44) can be added to some captioned device interfaces to enrich HU-AU communications where an AU has the ability to see an HU in real time and, in at least some cases, during playback of an HU voice segment. One issue with telepresence type videos is that they typically only give an AU a single HU view and therefore cannot provide a complete sense non-verbal expression. To this end, a telepresence video is typically obtained from a vantage point where just the upper torso of an HU can be viewed where posture and gesture related communication can be gleaned but where facial expressions may be more difficult to discern. Here, in some cases a system user observing a telepresence video maybe able to adjust zoom to zoom in on an HU's face to see facial expressions but then the observer cannot see posture and gestures.

In at least some embodiments it is contemplated that an AU interface may present more than one simultaneous telepresence type video to an AU to increase the amount of non-verbal communication queues that an AU can pick up on during HU communication. Here, a system processor may generate two or more HU views using images/video captured by a single HU device camera. For instance, the system processor may be located at the AU captioned device in some embodiments. In other embodiments, the system processing required for generating two or more HU videos may be at the HU device. In still other cases the system processor may be a relay processor.

In at least some cases a first torso type telepresence video may be generated and a second facial type telepresence video may be generated using images from one or more HU device cameras and both videos may be presented to the AU simultaneously via a single interface. In this regard, see FIG. 65 that includes captioned text in field 2500, a torso video in field 2502 and a facial video in field 2504. As shown, the facial video 2504 is positioned just under the captioned device camera 2200 so that while the AU is looking at the facial video 2504, camera 2200 can obtain an AU video optimal for creating a sense of eye contact for the HU on the other end of a call.

Where a facial video is generated, the system processor may perform a centering function as part of the video generation process where the processor automatically centers the HU's face within the video even if the HU is moving laterally or up-down with respect to her device camera. Thus, the HU's face may remain essentially stationary within field 2504 so that her facial expressions can be easily observed without distracting movement. In at least some cases a similar centering function may be performed on the torso video representation in field 2502.

In at least some cases where an AU device tracks AU sight trajectory, the AU device processor may be programmed to move interface objects about on a display screen automatically to optimize the sense of direct eye contact with the HU as the AU looks at different objects on the interface. For instance, in FIG. 65, while the AU is looking at facial video field 2504, that field may be presented as shown just under the device camera 2200. If AU changes sight trajectory to view caption field 2500, the FIG. 65 interface may be rearranged so that the captions filed 2500 is moved up to a location just below camera 2200 with facial video field 2504 moved to a different location on the interface. This process may be repeated any time the AU changes sight trajectory from one object to another so that the currently viewed object is located proximate the camera and others are moved to different locations. The rearrangement of objects on the display screen may be gradual so that the rearrangement activity does not distract the AU.

Confidence Factors for CA Generated Text

Several of the systems described above include features where confidence factors are generated for ASR engine captions. In at least some embodiments where a CA generates captions (e.g., listens to HU voice signal and types captions or revoices to voice trained software which then generates CA captions), the system may be programmed to automatically generate confidence factors for each CA generated word or phrase. For instance, in a case where a CA types captions, a system processor may run a parallel ASR engine to generate ASR captions and may generate confidence factors associated with each ASR word or phrase. The processor may compare high confidence ASR word captions to CA generated captions and, when there is a mismatch (e.g., on a scale of 1 to 10, a difference of more than 2, 3, 4, or 5), the processor may visually distinguish (e.g. highlight, underline, etc.) the CA generated word in captions that are presented to the CA for error correction. In addition, the processor may present the ASR captioned word or phrase (e.g., hovering over the possible error text in the CA generated text) for quick user selection.

As another instance, in a case where a CA revoices the HU voice signal to an ASR trained to the CA voice to generate CA captions, the ASR trained to the CA voice may generate confidence factors for each caption word or phrase based on how many close caption options exist for each specific word. When there are several close options, each of which makes grammatical sense, a confidence factor would be low. Other factors for assessing caption confidence factors for specific words are contemplated. Here, a system processor would visually distinguish CA generated words in captions that have a low confidence factor presented to the CA for error correction.

In cases where a CA types captions and an ASR generates ASR captions in parallel and an initial ASR caption for a word matches a CA generated caption for the same word, if the ASR generates a low confidence factor for the word, a system processor may be programmed to visually distinguish the low confidence word for the CA during error correction.

CA Involvement Based on Pool of Available CAs

In at least some cases it is contemplated that the number of CAs available and not captioning calls for a service provider will fluctuate. For instance, where a relay call center has 500 CAs working during a morning shift to handle incoming calls, at times essentially all (e.g., 90%) of the CAs may be linked to different calls and at other times it may be that only 50% of CAs are linked to handle calls. When almost all CAs are linked to calls, there is a possibility that the remainder of CAs may be required to handle additional incoming calls in the near term. In contrast, when half the available CAs are not currently linked to ongoing calls, there is less possibility that the pool of available CAs to handle additional incoming calls will be depleted. For this reason, in at least some embodiments, the system may be set up to delink CAs from calls more speedily at some times than at others based at least in part on the available CAs to handle additional incoming calls.

For instance, on one hand, in a case where half of all relay center CAs are not linked to ongoing calls and therefore are available to handle incoming calls, even on a call where an ASR is highly accurate, the CA may remain linked to the call to facilitate error correction as that CA likely will not be needed to handle any likely near term influx of new calls.

On the other hand, in a case where 495 out of 500 CAs are currently linked to ongoing calls so that only 5 are available to handle new calls, the system may be programmed to identify many of the 495 calls currently attended to by CAs as candidates to be switched over to full ASR captioning or some captioning process whereby a CA is only required for a portion of call segments (e.g., where CAs are only linked to the call for short durations to only handle low confidence factor text and are delinked to handle low confidence call segments on other calls) and may then either automatically delink CAs from calls or at least portions of calls or suggest that option to attending CAs. Thus, here, of the 495 currently attending CAs, it may be that 120 can be freed up to handle additional incoming calls.

Here, it is contemplated that the system may have different threshold CA occupied levels at which different ASR accuracy is required prior to switching between different captioning processes. For instance, where less than 70% of CAs are currently handling ongoing call captioning, the ASR accuracy level required to switch from CA error correction to full ASR captioning may be high (e.g., 98%) and where 70% or more of CAs are currently handling ongoing call captioning, the ASR accuracy level required to switch from CA error correction to full ASR captioning may be relatively low (e.g., 94%). Here, there may be several CA occupied level thresholds associated with different ASR accuracy levels. In addition, there may be different thresholds for switching from full CA transcription and correction to ASR transcription with CA error correction and then from ASR transcription with CA error correction to full ASR transcription without CA error correction.

In at least some cases it is contemplated that one CA may be associated with two or more ongoing calls simultaneously in cases where CA error correction requirements for the two or more calls are minimal. Thus, for instance, in a case where error correction is only required 5% of the time on each of first and second calls, a single CA may be presented with HU text from each of the first and second calls for error correction. Here, text from the first and second calls may be presented in first and second side by side windows or as a single scrolling text with interleaved text segments from each of the first and second calls.

Up/Down Voice Signal Sampling

In at least some cases third party ASRs only accept audio at particularly high sample rates (e.g., 16K) while phone lines only carry smaller rate signals (e.g., 8K audio maximum). Thus, in some cases a relay server receiving an 8K or lower HU voice signal from an AU captioned device or directly from an HU phone device may be programmed to automatically convert the received voice signal to a higher sampling rate like 16K prior to sending that signal via the Internet or other communication network on the to third party ASR for transcription.

In at least some cases it is contemplated the a low to high rate sampling may be performed by the AU captioned device instead of by the relay server and that the AU captioned device may send the high rate HU voice signal directly to the third party ASR instead of through the relay server. Here, the advantage is that the cost associated with higher rate signal transcription is shifted to the AU instead of being born by the relay operator. This is important because many AUs will have an unlimited data plan and therefore high rate signals can be accommodated without additional expense. This should be contrasted with a case where a relay operator pays for data usage on a volume basis as opposed to being based on an unlimited data plan.

In cases where an AU captioned device up samples data from, for instance an 8K voice signal to generate a 16K voice signal which is sent to a third party ASR, in at least some cases ASR transcribed text may be transmitted to the relay server as opposed to the AU captioned device. In other cases the transcribed text may be transmitted back to the AU captioned device and then on from there to the relay for error correction. Where ASR text is sent directly to the AU captioned device that text may be immediately presented to the AU.

In cases where an AU captioned device up samples the HU voice signal and sends that along to a third party ASR, the AU captioned device may also send a lower sample rate signal on to the relay for CA captioning or error correction. Thus, for instance, the HU voice signal sent to the ASR may be 16K while the signal sent to the relay for CA captioning and/or error correction may be 8K. In still other cases the AU captioned device may even down sample an HU voice signal (e.g., 4K or 2K) prior to sending along to the relay in order to reduce relay data costs.

There are at least two advantages associated with an AU device up sampling an HU voice signal and sending that signal directly to a third party ASR instead of through a captioning relay. First, captioning latency is reduced if the voice signal is sent directly to the ASR as opposed to through the relay. Second, as indicated above, data transmission costs are shifted from the relay operator to the AU and are often covered by an unlimited data plan.

In at least some cases it is contemplated that an HU phone device that is internet capable may automatically generate and transmit a 16K (or greater as captioning requirements evolve and require higher sampling rates over time) HU voice signal directly to a third party ASR captioning service and transmit a lower sample rate HU voice signal to the AU captioned device or the relay for CA captioning and/or error correction. Here, the third party ASR may transmit captions and related data back to the HU device, to the AU captioned device and/or to the relay server. Thus, for instance, the ASR may transmit the captions to the HU device which then transmits the captions to one or each of the AU captioned device and the relay. As another instance, the ASR may transmit captions to the AU captioned device which then retransmits to the relay or to the relay device which then retransmits to the AU captioned device. As still one other instance, the AAU may transmit captions to each of the AU captioned device and the relay.

Similarly, captions form an ASR may be passed directly to an AU's captioned device and from there on to a relay for error correction.

Other Concepts

In cases where CA captioning delay or error correction lag time are presented to a CA or an AU (see FIGS. 17, 45, etc.), the lag time may be adjusted downward based on any silent periods within an HU voice signal. For instance, where a CA is captioning HU voice signal that is 25 seconds behind a current instant in time and there is a 15 second HU voice signal silent period within the 25 second period, the delay may be represented as a 10 second delay. In other cases, a delay may be adjusted downward based on other factors. For instance, where a CA is correcting errors in ASR generated text and all ASR generated text between the text currently considered (e.g., listened to) by the CA and current text is high confidence factor text, the system may be programmed to play back the intervening HU voice signal at double the normal rate so that the time required to catch up can be reduced and the delay indicated can be cut back. In still other cases, an anticipated captioning or error correction delay may be increased beyond the duration of HU voice signal time between text currently considered by a CA and a current time where, for instance, line noise in a signal is relatively high, a CA has had trouble quickly captioning a call, etc.

Conference Calls

In at least some cases it is contemplated that an AU may be on a conference call with two or more HU conferees. Here, the captioning system may operate in any of the ways described above where the two or more voice signals from the CAs are captioned and text is sent back to the AU's captioned device to be presented to the AU via a display screen. Here, one problem that can result is that an AU cannot discern which of two or more HU conferees is saying what on the call as the system presents text as if the captions are associated with a single incoming HU voice signal. Remember that an AU is at least hearing impaired and therefore may not be able to distinguish between different voices associated with different textual voice messages which can cause confusion.

In at least some embodiments the problem of discerning which HU on a multi-HU conference call is saying what is dealt with by identifying different HU voices as they are received at an AU captioned device or at a relay and then, as text is generated for each of the voice signals, indicating which HU uttered which messages. In at least some cases where an HU uses a smart phone or other communication device that generate user identifying information, the HU device will transmit an HU identifier along with each voice signal transmitted that can be used to distinguish the HU voice signal from other HUs. In some cases the HU identifier will include a phone number or other device address, a user's name or a non-specific identifier so that the HU's identity is not determinable but the HU voice signal can be distinguished from other HU voice signals.

In some cases an AU captioned device processor, relay processor or some other system processor may be programmed to distinguish different voice signals automatically simply based on differences in voice characteristics. In hybrid cases a relay or other device may use HU identifiers to distinguish HU voice signals where those identifiers are available and, when HU identifiers are not available for one or more HU voice signals on a call, a system processor may then use different voice characteristics to distinguish other voices on a call. For instance, where there are four HUs on a conference call and two use smart phones that provide HU identifiers along with each voice message uttered while two do not, the system would use the HU identifiers to identify the two associated voice signals and would use voice characteristics of the other two HUs to distinguish each of those two other voice signals.

In still other cases smart phone or other voice capturing device processors may be programmed to code each separate HU voice signal and associated text differently so that each HU voice signal can be distinguished from all others. For instance, first and second HU voice signals may be modified so that they have first and second pitches, respectively, so that they are distinguishable by other voice receiving processors within the system. Receiving processor can reconvert the modified voice signals back to their original signals for broadcast to CAs or an AU when needed.

In cases where voice signals are distinguished a system processor time stamps the beginning and end times of each voice signal automatically and stores the separate voice signal segments, time stamps and HU identities or identifiers for each segment. The voice segments are then converted to text and each text segment is associated with one of the time stamped voice segments and an associated HU. Next, the text captions are presented to the AU in some fashion where each text segment is presented in a way that the HU that uttered the segment is associated with the caption. For instance, in some cases where HU names are available (e.g., received form an HU smart phone or the like or stored in an AU device or relay database and associated with specific HU phone numbers or other calling addresses), each caption segment presented may be associated with the HU's name. In other cases HU images stored in an AU's captioned device or other system device may be presented along with captions. In still other cases where available live videos of HUs may be presented where captions uttered by each HU are spatially associated on the AU device display screen with the HU videos.

Figure 66:
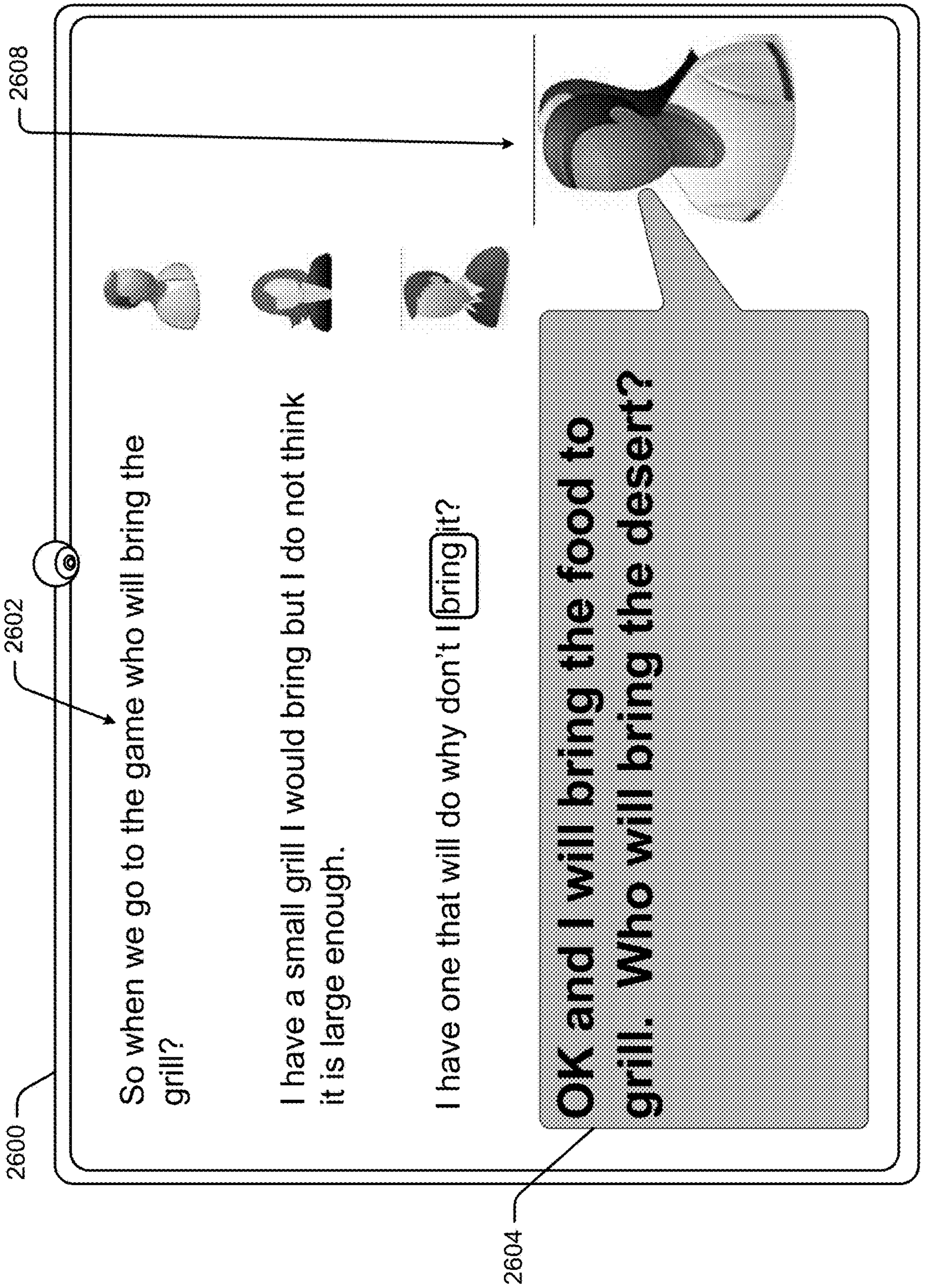
FIG. 66 is a captioning screen shot showing one view of a teleconference communication captioning system that is consistent with at least some aspects of the present disclosure.

In particularly advantageous cases captions uttered by different HUs in a sequence will be presented with a temporal aspect to their arrangement. For instance, in some cases captions and HU identifiers will scroll upward so that new captions are added near the bottom of the AU device display screen. In this regard see for instance FIG. 66 which shows one exemplary AU device display screen 2600 where a series of four HU caption segments are presented at 2602, a separate segment uttered by each of four separate Hus on an ongoing call. An image of each HU is presented to the right of a corresponding caption segment uttered by that HU. In the exemplary screenshot, a most recent HU utterance is shown near the bottom at 2604 where that utterance is visually distinguished in larger font and in a "call-out" box 2604 to distinguish from prior captions and the HU icon 2608 corresponding to the most recent utterance is shown larger as well. As shown, captions are arranged temporally with the oldest at the top and most recent at the bottom. One advantage to the screenshot in FIG. 66 is that an AU simply has to fix her gaze near the bottom of the screenshot at the area generally indicated by box 2604 to see most recent captions as all new captions are presented at that location.

Figure 67:
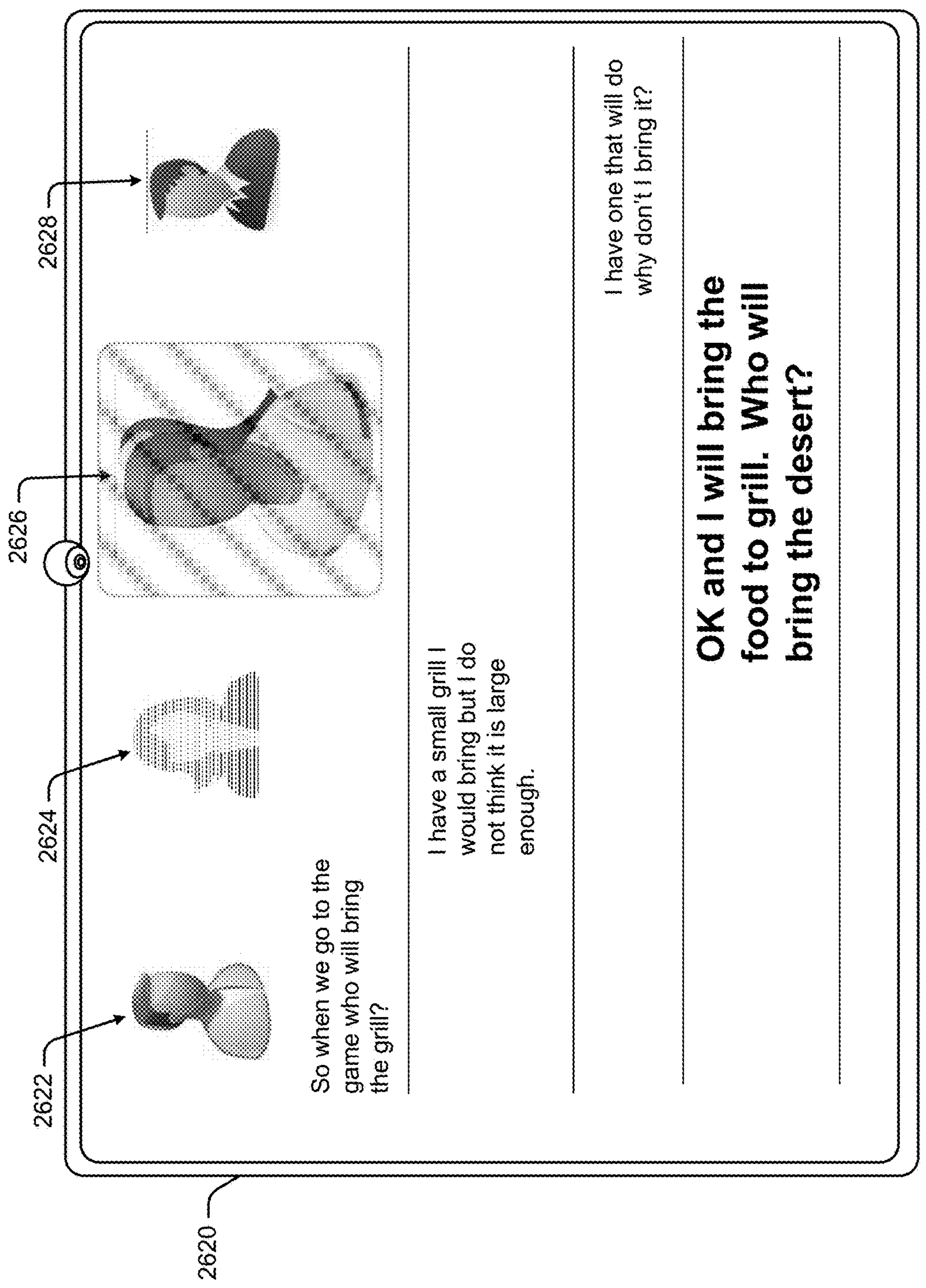
FIG. 67 is similar to FIG. 66, albeit showing another captioning teleconference view.

FIG. 67 shows another exemplary AU device screenshot 2620 where HU voice signal captions are temporally arranged. In screenshot 2620, HU voice captions are again arranged with oldest near the top of the screen and most recent near the bottom but here captions are arranged by HU in different HU specific columns. Again, the screenshot corresponds to a four HU conference call and therefore four HUs are represented in the screen shot 2620 spaced apart along an upper row at the top of an HU column 2622, 2624, 2626 and 2628. Each captioned voice signal corresponding to a specific user is located within the column below the HU image. Again, a most recent HU utterance at the bottom of the screenshot is visually distinguished (e.g., different font or font size or highlighting, etc.) to call attention thereto and the HU image associated therewith is enlarged to indicate current caller. In other cases a background area surrounding an HU image may be distinguished (e.g., highlighted or otherwise presented with a distinguishing appearance) to indicate a current speaker or even the volume associated with the voice signal received from the speaker (see FIG. 67).

Figure 68:
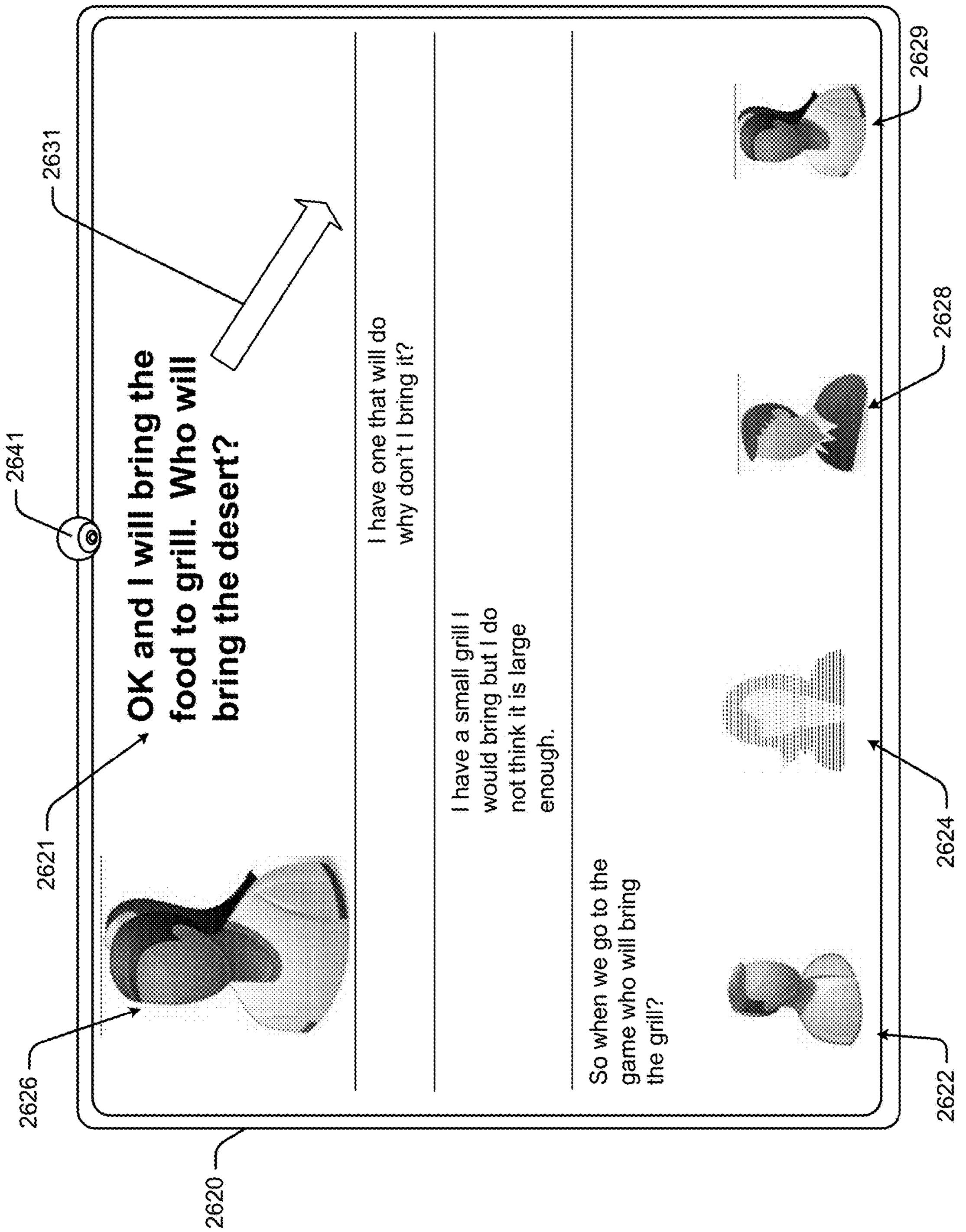
FIG. 68 is similar to FIG. 66, albeit showing another captioning teleconference view.

FIG. 68 is similar to FIG. 67, albeit where most recent text is presented at the top end of the AU display screen and prior presented text scrolls downward as new text is generated. In FIG. 68, the new text is specifically presented at a central location along the top edge of the display screen so that it is located just below the display camera 2641 so that as the AU is viewing the new text, if video of the AU is captured to present to the HUs, the AU appears to be looking directly at the HUs in the video while viewing the most recent text. Here, each HU is associated with a different text column on the screen shot with HU images presented along the lower edge of the display screen in associated columns. Once a most recent text segment is completed, that text slides over and into the column associated with the HU that generated the associated voice signal. Thus, for instance, in FIG. 68, once the text at 2621 ages, that text segment is moved into the right column as indicated by arrow 2631 to be associated with HU image 2629.

In at least some cases a single ASR or CA or a combination of a single ASR and a single CA may operate to generate captions for a plurality of HUs on a conference call. To this end, for instance, a CA may simply receive a constant stream of HU voice signals from two or more HUs and continually caption those signals as if they were generated by a single HU and the system may automatically associate specific caption text with specific HU voice signal segments and associated HUs so that AU device screenshots akin to those in one of FIGS. 66 through 68 may be presented to the AU. Similarly, an ASR engine may simply receive a continuous flow of HU voice signals from many HUs voices and transcribe time stamped text captions therefore as if the HU voice signals were from a single HU. Then, a system processor may use the ASR text caption time stamps to associate the ASR captions with the HU voice signal segments and specific HUs previously stored so that screenshots akin to those described above where captions are associated with specific HUs can be presented. Thus, here, the CA simply captions all voice signals and the system automatically associates different text captions with the different HUs on the call without any input from the CA.

Where ASR generated HU specific text is presented as in, for instance, FIG. 67, that ASR text may be presented to an error correcting CA either as a constant flow of captions that are not associated with specific HUs or in an HU associated way as shown in, for instance, FIG. 67. When presented as a constant flow of captions not associated with specific HUs, when a CA corrects an error in the captions, the relay sends error correction text to the AU for in line correct as described above and the AU captioned device then corrects the associated text segment on the AU device display. When the HU captions are presented in HU associated form as in FIG. 67, error corrections would be applied to appropriate caption segments as well.

In other cases when a multi-HU conference call occurs where HU voice signals can be individually discerned, a separate ASR may be assigned to each distinguishable voice signal. By assigning a specific ASR to a specific HU voice signal, the ASR can train during a call to the specific HU voice so that eventually the ASRs may be able to take over the entire call so that one CA or a reduced CA role can be implemented. Similarly, where separate ASRs are assigned to different HU voice signals on the same call, one or more of the ASRs may take over full or partial captioning duties from a CA that correspond to one or more of the HU voice signals while other HU voice signals continue to be captioned and/or error corrected by CAs instead of ASRs. For instance, where first through fourth ASRs operate on first through fourth HU voice signals initially, if the first and second ASRs become accurate enough to take over captioning entirely from a CA, those ASRs may automatically or at CA discretion take over captioning of the first and second associated voice signals while the third and fourth ASRs continue to train on the third and fourth HU voice signals.

In some cases, a separate CA for captions or error corrections may be assigned to each distinguishable voice signal. In still other cases, the number of CAs assigned to a conference call may be dynamic and be a function of any of several factors including number of HUs linked to the call, speaking rates of HUs, call quality characteristics (e.g., noise on the line), etc. In some cases a single ASR may feed two or more error correcting CAs on a single conference call. For instance, where four HUs are linked to one conference call, first and second CAs may handle error corrections for first and second HUs and third and fourth HUs, respectively. In each case, as error corrections are made, the system automatically sorts out which captions need correcting on the AU device and makes in line corrections accordingly.

Figure 69:
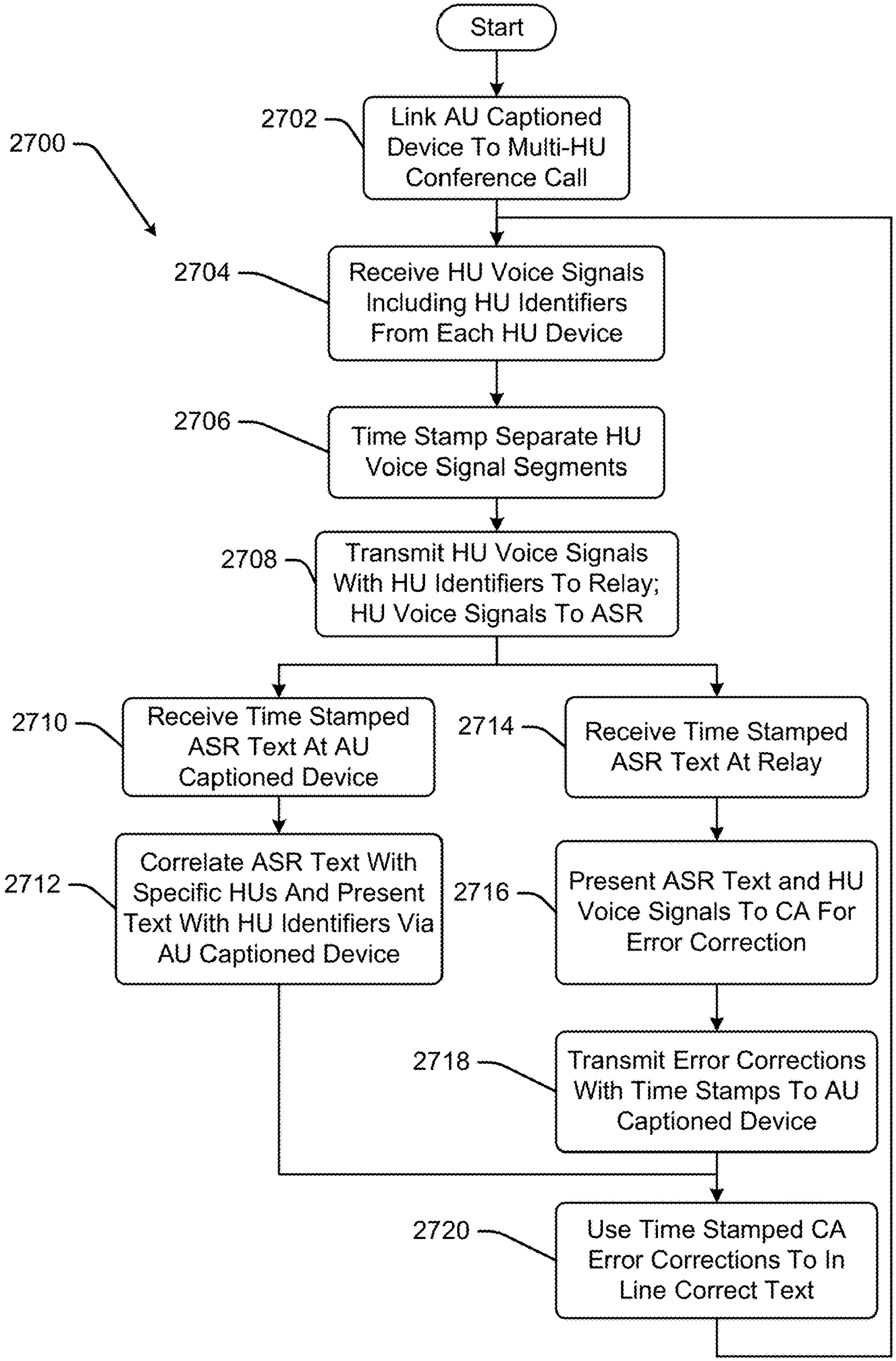
FIG. 69 includes a flowchart that shows a process that is consistent with at least some aspects of the present disclosure.

Referring to FIG. 69, a teleconference process 2700 for supporting an AU when conferring with more than one HU is illustrated. At step 2702 an AU's captioned device is linked to a multi-HU conference call. At block 2704, an AU captioned device receives HU voice signals from a plurality of HU communication devices where each signal includes an HU identifier or can otherwise be associated with a specific one of the HUs on the call (e.g., via voice recognition based on voice characteristics). At 2706, the AU device assigns start and end time stamps to each one of the voice signal segments. Here, a segment will typically be a speaking turn for an associated HU (e.g., a single persistent speaking duration for one HU prior to another HU speaking). In other cases, however, a voice signal segment may be shorter (e.g., on the order of 2-4 seconds of voice signal). At 2708 the voice signals are transmitted to the relay with HU identifiers and the voice signals are provided to an ASR (e.g., directly, through the relay, at the relay, etc.).

Referring still to FIG. 69, at 2710 time stamped ASR text is received at the AU captioned device. At 2712 the AU captioned device correlates the ASR text with specific HUs based on the time stamps and presents the ASR text to the AU via the captioned device display as uncorrected text.

Referring again to FIG. 69, at block 2714 the relay receives time stamped ASR text also which is presented 2716 to the CA via a workstation display while the associated HU voice signal is broadcast to the CA for error recognition. Error corrections are transmitted with the time stamps to the AU captioned device at 2718. The captioned device uses the time stamps to identify which presented captions need to be corrected and then performs in line corrections at block 2720.

In some cases it is contemplated that an ASR may be more accurate for some HU voice signals than others on a conference call. For instance, where four HUs participate in a conference call with one AU, an ASR handling all of the HU voice signals may eventually train to the point where accuracy for the first and second HU voice signals is above a threshold level and for third and fourth HU voice signals is below the threshold. Here, the system may automatically adapt so that CA captions or CA error corrections or both are only allowed for the third and fourth voice signals that have accuracy ratings below the threshold level and are disallowed for the more accurate first and second voice signals.

In this case, a CA workstation may present all of the ASR text captions for all the HUs as in FIG. 67 but only allow changes to the captions associated with the third and fourth HU voice signals to lessen the captioning burden on the CA or to cut out one or more of the CAs assigned to a call. Here, where the ASR caption accuracy exceeds a threshold level for first and second of four HU voices so that CA caption tasks are not required for those voices, the captioning burden on a CA would be substantially reduced as the sheer volume of CA captioning or error correction would be halved in many cases and periods during which first and second HUs are speaking could be treated like silent periods where those durations could be completely skipped if a CA were to fall behind in captioning or correcting for the third and fourth voices. In addition, because the captioning/correction burden is reduced, in at least some cases when an ASR takes over for at least a portion of a conference call, the system may automatically switch from a first highly skilled or more seasoned CA to a less skilled or less trained CA that should be able to handle the reduced captioning/correction load sufficiently well.

AU-AU Communication Captioning

In at least some cases it is contemplated that first and second AUs may confer using first and second AU captioned devices where each AU requires captioning of the other AU's voice signal. Here, in some cases each AU may have a fully functioning captioned device capable of linking to a relay to provide the other AU's voice signal to the relay and for receiving caption text back to present to an associated AU (e.g., the first captioned device used by the first AU presents text associated with the second AU's voice signals and the second captioned device used by the second AU presents text associated with the first AU's voice signals).

In other cases, however, it is contemplated that the AU captioned devices may be programmed so that one of the captioned devices operates as a primary captioned device that links to the relay and the other operates like a secondary captioned device that only links to the relay through the primary captioned device. In this regard, in at least some cases, when the secondary captioned device captures a second AU's voice signal and transmits that signal to the primary captioned device, the primary captioned device may be programmed to transmit that second AU voice signal to a relay for captioning. In addition, the secondary captioned device transmits a "captioned device" signal to the first captioned device indicating that the second AU's device is in fact another captioned device.

In addition, the primary captioned device is programmed to recognize when a captioned device signal is received from another communication device (e.g., in this case the secondary captioned device) and to thereby recognize when the other communication device is in fact a captioned device. Upon recognizing that the other device is a captioned device, the primary captioned device is programmed to automatically transmit any first AU voice signal captured by the primary captioned device to the relay for captioning. Thus, here, when two AU captioned devices are linked for caption assisted voice communications, a primary captioned device transmits each of the first and second AU voice signals to the relay for captioning. Here, an AU indicator or identifier may be transmitted with each voice signal segment that associates the segment with a specific one of the AUs so that the relay and can distinguish the first and second AU voice signals.

It should be appreciated that various aspects of the above systems provide many different advantages including, in at least some cases, increased captioning speed, increased captioning accuracy, reduced burden on captioning CAs, reduced captioning cost and increased AU and HU privacy as well as additional captioning interface features for each of the AU, CA and, in some cases, the HU involved in a captioned call. To this end, some of the described aspects and features that afford these advantages are listed hereafter.

Aspects and features that increase captioning speed include but are not limited to the following:

(1) CA error corrections presented more quickly to AU because of ASR.

(2) Processor speeding through high confidence factor text at expedited (e.g., double) rate.

(3) Processor providing options to CA for low confidence factor text.

(4) Limit CA error correction window to near real time ASR text—no reason to error correct text AU will never see.

(5) Switch out CA when too far behind and bring in second CA to pick up slack.

(6) Switch out more skilled CA for CA that is delayed for some reasons.

(7) CA applies experience to decide which caption type to use for best results.

(8) AU or HU device captioning to increase speed of initial ASR text.

(9) Better CA interface with stationary fields.

(10) Automatic acceptance of ASR text when not acted upon.

(11) Scored CAs for specific calls based on demands.

(12) Switching between CAs when a first CA is struggling to meet captioning speed and accuracy requirements.

(13) Applying two CAs to a single HU voice signal to expedite captioning at least at times.

Aspects and features of the present disclosure that increase accuracy include but are not limited to the following:

(1) Generate ASR captions first with CA error correction. Here, the CA is more accurate because less overall burden associate with transcribing and correcting captions.

(2) The ASR trains on CA error corrections.

(3) Commence captioning using remote ASR and local ASR in parallel. Here, the remote ASR may be most accurate initially but in some cases untrainable using CA error corrections. However, a local ASR is more likely to be trainable and hence should be more accurate as it trains.

(4) Running multiple ASRs in parallel and selecting most accurate automatically.

(5) Provide guidance to CA for switching between captioning processes to lead to more accurate process.

(6) Run metrics and tests to encourage CAs to strive for accuracy.

(7) Select ASRs based on HU, on voice type or characteristics, on call characteristics (e.g., line noise level, high or low definition audio, etc.).

(8) CA applies experience to decide which captioning process to use for best results.

(9) AU communication device captioning at least some HU voice signal segments to increase accuracy.

(10) HU communication device captioning at least some HU voice signal segments to increase accuracy.

(11) Scored CAs for specific calls based on demands.

(12) Having one CA generate text and a second CA error correct that text.

Aspects and features of the present disclosure that reduce captioning and error correcting burden on a CA include but are not limited to the following:

(1) ASR generating initial text that is provided to the CA as well as the AU.

(2) ASR indicating low confidence factor (CF) ASR text.

(3) ASR presenting options for low CF text that are selectable by a CA to error correct.

(4) A first CA generating HU voice signal captions and a second CA error correcting those captions.

(5) Processor only presenting low CF text and HU voice to CA at times (e.g., when error correction delay is behind) or persistently (always take out high CF text from consideration).

(6) Detect CA stress level and build in recuperation time when needed as opposed to when scheduled.

(7) Interface where CA needs to do nothing to accept ASR text if it is accurate.

Aspects and features of the present disclosure that reduces overall cost include but are not limited to the following:

(1) Eliminate all CAs from a call when ASR captioning accuracy exceeds an acceptable threshold level.

(2) When local ASR accuracy persistently exceeds remote ASR accuracy, delink the call from the remote ASR and only use the local ASRT to generate captioned text for AU consumption or CA error correction.

(3) Once ASR accuracy exceeds a threshold level, eliminate a captioning CA and only retain an error correcting CA on a call.

(4) Only facilitate CA error correction when an AU looks at captions (e.g., as detected by a camera or other AU device sensor).

(5) CA applies experience to decide which caption type to use for best results.

(6) CA eye tracking interface reducing cost by minimizing CA strain.

(7) Having one CA handle at least portions of two simultaneous ongoing calls.

(8) Have one CA handle captioning and/or error correction for two or more HUs that speak on a single conference call.

Aspects and features of the present disclosure that increase privacy include but are not limited to the following:

(1) Switch out CAs periodically so each CA only perceives a portion of a call.

(2) CA only presented low CF text for error correction so CA can only perceive part of a conversation.

(3) CAs only error correct when AU looking at captions (as sensed by camera or other AU device sensor).

(4) AU can select complete privacy. Here in another case, when complete privacy needed, CA may simply correct low CF text. In alternative, system may indicate low CF text to AU and allow AU to request CA error correction of any low CF text.

Additional aspects and features of the present disclosure that add value for an AU include but are not limited to the following:

(1) Privacy option. (FIG. 26)

(2) Better understanding of caption process.

(3) CA caption option selection.

(4) Understanding of low CF words and phrases.

(5) Ability to catch up when desired.

(6) Understanding of where CA is in error correction.

(7) Faster initial text.

(8) Faster error correction.

(9) Ability to split screen and see prior captions and ongoing real time captions.

(10) Understand caption delay.

(11) Option to adjust between speed and accuracy.

(12) Other information indicating emotions.

(13) Understanding of current accuracy level.

(14) AU and HU captions with AU captions generated by an ASR to increase contextual understanding of complete conversation.

Figure 24:
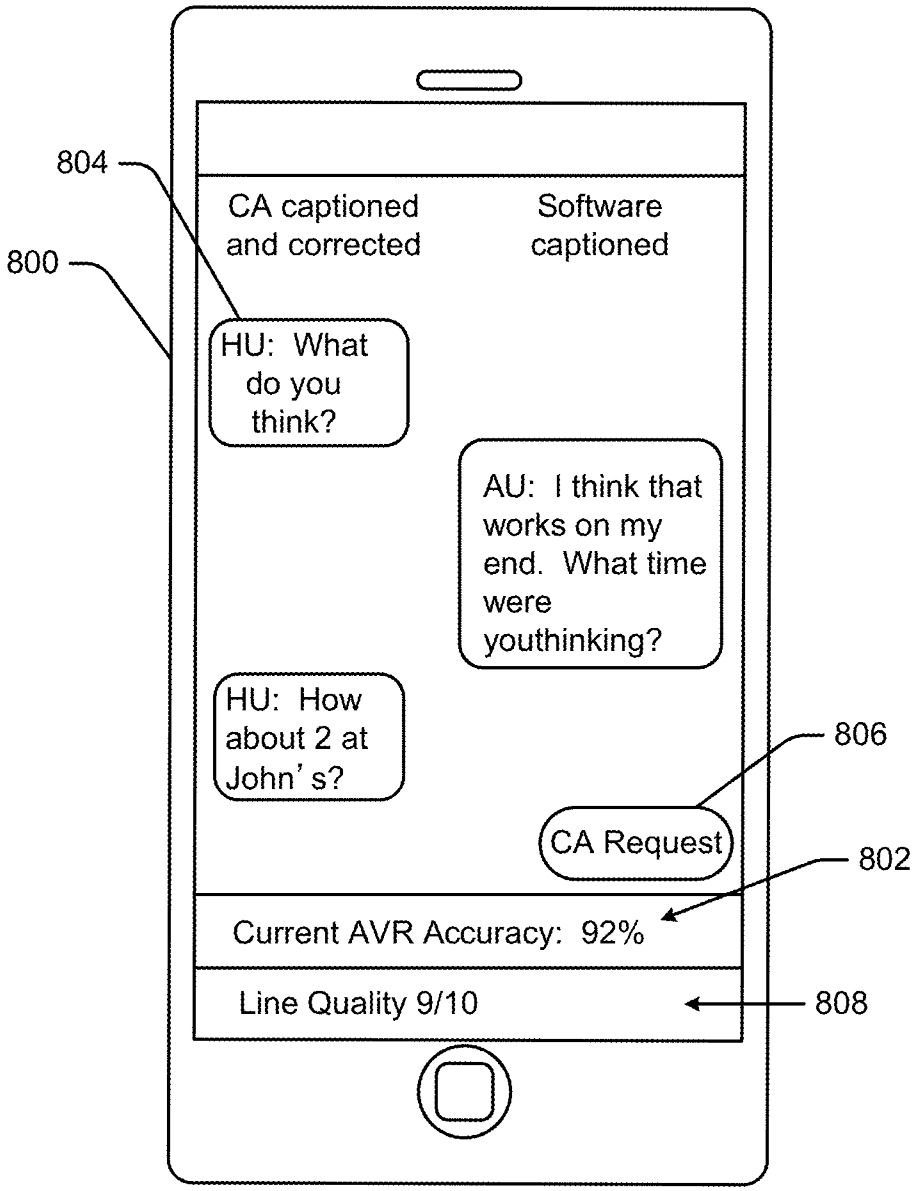
FIG. 24 shows an exemplary HU communication device with CA captioned HU text and ASR generated AU text presented as well as other communication information that is consistent with at least some aspects off the present disclosure.

(15) Understand line quality and other call characteristics (FIG. 24).

Figure 65:
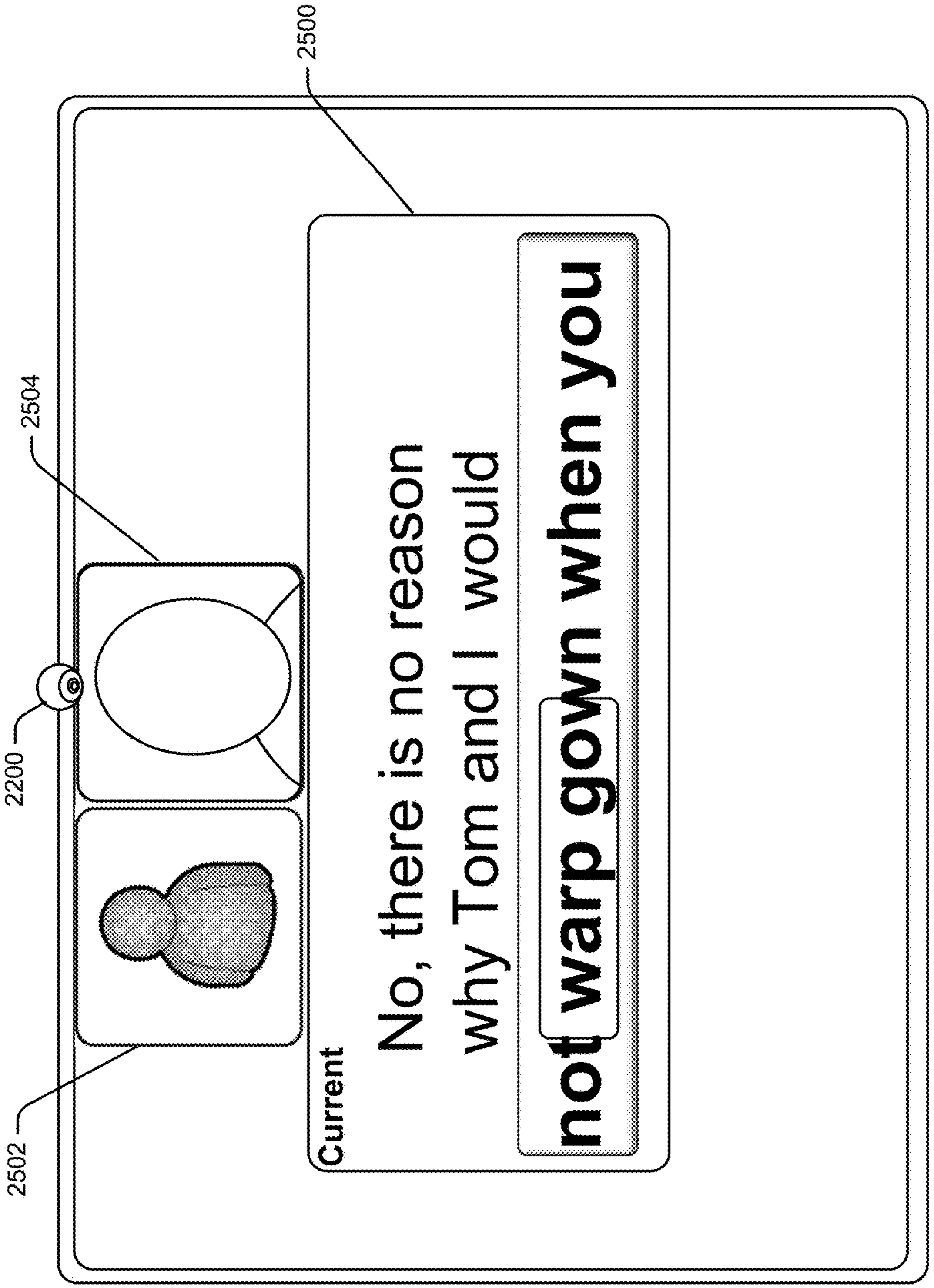
FIG. 65 is a captioning screen shot that is consistent with at least some aspects of the present disclosure.

(16) Dual HU view for full communication (FIG. 65).

Additional aspects and features of the present disclosure that add additional value for a CA include but are not limited to the following:

(1) Option to switch between complete ASR, CA captioning and error correction, and ASR captioning with CA error correction.

(2) Ability to understand turn taking between AU and HU (FIG. 23).

Figure 25:
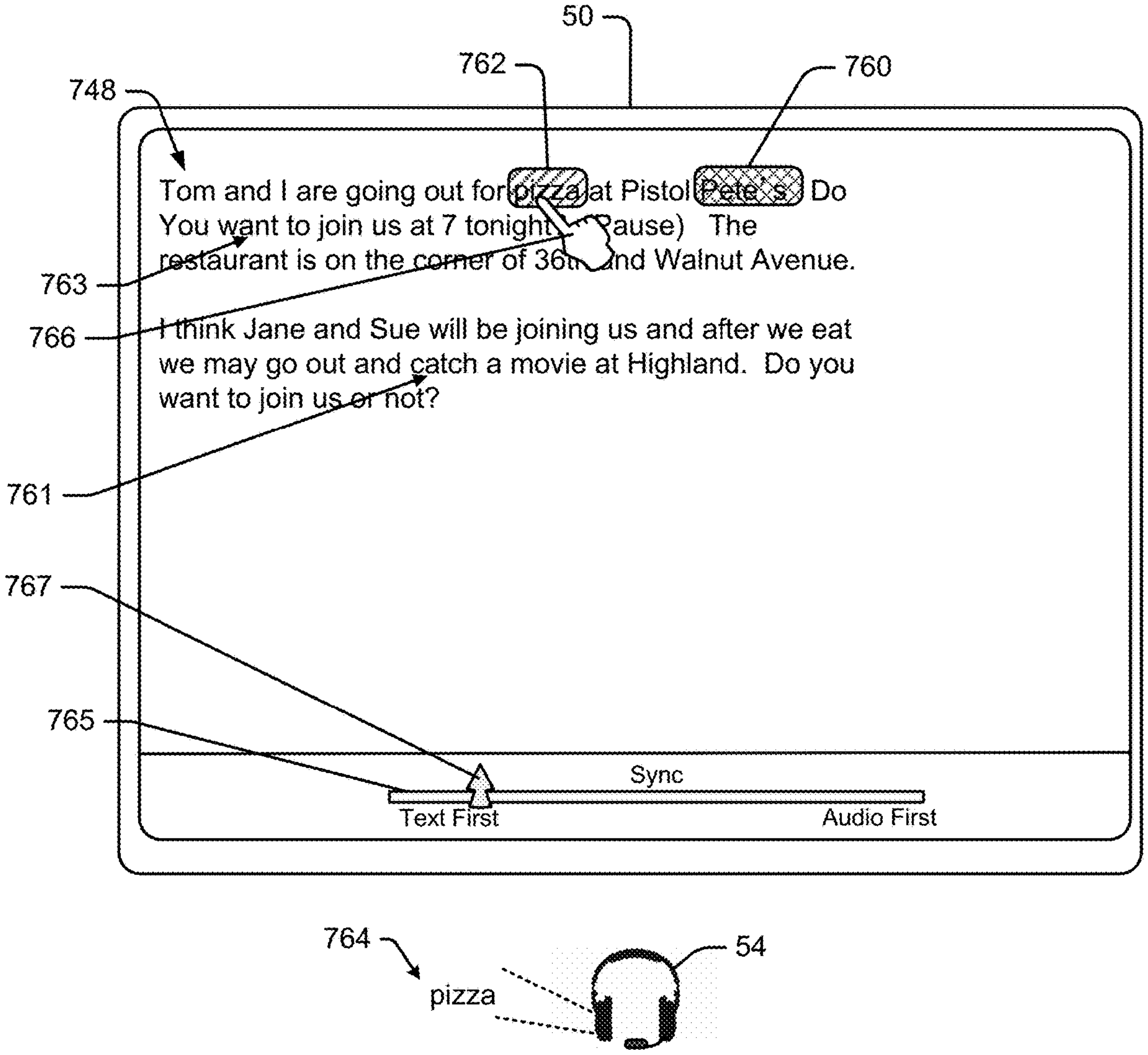
FIG. 25 is an exemplary CA workstation display screen shot similar to FIG. 23, albeit where a CA has corrected an error and an HU voice signal playback has been skipped backward as a function of where the correction occurred.

(3) Ability to adjust audio or ASR text first and alignment generally. (FIG. 25).

Figure 39:
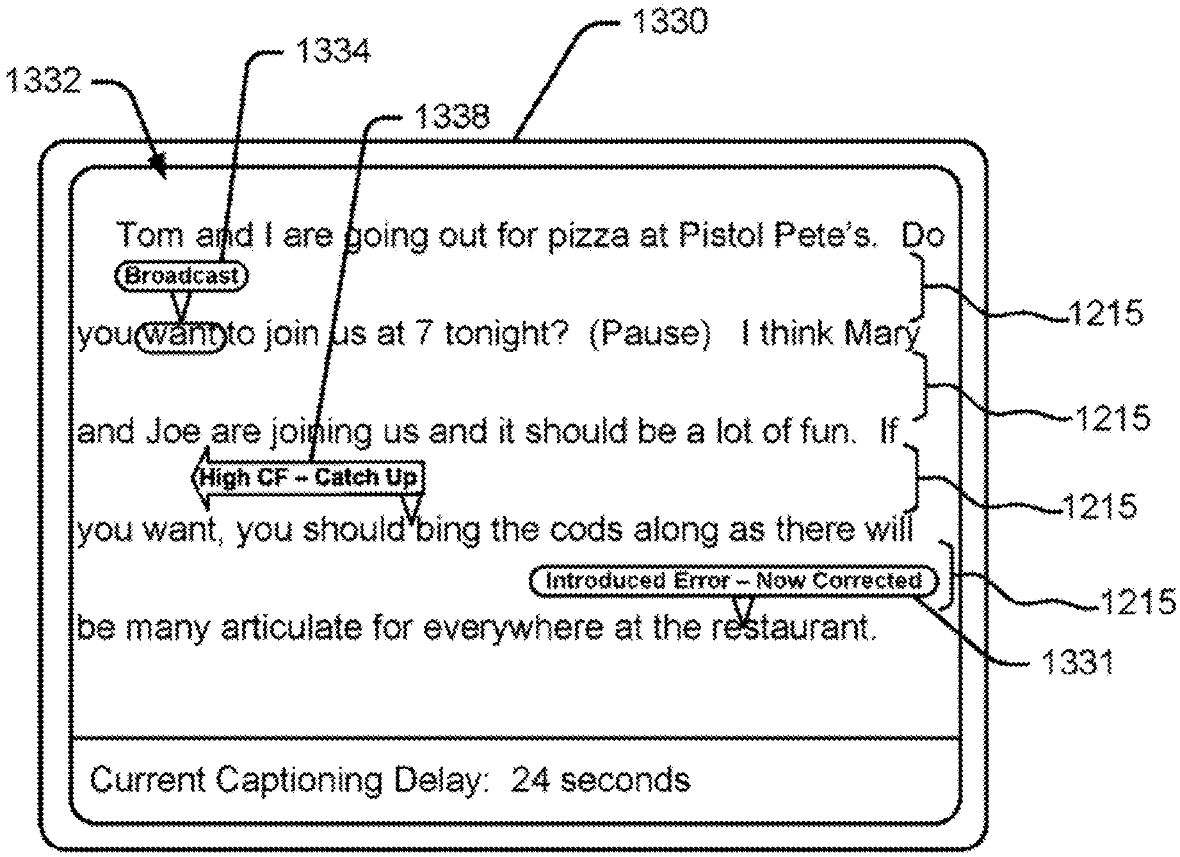
FIG. 39 is a screen shot showing a CA interface where various inventive features are shown.

(4) Ability to track captioned text currently broadcast (FIG. 39).

(5) Ability to see low CF text (FIG. 40).

(6) Ability to track real time metrics (FIG. 40).

(7) Ability to rapidly progress through expedited HU voice for high CF text (FIG. 40).

(8) Stationary line and low CF fields (FIGS. 44, 44A).

(9) Coaching of CA to change caption method (FIGS. 47; 50).

Figure 27:
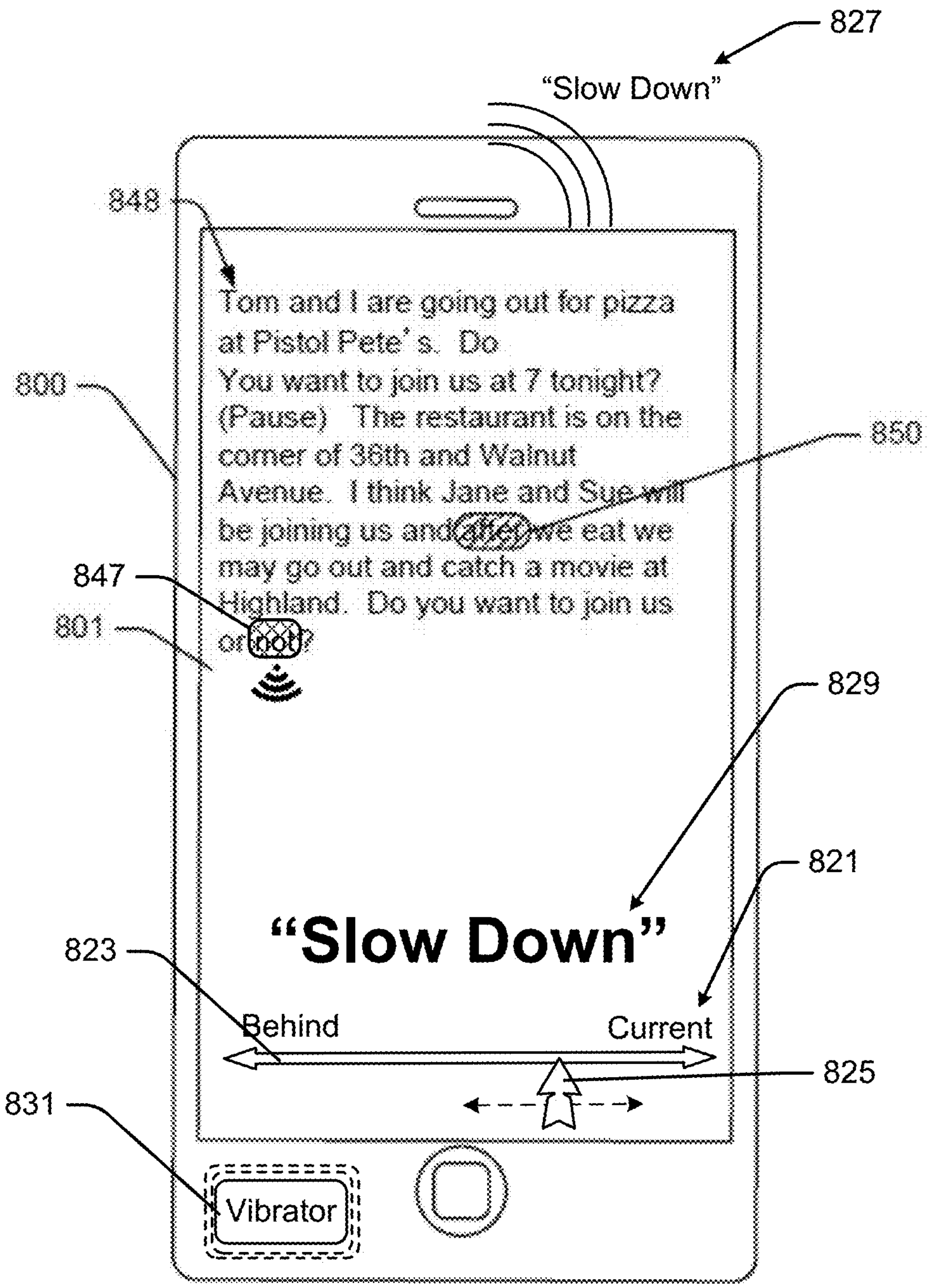
FIG. 27 is an illustration of an exemplary HU device that shows text corresponding to the HU's voice signal as well as an indication of which word in the text has been most recently presented to an AU.

Additional aspects and features of the present disclosure that add additional value for a HU include but are not limited to the following:

(1) Coaching on speed, annunciation, etc. (FIG. 27).

(2) Understand AU progress (word broadcast, where error corrections are at, which words have been presented as text to AU, etc.) (FIG. 27).

(3) Ability to initiate a caption process change based on caption accuracy feedback.

Additional aspects and features of the present disclosure that add additional value for a captioning system administrator include but are not limited to the following:

(1) Ability to enhance CA caption and error correction training.

(2) Metrics to track CA activities, speed, accuracy.

(3) Scoring system to rate CAs.

In at least some cases where ASR text is presented to an AU and an HU voice signal is delayed at least somewhat so that ASR text and HU voice can be presented more synchronously or precisely synchronously to an AU, the amount of voice delay may be adaptive and automatically changed by the system based on a number of factors. Similarly, in cases where ASR and HU voice are delayed so that at least some ASR error correction can occur prior to presentation to an AU, the amount of voice and ASR caption delay may be adaptive and automatically changed by the system based on several factors. For instance, HU voice broadcast and ASR captions may be dynamically adapted based on the level of ASR error correction that occurs prior to a current time during an ongoing call. For example, in cases where a call is progressing and no ASR error corrections occur during an initial 2 minute period, the HU voice and ASR caption delay may be minimized so that the captions and HU voice are presented relatively quickly (e.g., either immediately upon occurrence or, in some cases, where the HU voice signal is slightly delayed so that it is aligned in time with ASR captions). In other cases where an ASR makes substantial corrections in initial captions, delays may be increased so that at least some of the ASR corrections occur prior to caption and related HU voice presentation to the AU. Here it is contemplated that the adaptive delay would change during an ongoing call based on the degree of error corrections required.

The delay may be based on the level or error correction to initial ASR captions during the entire prior duration of an ongoing call, during a most recent rolling period of an ongoing call or during any other period. As another example, in a case where ASR error corrections occur within X seconds (e.g., 5 seconds) of generation of initial ASR text, delay may be based on the degree of error correction during a duration (e.g., one minute) that ends X seconds prior to a current time.

In other cases adaptive delay may be based on other factors like confidence factors associated with initial ASR generated text, content in HU and AU voice messages or other parameters. Parameters used to assess and adapt voice broadcast and caption presentation delays will be referred to hereinafter as caption quality factors.

While embodiments are described above where specific CAs are associated with preferred and non-preferred lists or optimal and non-optimal lists for specific AUs, it should be appreciated that the similar preferences or optimality ratings may be ascribed to different captioning processes. For instance, a first AU may routinely rank ASR captioning poorly but full CA captioning highly and, in that case, the system may automatically configure so that all calls for the first AU are handled via full CA captioning. For a second AU, the system may automatically generate caption confidence factors and use those factors to determine that the mix of captioning speed and accuracy is almost always best when initial captions are generated via an ASR system and one of 25 CAs that are optimal for the second AU is assigned to perform error corrections on the initial caption text.

To apprise the public of the scope of the present invention the following claims are made.

What is claimed is:

1. A captioning system for presenting captions to an assisted user (AU) during communication with a hearing user (HU) where the hearing user uses a hearing user's device to facilitate the communication, the system comprising:

a captioned device including a display screen, a speaker, and a microphone, the microphone for receiving the AU voice signal for transmission to the HU's device, the display screen for presenting captions corresponding to an HU voice signal, and the speaker for broadcasting the hearing user's voice signals;

a processor specially programmed to receive voice signal during an ongoing call between the AU and the HU and, during the ongoing call;

(i) run an automatic speech recognition (ASR) engine to generate initial ASR captions associated with the voice signal;

(ii) automatically assessing at least one caption quality factor associated with prior initial ASR captions generated during the ongoing call;

(iii) delaying broadcast of HU voice signal to the AU via the speaker; and (iv) providing the ASR captions to the AU device for display on the display screen;

(v) based on the at least one caption quality factor, automatically adjusting a duration of the HU voice signal broadcast delay to better temporally align the HU voice signal broadcast via the speaker with the captions presented via the display screen.

2. The method of claim 1 wherein the caption quality factor is related to the level of ASR error correction to the initial ASR captions prior to a current time during at least a portion of the ongoing call.

3. The method of claim 2 wherein the at least a portion of the ongoing call includes a most recent duration of time preceding a current time.

4. The method of claim 2 wherein ASR error corrections occur within X seconds of generation of initial ASR text and wherein the at least a portion of the ongoing call includes a duration that ends X seconds prior to a current time.

5. The method of claim 1 wherein ASR text captions are presented to the AU via the captioned device.

6. The method of claim 5 wherein the ASR performs error corrections on the ASR text captions and those error corrections are made in the text presented by the captioned device.

7. The method of claim 5 wherein ASR text presentation to the AU is delayed and wherein the delay duration is based at least in part on the quality factor.

8. The method of claim 7 wherein the ASR text and HU voice signal are presented substantially synchronously to the AU.

9. The method of claim 5 wherein the captioned device enables the AU to adjust synchronicity of the ASR text and HU voice signal.

10. The method of claim 5 wherein the captioned device enables an AU to select whether or not the HU voice signal is broadcast prior to or subsequent to presentation of the ASR text.

11. A captioning system for presenting captions to an assisted user (AU) during communication with a hearing user (HU) where the hearing user uses a hearing user's device to facilitate the communication, the system comprising:

a captioned device including a display screen, a speaker, and a microphone, the microphone for receiving the AU voice signal, the display screen for presenting captions corresponding to an HU voice signal, and the speaker for broadcasting the hearing user's voice signals;

a processor specially programmed to receive voice signal during an ongoing call between the AU and the HU and, during the ongoing call:

(i) run an automated speech recognition (ASR) engine to generate initial ASR captions associated with the HU's voice signal;

(ii) using the ASR engine to correct errors in the initial ASR captions;

(iii) automatically quantifying a degree of ASR error corrections generated;

(iv) automatically delaying broadcast of the HU voice signal via the speaker by a delay duration; and (v) automatically adjusting the delay duration as a function of the degree of ASR error corrections that occurred during at least a portion of the call between the AU and the HU to better temporally align the HU voice signal broadcast via the speaker with the captions presented via the display screen.

12. The method of claim 11 wherein the step of using the ASR engine to correct errors takes X seconds and wherein a maximum delay duration is X seconds.

13. The method of claim 12 wherein the minimum delay duration is zero seconds.

14. The method of claim 12 further including broadcasting the HU voice signal to the AU via the captioned device.

15. The method of claim 14 wherein the HU voice signal is broadcast substantially simultaneously with presentation of the ASR captioned text.

* * * * *